United States Patent [19]

Smith et al.

[11] 4,336,589

[45] Jun. 22, 1982

[54] WAREHOUSING MONITOR AND CONTROL SYSTEM

[75] Inventors: Charles A. Smith; Robert T. Danevicz, both of Grand Rapids, Mich.

[73] Assignee: Rapistan Division, Lear Siegler, Inc., Grand Rapids, Mich.

[21] Appl. No.: 138,250

[22] Filed: Apr. 7, 1980

[51] Int. Cl.³ .............................................. G06F 15/24

[52] U.S. Cl. .................................... 364/403; 198/347; 198/418; 364/478; 364/900

[58] Field of Search ............... 364/403, 478, 200, 900; 235/432, 385, 91 L; 340/150; 198/347, 418

[56] References Cited

U.S. PATENT DOCUMENTS

| | | | |
|---|---|---|---|
| 2,995,729 | 8/1961 | Steele | 364/403 |
| 3,144,958 | 8/1964 | Gumpertz | 235/385 |
| 3,637,989 | 1/1972 | Howard et al. | 235/91 L |
| 3,651,478 | 3/1972 | Shandlay | 364/900 |
| 3,688,087 | 8/1972 | Howard et al. | 235/385 |
| 3,737,631 | 6/1973 | Harris | 235/385 |
| 3,899,775 | 8/1975 | Larsen | 340/150 |
| 4,024,380 | 5/1977 | Gunn | 235/432 |
| 4,135,241 | 1/1979 | Stanis et al. | 235/385 |
| 4,141,078 | 2/1979 | Bridges et al. | 364/403 |
| 4,180,204 | 12/1979 | Koenig et al. | 235/385 |

*Primary Examiner*—Errol A. Krass

*Attorney, Agent, or Firm*—Price, Heneveld, Huizenga & Cooper

[57] ABSTRACT

A warehouse product monitoring and control system includes a distribution audit system computer which receives batch picking information on a recording medium identifying each transaction or article to be picked with a unique number. Associated with each unique number is processing information for controlling the sorting of the article within the system. The same number, unique for each article, is contained on a label positioned on each article as it is picked. The computer control provides continuous monitoring of the article as it is scanned by one or more label reading devices such that the picking and sorting status of each article to be picked can be continuously monitored. The system includes operator interface terminals and printers for providing a variety of status reports to the operating personnel such that the operational status of the system can be continuously monitored.

17 Claims, 9 Drawing Figures

OPERATOR INTERFACE SUBSYSTEM

FILE MANAGER SUB-SYSTEM

ALARM MESSAGE SUB-SYSTEM

LEGEND

P PROGRAM
T TASK
S SUBROUTINE
D DATA
P-n TASK/PROG. PRIORITY
Q FIFO QUEUE
⊘ QUEUEABLE RESOURSE
○ CONNECTOR

WAREHOUSING MONITOR AND CONTROL SYSTEM

BACKGROUND OF THE INVENTION

The present invention relates to a method and apparatus for monitoring and controlling the flow of articles in a warehouse or other installation.

There exists a great variety of systems in which orders are filled by, for example, a central warehouse where items to be shipped to a given destination are manually, semiautomatically, or automatically picked, sorted, and routed to a shipping dock for shipment to, for example, retail stores. Typically, labels identifying the shipping destination are applied to articles as they are picked which labels are subsequently employed at a sorting location for the diverting of articles to a particular shipping area of the installation. U.S. Pat. No. 4,181,947 illustrates a sorting system which can be employed with such a system.

Where, however, a warehouse system is of relatively large size and it is capable of simultaneously handling a great number of orders, maintaining accurate information as to the status of individual orders being filled as well as the operational status of the entire system, while maintaining a maximum throughput efficiency, is virtually impossible with the systems of the prior art.

SUMMARY OF THE PRESENT INVENTION

It is an object of the present invention to provide a method and apparatus for maintaining an accurate account of each transaction occurring within a warehousing system such that at any given time during an operating day, the status of each transaction and order being filled can be monitored and controlled. In order to achieve this objective, each transaction, which in the preferred embodiment of the invention pertains to a given article to be transferred from storage to a dispatching area, is assigned a unique identification number. This number is subsequently applied to an article as it is picked in the form of a machine readable coded label. The number is also entered into a control system memory, and as the article travels through the system, the label is read such that at any given time, the status of each transaction and the operation of the entire system is accurately known and can be controlled.

In the preferred embodiment of the invention, the system incorporates a computer controlled sorting and control system in which each article to be removed from storage and shipped to a destination, is assigned a unique code which identifies a single transaction within the system. Orders to be filled by batch picking and transfer of articles from storage to a given dispatch location at the warehouse, are grouped together in the computer memory to form batches of orders with the customer identification and discharge location being associated with each transaction number. By reading only the transaction number from a encoded label on an article at one or more locations within the system, the computer can continuously update the order status information and provide the operators of the system with current status information as well as provide control information to the sorting system employed. By providing operator interface circuits, reports can be generated either in soft or hard copies to monitor the operational status of each trasaction, order or batch of orders to facilitate the accurate and fast movement of articles within the system. Such information can be employed to quickly identify and correct failures and breakdowns within the system or to rapidly reassign divert locations for the sorting system in the event of a breakdown of a sortation line.

These and other objects, features and advantages of the system will become apparent upon reading the following description thereof together with reference to the drawings in which:

DETAILED DESCRIPTION OF THE PREFERRED EMBODIMENT

Figure 1:
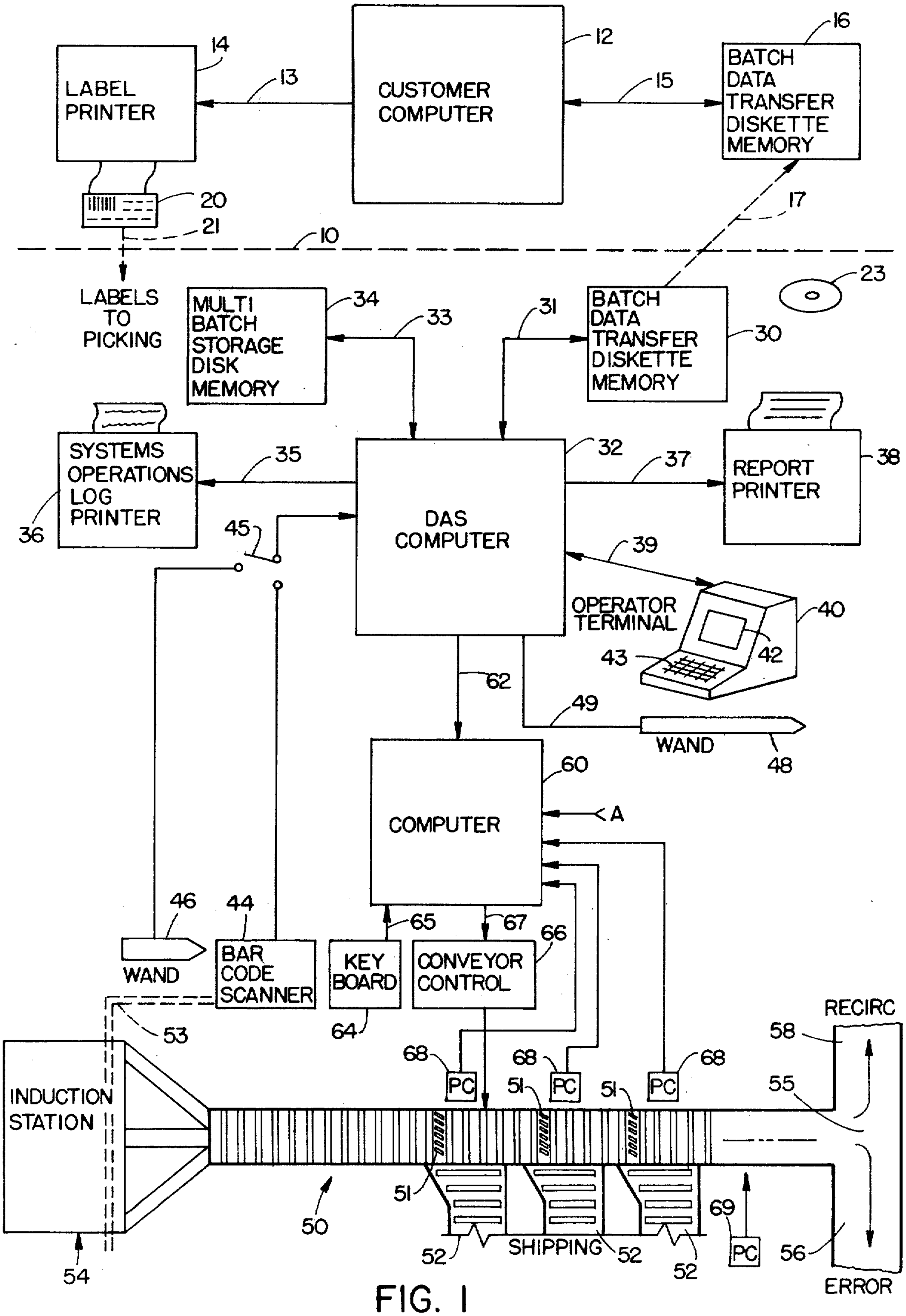
FIG. 1 is a pictorial representation of a warehousing system embodying the present invention including an electrical circuit diagram in block form of the control system.
Figure 7:
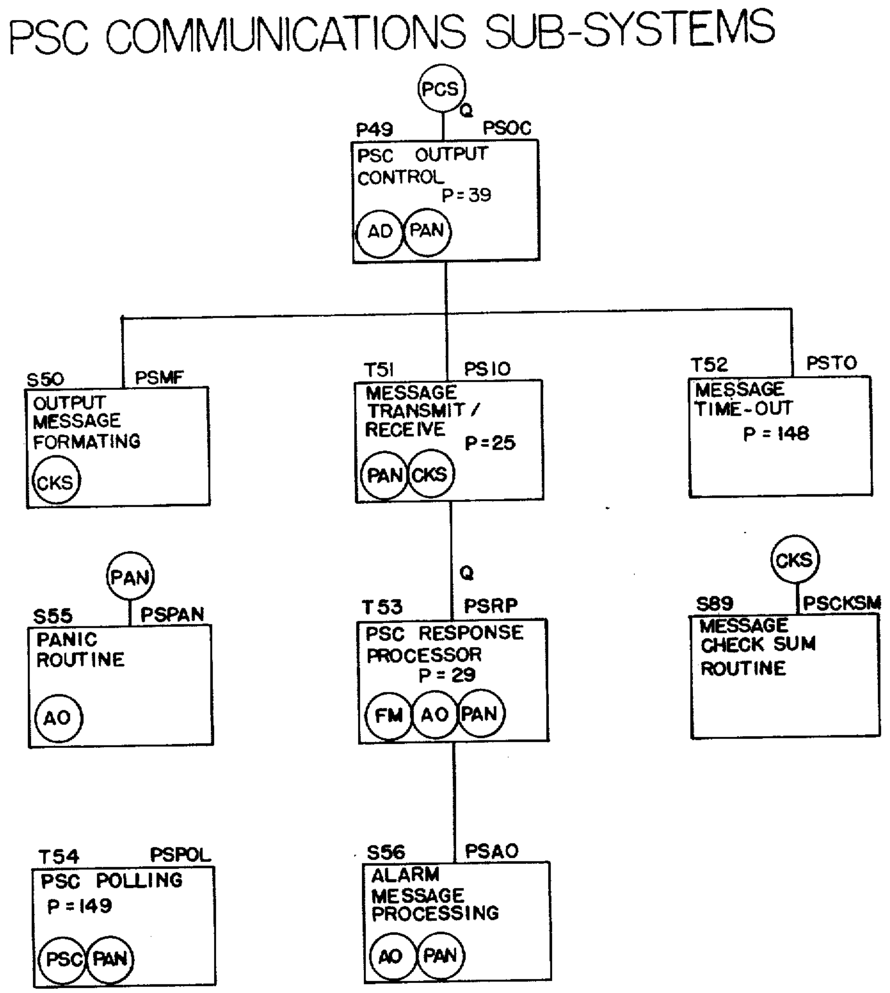
FIG. 7 is a block diagram of the module layout of the software for the interface between the sorting control system and the main control system.

FIG. 1 represents a physical installation as well as the control system located within the installation. At the upper portion of the figure above dashed line 10 there is shown a central control area corresponding typically to an office area of a customer's facility, while the portion below line 10 represents the actual warehouse installation including the sortation conveyer equipment, and in which the actual articles to be transferred from storage to a dispatching dock or the like are stored in a conventional warehousing storage system. Such a system may include, for example, tiers of vertically and horizontally arranged storage bins with access aisles extending between adjacent tiers permitting either manual, semiautomatic, or automatic picking of articles from the storage bins to be achieved through the use of stacker cranes or other picking systems. Articles removed from storage are placed on conveying systems which ultimately connect with a sorting conveyer. Not shown in FIG. 1 are the storage bins, access aisles, or the conveyers leading to the induction station and sorting conveyer system. In some installations, the warehouse will be physically separate from the central control area while in other installations the two locations may share a common building at separate areas. Having briefly described the environment in which the present invention pertains, a description of the overall system is now presented.

Figure 2:
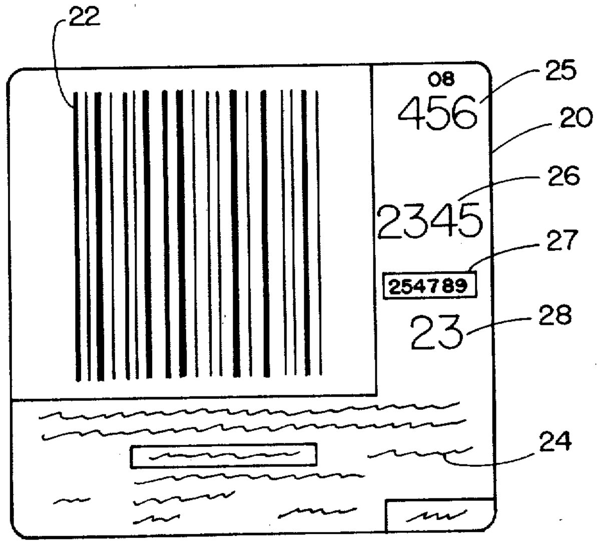
FIG. 2 is typical label associated with each article and identifying a unique transaction within the system.

In FIG. 1, the customer computer 12 typically will be a relatively large computer used by the customer for all of its business operations. Such a computer may be, for example, a commercially available IBM System 3 type computer which is interfaced with a label printer 14 by means of a data link 13 for the printing of labels 20, such as shown in FIG. 2. The label printer can be any one of a number of dot matrix-type printers which are commercially available such as the Printronix Model 600. Also, interfaced with the customer computer 12, is a batch data transfer diskette memory 16 coupled to the computer by a data link 15 for the generation of diskettes containing information corresponding to one batch of orders. The unit 16 may be, for example, a commercially available IBM floppy diskette model 3540. The customer computer 12 is employed in connection with label printer 14 and disketter unit 16 through conventional programming techniques to arrange orders to any one of the several retail outlets of the customer in a logical picking sequence such that the articles can be batch picked. Thus, for example, if the customer is a large grocery chain, with several grocery stores located in the geographical area served by the warehouse, one batch of orders to be filled may include 50 different grocery items with the batch including orders for 15 different retail outlets. The orders are arranged such that each item which is common to the group of articles to be picked will be simultaneously picked by the warehousing picking system. Thus, the computer 12 will be programmed, for example, to print labels in order with all of the labels for example, pertaining to a case of a certain type of produce such as beans to be simultaneously picked for all of the orders. This organization provides for efficient batch picking of articles.

Assigned to each transaction, which corresponds to a single case of a given item, is a unique six digit number which is employed within the control system shown in FIG. 1, to uniquely identify that article such that its progress within the system can be monitored and controlled. This number is applied in machine readable form to the label 20 as seen in FIG. 2 in the form of a bar code 22 which occupies a large portion of the label. The label 20 also includes man readable information 24 at the bottom of the label indicating for example the product identification, pricing information, and shipment location for the customer to which the article being picked is to be transferred. Further, the label will include man readable indicia 25 indicting the storage location of the article within the warehousing system which is contained within the memory of computer 12. Also on label 20 is indicia 26, corresponding to the store number to which the article is to be shipped, indicia 27 showing the unique six digit number (which in the example shown in FIG. 2 is the number 254789); and finally, indicia 28 pertaining to the discharge chute of the sortation conveyor system to which the article is to be sent for shipment.

Each article to be picked corresponding to a single transaction thus receives a label 20 and each label printed by printer 14 in a given day has a unique number 22 as compared to all other labels printed. Information corresponding to the label information as well as additional information is simultaneously recorded on a floppy disc by unit 16 which includes the label information for a plurality of labels forming several orders forming, in turn, a single batch for processing within the control system. Each diskette therefore includes stored data corresponding to each label of a given batch including the six digit label number, the sort lane number, the store number, the product code, which is assigned by the customer to any particular type of product, and information pertaining to where the product is stored in the warehouse. Further, each diskette includes a header record which provides an identification of the particular batch, as well as a description of the batch which can be any 50 character description desired by the customer. Thus, each group of labels provided by printer 14 will have associated with them a single diskette corresponding to a batch of items to be picked. Each batch will typically include several orders, each of which include several transactions with each transaction having a single label associated with it. The system of the present invention is capable of processing simultaneously up to 10 batches with each batch having a capability of 35 orders per batch and total of 9,000 transactions for each batch. Typically, however, only one or two batches will be picked simultaneously with the remaining batch information contained in memory in either a pending status or possibly a completed status, depending upon the operational status of the picking and sorting of the batches. The generation of the labels, as well as the diskette in a batch picking sequence, with the exception of the utilization of a unique number assigned to and associated with each label and transaction is conventional and achieved by computer 12. The labels are manually carried to the warehouse as indicated by dashed line 21 as are the diskettes 23 generated and associated with each batch as indicated by dashed line 17.

Each diskette from the customer computer 12 generated by the diskette unit 16 is read by a batch data transfer diskette memory unit 30 associated with and coupled to a distribution audit system (DAS) computer 32 by means of a data link 31. The diskette unit 30 may comprise for example a commercially available IBM diskette unit model number 4964, while computer 32 may for example be an IBM model 4955D computer. The function of unit 30 is to read the information from the diskette hand carried from unit 16 into a multi-batch storage disc memory unit 34 coupled to computer unit 32 through data link 33. Unit 34 is capable of storing not only the control program for computer 32, but also the data stored on each of the diskettes associated with each batch of articles to be picked. Unit 34 may, for example, comprise a commercially available IBM 4962 disc storage unit. Hard copies of alarm, status, and control information are provided by a systems operations log printer 36 coupled to computer 32 by means of a data link 35. Printer 36 may, for example, comprise a Digital Equipment Corporation matrix printer type LA 120. A second report printer 38 is also coupled to computer 32 through data link 37 and is employed for providing a variety of status reports as discussed below and may be for example an IBM model 4974 matrix printer. Also coupled to computer 32 by means of a data link 39 is an operator terminal 40. Terminal 40 includes a CRT display 42 and a digital keyboard 43 and may be a commercially available IBM model 4979 display station. Several such operator terminals and printers may be positioned at different locations within the system as conveniently desired. Other interface inputs to the computer 32 include one or more bar code scanners 44 selectively coupled to the computer 32 by means of a switch 45 which either couples the scanners 44 which are Accusort model number M scanners to an input of computer 32 or label wand scanners 46 to the computer 32. The wand scanners 46 can be Accusort model number 4600 scanner for detecting the bar code 22 on labels 20 of FIG. 2. Scanners 44 optically read labels on articles prior to transfer or induction onto the sortation conveyor 50 as shown by lines 53 in FIG. 1. Also coupled to computer 32 by means of a data line 49 is a second wand scanner 48 which is employed for scanning stock-out labels as described below and which can also be an Accusort model 4600 wand scanner. An additional wand scanner (not shown) is employed for hand scanning excess repack labels as also described below.

The DAS computer 32 interfaces with a programmable sort control (PSC) computer 60 by means of a data interface coupling 62. Associated with the PSC computer 60 is a backup keyboard 64 coupled thereto by means of a serial data link 65, and a conveyer control circuit 66 coupled thereto by means of a data link 67. A plurality of article detecting photo cells 68 are spaced along the sorting conveyer 50 downstream of each article diverter 51 for detecting whether an article has been properly diverted to its assigned discharge or shipping chute 52 associated with the sorting conveyer 50. Further, a line full photo cell detector 69 is also coupled to the PSC computer 60 and is associated with each of the discharge chutes 52 such that a control signal is applied to computer 60 in the event any of the discharge chutes are filled with articles and thereby requiring a different discharge chute to be assigned to a particular order being sorted and staged for shipment.

At the input end of the sorting conveyer 50, there is provided an induction station 54 for receiving articles from several feeder conveyers (not shown) extending throughout the warehousing system and converging the articles onto the sorting conveyer 50. The PSC computer and its associated interface and control circuits to provide the induction and sorting of articles is described in detail in the above identified U.S. Pat. No. 4,181,947, the disclosure of which is incorporated herein by reference.

Sorting conveyer 50 terminates in a T 55 leading to either an error chute 56 or a recirculation loop 58 such that articles not sorted can either be recirculated through the sortation control system as selectively controlled as described below or fed to a storage area associated with the error chute for manual attention to a nonreadable label.

Figure 6:
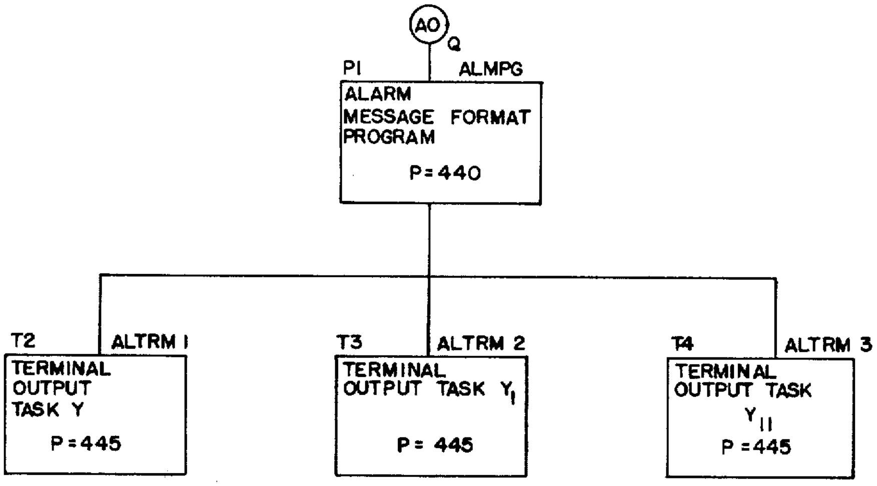
FIG. 6 is a block diagram of the module layout of the software for the alarm message portion of the control syste including the legend employed for FIGS. 3 through 8.

The control of the hardware elements shown in FIG. 1 corresponding to the control system of the present invention is achieved by the programming of computer 32 which program is stored in memory 34 and which is organized according to the module layout chart shown in FIGS. 3 through 8. With reference to these figures, FIGS. 3A and 3B disclose the layout of the programming for the interface between computer 32 and printer 38 and computer 32 and the operator terminal 40. The programming represented by FIG. 4 pertains to the internal handling of data between computer 32 and memory 34 as does the programming diagrammed in FIG. 5. FIG. 6, relates to the alarm messages provided by printer 36 and accordingly the programming for providing such alarms. The programming represented by FIG. 7 pertains to the programming which interfaces computer 32 with computer 60. Finally, the programming represented by FIG. 8 pertains to the intercoupling of computer 32 with the scanning wands 46, 48, and the bar code scanners 44. The module layout of the program as represented by FIGS. 3 through 8 is directly correlated with the pseudo code and structural English printout of the software organization disclosed in appendix A which is attached hereto, made part of the specification and incorporated herein by reference. In FIGS. 3 through 8, each block represents a module which performs a specific operation within the system. Each block is identified by the letters P, S, T, or D (described in the legend accompanying FIG. 6) followed by a number identifying a particular portion of the program employed. In addition, each block includes a label name constituting an acronym which is correlated with the programming information disclosed in appendix A. As can be seen, for example in FIGS. 3A and 3B, many of the modules call up additional modules indicated by an encircled two letter connector. Thus, for example, the panic subroutine shown in FIG. 3B which serves to stop the program in the event of a major failure, is identified by the two letters PA which is called up by many of the modules in the event the module is unable to perform its particular programming function. The programming comprising the source code for the PSC computer is also incorporated herein by reference as appendix B which is attached hereto and made a part of this specification.

Having described the hardware and the broad correlation between the program organization and individual elements of the hardware, a description of the operation of the system to achieve its desired monitoring and control of each transaction, as well as the various status reports available employing the unique transaction number identification of each article to be picked, is now presented.

Figure 3A:
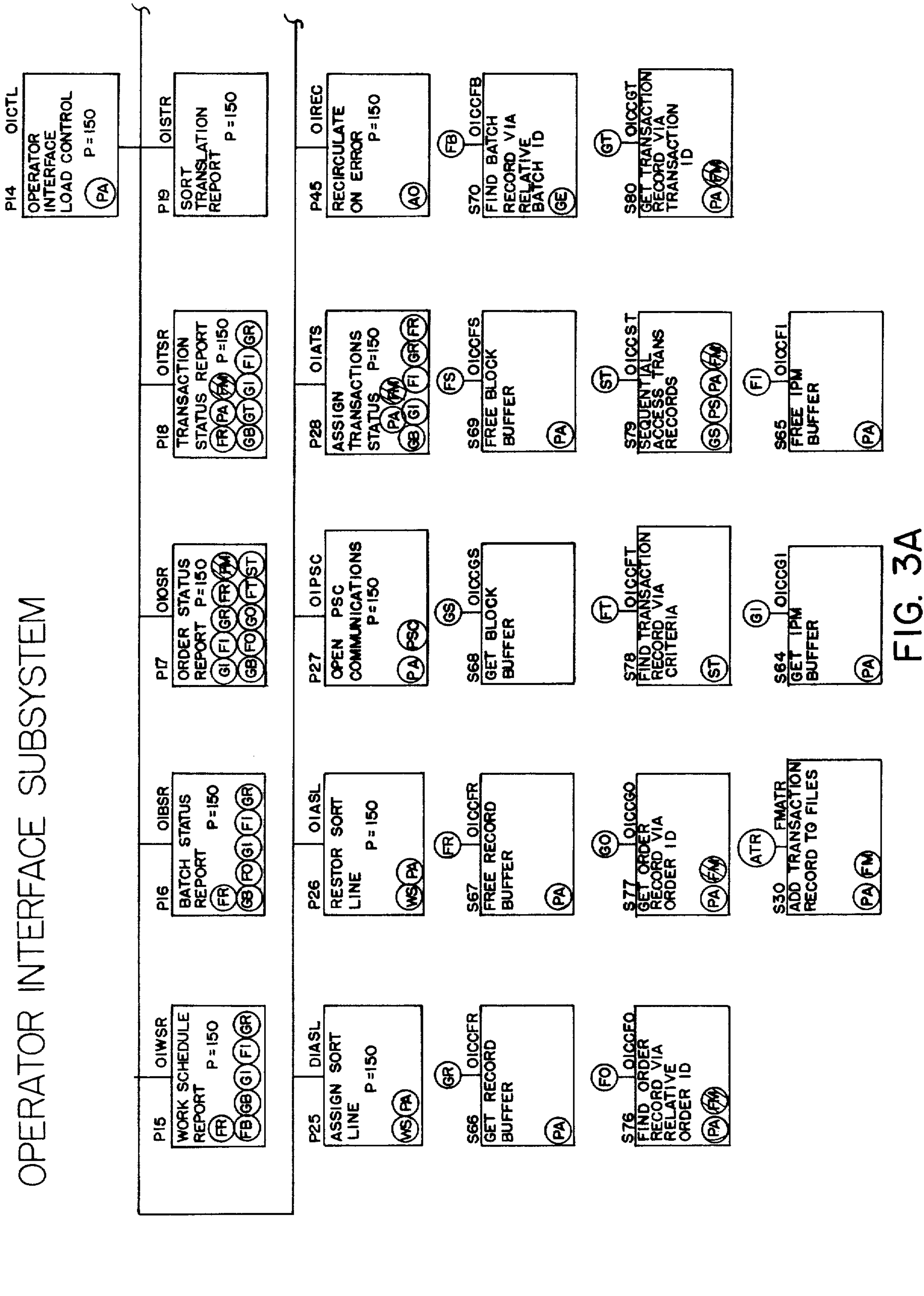
FIGS. 3A and 3B are block diagrams showing the module layout of the software employed for the operator interface portion of the control system.
Figure 3B:
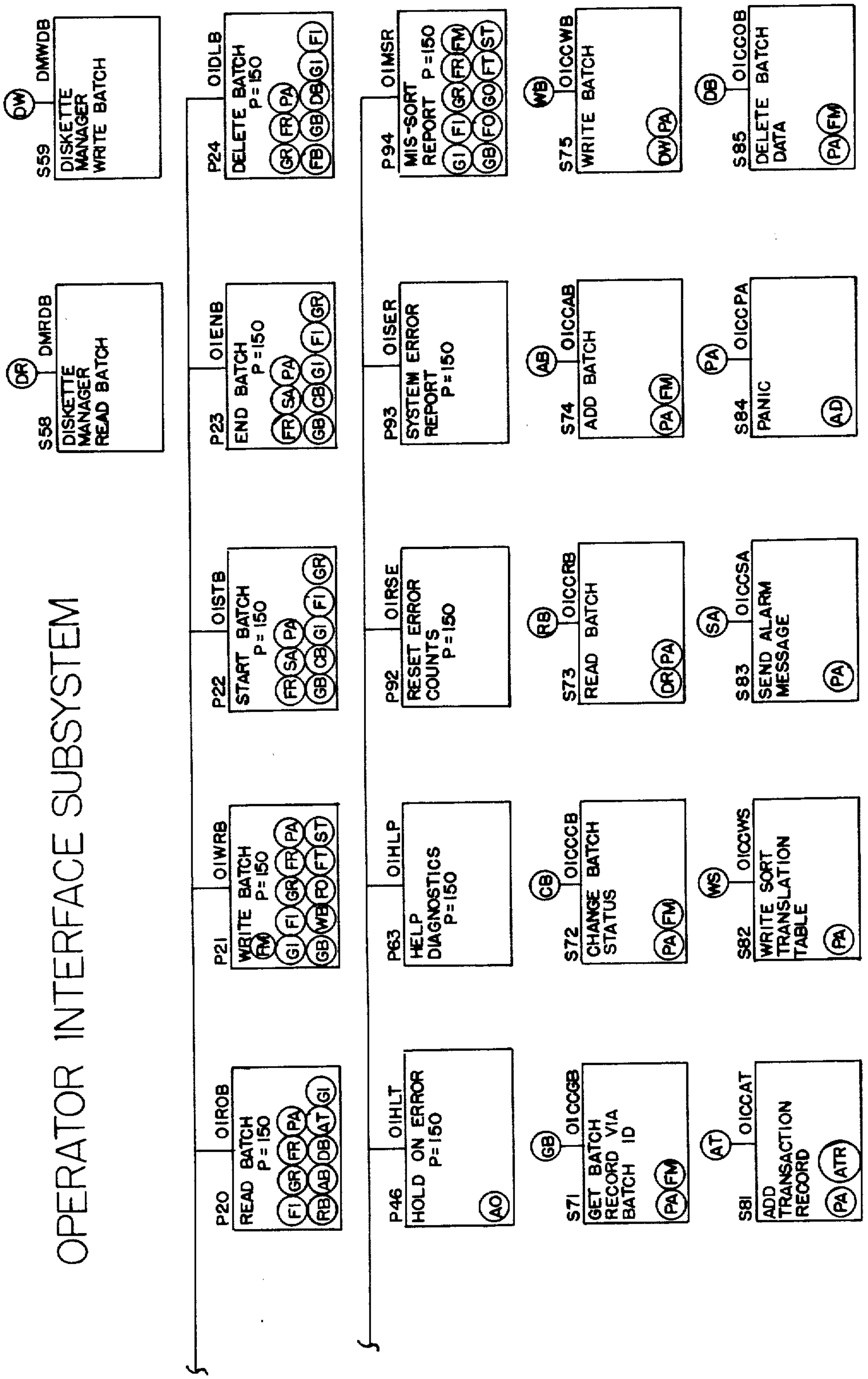
Figure 4:
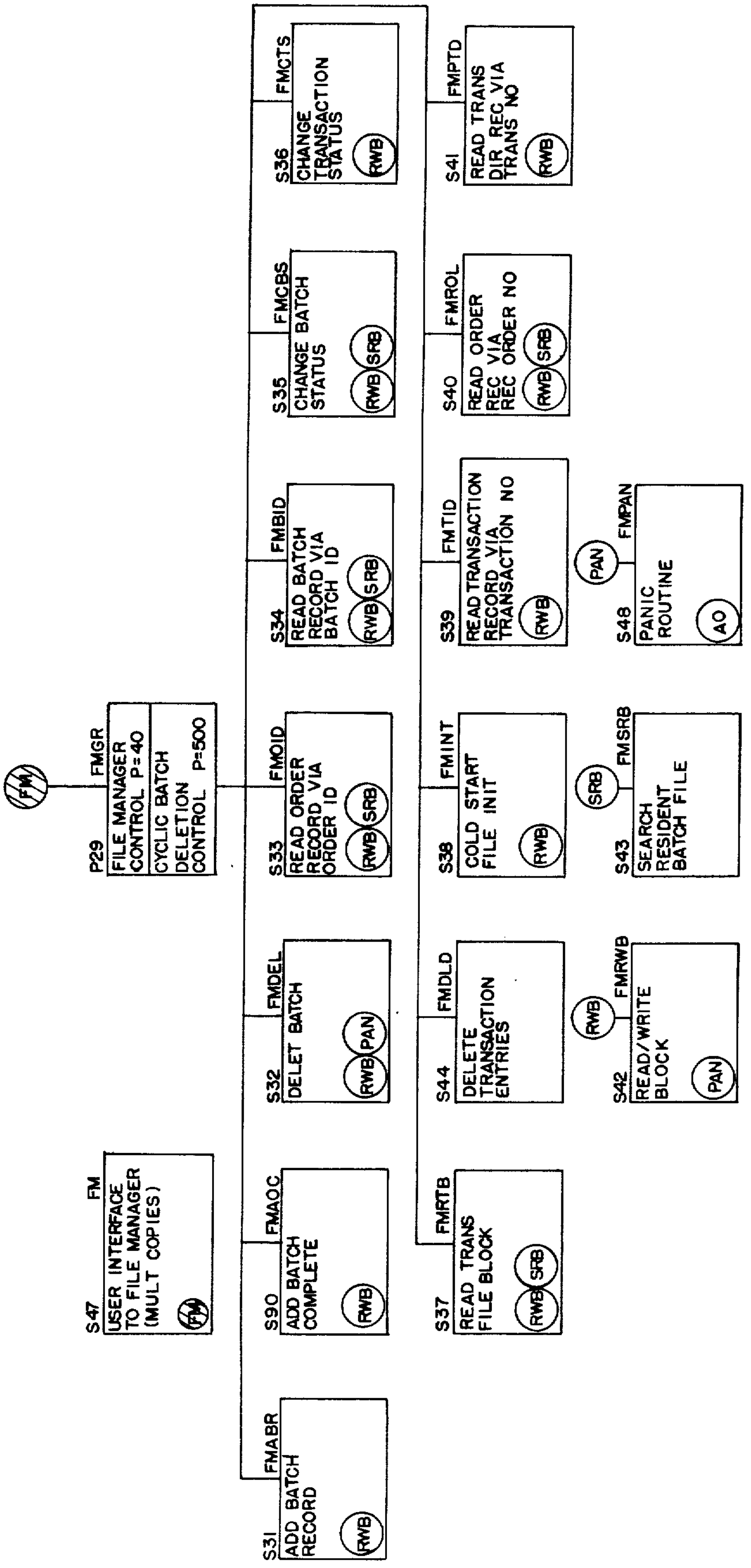
FIG. 4 is a block diagram of the module layout of the software for the file manager portion of the control system.
Figure 8:
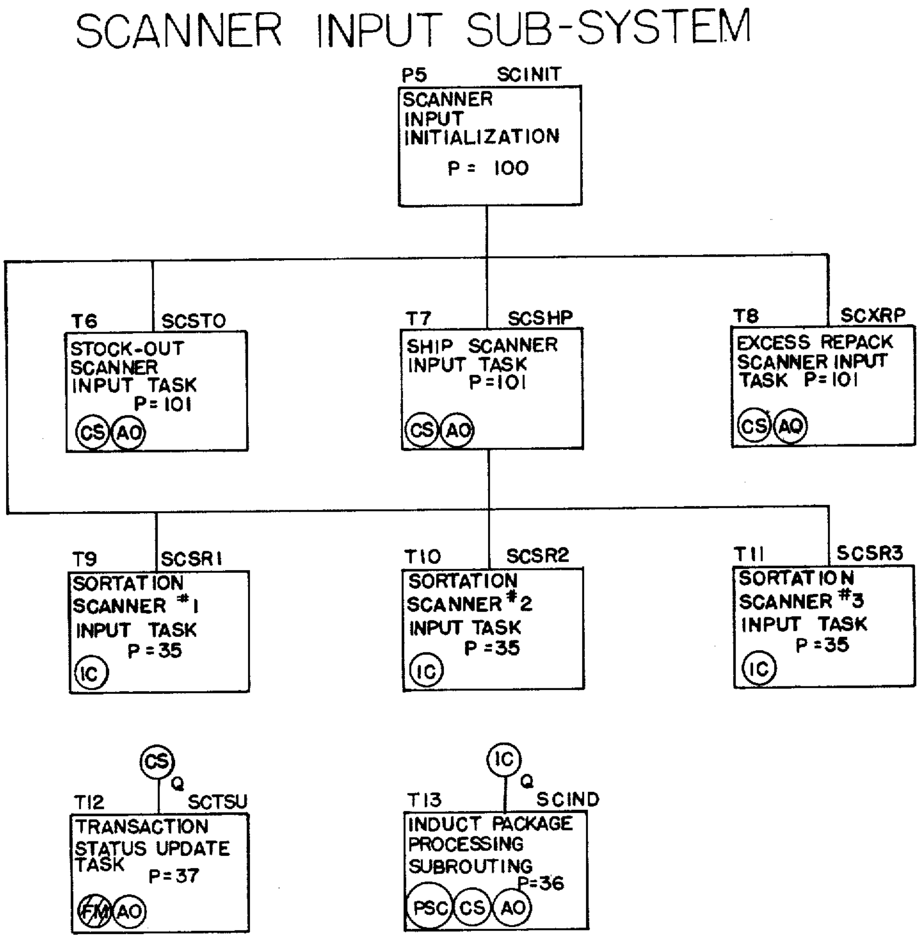
FIG. 8 is a block diagram of the module layout of the software for the code reading portion of the control system of the present invention.
Figure 5:
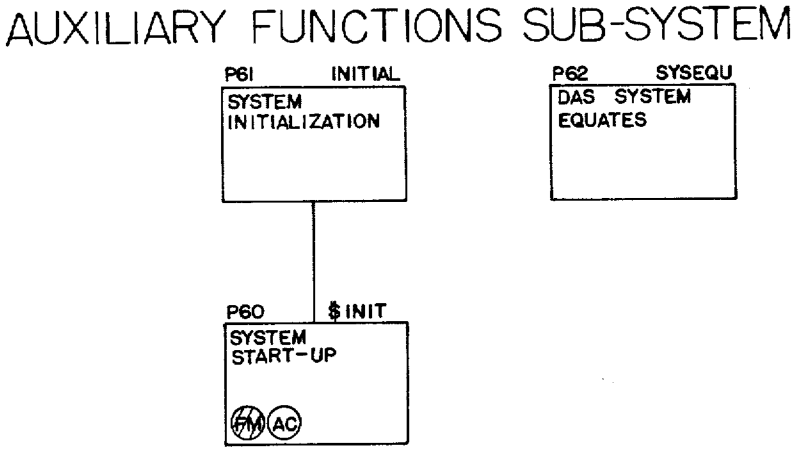
FIG. 5 is a block diagram of the module layout of the software for the auxiliary functions of the control system.

Before any of the articles to be picked can be recognized and sorted by the DAS control system, the batch and transaction information must first be transferred to the DAS system. This is achieved by the operator control terminal 40 entering a READ command which transfers the information from a diskette 23 placed in unit 30 into the computer memory 34. The program for this is shown in FIG. 3B indicated as READ BATCH. Once the data base has been constructed by the operator for each of the diskettes being processed during a day's operation, the actual picking, sorting, and monitoring functions available are commenced by a START command which changes the batch status from pending to active and enables the DAS computer to sort the product.

The picker applies labels to the correct products and places the unique six digit bar code containing label on each article as they are picked and transferred onto conveyers within the system which feed to the induction station 54. Each article is scanned by scanner 44 for its unique number and this information is supplied to the DAS computer which correlates it with sort location information for that number, and communicates with the PSC computer the sort destination assigned to the particular transaction. Depending upon the selected mode of operation, the article can be stopped and hand wanded by wand 46, recirculated through recirculation loop 58 or shunted into the error chute 56 upon failure of scanner 44 to read the article's number. The status of the article is changed from "not-picked" to "in-sortation" and the PSC performs the physical sorting of the article and informs the DAS computer of the actual status of the package on the sorting conveyer. When the label is transferred to its assigned destination chute 52, (FIG. 1) the status of the article is changed from "in-sortation" to "staged for shipment". If the article is unable to sort to its assigned sorting lane, the PSC informs the DAS of the actual disposition of the package.

Once all of the articles of a batch have been picked and sorted, including articles for several different orders typically, the operator who monitors the progress of the batch picking as described below, enters an END command in the operator terminal 40 which changes the batch status to "complete". At this time, the operator can enter a WRITE command in terminal 40 which generates a new diskette which is returned to the customer computer and which has information as to the completed status of each transaction in the batch which can be employed by the customer for inventory, billing, and other functions such the printing of shipping manifests and other documents. Once the batch has been processed by the DAS control system, it can be deleted from the DAS data base, memory 34 by entering a DELETE command.

There are a variety of system batch and sortation control commands which are employed by the system of the present invention. The system control commands include a listing of system commands for status reports which is identified by the command HELP entered in keyboard 43 to generate a listing of available reports on CRT 42.

By entering the command ERROR a system error report as shown in appendix A is generated by printer 38 which permits the operator to visualize the number of missorts and transfer failures and take corrective action. Another system control command is RESET which is employed by the operator for resetting error counts which may correspond to missorts where an item is discharged to the wrong discharge chute 52 inadvertently, or transfer failures where the PSC computer fails to divert an article to any of the desired discharge chutes. The final system control command is the time setting function which is employed to provide a real time display or printout to all of the various reports and is entered by entering the command $ T employed by the operator to set the system time.

In addition to the system control commands, there are several batch control commands which are entered by keyboard 43 some of which have been previously discussed. The first of these, is the READ command which effects the reading of the customer's diskette 23 by the DAS computer diskette unit 30 reading the information into the memory 34. The START command starts the batch processing monitor and control while an END command as previously discussed, ends the batch processing. The WRITE command causes the diskette to be reprogrammed with the updated status of the orders and transactions therein reported back to the main customer computer through a reprogrammed diskette while a DELETE command then is employed to delete the completed batch information from memory 34. The ASSIGN command is employed for example in the event a given product is out of stock and with the batch processing system, this could affect several transactions associated with several different orders. To provide a quick update of the status of the particular product and therefore the transactions in which it is involved, the operator can assign to the transaction numbers affected, a stockout status so that this condition can be instantaneously displayed at any of the report printers or operator terminals once the condition has been reported.

Finally, there are several sortation control commands entered into keyboard 43 to control the sorting of articles. One mode of operation is identified and controlled by the command HOLD. With the HOLD command, the induction station 54 is stopped when a no-read occurs on scanner 44 and the operator must manually scan the label using wand 46 (FIG. 1) to read the label. He does that by actuating switch 45 such that the wand 46 output information is supplied to the DAS computer 32. The induction station 54 then restarts, and the article is sorted.

With the RECIRC command, articles with labels not read by scanner 44 are automatically directed to recirculation lane 58. Upon initial startup of the system, the command OPEN is employed to open the communications interface 62 between the DAS computer 32, the PSC computer 60. The command REROUTE is employed to assign an alternate sortation line for articles with a common destination contained within all batches being processed. This is employed for example, in the event a sort line 52 has a mechanical failure and it is temporarily shut down. The command RESTORE will automatically reassign rerouted articles not yet processed to the original sort line once it has been repaired.

In addition to the interface between the operator terminal 40 and the system employing the above identified commands, the system will automatically provide two different types of printouts available to management and control personnel for the monitoring and operational control of the system. The first type of printout is provided by the system's operational log printer 36, and provides indications of the status of the system as well as missorts and the like. The following is a typical printout during a short period of time representing a variety of operational conditions of the system.

04/01/80 14:30:34 System Started
04/01/80 14:30:46 PSC Communications Line Open
04/01/80 14:30:59 Start of Batch T02
04/01/80 14:31:04 Hold on Scanner Error
04/01/80 14:31:43 Scanner Error At Induction #1 Scanner
04/01/80 14:31:54 Transaction 984561 at Induction #1 Scanner Not On File
04/01/80 14:32:17 Transaction 411589 at Induction #1 Scanner Out of Batch
04/01/80 14:32:44 Sortation Line 1 Full
04/01/80 14:32:49 Transaction 598402 Missorted To Sort Line 3
04/01/80 14:33:24 Unsuccessful Transfer At Sort Line 1 for Transaction 632368
04/01/80 14:33:27 Scanner Error at Induction #2 Scanner
04/01/80 14:34:29 Transaction 581419 Has Been Lost From Tracking
04/01/80 14:34:46 Recirculate On Scanner Error
04/01/80 14:35:37 End of Batch T02
04/01/80 14:36:08 Transaction 581419 on Sort Line 2 Not On File
04/01/80 14:36:27 PSC Communications Failure
00/00/00 00:00:10 Power Fail/Restart As can be seen from the above report, the status of the system and its communications with the PSC is indicated as well as events such as scanning errors at the induction station, sortation lines being full, as detected by the line full photo detector 69 (FIG. 1), missorts and the like. This record is automatically printed without a specific operator command such that monitoring personnel can take corrective action as required. Naturally, many of the messages printed simply indicate the status of a particular batch, for example, at 14:30:59, batch T02 was beginning to be processed and at 14:35:37, batch T02 was completed.

The second type of printed information, is specifically requested results from the entry of the system control command HELP, which provides a variety of selectable status reports. These reports are called up using keyboard 44 selectively as indicated by the following table:

Schedule—Work Schedule Batches
Batch—Batch/Order Status
Order—Order/Transaction Status
Transact—Transaction Status
Missort—Missort Exceptions
Route—Sort Line Translations The reports generated by the entry of the commands at keyboard 43 are provided by the report printer 38 (FIG. 1) and an example of each such report is shown in the attached appendix A which also includes a data dictionary which identifies the manner in which the modules shown in FIGS. 3 through 8 are called up in the program. Basically each report provides a complete current status of batches being processed by the system, orders included in each batch, and particular transactions included in each order. Further, these reports provide an indication as to the percentage of completion, the number of items which are out of stock, and an indication of items not picked, missorted, or in processing. This information is used by the supervisory personnel to monitor on a regular basis the operation of the picking and sorting system, as well as to provide particular commands through terminal 40 for effecting the efficient operation of the system.

In the event that a stockout condition exists where items to be picked are not available, this information can, as previously indicated, be entered through an operator terminal, but also wand 48 can be employed to scan the labels which have not been applied to articles to be picked and the system automatically assigns a stockout status to the transactions and permits the batch to be completed noting the stockout status in the batch status report. An additional wand scanner (not shown) is provided for excess labels to cover the situation where incomplete case loads of materials are ordered and the efficiency of the picker in filling the cartons is unknown. To cover this situation, several additional labels are provided in the event that a greater number of cartons are required due to the packing efficiency. In the event these extra labels are not needed, they are scanned by the additional wand scanner to maintain accurate status information as to all labels and therefore all transactions within the system.

With the system of the present invention, therefore, high speed article processing can be achieved and in the environment of the preferred embodiment a picking and sorting operation for warehouses is provided with a control system for efficiently monitoring the current operational status of a plurality of batch picks each including several orders, in turn, including several transactions. By assigning each transaction a unique identifying number which is physically associated with the article to be picked in the form of a machine readable label, and which is entered into the control system memory in the form of stored data, the current status of each transaction, order, and batch can be continuously monitored and controlled. The resultant system results in a more efficiently operated system with a higher throughput than previously achievable through conventional picking systems.

It will become apparent to those skilled in the art that various modifications to the preferred embodiment of the invention described and disclosed herein can be made without departing from the spirit or scope of the invention as defined by the appended claims.

```
COPYRIGHT     1979      RAPISTAN INC.    GRAND RAPIDS      MICHIGAN           00000010
                                                                              00000020
THIS SOFTWARE IS FURNISHED TO THE PURCHASER UNDER A LICENSE FOR USE           00000030
ON A SINGLE COMPUTER SYSTEM AND CAN BE COPIED (WITH INCLUSION OF              00000040
RAPISTAN'S COPYRIGHT NOTICE) ONLY FOR USE IN SUCH SYSTEMS, EXCEPT AS          00000050
MAY BE OTHERWISE PROVIDED IN WRITING BY RAPISTAN INC.                         00000060
                                                                              00000070
THE INFORMATION IN THIS DOCUMENT IS SUBJECT TO CHANGE WITHOUT NOTICE          00000080
AND SHOULD NOT BE CONSTRUED AS A COMMITMENT BY RAPISTAN INCORPORATED.         00000090
                                                                              00000100
RAPISTAN ASSUMES NO RESPONSIBILITY FOR THE USE OR RELIABILITY OF ITS          00000110
SOFTWARE ON EQUIPMENT WHICH IS NOT SUPPLIED BY RAPISTAN.                      00000120

*****************************************************************************00000010
*                                                                             00000020
* AUXILIARY FUNCTIONS DATA DICTIONARY                                         00000030
*                                                                             00000040
*****************************************************************************00000050
                                                                              00000060
I/O #     DESCRIPTION                                                         00000070
                                                                              00000080
01AX      CONTROL DATA SET FORMAT                                             00000090
02AX      START-UP CODE                                                       00000100
03AX      SYSTEM INITIALIZATION BATCH TABLE                                   00000110
04AX      SYSTEM INITIALIZATION BUFFER IN USE FLAG                            00000120
05AX      SYSTEM INITIALIZATION DISK BUFFERS                                  00000130
06AX      SYSTEM INITIALIZATION ORDER TABLE                                   00000140
07AX      SYSTEM INITIALIZATION BATCH ERROR FLAG                              00000150
08AX      SYSTEM INITIALIZATION DISK ERROR FLAG                               00000160
09AX      SYSTEM CONFIGURATION PROGRAM DIALOGUE                               00000170
```

```
***********************************************************************
*
* AUXILIARY FUNCTIONS DATA REFERENCES
*
***********************************************************************


01AX      AXINT
02AX      $INIT,$INITIAL
03AX      $INITIAL
04AX      $INITIAL
05AX      $INITIAL
06AX      $INITIAL
07AX      $INITIAL
08AX      $INITIAL
09AX      AXCNFG


***********************************************************************
*
* AUXILIARY DATA DICTIONARY ENTRIES
*
***********************************************************************

01AX      CONTROL DATA SET FORMAT FOR AXINT.P

          PROGRAM AXINT IS USED TO INITIALIZE DATA SETS TO A PREDEFINED
          HEX VALUE. IT'S OPERATION IS CONTROLLED BY INITIALIZ-
          ATION COMMANDS IN A CONTROL DATA SET. THESE COMMANDS
          CAN BE CREATED USING THE TEXT EDITOR WITH TAB SETS AT
          10 AND 20. THE COMMAND FORMAT IS AS FOLLOWS:

          COL.
          1......8  10....15  20....22
           DSNAME    VOLSER    VALUE

          DSNAME: DATA SET MEMBER NAME

          VOLSER: VOLUME ID WHERE DATA SET IS LOCATED

          VALUE:  THE DECIMAL VALUE OF A HEX BYTE YOU WANT TO
                  INITIALIZE THE FILE TO. FOR INSTANCE
                  64 = X'40'
                   0 = X'00'
                 255 = X'FF'

          NOTE: ALL PARAMETERS MUST BE SPECIFIED.

          THE LAST COMMAND MUST BE AN 'END' STARTING IN COL. 1.

02AX      START-UP CODE

          THE EDX OPERATING SYSTEM PASSES A PARAMETER TO THE
          INITIALIZATION PROGRAM NAMED "$INITIAL." IF $INITIAL HAS
          A PARAMETER DEFIND IN ITS PROGRAM STATEMENT. (PARM=1)
          THIS PARAMETER CONTAINS A START-UP CODE INDICATING THE
          TYPE OF START-UP BEING PERFORMED. THE START-UP CODE
          VALUES FOLLOW:

                    '0' = MANUAL IPL
                    '1' = POWER FAIL/RESTART

          THIS CODE IS SAVED IN $SYSCOM BY PROGRAM $INITIAL AND
          CHECKED BY THE SYSTEM START-UP PROGRAM.

03AX      SYSTEM INITIALIZATION BATCH TABLE

          THIS TABLE IS DEFINED WITHIN MODULE $INITIAL.
          IT'S PURPOSE IS TO HOLD THE BATCH ID, RELATIVE BATCH,
          AND NUMBER OF TRANSACTIONS WITHIN THE BATCH, FOR ALL
          BATCHES WITH A STATUS OF PENDING, ACTIVE OR COMPLETE.
          THIS TABLE IS BUILT AT SYSTEM START UP TIME AND WILL
          BE USED TO UPDATE THE ORDER RECORDS FOUND IN THE ORDER
          DISK FILE.

04AX      SYSTEM INITIALIZATION BUFFER IN USE FLAG.
```

```
         THIS FLAG IS DEFINED WITHIN MODULE $INITIAL.
         THE FLAG INDICATES WHICH OF THE TWO DISK I/O BUFFERS
         WAS LAST USED. WHEN READING THE TRANSACTION FILE,
         MODULE $INITIAL WILL ALTERNATE THE USE OF THESE BUFFERS.

05AX     SYSTEM INITIALIZATION DISK BUFFERS.

         THERE ARE TWO DISK BUFFERS DEFINED WITHIN MODULE $INITIAL.
         EACH BUFFER IS CAPABLE OF HOLDING 50 DISK SECTORS.
         THEIR USE IS DEFINED IN 04AX.

06AX     SYSTEM INITIALIZATION ORDER TABLE.

         THIS TABLE ID DEFINED WITHIN MODULE $INITIAL.
         IT CONTAINS COUNTS OF TRANSACTIONS BY THEIR STATUS
         FOR ALL ORDERS IN THE BATCH BEING PROCESSED. THIS
         TABLE IS ONLY USED AT SYSTEM START UP TIME TO UPDATE
         THE ORDER RECORDS ON DISK.

07AX     SYSTEM INITIALIZATION BATCH ERROR FLAG.

         THIS FLAG IS DEFINED WITHIN MODULE $INITIAL.
         WHEN SET, THIS FLAG INDICATES THAT AN UNUSED
         RECORD WAS FOUND IN THE TRANSACTION FILE BEFORE
         ALL TRANSACTIONS IN THE BATCH HAVE BEEN PROCESSED.

08AX     SYSTEM INITIALIZATION DISK ERROR FLAG.

         THIS FLAG IS DEFINED WITHIN MODULE $INITIAL.
         THIS FLAG IS SET WHENEVER A DISK I/O ERROR
         HAS OCCURRED DURRING THE UPDATE OF THE ORDER
         FILE AT SYSTEM START UP TIME.

09AX     SYSTEM CONFIGURATION PROGRAM DIALOGUE

         WHEN USING THE SYSTEM CONFIGURATION UTILITY, PARAMATERS
         THAT WILL REMAIN THE SAME AS DISPLAYED DO NOT NEED TO BE
         ENTERED. JUST PRESSING THE "ENTER" OR "RETURN" KEY WILL
         INDICATE NO CHANGE. WHEN SPECIFYING MESSAGE ROUTING, ALL
         LOG DEVICES SHOULD BE ENTERED ON THE SAME LINE, SEPARATED
         BY SPACES OR CAMMAS. A ZERO (0) IN THE FIRST POSITION IN-
         DICATES THAT THE MESSAGE IS NOT TO BE PRINTED ON ANY LOG
         DEVICE.


*******************************************************************
*
* SCANNER DATA DICTIONARY
*
*******************************************************************

I/O #              DESCRIPTION

01SC     SCSTFLG   SCANNER STOP FLAG
02SC               INITIALIZATION
04SC               SCANNER DATA TRANSMISSION
05SC     STUPBUFQ  STATUS UPDATE BUFFER QUEUE
06SC               SCANNER ID
08SC     TSTATUPQ  TRANSACTION STATUS UPDATE QUEUE
09SC               RECIRCULATION DESTINATION
10SC     STOPEVT   SCANNER PROGSTOP EVENT
11SC               ERROR ON READ
12SC               PASSING INFORMATION TO SCIND
13SC               ERROR DESTINATION
14SC     STPNR     STOP ON NO READ FLAG
15SC               SLOW DOWN EVENT
16SC     TSTATUPR  RESERVE STATUS UPDATE QUEUE
17SC     STUPBUFR  RESERVE STATUS UPDATE BUFFER QUEUE
18SC     SCINDEV   PACKAGE PROCESSING TASK EVENT
19SC     SCTSUEV   STATUS UPDATE TASK EVENT
20SC     INDQUEBF  INDUCTION BUFFER QUEUE
21SC     INDQUE    INDUCTION QUEUE
22SC               NOT USED
23SC               ROUTING OF ERROR CONDITIONS
```

```
*********************************************************************
*
* SCANNER DATA REFERENCES
*
*********************************************************************

I/O #     MODULES REFERENCING

01SC      SCINIT,SCSR1,SCSR2,SCSR3,SCSTO,SCSHP,SCXRP,SCSTU
02SC      SCINIT,SCSTO,SCSHP,SCXRP,SCTSU,SCIND
03SC      NOT USED
04SC      SCSTO,SCSHP,SCXRP,SCSR1,SCSR2,SCSR3
05SC      SCSTO,SCSHP,SCXRP,SCTSU,SCIND
06SC      SCSTO,SCSHP,SCXRP,SCTSU,SCIND,SCSR1,SCSR2,SCSR3,AXCNFG
07SC      NOT USED
08SC      SCSTO,SCSHP,SCXRP,SCTSU,SCIND
09SC      SCIND,AXCNFG
10SC      SCINIT
11SC      SCSR1,SCSR2,SCSR3,SCIND,OIHLT,OIREC
12SC      SCIND,SCSR1,SCSR2,SCSR3
13SC      SCIND,AXCNFG
14SC      SCSR1,SCSR2,SCSR3,OIHLT,OIREC
15SC      SCIND,SCTSU,PSOC
16SC      SCIND,SCTSU
17SC      SCIND,SCTSU
18SC      SCIND,SCSR1,SCSR2,SCSR3,SCINIT
19SC      SCTSU,SCIND,SCINIT,SCSTO,SCSHP,SCXRP
20SC      SCIND,SCSR1,SCSR2,SCSR3
21SC      SCIND,SCSR1,SCSR2,SCSR3
22SC      NOT USED
23SC      SCIND


*********************************************************************
*
* SCANNER DATA DICTIONARY ENTRIES
*
*********************************************************************

01SC      SCANNER STOP FLAG
              (SCSTFLG)

          THIS FLAG IS INITIALIZED TO 0 BY THE SCANNER INITIALIZATION
          PROGRAM. IT IS CHECKED BY ALL OF THE SCANNER TASKS. WHEN A
          FATAL ERROR IS ENCOUNTERED THE FAILING TASK WILL SET THIS
          FLAG TO -1. THIS WILL BRING DOWN THE SCANNER SUB-SYSTEM.

02SC      THE MAIN SCANNER TASK (SCINIT) WHEN LOADED WILL PICK UP ALL
          SYSCOM ADDRESSES NEEDED FOR THE SCANNER SUB-SYSTEM. THE OT-
          HER SCANNER TASKS WHEN ATTACHED WILL RETRIEVE THESE ADDRES-
          SES AND PLACE THEM IN THE APPROPRIATE INSTRUCTIONS THROUGH
          THE USE OF THE 'P' PARAMETERS.

04SC      SCANNER DATA TRANSMISSION
          (FORM OF DATA BROUGHT IN)

          THE DATA READ FROM THE SCANNER WILL BE SIX EBCDIC DIGITS
          FOLLOWED BY A LINE FEED AND A CARRIAGE RETURN.

05SC      STATUS UPDATE BUFFER QUEUE

          STUPBUFQ  DEFINEQ   COUNT=50,SIZE=16

          STUPBUFQ IS A QUEUE THAT CONTAINS BUFFERS TO BE USED TO
          STORE SCANNER ID AND TRANSACTION NUMBER. THIS INFORMATION
          IS PUT IN BY THE SCANNER HANDLING ROUTINES (SCSTO, SCSHP,
          SCXRP, SCIND). THIS INFORMATION IS USED BY SCTSU TO CHANGE
          THE STATUS OF THE REFERENCED TRANSACTIONS.

          TO GET A BUFFER USE:

                    FIRSTQ    STUPBUFQ,LOC,EMPTY=ROUTINE      ,WHERE:

          LOC     = LABEL ON A WORD TO RECEIVE THE BUFFER ADDRESS.
          ROUTINE = NAME OF INSTRUCTION TO BRANCH TO IF STUPBUFQ
                    IS EMPTY.
```

```
        TO RETURN A BUFFER TO THE QUEUE USE:

                  NEXTQ      STUPBUFQ,LOC,FULL=ROUTINE       ,WHERE:

        LOC     = LABEL ON THE WORD THAT CONTAINS THE ADDRESS OF
                  THE BUFFER.
        ROUTINE = NAME OF THE INSTRUCTION TO BRANCH TO IF STUPBUFQ
                  IS FULL.

06SC    SCANNER ID'S

        SCANNER ID'S USED IN THE SCANNER SUB-SYSTEM ARE:

        ID        SCANNER


         1        INDUCTION #1
         2        INDUCTION #2
         3        INDUCTION #3
         4        EXCESS REPACK
         5        STOCK OUT
         6        STAGED FOR SHIPMENT

08SC    TRANSACTION STATUS UPDATE QUEUE

        THIS TRANSACTION STATUS UPDATE QUEUE IS USED BY SCTSU TO
        GET THE TRANSACTION NUMBER AND NEW STATUS OF A TRANSACTION
        TO BE UPDATED. IT CONTAINS ADDRESSES OF BUFFERS THAT CONTAIN
        THE INFORMATION NEEDED.

        TSTATUPQ  DEFINEQ   COUNT=50

        TO PLACE AN ENTRY ON THE QUEUE USE:

                  NEXTQ      TSTATUPQ,LOC,FULL=ROUTINE       ,WHERE:

        LOC     = LABEL ON WORD CONTAINING ADDRESS OF BUFFER
        ROUTINE = LABEL OF INSTRUCTION TO BRANCH TO IF QUEUE IS FULL.

        TO GET AN ENTRY OFF THE QUEUE USE:

                  FIRSTQ     TSTATUPQ,LOC,EMPTY=ROUTINE      ,WHERE:

        LOC=LABEL OF A WORD TO RECEIVE ADDRESS OF BUFFER
        ROUTINE=LABEL OF INSTRUCTION TO BRANCH TO IF QUEUE IS EMPTY.

09SC    RECIRCULATION DESTINATION

        THE RECIRCULATION DESTINATION WILL BE DESTINATION ZERO (0).

10SC    SCANNER PROGSTOP EVENT

        THIS EVENT IS WAITED ON BY THE SCANNER INITIALIZATION ROUTINE
        AFTER THE SCANNER STOP FLAG HAS BEEN SET.  THIS EVENT WILL
        NEVER BE POSTED, SO A PROGRAM STOP WILL NEVER BE EXECUTED.

11SC    INDUCTION SCANNER READ ERROR FLAG

        THIS FLAG WILL BE INTERNAL TO THE SCANNER SUB-SYSTEM. WHEN
        A READ ERROR OCCURS, THE STOP ON 'NO READ' FLAG (14SC) IN
        SYSCOM IS PASSED AS THE ERROR FLAG. IF NO ERROR IS DETECTED
        THE READ ERROR FLAG IS SET TO -1.

        PASSING INFORMATION TO SCIND

        PASSING INFORMATION TO SCIND IS DONE THROUGH THE USE OF A
        QUEUE. FIRST A BUFFER IS OBTAINED FROM THE INDUCTION BUFFER
        QUEUE (20SC).  THE SCAN INFORMATION IS THEN PUT INTO THIS
        8-BYTE BUFFER.  THE ADDRESS OF THIS BUFFER IS THEN PUT ON
        THE INDUCTION QUEUE (21SC).

        THE FORMAT OF THE DATA IN THE BUFFER IS:

             WORD#          DATA

               1            SCANNER ID
```

```
         2-3            TRANSACTION NUMBER
          4             ERROR FLAG

13SC     ERROR DESTINATION

         ONLY SPECIAL DEFAULT TRANSACTION #000000, GOES TO THIS
         SPECIAL DESTINATION. THIS DESTINATION MAY VARY FROM SYSTEM
         TO SYSTEM.

14SC     STOP ON 'NO READ' FLAG: (STPNR)

         THIS FLAG WILL RESIDE IN SYSCOM AND BE INITIALIZED BY THE
         OPERATOR INTERFACE SUB-SYSTEM. IF THIS FLAG IS A "0",
         ALL 'NO READS' AT INDUCTION ARE SENT TO RECIRCULATION.
         IF IT IS A "1", THEN NO MESSAGE IS SENT TO THE PSC WHEN
         A 'NO READ' CONDITION OCCURS. THIS STOPS THE PACKAGE
         AT THE INDUCTION POINT.

         TO EXAMINE THIS FLAG USE THE FOLLOWING PROCESS:

         MOVE      #1,$SYSCOM         * GET ADDRESS OF SYSCOM
         MOVE      #2,(+SCNR,#1)      * GET ADDRESS OF STPNR
         MOVE      FLAG,(0,#2)        * GET STPNR

         "FLAG" NOW CONTAINS THE STOP ON 'NO READ' FLAG.

15SC     SLOW DOWN FLAG

         THIS EVENT WILL BE DEFINED IN SYSCOM.  IT IS A LINK
         TO THE PSC COMMUNICATIONS SUB SYSTEM.  THIS EVENT
         WHEN RESET WILL SIGNAL A NEED TO SLOW DOWN THE RATE
         OF TRANSACTIONS BEING INDUCTED.  WHEN POSTED, EVERY-
         THING RUNS NORMALLY. WHEN RESET, NO INDUCTION MESSAGE
         IS SENT TO THE PSC.

16SC     RESERVE STATUS UPDATE QUEUE

         THIS QUEUE IS USED FOR STATUS UPDATES WHEN THE SCANNER
         SUB SYSTEM GOES INTO SLOW DOWN MODE.  IT IS USED THE
         SAME WAY AS THE PRIMARY UPDATE QUEUE. SEE (08SC).

17SC     RESERVE STATUS UPDATE BUFFER QUEUE

         THIS QUEUE IS USED TO SUPPLY BUFFERS WHEN THE SCANNER
         SUB SYSTEM GOES INTO SLOW DOWN MODE.  IT IS USED THE
         SAME WAY AS THE PRIMARY STATUS UPDATE BUFFER QUEUE. SEE
         05SC.

18SC     PACKAGE PROCESSING TASK EVENT (SCINDEV)

         THIS EVENT IS POSTED WHEN SOMETHING IS PUT IN THE INDUCTION
         QUEUE.  IT IS RESET WHEN SCIND HAS EMPTIED THE QUEUE.  IT IS
         ALSO POSTED BY SCINIT EVERY 5 SECONDS.

19SC     STATUS UPDATE TASK EVENT (SCTSUEV)

         THIS EVENT IS POSTED WHEN SOMETHING IS PUT IN THE STATUS UPDATE
         QUEUE.  IT IS RESET WHEN SCTSU HAS EMPTIED THE QUEUE.  IT IS
         ALSO POSTED BY SCINIT EVERY 5 SECONDS.

20SC     INDUCTION BUFFER QUEUE (INDQUEBF)

         THIS QUEUE IS USED TO SUPPLY BUFFERS FOR SENDING INFORMATION
         TO SCIND, (SEE 12SC).  THERE ARE 50 BUFFERS, EACH A SIZE OF
         8 BYTES.

21SC     INDUCTION QUEUE (INDQUE)

         THIS QUEUE IS USED TO SEND INFORMATION TO SCIND.  THIS QUEUE
         CONTAINS 50 1-WORD ELEMENTS.

22SC     NOT USED

23SC     ROUTING OF ERROR CONDITIONS
```

```
    TRANSACTION SCANNED           :  RECIRC MODE  :   HOLD MODE
------------------------------+---------------+----------------
1.  NOT ON FILE               :  ERROR CHUTE  :  ERROR CHUTE
2.  ON FILE, BATCH PENDING    : *RECIRC       : *RECIRC
3.  ON FILE, BATCH COMPLETE   : *ERROR CHUTE  : *ERROR CHUTE
4.  TRANS# FOUND, BUT BATCH-  :               :
    -IS ADDING OR DELETING    :  ERROR CHUTE  :  ERROR CHUTE
5.  NO READ (SCANNER ERROR)   :  RECIRC       :  HOLD (14SC)
6.  TRANS# 000000 (13SC)      :  ERROR CHUTE  :  ERROR CHUTE

                     * NOTE - CHANGE STATUS TO 'IN SORTATION'


*******************************************************************
*
* PSC DATA DICTIONARY INDEX
*
*******************************************************************

I/O #     DESCRIPTION

01PS      PSC OUTPUT BUFFER FORMAT
02PS      PSC OUTPUT QUEUE AND EVENT
03PS      PSC CALL CODES
04PS      INDUCT PACKAGE
05PS      OPEN LINK TO PSC
06PS      SEND IDLE MESSAGE TO PSC
07PS      COMMUNICATIONS STATUS FLAG
08PS      IDLE MESSAGE COUNT
09PS      RESPONSE COUNT TABLE
10PS      RESPONSE DUMP FLAG
11PS      PSC COMMUNICATIONS PANIC CALL
12PS      COMMUNICATIONS SEQUENCE BYTES
13PS      NUMBER OF TIME-OUTS
14PS      INVALID SEQUENCE COUNTER
15PS      INVALID CHECKSUM COUNTER
16PS      PSC MESSAGE FORMATTING
17PS      TRANSMISSION COMPLETION EVENT
18PS      PSC IDLE MESSAGE FORMAT
19PS      PSC OPEN LINK MESSAGE FORMAT
20PS      PSC INDUCT PACKAGE MESSAGE FORMAT
21PS      TRANSMISSION COMPLETION CODE WORD
22PS      PSC RESPONSE MESSAGE FORMAT
23PS      PSC RESPONSE BUFFERS
24PS      PSC RESPONSE QUEUE
25PS      PSC RESPONSES
26PS      ALARM PROCESSING ROUTINE
27PS      PSC MESSAGE CHECKSUM CALCULATION
28PS      PSC RESPONSE OVERFLOW EVENT
29PS      PSC INPUT/OUTPUT EVENT
30PS      PSC RESPONSE PROCESSING EVENT


*******************************************************************
*
* PSC DATA REFERENCES
*
*******************************************************************

I/O #     MODULES REFERENCING

01PS      SCIND,PSPOL,OIPSC
02PS      SCIND,PSPOL,OIPSC
03PS      SCIND
04PS      SCIND
05PS      OIPSC
06PS      PSPOL
07PS      PSOC,PSPAN,OIPSC,SCIND
08PS      PSOC,PSPOL
09PS      PSOC,PSAO
10PS      PSOC,PSAO,PSIO
11PS      PSOC,PSIO,PSRP,PSPOL,PSPAN,PSAO,PSCKSM
12PS      PSOC,PSMF
```

```
13PS      PSOC,PSIO
14PS      PSOC,PSIO
15PS      PSOC,PSIO
16PS      PSOC,PSMF
17PS      PSOC,PSTO
18PS      PSMF
19PS      PSMF
20PS      PSMF
21PS      PSIO,PSTO
22PS      PSIO,PSRP
23PS      PSIO,PSRP,PSAD
24PS      PSIO,PSRP
25PS      PSRP,PSAD
26PS      PSRP,PSAD
27PS      PSMF,PSCKSM
28PS      PSIO,PSRP,PSOC
29PS      PSOC,PSIO
30PS      PSDI,PSRP


*************************************************************************
*
* PSC DATA DICTIONARY ENTRIES
*
*************************************************************************

01PS      PSC OUTPUT BUFFER FORMAT

          *  CALL CODE  *
          * PARAMETER 1 *
          *      .      *
          *      .      *    SIZE = 5 WORDS
          *      .      *
          * PARAMETER N *

          FOR VALID CALL CODES SEE:  03PS

          NOTE: ALL BUFFERS ARE TO BE OBTAINED FROM A BUFFER QUEUE
                DEFINED IN $SYSCOM.

02PS      PSC OUTPUT QUEUE

          THE PSC OUTPUT QUEUE IS DEFINED IN $SYSCOM AND IS USED TO PASS
          THE ADDRESS OF THE CALL BUFFER TO THE PSC COMMUNICATIONS
          SUB-SYSTEM. AFTER QUEUEING THE CALL BUFFER, THE PSC
          RUN EVENT ALSO DEFINED IF $SYSCOM MUST BE POSTED.

03PS      PSC CALL CODES

          POPN      OPEN LINK TO PSC
          PIDL      SEND IDLE MESSAGE TO PSC
          PIND      SEND INDUCT PACKAGE MESSAGE TO PSC

04PS      INDUCT PACKAGE

          CODE:  PIND

                    INPUT BUFFER LAYOUT:

                    WORD #    CONTENTS

                      1       CALL CODE
                     2-3      TRANSACTION NUMBER
                      4       INDUCT SCANNER I.D.
                      5       SORT DESTINATION

05PS      OPEN LINK TO PSC

          CODE: POPN

                    INPUT BUFFER LAYOUT:

                    WORD #    CONTENTS

                      1       CALL CODE
```

```
06PS     SEND IDLE MESSAGE TO PSC

         CODE: PIDL


              INPUT BUFFER LAYOUT:

              WORD #     CONTENTS

                1        CALL CODE

07PS     COMMUNICATIONS STATUS FLAG

         THE COMMUNISATIONS STATUS FLAG IS A GLOBAL VARIABLE DEFINED
         IN $SYSCOM. IT CONTAINS THE CURRENT STATUS OF THE
         COMMUNICATIONS LINK BETWEEN DAS AND PSC.
              THE STATUS VALUES ARE:

               ZERO = "OPEN"
              OTHER = "CLOSED"

08PS     IDLE MESSAGE COUNT

         THE IDLE MESSAGE COUNT IS A LOCAL VARIABLE DEFINED WITHIN
         THE PSC COMMUNICATIONS SUB-SYSTEM. IT CONTAINS THE NUMBER
         OF COMMUNICATION INACTIVITY CYCLES TO BE PERFORMED BEFORE
         THE PSC REQUIRES AN IDLE MESSAGE TO BE SENT.

09PS     RESPONSE COUNT TABLE

         THE PSC RESPONSE COUNT TABLE CONTAINS ALL POSSIBLE PSC
         RESPONSE CODES (EXCEPT TRANS. COMPLETE) AND A COUNT THAT
         INDICATES THE NUMBER OF TIMES DAS HAS RECEIVED THIS
         RESPONSE FROM THE PSC. IN ADDITION TO THESE COUNTS, ONE
         ADDITIONAL COUNTER IS DEFIND FOR ALL UNKNOWN RESPONSES
         RECEIED FROM THE PSC.

10PS     RESPONSE DUMP FLAG

         THE PSC RESPONSE DUMP FLAG IS A LOCAL VARIABLE DEFINED
         WITHIN THE PSC COMMUNICATIONS SUB-SYSTEM.  WHEN SET,
         ALL ABNORMAL RESPONSES RECEIVED BY DAS FROM PSC WILL BE
         OUTPUT ON THE LOG DEVICES.

11PS     PSC COMMUNICATIONS PANIC CALL

         TO PROCESS A PANIC WITHIN THE PSC COMMUNICATIONS SUB-SYSTEM
         THE USER SHOULD CALL THE SUBROUTINE "PSPAN" WITH THE PANIC CODE
         AS A PARAMETER. NO RETURN WILL BE MADE FROM THIS CALL.

12PS     COMMUNICATION SEQUENCE BYTES

         THERE ARE TWO COMMUNICATION SEQUENCE BYTES, ONE FOR INPUT
         FROM THE PSC AND THE OTHER FOR NEXT OUTPUT TO THE PSC. AFTER
         EACH SUCCESSFUL INTERCHANGE BETWEEN DAS AND PSC, THESE
         SEQUENCE BYTES WILL BE UPDATED TO REFLECT THE LAST SEQUENCE
         VALUE RECEIVED AND LAST SEQUENCE VALUE TRANSMITTED. THE
         INITIAL VALUES OF THESE SEQUENCE BYTES FOLLOW:

                   INPUT  = EBCDIC "5"
                   OUTPUT = EBCDIC "5"

         THE ALTERNATE SEQUENCE BYTES VALUES = EBCDIC "J".
```

```
13PS     NUMBER OF TIME-OUTS

         THIS COUNTER IS A LOCAL VARIABLE DEFINED WITHIN THE PSC
         COMMUNICATIONS SUB-SYSTEM. IT IS INCREMENTED EACH TIME A
         PSC RESPONSE HAS TIMED OUT.

14PS     INVALID SEQUENCE COUNTER

         THIS COUNTER IS A LOCAL VARIABLE DEFINED WITHIN THE PSC
         COMMUNICATIONS SUB-SYSTEM. IT IS INCREMENTED EACH TIME
         THE PSC RESPONDS WITH AN INVALID SEQUENCE BYTE.

15PS     INVALID CHECKSUM COUNTER

         THIS COUNTER IS A LOCAL VARIABLE DEFINED WITHIN THE PSC
         COMMUNICATIONS SUB-SYSTEM. IT IS INCREMENTED EACH TIME
         THE PSC RESPONDS WITH AN INVAID CHECKSUM.

16PS     PSC MESSAGE FORMATTING

         TO FORMAT A PSC OUTPUT MESSAGE, THE SUBROUTINE "PSMF" IS
         CALLED. PARAMETERS PASSED TO THIS SUBROUTINE ARE:
         DATA INPUT FROM PSC OUTPUT QUEUE.
         PARAMETERS RETURNED FROM THIS SUBROUTINE ARE:
         COMPLETION CODE (SUCCESSFUL, NOT SUCCESSFUL).

17PS     TRANSMISSION COMPLETION EVENT

         THIS EVENT IS DEFINED WITHIN THE PSC COMMUNICATIONS SUB-
         SYSTEM AND IS USED TO PASS ONE OF THE FOLLOWING CODES
         BACK TO THE PSC OUTPUT CONTROL TASK "PSOC."

                  RETRY TRANSMISSION
                  DATA RECEIVED
                  IDLE RECEIVED

18PS     PSC IDLE MESSAGE FORMAT

         BYTE #   CONTENTS

           1      CURRENT OUTPUT SEQUENCE VALUE  (EBCDIC)
           2      IDLE CONTROL CODE "I"          (EBCDIC)
          3-13    SPACES                         (EBCDIC)
          14      CHECKSUM                       (EBCDIC)

         NOTE: CHECKSUM = ADDITION OF BYTES 1-13 THEN FORCED TO
               BE A PRINTABLE CHARACTER.

19PS     PSC OPEN LINK MESSAGE FORMAT

         BYTE #   CONTENTS

           1      CURRENT OUTPUT SEQUENCE VALUE  (EBCDIC)
           2      OPEN LINK MESSAGE CODE "L"     (EBCDIC)
          3-13    SPACES                         (EBCDIC)
          14      CHECKSUM

         NOTE: CHECKSUM = ADDITION OF BYTES 1-13 THEN FORCED TO
               BE A PRINTABLE CHARACTER.

20PS     PSC INDUCT PACKAGE MESSAGE FORMAT

         BYTE #   CONTENTS

           1      CURRENT OUTPUT SEQUENCE VALUE  (EBCDIC)
           2      INDUCT PACKAGE CODE "D"        (EBCDIC)
          3-8     TRANSACTION NUMBER             (EBCDIC)
          9-10    INDUCT NUMBER                  (EBCDIC)
         11-13    SORT DESTINATION               (EBCDIC)
          14      CHECKSUM                       (EBCDIC)

         NOTE: CHECKSUM = ADDITION OF BYTES 1-13 THEN FORCED TO
               BE A PRINTABLE CHARACTER.
```

```
21PS    TRANSMISSION COMPLETION CODE EVENT

        THE COMPLETION CODE ECB IS A LOCAL EVENT DEFINED WITHIN
        THE PSC COMMUNICATINS SUB-SYSTEM. IT IS USED TO HOLD THE
        TRANSMISSION COMPLETION EVENT CODE THAT IS POSTED BACK TO
        THE PSC OUTPUT CONTROL TASK "PSOC."

22PS    PSC RESPONSE MESSAGE FORMAT

        BYTE #    CONTENTS

         1        SEQUENCE BYTE VALUE       (EBCDIC)
         2        RESPONSE MESSAGE TYPE     (EBCDIC)
        3-13      RESPONSE PARAMETERS       (EBCDIC)
         14       CHECKSUM                  (EBCDIC)
         15       CARRIAGE RETURN           (EBCDIC)
         16       LINE FEED                 (EBCDIC)

        NOTE: CHECKSUM = ADDITION OF BYTES 1-13 THEN FORCED TO
              BE A PRINTABLE CHARACTER.

              FOR VALID RESPONSE MESSAGE TYPES SEE: 25PS

23PS    PSC RESPONSE BUFFERS

        BYTE #    CONTENTS

         1        SEQUENCE VALUE RECEIVED       (EBCDIC)
         2        RESPONSE MESSAGE TYPE         (EBCDIC)
        3-13      RESPONSE PARAMETERS           (EBCDIC)
         14       CHECKSUM                      (EBCDIC)

        NOTE: ALL BUFFERS ARE TO BE OBTAINED FROM A BUFFER QUEUE
              DEFINED WITHIN THE PSC COMMUNICATIONS SUB-SYSTEM.

              FOR VALID RESPONSE MESSAGE TYPES SEE: 25PS

24PS    PSC RESPONSE QUEUE

        THIS QUEUE IS DEFINED WITHIN THE PSC COMMUNICATIONS SUB-
        SYSTEM AND IS USED TO PASS THE PSC RESPONSE MESSAGE TO
        THE PSC RESPONSE PROCESSOR ROUTINE.

25PS    PSC RESPONSES

        FOR PSC RESPONSES SEE: SOFTWARE MANUAL FOR THE PROGRAMMABLE
        SORT CONTROLLER, SECTION 9, DOCUMENT NUMBER
        7G-01730-600-0094-??.

26PS    ALARM PROCESSING ROUTINE

        THIS ROUTINE IS USED TO PRINT MESSAGES ON THE LOG DEVICES
        FOR PSC RESPONSES OTHER THAN A TRANSFER COMPLETE. PARAMETERS
        PASSED TO THIS ROUTINE ARE: DATA RECEIVED FROM THE PSC.

27PS    PSC MESSAGE CHECKSUM CALCULATION

        TO CALCULATE A MESSAGE CHECKSUM, CALL ROUTINE 'PSCKSM'
        WITH THE ADDRESS OF THE MESSAGE AND THE ADDRESS WHERE
        THE CHECKSUM IS TO BE PLACED.

28PS    PSC RESPONSE OVERFLOW EVENT

        THIS EVENT INDICATES WHEN THERE HAS BEEN A PSC RESPONSE
        OVERFLOW CONDITION DO TO THE RESPONSE QUEUE BEING FULL.
        WHEN THE EVENT IS RESET, ALL NEW TRANSMISSIONS TO THE PSC
        ARE DELAYED UNTIL THE PSC RESPONSE QUEUE IS CLEANED OUT
        AND THE EVENT ID POSTED. THIS EVENT IS DEFINED WITHIN
        THE PSC COMMUNICATIONS SUB-SYSTEM.

29PS    PSC INPUT/OUTPUT EVENT
```

```
        THIS EVENT IF DEFINED WITHIN THE PSC COMMUNICATIONS SUB-SYSTEM.
        WHEN POSTED, IT INITIATES THE PSC INPUT/OUTPUT SEQUENCE.
        THIS EVENT IS RESET AT THE END OF A PSC INPUT/OUTPUT
        SEQUENCE.

30PS    PSC RESPONSE PROCESSING EVENT

        THIS EVENT ID DEFINED WITHIN THE PDC COMMUNICATIONS SUB-SYSTEM.
        WHEN POSTED, IT INITIATES THE PSC RESPONSE PROCESSING SEQUENCE.
        THIS EVENT IS RESET AFTER ALL CURRENT PSC RESPONSES HAVE
        BEEN PROCESSED.


*****************************************************************************
*
* ALARM MESSAGE DATA DICTIONARY INDEX
*
*****************************************************************************

I/O #                    DESCRIPTION

01AL    ALMQUE    ALARM MESSAGE QUEUE
02AL    BUFFQUE   BUFFER POOL QUEUE
03AL              ALARM MESSAGES
04AL    TCW       TERMINAL CONROL WORD
05AL    OTADTBL   OUTPUT TASK START EVENT TABLE
06AL    OTEETBL   OUTPUT TASKS END-EVENT TABLE
07AL              PANIC
08AL              FATAL ERROR
09AL    TIMRTSK   TIME OUT TASK
10AL    DATES     DATE AND TIME SUBROUTINE
11AL    CRFLG     MESSAGE COMPRESS FLAG
12AL              NON-COMPRESSABLE MESSAGES
13AL    MOVTXT    MESSAGE COMPRESSING SUBROUTINE


*****************************************************************************
*
* ALARM MESSAGES DATA REFERENCES
*
*****************************************************************************

I/O #                    MODULES REFERENCING

01AL      ALMPG,SCTSU,SCIND,SCSTO,SCSHP,SCXRP,PSOC,PSRP,PSAO,OICCPA
          $INIT,PSIO,OIHLT,OIREC,OICCSA
02AL      ALMPG,SCTSU,SCIND,SCSTO,SCSHP,SCXRP,PSOC,PSRP,PSAO,OICCSA
          $INIT,PSIO,OIHLT,OIREC
03AL.01   SCIND
    .02   SCIND,SCTSU
    .03   SCIND,SCSHP,SCSTO,SCXRP
    .04   PSAO
    .05   PSOC
    .06   PSAO
    .07   OISTB
    .08   OIENB
    .09   PSOC
    .10   PSAO
    .11   PSAO
    .12   $INIT
    .13   $INIT
    .14   PSIO
    .15   PSIO
    .16   PSIO
    .17   PSRP
    .18   PSAO
    .19   OIHLT
    .20   OIREC
    .21   PSAO
```

```
04AL      ALMPG,AXCNFG
05AL      ALMPG,AXCNFG
06AL      ALMPG,ALTRM1,ALTRM2,ALTRM3
07AL      ALMPG,SCIND,SCTSU,SCSTD,SCSHP,SCXRP,PSPAN,FMPAN,$INIT,DICCPA,
          DIREC,DIHLT
08AL      ALMPG,SCIND,SCTSU,SCSTD,SCSHP,SCXRP,PSPAN,FMPAN,$INIT,DICCPA,
          SCSR1,SCSR2,SCSR3
09AL      ALMPG
10AL      ALMPG
11AL      ALMPG
12AL      ALMPG
13AL      ALMPG


*************************************************************************
*
* ALARM MESSAGE DATA DICTIONARY ENRIES
*
*************************************************************************

01AL      ALARM MESSAGE QUEUE

          ALMQUE

                    THE ALARM MESSAGE QUEUE RESIDES IN SYSCOM. EACH ENTRY
                    IN THIS QUEUE IS 1-WORD LONG AND IS JUST A POINTER
                    TO A DATA BUFFER. THIS 8-WORD BUFFER IS WHERE THE
                    DATA FOR THE MESSAGE IS STORED. THIS BUFFER IS ALSO
                    IN SYSCOM. SEE D.D. 12.

                    THE MAXIMUM NUMBER OF ENTRIES THAT CAN BE PUT IN
                    ALMQUE IS 11D.

          TO PUT A MESSAGE ON THE ALARM QUEUE USE:

          LABEL     NEXTQ     *,LOC,FULL=ROUTINE,P1=ALMQUE      WHERE:

          LOC=LABEL ON A WORD CONTAINING THE ADDRESS OF THE BUFFER
              THAT CONTAINS THE MESSAGE DATA.
          ROUTINE=LABEL OF STATEMENT TO EXECUTE IF THE QUEUE IS FULL.
          ALMQUE=THE ADDRESS OF THE ALARM BUFFER

          TO GET THE ADDRESS OF ALMQUE, USE THE FOLLOWING PROCESS:

                    MOVE      #1,$SYSCOM     * GET ADDRESS OF SYSCOM
                    MOVE      ALMQUE,(+ALMS,#1) * GET ADDRESS OF ALMQUE

02AL      BUFFQUE

          BUFFQUE IS A QUEUE THAT CONTAINS ALARM MESSAGE OUTPUT
          BUFFERS. THESE BUFFERS ARE 8-WORDS LONG. TO OBTAIN A
          BUFFER USE:

          LABEL     FIRSTQ    *,LOC,EMPTY=ROUTINE,P1=BUFFQUE

          WHERE:

          LOC=NAME OF A VARIABLE TO RECEIVE THE ADDRESS OF THE BUFFER
          ROUTINE=NAME OF STATEMENT TO BRANCH TO IF BUFFQUE IS EMPTY.
          BUFFQUE=THE ADDRESS OF THE BUFFER QUEUE

          WHEN FILLING THIS BUFFER WITH ALARM MESSAGE DATA USE THE
          FOLLOWING FORMAT.

          WORD #    CONTENTS

           1        MSG #               SEE DATA DICTIONARY 13
          2-8       MESSAGE PARAMETERS

          TO RESTORE A BUFFER USE:

                    NEXTQ     *,LOC,FULL=ROUTINE,P1=BUFFQUE
```

```
WHERE:

LOC=LABEL ON THE ADDRESS OF THE BUFFER
ROUTINE=INSTRUCTION TO BRANCH TO IF BUFFQUE IS FULL.
BUFFQUE=THE ADDRESS OF THE BUFFER QUEUE

TO OBTAIN THE ADDRESS OF BUFFQUE USE:

           MOVE      #1,$SYSCOM     * GET ADDRESS OF SYSCOM
           MOVE      BUFFQUE,(+ALBF,#1) * GET ADDRESS OF BUFFQUE

03AL    ALARM MESSAGES

        MSG #      MESSAGE

          1        TRANSACTION (TRANS #) AT (SCANNER NAME)
                   SCANNER OUT OF BATCH.

          2        TRANSACTION (TRANS #) AT (SCANNER NAME)
                   SCANNER NOT ON FILE.

          3        SCANNER ERROR AT (SCANNER NAME) SCANNER.

          4        DATA AS RECEIVED FROM PSC = (DATA)

          5        PSC COMMUNICATIONS LINE OPEN

          6        TRANSACTION (TRANS #) MIS-SORTED TO SORT LINE
                   (LINE #)

          7        START OF BATCH (BATCH ID)

          8        END OF BATCH (BATCH ID)

          9        PSC COMMUNICATIONS FAILURE

         10        SORTATION LINE (DESTINATION) FULL.

         11        UNSUCCESSFUL TRANSFER AT SORT LINE (DESTINATION)
                   FOR TRANSACTION (TRANS #)

         12        SYSTEM STARTED

         13        POWER FAIL/RESTART

         14        INVALID CHECKSUM FROM PSC, DATA = (DATA)

         15        INVALID SEQUENCE FROM PSC, DATA = (DATA)

         16        PSC TIME-OUT

         17        TRANSACTION (TRANS #) ON SORT LINE (LINE #)
                   NOT ON FILE

         18        DATA RECEIVED FROM PSC OUT-OF-RANGE, DATA = (DATA)

         19        HOLD ON SCANNER ERROR

         20        RECIRCULATE ON SCANNER ERROR

         21        TRANSACTION (TRANS #) HAS BEEN LOST FROM TRACKING

        ALARM MESSAGE INPUT BUFFER

        *MESSAGE #1          TRANSACTION OUT OF BATCH

                   INPUT BUFFER LAYOUT

                   WORD #     CONTENTS

                     1        MESSAGE # (1)
                    2-3       TRANSACTION #
                    4-5       SCANNER ID
                    6-8       UNUSED
```

```
*MESSAGE #2           TRANSACTION NOT ON FILE

          INPUT BUFFER LAYOUT

          WORD #    CONTENTS

            1       MESSAGE # (2)
           2-3      TRANSACTION #
           4-5      SCANNER ID
           6-8      UNUSED

*MESSAGE #3           NO READ AT (SCANNER ID) SCANNER

          INPUT BUFFER LAYOUT

          WORD #    CONTENTS

            1       MESSAGE #(3)
           2-3      UNUSED
           4-5      SCANNER ID
           6-8      UNUSED

*MESSAGE #4           PSC DATA MESSAGE

          INPUT BUFFER LAYOUT

          WORD #    CONTENTS

            1       MESSAGE #(4)
           2-8      DATA RECEIVED FROM PSC  (EBCDIC)

*MESSAGE #5           PSC COMMUNICATIONS MESSAGE

          INPUT BUFFER LAYOUT

          WORD #    CONTENTS

            1       MESSAGE # (5)
           2-8      UNUSED

*MESSAGE #6           MIS-SORTED CARTON MESSAGE

          INPUT BUFFER LAYOUT

          WORD #    CONTENTS

            1       MESSAGE # (6)
           2-4      TRANSACTION #                   (EBCDIC)
           5-6      MIS-SORTED SHIPPING LINE #      (EBCDIC)
           7-8      UNUSED

*MESSAGE #7           START OF BATCH

          INPUT BUFFER LAYOUT

          WORD #    CONTENTS

            1       MESSAGE # (7)
           2-3      BATCH ID (RIGHT JUSTIFIED)
           4-8      UNUSED

*MESSAGE #8           END OF BATCH

          INPUT BUFFER LAYOUT

          WORD #    CONTENTS

            1       MESSAGE # (8)
           2-3      BATCH ID (RIGHT JUSTIFIED)
           4-8      UNUSED

MESSAGE #9            PSC COMMUNICATION FAILURE

          INPUT BUFFER LAYOUT
```

```
          WORD #    CONTENTS

           1        MESSAGE # (9)
          2-8       UNUSED

*MESSAGE #10        SORTATION LINE FULL

          INPUT BUFFER LAYOUT

          WORD #    CONTENTS

           1        MESSAGE # (10)
          2-3       DESTINATION  (EBCDIC)
          4-8       UNUSED

*MESSAGE #11        TRANSFER FAILURE

          INPUT BUFFER LAYOUT

          WORD #    CONTENTS

           1        MESSAGE # (11)
          2-4       TRANSACTION #   (EBCDIC)
          5-6       DESTINATION     (EBCDIC)
          7-8       UNUSED

*MESSAGE #12        SYSTEM STARTED

          INPUT BUFFER LAYOUT


          WORD #    CONTENTS

           1        MESSAGE # (12)
          2-8       UNUSED

*MESSAGE #13        POWER FAIL/RESTART

          INPUT BUFFER LAYOUT

          WORD #    CONTENTS

           1        MESSAGE # (13)
          2-8       UNUSED

*MESSAGE #14        INVALID CHECKSUM FROM PSC

          INPUT BUFFER LAYOUT

          WORD #   CONTENTS

           1       MESSAGE #(14)
          2-8      DATA RECEIVED FROM PSC  (EBCDIC)

*MESSAGE #15        INVALID SEQUENCE FROM PSC

          INPUT BUFFER LAYOUT

          WORD #   CONTENTS

           1       MESSAGE #(15)
          2-8      DATA RECEIVED FROM PSC  (EBCDIC)

*MESSAGE #16        PSC TIME-OUT

          INPUT BUFFER LAYOUT

          WORD #   CONTENTS

           1       MESSAGE #(16)
          2-8      UNUSED

*MESSAGE #17        TRANSACTION ON SORT LINE NOT ON FILE

          INPUT BUFFER LAYOUT
```

```
            WORD #     CONTENTS

              1        MESSAGE # (17)
              2-4      TRANSACTION #    (EBCDIC)
              5-6      DESTINATION      (EBCDIC)
              7-8      UNUSED

     *MESSAGE #18      DATA RECEIVED FROM PSC OUT-OF-RANGE

            INPUT BUFFER LAYOUT

            WORD #     CONTENTS

              1        MESSAGE # (18)
              2-8      DATA RECEIVED FROM PSC (EBCDIC)

     *MESSAGE #19      HOLD ON SCANNER ERROR

            INPUT BUFFER LAYOUT

            WORD #     CONTENTS

              1        MESSAGE # (19)
              2-8      UNUSED

     *MESSAGE #20      RECIRCULATE ON SCANNER ERROR

            INPUT BUFFER LAYOUT

            WORD #     CONTENTS

              1        MESSAGE # (20)
              2-8      UNUSED

     *MESSAGE #21      TRANSACTION HAS BEEN LOST FROM TRACKING

            INPUT BUFFER LAYOUT

            WORD #     CONTENTS

              1        MESSAGE # (21)
              2-4      TRANSACTION #        (EBCDIC)
              5-8      UNUSED
```

04AL  TERMINAL CONTROL WORD        (TCW)

THE TERMINAL CONTROL WORDS ARE LOCATED IN $SYSCOM (SEE 39FM).
ASSOCIATED WITH EACH MESSAGE THAT ALMPG WILL OUTPUT IS A TCW
WHICH SPECIFIES WHICH TERMINAL(S) ANY SPECIFIC MESSAGE WILL BE
SENT TO.

EACH BIT IN THE TCW CORRESPONDS TO AN OUTPUT DEVICE.
IF THE BIT IS SET "ON", TO A ONE, THEN THE ASSOCIATED
MESSAGE IS SENT TO THAT DEVICE.

TCW

0/1/2/3/4/5/6/7/8/9/10/11/12/13/14/15   BITS

BIT              OUTPUT DEVICE

0               LOG DEVICE #1
      1               LOG DEVICE #2
      2               LOG DEVICE #3
      3
      4
      5
      6
      7
      8
      9
     10
     11
     12
     13

```
14
15

TERMINAL CONTROL WORD TABLE    (MESSAGE ROUTING TABLE)

THE TERMINAL CONTROL WORDS FOR ALL OF THE ALARM MESSAGES
ARE IN THE TCW TABLE IN $SYSCOM. TO REFERENCE A TCW FOR A
MESSAGE GET THE ADDRESS OF THE TABLE (SEE 39FM). SUBTRACT
ONE FROM THE MESSAGE NUMBER, DOUBLE IT, AND ADD IT TO
THIS ADDRESS.

               TCW1        TCW FOR MESSAGE 1
               TCW1        TCW FOR MESSAGE 2
                .                 .
                .                 .
                .                 .
               TCW N       TCW FOR MESSAGE N

05AL      OUTPUT TASK START EVENT TABLE      (OTAOTBL)

          THIS TABLE RESIDES IN THE ALMPG PROGRAM. IT IS A TABLE
          OF ECB ADDRESSES FOR THE OUTPUT TASKS. THESE TASKS ARE
          USED FOR PRINTING ALARM MESSAGES.

          OUTPUT TASK START EVENT TABLE:

          OTAOTBL   EQU        *
                    DATA       A(ALTRM1S)
                    DATA       A(ALTRM2S)
                     .           .
                     .           .
                     .           .
                    DATA       A(ALTRMNS)

          THERE WILL BE ONE OF THESE EVENTS FOR EACH DEVICE
          THAT AN ALARM MESSAGE IS TO BE SENT TO.

06AL      OUTPUT TASKS END-EVENT TABLE      (OTEETBL)

          THIS TABLE IS A TABLE OF ADDRESSES. THESE ADDRESSES ARE
          THE ADDRESSES OF THE ECB'S FOR THE END EVENTS OF THE
          OUTPUT TASKS.

          OUTPUT TASK END EVENT TABLE:

          OTEETBL   EQU        *
                    DATA       A(ALTRM1E)
                    DATA       A(ALTRM2E)
                     .           .
                     .           .
                     .           .
                    DATA       A(ALTRMNE)

07AL      PANIC

          IF A FATAL SYSTEM ERROR IS ENCOUNTERED, A PROGRAM CAN PANIC
          BY PUTTING A NUMBER ON THE ALARM MESSAGE QUEUE (ALMQUE)
          THAT IS LESS THAN THE ADDRESS OF $SYSCOM. THIS WILL CAUSE
          A FATAL ERROR MESSAGE TO BE PRINTED ON ALL LOG PRINTERS.
          THE NUMBER PUT ON THE QUEUE WILL ALSO BE PRINTED.

          WHEN USING THIS TECHNIQUE THE PROGRAM PANICING MUST MAKE
          MAKE SURE THAT IT BRINGS ITSELF DOWN.

          FOR A LIST OF PANIC CODES SEE SECTION 08AL.

08AL      FATAL ERROR

          IF A PROGRAM HAS A FATAL ERROR IT WILL PUT A UNIQUE ERROR
          CODE ON THE ALARM MESSAGE QUEUE (ALMQUE). WHEN THE ALARM
          MESSAGE PROGRAM DEQUEUES THE ERROR CODE, IT WILL FORMAT
          THE ERROR CODE INTO A MESSAGE OF THE FORM:
```

```
 FATAL ERROR DD           WHERE:                    00005010
                                                    00005020
         DD = THE PANIC CODE                        00005030
                                                    00005040
THIS MESSAGE WILL BE PRINTED ON ALL LOG DEVICES.    00005050
                                                    00005060
FILE MANAGER FATAL ERRORS                           00005070
                                                    00005080
  ERROR #    MODULE    ERROR                        00005090
                                                    00005100
    01       FMRWB     DISK ERROR WHILE ADDING BATCH RECORD    00005110
    02       FMRWB     DISK ERROR WHILE ADDING TRANS. RECORD   00005120
    03       FMRWB     DISK ERROR WHILE DELETING BATCH         00005130
    04       FMRWB     DISK ERROR WHILE CHANGING BATCH STATUS  00005140
    05       FMRWB     DISK ERROR WHILE CHANGING TRANS. STATUS 00005150
                       (TERMINALS)                             00005160
    06       FMRWB     DISK ERROR WHILE CHANGING TRANS. STATUS 00005170
                       (SCANNERS)                              00005180
    07       FMRWB     DISK ERROR WHILE READING BATCH REC. VIA 00005190
                       BATCH I.D.                              00005200
    08       FMRWB     DISK ERROR WHILE READING TRANS. REC. VIA 00005210
                       TRANS. NO.                              00005220
    09       FMRWB     DISK ERROR WHILE READING TRANS. DIR. REC. 00005230
    10       FMRWB     DISK ERROR WHILE READING TRANS. FILE BLOCK 00005240
    11       FMRWB     DISK ERROR WHILE READING ORDER REC. VIA 00005250
                       ORDER I.D.                              00005260
    12       FMRWB     DISK ERROR WHILE READING ORDER REC. VIA 00005270
                       REL. ORDER NO.                          00005280
    13       FMRWB     DISK ERROR WHILE CODE START FILE INIT.  00005290
    14       FMRWB     DISK ERROR WHILE DELETING TRANS. FILE REC. 00005300
    15       FMATR     INVALID COMPLETION CODE RETURNED        00005310
    16       FMDEL     BATCH DELETION QUEUE FULL               00005320
    17       FMRWB     INVALID INPUT PARAMETERS                00005330
                                                               00005340
                                                               00005350
OPERATOR INTERFACE FATAL ERRORS                                00005360
                                                               00005370
  ERROR #    MODULE    ERROR                                   00005380
                                                               00005390
    101      OIWSR     IPM BUFFER QUEUE EMPTY (OICCGI)         00005400
    102      OIWSR     IPM BUFFER QUEUE FULL  (OICCFI)         00005410
    103      OIWSR     SRB BUFFER QUEUE EMPTY (OICCGR)         00005420
    104      OIWSR     SRB BUFFER QUEUE FULL  (OICCFR)         00005430
    105      OIWSR     INVALID CALL CODE      (OICCGB)         00005440
    106      OIWSR     INVALID COMPLETION CODE (OICCGB)        00005450
    107      OIBSR     IPM BUFFER QUEUE EMPTY (OICCGI)         00005460
    108      OIBSR     IPM BUFFER QUEUE FULL  (OICCFI)         00005470
    109      OIBSR     SRB BUFFER QUEUE EMPTY (OICCGR)         00005480
    110      OIBSR     SRB BUFFER QUEUE FULL  (OICCFR)         00005490
    111      OIBSR     INVALID CALL CODE      (OICCGB)         00005500
    112      OIBSR     INVALID COMPLETION CODE (OICCGB)        00005510
    113      OIBSR     INVALID CALL CODE      (OICCFO)         00005520
    114      OIBSR     INVALID RELATIVE ORDER NUMBER (OICCFO)  00005530
    115      OIBSR     INVALID COMPLETION CODE (OICCFO)        00005540
    116      OIOSR     IPM BUFFER QUEUE EMPTY (OICCGI)         00005550
    117      OIOSR     IPM BUFFER QUEUE FULL  (OICCFI)         00005560
    118      OIOSR     SRB BUFFER QUEUE EMPTY (OICCGR)         00005570
    119      OIOSR     SRB BUFFER QUEUE FULL  (OICCFR)         00005580
    120      OIOSR     INVALID CALL CODE (TRANS. DIR)          00005590
    121      OIOSR     SBB BUFFER QUEUE FULL  (OICCFS)         00005600
    122      OIOSR     INVALID CALL CODE      (OICCGB)         00005610
    123      OIOSR     INVALID COMPLETION CODE (OICCGB)        00005620
    124      OIOSR     INVALID CALL CODE      (OICCFO)         00005630
    125      OIOSR     INVALID RELATIVE ORDER NUMBER (OICCFO)  00005640
    126      OIOSR     INVALID COMPLETION CODE (OICCFO)        00005650
    127      OIOSR     INVALID CALL CODE      (OICCGO)         00005660
    128      OIOSR     INVALID COMPLETION CODE (OICCGO)        00005670
    129      OIOSR     INVALID CALL CODE      (OICCST)         00005680
    130      OIOSR     INVALID RELATIVE TRANSACTION NUMBER (OICCST) 00005690
    131      OIOSR     INVALID COMPLETION CODE (OICCST)        00005700
    132      OITSR     IPM BUFFER QUEUE EMPTY (OICCGI)         00005710
    133      OITSR     IPM BUFFER QUEUE FULL  (OICCFI)         00005720
    134      OITSR     SRB BUFFER QUEUE EMPTY (OICCGR)         00005730
```

| | | | |
|---|---|---|---|
| 135 | OITSR | SRB BUFFER QUEUE FULL (OICCFR) | 00005740 |
| 136 | OITSR | INVALID CALL CODE(TRANS DIR) | 00005750 |
| 137 | OITSR | INVALID COMPLETION CODE(TRANS DIR) | 00005760 |
| 138 | OITSR | INVALID CALL CODE (OICCGB) | 00005770 |
| 139 | OITSR | INVALID COMPLETION CODE (OICCGB) | 00005780 |
| 140 | OITSR | INVALID CALL CODE (OICCGT) | 00005790 |
| 141 | OITSR | INVALID COMPLETION CODE (OICCGT) | 00005800 |
| 142 | OISTB | IPM BUFFER QUEUE EMPTY (OICCGI) | 00005810 |
| 143 | OISTB | IPM BUFFER QUEUE FULL (OICCFI) | 00005820 |
| 144 | OISTB | SRB BUFFER QUEUE EMPTY (OICCGR) | 00005830 |
| 145 | OISTB | SRB BUFFER QUEUE FULL (OICCFR) | 00005840 |
| 146 | OISTB | INVALID CALL CODE (OICCGB) | 00005850 |
| 147 | OISTB | INVALID COMPLETION CODE (OICCGB) | 00005860 |
| 148 | OISTB | INVALID CALL CODE (OICCCB) | 00005870 |
| 149 | OISTB | INVALID STATUS CODE (OICCCB) | 00005880 |
| 150 | OISTB | INVALID COMPLETION CODE (OICCCB) | 00005890 |
| 151 | OISTB | ALARM QUEUE FULL (OICCSA) | 00005900 |
| 152 | OISTB | ALARM BUFFER EMPTY (OICCSA) | 00005910 |
| 153 | OIENB | IPM BUFFER QUEUE EMPTY (OICCGI) | 00005920 |
| 154 | OIENB | IPM BUFFER QUEUE FULL (OICCFI) | 00005930 |
| 155 | OIENB | SRB BUFFER QUEUE EMPTY (OICCGR) | 00005940 |
| 156 | OIENB | SRB BUFFER QUEUE FULL (OICCFR) | 00005950 |
| 157 | OIENB | INVALID CALL CODE (OICCGB) | 00005960 |
| 158 | OIENB | INVALID COMPLETION CODE (OICCGB) | 00005970 |
| 159 | OIENB | INVALID CALL CODE (OICCCB) | 00005980 |
| 160 | OIENB | INVALID STATUS CODE (OICCCB) | 00005990 |
| 161 | OIENB | INVALID COMPLETION CODE (OICCCB) | 00006000 |
| 162 | OIENB | ALARM QUEUE FULL (OICCSA) | 00006010 |
| 163 | OIENB | ALARM BUFFER QUEUE EMPTY (OICCSA) | 00006020 |
| 164 | OIASL | DISK WRITE ERROR SORT TABLE (OICCWS) | 00006030 |
| 165 | OIRSL | DISK WRITE ERROR SORT TABLE (OICCWS) | 00006040 |
| 166 | OIRDB | IPM BUFFER QUEUE EMPTY (OICCGI) | 00006050 |
| 167 | OIRDB | IPM BUFFER QUEUE FULL (OICCFI) | 00006060 |
| 168 | OIRDB | SRB BUFFER QUEUE EMPTY (OICCGR) | 00006070 |
| 169 | OIRDB | SRB BUFFER QUEUE FULL (OICCFR) | 00006080 |
| 170 | OIRDB | BATCH ALREADY BEING ADDED (OICCAB) | 00006090 |
| 171 | OIRDB | INVALID CALL CODE (OICCAB) | 00006100 |
| 172 | OIRDB | INVALID COMPLETION CODE (OICCAB) | 00006110 |
| 173 | OIRDB | INVALID CALL CODE (OICCAT) | 00006120 |
| 174 | OIRDB | INVALID COMPLETION CODE (OICCAT) | 00006130 |
| 175 | OIWRB | SRB BUFFER QUEUE EMPTY (OICCGR) | 00006140 |
| 176 | OIRDB | INVALID CALL CODE (OICCRB) | 00006150 |
| 177 | OIRDB | INVALID COMPLETION CODE (OICCRB) | 00006160 |
| 178 | OIRDB | INVALID RELATIVE BATCH NUMBER (OICCDB) | 00006170 |
| 179 | OIRDB | INVALIDE CALL CODE (OICCDB) | 00006180 |
| 180 | OIRDB | INVALID COMPLETION CODE (OICCDB) | 00006190 |
| 181 | OIPSC | PSC QUEUE FULL | 00006200 |
| 182 | OIPSC | PSC BUFFER QUEUE EMPTY | 00006210 |
| 183 | OIATS | INVALID CALL CODE (OICCGB) | 00006220 |
| 184 | OIATS | INVALID COMPLETION CODE (OICCGB) | 00006230 |
| 185 | OIATS | IPM BUFFER QUEUE EMPTY (OICCGI) | 00006240 |
| 186 | OIATS | IPM BUFFER QUEUE FULL (OICCFI) | 00006250 |
| 187 | OIATS | SRB BUFFER QUEUE EMPTY (OICCGR) | 00006260 |
| 188 | OIATS | SRB BUFFER QUEUE FULL (OICCFR) | 00006270 |
| 189 | OIATS | INVALID CALL CODE (OICCGT) | 00006280 |
| 190 | OIATS | INVALID COMPLETION CODE (OICCGT) | 00006290 |
| 191 | OIATS | INVALID CALL CODE (TRANS STATUS) | 00006300 |
| 192 | OIATS | INVALID STATUS CODE (TRANS STATUS) | 00006310 |
| 193 | OIATS | INVALID COMPLETION CODE (TRANS STATUS) | 00006320 |
| 194 | OIWRB | IPM BUFFER QUEUE EMPTY (OICCGI) | 00006330 |
| 195 | OIWRB | IPM BUFFER QUEUE FULL (OICCFI) | 00006340 |
| 196 | OIMSR | IPM BUFFER QUEUE EMPTY (OICCGI) | 00006350 |
| 197 | OIWRB | SBB BUFFER QUEUE FULL (OICCFS) | 00006360 |
| 198 | OIWRB | SRB BUFFER QUEUE FULL (OICCFR) | 00006370 |
| 199 | OIWRB | INVALID CALL CODE (OICCWB) | 00006380 |
| 200 | OIWRB | INVALID COMPLETION CODE (OICCWB) | 00006390 |
| 601 | OIWRB | INVALID CALL CODE (OICCFO) | 00006400 |
| 602 | OIWRB | INVALID RELATIVE ORDER NUMBER (OICCFO) | 00006410 |
| 603 | OIWRB | INVALID COMPLETION CODE (OICCFO) | 00006420 |
| 604 | OIWRB | INVALID CALL CODE (OICCST) | 00006430 |
| 605 | OIWRB | INVALID RELATIVE TRANSACTION NUMBER(OICCST) | 00006440 |
| 606 | OIWRB | INVALID COMPLETION CODE (OICCST) | 00006450 |
| 607 | OIWRB | INVALID CALL CODE (OICCGB) | 00006460 |
| 608 | OIWRB | INVALID COMPLETION CODE (OICCGB) | 00006470 |

| | | | |
|---|---|---|---|
| 609 | OIDLB | IPM BUFFER QUEUE EMPTY (OICCGI) | 00006480 |
| 610 | OIDLB | IPM BUFFER QUEUE FULL (OICCFI) | 00006490 |
| 611 | OIDLB | SRB BUFFER QUEUE EMPTY (OICCGR) | 00006500 |
| 612 | OIDLB | SRB BUFFER QUEUE FULL (OICCFR) | 00006510 |
| 613 | OIDLB | INVALID CALL CODE (OICCGB) | 00006520 |
| 614 | OIDLB | INVALID COMPLETION CODE (OICCGB) | 00006530 |
| 615 | OIDLB | INVALID RELATIVE BATCH NUMBER (OICCDB) | 00006540 |
| 616 | OIDLB | INVALID CALL CODE (OICCDB) | 00006550 |
| 617 | OIDLB | INVALID COMPLETION CODE (OICCDB) | 00006560 |
| 618 | OICTL | INVALID LOAD CODE (LOADIT) | 00006570 |
| 619 | OIHLT | ALARM BUFFER QUEUE EMPTY | 00006580 |
| 620 | OIHLT | ALARM MESSAGE QUEUE FULL | 00006590 |
| 621 | OIREC | ALARM BUFFER QUEUE EMPTY | 00006600 |
| 622 | OIREC | ALARM MESSAGE QUEUE FULL | 00006610 |
| 623 | FMATR | IPM BUFFER QUEUE EMPTY | 00006620 |
| 624 | FMATR | ERROR RETURNED FROM F.M. WHILE CHANGING BATCH STATUS TO PENDING. | 00006630 00006640 |
| 625 | FMATR | IPM BUFFER QUEUE FULL | 00006650 |
| 626 | FMATR | ERROR RETURNED FROM F.M. WHILE DELETING A BATCH. | 00006660 00006670 |
| 627 | OITSR | INVALID RELATIVE ORDER | 00006680 |
| 628 | OITSR | INVALID FM CALL CODE | 00006690 |
| 629 | OIMSR | IPM BUFFER QUEUE FULL (OICCFI) | 00006700 |
| 630 | OIMSR | SRB BUFFER QUEUE EMPTY (OICCGR) | 00006710 |
| 631 | OIMSR | SRB BUFFER QUEUE FULL (OICCFR) | 00006720 |
| 632 | OIMSR | SBB BUFFER QUEUE FULL (OICCFS) | 00006730 |
| 633 | OIMSR | INVALID CALL CODE (OICCGB) | 00006740 |
| 634 | OIMSR | INVALID COMPLETION CODE (OICCGB) | 00006750 |
| 635 | OIMSR | INVALID CALL CODE (OICCFO) | 00006760 |
| 636 | OIMSR | INVALID RELATIVE ORDER NUMBER (OICCFO) | 00006770 |
| 637 | OIMSR | INVALID COMPLETION CODE (OICCFO) | 00006780 |
| 638 | OIMSR | INVALID CALL CODE (OICCST) | 00006790 |
| 639 | OIMSR | INVALID RELATIVE TRANSACTION NUMBER (OICCST | 00006800 |
| 640 | OIMSR | INVALID COMPLETION CODE (OICCST) | 00006810 |
| 641 | OIMSR | INVALID CALL CODE (OICCGO) | 00006820 |
| 642 | OIMSR | INVALID COMPLETION CODE (OICCGO) | 00006830 |
| 643 | OIMSR | INVALID CALL CODE (TRANS. DIR) | 00006840 |

ALARM MESSAGE FATAL ERRORS

ERROR #   MODULE   ERROR

| 201 | ALMPG | BAD MESSAGE NUMBER | 00006900 |
|---|---|---|---|
| 202 | ALMPG | BUFFER QUEUE FULL | 00006910 |

SCANNER INPUT FATAL ERRORS

ERROR #   MODULE   ERROR

| 301 | SCIND | DIRECTORY READ ERROR | 00006970 |
|---|---|---|---|
| 302 | SCIND | BUFFER QUEUE EMPTY (ALARM) | 00006980 |
| 303 | SCIND | PSC OUTPUT QUEUE FULL | 00006990 |
| 304 | SCIND | PSC BUFFER QUEUE EMPTY | 00007000 |
| 305 | SCIND | STATUS UPDATE QUEUE FULL | 00007010 |
| 306 | SCIND | STATUS UPDATE BUFFER QUEUE EMPTY | 00007020 |
| 307 | SCTSU | ERROR RETURNED FROM FILE MANAGER | 00007030 |
| 308 | SCTSU | STATUS UPDATE BUFFER QUEUE FULL | 00007040 |
| 309 | SCTSU | ALARM QUEUE FULL | 00007050 |
| 310 | SCTSU | ALARM BUFFER QUEUE EMPTY | 00007060 |
| 311 | SCTSU | FILE MANAGER BUFFER QUEUE FULL | 00007070 |
| 312 | SCTSU | FILE MANAGER BUFFER QUEUE EMPTY | 00007080 |
| 313 | SCSTO SCSHP SCXRP | STATUS UPDATE QUEUE FULL | 00007090 00007100 00007110 |
| 314 | SCSTO SCSHP SCXRP | STATUS UPDATE BUFFER QUEUE EMPTY | 00007120 00007130 00007140 |
| 315 | SCSTO SCSHP SCXRP | ALARM QUEUE FULL | 00007150 00007160 00007170 |
| 316 | SCSTO SCSHP SCXRP | ALARM BUFFER QUEUE EMPTY | 00007180 00007190 00007200 |

| | | |
|---|---|---|
| 317 | SCIND | ALARM QUEUE FULL |
| 318 | SCSR1 | INDUCTION QUEUE FULL |
| 319 | SCSR1 | INDUCTION BUFFER QUEUE EMPTY |
| 320 | SCSR2 | INDUCTION QUEUE FULL |
| 321 | SCSR2 | INDUCTION BUFFER QUEUE EMPTY |
| 322 | SCSR3 | INDUCTION QUEUE FULL |
| 323 | SCSR3 | INDUCTION BUFFER QUEUE EMPTY |
| 324 | SCIND | INDUCTION BUFFER QUEUE FULL |

PSC COMMUNICATIONS FATAL ERRORS

| ERROR # | MODULE | ERROR |
|---|---|---|
| 401 | PSOC | ALARM MESSAGE QUEUE FULL |
| 402 | PSOC | ALARM MSG. BUFFER QUEUE EMPTY |
| 403 | PSID | PSC RESPONSE QUEUE FULL |
| 404 | PSID | PSC RESPONSE BUFFER QUEUE EMPTY |
| 405 | PSRP | F.M. BUFFER QUEUE FULL |
| 406 | PSRP | ALARM MESSAGE QUEUE FULL |
| 407 | PSRP | ALARM MESSAGE BUFFER QUEUE EMPTY |
| 408 | PSRP | UNEXPECTED F.M. COMPLETION CODE RETURNED |
| 409 | PSRP | F.M. BUFFER QUEUE EMPTY |
| 410 | PSRP | PSC RESPONSE BUFFER QUEUE FULL |
| 411 | PSPOL | PSC OUTPUT QUEUE FULL |
| 412 | PSPOL | PSC OUTPUT BUFFER QUEUE EMPTY |
| 413 | PSOC | PSC OUTPUT BUFFER QUEUE FULL |
| 414 | PSOC | PSC MESSAGE FORMATTING ERROR FOUND |
| 415 | PSAD | ALARM MESSAGE BUFFER QUEUE FULL |
| 416 | PSAD | ALARM MESSAGE QUEUE FULL |
| 417 | PSAD | ALARM MESSAGE BUFFER QUEUE EMPTY |
| 418 | PSID | ALARM MESSAGE BUFFER QUEUE EMPTY |
| 419 | PSID | ALARM MESSAGE QUEUE FULL |
| 420 | | NOT USED |
| 421 | PSRP | TRANS. NO. CONVERSION ERROR |

AUXILIARY FUNCTIONS FATAL ERRORS

| ERROR # | MODULE | ERROR |
|---|---|---|
| 501 | $INIT | FILE MANAGER SUB-SYSTEM LOAD ERROR |
| 502 | $INIT | FILE MANAGER BUFFER QUEUE EMPTY |
| 503 | $INIT | UNEXPECTED F.M. COMPLETION CODE RECEIVED |
| 504 | $INIT | FILE MANAGER BUFFER QUEUE FULL |
| 505 | $INIT | PSC COMM. SUB-SYSTEM LOAD ERROR |
| 506 | $INIT | SCANNER INPUT SUB-SYSTEM LOAD ERROR |
| 507 | $INIT | OPERATOR INTERFACE SUB-SYSTEM LOAD ERROR |
| 508 | $INIT | ALARM MESSAGE BUFFER QUEUE EMPTY |
| 509 | $INIT | ALARM MESSAGE QUEUE FULL |

09AL TIME OUT TASK (TIMRTSK)

WHEN THE OUTPUT TASKS ARE STARTED A TIME OUT TASK IS ALSO STARTED. IF THE TIME OUT TASK TIMES OUT THE OUTPUT TASKS, IT IS ASSUMED THAT THERE IS A HARDWARE PROBLEM. TO AVOID HANGING UP THE OTHER ALARM MESSAGES THE PRINTEXTS ARE TERMINATED THROUGH POSTS OF THE PRINT ECB'S OF EACH OUTPUT TASK.

10AL DATE AND TIME SUBROUTINE (DATES)

THIS SUBROUTINE IS CALLED TO PUT THE DATE AND TIME INTO THE ALARM OUTPUT BUFFER. THE SUBROUTINE USES THE FIRST 18 BYTES OF THE BUFFER FOR THE DATE AND TIME. THE FORMAT IS:

```
    TIME     DATE
XX:XX:XX XX/XX/XX
```

11AL MESSAGE COMPRESS FLAG

THIS FLAG (CRFLG) IS USED TO INDICATE IF A MESSAGE SHOULD BE COMPRESSED OR NOT. IF THE FLAG IS A '1', THE MESSAGE IS COMPRESSED. IF NOT, IT'S NOT.

12AL NON-COMPRESSABLE MESSAGES

```
        NON-COMPRESSABLE MESSAGES ARE THOSE DISPLAYING BLANKS THAT ARE
        SIGNIFICANT.  THESE MESSAGES ARE THOSE CONTAINING DATA SENT
        FROM THE PSC.

13AL    MESSAGE COMPRESSING SUBROUTINE (MOVTXT)

        THIS SUBROUTINE WILL COMPRESS A STRING OF BLANKS IN AN ALARM
        MESSAGE DOWN TO A SINGLE BLANK.  ALL OCCURRENCES OF BLANKS
        IN THE MESSAGES ARE COMPRESSED.



*******************************************************************************
*
* FILE MANAGER DATA DICTIONARY INDEX
*
*******************************************************************************

I/O #              DESCRIPTION

01FM    BATCH FILE DEFINITION
02FM    RESIDENT BATCH FILE DEFINITION
03FM    TRANSACTION DIRECTORY DEFINITION
04FM    TRANSACTION FILE DEFINITION
05FM    ORDER FILE DEFINITION
06FM    SORT TRANSLATION FILE DEFINITION
07FM    DISKETTE FILE DEFINITION
08FM    FILE MANAGER USER CALLING SEQUENCE
09FM    FILE MANAGER INPUT BUFFER FORMAT
10FM    FILE MANAGER CALL CODES
11FM    FILE MANAGER COMPLETION CODES
12FM    ADD BATCH RECORD CALL FORMAT
13FM    ADD TRANSACTION RECORD CALL FORMAT
14FM    DELETE BATCH CALL FORMAT
15FM    CHANGE BATCH STATUS CALL FORMAT
16FM    CHANGE TRANSACTION STATUS FROM TERMINAL CALL FORMAT
17FM    CHANGE TRANSACTION STATUS FROM SCANNERS CALL FORMAT
18FM    READ BATCH RECORD VIA BATCH I.D. CALL FORMAT
19FM    READ TRANSACTION RECORD VIA TRANSACTION NO. CALL FORMAT
20FM    READ TRANSACTION DIRECTORY RECORD VIA TRANS. NO. CALL FORMAT
21FM    READ TRANSACTION FILE BLOCK CALL FORMAT
22FM    READ ORDER RECORD VIA ORDER I.D. CALL FORMAT
23FM    READ ORDER RECORD VIA RELATIVE ORDER NO. CALL FORMAT
24FM    COLD START FILE INITIALIZATION CALL FORMAT
25FM    FILE MANAGER ENTRY EVENT
26FM    CALL CODE DISPATCH TABLE
27FM    FILE MANAGER COMPLETION EVENT
28FM    READ/WRITE FILE BLOCK
29FM    ORDER I.D. TABLE
30FM    NOT USED
31FM    BATCH ADDITION COUNTS
32FM    BATCH DELETION QUEUE
33FM    RESIDENT BATCH FILE SEARCH
34FM    FILE MANAGER RESOURCE DEFINITION
35FM    FILE MANAGER PANIC CALL
36FM    RECORD BUFFER QUEUE
37FM    SECTOR BUFFER QUEUE
38FM    ADD BATCH COMPLETE
39FM    SYSTEM PARAMETER FILE DEFINITION
40FM    SYSTEM ERROR COUNTS


*******************************************************************************
*
* FILE MANAGER DATA REFERENCES
*
*******************************************************************************

I/O #              MODULES REFERENCING

01FM    FMATR,FMABR,FMDEL,FMOID,FMBID,FMCBS,FMRTB,FMINT,FMROL,DICCGB
        FMOLD,FMADC,DIATS,DIBSR,DISTB,$INITIAL
```

| | | |
|---|---|---|
| 02FM | FMATR,FMABR,FMDEL,FMCBS,FMINT,FMOLD,FMCTS,FMDRB,SCIND,FMADC, | 00000590 |
| | JIRDB,OITSR,OIWSR,OICCFB | 00000600 |
| 03FM | FMATR,FMCTS,FMTID,FMRTD,SCIND,FMTSR | 00000610 |
| 04FM | FMATR,FMCTS,FMRTB,FMTID,SCTSU,SCIND,FMOLD,FMRTD,OICCFT,OICCGT, | 00000620 |
| | $INITIAL | 00000630 |
| 05FM | FMATR,FMCTS,FMRTB,FMTID,SCTSU,OICCFD,OICCGD,FMADC,$INITIAL | 00000640 |
| 06FM | FMINT,SCIND,OIASL,OICCWS,OIRSL,OISTR,AXCNFG | 00000650 |
| 07FM | AXBLDD,OIRDB,OIWRB | 00000660 |
| 08FM | FM,PSRP,SCTSU,$INIT,FMATR,OIATS,OITSR,OICCAB,OICCAT,OICCCB, | 00000670 |
| | OICCDB,OICCFD,OICCGB,OICCGD,OICCGT,OICCST,OIOSR | 00000680 |
| 09FM | FMGR,FMRWB,PSRP,$INIT,FMATR,OICCFI,OICCGI,SCTSU | 00000690 |
| 10FM | SCTSU | 00000700 |
| 11FM | SCTSU | 00000710 |
| 12FM | FMABR,OICCAB | 00000720 |
| 13FM | FMATR,OICCAT | 00000730 |
| 14FM | FMATR,FMDEL,OICCDB | 00000740 |
| 15FM | FMCBS,OICCCB | 00000750 |
| 16FM | FMCTS,OIATS | 00000760 |
| 17FM | FMCTS,PSRP,SCTSU | 00000770 |
| 18FM | FMBID,OICCGB | 00000780 |
| 19FM | FMTID,OICCGT | 00000790 |
| 20FM | FMRID,OITSR,OIOSR | 00000800 |
| 21FM | FMRTB,OICCST | 00000810 |
| 22FM | FMOID,OICCGD | 00000820 |
| 23FM | FMPOL,OICCFD | 00000830 |
| 24FM | FMINT,$INIT | 00000840 |
| 25FM | FMGR,FM | 00000850 |
| 26FM | FMGR | 00000860 |
| 27FM | FMGR,FM | 00000870 |
| 28FM | FMABR,FMDEL,FMOID,FMBID,FMCBS,FMCTS,FMRTB,FMINT | 00000880 |
| | FMTID,FMRDL,FMRTD,FMRWB,FMADC | 00000890 |
| 29FM | FMATR | 00000900 |
| 30FM | | 00000910 |
| 31FM | FMABR | 00000920 |
| 32FM | FMDEL,FMINT,FMOLD | 00000930 |
| 33FM | FMOID,FMBID,FMCBS,FMRTB,FMRDL,FMSRB | 00000940 |
| 34FM | FMOLD,FM | 00000950 |
| 35FM | FMPAN,FMATR,FMDEL,FMRWB | 00000960 |
| 36FM | OICCGR,OICCFR | 00000970 |
| 37FM | OICCGS,OICCFS | 00000980 |
| 38FM | FMADC,FMATR | 00000990 |
| 39FM | $INITIAL,PSOC,OIASL,OIRDB,OIRSL,OISTR,AXCNFG,SCINIT,ALMPG,OISER | 00001000 |
| 40FM | OISER,OIRSE,SCIND,PSRP | 00001010 |

```
************************************************************************ 00001020
*                                                                        00001030
* FILE MANAGER DATA DICTIONARY ENTRIES                                   00001040
*                                                                        00001050
************************************************************************ 00001060
                                                                         00001070
I/O #              DESCRPTION                                            00001080
                                                                         00001090
01FM     BATCH FILE DEFINITION                                           00001100
                                                                         00001110
         THE BATCH FILE CONTAINS 64 BYTE RECORDS WITH                    00001120
         4 RECORDS PER SECTOR. TOTAL FILE FOR 11 BATCHES                 00001130
         OCCUPIES 3 SECTORS. THIS FILE RESIDES ON DISK AS                00001140
         A CONTIGUOUS FILE CALLED "BATCH". THE LAYOUT OF                 00001150
         EACH 64 BYTE RECORD FOLLOWS.                                    00001160
                                                                         00001170
         INDEX       FIELD            SIZE (BYTES)      TYPE             00001180
                                                                         00001190
           IBSTA    BATCH STATUS           1           BINARY            00001200
           IBBID    BATCH I.D.             3           EBCDIC            00001210
           IBHDR    BATCH HEADER          50           EBCDIC            00001220
           IBORD    NO. OF ORDERS          2           BINARY            00001230
           IBXAC    NO. OF TRANSACTIONS    2           BINARY            00001240
                    SPARE                  6                             00001250
                                                                         00001260
         NOTE: VALID BATCH STATUS VALUES FOLLOW:                         00001270
                                                                         00001280
```

```
        EQU     MEANING

        BADD    ADDING
        BDEL    DELETION
        BFRE    UNUSED RECORD
        BPEN    PENDING
        BACT    ACTIVE
        BCMP    COMPLETE

02FM    RESIDENT BATCH FILE DEFINITION

        THE RESIDENT BATCH FILE CONTAINS 4 BYTE RECORDS.
        TOTAL SPACE ALLOCATED FOR 11 BATCHES IS 44 BYTES.
        THIS FILE RESIDES IN $SYSCOM AS A CONTIGUOUS
        FILE. THE LAYOUT FO EACH 4 BYTE RECORD FOLLOWS:

        INDEX          FIELD              SIZE (BYTES)         TYPE

        IBSTA   BATCH STATUS                   1               BINARY
        IBBID   BATCH I.D.                     3               EBCDIC

        NOTE: VALID BATCH STATUS VALUES FOLLOW:

        -EQU-   -MEANING-

        BADD    ADDING
        BDEL    DELETING
        BFRE    UNUSED RECORD
        BPEN    PENDING
        BACT    ACTIVE
        BCMP    COMPLETE

03FM    TRANSACTION DIRECTORY DEFINITION

        TRANSACTION DIRECTORY CONTAINS 4 BYTE RECORDS WITH
        64 RECORDS PER SECTOR. TOTAL DIRECORY FOR
        999,999 ENTRIES OCCUPIES 15,625 SECTORS. THIS
        DIRECTORY RESIDES ON DISK AS A CONTIGUOUS FILE
        CALLED "XDIR". THE LAYOUT OF EACH 4 BYTE RECORD
        FOLLOWS:

        INDEX          FIELD              SIZE (BYTES)         TYPE

        IDRLX   REL. TRANSACTION NO.           2               BINARY
        IDRLB   REL. BATCH NO.                 1               BINARY
        IDDST   DESTINATION                    1               BINARY

        NOTE: IF RECORD IS UNUSED, ALL BITS ARE SET.

04FM    TRANSACTION FILE DEFINITION

        THE TRANSACTION FILE CONTAINS 18 BYTE RECORDS WITH
        14 RECORDS PER SECTOR. EACH BATCH MAY CONTAIN 9,002
        RECORDS (643 SECTORS). THIS FILE RESIDES ON DISK
        AS A CONTIGUOUS FILE CALLED "XACT" CONTAINING SPACE
        FOR 11 BATCHES FOR A TOTAL OF 7,073 SECTORS.
        THE LAYOUT OF EACH 18 BYTE RECORD FOLLOWS:

        INDEX          FIELD              SIZE (BYTES)         TYPE

        IXXNO   TRANSACTION NO.                4               BINARY
        IXSTA   STATUS                         1               BINARY
        IXRLO   RELATIVE ORDER NO.,            1               BINARY
        IXPRD   PRODUCT                        6               EBCDIC
        IXDST   DESTINATION                    1               BINARY
        IXSRC   SOURCE                         5               EBCDIC

        NOTE: VALID TRANSACTION STATUS VALUES FOLLOW:

        -EQU-   -MEANING-

        XNPK    NOT PICKED
        XINS    IN-SORTATION
```

```
XSTG    STAGED FOR SHIPPING
XSTO    STOCKED-OUT
XXSR    EXCESS REPACK

05FM        ORDER FILE DEFINITION

        ORDER FILE CONTAINS 20 BYTE RECORDS WITH 12 RECORDS
        PER SECTOR. TOTAL FILE FOR 36 RECORDS PER BATCH WITH
        SPACE ALLOCATED FOR 11 BATCHES OCCUPIES 33 SECTORS.
        THIS FILE RESIDES ON DISK AS A CONTIGUOUS FILE CALLED
        "ORDER". THE LAYOUT OF EACH 20 BYTE RECORD FOLLOWS.

        INDEX       FIELD                   SIZE (BYTES)        TYPE

        IORLO   RELATIVE ORDER NO.              2               BINARY
        IOOID   ORDER I.D.                      6               EBCDIC
        IOQNP   QTY. NOT PICKED                 2               BINARY
        IOQIS   QTY. IN SORTATION               2               BINARY
        IOQSS   QTY. STAGED FOR SHIP.           2               BINARY
        IOQXS   QTY. EXCESS REPACK              2               BINARY
        IOQSO   QTY. STOCK-OUT                  2               BINARY
        IOQMS   QTY. MIS-SORT                   2               BINARY

06FM        SORT TRANSLATION FILE DEFINITION

        THE SORT TRANSLATION FILE CONSISTS OF 1 SECTOR
        OF 256 BYTES ON DISK CALLED "XLATE" OF WHICH THE FIRST 100
        BYTES ARE USED. THESE ENTRIES CORRESPOND DIRECTLY TO THE
        SORT DESTINATION VALUES 0 THRU 99. (DESTINATION 0 IS
        NOT USED) NORMALLY THESE ENTRIES ARE EACH ZERO.
        IF A TRANSLATION IS IN EFFECT, THE NEW (NON-ZERO)
        DESTINATION (1-99) IS PLACED IN THE RELATIVE BYTE
        CORRESPONDING TO THE OLD DESTINATION.

        ON IPL, THE DISK-RESIDENT SORT TRANSLATION FILE
        DATA IS COPIED INTO $SYSCOM AS A 50 WORD (100
        BYTE) MEMORY RESIDENT TABLE.  SUBSEQUENT UPDATES
        TO THIS DATA ARE MADE TO THE MEMORY-RESIDENT
        AND DISK-RESIDENT FILES.

07FM        DISKETTE FILE DEFINITION

        EACH DISKETTE CONTAINING DATA TO BE READ BY THE
        DAS OR DATA WRITTEN BY THE DAS FOLLOWS THE IBM
        STANDARD FOR INFORMATION INTERCHANGE (ONE-
        SIDED, 128 BYTE SECTORS). EACH DISKETTE
        FILE CONTAINS 24 BYTE RECORDS WITH 5
        RECORDS PER SECTOR. RECORDS 1, 2, AND
        3 HAVE UNIQUE LAYOUTS WITH RECORDS 4
        THRU N HAVING AN IDENTICAL FORMAT. THESE
        LAYOUTS FOLLOW:

        REC.#       FIELD                   SIZE (BYTES)        TYPE

          1     NO. OF RECS. IN FILE            4               BINARY
                BATCH I.D.                      3               EBCDIC
                HEADER (PART 1)                17               EBCDIC

          2     HEADER (PART 2)                24               EBCDIC

          3     HEADER (PART 3)                 9               EBCDIC
                UNUSED                         15               EBCDIC

        4-N     TRANSACTION NO.                 4               BINARY
                ORDER I.D.                      6               EBCDIC
                PRODUCT                         5               EBCDIC
                DESTINATION                     2               EBCDIC
                SOURCE                          5               EBCDIC
                STATUS                          1               EBCDIC

        NOTE: NO. OF RECS IN FILE IN RECORD 1 INCLUDES
              RECORDS 1, 2, AND 3.
```

```
08FM      FILE MANAGER USER CALLING SEQUENCE

          FOR ANY TASK TO USE THE FILE MANAGEMENT PROGRAM THE
          FOLLOWING CALLING SEQUENCE MUST BE USED:

                  MOVE #1, BUFADR
                  CALL FM

          WHERE BUFADR IS THE ADDRESS OF A 16 WORD BUFFER
          CONTAINING INPUT DATA AND FM IS A SUBROUTINE
          INCLUDED IN THE CALLING PROGRAM WHICH
          PERFORMS ALL INTERFACE FUNCTIONS. NOTE:
          #1 WILL STILL CONTAIN THE INPUT BUFFER
          ADDRESS UPON RETURN FROM SUBROUTINE FM.

09FM      FILE MANAGER INPUT BUFFER FORMAT

                  *      CALL CODE      *
                  *  COMPLETION CODE    *
                  *    PARAMETER 1      *
                  *    PARAMETER 2      *
                  *    PARAMETER 3      *  SIZE = 16 WORDS
                  *    PARAMETER 4      *
                  *    PARAMETER N      *
                  *                     *

                  FOR VALID CALL CODES SEE: 10FM


          NOTE: ALL BUFFERS ARE TO BE OBTAINED FROM
          A BUFFER QUEUE DEFINED IN $SYSCOM FOR
          THIS PURPOSE

10FM      FILE MANAGER CALL CODES

          FABR    ADD BATCH RECORD
          FATR    ADD TRANSACTION RECORD
          FDEL    DELETE BATCH
          FCBS    CHANGE BATCH STATUS
          FCTST   CHANGE TRANSACTION STATUS (FROM TERMINALS)
          FCTSS   CHANGE TRANSACTION STATUS (FROM SCANNERS)
          FBID    READ BATCH RECORD VIA BATCH I.D.
          FTID    READ TRANSACTION RECORD VIA TRANSACTION NUMBER
          FRTD    READ TRANSACTION DIRECTORY RECORD VIA TRANSACTION NO.
          FRTB    READ TRANSACTION FILE BLOCK
          FOID    READ ORDER RECORD VIA ORDER I.D.
          FROL    READ ORDER RECORD VIA RELATIVE ORDER NO.
          FINT    COLD START FILE INITIALIZATION

11FM      FILE MANAGER COMPLETION CODES

          FOK     SUCCESSFUL
          FBX     BATCH FILE SPACE EXHAUSTED
          FTX     TRANSACTION FILE SPACE EXHAUSTED
          FBA     BATCH ALREADY ON FILE
          FTA     TRANSACTION ALREADY ON FILE
          FIS     INVALID STATUS
          FBN     BATCH NOT ON FILE
          FIR     INVALID RELATIVE RECORD/BLOCK NUMBER
          FNB     TRANSACTION NOT IN BATCH
          FTN     TRANSACTION NOT ON FILE
          FOX     ORDER FILE SPACE EXHAUSTED
          FON     ORDER NOT ON FILE
          FCC     INVALID CALL CODE
          FAD     BATCH ALREADY BEING ADDED

12FM      CODE: FABR                         ADD BATCH RECORD

          INPUT BUFFER LAYOUT:
```

```
        WORD #                  CONTENTS

         1                      CALL CODE (FABR)
         2                      IGNORE
         3                      $SYSCOM ADR. OF BATCH I.D. DATA
                                (SEE BELOW FOR DATA DEFINTION)

   RETURN BUFFER LAYOUT:

        WORD #                  CONTENTS

         1                      UNCHANGED
         2                      COMPLETION CODE
         3                      UNCHANGED

   COMPLETION CODES:

        CODE                    MEANING

        FOK                     SUCCESSFUL
        FBX                     BATCH FILE SPACE EXHAUSTED
        FBA                     BATCH ALREADY ON FILE
        FCC                     INVALID CALL CODE
        FAD                     BATCH ALREADY BEING ADDED

   BATCH IDENTIFICATION DATA DEFINITION

   THE BATCH IDENTIFICATION DATA IS USED TO ADD A BATCH
   RECORD TO THE BATCH FILE. THE MEMORY ADDRESS OF THIS
   DATA IS PASSED TO THE FILE MANAGER IN THE ADD BATCH
   CALL. THE SIZE OF THIS DATA AREA IS 54 BYTES OF
   CONTIGUOUS MEMORY.  THE LAYOUT OF THIS DATA AREA
   FOLLOWS:

            FIELD               SIZE (BYTES)        TYPE
        SPARE                       1
        BATCH I.D.                  3               EBCDIC
        BATCH HEADER               50               EBCDIC

13FM   CODE: FATR               ADD TRANSACTION RECORD

   INPUT BUFFER LAYOUT:

        WORD #                  CONTENTS

         1                      CALL CODE (FATR)
         2                      IGNORE
         3                      $SYSCOM ADR. OF TRANSACTION I.D
                                (SEE BELOW FOR DATA DEFINITION)
         4                      ZERO = FIRST/NEXT REC. NON-ZERO
                                = LAST REC.

   RETURN BUFFER LAYOUT:

        WORD #                  CONTENTS

         1                      UNCHANGED
         2                      COMPLETION CODE
        3-4                     UNCHANGED

   COMPLETION CODES:

        CODE                    MEANING

        FOK                     SUCCESSFUL
        FTA                     TRANSACTION ALREADY ON FILE
        FTX                     TRANSACTION FILE SPACE EXHAUSTE
        FOX                     ORDER FILE SPACE EXHAUSTED
        FCC                     INVALID CALL CODE

   NOTE: FTA, FTX, FOX CAUSE AN AUTO. DELETE OF
         THE BATCH BEING ADDED.
```

```
       TRANSACTION IDENTIFICATION DATA DEFINITION

       THE TRANSACTION IDENTIFICATION DATA IS USED TO
       ADD A TRANSACTION RECORD TO THE TRANSACTION FILE.
       THE MEMORY ADDRESS OF THIS DATA AREA IS PASSED TO
       THE FILE MANAGER IN THE ADD TRANSACTION CALL. THE
       SIZE OF THIS DATA AREA IS 24 BYTES OF CONTIGUOUS
       MEMORY. THE LAYOUT OF THIS DATA AREA FOLLOWS:

                    FIELD                  SIZE (BYTES)        TYPE

               TRANSACTION NO.                  4             BINARY
               ORDER I.D.                       6             EBCDIC
               PRODUCT I.D.                     6             EBCDIC
               SORT DESTINATION                 1             BINARY
               SOURCE                           5             EBCDIC
               STATUS                           2             BINARY

14FM   CODE: FDEL                          DELETE BATCH

       INPUT BUFFER LAYOUT:

               WORD #                      CONTENTS

                 1                         CALL CODE (FDEL)
                 2                         IGNORE
                3-N                        RELATIVE BATCH NO(S) OF BATCH
                                           (ES) TO BE DELETED
                N+1                        ZERO

       RETURN BUFFER LAYOUT:

               WORD #                      CONTENTS

                 1                         UNCHANGED
                 2                         COMPLETION CODE
               3-N+1                       UNCHANGED

       COMPLETION CODES:

               CODE                        MEANING

               FOK                         SUCCESSFUL
               FIR                         INVALID RELATIVE RECORD/
                                           BLOCK NUMBER
               FCC                         INVALID CALL CODE .

15FM   CODE: FCBS                          CHANGE BATCH STATUS

       INPUT BUFFER LAYOUT:

               WORD #                      CONTENTS

                 1                         CALL CODE (FCBS)
                 2                         IGNORE
                3-4                        BATCH I.D.
                 5                         NEW STATUS (BPEN=PENDING,
                                           BACT=ACTIVE, BCMP=COMPLETE)

       RETURN BUFFER LAYOUT:

               WORD #                      CONTENTS

                 1                         UNCHANGED
                 2                         COMPLETION CODE
                3-5                        UNCHANGED

       COMPLETION CODES:

               CODE                        MEANING

               FOK                         SUCCESSFUL
               FIS                         INVALID STATUS
```

```
         FBN                               BATCH NOT ON FILE
         FCC                               INVALID CALL CODE

16FM     CODE: FCTST                       CHANGE TRANSACTION STATUS
                                           FROM TERMINAL

      INPUT BUFFER LAYOUT:

          WORD #                           CONTENTS

            1                              CALL CODE
            2                              IGNORE
           3-4                             TRANSACTION NUMBER
           5-6                             BATCH I.D.
            7                              STATUS (XNPK=NOT PICKED,XINS
                                           =IN SORTATION,XSTO=STOCK-
                                           OUT,XXSR=EXCESS REPACK,XSTG
                                           =STAGED FOR SHIPMENT)

      RETURN BUFFER LAYOUT:

          WORD #                           CONTENTS

            1                              UNCHANGED
            2                              COMPLETION CODE
           3-7                             UNCHANGED

      COMPLETION CODES:

          CODE                             MEANING

          FOK                              SUCCESSFUL
          FIS                              INVALID STATUS
          FNB                              TRANSACTION NOT IN BATCH
          FTN                              TRANSACTION NOT ON FILE
          FCC                              INVALID CALL CODE

17FM     CODE: FCTSS                       CHANGE TRANSACTION STATUS
                                           FROM SCANNERS

      INPUT BUFFER LAYOUT:

          WORD #                           CONTENTS

            1                              CALL CODE (FCTSS)
            2                              IGNORE
           3-4                             TRANSACTION NUMBER
            5                              STATUS (XINS=IN SORTATION,
                                           XSTO=STOCK-OUT,XXSR=EXCESS
                                           REPACK,XSTG=STAGED FOR
                                           SHIPMENT,XMIS=MIS-SORT)
           6-7                             TRANSACTION DIRECTORY ENTRY
                                           FOR STATUS OF IN-SORTATION.
            8                              MIS-SORT DEST. FOR STATUS
                                           OF MIS-SORT

      RETURN BUFFER LAYOUT:

          WORD #                           CONTENTS

            1                              UNCHANGED
            2                              COMPLETION CODE
           3-5                             UNCHANGED

      COMPLETION CODES:

          CODE                             MEANING

          FOK                              SUCCESSFUL
          FIS                              INVALID STATUS
          FTN                              TRANSACTION NOT ON FILE
          FCC                              INVALID CALL CODE
```

```
18FM    CODE: FBID                          READ BATCH RECORD VIA
                                            BATCH I.D.

        INPUT BUFFER LAYOUT:

                WORD #                      CONTENTS

                  1                         CALL CODE (FBID)
                  2                         IGNORE
                 3-4                        BATCH I.D.
                  5                         RECORD BUFFER ADDRESS (IN
                                            $SYSCOM)(BUFFER SIZE > OR =
                                            64 BYTES)

        RETURN BUFFER LAYOUT:

                WORD #                      CONTENTS

                  1                         UNCHANGED
                  2                         COMPLETION CODE
                 3-5                        UNCHANGED

        COMPLETION CODES:

                CODE                        MEANING

                FOK                         SUCCESSFUL
                FBN                         BATCH NOT ON FILE
                FCC                         INVALID CALL CODE

19FM    CODE: FTID                          READ TRANSACTION RECORD
                                            VIA TRANSACTION NO.

        INPUT BUFFER LAYOUT:

                WORD #                      CONTENTS

                  1                         CALL CODE (FTID)
                  2                         IGNORE
                 3-4                        TRANSACTION NUMBER
                  5                         RECORD BUFFER ADDRESS (IN
                                            $SYSCOM)(BUFFER >  OR = 18
                                            BYTES)

        RETURN BUFFER LAYOUT:

                WORD #                      CONTENTS

                  1                         UNCHANGED
                  2                         COMPLETION CODE
                 3-5                        UNCHANGED

        COMPLETION CODES:

                CODE                        MEANING

                FOK                         SUCCESSFUL
                FTN                         TRANSACTION NOT ON FILE
                FCC                         INVALID CALL CODE

20FM    CODE: FRTD                          READ TRANSACTION DIRECTORY
                                            RECORD VIA TRANSACTION NO.

        INPUT BUFFER LAYOUT:

                WORD #                      CONTENTS

                  1                         CALL CODE (FRTD)
                  2                         IGNORE
                 3-4                        TRANSACTION NUMBER
                  5                         RECORD BUFFER ADDRESS (IN
                                            $SYSCOM)(BUFFER > OR = 4 BYTES)
```

```
        RETURN BUFFER LAYOUT:

               WORD #                   CONTENTS

                 1                      UNCHANGED
                 2                      COMPLETION CODE
                3-5                     UNCHANGED

        COMPLETION CODES:

               CODE                     MEANING

               FOK                      SUCCESSFUL
               FTN                      TRANSACTION NOT ON FILE
               FCC                      INVALID CALL CODE

21FM    CODE: FRTB                      READ TRANSACTION FILE BLOCK

        INPUT BUFFER LAYOUT:

               WORD #                   CONTENTS

                 1                      CALL CODE (FRTB)
                 2                      IGNORE
                3-4                     BATCH I.D.
                 5                      RELATIVE BLOCK NUMBER (1-NO.
                                        OF TRANS. BLOCKS USED)
                 6                      BLOCK BUFFER ADDRESS (IN
                                        $SYSCOM)(BUFFER > OR = 256 BYTE

        RETURN BUFFER LAYOUT:

               WORD #                   CONTENTS

                 1                      UNCHANGED
                 2                      COMPLETION CODE
                3-6                     UNCHANGED

        COMPLETION CODES:

               CODE                     MEANING

               FOK                      SUCCESSFUL
               FBN                      BATCH NOT ON FILE
               FIR                      INVALID RELATIVE RECORD/
                                        BLOCK NUMBER
               FCC                      INVALID CALL CODE

22FM    CODE: FOID                      READ ORDER RECORD VIA
                                        ORDER I.D.

        INPUT BUFFER LAYOUT:

               WORD #                   CONTENTS

                 1                      CALL CODE (FOID)
                 2                      IGNORE
                3-4                     BATCH I.D.
                5-7                     ORDER I.D.
                 8                      RECORD BUFFER ADDRESS (IN
                                        $SYSCOM)(BUFFER SIZE > OR =
                                        18 BYTES)

        RETURN BUFFER LAYOUT:

               WORD #                   CONTENTS

                 1                      UNCHANGED
                 2                      COMPLETION CODE
                3-8                     UNCHANGED

        COMPLETION CODES:
```

```
                CODE              MEANING

                FOK               SUCCESSFUL
                FBN               BATCH NOT ON FILE
                FON               ORDER NOT ON FILE
                FCC               INVALID CALL CODE

23FM     CODE: FROL               READ ORDER RECORD VIA
                                  RELATIVE ORDER NO.

         INPUT BUFFER LAYOUT:

                WORD #            CONTENTS

                  1               CALL CODE (FROL)
                  2               IGNORE
                 3-4              BATCH I.D.
                  5               RELATIVE ORDER NUMBER (1-
                                  NO. OF ORDERS IN BATCH)
                  6               RECORD BUFFER ADDRESS (IN
                                  $SYSCOM)(BUFFER SIZE > OR =
                                  18 BYTES)

         RETURN BUFFER LAYOUT:

                WORD #            CONTENTS

                  1               UNCHANGED
                  2               COMPLETION CODE
                 3-6              UNCHANGED

         COMPLETION CODES:

                CODE              MEANING

                FOK               SUCCESSFUL
                FBN               BATCH NOT ON FILE
                FIR               INVALID RELATIVE RECORD/
                                  BLOCK NUMBER
                FCC               INVALID CALL CODE

24FM     CODE: FINT               COLD START FILE
                                  INITIALIZATION

         INPUT BUFFER LAYOUT:

                WORD #            CONTENTS

                  1               CALL CODE (FINT)
                  2               IGNORE

         RETURN BUFFER LAYOUT:

                WORD #            CONTENTS

                  1               UNCHANGED
                  2               COMPLETION CODE

         COMPLETION CODES:

                CODE              MEANING

                FOK               SUCCESSFUL
                FCC               INVALID CALL CODE

25FM     FILE MANAGER ENTRY EVENT

         THIS EVENT IS DEFINED IN $SYSCOM AND IS USED
         BY ALL CALLERS TO PASS THE ADDRESS OF A
         BUFFER CONTAINING INPUT DATA TO THE FILE
         MGT. PROGRAM
```

```
26FM     FILE MANAGER CALL CODE DISPATCH TABLE FORMAT

         *  ADRS. OF WORK ROUTINE FOR CALL CODE 1  *
         *  ADRS. OF WORK ROUTINE FOR CALL CODE 2  *
         *  ADRS. OF WORK ROUTINE FOR CALL CODE 3  *
         *  ADRS. OF WORK ROUTINE FOR CALL CODE 4  *
         *  ADRS. OF WORK ROUTINE FOR CALL CODE 5  *
         *  ADRS. OF WORK ROUTINE FOR CALL CODE N  *

27FM     FILE MANAGER COMPLETION EVENT

         THIS EVENT IS DEFINED IN $SYSCOM AND IS USED
         TO PASS THE ADDRESS OF A BUFFER CONTAINING
         THE FILE MANAGER OUTPUT DATA BACK TO THE
         CALLER. THIS BUFFER IS THE SAME ONE USED BY
         THE CALLER FOR THE FILE MANAGER ENTRY EVENT.

28FM     READ/WRITE FILE BLOCK

         TO READ OR WRITE A SECTOR FROM/TO ONE OF THE
         DISK FILES SPECIFIED BELOW, SUBROUTINE
         FMRWB IS CALLED WITH THE FOLLOWING INPUT
         PARAMETERS:

                 CALL PARAMETERS

                 READ/WRITE INDICATOR
                 BUFFER ADDRESS (256 BYTE BUFFER) FOR READ/WRITE
                 RELATIVE BLOCK NUMBER
                 FILE CODE (SEE BELOW)
                 BUFFER ADDRESS SUPPLIED BY FM USER

                 FILE CODES:

                 CODE                    FILE

                 XDIRF                   TRANSACTION DIRECTORY
                 XACTF                   TRANSACTION FILE
                 BATCHF                  BATCH FILE
                 ORDERF                  ORDER FILE
                 XLATEF                  TRANSLATION FILE
                 ORDERI                  BUILD RESIDENT ORDER FILE
                 ORDERU                  UPDATE RESIDENT ORDER FILE

29FM     ORDER I.D. TABLE

         THE ORDER I.D. TABLE IS A LOCAL TABLE
         CONTAINING ORDER I.D.'S AND COUNTS OF
         TRANSACTIONS PER ORDER FOR ALL ORDERS
         FOUND IN BATCH BEING ADDED TO SYSTEM.

31FM     BATCH ADDITION COUNTS

         TWO COUNTERS ARE USED BY ADD TRANSACTION
         (FMATR) TO INDICATE THE NO. OF
         TRANSACTIONS AND NO. OF ORDERS ADDED
         THUS FAR IN THE BATCH ADDITION PROCESS.

32FM     BATCH DELETION QUEUE

         A FIFO QUEUE OF ONE-WORD ENTRIES
         CONTAINING RELATIVE BATCH NOS. OF
         BATCHES TO BE DELETED BY FMDLD.

33FM     RESIDENT BATCH FILE SEARCH

         TO OBTAIN THE RELATIVE BATCH NO. GIVEN
         A BATCH I.D. CALL FMSRB WITH THE BATCH
         I.D. AS A PARAMETER. FMSRB SEARCHES
         THE RESIDENT BATCH FILE AND RETURNS
         EITHER THE RELATIVE BATCH NO. OR A
         ZERO VALUE IF THE BATCH IS NOT ON FILE.
```

```
34FM     FILE MANAGER RESOURCE DEFINITION

         A QUEUE CONTROL BLOCK DEFINED IN $SYSCOM USED TO
         FORCE SERIAL USE OF THE FILE MANAGER PROGRAM.

35FM     FILE MANAGER PANIC CALL

         TO PROCESS A PANIC WITHIN THE FILE MANAGER SUB-SYSTEM
         THE USER SHOULD CALL THE SUBROUTINE FMPAN WITH THE
         PANIC CODE IN REGISTER 1. (#1) NO RETURN WILL BE
         MADE FROM THIS CALL.

36FM     RECORD BUFFER QUEUE

         THE RECORD BUFFER QUEUE IS DEFINED IN $SYSCOM
         AND CONTAINS A POOL OF 64 BYTE BUFFERS.
         THESE BUFFERS ARE USED TO PASS COPIES OF RECORDS
         TO AND FROM THE FILE MANAGER.

37FM     SECTOR BUFFER QUEUE

         THE SECTOR BUFFER QUEUE IS DEFINED IN $SYSCOM
         AND CONTAINS A POOL OF 256 BYTE BUFFERS.
         THESE BUFFERS ARE USED TO PASS COPIES OF
         DISK FILE SECTORS TO AND FROM THE FILE MANAGER.

38FM     CODE: FADC                        ADD BATCH COMPLETE

         INPUT BUFFER LAYOUT:

                WORD #                     CONTENTS

                  1                        CALL CODE (FADC)
                  2                        IGNORE

         RETURN BUFFER LAYOUT:

                WORD #                     CONTENTS

                  1                        UNCHANGED
                  2                        COMPLETION CODE

         COMPLETION CODES:

                 CODE                      MEANING

                 FOK                       SUCCESSFUL
                 FBN                       BATCH NOT ON FILE
                 FCC                       INVALID CALL CODE

39FM     SYSTEM PARAMETER FILE DEFINITION

         THE SYSTEM PARAMETER FILE CONSISTS OF 1 SECTOR OF 256
         BYTES ON DISK CALLED "PARMFILE" OF WHICH THE FIRST 58
         BYTES ARE USED. THE LAYOUT OF THIS FILE FOLLOWS.

         INDEX          FIELD              SIZE(BYTES)      TYPE

         SNOS     # OF SHIPPING LINES           2          BINARY
         SREC     RECIRC DESTINATION            2          BINARY
         SERD     ERROR DESTINATION             2          BINARY
         SNOI     # OF INDUCTION LINES          2          BINARY
         SOUT     # OF STOCK-OUT SCANNERS       2          BINARY
         XRPK     # OF EXCESS REPACK SCNRS      2          BINARY
         SHIP     # OF SHIPPING SCANNERS        2          BINARY
         LOGD     # OF LOG DEVICES              2          BINARY
         LOGMR    LOG MESSAGE ROUTING TABLE    42          BINARY

         FOR FURTHER DEFINITION OF THE LOG MESSAGE ROUTING TABLE
         ENTRIES, SEE 04AL.
```

```
                ON IPL, THE DISK-RESIDENT SYSTEM PARAMETER FILE DATA IS
                COPIED INTO $SYSCOM AS A 29 WORD (58 BYTE) MEMORY RESIDENT
                TABLE. THE INDEX INTO THE MEMORY RESIDENT TABLE IS THE
                SAME AS THE DISK FILE INDEX.

40FM            SYSTEM ERROR COUNTS

                THE SYSTEM ERROR COUNTS RESIDE IN $SYSCOM AND CONTAIN THE
                NUMBER OF ERRORS FOR EACH CONDITION. THE MIS-SORT COUNT
                TABLE CONTAINS 1 WORD FOR EACH SORT LINE IN THE SYSTEM.
                THESE COUNTS CAN BE CLEARED BY OPERATOR COMMAND OR BY
                AN IPL. THE LAYOUT OF THESE COUNTS FOLLOW:

                INDEX           FIELD                   SIZE(BYTES)     TYPE

                MSRT            MIS-SORT COUNT TABLE        100         BINARY
                NRED            NO-READ COUNT TABLE           6         BINARY
                RJCT            REJECT LINE COUNT             2         BINARY
                PREC            RECIRCS FROM PSC              2         BINARY
                SCRC            SCANNER ASSIGNED RECIRCS      2         BINARY

************************************************************************
*
* OPERATOR INTERFACE DATA DICTIONARY INDEX
*
************************************************************************

I/O #           DESCRIPTION

01OI            OPERATOR INTERFACE COMMANDS
02OI            ERROR MESSAGES
03OI            REQUEST MESSAGES
04OI            DESCRIPTIVE MESSAGES
05OI            WORK SCHEDULE REPORT LAYOUT
06OI            BATCH STATUS REPORT LAYOUT
07OI            ORDER STATUS REPORT LAYOUT
08OI            TRANSACTION STATUS REPORT LAYOUT
09OI            SORT LINE ROUTING REPORT LAYOUT
10OI            LOCAL FLAG DEFINITIONS
11OI            GLOBAL FLAG DEFINITIONS
12OI            BATCH LOCAL DATA
13OI            ORDER LOCAL DATA
14OI            TRANSACTION LOCAL DATA
15OI            FIND BATCH CALL
16OI            GET BATCH CALL
17OI            FIND ORDER CALL
18OI            GET ORDER CALL
19OI            FIND TRANSACTION CALL
20OI            SEQUENTIAL TRANSACTION CALL
21OI            GET TRANSACTION CALL
22OI            READ BATCH CALL
23OI            WRITE BATCH CALL
24OI            ADD BATCH CALL
25OI            ADD TRANSACTION CALL
26OI            OPERATOR INTERFACE CONTROL LOCAL DATA
27OI            WORK SCHEDULE REPORT LOCAL DATA
28OI            BATCH STATUS REPORT LOCAL DATA
29OI            ORDER STATUS REPORT LOCAL DATA
30OI            TRANSACTION STATUS REPORT LOCAL DATA
31OI            SORT TRANSLATION REPORT LOCAL DATA
32OI            READ BATCH LOCAL DATA
33OI            WRITE BATCH LOCAL DATA
34OI            START BATCH LOCAL DATA
35OI            END BATCH LOCAL DATA
36OI            DELETE BATCH LOCAL DATA
37OI            REROUTE SHIPPING LINE LOCAL DATA
38OI            RESTORE SHIPPING LINE LOCAL DATA
39OI            OPEN PSC COMMUNICATIONS LOCAL DATA
40OI            ASSIGN TRANSACTION STATUS LOCAL DATA
41OI            RECIRC LOCAL DATA
42OI            HOLD LOCAL DATA
```

| | | |
|---|---|---|
| 43OI | BATCH VERIFICATION DISPLAY LAYOUT | 00000510 |
| 44OI | TRANSACTION VERIFICATION DISPLAY LAYOUT | 00000520 |
| 45OI | CHANGE BATCH STATUS CALL | 00000530 |
| 46OI | WRITE SORT TRANSLATION TABLE CALL | 00000540 |
| 47OI | HELP COMMAND LAYOUT | 00000550 |
| 48OI | GET IPM CALL | 00000560 |
| 49OI | GET RECORD BUFFER CALL | 00000570 |
| 50OI | FREE IPM CALL | 00000580 |
| 51OI | FREE RECORD BUFFER CALL | 00000590 |
| 52OI | SEND ALARM MESSAGE CALL | 00000600 |
| 53OI | DELETE BATCH CALL | 00000610 |
| 54OI | PANIC CALL | 00000620 |
| 55OI | GET BLOCK BUFFER CALL | 00000630 |
| 56OI | FREE BLOCK BUFFER CALL | 00000640 |
| 57OI | DISKETTE COMMAND WORD FLAG DEFINITIONS | 00000650 |
| 58OI | SYSTEM ERROR REPORT LAYOUT | 00000660 |
| 59OI | SYSTEM ERROR REPORT LOCAL DATA | 00000670 |
| 60OI | MIS-SORT REPORT LOCAL DATA | 00000680 |
| 61OI | MIS-SORT REPORT LAYOUT | 00000690 |
| | | 00000700 |

```
************************************************************00000710
*                                                            00000720
* OPERATOR INTERFACE MODULE REFERENCES                       00000730
*                                                            00000740
************************************************************00000750
                                                             00000760
I/O #     DESCRIPTION                                        00000770
                                                             00000780
01OI      OICTL                                              00000790
02OI:1    OICTL                                              00000800
    :2    OICCAB(OIRDB)                                      00000810
    :3    OICCAT(OIRDB)                                      00000820
    :4    OICCAB(OIRDB)                                      00000830
    :5    OICCAT(OIRDB)                                      00000840
    :6    OIATS                                              00000850
    :7    OIBSR,OIOSR,OITSR,OIWRB,OISTB,OIENB,OIDLB,OIATS,OIMSR  00000860
    :8    OITSR,OIATS                                        00000870
    :9    OICCAT(OIRDB)                                      00000880
    :10   OICCGO(OIOSR),OICCGO(OIMSR)                        00000890
    :11   OIASL,OIRSL                                        00000900
    :12   OIBSR,OIOSR,OICCGO(OIOSR),OICCGO(OIMSR),OIMSR      00000910
    :13   OIATS,OITSR                                        00000920
    :14   OICCRB(OIRDB),OICCWB(OIWRB)                        00000930
    :15   OIRDB                                              00000940
    :16   OIRDB                                              00000950
    :17   OIDLB                                              00000960
    :18   OIDLB                                              00000970
    :19   OIATS                                              00000980
    :20   INITIAL                                            00000990
    :21   INITIAL                                            00001000
    :22   INITIAL                                            00001010
    :23   OIASL                                              00001020
    :24   OIRSL                                              00001030
03OI:1    OIWSR,OIBSR,OIOSR,OITSR,OISTR,OISER,OIMSR          00001040
    :2    OIBSR,OIOSR,OIWRB,OISTB,OIENB,OIDLB,OIATS,OIMSR    00001050
    :3    OIOSR,OIMSR                                        00001060
    :4    OIOSR,OIMSR                                        00001070
    :5    OIOSR                                              00001080
    :6    OIRDB,OIWRB                                        00001090
    :7    OIRDB                                              00001100
    :8    OIWRB                                              00001110
    :9    OISTB                                              00001120
    :10   OIENB                                              00001130
    :11   OIDLB                                              00001140
    :12   OIDLB                                              00001150
    :13   OITSR,OIATS                                        00001160
    :14   OIATS                                              00001170
    :15   OIASL,OIRSL                                        00001180
    :16   OIASL                                              00001190
    :17   OIATS                                              00001200
    :18   OISER                                              00001210
```

|  |  |  |
|---|---|---|
| :19 | OIRSE | 00001220 |
| :20 | OIRSE | 00001230 |
| :21 | OIRSE | 00001240 |
| :22 | OIRSE | 00001250 |
| :23 | OIRSE | 00001260 |
| :24 | OIRSE | 00001270 |
| 0401:1 | OICTL | 00001280 |
| :2 | OICTL | 00001290 |
| :3 | OIWSR | 00001300 |
| :4 | OIWSR,OIDLB | 00001310 |
| :5 | OIBSR | 00001320 |
| :6 | OIOSR | 00001330 |
| :7 | OITSR | 00001340 |
| :8 | OISTR | 00001350 |
| :9 | OIRDB | 00001360 |
| :10 | OIWRB | 00001370 |
| :11 | OISTB | 00001380 |
| :12 | OIENB | 00001390 |
| :13 | OIDLB | 00001400 |
| :14 | OIATS | 00001410 |
| :15 | OIASL | 00001420 |
| :16 | OIRSL | 00001430 |
| :17 | OIPSC | 00001440 |
| :18 | OIPSC | 00001450 |
| :19 | OIREC | 00001460 |
| :20 | OIHLT | 00001470 |
| :21 | OIHLP | 00001480 |
| :22 | OIASL,OIRSL | 00001490 |
| :23 | OIRDB | 00001500 |
| :24 | OIWRB | 00001510 |
| :25 | OIRDB,OIWRB | 00001520 |
| :26 | OIATS | 00001530 |
| :27 | INIT | 00001540 |
| :28 | INIT | 00001550 |
| :29 | INITIAL | 00001560 |
| :30 | INITIAL | 00001570 |
| :31 | OISER | 00001580 |
| :32 | OISER | 00001590 |
| :33 | OIRSE | 00001600 |
| :34 | OIRSE | 00001610 |
| :35 | OIMSR | 00001620 |
| :36 | OIMSR | 00001630 |
| :37 | OIOSR | 00001640 |
| 0501 | OIWSR | 00001650 |
| 0601 | OIBSR | 00001660 |
| 0701 | OIOSR | 00001670 |
| 0801 | OITSR | 00001680 |
| 0901 | OISTR | 00001690 |
| 1001 | OICTL,OIWSR,OIBSR,OIOSR,OITSR,OISTR,OIRDB,OIWRB,OISTB,OIENB, | 00001700 |
|  | OIDLB,OIATS,OIASL,OIRSL,OIPSC,OIMSR | 00001710 |
| 1101 | OICTL,OIRDB,OIWRB | 00001720 |
| 1201 | OIWSR,OIBSR,OIOSR,OITSR,OIRDB,OIWRB,OISTB,OIENB,OIDLB,OIATS, | 00001730 |
|  | OIMSR | 00001740 |
| 1301 | OIBSR,OIOSR,OIWRB,OIMSR | 00001750 |
| 1401 | OIOSR,OITSR,OIRDB,OIWRB,OIATS,OIMSR | 00001760 |
| 1501 | OIWSR | 00001770 |
| 1601 | OICCFB,OIBSR,OIWRB,OISTB,OIENB,OIDLB,OIATS,OIMSR | 00001780 |
| 1701 | OIBSR,OIOSR,OIWRB,OIDLB,OIMSR | 00001790 |
| 1801 | OIOSR,OIMSR | 00001800 |
| 1901 | OIOSR,OIWRB,OIMSR | 00001810 |
| 2001 | OICCFT | 00001820 |
| 2101 | OITSR,OIATS | 00001830 |
| 2201 | OIRDB | 00001840 |
| 2301 | OIWRB | 00001850 |
| 2401 | OIRDB | 00001860 |
| 2501 | OIRDB | 00001870 |
| 2601 | OICTL | 00001880 |
| 2701 | OIWSR | 00001890 |
| 2801 | OIBSR | 00001900 |
| 2901 | OIOSR | 00001910 |
| 3001 | OITSR | 00001920 |
| 3101 | OISTR | 00001930 |
| 3201 | OIRDB | 00001940 |

| | | | | |
|---|---|---|---|---|
| 33OI | OIWRB | | | 00001950 |
| 34OI | OISTB | | | 00001960 |
| 35OI | OIENB | | | 00001970 |
| 36OI | OIDLB | | | 00001980 |
| 37OI | OIASL | | | 00001990 |
| 38OI | OIRSL | | | 00002000 |
| 39OI | OIPSC | | | 00002010 |
| 40OI | OIATS | | | 00002020 |
| 41OI | OIREC | | | 00002030 |
| 42OI | OIHLT | | | 00002040 |
| 43OI | OIRDB,OIWRB,OISTB,OIENB,OIDLB,OIATS | | | 00002050 |
| 44OI | OIATS | | | 00002060 |
| 45OI | OISTB,OIENB | | | 00002070 |
| 46OI | OIASL,OIRSL | | | 00002080 |
| 47OI | OIHLP | | | 00002090 |
| 48OI | OIWSR,OIBSR,OIOSR,OITSR,OIRDB,OISTB,OIENB,OIDLB,OIATS,OIWRB, | | | 00002100 |
| | OIMSR | | | 00002110 |
| 49OI | OIWSR,OIBSR,OIOSR,OITSR,OIRDB,OISTB,OIENB,OIDLB,OIATS,OIMSR | | | 00002120 |
| 50OI | OIWSR,OIBSR,OIOSR,OITSR,OIRDB,OISTB,OIENB,OIDLB,OIATS,OIWRB, | | | 00002130 |
| | OIMSR | | | 00002140 |
| 51OI | OIWSR,OIBSR,OIOSR,OITSR,OIRDB,OISTB,OIENB,OIDLB,OIATS,OIMSR | | | 00002150 |
| 52OI | OISTB,OIENB | | | 00002160 |
| 53OI | OIDLB,OIRDB | | | 00002170 |
| 54OI | OITSR,OIPSC,OIATS,OICCGB,OICCCB,OICCRB,OICCAB,OICCWB,OICCFO, | | | 00002180 |
| | OICCGO,OICCST,OICCGT,OICCAT,OICCWS,OICCSA,OICCDB,FMATR,OIMSR, | | | 00002190 |
| | OIOSR | | | 00002200 |
| 55OI | OICCST | | | 00002210 |
| 56OI | OICCST | | | 00002220 |
| 57OI | OIRDB,OIWRB | | | 00002230 |
| 58OI | OISER | | | 00002240 |
| 59OI | OISER | | | 00002250 |
| 60OI | OIMSR | | | 00002260 |
| 61OI | OIMSR | | | 00002270 |
| | | | | 00002280 |

```
************************************************************00002290
*                                                            00002300
* OPERATOR INTERFACE DATA DICTIONARY ENTRIES                 00002310
*                                                            00002320
************************************************************00002330
                                                             00002340
I/O #              DESCRIPTION                               00002350
                                                             00002360
01OI    OPERATOR INTERFACE COMMANDS:                         00002370
                                                             00002380
        CATEGORY:       COMMAND:   DESCRIPTION:              00002390
                                                             00002400
        STATUS REPORTS  BATCH      BATCH STATUS REPORT       00002410
                        ORDER      ORDER STATUS REPORT       00002420
                        TRANSACT   TRANSACTION STATUS REPORT 00002430
                        SCHEDULE   WORK SCHEDULE REPORT      00002440
                        ROUTE      SORT LINE ROUTING REPORT  00002450
                        MISSORT    MISSORT EXCEPTIONS        00002460
                                                             00002470
        BATCH CONTROL   READ       READ BATCH FROM DISKETTE  00002480
                        START      START BATCH PROCESSING    00002490
                        END        END BATCH PROCESSING      00002500
                        WRITE      WRITE BATCH TO DISKETTE   00002510
                        DELETE     DELETE BATCH INFORMATION  00002520
                                                             00002530
        TRANSACTION     ASSIGN     ASSIGN TRANSACTION STATUS 00002540
                                                             00002550
        SCANNER INPUT   RECIRC     RECIRCULATE ON SCANNER ERROR 00002560
                        HOLD       HOLD ON SCANNER ERROR     00002570
                                                             00002580
        SORT LINE       REROUTE    ASSIGN ALTERNATE SORT LINE 00002590
                        RESTORE    RESTORE SORT LINE         00002600
                                                             00002610
        PSC CONTROL     OPEN       OPEN PSC COMMUNICATIONS   00002620
                                                             00002630
        DIAGNOSTIC      HELP       OPERATOR COMMAND LIST     00002640
                        RESET      RESET SYSTEM ERROR COUNTS 00002650
                        ERROR      DISPLAY SYSTEM ERROR COUNTS 00002660
                                                             00002670
02OI    ERROR MESSAGES:                                      00002680
```

```
1: PROGRAM LOAD ERROR XX

        UNABLE TO LOAD AN OPERATOR COMMAND PROGRAM FOR EXECU-
        TION. EDX COMPLETION CODE (XX) FOR LOAD STATEMENT
        DESCRIBES CAUSE OF ERROR.

2: BATCH FILE SPACE EXHAUSTED

        ATTEMPT TO ADD TOO MANY BATCH RECORDS. BATCH NOT
        ADDED.

3: TRANSACTION FILE SPACE EXHAUSTED

        ATTEMPT TO ADD TOO MANY TRANSACTIONS RECORDS. BATCH
        AUTOMATICALLY DELETED.

4: BATCH ALREADY ON FILE XXX

        ATTEMPT TO ADD BATCH ID (XXX) FAILED BECAUSE A DUP-
        LICATE BATCH ID WAS ENCOUNTERED.

5: TRANSACTION ALREADY ON FILE XXXXXX

        ATTEMPT TO ADD TRANSACTION ID (XXXXXX) FAILED BECAUSE
        A DUPLICATE TRANSACTIN ID WAS ENCOUNTERED.

6: INVALID STATUS X

        ATTEMPT TO CHANGE EITHER BATCH OR TRANSACTION STATUS
        FAILED BECAUSE OF INVALID STATUS CODE. OLD STATUS NOT
        MODIFIED.

7: BATCH NOT ON FILE XXX

        ATTEMPT TO ACCESS BATCH ID (XXX) INFORMATION NOT CUR-
        RENTLY AVAILABLE.

8: TRANSACTION NOT ON FILE XXXXXX

        ATTEMPT TO ACCESS TRANSACTION ID (XXXXXX) INFORMATION
        NOT CURRENTLY AVAILABLE.

9: ORDER FILE SPACE EXHAUSTED

        ATTEMPT TO ADD TOO MANY ORDER RECORDS. BATCH AUTOMA-
        TICALLY DELETED.

10: ORDER NOT ON FILE XXXXXX

        ATTEMPT TO ACCESS ORDER ID (XXXXXX) INFORMATION NOT
        CURRENTLY AVAILABLE.

11: INVALID SORT LINE NUMBER XX

        ATTEMPT TO ASSIGN OR RESTORE A SORT LINE OUTSIDE
        KNOWN RANGE.

12: BATCH NO LONGER ON FILE - REPORT TERMINATED

        BATCH INFORMATION WAS DELETED DURING REPORT GENER-
        ATION BUT AFTER BATCH ID WAS VERIFIED.

13: INVALID TRANSACTION NUMBER

        TRANSACTION NUMBER OUT OF RANGE.

14: DISKETTE I/O ERROR OCCURRED

        ATTEMPT TO READ OR WRITE A DISKETTE DATA BLOCK
        FAILED.

15: TRANSACTION VALIDATION ERROR
```

```
        ATTEMPT TO ADD A TRANSACTION RECORD FAILED BECAUSE OF A
        DATA VALIDATION CHECK REJECTED EITHER; TRANSACTION ID,
        DESTINATION, OR STATUS CODE.

    16: DISKETTE FORMAT ERROR

        ATTEMPT TO ACCESS A NON-STANDARD IBM SYSTEM 3 DISKETTE.

    17: BATCH MUST BE PENDING OR COMPLETE TO BE DELETED - COMMAND
        ABORTED

        ATTEMPTED TO DELETE AN ACTIVE BATCH. THE COMMAND IS ABORTED

    18: ALL CURRENT BATCHES ARE ACTIVE - COMMAND ABORTED

        ATTEMPTED TO DELETE ALL BATCHES WHEN ALL BATCHES ON FILE
        WERE ACTIVE. THE COMMAND IS ABORTED.

    19: TRANSACTION XXXXXX NOT IN BATCH XXX

        ATTEMPT TO CHANGE A TRANSACTION STATUS THAT IS NOT
        IN THE REQUESTED BATCH.

    20: ERROR IN BATCH XXX

        ERROR WAS FOUND IN THE TRANSACTION FILE AT SYSTEM
        START UP TIME. STATUS OF BATCH IS QUESTIONABLE.

    21: DISK ERROR WHILE PROCESSING BATCH XXX

        ATTEMPT TO READ A PORTION OF THE TRANSACTION FILE
        AT SYSTEM START UP TIME FAILED. STATUS OF BATCH
        IS QUESTIONABLE.

    22: ERROR WHILE READING BATCH FILE

        ATTEMPT TO READ THE BATCH FILE AT SYSTEM START UP
        TIME FAILED. STATUS OF SYSTEM IS QUESTIONABLE.

    23: ATTEMPT TO ASSIGN A SORT LINE TO ITSELF

        AN ATTEMPT WAS MADE TO REROUTE A SORT LINE TO IT-
        SELF USING THE REROUTE COMMAND. NO ACTION IS TAKEN
        AND THE COMMAND IS ABORTED.

    24: NO PRIOR ASSIGNMENT OF SORT LINE

        AN ATTEMPT WAS MADE TO RESTORE A SORT LINE THAT
        HAD NOT BEEN REROUTED USING THE RESTORE COMMAND.
        NO ACTION IS TAKEN AND THE COMMAND IS ABORTED.

03DI    REQUEST MESSAGES:

     1: DO YOU WANT HARD COPY?

            Y          USER TERMINAL DEQUEUED AND SYSTEM PRINTER
                       ENQUEUED. ALL FUTURE MESSAGES LISTED ON
                       SYSTEM PRINTER.

            N          NO ACTION.

     2: ENTER BATCH ID:

            XXX        3-CHARACTER ALPHANUMERIC BATCH ID.

     3: ALL ORDERS ?

            Y          ALL ORDER INFORMATION FOR A PREVIOUSLY RE-
                       QUESTED BATCH ID, WILL BE ACCESSED.

            N          NO ACTION.

     4: ENTER ORDER ID:
```

```
        XXXXXX      6-CHARACTER ALPHANUMERIC ORDER ID.

5: LIST EXCEPTIONS ?

        Y           ALL TRANSACTION INFORMATION NOT "STAGED FOR
                    SHIPMENT" FOR A PREVIOUSLY REQUESTED BATCH
                    ID AND ORDER ID, WILL BE LISTED.

        N           NO ACTION.

6: DISKETTE MOUNTED ?

        Y           ACCESS OF DISKETTE ATTEMPTED.

        N           NO ACTION.

7: OK TO READ ?

        Y           DISKETTE BATCH INFORMATION READ.

        N           READ BATCH (FROM DISKETTE) COMMAND TERM-
                    INATED.

8: CORRECT BATCH ?

        Y           BATCH INFORMATION FOR A PREVIOUSLY REQUEST-
                    ED BATCH ID IS WRITTEN TO DISKETTE.

        N           WRITE BATCH (TO DISKETTE) COMMAND TERMIN-
                    ATED.

9: START BATCH ?

        Y           BATCH STATUS FOR PREVIOUSLY REQUESTED BATCH
                    ID IS CHANGED.

        N           BATCH STATUS NOT CHANGED.

10: END BATCH ?

        Y           BATCH STATUS FOR PREVIOUSLY REQUESTED BATCH
                    ID IS CHANGED.

        N           BATCH STATUS NOT CHANGED.

11: ALL BATCHES ?

        Y           ALL BATCH INFORMATION CURRENTLY AVAILABLE
                    MAY BE DELETED.

        N           NO ACTION.

12: DELETE BATCH ?

        Y           ALL BACH INFORMATION ASSOCIATED WITH THE
                    PREVIOUSLY DISPLAYED BATCH ID WILL BE DES-
                    TROYED.

        N           NO ACTION.

13: ENTER TRANSACTION ID:

        XXXXXX      6-DIGIT NUMERIC TRANSACTION ID, IN THE
                    RANGE 1 THROUGH 999999.

14: ENTER NEW STATUS NUMBER:

        X           SINGLE DIGIT NUMERIC TRANSACTION STATUS, IN
                    THE RANGE 1 THROUGH 5.

15: ENTER OLD SORT LINE:

        XX          2-DIGIT NUMERIC SORT LINE NUMBER, IN THE
                    RANGE 1 THROUGH 99.
```

```
16: ENTER NEW SORT LINE:

        XX        2-DIGIT NUMERIC SORT LINE NUMBER, IN THE
                  RANGE 1 THROUGH 99.

17: TYPE "CANCEL" TO TERMINATE:

        CANCEL    COMMAND ABORTED

        <ENTER>   CONTINUE PROCESSING

18: LIST MISSORT COUNTS ?

        Y         MISSORTS COUNTS LISTED

        N         NO ACTION

19: CLEAR ALL COUNTS ?

        Y         ALL ERROR COUNTS CLEARED

        N         NO ACTION

20: CLEAR MISSORT COUNTS ?

        Y         MISSORT COUNTS CLEARED

        N         NO ACTION

21: CLEAR SCANNER NO-READ COUNTS ?

        Y         NO-READ COUNTS CLEARED

        N         NO ACTION

22: CLEAR REJECT COUNT ?

        Y         REJECT COUNT CLEARED

        N         NO ACTION

23: CLEAR RECIRCULATION COUNTS ?

        Y         RECIRCULATION COUNTS CLEARED

        N         NO ACTION

24: CLEAR LOST FROM TRACKING COUNT ?

        Y         LFT COUNT CLEARED

        N         NO ACTION

040I      DESCRIPTIVE MESSAGES:

 1: DISKETTE ALREADY IN USE
 2: RETRY COMMAND LATER
 3: WORK SCHEDULE REPORT
 4: NO CURRENT BATCH INFORMATION
 5: BATCH STATUS REPORT
 6: ORDER STATUS REPORT
 7: TRANSACTION STATUS REPORT
 8: SORT TRANSLATION REPORT
 9: READ BATCH COMMAND
10: WRITE BATCH COMMAND
11: START BATCH COMMAND
12: END BATCH COMMAND
13: DELETE BATCH COMMAND
14: ASSIGN TRANSACTION STATUS COMMAND
15: ASSIGN SHIPPING LINE COMMAND
16: RESTORE SHIPPING LINE COMMAND
17: OPEN PSC COMMUNICATIONS COMMAND
18: PSC COMMUNICATIONS INITIATED
19: RECIRC ON SCANNER ERROR
```

```
        20: HOLD ON SCANNER ERROR
        21: HELP COMMAND
        22: SHIPPING LINE ASSIGNED
        23: READ BATCH COMMAND ABORTED
        24: WRITE BATCH COMMAND ABORTED
        25: REMOVE DISKETTE
        26: STATUS CHANGE COMPLETE
        27: SYSTEM STARTED
        28: SET DATE AND TIME USING COMMAND $T
        29: SYSTEM INITIALIZATION IN PROGRESS
        30: STATUS OF SYSTEM IS QUESTIONABLE
        31: SYSTEM ERROR REPORT
        32: M I S - S O R T S
        33: RESET ERROR COUNTS COMMAND
        34: COUNTS CLEARED
        35: MIS-SORT REPORT
        36: NO MIS-SORTS IN THIS ORDER
        37: NO EXCEPTIONS IN THIS ORDER

050I    WORK SCHEDULE REPORT LAYOUT:

             REPORT FIELD:                 FROM:

         1:  DATE                          270I TIME
         2:  TIME                          270I TIME
         3:  PAGE                          270I PAGECNT
         4:  BATCH ID                      120I BID
         5:  BATCH STATUS                  120I BSTATUS, BSTBL
         6:  ORDER COUNT                   120I BOCNT
         7:  TRANSACTION COUNT             120I BTCNT
         8:  HEADER INFORMATION            120I BHDR

        * SEE REPORT LAYOUT SHEET

060I    BATCH STATUS REPORT LAYOUT:

             REPORT FIELD:                 FROM:

         1:  DATE                          280I TIME
         2:  TIME                          280I TIME
         3:  PAGE                          280I PAGECNT
         4:  BATCH ID                      120I BID
         5:  BATCH STATUS                  120I BSTATUS, BSTBL
         6:  ORDER COUNT                   120I BOCNT
         7:  TRANSACTION COUNT             120I BTCNT
         8:  HEADER INFORMATION            120I BHDR
         9:  BATCH % COMPLETE              120I BPCOM

        * SEE REPORT LAYOUT SHEET

070I    ORDER STATUS REPORT LAYOUT:

             REPORT FIELD:                 FROM:

         1:  DATE                          290I TIME
         2:  TIME                          290I TIME
         3:  PAGE                          290I PAGECNT
         4:  BATCH ID                      120I BID
         5:  BATCH STATUS                  120I BSTATUS, BSTBL
         6:  ORDER COUNT                   120I BOCNT
         7:  TRANSACTION COUNT             290I RTCNT
         8:  HEADER INFORMATION            120I BHDR
         9:  ORDER NUMBER                  130I OCNT
        10:  ORDER ID                      130I OID
        11:  QUANTITY PLANNED              130I OTCNT
        12:  QUANTITY STAGED               130I OQSTG
        13:  QUANTITY NOT SHIPPED          130I OQNSTG
        14:  QUANTITY STOCK-OUT            130I OQSTO
        15:  QUANTITY EXCESS REPACK        130I OQXRP
        16:  QUANTITY IN SORTATION         130I OQISORT
        17:  QUANTITY NOT PICKED           130I OQNPKD
        18:  QUANTITY MIS-SORT             130I OQMIS
        19:  ORDER % COMPLETE              130I OPCOM
        20:  TRANSACTION NUMBER            290I RTCNT
```

```
     21:  TRANSACTION ID                  140I TID
     22:  TRANSACTION STATUS              140I TSTATUS
     23:  PRODUCT ID                      140I TPROD
     24:  SOURCE LOCATION                 140I TSOURCE
     25:  DESTINATION                     140I TDEST
     26:  MIS-SORT DESTINATION

     * SEE REPORT LAYOUT SHEET

080I   TRANSACTION STATUS REPORT LAYOUT:

          REPORT FIELD:                   FROM:

      1:  DATE                            300I TIME
      2:  TIME                            300I TIME
      3:  PAGE                            300I PAGECNT
      4:  BATCH ID                        120I BID
      5:  BATCH STATUS                    120I BSTATUS, BSTBL
      6:  ORDER COUNT                     120I BOCNT
      7:  HEADER INFORMATION              120I BHDR
      8:  TRANSACTION ID                  140I TID
      9:  TRANSACTION STATUS              140I TSTATUS
     10:  PRODUCT ID                      140I TPROD
     11:  SOURCE LOCATION                 140I TSOURCE
     12:  DESTINATION                     140I TDEST
     13:  MIS-SORT DESTINATION                 TMDEST

     * SEE REPORT LAYOUT SHEET

090I   SORT LINE ROUTING REPORT LAYOUT:

          REPORT FIELD:                   FROM:

      1:  DATE                            310I TIME
      2:  TIME                            310I TIME
      3:  PAGE                            310I PAGECNT
      4:  SORT LINE                       06FM
      5:  ALTERNATE                       06FM

     * SEE REPORT LAYOUT SHEET

100I   LOCAL FLAG DEFINITIONS:

          LABEL:    DESCRIPTION:                VALUE: BYTES: TYPE:

      1:  FLGDEF    LOCAL FLAG DEFINITION                 2    BINARY
      2:  FLGOK     (GENERAL PURPOSE "OK")      0001      0    EQUATE
      3:  FLGHCY    HARDCOPY DEVICE             0002      0    EQUATE
      4:  FLGBFD    BATCH FOUND                 0004      0    EQUATE
      5:  FLBSPOB   SPECIFIC ORDER OR BATCH     0008      0    EQUATE
      6:  FLGOSQ    ORDER SEQUENCE PROCESSING   0010      0    EQUATE
      7:  FLGEXC    EXCEPTION PROCESSING        0020      0    EQUATE
      8:  FLGDEL    DELETION PROCESSING         0040      0    EQUATE
      9:  FLGLOR    LIST ORDER RECORD           0080      0    EQUATE
     10:  FLGLTR    LIST TRANSACTION RECORD     0100      0    EQUATE
     11:  FLGABO    BATCH READ/WRITE ABORTED    0200      0    EQUATE
     12:  FLGLR     LAST RECORD PROCESSING      0400      0    EQUATE
     13:  FLGRAB    REPORT ABORTED              0800      0    EQUATE

110I   GLOBAL FLAG DEFINITIONS:

          LABEL:    DESCRIPTION:                VALUE: BYTES: TYPE:

      1:  OIFLG     GLOBAL FLAG DEFINITION                2    BINARY
      2:  OIDIU     DISKETTE IN USE             0001      0    EQUATE

          MODULE REFERENCE: OICTL, OIRDB, OIWRB.

120I   BATCH LOCAL DATA:

          LABEL:    DESCRIPTION:                       BYTES: TYPE:

      1:  BRDA      RESIDENT DIRECTORY ADDRESS            2    BINARY
      2:  BMAX      MAXIMUM BATCHES ALLOWED               2    BINARY
```

```
     3:  BCNT      BATCH COUNTER                         2     BINARY
     4:  BID       BATCH ID                              6     EBCDIC
     5:  BSTATUS   BATCH STATUS                          2     BINARY
     6:  BHDR      BATCH HEADER                         52     EBCDIC
     7:  BOCNT     BATCH ORDER COUNT                     2     BINARY
     8:  BTCNT     BATCH TRANSACTION COUNT               2     BINARY
     9:  BRDES     RESIDENT DIRECTORY ENTRY SIZE         2     BINARY
    10:  BIPM      IPM BUFFER ADDRESS                    2     BINARY
    11:  BSRB      SYSCOM RECORD BUFFER ADDRESS          2     BINARY
    12:  BPANIC1   PANIC CODE 1                          2     BINARY
    13:  BPANIC2   PANIC CODE 2                          2     BINARY
    14:  BPANIC3   PANIC CODE 3                          2     BINARY
    15:  BPCOM     BATCH PERCENT COMPLETE                8     BINARY
    16:  BESTBL    BATCH ENGLISH STATUS TABLE           48     EBCDIC
    17:  BHDR1     BATCH REPORT HEADER                  82     EBCDIC
    18:  BHDR2     BATCH REPORT HEADER                  30     EBCDIC
    19:  BHDR3     BATCH REPORT HEADER                  50     EBCDIC
    20:  BDTL      BATCH REPORT DETAIL INFORMATION      32     EBCDIC
    21:  BFTN      BATCH REPORT FOOTNOTE                34     EBCDIC

130I     ORDER LOCAL DATA:

         LABEL:    DESCRIPTION                       BYTES: TYPE:

     1:  OID       ORDER ID                              8     EBCDIC
     2:  OCNT      ORDER COUNTER                         2     BINARY
     3:  ORNO      ORDER RELATIVE NUMBER                 2     BINARY
     4:  OTCNT     ORDER TRANSACTION COUNT               2     BINARY
     5:  OQSTG     ORDER QUANTITY STAGED                 2     BINARY
     6:  OQNSTG    ORDER QUANTITY NOT STAGED             2     BINARY
     7:  OQNPKD    ORDER QUANTITY NOT PICKED             2     BINARY
     8:  OQISORT   ORDER QUANTITY IN SORTATION           2     BINARY
     9:  OQXRP     ORDER QUANTITY EXCESS REPACK          2     BINARY
    10:  OQSTO     ORDER QUANTITY STOCK OUT              2     BINARY
    11:  OQMIS     ORDER QUANTITY MIS-SORT               2     BINARY
    12:  OPCOM     ORDER QUANTITY PERCENT COMPLETE       8     BINARY
    13:  OIPM      IPM BUFFER ADDRESS                    2     BINARY
    14:  OSRB      SYSCOM RECORD BUFFER ADDRESS          2     BINARY
    15:  OPANIC1   PANIC CODE 1                          2     BINARY
    16:  OPANIC2   PANIC CODE 2                          2     BINARY
    17:  OPANIC3   PANIC CODE 3                          2     BINARY
    18:  OHDR1     ORDER REPORT HEADER                  82     EBCDIC
    19:  OHDR2     ORDER REPORT HEADER                  82     EBCDIC
    20:  ODTL      ORDER REPORT DETAIL INFORMATION      80     EBCDIC

140I     TRANSACTION LOCAL DATA:

         LABEL:    DESCRIPTION:                      BYTES: TYPE:

     1:  TCNT      TRANSACTION COUNTER                   2     BINARY
     2:  TID       TRANSACTION ID                        8     BINARY
     3:  TSTATUS   TRANSACTION STATUS                    2     BINARY
     4:  TRON      TRANSACTION RELATIVE ORDER NUMBER     2     BINARY
     5:  TPROD     TRANSACTION PRODUCT ID                6     EBCDIC
     6:  TSOURCE   TRANSACTION SOURCE                    6     EBCDIC
     7:  TDEST     TRANSACTION DESTINATION               2     BINARY
     8:  TFBLK     TRANSACTION FILE BLOCK NUMBER         2     BINARY
     9:  TFOFF     TRANSACTION FILE ENTRY OFFSET         2     BINARY
    10:  TFRS      FILE RECORD SIZE                      2     BINARY
    11:  TFBF      TRANSACTION FILE BLOCKING FACTOR      2     BINARY
    12:  TIPM      IPM BUFFER ADDRESS                    2     BINARY
    13:  TSRB      SYSCOM RECORD BUFFER ADDRESS          2     BINARY
    14:  TPANIC1   PANIC CODE 1                          2     BINARY
    15:  TPANIC2   PANIC CODE 2                          2     BINARY
    16:  TPANIC3   PANIC CODE 3                          2     BINARY
    17:  TESTBL    TRANSACTION ENGLISH STATUS TABLE     65     EBCDIC
    18:  THDR1     TRANSACTION REPORT HEADER            64     EBCDIC
    19:  THDR2     TRANSACTION REPORT HEADER            78     EBCDIC
    20:  TDTL      TRANSACTION DETAIL INFORMATION       74     EBCDIC

150I     FIND BATCH CALL: OICCFB

         LABEL:    DESCRIPTION:                      BYTES: TYPE:
```

```
INPUT:

 1:  BRDA       RESIDENT DIRECTORY ADDRESS            2      BINARY
 2:  BRDES      RESIDENT DIRECTORY ENTRY SIZE         2      BINARY
 3:  FLGDEF     LOCA FLAG WORD                        2      BINARY
 4:  BMAX       MAXIMUM BATCHES ALLOWED               2      BINARY
 5:  BCNT       BATCH COUNTER TO START TABLE          2      BINARY
                SEARCH

LOCAL:

 1:  SAVE.1     TEMPORARY SAVE #1                     2      BINARY

OUTPUT:

 1:  TFLG       TEMPORARY FLAG                        2      BINARY
 2:  SAVE.2     TEMPORARY SAVE #2                     2      BINARY

OUTPUT:

 1:  BID        BATCH ID                              3      EBCDIC
 2:  FLGDEF     UPDATED LOCAL FLAG WORD               2      BINARY
 3:  BCNT       UPDATED BATCH COUNTER                 2      BINARY

1601    GET BATCH CALL: DICCGB

     LABEL:     DESCRIPTION:                      BYTES: TYPE:

INPUT:

 1:  BID        BATCH ID                              3      EBCDIC
 2:  BIPM       IPM BUFFER ADDRESS                    2      BINARY
 3:  BSRB       SYSCOM RECORD BUFFER ADDRESS          2      BINARY
 4:  BPANIC1    BAD CALL CODE PANIC CODE              2      BINARY
 5:  BPANIC2    BAD RETURN CODE PANIC CODE            2      BINARY
 6:  FLGDEF     LOCAL FLAG WORD                       2      BINARY

LOCAL:

 1:  SAVE.1     TEMPORARY SAVE #1                     2      BINARY

OUTPUT:

 1:  BSTATUS    BATCH STATUS                          2      BINARY
 2:  BHDR       BATCH HEADER                         50      EBCDIC
 3:  BOCNT      BATCH ORDER COUNTER                   2      BINARY
 4:  BTCNT      BATCH TRANSACTION COUNTER             2      BINARY
 5:  PANIC      UPDATED PANIC WORK AREA               2      BINARY
 6:  FLGDEF     UPDATED LOCAL FLAG WORD               2      BINARY

1701    FIND ORDER CALL: DICCFO

     LABEL:     DESCRIPTION                       BYTES: TYPE:

 1:  OIPM       IPM BUFFER ADDRESS                    2      BINARY
 2:  BID        BATCH ID                              3      EBCDIC
 3:  OCNT       ORDER NUMBER                          2      BINARY
 4:  OSRB       SYSCOM RECORD BUFFER ADDRESS          2      BINARY
 5:  FLGDEF     LOCAL FLAG WORD                       2      BINARY
 6:  OPANIC1    BAD CALL CODE PANIC CODE              2      BINARY
 7:  OPANIC2    BAD RELATIVE RECORD PANIC CODE        2      BINARY

LOCAL:

 1:  SAVE.1     TEMPORARY SAVE #1                     2      BINARY

OUTPUT:

 1:  OID        ORDER ID                              6      EBCDIC
 2:  ORNO       ORDER RELATIVE NUMBER                 2      BINARY
 3:  OQSTB      ORDER QUANTITY STAGED                 2      BINARY
 4:  OQNPKD     ORDER QUANTITY NOT PICKED             2      BINARY
 5:  OQISORT    ORDER QUANTITY IN SORTATION           2      BINARY
 6:  OQXRP      ORDER QUANTITY EXCESS REPACK          2      BINARY
```

```
   7:  OQSTO      ORDER QUANTITY STOCK OUT               2    BINARY
   8:  OQMIS      ORDER QUANTITY MIS-SORT                2    BINARY
   9:  FLGDEF     UPDATED LOCAL FLAG WORD                2    BINARY
  10:  OCNT       UPDATED ORDER NUMBER                   2    BINARY
  11:  PANIC      UPDATED PANIC WORK AREA                2    BINARY

180I   GET ORDER CALL: OICCGO

       LABEL:     DESCRIPTION:                       BYTES:  TYPE:

INPUT:

   1:  OIPM       IPM BUFFER ADDRESS                     2    BINARY
   2:  BID        BATCH ID                               3    EBCDIC
   3:  OID        ORDER ID                               6    EBCDIC
   4:  OSRB       SYSCOM RECORD BUFFER ADDRESS           2    BINARY
   5:  FLGDEF     LOCAL FLAG WORD                        2    BINARY
   6:  OPANIC1    BAD CALL CODE PANIC CODE               2    BINARY
   7:  OPANIC2    BAD RETURN CODE PANIC CODE             2    BINARY

LOCAL:

   1:  SAVE.1     TEMPORARY SAVE #1                      2    BINARY
   2:  BNRTXT     BATCH NO LONGER THERE MESSAGE         50    EBCDIC
   3:  ONTXT      ORDER NOT ON FILE MESSAGE             32    EBCDIC

OUTPUT:

   1:  OID        ORDER ID                               6    EBCDIC
   2:  ORNO       ORDER RELATIVE NUMBER                  2    BINARY
   3:  OQSTG      ORDER QUANTITY STAGED                  2    BINARY
   4:  OQNPKD     ORDER QUANTITY NOT PICKED              2    BINARY
   5:  OQISORT    ORDER QUANTITY IN SORTATION            2    BINARY
   6:  OQXRP      ORDER QUANTITY EXCESS REPACK           2    BINARY
   7:  OQSTO      ORDER QUANTITY STOCK OUT               2    BINARY
   8:  OQMIS      ORDER QUANTITY MIS-SORT                2    BINARY
   9:  FLGDEF     UPDATED LOCAL FLAG WORD                2    BINARY
  10:  PANIC      UPDATED PANIC WORK AREA                2    BINARY

190I   FIND TRANSACTION CALL: OICCFT

       LABEL:     DESCRIPTION                        BYTES:  TYPE:

INPUT:

   1:  TCNT       TRANSCTION COUNTER TO START ACCESS     2    BINARY
   2:  BTCNT      BATCH TRANSACTION COUNTER              2    BINARY
   3:  TSBB       SYSCOM BLOCK BUFFER ADDRESS            2    BINARY
   4:  TFOFF      TRANSACTION FILE ENTRY OFFSET          2    BINARY
   5:  ORNO       ORDER RELATIVE NUMBER                  2    BINARY
   6:  FLGDEF     LOCAL FLAG WORD                        2    BINARY

LOCAL:

   1:  T1FLG      TEMPORARY OK FLAG                      2    BINARY
   2:  T2FLG      TEMPOARY ORDER SEQUENCE FLAG           2    BINARY
   3:  SAVE.2     TEMPORARY SAVE #2                      2    BINARY

OUTPUT:

   1:  TID        TRANSACTION ID                         4    BINARY
   2:  TSTATUS    TRANSACTION STATUS                     2    BINARY
   3:  TRON       TRANSACTION RELATIVE ORDER NUMBER      2    BINARY
   4:  TPROD      TRANSACTION PRODUCT ID                 6    EBCDIC
   5:  TSOURCE    TRANSACTION SOURCE                     6    EBCDIC
   6:  TDEST      TRANSACTION DESTINATION                2    BINARY
   7:  FLGDEF     UPDATED LOCAL FLAG WORD                2    BINARY
   8:  TCNT       UPDATED TRANSACTION COUNTER            2    BINARY

200I   SEQUENTIAL TRANSACTION CALL: OICCST

       LABEL:     DESCRIPTION:                       BYTES:  TYPE:
```

```
INPUT:

 1:  TCNT      TRANSACTION COUNTER TO ACCESS FILE 2     BINARY
 2:  TFBF      TRANSACTION FILE BLOCKING FACTOR   2     BINARY
 3:  TFOFF     TRANSACTION FILE ENTRY OFFSET      2     BINARY
 4:  TFRS      TRANSACTION FILE RECORD SIZE       2     BINARY
 5:  TFBLK     TRANSACTION FILE BLOCK NUMBER      2     BINARY
 6:  TIPM      IPM BUFFER ADDRESS                 2     BINARY
 7:  BID       BATCH ID                           3     EBCDIC
 8:  SBB       SYSCOM BLOCK BUFFER ADDRESS        2     BINARY
 9:  TPANIC1   BAD CALL CODE PANIC CODE           2     BINARY
10:  TPANIC2   BAD BLOCK NUMBER PANIC CODE        2     BINARY
11:  TPANIC3   BAD RETURN CODE PANIC CODE         2     BINARY
12:  BOCNT     BATCH ORDER COUNT                  2     BINARY
13:  BTCNT     BATCH TRANSACTION COUNT            2     BINARY

LOCAL:

 1:  TMP1      TEMPORARY WORK AREA                2     BINARY
 2:  SAVE.1    TEMPORARY SAVE #1                  2     BINARY
 3:  SAVE.2    TEMPORARY SAVE #2                  2     BINARY
 4:  DATBUF    TRANSACTION SECTOR BUFFER        256     BINARY

OUTPUT:

 1:  TCNT      UPDATED TRANSACTION COUNTER        2     BINARY
 2:  TFBLK     UPDATED FILE BLOCK NUMBER          2     BINARY
 3:  SBB       UPDATED SYSCOM BLOCK BUFFER ADDR.  2     BINARY
 4:  TSBB      UPDATED TRANSACTION BLOCK BUFR     2     BINARY
 5:  PANIC     UPDATED PANIC WORK AREA            2     BINARY
 6:  FLGDEF    UPDATED LOCAL FLAG WORD            2     BINARY
 7:  OCNT      UPDATED ORDER COUNTER              2     BINARY

2101     GET TRANSACTION CALL: DICCGT

         LABEL:    DESCRIPTION:                    BYTES: TYPE:

INPUT:

 1:  TIPM      IPM BUFFER ADDRESS                 2     BINARY
 2:  TID       TRANSACTION ID                     4     BINARY
 3:  TSRB      SYSCOM RECORD BUFFER ADDRESS       2     BINARY
 4:  TPANIC1   BAD CALL CODE PANIC CODE           2     BINARY
 6:  TPANIC2   BAD RETURN CODE PANIC CODE         2     BINARY
 7:  FLGDEF    LOCAL FLAG WORD                    2     BINARY

LOCAL:

 1:  SAVE.1    TEMPORARY SAVE #1                  2     BINARY

OUTPUT:

 1:  TSTATUS   TRANSACTION STATUS                 2     BINARY
 2:  TRON      TRANSACTION RELATIVE ORDER NUMBER  2     BINARY
 3:  TPROD     TRANSACTIONPRODUCT ID              6     EBCDIC
 4:  TSOURCE   TRANSACTION SOURCE                 6     EBCDIC
 5:  TDEST     TRANSACTION DESTINATION            2     BINARY
 6:  PANIC     UPDATED PANIC WORK AREA            2     BINARY
 7:  FLGDEF    UPDATED LOCAL FLAG WORD            2     BINARY

2201     READ BATCH CALL: DICCRB

         LABEL:    DESCRIPTION:                    BYTES: TYPES:

INPUT:

 1:  DCMD      DISKETTE COMMAND WORD              2     BINARY
 2:  TEMP      TEMPORARY WORK AREA              2-8     BINARY
 3:  DPANIC1   BAD CALL CODE PANIC CODE           2     BINARY
 4:  DPANIC2   BAD RETURN CODE PANIC CODE         2     BINARY
 5:  BSRB      SYSCOM RECORD BUFFER               2     BINARY
 6:  FLGDEF    LOCAL FLAG WORD                    2     BINARY
```

```
     LOCAL:

       1:  RBTXT1     FORMAT ERROR MESSAGE              28     EBCDIC
       2:  RBTXT1     I/O ERROR MESSAGE                 34     EBCDIC

     OUTPUT:

       1:  BSRB       UPDATED RECORD BUFFER              2     BINARY
       2:  PANIC      UPDATED PANIC WORK AREA            2     BINARY
       3:  FLGDEF     UPDATED LOCAL FLAG WORD            2     BINARY

230I WRITE BATCH CALL: OICCWB

           LABEL:     DESCRIPTION:                   BYTES:  TYPE:

     INPUT:

       1:  DCMD       DISKETTE COMMAND WORD              2     BINARY
       2:  OIWRB      PROGRAM TASK WORD ADDRESS          2     BINARY
       3:  DPANIC1    BAD CALL CODE PANIC CODE           2     BINARY
       4:  DPANIC2    BAD RETURN CODE PANIC CODE         2     BINARY
       5:  BID        BATCH ID                           3     EBCDIC
       6:  BHDR       BATCH HEADER                      50     EBCDIC
       7:  TID        TRANSACTION ID                     4     BINARY
       8:  OID        ORDER ID                           6     EBCDIC
       9:  TPROD      TRANSACTION PRODUCT ID             6     EBCDIC
      10:  TDEST      TRANSACTION DESTINATION            2     BINARY
      11:  TSOURCE    TRANSACTION SOURCE                 6     EBCDIC
      12:  TSTATUS    TRANSACTION STATUS                 2     BINARY
      13:  FLGDEF     LOCAL FLAG WORD                    2     BINARY

     LOCAL:

       1:  TEMP       TEMPORARY WORK AREA                2     BINARY
       2:  SAVE.1     TEMPORARY SAVE #1                  2     BINARY
       3:  WBTXT1     I/O ERROR MESSAGE                 34     EBCDIC

     OUTPUT:

       1:  PANIC      UPDATED PANIC WORK AREA            2     BINARY
       2:  TCNT       UPDATED TRANSACTION COUNTER        2     BINARY
       3:  FLGDEF     UPDATED LOCAL FLAG WORD            2     BINARY

240I ADD BATCH CALL: OICCAB

           LABEL:     DESCRIPTION:                   BYTES:  TYPE:

     INPUT:

       1:  BIPM       IPM BUFFER ADDRESS                 2     BINARY
       2:  BID        BATCH ID                           3     EBCDIC
       3:  BHDR       BATCH HEADER                      50     EBCDIC
       4:  BSRB       SYSCOM RECOD BUFFER ADDRESS        2     BINARY
       5:  BPANIC1    BATCH ALREADY ADDING PANIC CODE    2     BINARY
       6:  BPANIC2    BAD CALL CODE PANIC CODE           2     BINARY
       7:  BPANIC3    BAD RETURN CODE PANIC CODE         2     BINARY
       8:  FLGDEF     LOCAL FLAG WORD                    2     BINARY

     LOCAL:

       1:  SAVE.1     TEMPORARY SAVE #1                  2     BINARY
       2:  ABTXT1     SPACE EXHAUSTED MESSAGE           34     EBCDIC
       3:  ABTXT2     ALREADY ON FILE MESSAGE           32     EBCDIC

     OUTPUT:

       1:  PANIC      UPDATED PANIC WORK AREA            2     BINARY
       2:  FLGDEF     UPDATED LOCAL FLAG WORD            2     BINARY

250I ADD TRANSACTION CALL: OICCAT

           LABEL:     DESCRIPTION:                   BYTES:  TYPE:
```

```
INPUT:

  1:  TIPM       IPM BUFFER ADDRESS                     2     BINARY
  2:  TSRB       SYSCOM RECORD BUFFER ADDRESS           2     BINARY
  3:  TPANIC1    BAD CALL CODE PANIC CODE               2     BINARY
  4:  TPANIC2    BAD RETURN CODE PANIC CODE             2     BINARY
  5:  TID        TRANSACTION ID                         4     BINARY
  6:  OID        ORDER ID                               6     EBCDIC
  7:  TPROD      TRANSACTION PRODUCT ID                 6     EBCDIC
  8:  TDEST      TRANSACTION DESTINATION                2     BINARY
  9:  TSOURCE    TRANSACTION SOURCE                     6     EBCDIC
 10:  TSTATUS    TRANSACTION STATUS                     2     BINARY
 11:  FLGDEF     LOCAL FLAG WORD                        2     BINARY

LOCAL:

  1:  TFLG       TEMPORARY FLAG WORD                    2     BINARY
  2:  SAVE.1     TEMPORARY SAVE #1                      2     BINARY
  3:  ATTXT1     ALREADY ON FILE MESSAGE               36     EBCDIC
  4:  ATTXT2     TRANSACTION SPACE EXHAUSTED MSG       40     EBCDIC
  5:  ATTXT3     ORDER SPACE EXHAUSTED MESSAGE         34     EBCDIC

OUTPUT:

  1:  PANIC      UPDATED PANIC WORK AREA                2     BINARY
  2:  FLGDEF     UPDATED LOCAL FLAG WORD                2     BINARY

260I      OPERATOR INTERFACE CONTROL LOCAL DATA:

      LABEL:     DESCRIPTION:                       BYTES:  TYPE:

  1:  OIEND      END ECB OF OPERATOR INTERFACE          3     BINARY
  2:  MSGLDER    LOAD ERROR MESSAGE                    26     EBCDIC
  3:  MSGDIU     DISKETTE IN USE MESSAGE               30     EBCDIC
  4:  MSGRTRY    RETRY COMMAND MESSAGE                 22     EBCDIC
  5:  PANIC      PANIC WORK AREA                        2     BINARY
  6:  OITSK1CD   LOAD TASK #1 CODE                      2     BINARY
  7:  OITSK2CD   LOAD TASK #2 CODE                      2     BINARY
  8:  OITSK3CD   LOAD TASK #3 CODE                      2     BINARY
  9:  OITSK4CD   LOAD TASK #4 CODE                      2     BINARY
 10:  LORES      LOAD PROGRAM QUEUE CONTROL BLOCK      10     BINARY

270I      WORK SCHEDULE REPORT LOCAL DATA:

      LABEL:     DESCRIPTION:                       BYTES:  TYPE:

  1:  FLGDEF     LOCAL FLAG WORD                        2     BINARY
  2:  IPM        IPM BUFFER ADDRES                      2     BINARY
  3:  IPMPC1     IPM PANIC CODE 1                       2     BINARY
  4:  IPMPC2     IPM PANIC CODE 2                       2     BINARY
  5:  SRB        SYSCOM RECORD BUFFER ADDRESS           2     BINARY
  6:  SRBPC1     SRB PANIC CODE 1                       2     BINARY
  7:  SRBPC2     SRB PANIC CODE 2                       2     BINARY
  8:  TIME       TABLE:HH,MM,SS,MO,DA,YR               12     BINARY
  9:  PAGECNT    REPORT PAGE COUNT                      2     BINARY
 10:  LINECNT    REPORT LINE COUNT                      2     BINARY
 11:  TEMP       TEMPORARY WORK AREA                    4     BINARY
 12:  PANIC      PANIC CODE WORK AREA                   2     BINARY
 13:  MSGWSR     BANNER                                22     EBCDIC
 14:  FLG1       AUXILIARY FLAG WORD                    2     BINARY
 15:  CRTCNT     CRT MAXIMUM SCREEN SIZE                2     BINARY

280I      BATCH STATUS REPORT LOCAL DATA:

      LABEL:     DESCRIPTION:                       BYTES:  TYPE:

  1:  FLGDEF     LOCAL FLAG WORD                        2     BINARY
  2:  IPM        IPM BUFFER ADDRES                      2     BINARY
  3:  IPMPC1     IPM PANIC CODE 1                       2     BINARY
  4:  IPMPC2     IPM PANIC CODE 2                       2     BINARY
  5:  SRB        SYSCOM RECORD BUFFER ADDRESS           2     BINARY
  6:  SRBPC1     SRB PANIC CODE 1                       2     BINARY
  7:  SRBPC2     SRB PANIC CODE 2                       2     BINARY
  8:  TIME       TABLE:HH,MM,SS,MO,DA,YR               12     BINARY
```

| | | | | |
|---|---|---|---|---|
| 9: | PAGECNT | REPORT PAGE COUNT | 2 | BINARY |
| 10: | LINECNT | REPORT LINE COUNT | 2 | BINARY |
| 11: | CRTCNT | CRT MAXIMUM SCREEN SIZE | 2 | BINARY |
| 12: | PRINTCNT | PRINTER MAXIMUM LINE SIZE | 2 | BINARY |
| 13: | TEMP | TEMPORARY WORK AREA | 10 | BINARY |
| 14: | PANIC | PANIC CODE WORK AREA | 2 | BINARY |
| 15: | MSGBSR | BANNER | 22 | EBCDIC |

290I ORDER STATUS REPORT LOCAL DATA:

| | LABEL: | DESCRIPTION: | BYTES: | TYPE: |
|---|---|---|---|---|
| 1: | FLGDEF | LOCAL FLAG WORD | 2 | BINARY |
| 2: | IPM | IPM BUFFER ADDRES | 2 | BINARY |
| 3: | IPMPC1 | IPM PANIC CODE 1 | 2 | BINARY |
| 4: | IPMPC2 | IPM PANIC CODE 2 | 2 | BINARY |
| 5: | SRB | SYSCOM RECORD BUFFER ADDRESS | 2 | BINARY |
| 6: | SRBPC1 | SRB PANIC CODE 1 | 2 | BINARY |
| 7: | SRBPC2 | SRB PANIC CODE 2 | 2 | BINARY |
| 8: | SBB | SYSCOM BLOCK BUFFER ADDRESS | 2 | BINARY |
| 9: | SBBPC1 | SBB PANIC CODE 1 | 2 | BINARY |
| 10: | RTCNT | REPORT TRANSACTION COUNTER | 2 | BINARY |
| 11: | TIME | TABLE:HH,MM,SS,MO,DA,YR | 12 | BINARY |
| 12: | PAGECNT | REPORT PAGE COUNT | 2 | BINARY |
| 13: | LINECNT | REPORT LINE COUNT | 2 | BINARY |
| 14: | CRTCNT | CRT MAXIMUM SCREEN SIZE | 2 | BINARY |
| 15: | PRINTCNT | PRINTER MAXIMUM LINE SIZE | 2 | BINARY |
| 16: | TEMP | TEMPORARY WORK AREA | 10 | BINARY |
| 17: | PANIC | PANIC CODE WORK AREA | 2 | BINARY |
| 18: | MSGOSR | BANNER | 22 | EBCDIC |
| 19: | MSGABORT | REPORT ABORTED | 48 | EBCDIC |

300I TRANSACTION STATUS REPORT LOCAL DATA:

| | LABEL: | DESCRIPTION: | BYTES: | TYPE: |
|---|---|---|---|---|
| 1: | FLGDEF | LOCAL FLAG WORD | 2 | BINARY |
| 2: | IPM | IPM BUFFER ADDRES | 2 | BINARY |
| 3: | IPMPC1 | IPM PANIC CODE 1 | 2 | BINARY |
| 4: | IPMPC2 | IPM PANIC CODE 2 | 2 | BINARY |
| 5: | SRB | SYSCOM RECORD BUFFER ADDRESS | 2 | BINARY |
| 6: | SRBPC1 | SRB PANIC CODE 1 | 2 | BINARY |
| 7: | SRBPC2 | SRB PANIC CODE 2 | 2 | BINARY |
| 8: | TIME | TABLE:HH,MM,SS,MO,DA,YR | 12 | BINARY |
| 9: | PAGECNT | REPORT PAGE COUNT | 2 | BINARY |
| 10: | LINECNT | REPORT LINE COUNT | 2 | BINARY |
| 11: | TEMP | TEMPORARY WORK AREA | 12 | BINARY |
| 12: | PANIC | PANIC CODE WORK AREA | 2 | BINARY |
| 13: | MSGTSR | BANNER | 28 | EBCDIC |
| 14: | MSGFTN | TRANSACTION NOT ON FILE | 32 | EBCDIC |
| 15: | CRTCNT | CRT MAXIMUM SCREEN SIZE | 2 | BINARY |
| 16: | DZERO | DWORD CONSTANT 0 | 4 | BINARY |
| 17: | TRANSMAX | DWORD CONSTANT 999999 | 4 | BINARY |

310I SORT TRANSLATION REPORT LOCAL DATA:

| | LABEL: | DESCRIPTION: | BYTES: | TYPE: |
|---|---|---|---|---|
| 1: | TIME | TABLE:HH,MM,SS,MO,DA,YR | 12 | BINARY |
| 2: | PAGECNT | REPORT PAGE COUNT | 2 | BINARY |
| 3: | TEMP | TEMPORARY WORK AREA | 10 | BINARY |
| 4: | MSGSTR | BANNER | 26 | EBCDIC |
| 5: | SLCNT | SORT LINE COUNT | 2 | BINARY |
| 6: | MAXSL | MAXIMUM SORT LINES | 2 | BINARY |
| 7: | SLRBASE | ROW SORT LINE BASE NUMBER | 2 | BINARY |
| 8: | ROWBASE | ROW SORT LINE BASE ADDRESS | 2 | BINARY |
| 9: | SLCBASE | COLUMN SORT LINE BASE NUMBER | 2 | BINARY |
| 10: | COLBASE | COLUMN SORT LINE BASE ADDRESS | 2 | BINARY |
| 11: | SHDR1 | REPORT HEADER LINE 1 | 82 | EBCDIC |
| 12: | SHDR2 | REPORT HEADER LINE 2 | 16 | EBCDIC |
| 13: | SHDR3 | REPORT HEADER LINE 3 | 16 | EBCDIC |
| 14: | SDTL | REPORT DETAIL LINE | 16 | EBCDIC |
| 15: | FLGDEF | LOCAL FLAG WORD | 2 | BINARY |
| 16: | CRTCNT | CRT MAXIMUM SCREEN SIZE | 2 | BINARY |

320I READ BATCH LOCAL DATA:

| | LABEL: | DESCRIPTION: | BYTES: | TYPE: |
|---|---|---|---|---|
| 1: | FLGDEF | LOCAL FLAG WORD | 2 | BINARY |
| 2: | IPM | IPM BUFFER ADDRES | 2 | BINARY |
| 3: | IPMPC1 | IPM PANIC CODE 1 | 2 | BINARY |
| 4: | IPMPC2 | IPM PANIC CODE 2 | 2 | BINARY |
| 5: | SRB | SYSCOM RECORD BUFFER ADDRESS | 2 | BINARY |
| 6: | SRBPC1 | SRB PANIC CODE 1 | 2 | BINARY |
| 7: | SRBPC2 | SRB PANIC CODE 2 | 2 | BINARY |
| 8: | TEMP | TEMPORARY WORK AREA | 8 | BINARY |
| 9: | PANIC | PANIC CODE WORK AREA | 2 | BINARY |
| 10: | DCMD | DISKETTE COMMAND WORD | 2 | BINARY |
| 11: | DPANIC1 | DISKETTE PANIC CODE 1 | 2 | BINARY |
| 12: | DPANIC2 | DISKETTE PANIC CODE 2 | 2 | BINARY |
| 13: | DZERO | DWORD CONSTANT 0 | 4 | BINARY |
| 14: | D999999 | DWORD CONSTANT 999999 | 4 | BINARY |
| 15: | TVERCNT | TRANS. VALIDATION ERROR ADDR. CNT. | 2. | BINARY |
| 16: | FLAG | DISKETTE MOUNTED FLAG | 2 | BINARY |
| 17: | COMMA | CONSTANT "," | 2 | EBCDIC |
| 18: | MSGTID | TRANSACTION NO. | 18 | EBCDIC |
| 19: | MSGDEST | DESTINATION | 14 | EBCDIC |
| 20: | MSGSTAT | STATUS | 8 | EBCDIC |
| 21: | MSGTVER | VALIDATION ERROR | 38 | EBCDIC |

330I WRITE BATCH LOCAL DATA:

| | LABEL: | DESCRIPTION: | BYTES: | TYPE: |
|---|---|---|---|---|
| 1: | FLGDEF | LOCAL FLAG WORD | 2 | BINARY |
| 2: | IPM | IPM BUFFER ADDRES | 2 | BINARY |
| 3: | IPMPC1 | IPM PANIC CODE 1 | 2 | BINARY |
| 4: | IPMPC2 | IPM PANIC CODE 2 | 2 | BINARY |
| 5: | SBB | SYSCOM BLOCK BUFFER ADDRESS | 2 | BINARY |
| 6: | SBBPC1 | SBB PANIC CODE 1 | 2 | BINARY |
| 7: | SBBPC2 | SBB PANIC CODE 2 | 2 | BINARY |
| 8: | TEMP | TEMPORARY WORK AREA | 8 | BINARY |
| 9: | PANIC | PANIC CODE WORK AREA | 2 | BINARY |
| 10: | DCMD | DISKETTE COMMAND WORD | 2 | BINARY |
| 11: | DPANIC1 | DISKETTE PANIC CODE 1 | 2 | BINARY |
| 12: | DPANIC2 | DISKETTE PANIC CODE 2 | 2 | BINARY |
| 13: | ORTABLE | ORDER REFERENCE TABLE | 210 | EBCIDIC |
| 14: | FLAG | EXTRA FLAG WORD | 2 | BINARY |
| 15: | SRB | SYSCOM RECORD BUFFER ADDRESS | 2 | BINARY |
| 16: | SRBPC1 | SRB PANIC CODE 1 | 2 | BINARY |
| 17: | SRBPC2 | SRB PANIC CODE 2 | 2 | BINARY |

340I START BATCH LOCAL DATA:

| | LABEL: | DESCRIPTION: | BYTES: | TYPE: |
|---|---|---|---|---|
| 1: | FLGDEF | LOCAL FLAG WORD | 2 | BINARY |
| 2: | IPM | IPM BUFFER ADDRES | 2 | BINARY |
| 3: | IPMPC1 | IPM PANIC CODE 1 | 2 | BINARY |
| 4: | IPMPC2 | IPM PANIC CODE 2 | 2 | BINARY |
| 5: | SRB | SYSCOM RECORD BUFFER ADDRESS | 2 | BINARY |
| 6: | SRBPC1 | SRB PANIC CODE 1 | 2 | BINARY |
| 7: | SRBPC2 | SRB PANIC CODE 2 | 2 | BINARY |
| 8: | TEMP | TEMPORARY WORK AREA | 8 | BINARY |
| 9: | PANIC | PANIC CODE WORK AREA | 2 | BINARY |
| 10: | KAOBFQ | ALARM BUFFER QUEUE ADDRESS | 2 | BINARY |
| 11: | KAOALQ | ALARM QUEUE ADDRESS | 2 | BINARY |
| 12: | ALARM | ALARM CODE | 2 | BINARY |
| 13: | ALARMPC1 | ALARM PANIC CODE 1 | 2 | BINARY |
| 14: | ALARMPC2 | ALARM PANIC CODE 2 | 2 | BINARY |

350I END BATCH LOCAL DATA:

| | LABEL: | DESCRIPTION: | BYTES: | TYPE: |
|---|---|---|---|---|
| 1: | FLGDEF | LOCAL FLAG WORD | 2 | BINARY |
| 2: | IPM | IPM BUFFER ADDRES | 2 | BINARY |

|       |     |          |                              | Bytes | Type   |          |
|-------|-----|----------|------------------------------|-------|--------|----------|
|       | 3:  | IPMPC1   | IPM PANIC CODE 1             | 2     | BINARY | 00013030 |
|       | 4:  | IPMPC2   | IPM PANIC CODE 2             | 2     | BINARY | 00013040 |
|       | 5:  | SRB      | SYSCOM RECORD BUFFER ADDRESS | 2     | BINARY | 00013050 |
|       | 6:  | SRBPC1   | SRB PANIC CODE 1             | 2     | BINARY | 00013060 |
|       | 7:  | SRBPC2   | SRB PANIC CODE 2             | 2     | BINARY | 00013070 |
|       | 8:  | TEMP     | TEMPORARY WORK AREA          | 8     | BINARY | 00013080 |
|       | 9:  | PANIC    | PANIC CODE WORK AREA         | 2     | BINARY | 00013090 |
|       | 10: | KAOBFQ   | ALARM BUFFER QUEUE ADDRESS   | 2     | BINARY | 00013100 |
|       | 11: | KAOALQ   | ALARM QUEUE ADDRESS          | 2     | BINARY | 00013110 |
|       | 12: | ALARM    | ALARM CODE                   | 2     | BINARY | 00013120 |
|       | 13: | ALARMPC1 | ALARM PANIC CODE 1           | 2     | BINARY | 00013130 |
|       | 14: | ALARMPC2 | ALARM PANIC CODE 2           | 2     | BINARY | 00013140 |

3601 DELETE BATCH LOCAL DATA:

|     |          |                                |    |        |          |
|-----|----------|--------------------------------|----|--------|----------|
|     | LABEL:   | DESCRIPTION:                   | BYTES: | TYPE: |        |
| 1:  | FLGDEF   | LOCAL FLAG WORD                | 2  | BINARY | 00013200 |
| 2:  | IPM      | IPM BUFFER ADDRESS #1          | 2  | BINARY | 00013210 |
| 3:  | IPMPC1   | IPM PANIC CODE 1               | 2  | BINARY | 00013220 |
| 4:  | IPMPC2   | IPM PANIC CODE 2               | 2  | BINARY | 00013230 |
| 5:  | SRB      | SYSCOM RECORD BUFFER ADDRESS   | 2  | BINARY | 00013240 |
| 6:  | SRBPC1   | SRB PANIC CODE 1               | 2  | BINARY | 00013250 |
| 7:  | SRBPC2   | SRB PANIC CODE 2               | 2  | BINARY | 00013260 |
| 8:  | TEMP     | TEMPORARY WORK AREA            | 8  | BINARY | 00013270 |
| 9:  | PANIC    | PANIC CODE WORK AREA           | 2  | BINARY | 00013280 |
| 10: | IPM2     | IPM BUFFER ADDRESS #2          | 2  | BINARY | 00013290 |
| 11: | DBTABLE  | DELETION BATCH TABLE ADDRESS   | 2  | BINARY | 00013300 |
| 11: | BTCH     | RELATIVE BATCH NUMBER          | 2  | BINARY | 00013310 |
| 12: | ACTBAT   | ACTIVE BATCH FLAG WORD         | 2  | BINARY | 00013320 |
| 13: | QSTFLG   | QUESTIONED FLAG WORD           | 2  | BINARY | 00013330 |
| 14: | PRTFLG   | PRINT FLAG WORD                | 2  | BINARY | 00013340 |
| 15: | DMSG1    | BATCH NOT ON FILE              | 26 | EBCDIC | 00013350 |
| 16: | DMSG2    | BATCH MUST BE PENDING OR COMPLETE | 72 | EBCDIC | 00013360 |
| 17: | DMSG3    | NO CURRENT BATCH INFORMATION   | 36 | EBCDIC | 00013370 |
| 18: | DMSG4    | ALL CURRENT BATCHES ARE ACTIVE | 56 | EBCDIC | 00013380 |

3701 REROUTE SHIPPING LINE LOCAL DATA:

|     |        |                         |        |        |          |
|-----|--------|-------------------------|--------|--------|----------|
|     | LABEL: | DESCRIPTION:            | BYTES: | TYPE:  |          |
| 1:  | PANIC  | PANIC CODE WORK AREA    | 2      | BINARY | 00013440 |
| 2:  | STB    | SORT TRANSLATION BUFFER | 260    | BINARY | 00013450 |
| 3:  | TEMP   | TEMPORARY WORK AREA     | 2      | BINARY | 00013460 |
| 4:  | SAVE   | SAVE OLD SORT LINE      | 2      | BINARY | 00013470 |
| 5:  | NEWSL  | NEW SORT LINE ASSIGNMENT| 2      | BINARY | 00013480 |
| 6:  | SLTXT1 | INVALID SORT LINE       | 34     | EBCDIC | 00013490 |

3801 RESTORE SHIPPING LINE LOCAL DATA:

|     |        |                         |        |        |          |
|-----|--------|-------------------------|--------|--------|----------|
|     | LABEL: | DESCRIPTION:            | BYTES: | TYPE:  |          |
| 1:  | PANIC  | PANIC CODE WORK AREA    | 2      | BINARY | 00013550 |
| 2:  | STB    | SORT TRANSLATION BUFFER | 260    | BINARY | 00013560 |

3901 OPEN PSC COMMUNICATIONS LOCAL DATA:

|     |          |                      |        |        |          |
|-----|----------|----------------------|--------|--------|----------|
|     | LABEL:   | DESCRIPTION:         | BYTES: | TYPE:  |          |
| 1:  | OIPSCTX1 |                      | 38     | EBCDIC | 00013620 |
| 2:  | OIPSCTX2 |                      | 36     | EBCDIC | 00013630 |
| 3:  | PANIC    | PANIC CODE WORK AREA | 2      | BINARY | 00013640 |
| 4:  | PPANIC1  | PSC PANIC CODE 1     | 2      | BINARY | 00013650 |
| 5:  | PPANIC2  | PSC PANIC CODE 2     | 2      | BINARY | 00013660 |

4001 ASSIGN TRANSACTION STATUS LOCAL DATA:

|     |        |                    |        |        |          |
|-----|--------|--------------------|--------|--------|----------|
|     | LABEL: | DESCRIPTION:       | BYTES: | TYPE:  |          |
| 1:  | FLGDEF | LOCAL FLAG WORD    | 2      | BINARY | 00013720 |
| 2:  | IPM    | IPM BUFFER ADDRESS | 2      | BINARY | 00013730 |
| 3:  | IPMPC1 | IPM PANIC CODE 1   | 2      | BINARY | 00013740 |
| 4:  | IPMPC2 | IPM PANIC CODE 2   | 2      | BINARY | 00013750 |

|     |          |                              |        |        |          |
|-----|----------|------------------------------|--------|--------|----------|
| 5:  | SRB      | SYSCOM RECORD BUFFER ADDRESS | 2      | BINARY | 00013760 |
| 6:  | SRBPC1   | SRB PANIC CODE 1             | 2      | BINARY | 00013770 |
| 7:  | SRBPC2   | SRB PANIC CODE 2             | 2      | BINARY | 00013780 |
| 8:  | CRTCNT   | CRT MAXIMUM SCREEN SIZE      | 2      | BINARY | 00013790 |
| 9:  | LINECNT  | REPORT LINE COUNT            | 2      | BINARY | 00013800 |
| 10: | TEMP     | TEMPORARY WORK AREA          | 10     | BINARY | 00013810 |
| 11: | PANIC    | PANIC CODE WORK AREA         | 2      | BINARY | 00013820 |
| 12: | TMX      | END TRANSACTION RANGE ID     | 4      | BINARY | 00013830 |
| 13: | TNSTATUS | NEW TRANSACTION STATUS       | 2      | BINARY | 00013840 |
| 14: | MSGTNF   | TRANSACTION NOT FOUND        | 32     | EBCDIC | 00013850 |
| 15: | MSGTRE   | TRANSACTION RANGE ERROR      | 34     | EBCDIC | 00013860 |
| 16: | DZERO    | DWORD CONSTANT 0             | 4      | BINARY | 00013870 |
| 17: | DWONE    | DWORD CONSTANT 1             | 4      | BINARY | 00013880 |
| 18: | D999999  | DWORD CONSTANT 999999        | 4      | BINARY | 00013890 |

41OI  RECIRC LOCAL DATA:

| LABEL: | DESCRIPTION: | BYTES: | TYPE: |
|--------|--------------|--------|-------|
| 1: DIRECTXT | BANNER | 30 | EBCDIC |

42OI  HOLD LOCAL DATA:

| LABEL: | DESCRIPTION: | BYTES: | TYPE: |
|--------|--------------|--------|-------|
| 1: DIHLTXT | BANNER | 28 | EBCDIC |

43OI  BATCH VERIFICATION DISPLAY LAYOUT:

| REPORT FIELD: | FROM: | |
|---------------|-------|---|
| 1: DATE | LOCAL | TIME |
| 2: TIME | LOCAL | TIME |
| 3: PAGE | LOCAL | PAGECNT |
| 4: BATCH ID | 12OI | BID |
| 5: BATCH STATUS | 12OI | BSTATUS, BSTBL |
| 6: ORDER COUNT | 12OI | BOCNT |
| 7: TRANSACTION COUNT | 12OI | BTCNT |
| 8: HEADER INFORMATION | 12OI | BHDR |

\* SEE REPORT LAYOUT SHEET

44OI  TRANSACTION VERIFICATION DISPLAY LAYOUT:

| REPORT FIELD: | FROM: | |
|---------------|-------|---|
| 1: DATE | LOCAL | TIME |
| 2: TIME | LOCAL | TIME |
| 3: PAGE | LOCAL | PAGECNT |
| 4: TRANSACTION ID | 14OI | TID |
| 5: TRANSACTION STATUS | 14OI | TSTATUS |
| 6: PRODUCT ID | 14OI | TPROD |
| 7: SOURCE LOCATION | 14OI | TSOURCE |
| 8: DESTINATION | 14OI | TDEST |

\* SEE REPORT LAYOUT SHEET

45OI  CHANGE BATCH STATUS CALL: OICCB

LABEL:    DESCRIPTION:                       BYTES: TYPE:

INPUT:

| 1: | BIPM    | IPM BUFFER ADDRESS        | 2 | BINARY |
| 2: | BID     | BATCH ID                  | 3 | EBCDIC |
| 3: | BSTATUS | BATCH STATUS              | 2 | BINARY |
| 4: | BPANIC1 | BAD CALL CODE PANIC CODE  | 2 | BINARY |
| 5: | BPANIC2 | BAD STATUS PANIC CODE     | 2 | BINARY |
| 6: | BPANIC3 | BAD RETURN CODE PANIC CODE| 2 | BINARY |
| 7: | FLGDEF  | LOCAL FLAG WORD           | 2 | BINARY |

LOCAL:

|  |  |  |  |  |  |  |
|---|---|---|---|---|---|---|
|  | 1: | SAVE.1 | TEMPORARY SAVE #1 | 2 | BINARY | 00014490 |
|  | 2: | RNTXT | NOT ON FILE MESSAGE | 28 | EBCDIC | 00014500 |
|  |  |  |  |  |  | 00014510 |
|  | OUTPUT: |  |  |  |  | 00014520 |
|  |  |  |  |  |  | 00014530 |
|  | 1: | PANIC | UPDATED PANIC WORK AREA | 2 | BINARY | 00014540 |
|  | 2: | FLGDEF | UPDATED LOCAL FLAG WORD | 2 | BINARY | 00014550 |
|  |  |  |  |  |  | 00014560 |
| 46OI | WRITE SORT TRANSLATION TABLE CALL: OICCWS |  |  |  |  | 00014570 |
|  |  |  |  |  |  | 00014580 |
|  |  | LABEL: | DESCRIPTION | BYTES: | TYPE: | 00014590 |
|  |  |  |  |  |  | 00014600 |
|  | INPUT: |  |  |  |  | 00014610 |
|  |  |  |  |  |  | 00014620 |
|  | 1: | STB | SORT TRANSLATION BUFFER | 260 | BINARY | 00014630 |
|  | 2: | DS1 | DISK DATA SET | 2 | BINARY | 00014640 |
|  |  |  |  |  |  | 00014650 |
|  | LOCAL: |  |  |  |  | 00014660 |
|  |  |  |  |  |  | 00014670 |
|  | 1: | SAVE.2 | TEMPORARY SAVE #2 | 2 | BINARY | 00014680 |
|  |  |  |  |  |  | 00014690 |
| 47OI | HELP COMMAND LAYOUT: |  |  |  |  | 00014700 |
|  |  |  |  |  |  | 00014710 |
|  | * SEE REPORT LAYOUT SHEET |  |  |  |  | 00014720 |
|  |  |  |  |  |  | 00014730 |
| 48OI | GET IPM CALL: OICCGI |  |  |  |  | 00014740 |
|  |  |  |  |  |  | 00014750 |
|  | USER MUST DEFINE IN PROGRAM LOCAL DATA: |  |  |  |  | 00014760 |
|  |  |  |  |  |  | 00014770 |
|  |  | LABEL: | DESCRIPTION: | BYTES: | TYPE: | 00014780 |
|  |  |  |  |  |  | 00014790 |
|  | INPUT: |  |  |  |  | 00014800 |
|  |  |  |  |  |  | 00014810 |
|  | 1: | IPMPC1 | IPM BUFFER QUEUE EMPTY PANIC CODE | 2 | BINARY | 00014820 |
|  |  |  |  |  |  | 00014830 |
|  | OUTPUT: |  |  |  |  | 00014840 |
|  |  |  |  |  |  | 00014850 |
|  | 1: | IPM | IPM BUFFER ADDRESS | 2 | BINARY | 00014860 |
|  | 2: | PANIC | UPDATED PANIC WORK AREA | 2 | BINARY | 00014870 |
|  |  |  |  |  |  | 00014880 |
| 49OI | GET RECORD BUFFER CALL: OICCGR |  |  |  |  | 00014890 |
|  |  |  |  |  |  | 00014900 |
|  |  | LABEL: | DESCRIPTION: | BYTES: | TYPE: | 00014910 |
|  |  |  |  |  |  | 00014920 |
|  | INPUT: |  |  |  |  | 00014930 |
|  |  |  |  |  |  | 00014940 |
|  | 1: | SRBPC1 | SRB BUFFER QUEUE EMPTY PANIC CODE | 2 | BINARY | 00014950 |
|  |  |  |  |  |  | 00014960 |
|  | OUTPUT: |  |  |  |  | 00014970 |
|  |  |  |  |  |  | 00014980 |
|  | 1: | SRB | SYSCOM RECORD BUFFER ADDRESS | 2 | BINARY | 00014990 |
|  | 2: | PANIC | UPDATED PANIC WORK AREA | 2 | BINARY | 00015000 |
|  |  |  |  |  |  | 00015010 |
| 50OI | FREE IPM CALL: OICLFI |  |  |  |  | 00015020 |
|  |  |  |  |  |  | 00015030 |
|  |  | LABEL: | DESCRIPTION: | BYTES: | TYPE: | 00015040 |
|  |  |  |  |  |  | 00015050 |
|  | INPUT: |  |  |  |  | 00015060 |
|  |  |  |  |  |  | 00015070 |
|  | 1: | IPM | IPM BUFFER ADDRESS | 2 | BINARY | 00015080 |
|  | 2: | IPMPC2 | IPM BUFFER QUEUE FULL PANIC CODE | 2 | BINARY | 00015090 |
|  |  |  |  |  |  | 00015100 |
|  | LOCAL: |  |  |  |  | 00015110 |
|  |  |  |  |  |  | 00015120 |
|  | 1: | SAVE.2 | TEMPORARY SAVE #2 | 2 | BINARY | 00015130 |
|  |  |  |  |  |  | 00015140 |
|  | OUTPUT: |  |  |  |  | 00015150 |
|  |  |  |  |  |  | 00015160 |
|  | 1: | PANIC | UPDATED PANIC WORK AREA | 2 | BINARY | 00015170 |
|  |  |  |  |  |  | 00015180 |
| 51OI | FREE RECORD BUFFER CALL: OICCFR |  |  |  |  | 00015190 |
|  |  |  |  |  |  | 00015200 |
|  |  | LABEL: | DESCRIPTION: | BYTES: | TYPE: | 00015210 |
|  |  |  |  |  |  | 00015220 |

```
     INPUT:

      1:  SRB       SYSCOM RECORD BUFFER ADDRESS        2     BINARY
      2:  SRBPC2    SRB BUFFER QUEUE FULL PANIC CODE    2     BINARY

     LOCAL:

      1:  SAVE.2    TEMPORARY SAVE #2                   2     BINARY

     OUTPUT:

      1:  PANIC     UPDATED PANIC WORK AREA             2     BINARY

520I SEND ALARM MESSAGE CALL: DICCSA

          LABEL:    DESCRIPTION                       BYTES: TYPE:

     INPUT;

      1:  ALARM     ALARM CODE                          2     BINARY
      2:  ALARMPC1  ALARM QUEUE EMPTY PANIC CODE        2     BINARY
      3:  ALARMPC2  ALARM QUEUE FULL PANIC CODE         2     BINARY
      4:  BID       BATCH ID                            3     EBCDIC

     LOCAL:

      1:  SAVE.2    TEMPORARY SAVE #2                   2     BINARY

     OUTPUT:

      1:  PANIC     UPDATED PANIC WORK AREA             2     BINARY

530I DELETE BATCH CALL: DICCDB

          LABEL:    DESCRIPTION:                      BYTES: TYPE:

     INPUT:

      1:  BIPM      IPM BUFFER ADDRESS                  2     BINARY
      2:  BPANIC1   BAD RELATIVE BATCH ID PANIC CODE    2     BINARY
      3:  BPANIC2   BAD CALL CODE PANIC CODE            2     BINARY
      4:  BPANIC3   BAD RETURN CODE PANIC CODE          2     BINARY

     LOCAL:

      1:  SAVE.1    TEMPORARY SAVE #1                   2     BINARY

     OUTPUT:

      1:  PANIC     UPDATED PANIC WORK AREA             2     BINARY

540I PANIC CALL: DICCPA

          LABEL:    DESCRIPTION:                      BYTES: TYPE:

     INPUT:

      1:  PANIC     PAIC CODE                           2     BINARY

     LOCAL:

      1:  SAVE.2    TEMPORARY SAVE #2                   2     BINARY
      2:  NEVEVT    NEVER EVENT CONTROL BLOCK           6     BINARY

550I GET BLOCK BUFFER CALL: DICCGS

          LABEL:    DESCRIPTION:                      BYTES: TYPE:

     LOCAL:

      1:  SAVE.2    TEMPORARY SAVE #2                   2     BINARY

     OUTPUT:
```

```
       1:  SBB       SYSCOM BLOCK BUFFER ADDRESS          2     BINARY

560I     FREE BLOCK BUFFER CALL: DICCFS

            LABEL:   DESCRIPTION:                        BYTES: TYPE:

         INPUT:

       1:  SBB       SYSCOM BLOCK BUFFER ADDRESS          2     BINARY
       2:  SBBPC2    SBB BUFFER QUEUE FULL PANIC CODE     2     BINARY

         LOCAL:

       1:  SAVE.2    TEMPORARY SAVE #2                    2     BINARY

         OUTPUT:

       1:  PANIC     UPDATED PANIC WORK AREA              2     BINARY

570I     DISKETTE COMMAND WORD FLAG DEFINITION:

            LABEL:   DESCRIPTION:               VALUE:  BYTES: TYPE:

       1:  DCMD      DISKETTE COMMAND WORD                2     BINARY
       2:  CMDBAT    WRITE BATCH HEADER          0001     0     EQUATE
       3:  CMDTRA    WRITE TRANSACTION DETAIL    0010     0     EQUATE
       4:  CMDLR     WRITE LAST RECORD           0011     0     EQUATE
       5:  CMDHDR    READ BATCH HEADER           0100     0     EQUATE
       6:  CMDDTL    READ TRANSACTION DETAIL     0101     0     EQUATE

580I       SYSTEM ERROR REPORT LAYOUT

            REPORT FIELD:                  FROM:

       1:  DATE                          LOCAL TIME
       2:  TIME                          LOCAL TIME
       3:  PAGE                          PAGE COUNT
       4:  TRANSACTIONS LOST             SEE 40FM
       5:  TRANSACTIONS REJECTED         SEE 40FM
       6:  TRANSACTIONS RECIRCED
            FROM INDUCTION               SEE 40FM
            BY THE PSC                   SEE 40FM
            TOTAL                        SEE 40FM
       7:  NO-READS                      SEE 40FM
       8:  MIS-SORTS                     SEE 40FM

590I       SYSTEM ERROR REPORT LOCAL DATA

            LABEL:   DESCRIPTION:                BYTES: TYPE:

       1:  HCFLG     HARD COPY FLAG WORD           2    BINARY
       2:  ABFLG     ABORT REPORT FLAG WORD        2    BINARY
       3:  TEMP      TEMPORARY STORAGE             4    BINARY
       4:  SORTLIN   NUMBER OF SORT LINES          2    BINARY
       5:  COL       NUMBER OF REPORT COLUMNS      2    BINARY
       6:  ROW       NUMBER OF REPORT ROWS         2    BINARY
       7:  LNCNT     LINE COUNTER                  2    BINARY
       8:  CRTCNT    LINES AVAILABLE ON CRT        2    BINARY
       9:  CNTER     SORT LINE COUNTER             2    BINARY

600I     MIS-SORT REPORT LOCAL DATA:

            LABEL:   DESCRIPTION:                        BYTES: TYPE:

       1:  FLGDEF    LOCAL FLAG WORD                      2     BINARY
       2:  IPM       IPM BUFFER ADDRES                    2     BINARY
       3:  IPMPC1    IPM PANIC CODE 1                     2     BINARY
       4:  IPMPC2    IPM PANIC CODE 2                     2     BINARY
       5:  SRB       SYSCOM RECORD BUFFER ADDRESS         2     BINARY
       6:  SRBPC1    SRB PANIC CODE 1                     2     BINARY
       7:  SRBPC2    SRB PANIC CODE 2                     2     BINARY
       8:  SBB       SYSCOM BLOCK BUFFER ADDRESS          2     BINARY
       9:  SBBPC1    SBB PANIC CODE 1                     2     BINARY
      10:  RTCNT     REPORT TRANSACTION COUNTER           2     BINARY
```

```
        11:  TIME       TABLE:HH,MM,SS,MO,DA,YR       12    BINARY   00016710
        12:  PAGECNT    REPORT PAGE COUNT              2    BINARY   00016720
        13:  LINECNT    REPORT LINE COUNT              2    BINARY   00016730
        14:  CRTCNT     CRT MAXIMUM SCREEN SIZE        2    BINARY   00016740
        15:  PRINTCNT   PRINTER MAXIMUM LINE SIZE      2    BINARY   00016750
        16:  TEMP       TEMPORARY WORK AREA           10    BINARY   00016760
        17:  PANIC      PANIC CODE WORK AREA           2    BINARY   00016770
        18:  MSGOSR     BANNER                        22    EBCDIC   00016780
        19:  MSGABORT   REPORT ABORTED                48    EBCDIC   00016790
                                                                     00016800
 610I    MIS-SORT REPORT LAYOUT:                                     00016810
                                                                     00016820
             REPORT FIELD:                FROM:                      00016830
                                                                     00016840
         1:  DATE                         290I  TIME                 00016850
         2:  TIME                         290I  TIME                 00016860
         3:  PAGE                         290I  PAGECNT              00016870
         4:  BATCH ID                     120I  BID                  00016880
         5:  BATCH STATUS                 120I  BSTATUS, BSTBL       00016890
         6:  ORDER COUNT                  120I  BOCNT                00016900
         7:  TRANSACTION COUNT            290I  RTCNT                00016910
         8:  HEADER INFORMATION           120I  BHDR                 00016920
         9:  ORDER NUMBER                 130I  OCNT                 00016930
        10:  ORDER ID                     130I  OID                  00016940
        11:  QUANTITY PLANNED             130I  OTCNT                00016950
        12:  QUANTITY STAGED              130I  OQSTG                00016960
        13:  QUANTITY NOT SHIPPED         130I  OQNSTG               00016970
        14:  QUANTITY STOCK-OUT           130I  OQSTO                00016980
        15:  QUANTITY EXCESS REPACK       130I  OQXRP                00016990
        16:  QUANTITY IN SORTATION        130I  OQISORT              00017000
        17:  QUANTITY NOT PICKED          130I  OQNPKD               00017010
        18:  QUANTITY MIS-SORT            130I  OQMIS                00017020
        19:  ORDER % COMPLETE             130I  OPCOM                00017030
        20:  TRANSACTION NUMBER           290I  RTCNT                00017040
        21:  TRANSACTION ID               140I  TID                  00017050
        22:  TRANSACTION STATUS           140I  TSTATUS              00017060
        23:  PRODUCT ID                   140I  TPROD                00017070
        24:  SOURCE LOCATION              140I  TSOURCE              00017080
        25:  DESTINATION                  140I  TDEST                00017090
        26:  MIS-SORT DESTINATION                                    00017100
                                                                     00017110
         * SEE REPORT LAYOUT SHEET                                   00017120
                                                                     00017130
 HELP COMMAND
             STATUS REPORT COMMANDS         :    BATCH CONTROL COMMANDS
                                            :
 SCHEDULE  - WORK SCHEDULE BATCHES          : READ    - READ BATCH FROM DISKETTE
 BATCH     * BATCH/ORDER STATUS             : START   - START BATCH PROCESSING
 ORDER     * ORDER/TRANSACTION STATUS       : END     - END BATCH PROCESSING
 TRANSACT  - TRANSACTION STATUS             : WRITE   - WRITE BATCH TO DISKETTE
 MISSORT   * MISSORT EXCEPTIONS             : DELETE  - DELETE BATCH INFORMATION
 ROUTE     - SORT LINE TRANSLATIONS         : ASSIGN  - ASSIGN TRANSACTION STATUS

 > CANCEL  * ( TO TERMINATE REPORTS )       :
 ...........................................:.................................
                                            :
             SYSTEM CONTROL COMMANDS        :    SORTATION CONTROL COMMANDS

 HELP      - LIST SYSTEM COMMANDS           : HOLD    - HOLD ON ERROR
 RESET     - RESET ERROR COUNTS             : RECIRC  - RECIRCULATE ON ERROR
 ERROR     - DISPLAY SYSTEM ERROR COUNTS    : OPEN    - OPEN PSC COMMUNICATIONS
 ST        - SET SYSTEM TIME                : REROUTE - ASSIGN ALTERNATE SORT LINE
                                            : RESTORE - RESTORE ORIGINAL SORT LINE
                                            :
 -- BATCH --   NO. OF   NO. OF
 ID.  STATUS   ORDERS   TRANS.   HEADER INFORMATION

 S01  ACTIVE     3       150     SAMPLE BATCH OF 150 TRANSACTIONS
 T02  ACTIVE     1         9     TEST BATCH T02
 T03  PENDING    1         8     TEST BATCH T03
 T04  PENDING    1         9     TEST BATCH T04
 T05  COMPLETE   9         9     TEST BATCH T05
 T06  PENDING    1         9     TEST BATCH T06
 T07  PENDING    9         9     TEST BATCH T07
```

| | | | | |
|---|---|---|---|---|
| T08 | COMPLETE | 1 | 9 | TEST BATCH T08 |
| T09 | COMPLETE | 9 | 9 | TEST BATCH T09 |
| T10 | PENDING | 1 | 9 | TEST BATCH T10 |

| -- BATCH -- ID. | STATUS | NO. OF ORDERS | NO. OF TRANS. | HEADER INFORMATION |
|---|---|---|---|---|
| S01 | ACTIVE | 3 | 150 | SAMPLE BATCH OF 150 TRANSACTIONS |

| # | ORDER ID. | QUANTITIES: PLAN | STAGED | NOT SHIP | % COMP. | STOCK -OUT | EXCESS REPACK | IN SORT. | NOT PICKED | MIS-SORT |
|---|---|---|---|---|---|---|---|---|---|---|
| 1 | 000001 | 50 | 26 | 24 | 74.0 | 2 | 9 | 3 | 7 | 3 |
| 2 | 000002 | 50 | 35 | 15 | 74.0 | 2 | 0 | 4 | 8 | 1 |
| 3 | 000003 | 50 | 50 | 0 | 100.0 | 0 | 0 | 0 | 0 | 0 |

BATCH PERCENT COMPLETE: 82.7

| | | | | | | | | | | |
|---|---|---|---|---|---|---|---|---|---|---|
| 1 | 000001 | 50 | 26 | 24 | 74.0 | 2 | 9 | 3 | 7 | 3 |

| # | - TRANSACTION - NUMBER | STATUS | PRODUCT IDENTIFICATION | SOURCE LOCATION | DESTINATION |
|---|---|---|---|---|---|
| 1 | 16 | MIS-SORTED | 000007 | 00007 | 1 ( 2) |
| 2 | 91 | EXCESS REPACK | 000082 | 00082 | 1 |
| 3 | 94 | EXCESS REPACK | 000085 | 00085 | 1 |
| 4 | 97 | MIS-SORTED | 000088 | 00088 | 1 ( 3) |
| 5 | 100 | EXCESS REPACK | 000091 | 00091 | 1 |
| 6 | 103 | EXCESS REPACK | 000094 | 00094 | 1 |
| 7 | 106 | EXCESS REPACK | 000097 | 00097 | 1 |
| 8 | 109 | EXCESS REPACK | 000100 | 00100 | 1 |
| 9 | 112 | EXCESS REPACK | 000103 | 00103 | 1 |
| 10 | 115 | EXCESS REPACK | 000106 | 00106 | 1 |
| 11 | 118 | EXCESS REPACK | 000109 | 00109 | 1 |
| 12 | 121 | STOCK-OUT | 000112 | 00112 | 1 |
| 13 | 124 | IN SORTATION | 000115 | 00115 | 1 |
| 14 | 127 | NOT PICKED | 000118 | 00118 | 1 |
| 15 | 130 | IN SORTATION | 000121 | 00121 | 1 |
| 16 | 133 | IN SORTATION | 000124 | 00124 | 1 |
| 17 | 136 | NOT PICKED | 000127 | 00127 | 1 |
| 18 | 139 | NOT PICKED | 000130 | 00130 | 1 |
| 19 | 142 | NOT PICKED | 000133 | 00133 | 1 |
| 20 | 145 | STOCK-OUT | 000136 | 00136 | 1 |
| 21 | 148 | NOT PICKED | 000139 | 00139 | 1 |
| 22 | 151 | MIS-SORTED | 000142 | 00142 | 1 ( 2) |
| 23 | 154 | NOT PICKED | 000145 | 00145 | 1 |
| 24 | 157 | NOT PICKED | 000148 | 00148 | 1 |

| | | | | | | | | | | |
|---|---|---|---|---|---|---|---|---|---|---|
| 2 | 000002 | 50 | 35 | 15 | 74.0 | 2 | 0 | 4 | 8 | 1 |

| # | - TRANSACTION - NUMBER | STATUS | PRODUCT IDENTIFICATION | SOURCE LOCATION | DESTINATION |
|---|---|---|---|---|---|
| 1 | 113 | IN SORTATION | 000104 | 00104 | 2 |
| 2 | 116 | IN SORTATION | 000107 | 00107 | 2 |
| 3 | 119 | IN SORTATION | 000110 | 00110 | 2 |
| 4 | 122 | STOCK-OUT | 000113 | 00113 | 2 |
| 5 | 125 | STOCK-OUT | 000116 | 00116 | 2 |
| 6 | 128 | NOT PICKED | 000119 | 00119 | 2 |
| 7 | 131 | NOT PICKED | 000122 | 00122 | 2 |
| 8 | 134 | NOT PICKED | 000125 | 00125 | 2 |
| 9 | 137 | NOT PICKED | 000128 | 00128 | 2 |
| 10 | 140 | NOT PICKED | 000131 | 00131 | 2 |
| 11 | 143 | IN SORTATION | 000134 | 00134 | 2 |
| 12 | 149 | NOT PICKED | 000140 | 00140 | 2 |
| 13 | 152 | NOT PICKED | 000143 | 00143 | 2 |
| 14 | 155 | NOT PICKED | 000146 | 00146 | 2 |
| 15 | 158 | MIS-SORTED | 000149 | 00149 | 2 ( 1) |

| | | | | | | | | | | |
|---|---|---|---|---|---|---|---|---|---|---|
| 3 | 000003 | 50 | 50 | 0 | 100.0 | 0 | 0 | 0 | 0 | 0 |

**** NO EXCEPTIONS IN THIS ORDER

**** REPORT COMPLETE

| - TRANSACTION - NUMBER | STATUS | ORDER ID | PRODUCT ID | SOURCE LOCATION | DESTINATION |
|---|---|---|---|---|---|
| 109 | EXCESS REPACK | 000001 | 000100 | 00100 | 1 |

| # | ORDER ID. | QUANTITIES: PLAN | STAGED | NOT SHIP | % COMP. | STOCK -OUT | EXCESS REPACK | IN SORT. | NOT PICKED | MIS-SORT |
|---|---|---|---|---|---|---|---|---|---|---|
| 1 | 000001 | 50 | 26 | 24 | 74.0 | 2 | 9 | 3 | 7 | 3 |

| # | - TRANSACTION - NUMBER | STATUS | PRODUCT IDENTIFICATION | SOURCE LOCATION | DESTINATION |
|---|---|---|---|---|---|
| 1 | 16 | MIS-SORTED | 000007 | 00007 | 1 ( 2) |
| 2 | 97 | MIS-SORTED | 000088 | 00088 | 1 ( 3) |
| 3 | 151 | MIS-SORTED | 000142 | 00142 | 1 ( 2) |

| # | ORDER ID. | QUANTITIES: PLAN | STAGED | NOT SHIP | % COMP. | STOCK -OUT | EXCESS REPACK | IN SORT. | NOT PICKED | MIS-SORT |
|---|---|---|---|---|---|---|---|---|---|---|
| 2 | 000002 | 50 | 35 | 15 | 74.0 | 2 | 0 | 4 | 8 | 1 |

| # | - TRANSACTION - NUMBER | STATUS | PRODUCT IDENTIFICATION | SOURCE LOCATION | DESTINATION |
|---|---|---|---|---|---|
| 1 | 158 | MIS-SORTED | 000149 | 00149 | 2 ( 1) |

| # | ORDER ID. | QUANTITIES: PLAN | STAGED | NOT SHIP | % COMP. | STOCK -OUT | EXCESS REPACK | IN SORT. | NOT PICKED | MIS-SORT |
|---|---|---|---|---|---|---|---|---|---|---|
| 3 | 000003 | 50 | 50 | 0 | 100.0 | 0 | 0 | 0 | 0 | 0 |

**** NO MIS-SORTS IN THIS ORDER

**** REPORT COMPLETE

| SORT LINE | CHANGE TO | SORT LINE | CHANGE TO | SORT LINE | CHANGE TO |
|---|---|---|---|---|---|
| 1 | | 11 | | 21 --- | 19 |
| 2 --- | 3 | 12 | | | |
| 3 | | 13 | | | |
| 4 | | 14 | | | |
| 5 | | 15 --- | 11 | | |
| 6 --- | 8 | 16 | | | |
| 7 | | 17 | | | |
| 8 | | 18 | | | |
| 9 | | 19 | | | |
| 10 | | 20 | | | |

| - TRANSACTIONS - LOST | REJECTED | - SENT TO RECIRCULATION - BY PSC | FROM INDUCTION | TOTAL |
|---|---|---|---|---|
| 0 | 3 | 2 | 5 | 7 |

| SCANNER NO-READS SCANNER #1 | SCANNER #2 |
|---|---|
| 0 | 1 |

M I S - S O R T S

| LINE | COUNT | LINE | COUNT |
|---|---|---|---|
| 1 ..... | 1 | 18 ..... | 0 |
| 2 ..... | 2 | 19 ..... | 0 |
| 3 ..... | 1 | 20 ..... | 0 |
| 4 ..... | 0 | 21 ..... | 0 |
| 5 ..... | 0 | | |
| 6 ..... | 0 | | |
| 7 ..... | 0 | | |
| 8 ..... | 0 | | |
| 9 ..... | 0 | | |
| 10 ..... | 0 | | |
| 11 ..... | 0 | | |

```
12 ..... 0
13 ..... 0
14 ..... 0
15 ..... 0
16 ..... 0
17 ..... 0
                                                                    00000010
                                                                    00000020
                                                                    00000030
                                                                    00000040
                                                                    00000050
        SYSTEM START-UP PROGRAM                                     00000060
                                                                    00000070
                                                                    00000080
                                                                    00000090
                    - MODULE HISTORY -                              00000100
                                                                    00000110
                                                                    00000120
          PROJECT:    DAS              76-01709                     00000130
                                                                    00000140
          SUB-SYSTEM:    AUXILIARY FUNCTIONS                        00000150
                                                                    00000160
          MODULE:    $INIT             60                           00000170
                                                                    00000180
                                                                    00000190
                    - MODULE ABSTRACT -                             00000200
                                                                    00000210
          THIS MODULE IS THE SYSTEM START-UP PROGRAM. IT LOADS ALL  00000220
          OTHER PROGRAMS IN THE SYSTEM AND CALLS THE FILE MANAGER   00000230
          TO INITIALIZE THE FILES. AFTER IT HAS DONE ALL THIS, IT   00000240
          PERFORMS A PROGSTOP.                                      00000250
          WAIT FOR 1 SECOND                                         00000260
          LOAD THE ALARM MESSAGE PRINTING SUB-SYSTEM                00000270
          IF NO LOAD ERRORS ENCOUNTERED THEN                        00000280
              LOAD THE FILE MANAGER SUB-SYSTEM                      00000290
              IF LOAD ERROR ENCOUNTERED THEN                        00000300
07AL              PANIC!                                            00000310
08AL                                                                00000320
              (ELSE)                                                00000330
              ENDIF                                                 00000340
09FM          GET A FILE MANAGER INPUT BUFFER                       00000350
              IF NONE AVAILABLE THEN                                00000360
07AL              PANIC!                                            00000370
08AL                                                                00000380
              (ELSE)                                                00000390
              ENDIF                                                 00000400
24FM          SET UP BUFFER TO INITIALIZE THE FILES                 00000410
08FM          CALL THE FILE MANAGER                                 00000420
24FM          IF FILE MANAGER COMPLETION CODE NOT SUCCESSFUL THEN   00000430
07AL              PANIC!                                            00000440
08AL                                                                00000450
              (ELSE)                                                00000460
              ENDIF                                                 00000470
09FM          RETURN THE FILE MANAGER BUFFER TO FREE POOL           00000480
              IF FREE POOL FULL THEN                                00000490
07AL              PANIC!                                            00000500
08AL                                                                00000510
              (ELSE)                                                00000520
              ENDIF                                                 00000530
              LOAD THE PSC COMMUNICATIONS SUB-SYSTEM                00000540
              IF LOAD ERROR ENCOUNTERED THEN                        00000550
07AL              PANIC!                                            00000560
08AL                                                                00000570
              (ELSE)                                                00000580
              ENDIF                                                 00000590
              LOAD THE SCANNER INPUT SUB-SYSTEM                     00000600
              IF LOAD ERROR ENCOUNTERED THEN                        00000610
07AL              PANIC!                                            00000620
08AL                                                                00000630
              (ELSE)                                                00000640
              ENDIF                                                 00000650
              LOAD THE OPERATOR INTERFACE SUB-SYSTEM                00000660
              IF LOAD ERROR ENCOUNTERED THEN                        00000670
07AL              PANIC!                                            00000680
```

```
08AL
          (ELSE)
          ENDIF
02AL      GET AN ALARM MESSAGE BUFFER
          IF NONE AVAILABLE THEN
07AL         PANIC!
08AL
          (ELSE)
          ENDIF
02AX      IF START-UP CODE = NEW IPL THEN
03AL         SET BUFFER TO PRINT "SYSTEM STARTED" MSG.
          ELSE
03AL         SET BUFFER TO PRINT "POWER FAIL/RESTART" MSG.
          ENDIF
01AL      PLACE BUFFER ON ALARM MESSAGE INPUT QUEUE
          IF QUEUE FULL THEN
07AL         PANIC!
08AL
          (ELSE)
          ENDIF
       (ELSE)
       ENDIF
       PROGSTOP



       SYSTEM INSTALLATION PROGRAM


                     - MODULE HISTORY -


          PROJECT:       DAS                    73-01709

          SUB-SYSTEM:    AUXILIARY FUNCTIONS

          MODULE:        $INITIAL               61


                     - MODULE ABSTRACT -

          THIS MODULE REBUILDS THE ORDER FILE FROM THE TRANSACTION
       RECORDS IN THE TRANSACTION FILE FOR EVERY BATCH ON FILE. IT
       THEN LOADS THE SYSTEM START-UP PROGRAM INTO PARTITION 3 AND
       EXITS.

       INITIALIZATION
02AX   SAVE START-UP CODE
       DISPLAY SYSTEM INITIALIZATION MESSAGE
39FM   READ SYSTEM PARAMETER FILE
       IF THERE WHERE NO READ ERRORS THEN
39FM      GET ADDRESS OF $SYSCOM PARAMETER TABLE
39FM      MOVE SYSTEM PARAMETERS TO $SYSCOM
01FM      READ THE BATCH FILE
          IF THERE WERE NO READ ERRORS, THEN
01FM         DOUNTIL ALL RECORDS IN BATCH FILE HAVE BEEN TESTED
01FM            INDEX TO FIRST/NEXT BATCH RECORD
01FM            IF BATCH STATUS = ACTIVE, PENDING, OR COMPLETE, THEN
01FM               SAVE RELATIVE BATCH, TRANSACTION COUNT, AND BATCH ID
03AX
                (ELSE)
                ENDIF
             ENDDO
03AX         DOUNTIL END OF BATCH TABLE REACHED
03AX            GET FIRST/NEXT RELATIVE BATCH AND TRANS COUNT FROM TBL
03AX            IF THIS IS NOT THE END OF THE TABLE, THEN
04FM               CALCULATE FIRST SECTOR IN TRANS FILE FOR THIS BATCH
04FM               CALCULATE NUMBER OF SECTORS IN THIS BATCH
01FM               MOVE NUMBER OF SECTORS IN BATCH TO 'SECTORS LEFT'
```

|        |                                                                    |          |
|--------|--------------------------------------------------------------------|----------|
|        | IF 'SECTORS LEFT' <= MAX SECTORS, THEN                             | 00000500 |
|        |    MOVE 'SECTORS LEFT' TO 'SECTOR COUNT'             | 00000510 |
|        |    ZERO 'SECTORS LEFT'                               | 00000520 |
|        | ELSE                                                               | 00000530 |
|        |    MOVE MAX SECTORS TO 'SECTOR COUNT'                | 00000540 |
|        |    SUBTRACT MAX SECTORS FROM 'SECTORS LEFT'          | 00000550 |
|        |    UPDATE TRANSACTION FILE SECTOR POINTER            | 00000560 |
|        | ENDIF                                                              | 00000570 |
| 04AX   | SET FLAG TO FIRST BUFFER                                           | 00000580 |
| 04FM   | READ TO FIRST BUFFER 'SECTOR COUNT' SECTORS FROM ---                | 00000590 |
| 05AX   | --- THE TRANSACTION FILE                                           | 00000600 |
| 05AX   | SET UP BUFFER POINTER FOR THE FIRST BUFFER                         | 00000610 |
| 06AX   | ZERO THE ORDER TABLE                                               | 00000620 |
| 07AX   | DOUNTIL THE TRANS COUNT = 0, OR BATCH ERROR FLAG ---                | 00000630 |
| 08AX   |                                                                    | 00000640 |
|        |    --- SET, OR DISK ERROR FLAG SET                   | 00000650 |
|        |    WAIT FOR THE READ TO COMPLETE                     | 00000660 |
|        |    IF NO READ ERRORS, THEN                           | 00000670 |
|        |      IF 'SECTORS LEFT' NOT = 0, THEN       | 00000680 |
|        |        IF 'SECTORS LEFT' <= MAX SECTORS, THEN | 00000690 |
|        |          MOVE 'SECTORS LEFT' TO 'SECTOR COUNT' | 00000700 |
|        |          ZERO 'SECTORS LEFT' | 00000710 |
|        |        ELSE                      | 00000720 |
|        |          MOVE MAX SECTORS TO 'SECTOR COUNT' | 00000730 |
|        |          SUBTRACT MAX SECTORS FROM 'SECTORS LEFT' | 00000740 |
|        |          UPDATE TRANSACTION FILE SECTOR POINTER | 00000750 |
|        |        ENDIF                     | 00000760 |
|        |        IF FLAG SET TO FIRST BUFFER, THEN | 00000770 |
| 05AX   |          READ TO SECOND BUFFER 'SECTOR COUNT' --- | 00000780 |
|        |          --- SECTORS FROM THE TRANSACTION FILE | 00000790 |
| 04AX   |          SET FLAG TO SECOND BUFFER | 00000800 |
|        |        ELSE                      | 00000810 |
| 05AX   |          READ TO FIRST BUFFER 'SECTOR COUNT' --- | 00000820 |
|        |          --- SECTORS FROM THE TRANSACTION FILE | 00000830 |
| 04AX   |          SET FLAG TO FIRST BUFFER | 00000840 |
|        |        ENDIF                     | 00000850 |
|        |       (ELSE)                          | 00000860 |
|        |      ENDIF                                 | 00000870 |
| 05AX   |      GET BUFFER POINTER                    | 00000880 |
| 05AX   |      DOUNTIL END OF BUFFER OR TRANS COUNT = 0 | 00000890 |
| 04FM   |        INDEX TO FIRST/NEXT TRANSACTION RECORD | 00000900 |
| 04FM   |        IF THE RECORD IS USED, THEN | 00000910 |
| 04FM   |          GET REL. ORDER FROM RECORD | 00000920 |
| 04FM   |          GET TRANSACTION STATUS FROM RECORD | 00000930 |
| 06AX   |          INDEX INTO ORDER TABLE BY REL. ORDER | 00000940 |
| 06AX   |          INDEX INTO STATUS COUNT FOR THIS ORDER | 00000950 |
| 06AX   |          INCREMENT STATUS COUNT | 00000960 |
|        |          DECREMENT TRANSACTION COUNT | 00000970 |
|        |        ELSE                      | 00000980 |
|        |          SET TRANSACTION COUNT TO ZERO | 00000990 |
| 07AX   |          SET BATCH ERROR FLAG | 00001000 |
|        |          DISPLAY BATCH ERROR MESSAGE | 00001010 |
|        |        ENDIF                     | 00001020 |
|        |      ENDDO                                 | 00001030 |
|        |      IF TRANSACTION COUNT NOT = 0, THEN    | 00001040 |
|        |        IF FLAG SET TO SECOND BUFFER, THEN | 00001050 |
| 05AX   |          SET POINTER TO SECOND BUFFER | 00001060 |
|        |        ELSE                      | 00001070 |
| 05AX   |          SET POINTER TO FIRST BUFFER | 00001080 |
|        |        ENDIF                     | 00001090 |
|        |      (ELSE)                                | 00001100 |
|        |      ENDIF                                 | 00001110 |
|        |    ELSE                                              | 00001120 |
| 08AX   |      SET DISK ERROR FLAG                   | 00001130 |
|        |    ENDIF                                             | 00001140 |
|        | ENDDO                                                              | 00001150 |
| 07AX   | IF BATCH ERROR FLAG AND DISK ERROR FLG NOT SET, THEN               | 00001160 |
| 08AX   |                                                                    | 00001170 |
| 05FM   |    CALCULATE FIRST ORDER SECTOR FOR CURRENT BATCH    | 00001180 |
| 05FM   |    READ ORDER SECTORS FOR THIS BATCH                 | 00001190 |
|        |    IF NO READ ERRORS, THEN                           | 00001200 |
| 05FM   |      DOUNTIL END OF ORDER RECORDS FOR THIS BATCH | 00001210 |
| 06AX   |                                                                    | 00001220 |

```
05FM                    INDEX TO FIRST/NEXT ORDER RECORD
06AX
05FM                    UPDATE ORDER STATUS COUNTS IN RECORD
06AX
                     ENDDO
05FM                 WRITE ORDER SECTORS FOR THIS BATCH
                     IF WRITE ERRORS, THEN
08AX                    SET DISK ERROR FLAG
                     (ELSE)
                     ENDIF
                  ELSE
08AX                 SET DISK ERROR FLAG
                  ENDIF
               ELSE
07AX              RESET BATCH ERROR FLAG
               ENDIF
            (ELSE)
            ENDIF
08AX        IF DISK ERROR FLAG SET, THEN
               DISPLAY DISK ERROR MESSAGE FOR THIS BATCH
               DISPLAY WARNING
08AX           RESET DISK ERROR FLAG
            (ELSE)
            ENDIF
         ENDDO
      ELSE
         DISPLAY DISK ERROR WHILE READING BATCH FILE MESSAGE
         DISPLAY WARNING MESSAGE
      ENDIF
   ELSE
      DISPLAY UNABLE TO READ SYSTEM PARAMETERS
      DISPLAY SYSTEM INITIALIZATION ABORTED
   ENDIF
   IF SYSTEM PARAMETERS READ O.K. THEN
      LOAD SYSTEM START-UP PROGRAM
   (ELSE)
   ENDIF
   PROGSTOP



   PSC OUTPUT CONTROL TASK


                  - MODULE HISTORY -

      PROJECT:        DAS                    7G-01709

      SUB-SYSTEM:     PSC COMMUNICATIONS

      MODULE:         PSOC                   49


                  - MODULE ABSTRACT -

      THIS TASK PROCESSES ALL PSC OUTPUT MESSAGES. IT REMOVES THE
   INPUT BUFFER FROM THE PSC OUTPUT QUEUE AND IF THE COMMUNICATIONS
   LINE IS OPEN, FORMATES THE MESSAGE, AND SENDS IT TO THE PSC.
   IT THEN WAITS ON THE TRANSMISSION COMPLETION CODE TO BE POSTED,
   AND WILL RETRY THE MESSAGE IF AN ERROR WAS ENCOUNTERED OR WILL
   CONTINUE COMMUNICATIONS WITH THE NEXT MESSAGE FOUND IN THE
   PSC OUTPUT QUEUE.
07PS SET COMMUNICATIONS LINK = CLOSED
     SET LAST COMPLETION CODE = IDLE RECEIVED
08PS RESET IDLE MESSAGE COUNT
09PS CLEAR PSC RESPONSE COUNTS
10PS RESET RESPONSE DUMP FLAG
13PS RESET TOTAL NO. OF TIME-OUTS
14PS RESET INVALID SEQUENCE COUNTER
15PS RESET INVALID CHECKSUM COUNTER
```

```
39FM    GET SORT PARAMETERS FROM SYSCOM                                 00000370
        ATTACH THE PSC POLL TASK                                        00000380
        ATTACH PSC RESPONSE PROCESSING TASK                             00000390
        ATTACH PSC INPUT/OUTPUT TASK                                    00000400
        DOUNTIL CPU STOPPED                                             00000410
15SC       WAIT ON SCANNER SLOW DOWN EVENT                              00000420
28PS       WAIT ON PSC RESPONSE OVERFLOW EVENT                          00000430
           IF LAST COMPLETION CODE NOT = DATA RECEIVED OR --            00000440
07PS       -- COMMUNICATION LINK CLOSED THEN                            00000450
02PS          DOUNTIL DATA RECEIVED FROM PSC OUTPUT QUEUE               00000460
02PS             WAIT FOR PSC RJN EVENT TO BE POSTED                    00000470
02PS             RETRIEVE BUFFER FROM PSC OUTPUT QUEUE                  00000480
02PS             IF QUEUE EMPTY THEN                                    00000490
02PS                RESET PSC RJN EVENT                                 00000500
                 (ELSE)                                                 00000510
                 ENDIF                                                  00000520
              ENDDO                                                     00000530
           ELSE                                                         00000540
02PS          RETRIEVE BUFFER FROM PSC OUTPUT QUEUE                     00000550
01PS                                                                    00000560
              IF QUEUE EMPTY THEN                                       00000570
                 SET MESSAGE CODE = IDLE                                00000580
              ELSE                                                      00000590
01PS             SET MESSAGE CODE = INPUT MESSAGE CODE                  00000600
                 SAVE DATA FROM INPUT BUFFER                            00000610
01PS             RETURN BUFFER TO FREE POOL                             00000620
                 IF FREE POOL FULL THEN                                 00000630
11PS                PANIC!                                              00000640
                 (ELSE)                                                 00000650
                 ENDIF                                                  00000660
              ENDIF                                                     00000670
           ENDIF                                                        00000680
07PS       IF COMMUNICATIONS LINK = CLOSED THEN                         00000690
              IF MESSAGE CODE = OPEN LINK THEN                          00000700
12PS             INITIALIZE THE SEQUENCE BYTES                          00000710
07PS             SET COMMUNICATIONS LINK = OPEN                         00000720
              ELSE                                                      00000730
                 SET MESSAGE CODE = NO MESSAGE                          00000740
              ENDIF                                                     00000750
           ELSE                                                         00000760
              IF MESSAGE CODE = OPEN LINK THEN                          00000770
                 SET MESSAGE CODE = NO MESSAGE                          00000780
              (ELSE)                                                    00000790
              ENDIF                                                     00000800
           ENDIF                                                        00000810
           IF MESSAGE CODE NOT = NO MESSAGE THEN                        00000820
12PS          TOGGLE LAST TRANSMITTED SEQUENCE BYTE                     00000830
16PS          CALL MESSAGE FORMATTING ROUTINE                           00000840
              IF NO ERROR RETURNED THEN                                 00000850
                 SET RETRY COUNT = MAX. NO. OF RETRIES                  00000860
08PS             SET IDLE MESSAGE COUNT = MAX. IDLE COUNT               00000870
                 DOWHILE RETRY COUNT > ZERO                             00000880
17PS                RESET TRANSMISSION COMPLETION EVENT                 00000890
                    ATTACH MESSAGE TIME-OUT TASK                        00000900
29PS                POST PSC INPUT/OUTPUT EVENT                         00000910
17PS                WAIT FOR TRANSMISSION COMPLETION EVENT              00000920
                    IF COMPLETION EVENT CODE = RETRY THEN               00000930
                       SUBTRACT 1 FROM RETRY COUNT                      00000940
                    ELSE                                                00000950
                       SET RETRY COUNT LESS THAN ZERO                   00000960
                    ENDIF                                               00000970
                 ENDDO                                                  00000980
                 IF RETRY COUNT = 0 THEN                                00000990
07PS                SET COMMUNICATION LINK = CLOSED                     00001000
02AL                GET ALARM MESSAGE BUFFER                            00001010
                    IF ONE RECEIVED THEN                                00001020
03AL                   SET UP BUFFER TO PRINT "COMM. FAILURE" MSG.      00001030
01AL                   PLACE BUFFER ADRS. ON ALARM MSG. QUEUE           00001040
                       IF ALARM MSG. QUEUE FULL THEN                    00001050
11PS                      PANIC!                                        00001060
                       (ELSE)                                           00001070
                       ENDIF                                            00001080
                    ELSE                                                00001090
```

```
11PS              PANIC!                                          00001100
                ENDIF                                             00001110
              ELSE                                                00001120
12PS            TOGGLE LAST RECEIVED SEQUENCE BYTE                00001130
              ENDIF                                               00001140
            ELSE                                                  00001150
11PS          PANIC!                                              00001160
            ENDIF                                                 00001170
          (ELSE)                                                  00001180
          ENDIF                                                   00001190
          IF LINK WAS JUST OPENED THEN                            00001200
02AL        GET ALARM MESSAGE BUFFER                              00001210
            IF ONE RECEIVED THEN                                  00001220
03AL          SET UP BUFFER TO PRINT "COMM. LINK OPEN" MSG.       00001230
01AL          PLACE BUFFER ADDRESS ON ALARM MSG. QUEUE            00001240
              IF ALARM MSG. QUEUE FULL THEN                       00001250
11PS            PANIC!                                            00001260
              (ELSE)                                              00001270
              ENDIF                                               00001280
            ELSE                                                  00001290
11PS          PANIC!                                              00001300
            ENDIF                                                 00001310
          (ELSE)                                                  00001320
          ENDIF                                                   00001330
        ENDDO                                                     00001340
        PROGSTOP                                                  00001350
                                                                  00000010
                                                                  00000020
                                                                  00000030
                                                                  00000040
                                                                  00000050
          PSC RESPONSE PROCESSOR ROUTINE                          00000060
                                                                  00000070
                                                                  00000080
                                                                  00000090
                    - MODULE HISTORY -                            00000100
                                                                  00000110
                                                                  00000120
            PROJECT:     DAS                  76-01709            00000130
                                                                  00000140
            SUB-SYSTEM:  PSC COMMUNICATIONS                       00000150
                                                                  00000160
            MODULE:      PSRP                 53                  00000170
                                                                  00000180
                                                                  00000190
                    - MODULE ABSTRACT -                           00000200
                                                                  00000210
          THIS TASK PROCESSES ALL VALID RESPONSES FROM THE PSC.   00000220
          IT CALLS THE FILE MANAGER TO UPDATE THE TRANSACTION     00000230
          STATUS IF NEEDED. IT ALSO CALLS THE MESSAGE PROCESSING  00000240
          ROUTINE IF A MESSAGE IS TO BE PRINTED.                  00000250
          DOUNTIL CPU STOPPED                                     00000260
24PS        DOUNTIL DATA RECEIVED FROM INPUT QUEUE                00000270
30PS          WAIT FOR PSC RESPONSE PROCESSING EVENT              00000280
              REMOVE AN ENTRY FROM THE INPUT QUEUE                00000290
              IF QUEUE EMPTY THEN                                 00000300
28PS            IF PSC OVERFLOW FLAG SET THEN                     00000310
23PS              GET A PSC RESPONSE BUFFER                       00000320
                  IF NONE AVAILABLE THEN                          00000330
11PS                PANIC !                                       00000340
                  ELSE                                            00000350
22PS                MOVE LAST DATA RECEIVED INTO BUFFER           00000360
28PS                POST PSC RESPONSE OVERFLOW EVENT              00000370
                  ENDIF                                           00000380
                ELSE                                              00000390
30PS              RESET PSC RESPONSE PROCESSING EVENT             00000400
                ENDIF                                             00000410
              (ELSE)                                              00000420
              ENDIF                                               00000430
            ENDDO                                                 00000440
25PS        IF MSG. TYPE RECEIVED = TRANSFER COMPLETE OR MIS-SORT THEN  00000450
              CLEAR STATUS FLAG                                   00000460
25PS          IF INPUT DATA WITHIN RANGE THEN                     00000470
25PS            IF MSG. TYPE REC. = TRANSFER COMPLETE THEN        00000480
```

```
              SET NEW STATUS = STAGED FOR SHIPPMENT
25PS          IF DEST. RECEIVED = REJECT THEN
40FM             ADD 1 TO TOTAL TRANS. SENT TO REJECT
              ELSE
25PS             IF DEST. RECEIVED = RECIRCULATION THEN
40FM                ADD 1 TO TOTAL TRANS. SENT TO RECIRCULATION
                 (ELSE)
                 ENDIF
              ENDIF
           ELSE
              SET NEW STATUS = MIS-SORT
40FM          ADD 1 TO NUMBER OF MIS-SORTS AT THIS LINE
26PS          CALL ALARM PROCESSING ROUTINE
25PS          IF MIS-SORT DESTINATION = 0 THEN
                 SET STATUS CHANGE FLAG
              (ELSE)
              ENDIF
           ENDIF
           IF STATUS CHANGE FLAG CLEAR THEN
09FM          GET A FILE MANAGER CALL BUFFER
              IF ONE RECEIVED THEN
17FM             SET UP BUFF. FOR A CHANGE STATUS CALL
17FM             SET STATUS = NEW STATUS
17FM             SET DESTINATION = DESTINATION RECEIVED FROM PSC
08FM             CALL THE FILE MANAGER
17FM             SAVE THE COMPLETION CODE
09FM             RETURN THE FILE MANAGER BUFFER TO THE FREE POOL
                 IF FREE POOL FULL THEN
11PS                PANIC!
                 ELSE
                    IF COMPLETION CODE NOT SUCCESSFUL THEN
                       IF COMP. CODE = TRANS. NOT ON FILE THEN
02AL                      GET ALARM MESSAGE BUFFER
                          IF ONE RECEIVED THEN
03AL                         SET UP BUFF. FOR "NOT ON FILE MSG"
01AL                         PLACE BUFF. ON ALARM MSG. QUEUE
                             IF QUEUE FULL THEN
11PS                            PANIC!
                             (ELSE)
                             ENDIF
                          ELSE
11PS                         PANIC!
                          ENDIF
                       ELSE
11PS                      PANIC!
                       ENDIF
                    (ELSE)
                    ENDIF
                 ENDIF
              ELSE
11PS             PANIC!
              ENDIF
           (ELSE)
           ENDIF
        ELSE
           IF TRANS. NO. = ZERO AND DESTINATION NOT EQUAL TO --
           -- RECIRC OR ERROR LINE THEN
26PS          CALL ALARM PROCESSING ROUTINE
           (ELSE)
           ENDIF
        ENDIF
     ELSE
26PS    CALL ALARM PROCESSING ROUTINE
     ENDIF
24PS RETURN BUFFER TO FREE POOL
     IF BUFFER FULL THEN
11PS    PANIC!
     (ELSE)
     ENDIF
  ENDDO
  EXIT
```

```
PSC CHECKSUM CALCULATION SUBROUTINE

                  - MODULE HISTORY -

   PROJECT:        DAS                  73-01709

   SUB-SYSTEM:     PSC COMMUNICTIONS

   MODULE:         PSCKSM               39

                  - MODULE ABSTRACT -

   THIS SUBROUTINE TAKES EBCDIC CHARACTER INPUT, CONVERTS
IT TO ASCII AND CALCULATES AN ASCII CHECKSUM CHARACTER.
THIS CHARACTER IS THEN MADE PRINTABLE AND CONVERTED BACK
EBCDIC AND PASSED BACK TO THE CALLER.

GET INPUTS
CLEAR CHECKSUM RESULT LOCATION
CLEAR ERROR FLAG
DO 13 TIMES
   GET NEXT EBCDIC CHARACTER FROM BUFFER
   DOWHILE EBCDIC CHAR NOT EQ TO TABLE VALUE AND NOT END OF TABL
      BUMP TO NEXT TABLE ENTRY
   ENDDO
   IF NOT AT END OF TABLE, THEN
      ADD ASCII VALUE TO RESULT
   ELSE
      SET ERROR FLAG
   ENDIF
   BUMP TO NEXT BUFFER POSITION
ENDDO
SET BIT 0 OFF IN RESULT
COMPLEMENT BIT 2 IN RESULT
SET BIT 1 TO RESULT OF COMPLEMENT
DOWHILE ASCII CHARACTER NOT EQ TO TABLE AND NOT END OF TABLE
   BUMP TO NEXT TABLE ENTRY
ENDDO
IF NOT END OF TABLE AND ERROR FLAG NOT SET THEN
   MOVE EBCDIC VALUE TO CHECK SUM CHARACTER
ELSE
   MOVE A -1 TO CHECK SUM CHARACTER
ENDIF
RETURN
```

```
PSC MESSAGE TRANSMIT/RECEIVE TASK

                  - MODULE HISTORY -

   PROJECT:        DAS                  73-01709

   SUB-SYSTEM:     PSC COMMUNICATIONS

   MODULE:         PSIO                 51

                  - MODULE ABSTRACT -
```

```
        THIS TASK TAKES THE FORMATTED MESSAGE AND TRANSMITS IT
        TO THE PSC THEN STARTS THE PSC RESPONSE TIME-OUT TASK AND
        WAITS FOR THE RESPONSE FROM THE PSC. IF THE RESPONSE HAS
        TIMED OUT, THE COMPLETION CODE IS SET TO "RETRY". IF THE
        RESPONSE SEQUENCE BYTE OR MESSAGE CHECKSUM IS INVALID,
        THE COMPLETION CODE IS SET TO "RETRY". IF THE RESPONSE IS
        VALID AND DATA WAS RECEIVED FROM THE PSC, THE COMPLETION
        CODE IS SET TO "DATA RECEIVED" AND THE DATA IS PASSED TO THE
        PSC RESPONSE PROCESSING TASK. IF THE RESPONSE IS VALID
        AND AN IDLE WAS RECEIVED FROM THE PSC, THE COMPLETION CODE
        IS SET TO "IDLE RECEIVED".
        ENQUEUE THE PSC TERMINAL
        DO UNTIL CPU STOPPED
           RESET ERROR CODE
29PS       WAIT FOR PSC INPUT/OUTPUT EVENT
21PS       SET COMPLETION CODE = UNUSED
           GET FORMATTED MESSAGE
           OUTPUT THE MESSAGE TO THE PSC
           READ THE RESPONSE FROM THE PSC
22PS       IF CORRECT NUMBER OF BYTES RECEIVED THEN
12PS          IF REC. SEQ. BYTE = TOGGLE OF LAST RECEIVED SEQ. BYTE THEN
22PS
22PS             COMPUTE MESSAGE CHECKSUM
                 IF INPUT CHECKSUM = COMPUTED CHECKSUM THEN
22PS                IF MESSAGE TYPE = IDLE THEN
21PS                   SET COMPLETION CODE = IDLE RECEIVED
30PS                   POST RESPONSE PROCESSING EVENT
                    ELSE
21PS                   SET COMPLETION CODE = DATA RECEIVED
                    ENDIF
                 ELSE
15PS                ADD 1 TO INVALID CHECKSUM COUNTER
21PS                SET COMPLETION CODE = RETRY
                    SET ERROR CODE = INVALID CHECKSUM
                 ENDIF
              ELSE
14PS             ADD 1 TO INVALID SEQUENCE COUNTER
21PS             SET COMPLETION CODE = RETRY
                 SET ERROR CODE = INVALID SEQUENCE
              ENDIF
           ELSE
PS13          ADD 1 TO TOTAL NUMBER OF TIME-OUTS
21PS          SET COMPLETION CODE = RETRY
              SET ERROR CODE = TIME-OUT
           ENDIF
21PS       IF COMPLETION CODE = DATA RECEIVED THEN
23PS          GET PSC RESPONSE PROCESSING BUFFER
              IF ONE RECEIVED THEN
22PS             PLACE DATA INPUT INTO RESPONSE PROC. BUFFER
23PS
24PS             PLACE BUFFER ADRS. ON PSC RESPONSE QUEUE
                 IF QUEUE FULL THEN
11PS                PANIC!
                 ELSE
30PS                POST RESPONSE PROCESSING EVENT
                 ENDIF
              ELSE
28PS             RESET PSC RESPONSE OVERFLOW EVENT
              ENDIF
           ELSE
              IF ERROR CODE SET THEN
10PS             IF DUMP FLAG SET THEN
02AL                GET ALARM MESSAGE BUFFER
                    IF ONE RECEIVED THEN
                       PLACE ERROR CODE INTO BUFFER
                       COPY LAST PSC MSG. RECEIVED INTO BUFFER
01AL                   PLACE BUFFER ADRS. ON ALARM MSG. QUEUE
                       IF ALARM MSG. QUEUE FULL THEN
11PS                      PANIC!
                       (ELSE)
                       ENDIF
                    ELSE
11PS                   PANIC!
```

```
            ENDIF
         (ELSE)
         ENDIF
      (ELSE)
      ENDIF
   ENDIF
29PS   RESET PSC INPUT/OUTPUT EVENT
21PS   POST COMPLETION CODE TO TIME-OUT TASK
ENDDO
EXIT




PSC POLL TASK


               - MODULE HISTORY -


   PROJECT:       DAS                    73-01709

   SUB-SYSTEM:    PSC COMMUNICATIONS

   MODULE:        PSPOL                  54


               - MODULE ABSTRACT -

   THIS TASK DELAYS FOR A PERIOD OF TIME THEN PLACES
A PSC IDLE MESSAGE INTO THE PSC OUTPUT QUEUE FOR
TRANSMISSION TO THE PSC.
DOUNTIL CPU STOPPED
08PS   DOWHILE IDLE MESSAGE COUNT LT. OR EQ. ZERO
          DELAY FOR ?? MS.
       ENDDO
08PS   DOWHILE IDLE MESSAGE COUNT > ZERO
          DELAY FOR ?? MS.
08PS      SUBTRACT 1 FROM IDLE MESSAGE COUNT
       ENDDO
01PS   GET PSC OUTPUT BUFFER
       IF ONE RECEIVED THEN
06PS      SET BUFFER FOR IDLE MESSAGE
02PS      PLACE BUFFER ADRS. ON PSC OUTPUT QUEUE
02PS      POST PSC RUN EVENT
          IF QUEUE FULL THEN
11PS         PANIC!
          (ELSE)
          ENDIF
       ELSE
11PS      PANIC!
       ENDIF
ENDDO
EXIT




PSC PANIC PROCESSOR


               - MODULE HISTORY -


   PROJECT:       DAS                    73-01709

   SUB-SYSTEM:    PSC COMMUNICATIONS

   MODULE:        PSPAN                  55
```

```
                        - MODULE ABSTRACT -

           THIS SUBROUTINE IS CALLED FROM SEVERAL PSC
        MODULES TO SEND A PANIC CODE TO THE ALARM MESSAGE SUB-SYSTEM
        TO PRINT A FATAL ERROR MESSAGE AND TO SUSPEND EXECUTION OF
        THE PSC SUB-SYSTEM.
11PS    GET INPUTS
07PS    SET COMMUNICATIONS LINK = CLOSED
01AL    PUT PANIC CODE INPUT INTO ALARM MSG. QUEUE
07AL
03AL

        DOUNTIL NEW IPL
           WAIT FOR IMPOSSIBLE EVENT
        ENDDO
        RETURN TO CALLER (NOT REALLY)



        PSC ALARM MESSAGE PROCESSING



                        - MODULE HISTORY -

           PROJECT:        DAS                    73-01709

           SUB-SYSTEM:     PSC COMMUNICATIONS

           MODULE:         PSA0                   56


                        - MODULE ABSTRACT -

           THIS SUBROUTINE PROCESSES ALL PSC RESPONSES OTHER THAN
        A TRANSFER COMPLETE. IT UPDATES THE APPROPRIATE MESSAGE
        COUNTER AND PRINTS THE APPROPRIATE MESSAGE AT THE
        LOG DEVICES.
26PS    GET INPUTS
23PS    GET PSC RESPONSE CODE
09PS    GET RESPONSE COUNT TABLE
        DOUNTIL RESPONSE CODE FOUND IN TABLE OR END OF TABLE
09PS       INDEX TO FIRST/NEXT TABLE ENTRY
23PS       IF RESPONSE CODE = TABLE ENTRY THEN
09PS
09PS          ADD 1 TO RESPONSE CODE COUNT
           (ELSE)
           ENDIF
        ENDDO
        IF END OF TABLE FOUND THEN
09PS       ADD 1 TO UNKNOWN RESPONSE COUNT
        (ELSE)
        ENDIF
02AL    GET AN ALARM MESSAGE BUFFER
        IF ONE RECEIVED THEN
26SC       IF DATA RECEIVED WITHIN RANGE THEN
25SC
23PS          CASENTRY (RESPONSE CODE)
                 CASE RESPONSE CODE = SORTATION LINE FULL
03AL                BUILD BUFFER FOR "SORTATION LINE FULL" MSG.
                 CASE RESPONSE CODE = SORTATION TRANSFER FAILURE
03AL                BUILD BUFFER FOR "SORTATION TRANSFER FAILURE" MSG.
40FM                ADD 1 TO TRANSFER FAILURES AT THIS LINE
                 CASE RESPONSE CODE = MISSORT
25SC                IF SORT DESTINATION = ZERO THEN
03AL                   BUILD BUFFER FOR "TRANSACTION LOST" MSG.
                    ELSE
03AL                   BUILD BUFFER FOR "MISSORT" MSG.
                    ENDIF
```

```
              CASE RESPONSE CODE = SUCCESSFUL TRANSFER              00000570
03AL             BUILD BUFFER FOR "OUT-OF-RANGE" MSG.               00000580
              CASE RESPONSE CODE = OTHER                            00000590
10PS             IF DUMP INPUT FLAG SET THEN                        00000600
03AL                BUILD BUFFER FOR PRINTING THE DATA RECEIVED     00000610
                 ELSE                                               00000620
02AL                RETURN ALARM MESSAGE BUFFER TO FREE POOL        00000630
                    IF FREE POOL FULL THEN                          00000640
11PS                   PANIC!                                       00000650
                    (ELSE)                                          00000660
                    ENDIF                                           00000670
                 ENDIF                                              00000680
              ENDCASE                                               00000690
           ELSE                                                     00000700
03AL          BUILD BUFFER FOR "OUT-OF-RANGE" MSG.                  00000710
           ENDIF                                                    00000720
           IF ALARM MESSAGE BUFFER NOT RETURNED TO FREE POOL THEN   00000730
01AL          PLACE BUFFER ADRS. ON ALARM MESSAGE QUEUE             00000740
              IF ALARM MESSAGE QUEUE FULL THEN                      00000750
11PS             PANIC!                                             00000760
              (ELSE)                                                00000770
              ENDIF                                                 00000780
           (ELSE)                                                   00000790
           ENDIF                                                    00000800
        ELSE                                                        00000810
11PS       PANIC!                                                   00000820
        ENDIF                                                       00000830
25PS    RETURN TO CALLER                                            00000840

                                                                    00000010
                                                                    00000020
                                                                    00000030
                                                                    00000040
                                                                    00000050
        PSC RESPONSE TIME-OUT TASK                                  00000060
                                                                    00000070
                                                                    00000080
                                                                    00000090
                    - MODULE HISTORY -                              00000100
                                                                    00000110
                                                                    00000120
           PROJECT:     DAS              76-01709                   00000130
                                                                    00000140
           SUB-SYSTEM:  PSC COMMUNICATIONS                          00000150
                                                                    00000160
           MODULE:      PSTO             52                         00000170
                                                                    00000180
                                                                    00000190
                    - MODULE ABSTRACT -                             00000200
                                                                    00000210
        THIS TASK IS THE PSC RESPONSE TIME-OUT TASK. IF THE PSC     00000220
        HAS NOT RESPONDED WHEN THIS TASK TIMES OUT, THE INPUT       00000230
        REQUEST OF TASK "PSIO" IS TERMINATED. WHEN A COMPLETION     00000240
        CODE IS SET BY TASK "PSIO", THIS TASK WILL POST THAT CODE   00000250
        BACK TO THE PSC CONTROL TASK "PSOC".                        00000260
        RESET TIME-OUT COUNT                                        00000270
21PS    DOWHILE COMPLETION CODE NOT POSTED AND TIME-OUT COUNT NOT ZERO  00000280
           DELAY FOR ?? MS.                                         00000290
           SUBTRACT 1 FROM THE TIME-OUT COUNT                       00000300
        ENDDO                                                       00000310
21PS    IF COMPLETION CODE NOT POSTED THEN                          00000320
           KILL THE PSC READ FUNCTION                               00000330
21PS       WAIT FOR COMPLETION CODE TO BE POSTED                    00000340
        (ELSE)                                                      00000350
        ENDIF                                                       00000360
21PS    POST COMPLETION CODE TO PSC CONTROL TASK "PSOC"             00000370
17PS                                                                00000380
        EXIT                                                        00000390
```

```
                    PSC OUTPUT MESSAGE FORMATTING

                            - MODULE HISTORY -

            PROJECT:        DAS                 75-01709

            SUB-SYSTEM:     PSC COMMUNICATIONS

            MODULE:         PSMF                50

                            - MODULE ABSTRACT -

            THIS SUBROUTINE FORMATES THE PSC OUTPUT MESSAGE INTO
            A FORM THAT CAN BE TRANSMITTED OVER THE TTY LINE TO THE
            PSC. IF THE INPUT MESSAGE TYPE IS NOT ONE OF THE VALID
            TYPES, THIS ROUTINE WILL RETURN TO THE CALLER WITH
            AN ERROR CODE.
 16PS       GET INPUTS
 16PS       SET RETURN CODE = ERROR
 12PS       PLACE THE CURRENT OUTPUT SEQUENCE BYTE IN OUTPUT BUFFER
 16PS       CASENTRY (MESSAGE CODE)
               CASE MESSAGE CODE = IDLE
 18PS             BUILD IDLE MESSAGE IN OUTPUT BUFFER
 16PS             SET RETURN CODE = SUCCESSFUL
               CASE MESSAGE CODE = OPEN LINK
 19PS             BUILD OPEN LINK MESSAGE IN OUTPUT BUFFER
 16PS             SET RETURN CODE = SUCCESSFUL
               CASE MESSAGE CODE = INDUCT PACKAGE
 20PS             BUILD INDUCT PACKAGE MESSAGE IN OUTPUT BUFFER
                  IF NO CONVERSION ERRORS FOUND AND DATA IN RANGE THEN
 16PS                SET RETURN CODE = SUCCESSFUL
                  (ELSE)
                  ENDIF
            ENDCASE
            IF RETURN CODE = SUCCESSFUL THEN
 27PS          COMPUTE MESSAGE CHECKSUM
 18PS          PLACE CHECKSUM IN OUTPUT BUFFER
 19PS
 20PS
            (ELSE)
            ENDIF
 16PS       RETURN TO CALLER
```

```
                    INDUCTION SCANNER #2 TASK

                            - MODULE HISTORY -

            PROJECT:        DAS                 75-01709

            SUB-SYSTEM:     SCANNER INPUT

            MODULE:         SCSR2               10
```

- MODULE ABSTRACT -

THIS TASK RUNS UNTIL THE SCANNER STOP FLAG IS SET (-1). IT
FIRST READS A TRANSACTION NUMBER FROM INDUCTION SCANNER #2, THEN
CONVERTS THE NUMBER TO BINARY. AN ERROR FLAG IS SENT TO THE PACK-
AGE PROCESSING TASK (SCIND) TO INDICATE THE STATUS OF THE READ.
THE SCAN INFORMATION IS PUT ON THE INDUCTION QUEUE AND THE PACK-
AGE PROCESSING TASK EVENT IS POSTED.

```
                ENQUEUE THE SCANNER
01SC            DO UNTIL THE SCANNER STOP FLAG IS SET
04SC                READ THE TRANSACTION NUMBER (READTEXT)
                    IF THE BUFFER IS NOT COMPLETELY FULL, THEN
20SC                    GET AN INDUCTION QUEUE BUFFER
20SC                    IF ONE RECEIVED, THEN
06SC                        PUT IN SCANNER ID
                            CONVERT TRANSACTION NUMBER FROM EBCDIC TO BINARY
11SC                        IF ANY ERRORS (CONVERSION, < 5-DIGITS), THEN
                                SET TRANSACTION NUMBER TO ZERO AND PUT IN BUFFER
14SC                            GET STOP ON NOREAD FLAG FROM SYSCOM
11SC                            MOVE NO READ FLAG TO ERROR FLAG
                            ELSE
                                SET ERROR FLAG = -1
                            ENDIF
11SC                        PUT ERROR FLAG IN BUFFER
21SC                        PUT ADDRESS OF BUFFER ON INDUCTION QUEUE
21SC                        IF THERE WAS NO ROOM, THEN
01SC                            SET SCANNER STOP FLAG
07AL                            PANIC
                            ELSE
18SC                            POST PACKAGE PROCESSING TASK EVENT
                            ENDIF
                        ELSE
01SC                        SET SCANNER STOP FLAG
07AL                        PANIC
                        ENDIF
                    (ELSE)
                    ENDIF
                ENDDO
                DEQUEUE THE SCANNER
                ENDTASK
```

INDUCTION SCANNER #1 TASK

- MODULE HISTORY -

PROJECT:        DAS                     76-01709

SUB-SYSTEM:     SCANNER INPUT

- MODULE ABSTRACT -

THIS TASK RUNS UNTIL THE SCANNER STOP FLAG IS SET (-1). IT
FIRST READS A TRANSACTION NUMBER FROM INDUCTION SCANNER #1, THEN
CONVERTS THE NUMBER TO BINARY. AN ERROR FLAG IS SENT TO THE PACK-
AGE PROCESSING TASK (SCIND) TO INDICATE THE STATUS OF THE READ.
THE SCAN INFORMATION IS PUT ON THE INDUCTION QUEUE AND THE PACK-
AGE PROCESSING TASK EVENT IS POSTED.

```
        ENQUEUE THE SCANNER
01SC    DO UNTIL THE SCANNER STOP FLAG IS SET
04SC       READ THE TRANSACTION NUMBER (READTEXT)
           IF THE BUFFER IS NOT COMPLETELY FULL, THEN
20SC          GET AN INDUCTION QUEUE BUFFER
20SC          IF ONE RECEIVED, THEN
06SC             PUT IN SCANNER ID
                 CONVERT TRANSACTION NUMBER FROM EBCDIC TO BINARY
11SC             IF ANY ERRORS (CONVERSION, < 5-DIGITS), THEN
                    SET TRANSACTION NUMBER TO ZERO AND PUT IN BUFFER
14SC                GET STOP ON NOREAD FLAG FROM SYSCOM
11SC                MOVE NO READ FLAG TO ERRROR FLAG
                 ELSE
                    SET ERROR FLAG = -1
                 ENDIF
11SC             PUT ERROR FLAG IN BUFFER
21SC             PUT ADDRESS OF BUFFER ON INDUCTION QUEUE
21SC             IF THERE WAS NO ROOM, THEN
01SC                SET SCANNER STOP FLAG
07AL                PANIC
                 ELSE
18SC                POST PACKAGE PROCESSING TASK EVENT
                 ENDIF
              ELSE
01SC             SET SCANNER STOP FLAG
07AL             PANIC
              ENDIF
           (ELSE)
           ENDIF
        ENDDO
        DEQUEUE THE SCANNER
        ENDTASK
```

```
        SCANNER INITIALIZATION PROGRAM

                      - MODULE HISTORY -

           PROJECT:        DAS                    7G-01709

           SUB-SYSTEM:     SCANNER INPUT

           MODULE:         SCINIT                 5

                      - MODULE ABSTRACT -

          THIS PROGRAM WILL BE LOADED INTO MEMORY BY THE INI-
        TIAL SYSTEM PROGRAM.  ONCE LOADED IT WILL SET THE SCAN-
        NER STOP FLAG TO NOSTOP.  AFTER ATTACHING ALL OF THE
        SCANNER ROUTINES, IT WILL GO INTO A LOOP AND POST THE
        PACKAGE PROCESSING TASK EVENT AND THE STATUS UPDATE TASK
        EVENT ONCE EVERY 5 SECONDS. IF THE SCANNER STOP FLAG IS
        EVER SET, IT WILL DROP OUT OF THE LOOP AND WAIT FOR AN
        EVENT THAT WILL NEVER BE POSTED JUST TO KEEP IT IN MEMORY.

02SC    INITIALIZATION
01SC    INITIALIZE SCANNER STOP FLAG TO NOSTOP (0)
39FM    GET NUMBER OF SCANNERS AND TYPES FROM SYSCOM
        ATTACH THOSE TASKS
        ATTACH SCTSU
        ATTACH SCINDT
        DO UNTIL THE SCANNER STOP FLAG IS SET
           DELAY 5 SECONDS
18SC       POST THE PACKAGE PROCESSING TASK EVENT
```

```
19SC      POST THE STATUS UPDATE TASK EVENT
       ENDDO
10SC   WAIT FOR PROGSTOP EVENT
       PROGRAM STOP




       TRANSACTION STATUS UPDATE TASK



                    - MODULE HISTORY -


          PROJECT:        DAS                   73-01709

          SUB-SYSTEM:     SCANNER INPUT

          MODULE:         SCTSU                 12


                    - MODULE ABSTRACT -


       THIS TASK RUNS UNTIL THE SCANNER STOP FLAG IS SET.  IT
     FIRST GETS THE ADDRESS OF THE BUFFER OFF THE STATUS UPDATE
     QUEUE, THEN GETS THE STATUS AND TRANSACTION NUMBER OUT OF THE
     BUFFER.  IT THEN ENQUEUES AND CALLS THE FILE MANAGER TO CHNGE
     THE STATUS. ON RETURN FROM THE FILE MANAGER IT IS DEQUEUED AND
     THE RETURN CODE IS CHECKED. ANY CODE OTHER THAN SUCCESSFUL OR
     OR TRANSACTION NOT ON FILE IS CONSIDERED A FATAL ERROR. IF THE
     TRANSACTION WAS NOT FOUND AN ALARM MESSAGE IS PRINTED. IF THE
     ERROR IS CONSIDERED FATAL, A PANIC IS EXECUTED AND THE SCANNER
     STOP FLAG IS SET TO BRING DOWN THE SUB-SYSTEM.  IN ANY OF THE
     THREE CASES, THE STATUS UPDATE BUFFER IS RETRNED TO THE QUEUE.
     IF THE SCANNER STOP FLAG IS NOT YET SET, THE QUEUE IS CHECKED
     FOR ANOTHER ENTRY. IF THERE IS ONE, IT IS PROCESSED. IF NOT,
     A WAIT FOR STATUS UPDATE TASK EVENT IS PERFORMED.

02SC   INITIALIZATION
01SC   DOUNTIL THE SCANNER STOP FLAG IS SET
          DOUNTIL AN ENTRY RECIEVED FROM THE UPDATE QUEUE
19SC         WAIT FOR STATUS UPDATE TASK EVENT
09SC         GET A BUFFER ADDRESS OFF THE STATUS UPDATE QUEUE
09SC         IF NONE RECIEVED, THEN
15SC            GET THE SLOW DOWN FLAG
15SC            IF THE SLOW DOWN FLAG IS SET, THEN
16SC               GET A BUFFER ADDRESS OFF THE RESERVE QUEUE
16SC               IF NONE RECEIVED, THEN
15SC                  CLEAR THE SLOW DOWN FLAG
                   (ELSE)
                   ENDIF
                (ELSE)
                ENDIF
             (ELSE)
             ENDIF
05SC         IF A BUFFER ADDRESS WAS RECEIVED, THEN
17SC
                GET THE DATA FROM THE BUFFER
05SC            RETURN THE BUFFER TO THE BUFFER QUEUE
17SC
                IF THERE IS NO ROOM, THEN
08AL               PANIC
                (ELSE)
                ENDIF
             ELSE
19SC            RESET STATUS UPDATE TASK EVENT
             ENDIF
          ENDDO
          SET ERROR CODE = GOOD
```

```
09FM       GET A FILE MANAGER INPUT BUFFER
09FM       IF ONE RECIEVED THEN
10FM          PUT IN CHANGE STATUS CALL CODE
17FM          PUT IN DATA
04FM
08FM          CALL THE FILE MANAGER
17FM          GET THE RETURN CODE
11FM          IF RETURN CODE NOT = SUCCESSFUL THEN
11FM             IF RETURN CODE = RECORD NOT FOUND THEN
02AL                GET AN ALARM MESSAGE BUFFER
02AL                IF ONE RECIEVED THEN
03AL                   PUT IN MESSAGE #
                       PUT IN TRANSACTION #
                       PUT IN SCANNER ID
01AL                   PUT ADDRESS OF BUFFER ON ALARM QUEUE
01AL                   IF ALREADY FULL THEN
08AL                      SET ERROR CODE = FATAL,ALARM QUE FULL
                       (ELSE)
                       ENDIF
                    ELSE
08AL                   SET ERROR CODE = FATAL, ALARM BUFQUE EMPTY
                    ENDIF
                 ELSE
08AL                SET ERROR CODE = FATAL, BAD RTURN FROM FM
                 ENDIF
              (ELSE)
              ENDIF
08FM          RETURN FILE MANAGER BUFFER
08FM          IF NO ROOM THEN
08AL             SET ERROR CODE = FATAL,FM BUFFER QUE FULL
              (ELSE)
              ENDIF
           ELSE
08AL          SET ERROR CODE = FATAL, NO FILE MANAGER BUFFER
           ENDIF
05SC       RETURN STATUS UPDATE BUFFER
05SC       IF THERE IS NO ROOM THEN
08AL          SET ERROR CODE = FATAL, STATUS UPDATE BUFQUE FULL
           (ELSE)
           ENDIF
           IF ERROR CODE = FATAL THEN
08AL          USE ERROR CODE FOR PANIC CODE
01SC          SET SCANNER STOP FLAG
07AL          PANIC
           (ELSE)
           ENDIF
        ENDDO
        ENDTASK
```

---

```
        INDUCTION SCANNER TASK


                     - MODULE HISTORY -


           PROJECT:       DAS                 73-01709

           SUB-SYSTEM:    SCANNER INPUT

           MODULE:        SCIND               13


                     - MODULE ABSTRACT -


   THIS TASK IS ATTACHED BY THE SCANNER INITIALIZATION PROGRAM.
IT THEN WAITS ON THE PACKAGE PROCESSING EVENT TO BE POSTED.
WHEN POSTED IT WILL GET AN ENTRY FROM THE INDUCTION QUEUE AND
GET THE DATA FROM THE BUFFER. THE DATA WILL THEN BE PROCESSED.
```

```
02SC     INITIALIZATION
01SC     DO UNTIL THE SCANNER STOP FLAG IS SET
            RESET FLAGS (STATUS,PSC)
            SET MSG# = 0
            SET PANIC CODE = 0
09SC        SET DESTINATION = RECIRCULATION
21SC        DO UNTIL ELEMENT RECEIVED FROM INDUCTION QUEUE
18SC           WAIT FOR PACKAGE PROCESSING TASK EVENT
21SC           GET AN ELEMENT FROM THE QUEUE
21SC           IF NONE RECEIVED, THEN
18SC              RESET EVENT
               (ELSE)
               ENDIF
            ENDDO
20SC        GET THE DATA FROM THE BUFFER
20SC        PUT THE BUFFER ON THE BUFFER QUEUE
20SC        IF THERE WAS ROOM, THEN
07PS           GET THE PSC COMMUNICATIONS FLAG
07PS           IF THE LINK IS OPEN, THEN
15SC              IF THE SLOW DOWN FLAG IS SET, THEN
16SC                 SET UP TO USE THE ALTERNATE QUEUES
17SC
                  ELSE
05SC                 SET UP TO USE THE PRIMARY QUEUES
08SC
                  ENDIF
12SC              GET THE ERROR FLAG
12SC              IF THE ERROR FLAG = -1 THEN
13SC                 IF TRANSACTION# NOT = 0 THEN
23SC
03FM                    COMPUTE RELATIVE RECORD NUMBER
03FM                    READ RECORD FROM TRANSACTION DIRECTORY
                        IF THERE WERE NO READ ERRORS THEN
                           SET PSC FLAG
03FM                       COMPUTE INDEX TO BUFFER
03FM                       GET RELATIVE TRANSACTION NUMBER
23SC                       IF ON FILE THEN
03FM                          GET RELATIVE BATCH AND DESTINATION
02FM                          GET BATCH STATUS FROM RESIDENT BATCH TABLE
23SC
02FM                          IF STATUS = PENDING, ACTVE, OR CMPLTE THEN
04FM                             COMPUTE RELTIVE RCRD FOR THE TRANS FILE
04FM                             READ RECORD FROM TRANSACTION FILE
                                 IF THERE WERE NO ERRORS, THEN
04FM                                COMPUTE INDEX TO BUFFER
04FM                                GET THE TRANSACTION NUMBER
23SC                                IF THIS TRANS# EQ OUR TRANS#, THEN
                                       SET STATUS FLAG
23SC                                   IF BATCH STATUS = ACTIVE THEN
04FM                                      PICK UP DESTINATION
                                       ELSE
03AL                                      SET MSG# = TRANS OUT OF BATCH
23SC                                      IF THE BATCH IS COMPLETE, THEN
13SC                                         SET DESTINATION = ERROR
                                          (ELSE)
                                          ENDIF
                                       ENDIF
                                    ELSE
03AL                                   SET MSG# = TRANS NOT ON FILE
13SC                                   SET DESTINATION = ERROR
                                    ENDIF
                                 ELSE
                                    SET PANIC CODE = READ ERROR
                                 ENDIF
                              ELSE
03AL                             SET MSG# = TRANS NOT ON FILE
13SC                             SET DESTINATION = ERROR
                              ENDIF
                           ELSE
03AL                          SET MSG# = TRANS NOT ON FILE
13SC                          SET DESTINATION = ERROR
                           ENDIF
                        ELSE
```

```
08AL                SET PANIC CODE = READ ERROR
                 ENDIF
              ELSE
                 SET PSC FLAG
13SC             GET ERROR DESTINATION
13SC             SET DESTINATION = ERROR
              ENDIF
           ELSE
              INCREMENT NOREAD COUNT FOR THIS SCANNER IN SYSCOM
03AL          SET MSG# = SCANNER READ ERROR
12SC          IF ERROR FLAG = 0 THEN
                 SET PSC FLAG
              (ELSE)
              ENDIF
           ENDIF
        (ELSE)
        ENDIF
     ELSE
08AL    SET PANIC CODE = INDUCTION BUFFER QUEUE FULL
     ENDIF
     IF PSC FLAG SET THEN
01PS    GET A BUFFER FROM THE PSC BUFFER QUEUE
01PS    IF ONE RECIEVED THEN
03PS       PUT IN CODE FOR INDUCT PACKAGE
04PS       PUT IN TRANSACTION NUMBER
04PS       PUT IN SCANNER ID
           IF THE DESTINATION IS NOT RECIRC OR THE ERR CHUTE, THEN
06FM          GET DEST. FROM SRT TRNSLTN TBLE
06FM          IF TRNSLTN TBLE DEST = 0, THEN
06FM             DEST = DIRECTORY DESTINATION
              ELSE
06FM             DEST = TRNSLTION TBLE DEST
              ENDIF
           ELSE
              IF THE DESTINATION IS RECIRC, THEN
40FM             INCREMENT THE RECIRC CNT IN SYSCOM
              ENDIF
           ENDIF
04PS       PUT IN DESTINATION
02PS       PUT ADDRESS OF BUFFER ON PSC OUTPUT QUEUE
02PS       IF THE PSC OUTPUT QUEUE IS FULL THEN
08AL          SET PANIC CODE = PSC OUTPUT QUEUE FULL
           ELSE
02PS          GET ADDRESS OF PSC EVENT
02PS          POST PSC EVENT
           ENDIF
        ELSE
08AL       SET PANIC CODE = PSC BUFFER QUEUE EMPTY
        ENDIF
     (ELSE)
     ENDIF
     IF MESSAGE NUMBER NOT EQUAL TO ZERO THEN
02AL    GET AN ALARM MESSAGE OUTPUT BUFFER
02AL    IF ONE RECIEVED THEN
03AL       PUT IN MESSAGE#, SCANNER ID, AND TRANS #
01AL       PUT ADDRESS OF BUFFER ON ALARM MESSAGE QUEUE
01AL       IF THE ALARM QUEUE IS FULL THEN
08AL          SET PANIC CODE = ALARM QUEUE FULL
           (ELSE)
           ENDIF
        ELSE
08AL       SET PANIC CODE = ALARM BUFFER QUEUE EMPTY
        ENDIF
     (ELSE)
     ENDIF
     IF STATUS FLAG SET THEN
        ENQUEUE THE QUEUE RESOURCE
        DOUNTIL A BUFFER IS RECIEVED FROM THE BUFFER QUEUE
05SC       GET A BUFFER
17SC
05SC       IF ONE RECIEVED THEN
04FM          PUT IN STATUS, SCANNER ID, TRANS#, AND DIRCTRY ENTRY
08SC          PUT ADDRESS OF BUFFER ON STATUS UPDATE QUEUE
08SC          IF THE QUEUE IS ALREADY FULL THEN
```

```
08AL                  SET PANIC CODE = STATUS UPDATE QUEUE FULL
                    ELSE
19SC                    POST STATUS UPDATE TASK EVENT
                    ENDIF
                ELSE
15SC                GET THE SLOW DOWN FLAG
15SC                IF IT IS NOT SET, THEN
16SC                    SET UP TO USE ALTERNATE QUEUES
17SC
15SC                    SET THE SLOW DOWN FLAG
                    ELSE
08AL                    PANIC
                    ENDIF
                ENDIF
            ENDDO
            DEQUEUE THE QUEUE RESOURCE
        (ELSE)
        ENDIF
        IF PANIC CODE NOT EQUAL TO ZERO THEN
08AL        GET PANIC CODE
01SC        SET SCANNER STOP FLAG
07AL        PANIC
        (ELSE)
        ENDIF
    ENDDO
    ENDTASK



    STOCK OUT SCANNER TASK


                - MODULE HISTORY -

      PROJECT:        DAS                   73-01709

      SUB-SYSTEM:     SCANNER INPUT

      MODULE:         SCST3                 6

                - MODULE ABSTRACT -

    THIS TASK RUNS UNTIL THE SCANNER STOP FLAG IS SET (-1).  IT
  FIRST READS A TRANSACTION NUMBER FROM THE STOCK OUT SCANNER,
  THEN CONVERTS THE NUMBER TO BINARY.  IF THERE WERE ANY ERRORS AN
  ALARM MESSAGE IS PRINTED TO TELL THE OPERATOR.  OTHERWISE A
  STATUS UPDATE BUFFER IS OBTAINED.  IN IT ARE PUT THE NEW STATUS
  AND TRANSACTION NUMBER.  THE ADDRESS OF THE BUFFER IS THEN PUT
  ON THE STATUS UPDATE QUEUE AND THE STATUS UPDATE TASK EVENT IS
  POSTED. THEN THE PROCESS STARTS ALL OVER WAITING FOR ANOTHER READ.

    ENQUEUE THE STOCK OUT SCANNER
02SC    INITIALIZATION
01SC    DOUNTIL SCANNER STOP FLAG SET
        RESET THE FATAL FLAG
04SC    READ THE TRANSACTION NUMBER (READTEXT)
        IF WE RECEIVED 7 BYTES (6-CHAR AND LINEFEED)
            CONVERT FROM EBCDIC TO BINARY
        (ELSE)
        ENDIF
04SC    IF NO ERRORS (CONVERSION,=0,<6 DIGITS) THEN
05SC        GET A BUFFER FROM THE STATUS UPDATE BUFFER QUEUE
05SC        IF ONE RECIEVED THEN
06SC            PUT IN SCANNER ID
                PUT IN TRANSACTION NUMBER
04FM            PUT IN STATUS
```

```
08SC          PUT ADDRESS OF BUFFER ON STATUS UPDATE QUEUE
08SC          IF STATUS UPDATE QUEUE ALREADY FULL THEN
                 SET FATAL FLAG
08AL             SET PANIC CODE = STATUS UPDATE QUEUE FULL
              ELSE
19SC             POST THE STATUS UPDATE TASK EVENT
              ENDIF
           ELSE
              SET FATAL FLAG
08AL          SET PANIC CODE = STATUS UPDT BUFQUE EMPTY
           ENDIF
        ELSE
           IF THE READ BUFFER WAS NOT FULL, THEN
02AL          GET A BUFFER FROM THE ALARM MESSAGE BUFFER QUEUE
02AL          IF ONE RECIEVED THEN
03AL             PUT IN MESSAGE NUMBER = NOREAD
06SC             PUT IN SCANNER ID
01AL             PUT ADDRESS OF BUFFER ON ALARM QUEUE
01AL             IF THERE IS NO ROOM THEN
                    SET FATAL FLAG
08AL                SET PANIC CODE = ALRM QUE FULL
                 (ELSE)
                 ENDIF
              ELSE
                 SET FATAL FLAG
08AL             SET PANIC CODE = ALRM BUFQUE EMPTY
              ENDIF
           (ELSE)
           ENDIF
        ENDIF
        IF THE FATAL FLAG IS SET THEN
01SC       SET SCANNER STOP FLAG
08AL       GET PANIC CODE
37AL       PANIC
        (ELSE)
        ENDIF
     ENDDO
     DEQUEUE THE SCANNER
     ENDTASK
```

---

EXCESS REPACK SCANNER TASK

- MODULE HISTORY -

| | | |
|---|---|---|
| PROJECT: | DAS | 73-01709 |
| SUB-SYSTEM: | SCANNER INPUT | |
| MODULE: | SCXRP | 8 |

- MODULE ABSTRACT -

THIS TASK RUNS UNTIL THE SCANNER STOP FLAG IS SET (-1). IT FIRST READS A TRANSACTION NUMBER FROM THE EXCESS REPACK SCANNER, THEN CONVERTS THE NUMBER TO BINARY. IF THERE WERE ANY ERRORS AN ALARM MESSAGE IS PRINTED TO TELL THE OPERATOR. OTHERWISE A STATUS UPDATE BUFFER IS OBTAINED. IN IT ARE PUT THE NEW STATUS AND TRANSACTION NUMBER. THE ADDRESS OF THE BUFFER IS THEN PUT ON THE STATUS UPDATE QUEUE AND THE STATUS UPDATE TASK EVENT IS POSTED. THEN THE PROCESS STARTS ALL OVER WAITING FOR ANOTHER READ.

```
        ENQUEUE THE EXCESS REPACK SCANNER
02SC    INITIALIZATION
01SC    DOUNTIL SCANNER STOP FLAG SET
           RESET THE FATAL FLAG
04SC       READ THE TRANSACTION NUMBER (READTEXT)
           IF WE RECEIVED 7 BYTES (6-CHAR AND LINEFEED)
              CONVERT FROM EBCDIC TO BINARY
           (ELSE)
           ENDIF
04SC       IF NO ERRORS (CONVERSION,=0,<6 DIGITS) THEN
05SC          GET A BUFFER FROM THE STATUS UPDATE BUFFER QUEUE
05SC          IF ONE RECIEVED THEN
06SC             PUT IN SCANNER ID
                 PUT IN TRANSACTION NUMBER
04FM             PUT IN STATUS
08SC             PUT ADDRESS OF BUFFER ON STATUS UPDATE QUEUE
08SC             IF STATUS UPDATE QUEUE ALREADY FULL THEN
                    SET FATAL FLAG
08AL                SET PANIC CODE = STATUS UPDATE QUEUE FULL
                 ELSE
19SC                POST THE STATUS UPDATE TASK EVENT
                 ENDIF
              ELSE
                 SET FATAL FLAG
08AL             SET PANIC CODE = STATUS UPDT BUFQUE EMPTY
              ENDIF
           ELSE
              IF THE READ BUFFER WAS NOT FULL, THEN
02AL             GET A BUFFER FROM THE ALARM MESSAGE BUFFER QUEUE
02AL             IF ONE RECIEVED THEN
03AL                PUT IN MESSAGE NUMBER = NOREAD
06SC                PUT IN SCANNER ID
01AL                PUT ADDRESS OF BUFFER ON ALARM QUEUE
01AL                IF THERE IS NO ROOM THEN
                       SET FATAL FLAG
08AL                   SET PANIC CODE = ALRM QUE FULL
                    (ELSE)
                    ENDIF
                 ELSE
                    SET FATAL FLAG
08AL                SET PANIC CODE = ALRM BUFQUE EMPTY
                 ENDIF
              (ELSE)
              ENDIF
           ENDIF
           IF THE FATAL FLAG IS SET THEN
01SC          SET SCANNER STOP FLAG
08AL          GET PANIC CODE
07AL          PANIC
           (ELSE)
           ENDIF
        ENDDO
        DEQUEUE THE SCANNER
        ENDTASK
```

```
         SHIPMENT SCANNER TASK

                    - MODULE HISTORY -

           PROJECT:       DAS                  73-01709

           SUB-SYSTEM:    SCANNER INPUT

           MODULE:        SCSHP                7
```

```
                       - MODULE ABSTRACT -


   THIS TASK RUNS UNTIL THE SCANNER STOP FLAG IS SET (-1).  IT
FIRST READS A TRANSACTION NUMBER FROM THE SHIPMENT SCANNER,
THEN CONVERTS THE NUMBER TO BINARY.  IF THERE WERE ANY ERRORS AN
ALARM MESSAGE IS PRINTED TO TELL THE OPERATOR.  OTHERWISE A
STATUS UPDATE BUFFER IS OBTAINED.  IN IT ARE PUT THE NEW STATUS
AND TRANSACTION NUMBER.  THE ADDRESS OF THE BUFFER IS THEN PUT
ON THE STATUS UPDATE QUEUE AND THE STATUS UPDATE TASK EVENT IS
POSTED. THEN THE PROCESS STARTS ALL OVER WAITING FOR ANOTHER READ.

        ENQUEUE THE SHIPMENT SCANNER
02SC    INITIALIZATION
01SC    DOUNTIL SCANNER STOP FLAG SET
           RESET THE FATAL FLAG
04SC       READ THE TRANSACTION NUMBER (READTEXT)
           IF WE RECEIVED 7 BYTES (6-CHAR AND LINEFEED)
              CONVERT FROM EBCDIC TO BINARY
           (ELSE)
           ENDIF
04SC       IF NO ERRORS (CONVERSION,=0,<6 DIGITS) THEN
05SC          GET A BUFFER FROM THE STATUS UPDATE BUFFER QUEUE
05SC          IF ONE RECIEVED THEN
06SC             PUT IN SCANNER ID
                 PUT IN TRANSACTION NUMBER
04FM             PUT IN STATUS
08SC             PUT ADDRESS OF BUFFER ON STATUS UPDATE QUEUE
08SC             IF STATUS UPDATE QUEUE ALREADY FULL THEN
                    SET FATAL FLAG
08AL                SET PANIC CODE = STATUS UPDATE QUEUE FULL
                 ELSE
19SC                POST THE STATUS UPDATE TASK EVENT
                 ENDIF
              ELSE
                 SET FATAL FLAG
08AL             SET PANIC CODE = STATUS UPDT BUFQUE EMPTY
              ENDIF
           ELSE
              IF THE READ BUFFER WAS NOT FULL, THEN
02AL             GET A BUFFER FROM THE ALARM MESSAGE BUFFER QUEUE
02AL             IF ONE RECIEVED THEN
03AL                PUT IN MESSAGE NUMBER = NOREAD
06SC                PUT IN SCANNER ID
01AL                PUT ADDRESS OF BUFFER ON ALARM QUEUE
01AL                IF THERE IS NO ROOM THEN
                       SET FATAL FLAG
08AL                   SET PANIC CODE = ALRM QUE FULL
                    (ELSE)
                    ENDIF
                 ELSE
                    SET FATAL FLAG
08AL                SET PANIC CODE = ALRM BUFQUE EMPTY
                 ENDIF
              (ELSE)
              ENDIF
           ENDIF
           IF THE FATAL FLAG IS SET THEN
01SC          SET SCANNER STOP FLAG
08AL          GET PANIC CODE
07AL          PANIC
           (ELSE)
           ENDIF
        ENDDO
        DEQUEUE THE SCANNER
        ENDTASK
```

```
INDUCTION SCANNER #3 TASK

              - MODULE HISTORY -

   PROJECT:        DAS                    73-01709

   SUB-SYSTEM:     SCANNER INPUT

              - MODULE ABSTRACT -

   THIS TASK RUNS UNTIL THE SCANNER STOP FLAG IS SET (-1). IT
FIRST READS A TRANSACTION NUMBER FROM INDUCTION SCANNER #3, THEN
CONVERTS THE NUMBER TO BINARY. AN ERROR FLAG IS SENT TO THE PACK-
AGE PROCESSING TASK (SCIND) TO INDICATE THE STATUS OF THE READ.
THE SCAN INFORMATION IS PUT ON THE INDUCTION QUEUE AND THE PACK-
AGE PROCESSING TASK EVENT IS POSTED.

        ENQUEUE THE SCANNER
01SC    DO UNTIL THE SCANNER STOP FLAG IS SET
04SC       READ THE TRANSACTION NUMBER (READTEXT)
           IF THE BUFFER IS NOT COMPLETELY FULL, THEN
20SC          GET AN INDUCTION QUEUE BUFFER
20SC          IF ONE RECEIVED, THEN
06SC             PUT IN SCANNER ID
                 CONVERT TRANSACTION NUMBER FROM EBCDIC TO BINARY
11SC             IF ANY ERRORS (CONVERSION, < 5-DIGITS), THEN
                    SET TRANSACTION NUMBER TO ZERO AND PUT IN BUFFER
14SC                GET STOP ON NOREAD FLAG FROM SYSCOM
11SC                MOVE NO READ FLAG TO ERROR FLAG
                 ELSE
                    SET ERROR FLAG = -1
                 ENDIF
11SC             PUT ERROR FLAG IN BUFFER
21SC             PUT ADDRESS OF BUFFER ON INDUCTION QUEUE
21SC             IF THERE WAS NO ROOM, THEN
01SC                SET SCANNER STOP FLAG
07AL                PANIC
                 ELSE
18SC                POST PACKAGE PROCESSING TASK EVENT
                 ENDIF
              ELSE
01SC             SET SCANNER STOP FLAG
07AL             PANIC
              ENDIF
          (ELSE)
          ENDIF
        ENDDO
        DEQUEUE THE SCANNER
        ENDTASK
```

```
MIS-SORT REPORT

              - MODULE HISTORY -

   PROJECT:        DAS                    73-01709

   SUB-SYSTEM:     OPERATOR INTERFACE

   MODULE:         OIMSR                  94
```

```
                 - MODULE ABSTRACT -

   THIS MODULE REQUESTS A BATCH ID. THE FILE MANAGER IS
CALLED TO READ THE BATCH FILE INFORMATION.
   IF THE BATCH INFORMATION IS FOUND, THE USER IS ASKED IF
ALL ORDERS ARE TO BE LISTED. IF ALL ORDERS ARE NOT TO BE
LISTED, A SPECIFIC ORDER ID IS REQUESTED, AND THE FILE
MANAGER IS CALLED TO READ THE ORDER FILE INFORMATION.
   IF HARDCOPY IS REQUIRED, THEN THE TERMINAL IS DEQUEUED
DEQUEUED AND THE SYSTEM PRINTER IS ENQUEUED. THE BATCH ID,
HEADER AND STATUS ARE THEN OUTPUT TO THE ENQUEUED DEVICE.
   IF ALL ORDERS TO BE LISTED, THE FILE MANAGER IS CALLED TO
SEQUENTIALLY READ EACH ORDER RECORD. FOR EACH ORDER RECORD,
OR THE SPECIFICLY REQUESTED ORDER RECORD, THE ORDER ID, ALL
QUANTITIES AND ORDER PERCENT COMPLETE ARE OUTPUT.
   THE FILE MANAGER IS CALLED TO SEQUENTIALLY READ EACH TRAN-
SACTION BLOCK. EACH TRANSACTION RECORD ASSOCIATED WITH THE
ORDER IS EXAMINED. IF THE TRANSACTION STATUS IS A MIS-SORT,
THE TRANSACTION INFORMATION IS OUTPUT TO THE ENQUEUED DEVICE.
THE TERMINAL/PRINTER IS DEQUEUED BEFORE THE PROGRAM ENDS.

        ENQUEUE USER TERMINAL
040I    DISPLAY ON USER TERMINAL "MIS-SORT REPORT"
030I    ASK USER FOR BATCH ID
120I
480I    DEQUEUE AN IPM BUFFER (GET.IPM)
490I    DEQUEUE RECORD BUFFER (GET.SRB)
600I    INITIALIZE PANIC CODE
160I    ACCESS BATCH FILE (GET.BATCH)
100I    IF BATCH RECORD FOUND (OK SET), THEN
030I    !  ASK USER IF ALL ORDERS TO BE LISTED
600I    !  IF NOT ALL ORDERS, THEN
030I    !     ASK USER FOR ORDER ID
130I    !
600I    !     INITIALIZE PANIC CODE
180I    !     ACCESS ORDER FILE (GET.ORDER)
100I    !     IF ORDER RECORD FOUND (OK SET), THEN
100I    !        SET SPECIFIC ORDER
        !     (ELSE)
        !     ENDIF
        !  ELSE
100I    !     SET OK
100I    !     CLEAR SPECIFIC ORDER
        !  ENDIF
100I    !  IF ORDER FOUND (OK SET), THEN
100I    !  !  SET ORDER SEQUENCE
100I    !  !  SET EXCEPTIONS
030I    !  !  ASK USER IF HARDCOPY OUTPUT IS REQUIRED
        !  !  IF HARDCOPY REQUIRED, THEN
100I    !  !     SET HARDCOPY
        !  !     DEQUEUE USER TERMINAL
        !  !     ENQUEUE PRINTER
        !  !  ELSE
100I    !  !     CLEAR HARDCOPY
        !  !  ENDIF
600I    !  !  INITIALIZE DATE, TIME, PAGE COUNT AND LINE COUNT
610I    !  !  PRINT/DISPLAY BATCH HEADINGS
610I    !  !  PRINT/DISPLAY BATCH INFORMATION
610I    !  !  PRINT/DISPLAY ORDER HEADINGS
600I    !  !  INITIALIZE PANIC CODE
130I    !  !  INITIALIZE ORDER COUNT
130I    !  !  DOUNTIL ORDER COUNT GREATER THAN MAXIMUM
100I    !  !  !  IF SPECIFIC ORDER SET, THEN
130I    !  !  !     UPDATE ORDER COUNT BEYOND MAXIMUM
120I    !  !  !
        !  !  !  ELSE
170I    !  !  !     FIND THE FIRST/NEXT ORDER IN THIS BATCH (FIND.ORDER)
        !  !  !  ENDIF
```

```
100I   !  !  !  IF ORDER RECORD FOUND (OK SET), THEN
130I   !  !  !  !  COMPUTE ORDER PERCENT COMPLETE
       !  !  !  !  SET LIST ORDER INFORMATION
610I   !  !  !  !  PRINT/DISPLAY ORDER INFORMATION AND PERCENT COMPLETE
       !  !  !  !  --- (FORMS.CTL) ---
100I   !  !  !  !  IF ABORT SET THEN
130I   !  !  !  !     SET ORDER COUNT GREATER THAN MAX.
       !  !  !  !  ELSE
       !  !  !  !  !  IF MIS-SORTS IN THIS ORDER THEN
       !  !  !  !  !  !  CLEAR LIST ORDER INFORMATION


610I   !  !  !  !  !  !  PRINT/DISPLAY TRANSACTION HEADINGS
600I   !  !  !  !  !  !
60AL   !  !  !  !  !  !  INITIALIZE PANIC CODE
600I   !  !  !  !  !  !  INITIALIZE REPORT TRANSACTION COUNT
140I   !  !  !  !  !  !  INITIALIZE TRANS. CURRENT BLOCK NUMBER
140I   !  !  !  !  !  !  INITIALIZE TRANSACTION COUNT
140I   !  !  !  !  !  !  DOUNTIL TRANSACTION COUNT > MAXIMUM --
       !  !  !  !  !  !  -- OR BATCH NO LONGER ON FILE
190I   !  !  !  !  !  !  !  FIND THE FIRST/NEXT MIS-SORT RECORD
       !  !  !  !  !  !  !  --- (FIND.TRANS) ---
       !  !  !  !  !  !  !  IF BATCH STILL ON FILE THEN
100I   !  !  !  !  !  !  !  !  IF EXCEPTION RECORD FOUND THEN
       !  !  !  !  !  !  !  !  !  IF TRANS. STATUS = MIS-SORT THEN
20FM   !  !  !  !  !  !  !  !  !     SET UP TO READ THE TRANS. DIR.
08FM   !  !  !  !  !  !  !  !  !     CALL FILE MANAGER FOR DIR. REC.
20FM   !  !  !  !  !  !  !  !  !     IF RETURN CODE = ERROR THEN
20FM   !  !  !  !  !  !  !  !  !        IF RETURN CODE = NOT ON FILE
       !  !  !  !  !  !  !  !  !           PRINT ABORT MSG.
       !  !  !  !  !  !  !  !  !        ELSE
540I   !  !  !  !  !  !  !  !  !           PANIC
       !  !  !  !  !  !  !  !  !        ENDIF
       !  !  !  !  !  !  !  !  !     ELSE
03FM   !  !  !  !  !  !  !  !  !        SET MIS-SORT DEST. FROM REC.
       !  !  !  !  !  !  !  !  !        IF MIS-SORT DEST. = -1 THEN
       !  !  !  !  !  !  !  !  !           SET OUTPUT = '?'
       !  !  !  !  !  !  !  !  !        ELSE
       !  !  !  !  !  !  !  !  !           PLACE DEST. IN OUTPUT
       !  !  !  !  !  !  !  !  !        ENDIF
       !  !  !  !  !  !  !  !  !     ENDIF
       !  !  !  !  !  !  !  !  !  ELSE
       !  !  !  !  !  !  !  !  !     SET OUTPUT TO BLANKS
       !  !  !  !  !  !  !  !  !  ENDIF
       !  !  !  !  !  !  !  !  !  IF BATCH STILL ON FILE THEN
       !  !  !  !  !  !  !  !  !     SET LIST TRANSACTION INFO.
610I   !  !  !  !  !  !  !  !  !     PRINT/DISPLAY TRANS INFORMATION
       !  !  !  !  !  !  !  !  !     --- (FORMS.CTL) ---
       !  !  !  !  !  !  !  !  !  (ELSE)
       !  !  !  !  !  !  !  !  !  ENDIF
100I   !  !  !  !  !  !  !  !  !  IF ABORT SET THEN
140I   !  !  !  !  !  !  !  !  !     SET TRANS. COUNT > MAX
130I   !  !  !  !  !  !  !  !  !     SET ORDER COUNT > MAX.
       !  !  !  !  !  !  !  !  !  (ELSE)
       !  !  !  !  !  !  !  !  !  ENDIF
       !  !  !  !  !  !  !  !  (ELSE)
       !  !  !  !  !  !  !  !  ENDIF
       !  !  !  !  !  !  !  ELSE
040I   !  !  !  !  !  !  !  !  OUTPUT "BATCH NO LONGER ON FILE
       !  !  !  !  !  !  !  !  --- REPORT TERMINATED" ---
100I   !  !  !  !  !  !  !  !  SET ABORT
       !  !  !  !  !  !  !  ENDIF
       !  !  !  !  !  !  ENDDO
       !  !  !  !  !  !  CLEAR LIST TRANSACTION INFORMATION
       !  !  !  !  !  ELSE
020I   !  !  !  !  !     PRINT/DISPLAY "NO MIS-SORTS IN THIS ORDER"
       !  !  !  !  !  ENDIF
       !  !  !  !  !  IF HARD COPY SET THEN
       !  !  !  !  !     UPDATE LINE COUNT > MAX.
       !  !  !  !  !  ELSE
       !  !  !  !  !     MOVE REPORT TO TOP OF SCREEN
       !  !  !  !  !  ENDIF
```

```
        !  !  !  !  ENDIF
        !  !  !  ELSE
040I    !  !  !  !  PRINT/DISPLAY "BATCH NO LONGER ON FILE - RPT TERM"
100I    !  !  !  !  SET ABORT
        !  !  !  !  IF HARD COPY NOT SET THEN
        !  !  !  !     MOVE REPORT TO TOP OF SCREEN
        !  !  !  !  (ELSE)
        !  !  !  !  ENDIF
        !  !  !  ENDIF
        !  !  ENDDO
        !  !  IF HARD COPY AND EXCEPTIONS NOT SET THEN
        !  !     MOVE REPORT TO TOP OF SCREEN
        !  !  ELSE
        !  !  ENDIF
        !  (ELSE)
        !  ENDIF
        ELSE
020I       PRINT/DISPLAY BATCH ID, "BATCH NOT ON FILE"
        ENDIF
510I    RELEASE RECORD BUFFER (FREE.SRB)
500I    RELEASE THE IPM BUFFER (FREE.IPM)
        DEQUEUE TERMINAL/PRINTER
        ENDPROG


              FORMS.CTL SUBROUTINE

100I    IF HARDCOPY SET, THEN
600I       IF LINE COUNT GREATER THAN PRINTER PAGE, THEN
100I          SET OK
           ELSE
100I          CLEAR OK
           ENDIF
        ELSE
600I       IF LINE COUNT GREATER THAN TERMINAL PAGE, THEN
100I          SET OK
           ELSE
100I          CLEAR OK
           ENDIF
        ENDIF
100I    IF PAGE OVERFLOW (OK SET), THEN
600I       INCREMENT PAGE COUNT
610I       PRINT/DISPLAY BATCH HEADINGS
610I       PRINT/DISPLAY BATCH INFORMATION
610I       PRINT/DISPLAY ORDER HEADINGS
600I       INITIALIZE LINE COUNT
100I       IF LIST TRANSACTION INFORMATION SET, THEN
610I          PRINT/DISPLAY ORDER INFORMATION
610I          PRINT/DISPLAY TRANSACTION HEADINGS
600I          INCREMENT LINE COUNT
           (ELSE)
           ENDIF
        (ELSE)
        ENDIF
100I    IF LIST ORDER INFORMATION SET, THEN
610I       PRINT/DISPLAY ORDER INFORMATION
600I       INCREMENT LINE COUNT
        (ELSE)
        ENDIF
100I    IF LIST TRANSACTION INFORMATION SET, THEN

610I       PRINT/DISPLAY TRANSACTION INFORMATION
600I       INCREMENT REPORT TRANSACTION COUNT
600I       INCREMENT LINE COUNT
        (ELSE)
        ENDIF
        IF REPORT CANCELLED AND HARD COPY SET THEN
           PRINT REPORT CANCELLED MESSAGE
        (ELSE)
        ENDIF
        RETURN
```

```
    SYSTEM ERROR COUNTS REPORT

                  - MODULE HISTORY -

      PROJECT:       DAS                  70-01709

      SUB-SYSTEM:    OPERATOR INTERFACE

      MODULE:        OISER                93

                  - MODULE ABSTRACT -

      THIS MODULE DISPLAYS ALL OF THE SYSTEM ERROR COUNTS
    EITHER ON THE TERMINAL OR ON THE SYSTEM PRINTER.

        INITIALIZATION
040I    DISPLAY 'SYSTEM ERROR REPORT'
030I    ASK USER IF HARDCOPY IS REQUIRED
        IF YES, THEN
590I       SET A HARDCOPY FLAG
           ENQUEUE THE SYSTEM PRINTER
           EJECT TO TOP OF FORM
        ELSE
590I       CLEAR THE HARDCOPY FLAG
           ENQUEUE THE TERMINAL
           CLEAR THE SCREEN
        ENDIF
580I    PUT TIME AND DATE IN THE HEADER
580I    INITIALIZE PAGE COUNT AND PUT IN THE HEADER
580I    PRINT/DISPLAY HEADER #1
580I    PRINT/DISPLAY HEADER #2 AND HEADER #3
580I    PRINT/DISPLAY LOST, REJECTED, AND RECIRC COUNTS
39FM    GET NUMBER OF INDUCTS FROM SYSCOM   \
580I    CALCULATE CENTERING FOR SCANNER HEADERS AND COUNTS
580I    PRINT/DISPLAY HEADERS AND COUNTS
590I    IF HARDCOPY FLAG IS NOT SET, THEN
           MOVE THE REPORT TO THE TOP OF THE SCREEN
030I       ASK USER 'LIST MISSORT COUNTS ?'
           IF THE ANSWER IS YES, THEN
              CLEAR THE SCREEN
              INITIALIZE THE LINE COUNT
580I          INCREMENT THE PAGE NUMBER AND PUT IN THE HEADER
580I          PRINT THE HEADER #1
590I          CLEAR ABORT FLAG
           ELSE
590I          SET ABORT FLAG
           ENDIF
        ELSE
590I       CLEAR THE ABORT FLAG
           SKIP A FEW LINES
        ENDIF
590I    IF ABORT FLAG IS NOT SET, THEN
040I       PRINT/DISPLAY 'M I S - S O R T S'
39FM       GET NUMBER OF SORT LINES FROM SYSCOM
           CALL ROUTINE TO PRINT MIS-SORT COUNTS
        (ELSE)
        ENDIF
590I    IF HARDCOPY FLAG NOT SET, THEN
           MOVE THE REPORT TO THE TOP OF SCREEN
030I       ASK USER 'LIST TRANSFER FAILURE COUNTS ?'
           IF THE ANSWER IS YES, THEN
              CLEAR THE SCREEN
```

```
              INITIALIZE THE LINE COUNT
580I          INCREMENT THE PAGE NUMBER AND PUT IN HEADER
580I          PRINT THE HEADER #1
590I          CLEAR THE ABORT FLAG
           ELSE
590I          SET THE ABORT FLAG
           ENDIF
        ELSE
590I       CLEAR THE ABORT FLAG
           SKIP A FEW LINES
        ENDIF
590I    IF THE ABORT FLAG IS NOT SET, THEN
040I       PRINT/DISPLAY 'T R A N F E R   F A I L U R E S'
39FM       GET NUMBER OF SORT LINES FROM SYSCOM
           CALL THE SUBROUTINE TO OUTPUT THE TRANS. FAILURE REPORT
        (ELSE)
        ENDIF
590I    IF HARDCOPY FLAG IS SET, THEN
           EJECT TO TOP OF FORM
        (ELSE)
        ENDIF
        DEQUEUE WHATEVER WAS ENQUEUED
        EXIT

        SUBROUTINE TO OUTPUT MIS-SORT OR TRANSFER FAILURE REPORT

580I    CALCULATE THE NUMBER OF COLUMNS NEEDED
580I    PRINT/DISPLAY THAT MANY 'LINE  COUNT'
40FM    PRINT THE COUNTS
        ADJUST THE LINE COUNT
590I    IF THE HARDCOPY FLAG IS NOT SET, THEN
           MOVE TO TOP OF SCREEN
        (ELSE)
        ENDIF
        RETURN TO CALLER

          RESET ERROR COUNTS

                        - MODULE HISTORY -

           PROJECT:        DAS                   73-01709

           SUB-SYSTEM:     OPERATOR INTERFACE

           MODULE:         OIRSE                 92

                        - MODULE ABSTRACT -

           THIS MODULE RESETS THE SYSTEM ERROR COUNTS TO ZERO.
        ALL ERROR COUNTS CAN BE RESET OR ANY ONE OF THE FIVE
        CAN BE RESET INDIVIDUALLY.

        INITIALIZATION
040I    DISPLAY 'RESET ERROR COUNTS COMMAND'
030I    ASK USER IF ALL COUNTS SHOULD BE CLEARED
        IF NOT, THEN
030I       ASK USER IF MISSORTS SHOULD BE CLEARED
           IF YES, THEN
40FM          CLEAR MISSORT COUNTS
           (ELSE)
           ENDIF
```

```
03OI        ASK USER IF THE NO-READ COUNTS SHOULD BE CLEARED
            IF YES, THEN
40FM           CLEAR NO-READ COUNTS
            (ELSE)
            ENDIF
03OI        ASK USER IF THE REJECT COUNT SHOULD BE CLEARED
            IF YES, THEN
40FM           CLEAR REJECT COUNT
            (ELSE)
            ENDIF
03OI        ASK USER IF THE RECIRC COUNT SHOULD BE CLEARED
            IF YES, THEN
40FM           CLEAR RECIRC COUNT
            (ELSE)
            ENDIF
03OI        ASK USER IF LOST FROM TRACKING COUNT SHOULD BE CLEARED
            IF YES, THEN
40FM           CLEAR LOST FROM TRACKING COUNT
            (ELSE)
            ENDIF
03OI        ASK USER IF TRANSFER FAILURE COUNTS SHOULD BE CLEARED
            IF YES, THEN
40FM           CLEAR TRANSFER FAILURE COUNTS
            (ELSE)
            ENDIF
         ELSE
40FM        CLEAR ALL COUNTS
         ENDIF
04OI     DISPLAY 'COUNTS CLEARED'
         EXIT
```

```
         WRITE BATCH (TO DISKETTE) COMMAND


                        - MODULE HISTORY -

            PROJECT:       DAS                   79-01709

            SUB-SYSTEM:    OPERATOR INTERFACE

            MODULE:        OIWRB                 21

                        - MODULE ABSTRACT -

            THIS MODULE REQUESTS A BATCH ID. THE FILE MANAGER IS CALLED
         TO READ THE BATCH FILE RECORD. IF FOUND, THE BATCH INFORMATION
         IS DISPLAYED FOR USER VERIFICATION. THE USER IS ASKED IF OK TO
         WRITE TO DISKETTE. IF YES, THE USER IS ASKED IF DISKETTE IS
         MOUNTED. IF YES, THE FILE MANAGER IS CALLED TO SEQUENTIALLY READ
         ALL ORDER FILE RECORDS TO BUILD A TABLE OF ORDER ID'S.
            NEXT THE FILE MANAGER IS CALLED TO SEQUENTIALLY READ ALL
         TRANSACTION RECORDS, THEN EACH IS WRITTEN TO THE DISKETTE.
         ENQUEUE USER TERMINAL
         CLEAR THE SCREEN
04OI     DISPLAY ON USER TERMINAL "WRITE BATCH COMMAND"
48OI     DEQUEUE AN IPM BUFFER (GET.IPM)
         DEQUEUE A RECORD BUFFER (GET.SRB)
03OI     ASK USER FOR BATCH ID
08AL     INITIALIZE PANIC CODE
12OI
10OI     CLEAR BATCH ABORT
16OI     ACCESS BATCH FILE RECORD (GET.BATCH)
10OI     IF BATCH RECORD FOUND (OK SET), THEN
43OI     !  DISPLAY BATCH HEADINGS
```

```
430I     !  DISPLAY BATCH INFORMATION
030I     !  ASK IF OK TO WRITE ?
         !  IF YES, THEN
030I     !  !  ASK IF DISKETTE MOUNTED ?
         !  !  IF YES, THEN
         !  !     CLEAR DISKETTE NOT MOUNTED FLAG
08AL     !  !  !  INITIALIZE PANIC CODE
120I     !  !  !
570I     !  !  !  SET DISKETTE COMMAND WORD
330I     !  !  !
230I     !  !  !  WRITE DISKETTE HEADER RECORD (WRITE.BATCH)
100I     !  !  !  IF HEADER RECORD WRITTEN (OK SET), THEN
         !  !  !  !  DEQUEUE TERMINAL
08AL     !  !  !  !  INITIALIZE PANIC CODE
130I     !  !  !  !
130I     !  !  !  !  INITIALIZE ORDER COUNT
130I     !  !  !  !  DOUNTIL ORDER COUNT GREATER THAN MAXIMUM
170I     !  !  !  !     FIND FIRST/NEXT ORDER IN THIS BATCH (FIND.ORDER)
100I     !  !  !  !     IF ORDER RECORD FOUND (OK SET), THEN
330I     !  !  !  !        STORE ORDER ID IN TABLE
         !  !  !  !     ELSE
100I     !  !  !  !        SET BATCH ABORT
         !  !  !  !     ENDIF
         !  !  !  !  ENDDO
100I     !  !  !  !  IF BATCH ABORT NOT SET, THEN
08AL     !  !  !  !  !  INITIALIZE PANIC CODE
120I     !  !  !  !  !
140I     !  !  !  !  !
100I     !  !  !  !  !  CLEAR ORDER SEQUENCE, AND EXCEPTIONS
570I     !  !  !  !  !  SET DISKETTE COMMAND WORD
330I     !  !  !  !  !
140I     !  !  !  !  !  INITIALIZE CURRENT TRANSACTION BLOCK COUNT
140I     !  !  !  !  !  INITIALIZE TRANSACTION COUNT
100I     !  !  !  !  !  DOUNTIL TRANSACTION COUNT GREATER THAN MAXIMUM
190I     !  !  !  !  !  !  FIND FIRST/NEXT TRANSACTION RECORD IN BATCH
         !  !  !  !  !  !  --- (FIND.TRANS) ---
100I     !  !  !  !  !  !  IF TRANSACTION RECORD FOUND (OK SET), THEN
140I     !  !  !  !  !  !     IF TRANSACTION COUNT GREATER THAN MAX, THEN
570I     !  !  !  !  !  !        SET DISKETTE COMMAND WORD
         !  !  !  !  !  !     (ELSE)
         !  !  !  !  !  !     ENDIF
330I     !  !  !  !  !  !     UPDATE ORDER ID FROM TABLE
230I     !  !  !  !  !  !     WRITE NEXT DISKETTE RECORD (WRITE.BATCH)
100I     !  !  !  !  !  !     IF DISKETTE ERROR OCCURRED (OK CLEAR), THEN
140I     !  !  !  !  !  !        UPDATE TRANSACTION COUNT BEYOND MAXIMUM
         !  !  !  !  !  !     ELSE
         !  !  !  !  !  !     ENDIF
         !  !  !  !  !  !  ELSE
100I     !  !  !  !  !  !     SET BATCH ABORT
         !  !  !  !  !  !  ENDIF
         !  !  !  !  !  ENDDO
         !  !  !  !  (ELSE)
         !  !  !  !  ENDIF
         !  !  !  (ELSE)
         !  !  !  ENDIF
         !  !  ELSE
100I     !  !  !  SET BATCH ABORT
         !  !  ENDIF
         !  ELSE
100I     !  !  SET BATCH ABORT
         !  ENDIF
         ELSE
020I        DISPLAY BATCH ID, "BATCH NOT ON FILE"
100I        SET BATCH ABORT
         ENDIF
500I     RELEASE IPM BUFFER (FREE.IPM)
         ENQUEUE TERMINAL
100I     IF BATCH ABORT SET, THEN
040I        DISPLAY "WRITE BATCH COMMAND ABORTED"
         (ELSE)
         ENDIF
         IF DISKETTE MOUNTED THEN
```

```
040I      DISPLAY "REMOVE DISKETTE"
        (ELSE)
        ENDIF
110I    CLEAR DISKETTE IN USE
        DEQUEUE TERMINAL
        ENDPROG





        WRITE DISKETTE DATA BLOCK SUBROUTINE



                      - MODULE HISTORY -


           PROJECT:       DAS                   79-01709

           SUB-SYSTEM:    DISKETTE MANAGER

           MODULE:        DMWDB                 59


                      - MODULE ABSTRACT -


             THIS SUBROUTINE WHEN CALLED WILL PUT A HEADER OR
          DETAIL RECORD ON   A DATA INTERCHANGE FORMAT DISKETTE.
          WHEN THE HEADER RECORD IS PROCESSED THE DISKETTE WILL
          BE CHECKED AND BROUGHT ON-LINE TO EDX WITHOUT A $VARYON
          COMMAND. WHEN ALL RECORDS HAVE BEEN PROCESSED THE END-
          OF-DATA (EOD) POINTER ON THE DISKETTE HDR1 LABEL WILL BE
          UPDATED AND THE HEADER RECORD WILL BE UPDATED WITH THE
          RECORD COUNT.

          NOTE:  THE CALLING PROGRAM MUST HAVE DS1=$$ AND AN ENTRY
          STATEMENT FOR DS1

        IF COMMAND EQ TO 'PUT HEADER', THEN
           BRING DISKETTE ON-LINE
           IF NO ERRORS, THEN
              READ THE HDR1 RECORD FROM DISKETTE
              IF DISKETTE EXTENTS OK, THEN
                 POINT TO FIRST RECORD
                 MOVE 3 LOGICAL RECORDS TO BUFFER
                 SET INITILIZE SWITCH
                 MOVE 'OK' TO RETURN CODE
              ELSE
                 MOVE 'I/O ERROR TO RETURN CODE
              ENDIF
           ELSE
              MOVE 'I/O ERROR' TO RETURN CODE
           ENDIF
        ELSE
           IF COMMAND EQ TO 'PUT DETAIL RECORD' OR 'LAST DETAIL', THEN
              IF INITILIZE SWITCH SET, THEN
                 MOVE NEXT 24 BYTE LOGICAL RECORD TO BUFFER
                 MOVE 'OK' TO RETURN CODE
                 IF END OF PHYSICAL BUFFER OR COMMAND EQ 'LAST DETAIL'
                    WRITE RECORD
                    IF NOT END OF FILE, THEN
                       IF DISK WRITE ERROR, THEN
                          MOVE 'I/O ERROR' TO RETURN CODE
                       ELSE
                          IF COMMAND EQ LAST RECORD THEN
                             PUT NUMBER OF RECORDS IN HEADER
                             WRITE HEADER RECORD
                             IF DISK WRITE ERROR, THEN
                                MOVE 'I/O ERROR' TO RETURN CODE
```

```
                  (ELSE)
                  ENDIF
                  CALCULATE EOD PNTR FROM NUMBER OF RECORDS
                  SET EOD POINTER IN HDR1 RECORD
                  WRITE HDR1 RECORD TO DISK
                  IF DISK WRITE ERROR, THEN
                     MOVE 'I/O ERROR' TO RETURN CODE
                  (ELSE)
                  ENDIF
               (ELSE)
               ENDIF
            ENDIF
         ELSE
            MOVE 'I/O ERROR' TO RETURN CODE
         ENDIF
      ELSE
         IF END OF FIRST 128 BYTES, THEN
            BUMP BUFFER POINTER TO NEXT 128 BYTES
         (ELSE)
         ENDIF
      ENDIF
   ELSE
      MOVE 'INVALID CALL CODE' TO RETURN CODE
   ENDIF
ELSE
   MOVE 'INVALID CALL CODE' TO RETURN CODE
ENDIF
ENDIF
RETURN
```

```
BATCH STATUS REPORT

                  - MODULE HISTORY -

   PROJECT:       DAS                     73-01709

   SUB-SYSTEM:    OPERATOR INTERFACE

   MODULE:        OIBSR                   15

                  - MODULE ABSTRACT -

   THIS MODULE REQUESTS THE BATCH ID. THE FILE MANAGER IS
CALLED TO READ THE BATCH FILE INFORMATION.
   IF THE BATCH INFORMATION IS FOUND, THE USER IS ASKED
WHETHER OR NOT HARDCOPY OUTPUT IS REQUIRED. IF HARDCOPY IS
REQUIRED, THEN THE TERMINAL IS DEQUEUED AND THE SYSTEM PRINTER
ENQUEUED.
   THE FILE MANAGER IS CALLED TO SEQUENTIALLY READ EACH ORDER
RECORD. FOR EACH ORDER RECORD, THE ORDER ID AND ALL QUANTITIES
AND ORDER PERCENT COMPLETE ARE OUTPUT. THE COMPLETED QUANTITY
IS ACCUMULATED.
   THE BATCH PERCENT COMPLETE IS OUTPUT TO THE ENQUEUED DEVICE.
THE TERMINAL/PRINTER IS DEQUEUED BEFORE THE PROGRAM ENDS.
     ENQUEUE USER TERMINAL
04DI DISPLAY ON USER TERMINAL "BATCH STATUS REPORT"
48DI DEQUEUE AN IPM BUFFER (GET.IPM)
49DI DEQUEUE RECORD BUFFER (GET.SRB)
03DI ASK USER FOR BATCH ID
12DI
08AL INITIALIZE PANIC CODE
28DI
16DI ACCESS BATCH FILE (GET.BATCH)
01FM
```

```
10DI    IF BATCH RECORD FOUND (OK SET), THEN
10DI       SET BATCH FOUND
03DI       ASK USER IF HARDCOPY OUTPUT IS REQUIRED
           IF HARDCOPY REQUIRED, THEN
10DI          SET HARDCOPY
              DEQUEUE USER TERMINAL
              ENQUEUE PRINTER
           ELSE
10DI          CLEAR HARDCOPY
           ENDIF
28DI       INITIALIZE DATE, TIME, PAGE COUNT AND LINE COUNT
06DI       PRINT/DISPLAY BATCH HEADINGS
06DI       PRINT/DISPLAY BATCH INFORMATION
06DI       PRINT/DISPLAY ORDER HEADINGS
08AL       INITIALIZE PANIC CODE
28DI
13DI       INITIALIZE QUANTITY COMPLETE
13DI       INITIALIZE ORDER COUNT
13DI       DOUNTIL ORDER COUNT GREATER THAN MAXIMUM
17DI          FIND THE FIRST/NEXT ORDER IN THIS BATCH (FIND.ORDER)
10DI          IF ORDER RECORD FOUND (OK SET), THEN
13DI             COMPUTE ORDER PERCENT COMPLETE
06DI             PRINT/DISPLAY ORDER INFORMATION AND PERCENT COMPLETE
                 --- (FORMS.CTL) ---
10DI             IF ABORT SET THEN
13DI                SET ORDER COUNT GREATER THAN MAX.
10DI                CLEAR BATCH FOUND
                 (ELSE)
                 ENDIF
13DI             ACCUMULATE QUANTITY COMPLETE
              ELSE
10DI             CLEAR BATCH FOUND
04DI             PRINT/DISPLAY "BATCH NO LONGER ON FILE - RPT TERM."
              ENDIF
           ENDDO
           IF BATCH FOUND SET, THEN
28DI          COMPUTE BATCH PERCENT COMPLETE
06DI          PRINT/DISPLAY BATCH PERCENT, "BATCH PERCENT COMPLETE"
           (ELSE)
           ENDIF
           IF HARD COPY NOT SET THEN
              MOVE REPORT TO TOP OF SCREEN
           (ELSE)
           ENDIF
        ELSE
02DI       DISPLAY BATCH ID, "BATCH NOT ON FILE"
        ENDIF
51DI    RELEASE RECORD BUFFER (FREE.SRB)
28DI    RELEASE THE IPM BUFFER (FREE.IPM)
        DEQUEUE TERMINAL/PRINTER
        ENDPROG
              FORMS.CTL SUBROUTINE

10DI    IF HARDCOPY SET, THEN
28DI       IF LINE COUNT GREATER THAN PRINTER PAGE, THEN
10DI          SET OK
           ELSE
10DI          CLEAR OK
           ENDIF
        ELSE
28DI       IF LINE COUNT GREATER THAN TERMINAL PAGE, THEN
10DI          SET OK
           ELSE
10DI          CLEAR OK
           ENDIF
        ENDIF
10DI    IF PAGE OVERFLOW (OK SET), THEN
28DI       INCREMENT PAGE COUNT
06DI       PRINT/DISPLAY BATCH HEADINGS
06DI       PRINT/DISPLAY BATCH INFORMATION
06DI       PRINT/DISPLAY ORDER HEADINGS
28DI       INITIALIZE LINE COUNT
        (ELSE)
```

```
        ENDIF
05DI    PRINT/DISPLAY ORDER INFORMATION
28DI    INCREMENT LINE COUNT
        IF REPORT CANCELLED AND HARD COPY SET THEN
           PRINT REPORT CANCELLED MESSAGE
        (ELSE)
        ENDIF
        RETURN





        READ BATCH (FROM DISKETTE) COMMAND



                          - MODULE HISTORY -


           PROJECT:        DAS                  79-01709

           SUB-SYSTEM:     OPERATOR INTERFACE

           MODULE:         OIRD8                20


                          - MODULE ABSTRACT -


           THIS MODULE REQUESTS THE USER TO MOUNT A DISKETTE. THE
        DISKETTE HEADER IS READ AND DISPLAYED BACK TO THE USER. THE
        USER IS ASKED IF THIS DISKETTE IS OK TO READ. IF YES, THEN
        THE FILE MANAGER IS CALLED TO ADD THE BATCH. THE DISKETTE IS
        SEQUENTIALLY READ WHILE THE FILE MANAGER IS CALLED FOR EACH
        DISKETTE RECORD, TO ADD EACH TRANSACTION RECORD.
        ENQUEUE USER TERMINAL
39FM    GET NUMBER OF SORT LINES
14DI    DISPLAY ON USER TERMINAL "READ BATCH COMMAND"
03DI    ASK USER IF DISKETTE MOUNTED ?
        IF YES, THEN
49DI    !  DEQUEUE RECORD BUFFER (GET.SRB)
08DI    !  INITIALIZE PANIC CODE
32DI    !
57DI    !  SET DISKETTE COMMAND WORD
32DI    !
22DI    !  GET DISKETTE HEADER RECORD (READ.BATCH)
10DI    !  IF HEADER RECORD FOUND (OK SET), THEN
43DI    !  !  DISPLAY BATCH HEADINGS
43DI    !  !  DISPLAY BATCH INFORMATION
10DI    !  !  CLEAR BATCH ABORT
03DI    !  !  ASK IF OK TO READ ?
        !  !  IF YES, THEN
48DI    !  !  !  DEQUEUE AN IPM BUFFER (GET.IPM)
08AL    !  !  !  INITIALIZE PANIC CODE
12DI    !  !  !
24DI    !  !  !  ADD BATCH INFORMATION (ADD.BATCH)
10DI    !  !  !  IF BATCH ADDED (OK SET), THEN
        !  !  !  !  DEQUEUE TERMINAL
08AL    !  !  !  !  INITIALIZE PANIC CODE
14DI    !  !  !  !
57DI    !  !  !  !  SET DISKETTE COMMAND WORD
32DI    !  !  !  !
10DI    !  !  !  !  CLEAR LAST RECORD
10DI    !  !  !  !  CLEAR DELETION
10DI    !  !  !  !  DOUNTIL LAST RECORD SET
22DI    !  !  !  !  !  GET DISKETTE TRANSACTION RECORD (READ.BATCH)
10DI    !  !  !  !  !  IF TRANSACTION RECORD FOUND (OK SET), THEN
        !  !  !  !  !     VALIDATE TRANSACTION RECORD INFORMATION
        !  !  !  !  !     --- (VALIDATE.TRANSACTION) ---
10DI    !  !  !  !  !     IF TRANSACTION DATA VALID (OK SET), THEN
25DI    !  !  !  !  !        ADD TRANSACTION INFORMATIONN (ADD.TRANS)
```

```
10DI    ! ! ! ! !     IF ERROR (OK CLEAR), THEN              00000650
10DI    ! ! ! ! !        SET LAST RECORD                     00000660
10DI    ! ! ! ! !        SET BATCH ABORT                     00000670
        ! ! ! ! !     (ELSE)                                 00000680
        ! ! ! ! !     ENDIF                                  00000690
        ! ! ! ! !  ELSE                                      00000700
10DI    ! ! ! ! !     SET LAST RECORD                        00000710
10DI    ! ! ! ! !     SET BATCH ABORT                        00000720
10DI    ! ! ! ! !     SET DELETION                           00000730
        ! ! ! ! !  ENDIF                                     00000740
        ! ! ! ! ! ELSE                                       00000750
10DI    ! ! ! ! !     SET LAST RECORD                        00000760
10DI    ! ! ! ! !     SET BATCH ABORT                        00000770
10DI    ! ! ! ! !     SET DELETION                           00000780
        ! ! ! ! ! ENDIF                                      00000790
        ! ! ! ! ENDDO                                        00000800
        ! ! !. ELSE                                          00000810
10DI    ! ! !     SET BATCH ABORT                            00000820
        ! ! !  ENDIF                                         00000830
25DI    ! ! !  RELEASE IPM BUFFER (FREE.IPM)                 00000840
        ! !  ELSE                                            00000850
10DI    ! !     SET BATCH ABORT                              00000860
        ! !  ENDIF                                           00000870
        !  ELSE                                              00000880
10DI    !     SET BATCH ABORT                                00000890
        !  ENDIF                                             00000900
51DI    !  RELEASE RECORD BUFFER (FREE.SRB)                  00000910
        ELSE                                                 00000920
10I        SET BATCH ABORT                                   00000930
        ENDIF                                                00000940
10DI    IF DELETION SET, THEN                                00000950
12DI       INITIALIZE BATCH DIRECTORY ADDRESS, ENTRY SIZE, BATCH COUNT  00000960
12DI       DOWHILE RESIDENT BATCH STATUS NOT ADDING          00000970
              ADD 1 TO BATCH COUNT                           00000980
              INDEX TO NEXT REC. IN RESIDENT BATCH FILE      00000990
           ENDDO                                             00001000
02FM       CHANGE BATCH STATUS TO DELETING                   00001010
53DI       USE FILE MANAGER TO DELETE THIS BATCH (DELETE.BATCH)  00001020
        (ELSE)                                               00001030
        ENDIF                                                00001040
10DI    IF BATCH ABORT SET, THEN                             00001050
           ENQUEUE TERMINAL                                  00001060
04DI       DISPLAY "READ BATCH COMMAND ABORTED"              00001070
        (ELSE)                                               00001080
        ENDIF                                                00001090
04DI    DISPLAY "REMOVE DISKETTE"                            00001100
11DO    CLEAR DISKETTE IN USE                                00001110
        DEQUEUE USER TERMINAL                                00001120
        ENDPROG                                              00001130
                                                             00001140
                                                             00001150
              VALIDATE TRANSACTION SUBROUTINE                00001160
                                                             00001170
10DI    SET OK                                               00001180
07FM    IF TRANSACTION ID ZERO OR NOT NUMERIC, THEN          00001190
10DI       CLEAR OK                                          00001200
        (ELSE)                                               00001210
        ENDIF                                                00001220
07FM    IF STATUS NOT VALID OR NOT NUMERIC THEN              00001230
10DI       CLEAR OK                                          00001240
        (ELSE)                                               00001250
        ENDIF                                                00001260
07FM    IF DESTINATION GREATER THAN MAXIMUM OR NOT NUMERIC, THEN  00001270
10DI       CLEAR OK                                          00001280
        (ELSE)                                               00001290
        ENDIF                                                00001300
10DI    IF VALIDATION FAILED (OK CLEAR), THEN                00001310
02DI       DISPLAY "TRANSACTION VALIDATION ERROR"            00001320
44DI       DISPLAY DISKETTE TRANSACTION INFORMATION          00001330
        (ELSE)                                               00001340
        ENDIF                                                00001350
        RETURN                                               00001360
```

```
DISKETTE MANAGER READ SUBROUTINE


                 - MODULE HISTORY -

   PROJECT:       DAS                  79-01709

   SUB-SYSTEM:    DISKETTE MANAGER

   MODULE:        DMRDB                58


                 - MODULE ABSTRACT -

     THIS SUBROUTINE WHEN CALLED WILL GET A HEADER OR
   DETAIL RECORD FROM A DATA INTERCHANGE FORMAT DISKETTE.
   WHEN THE HEADER RECORD IS REQUESTED THE DISKETTE WILL
   BE CHECKED AND BROUGHT ON-LINE TO EDX WITHOUT A $VARYON
   COMMAND. WHEN ALL RECORDS HAVE BEEN PROCESSED FROM THE
   DISKETTE, THE RETURN CODE WILL BE SET TO INDICATE THE
   LAST RECORD HAS BEEN PROCESSED.

IF COMMAND EQ TO 'GET HEADER', THEN
   BRING DISKETTE ON-LINE
   IF NO ERRORS, THEN
      READ THE HDR1 RECORD FROM DISKETTE
      IF DISKETTE EXTENTS OK, THEN
         READ FIRST DATA RECORD
         IF DISK READ OK, THEN
            GET NUMBER OF RECORDS FROM HEADER
            IF NUMBER OF RECORDS BETWEEN 4 AND 9490, THEN
               SET INITILIZE SWITCH
               MOVE 3 LOGICAL RECORDS TO BUFFER
               MOVE 'OK' TO RETURN CODE
               DECREMENT RECORD COUNT
            ELSE
               MOVE 'DISKETTE FORMAT ERROR TO RTN CODE
            ENDIF
         ELSE
            MOVE 'I/O ERROR' TO RETURN CODE
         ENDIF
      ELSE
         MOVE 'I/O ERROR' TO RETURN CODE
      ENDIF
   ELSE
      MOVE 'I/O ERROR' TO RETURN CODE
   ENDIF
ELSE
   IF COMMAND EQ TO 'GET DETAIL RECORD', THEN
      IF INITILIZE SWITCH SET, THEN
         MOVE NEXT 24 BYTE LOGICAL RECORD TO BUFFER
         MOVE 'OK' TO RETURN CODE
         IF ALL RECORDS HAVE BEEN PROCESSED, THEN
            MOVE 'LAST RECORD' TO RETURN CODE
         ELSE
            IF END OF FIRST 128 BYTE BUFFER, THEN
               BUMP BUFFER POINTER TO NEXT 128 BYTES
            ELSE
               IF END OF PHYSICAL BUFFER, THEN
                  READ NEXT DISK RECORD
                  IF DISK READ ERRORS, THEN
                     MOVE 'I/O ERROR' TO RETURN CODE
                  (ELSE)
                  ENDIF
               (ELSE)
               ENDIF
```

```
                    ENDIF                                           00000750
                  ENDIF                                             00000760
                ELSE                                                00000770
                  MOVE 'INVALID CALL CODE' TO RETURN CODE           00000780
                  PANIC                                             00000790
                ENDIF                                               00000800
              ELSE                                                  00000810
                MOVE 'INVALID CALL CODE' TO RETURN CODE             00000820
              ENDIF                                                 00000830
            ENDIF                                                   00000840
          ENDIF                                                     00000850
          RETURN

                                                                    00000010
                                                                    00000020
                                                                    00000030
                                                                    00000040
                                                                    00000050
          TRANSACTION STATUS REPORT                                 00000060
                                                                    00000070
                                                                    00000080
                                                                    00000090
                         - MODULE HISTORY -                         00000100
                                                                    00000110
                                                                    00000120
          PROJECT:    DAS                    75-01709               00000130
                                                                    00000140
          SUB-SYSTEM: OPERATOR INTERFACE                             00000150
                                                                    00000160
          MODULE:     OITSR                  1B                     00000170
                                                                    00000180
                                                                    00000190
                         - MODULE ABSTRACT -                        00000200
                                                                    00000210
                                                                    00000220
          THIS MODULE REQUESTS A TRANSACTION NUMBER, THEN CALLS THE 00000230
          FILE MANAGER TO READ THE TRANSACTION FILE.                00000240
              IF THE TRANSACTION RECORD IS FOUND, THE FILE MANAGER IS AGAIN00000250
          CALLED, THIS TIME TO READ THE DISK BATCH FILE.            00000260
              IF THE DISK BATCH FILE INFORMATION IS FOUND, THE USER IS    00000270
          ASKED WHETHER OR NOT HARDCOPY OUTPUT IS REQUIRED. IF HARDCOPY IS00000280
          REQUIRED, THEN THE TERMINAL IS DEQUEUED AND THE SYSTEM PRINTER  00000290
          IS ENQUEUED.                                              00000300
              THE COMBINED BATCH AND TRANSACTION FILE INFORMATION IS THEN 00000310
          OUTPUT TO THE ENQUEUED DEVICE.                            00000320
              THE TERMINAL/PRINTER IS DEQUEUED BEFORE THE PROGRAM ENDS.   00000330
          ENQUEUE USER TERMINAL                                     00000340
04OI      DISPLAY ON USER TERMINAL "TRANSACTION STATUS REPORT"      00000350
          CLEAR THE SCREEN                                          00000360
14OI                                                                00000370
48OI      DEQUEUE AN IPM BUFFER (GET.IPM)                           00000380
49OI      DEQUEUE RECORD BUFFER (GET.SRB)                           00000390
03OI      ASK USER FOR TRANSACTION ID                               00000400
          IF VALID (0<TRANSACTION ID<=999999), THEN                 00000410
08AL      !   INITIALIZE PANIC CODE                                 00000420
14OI      !                                                         00000430
20FM      !   UPDATE IPM FOR CALL                                   00000440
08FM      !   CALL FILE MANGR TO TRANSACTION DIRECTORY RECORD BY TRANS. ID 00000450
20FM      !   CASENTRY (FOK, FTN, FCC, ? )                          00000460
          !     CASE FOK ( SUCCESSFUL )                             00000470
10OI      !       SET OK                                            00000480
03FM      !       SAVE THE MIS-SORT DESTINATION                     00000490
          !     CASE FTN ( TRANSACTION NOT FOUND )                  00000500
02OI      !       DISPLAY TRANSACTION ID, "TRANSACTION NOT ON FILE" 00000510
10OI      !       CLEAR OK                                          00000520
          !     CASE FCC ( INVALID CALL CODE )                      00000530
54OI      !       PANIC                                             00000540
          !     CASE  ?  ( INVALID COMPLETION CODE )                00000550
54OI      !       PANIC                                             00000560
          !   ENDCASE                                               00000570
10OI      !   IF TRANSACTION DIRECTORY RECORD FOUND (OK SET), THEN  00000580
12OI      !   !   GET BATCH ID FROM SYSCOM BATCH DIRECTORY          00000590
02FM      !   !                                                     00000600
```

```
15OI    !  !  ACCESS BATCH FILE (GET.BATCH)
10OI    !  !  IF BATCH RECORD FOUND (OK SET), THEN
08AL    !  !  !  INITIALIZE PANIC CODE
14OI    !  !  !
21OI    !  !  !  ACCESS TRANSACTION FILE (GET.TRANS)
10OI    !  !  !  IF TRANSACTION RECORD FOUND (OK SET), THEN
23FM    !  !  !     CALL FILE MANAGER FOR ORDER ID
23FM    !  !  !     IF ORDER RECORD FOUND, THEN
05FM    !  !  !        SAVE ORDER ID
03OI    !  !  !        ASK USER IF HARDCOPY OUTPUT IS REQUIRED
        !  !  !        IF HARDCOPY REQUIRED, THEN
10OI    !  !  !           SET HARD COPY FLAG
        !  !  !           DEQUEUE USER TERMINAL
        !  !  !           ENQUEUE PRINTER
        !  !  !        ELSE
10OI    !  !  !           CLEAR HARD COPY FLAG
        !  !  !        ENDIF
30OI    !  !  !        INITIALIZE DATE, TIME AND PAGE COUNT
08OI    !  !  !        PRINT/DISPLAY BATCH HEADINGS
08OI    !  !  !        PRINT/DISPLAY BATCH INFORMATION
08OI    !  !  !        PRINT/DISPLAY TRANSACTION HEADINGS
        !  !  !        IF TRANS. STATUS = MIS-SORT THEN
        !  !  !           IF MIS-SORT DESTINATION = -1 THEN
        !  !  !              SET MIS-SORT DEST. = '?'
        !  !  !           ELSE
        !  !  !              SET MIS-SORT DEST. IN OUTPUT LINE
        !  !  !           ENDIF
        !  !  !        (ELSE)
        !  !  !        ENDIF
08OI    !  !  !        PRINT/DISPLAY TRANSACTION INFORMATION
10OI    !  !  !        IF HARD COPY FLAG NOT SET, THEN
        !  !  !           MOVE DISPLAY TO TOP OF SCREEN
        !  !  !        (ELSE)
        !  !  !        ENDIF
        !  !  !     ELSE
23FM    !  !  !        IF BATCH WAS NOT FOUND, THEN
02OI    !  !  !           DISPLAY BATCH ID "BATCH NOT ON FILE"
        !  !  !        ELSE
23FM    !  !  !           IF THE RELATIVE ORDER NUMBER WAS INVALID,THEN
08AL    !  !  !              SET UP PANIC CODE FOR INVLD REL ORD
        !  !  !           ELSE
08AL    !  !  !              SET UP PANIC CODE FOR INVLD CALL CODE
        !  !  !           ENDIF
07AL    !  !  !           PANIC
        !  !  !        ENDIF
        !  !  !     ENDIF
        !  !  !  ELSE
02OI    !  !  !     DISPLAY TRANSACTION ID, "TRANSACTION NOT ON FILE"
        !  !  !  ENDIF
        !  !  ELSE
02OI    !  !  !  DISPLAY BATCH ID "BATCH NOT ON FILE"
        !  !  ENDIF
        !  (ELSE)
        !  ENDIF
        ELSE
02OI    !  DISPLAY INVALID TRANSATCION NO
        ENDIF
51OI    RELEASE RECORD BUFFER (FREE.SRB)
50OI    RELEASE THE IPM BUFFER (FREE.IPM)
        DEQUEUE TERMINAL/PRINTER
        ENDPROG
```

FIND DISK TRANSACTION FILE RECORD BY CRITERIA ( FIND.TRANS )

```
                    - MODULE HISTORY -


    PROJECT:        DAS                      73-01709

    SUB-SYSTEM:     OPERATOR INTERFACE

    MODULE:         DICCFT                   7B


                    - MODULE ABSTRACT -


          EACH RELATIVE TRANSACTION RECORD IS SEQUENTIALLY
       ACCESSED ONE AT A TIME BY CALLING THE SEQ.TRANS
       SUBROUTINE FOR EACH RELATIVE ORDER NUMBER.
          IF SUCCESSFUL, THE ORDER SEQUENCE INDICATOR IS
       EXAMINED. IF SET, THE TRANSACTION RELATIVE ORDER
       NUMBER IS COMPARED TO THE CURRENT RELATIVE ORDER
       NUMBER. IF MATCHED, THE EXCEPTIONS INDICATOR IS
       EXAMINED. IF SET, THE TRANSACTION STATUS IS EX-
       AMINED FOR EXCEPTION STATUS.
          THIS SUBROUTINE WILL EXIT WHEN EITHER:
       1) THE DISK TRANSACTION FILE HAS BEEN ACCESSED
          WITHOUT ERROR, AND THE (OPTIONAL) SELECTION
          CRITERIA (ORDER SEQUENCE, EXCEPTIONS) HAS BEEN
          MET, OR
       2) THE DISK TRANSACTION FILE HAS BEEN COMPLETELY
          ACCESSED.
140I  DOUNTIL TRANSACTION COUNT GREATER THAN MAXIMUM OR OK SET--
120I  -- OR TRANSACTION COUNT = ZERO
100I
200I     FIND FIRST/NEXT TRANSACTION IN THIS BATCH (SEQ.TRANS)
100I     IF TRANSACTION RECORD FOUND (OK SET), THEN
140I        COMPUTE TRANSACTION RECORD ENTRY ADDRESS
04FM        SET TRANSACTION INFORMATION
140I
100I        IF ORDER SEQUENCE SET, THEN
140I           IF RELATIVE ORDER NUMBER MATCH, THEN
130I
100I              IF EXCEPTIONS SET, THEN
140I                 IF TRANSACTION STATUS NOT AN EXCEPTION, THEN
100I                    CLEAR OK
                     (ELSE)
                     ENDIF
                  (ELSE)
                  ENDIF
               ELSE
100I              CLEAR OK
               ENDIF
            (ELSE)
         (ELSE)
         ENDIF
         IF TRANSACTION COUNT > ZERO THEN
            INCREMENT TRANSACTION COUNT
         (ELSE)
         ENDIF
      ENDDO
      RETURN




      END BATCH COMMAND


                    - MODULE HISTORY -


    PROJECT:        DAS                      73-01709
```

```
   SUB-SYSTEM:     OPERATOR INTERFACE

   MODULE:         OIENB               23


                   - MODULE ABSTRACT -


   THIS MODULE REQUESTS A BATCH ID. THE FILE MANAGER IS CALLED
TO READ THE CORRESPONDING BATCH INFORMATION. IF THE BATCH RECORD
IS FOUND, THEN THE BATCH ID, HEADER AND STATUS ARE DISPLAYED.
   THE USER IS ASKED WHETHER OR NOT BATCH IS TO BE ENDED. IF
YES, THEN THE FILE MANAGER IS CALLED TO CHANGE THE BATCH STATUS
        ENQUEUE USER TERMINAL
04OI    DISPLAY ON USER TERMINAL "END BATCH COMMAND"
48OI    DEQUEUE AN IPM BUFFER (GET.IPM)
49OI    DEQUEUE RECORD BUFFER (GET.SRB)
03OI    ASK USER FOR BATCH ID
12OI
08AL    INITIALIZE PANIC CODE
35OI
16OI    ACCESS BATCH FILE (GET.BATCH)
10OI    IF BATCH RECORD FOUND (OK SET), THEN
43OI       DISPLAY BATCH HEADER
43OI       DISPLAY BATCH INFORMATION
03OI       ASK USER OK TO END BATCH
           IF YES, THEN
08AL          INITIALIZE PANIC CODE
35OI
01FM          INITIALIZE NEW BATCH STATUS
12OI
45OI          CHANGE BATCH STATUS (CHANGE.BATCH)
              IF OK SET THEN
                 DISPLAY "BATCH ENDED"
52OI             ALARM LOG BATCH STATUS (SEND.ALARM)
              (ELSE)
              ENDIF
           ELSE
              DISPLAY "COMMAND ABORTED"
           ENDIF
        ELSE
02OI       DISPLAY BATCH ID, "BATCH NOT ON FILE"
           DISPLAY "COMMAND ABORTED"
        ENDIF
51OI    RELEASE RECORD BUFFER (FREE.SRB)
50OI    RELEASE THE IPM BUFFER (FREE.IPM)
        ENDPROG






        SORT TRANSLATION REPORT




                   - MODULE HISTORY -


   PROJECT:        DAS                 79-01709

   SUB-SYSTEM:     OPERATOR INTERFACE

   MODULE:         OISTR               19


                   - MODULE ABSTRACT -


   THIS MODULE REQUESTS WHETHER OR NOT HARDCOPY IS REQUIRED. IF
HARDCOPY IS REQUIRED, THEN THE TERMINAL IS DEQUEUED AND THE
SYSTEM PRINTER IS ENQUEUED. THE RESIDENT SORT TRANSLATION TABLE
IS FORMATTED AND OUTPUT TO THE ENQUEUED DEVICE.
   THE TERMINAL/PRINTER IS DEQUEUED BEFORE THE PROGRAM ENDS.
```

```
        ENQUEUE USER TERMINAL
39FM    GET NUMBER OF SORT LINES FROM SYSCOM
04OI    DISPLAY ON USER TERMINAL "SORT LINE ROUTING REPORT"
03OI    ASK USER IF HARDCOPY OUTPUT IS REQUIRED
        IF HARDCOPY REQUIRED, THEN
           DEQUEUE USER TERMINAL
           ENQUEUE PRINTER
        (ELSE)
        ENDIF
31OI    INITIALIZE DATE, TIME AND PAGE COUNT
31OI    INITIALIZE SORT LINE COUNT
31OI    INITIALIZE POINTER TO SYSCOM SORT TRANSLATION TABLE
09OI    PRINT/DISPLAY REPORT HEADINGS
31OI    DOUNTIL END OF SYSCOM SORT TRANSLATION TABLE
09OI       PRINT/DISPLAY TRANSLATION INFORMATION
31OI       INCREMENT POINTER TO SORT TRANSLATION TABLE
        ENDDO
        DEQUEUE TERMINAL/PRINTER
        ENDPROG
```

```
        WORK SCHEDULE REPORT

                          - MODULE HISTORY -

           PROJECT:        DAS                     79-01709

           SUB-SYSTEM:     OPERATOR INTERFACE

           MODULE:         OIWSR                   15

                          - MODULE ABSTRACT -

           THIS MODULE REQUESTS WHETHER OR NOT HARDCOPY OUTPUT IS
        REQUIRED. IF HARDCOPY REQUIRED, THEN THE TERMINAL IS DEQUEUED
        AND THE SYSTEM PRINTER IS ENQUEUED. THE RESIDENT BATCH DIR-
        ECTORY IS CONSULTED FOR BATCH ENTRIES IN USE.
           FOR EACH BATCH ENTRY IN USE, THE FILE MANAGER IS CALLED
        TO READ THE BATCH FILE RECORD. THE BATCH INFORMATION IS THEN
        OUTPUT TO THE ENQUEUED DEVICE.
           THE TERMINAL/PRINTER IS DEQUEUED BEFORE THE PROGRAM ENDS.

        ENQUEUE USER TERMINAL
        CLEAR THE SCREEN
04OI    DISPLAY ON USER TERMINAL "WORK SCHEDULE REPORT"
03OI    ASK USER IF HARDCOPY OUTPUT IS REQUIRED
        IF HARDCOPY REQUIRED, THEN
           SET HARD COPY FLAG
           DEQUEUE USER TERMINAL
           ENQUEUE PRINTER
        ELSE
           CLEAR HARD COPY FLAG
        ENDIF
48OI    DEQUEUE AN IPM BUFFER (GET.IPM)
49OI    DEQUEUE RECORD BUFFER (GET.SRB)
27OI    INITIALIZE DATE, TIME AND PAGE COUNT
05OI    PRINT/DISPLAY BATCH HEADINGS
10OI    CLEAR BATCH FOUND
02FM    INITIALIZE POINTER TO SYSCOM BATCH DIRECTORY
12OI
02FM    INITIALIZE SYSCOM BATCH DIRECTORY ENTRY SIZE
12OI
```

```
08AL     INITIALIZE PANIC CODE
27OI
12OI     INITIALIZE BATCH COUNT
12OI     DOUNTIL BATCH COUNT GREATER THAN MAXIMUM
15OI        FIND AN ACTIVE, PENDING OR COMPLETE BATCH RECORD (FIND.BATCH)
10OI        IF BATCH RECORD FOUND (OK SET), THEN
05OI           PRINT/DISPLAY BATCH INFORMATION
27OI
10OI           SET BATCH FOUND
            (ELSE)
            ENDIF
         ENDDO
51OI     RELEASE RECORD BUFFER (FREE.SRB)
50OI     RELEASE THE IPM BUFFER (FREE.IPM)
10OI     IF BATCH FOUND NOT SET, THEN
04OI        PRINT/DISPLAY "NO CURRENT BATCH INFORMATION"
         (ELSE)
         ENDIF
         IF HARDCOPY FLAG NOT SET, THEN
            MOVE REPORT TO TOP OF SCREEN
         (ELSE)
         ENDIF
         DEQUEUE TERMINAL/PRINTER
         ENDPROG
```

```
         'GET A BLOCK BUFFER


                        - MODULE HISTORY -

            PROJECT:          DAS                     79-01709

            SUB-SYSTEM:       OPERATOR INTERFACE

            MODULE:           OICCGS                  63

                        - MODULE ABSTRACT -

                 THIS SUBROUTINE DEQUEUES A 256 BYTE BLOCK BUFFER
              FROM THE BUFFER QUEUE IN SYSCOM. IF THE QUEUE IS EMPTY
              A DELAY IS PERFORMED BEFORE TRYING AGAIN.


37FM     GET ADDRESS OF SRB (256-BYTE) BUFFER QUEUE IN SYSCOM
         DOUNTIL BUFFER RECEIVED
37FM        DEQUEUE A BUFFER FROM THE QUEUE
37FM        IF THE QUEUE WAS EMPTY THEN
               DELAY
            (ELSE)
            ENDIF
         ENDDO
         RETURN
```

```
         START BATCH COMMAND


                        - MODULE HISTORY -
```

```
     PROJECT:        DAS                      79-01709

     SUB-SYSTEM:     OPERATOR INTERFACE

     MODULE:         DISTB                    22


                        - MODULE ABSTRACT -


        THIS MODULE REQUESTS A BATCH ID. THE FILE MANAGER IS CALLED
     TO READ THE CORRESPONDING BATCH INFORMATION. IF THE BATCH RECORD
     IS FOUND, THEN THE BATCH ID, HEADER AND STATUS ARE DISPLAYED.
        THE USER IS ASKED WHETHER OR NOT BATCH IS TO BE STARTED. IF
     YES, THEN THE FILE MANAGER IS CALLED TO CHANGE THE BATCH STATUS
     ENQUEUE USER TERMINAL
     CLEAR THE SCREEN
04DI DISPLAY ON USER TERMINAL "START BATCH COMMAND"
48DI DEQUEUE AN IPM BUFFER (GET.IPM)
49DI DEQUEUE RECORD BUFFER (GET.SRB)
03DI ASK USER FOR BATCH ID
12DI
08AL INITIALIZE PANIC CODE
34DI
16DI ACCESS BATCH FILE (GET.BATCH)
10DI IF BATCH RECORD FOUND (OK SET), THEN
43DI    DISPLAY BATCH HEADER
43DI    DISPLAY BATCH INFORMATION
03DI    ASK USER OK TO START BATCH
        IF YES, THEN
08AL       INITIALIZE PANIC CODE
34DI
01FM       INITIALIZE NEW BATCH STATUS
12DI
45DI       CHANGE BATCH STATUS (CHANGE.BATCH)
           IF OK SET THEN
              DISPLAY "BATCH STARTED"
52DI          ALARM LOG BATCH STATUS (SEND.ALARM)
           (ELSE)
           ENDIF
        ELSE
           DISPLAY "COMMAND ABORTED"
        ENDIF
     ELSE
02DI    DISPLAY BATCH ID, "BATCH NOT ON FILE"
        DISPLAY "COMMAND ABORTED"
     ENDIF
51DI RELEASE RECORD BUFFER (FREE.SRB)
50DI RELEASE THE IPM BUFFER (FREE.IPM)
     ENDPROG




     READ RELATIVE DISK TRANSACTION FILE RECORD ( SEQ.TRANS )


                        - MODULE HISTORY -


     PROJECT:        DAS                      79-01709

     SUB-SYSTEM:     OPERATOR INTERFACE

     MODULE:         DICOST                   79
```

```
                  - MODULE ABSTRACT -


               EACH RELATIVE TRANSACTION NUMBER IS USED TO
            CALCULATE THE RELATIVE BLOCK NUMBER AND TRANSACTION
            RECORD ENTRY OFFSET. IF THE TRANSACTION INFORMATION
            REQUESTED RESIDES IN A BLOCK OTHER THAN THE CURRENT
            BLOCK IN THE SYSCOM RECORD BUFFER, THE FILE MANAGER IS
            CALLED TO READ THE NEW BLOCK INTO THE SYSCOM RECORD
            BUFFER.
               IF SUCCESSFUL, OK IS SET. IF AN ERROR OCCURRED,
            TELL THE USER, CLEAR OK AND TAKE ANY FUTHER APPRO-
            PRIATE ACTION REQUIRED.
               THIS SUBROUTINE WILL EXIT WHEN EITHER:
            1) THE TRANSACTION RECORD REQUESTED IS IN THE CUR-
               RENT SYSCOM RECORD BUFFER, OR
            2) THE DISK TRANSACTION FILE HAS BEEN ACCESSED WITH-
               OUT ERROR, OR
            3) THE DISK TRANSACTION FILE HAS BEEN COMPLETELY
               ACCESSED.




140I     COMPUTE TRANSACTION BLOCK NUMBER/ENTRY OFFSET
140I     IF NEW BLOCK NUMBER, THEN
550I        DEQUEUE BLOCK BUFFER (GET.SBB)
140I        SAVE TRANSACTION CURRENT BLOCK NUMBER
21FM        UPDATE IPM FOR CALL
08FM        CALL FILE MANAGER TO READ TRANSACTION FILE BY BLOCK NUMBER
            SAVE FM RETURN DATA
560I        RELEASE BLOCK BUFFER (FREE.SBB)
21FM        CASENTRY (FOK, FBN, FIR, FCC, ? )
               CASE FOK ( SUCCESSFUL )
100I              SET OK
               CASE FBN ( BATCH NOT FOUND )
100I              CLEAR OK
130I              UPDATE ORDER COUNT BEYOND MAXIMUM
140I              SET TRANSACTION COUNT = ZERO
120I
               CASE FCC ( INVALID CALL CODE )
540I              PANIC
               CASE FIR ( INVALID RELATIVE BLOCK )
540I              PANIC
               CASE  ?  ( INVALID COMPLETION CODE )
540I              PANIC
            ENDCASE
         (ELSE)
         ENDIF
         RETURN





         DELETE BATCH COMMAND



                  - MODULE HISTORY -


      PROJECT:        DAS                    73-01709

      SUB-SYSTEM:     OPERATOR INTERFACE

      MODULE:         DIDLB                  24
```

```
                    - MODULE ABSTRACT -

         THIS MODULE ASKS THE USER IF ALL BATCHES TO BE DELETED. IF
        ALL BATCHES NOT TO BE DELETED, A SPECIFIC BATCH ID IS REQUESTED,
        AND THE FILE MANAGER IS CALLED TO READ THE BATCH FILE INFORM-
        ATION.
           IF ALL BATCHES TO BE DELETED, THE FILE MANAGER IS CALLED TO
        SEQUENTIALLY READ EACH BATCH RECORD. FOR EACH BATCH RECORD, OR
        THE SPECIFICLY REQUESTED BATCH RECORD, THE BATCH ID, HEADER AND
        BATCH STATUS ARE LISTED FOR USER VERIFICATION.
           THE USER IS ASKED WHETHER OR NOT BATCH IS TO BE DELETED. IF
        YES, THEN THE FILE MANAGER IS CALLED TO DELETE THE BATCH.
        ENQUEUE USER TERMINAL
        CLEAR THE USERS SCREEN
04DI    DISPLAY ON USER TERMINAL "DELETE BATCH COMMAND"
48DI    DEQUEUE AN IPM BUFFER (#1) (GET.IPM)
48DI    DEQUEUE AN IPM BUFFER (#2) (GET.IPM)
49DI    DEQUEUE RECORD BUFFER (GET.SRB)
08AL    INITIALIZE PANIC CODE
36DI
12DI    INITIALIZE POINTER TO SYSCOM BATCH DIRECTORY
12DI    INITIALIZE SYSCOM BATCH DIRECTORY ENTRY SIZE
08AL    INITIALIZE PANIC CODE
03DI    ASK USER IF ALL BATCHES TO BE DELETED
36DI    IF NOT ALL BATCHES, THEN
03DI       ASK USER FOR BATCH ID
12DI
16DI       ACCESS BATCH FILE (GET.BATCH)
           IF THE BATCH IS ACTIVE, THEN
              SET THE ACTIVE FLAG
           ELSE
              IF THE BATCH IS ACTIVE OR DELETING, THEN
                 CLEAR OK FLAG
              (ELSE)
              ENDIF
           ENDIF
10DI       IF BATCH RECORD FOUND (OK SET), THEN
10DI          SET SPECIFIC BATCH
           ELSE
02DI          DISPLAY BATCH ID, "BATCH NOT ON FILE"
           ENDIF
        ELSE
           CLEAR THE USERS SCREEN
10DI       SET OK
10DI       CLEAR SPECIFIC BATCH
        ENDIF
10DI    IF BATCH FOUND (OK SET), THEN
10DI    !  CLEAR BATCH FOUND
12DI    !  INITIALIZE BATCH COUNT
12DI    !  DOUNTIL BATCH COUNT GREATER THAN MAXIMUM
10DI    !  !  IF SPECIFIC BATCH SET, THEN
02FM    !  !     SAVE RELATIVE BATCH ID
10DI    !  !     SET BATCH FOUND
        !  !  ELSE
15DI    !  !     FIND AN ACTIVE, PENDING OR COMPLETE BATCH RECORD
        !  !     --- (FIND.BATCH) ---
        !  !     SAVE RELATIVE BATCH
        !  !     IF THE BATCH IS ACTIVE, THEN
        !  !        SET THE ACTIVE FLAG
        !  !        CLEAR OK FLAG
        !  !        SET BATCH FOUND FLAG
        !  !     (ELSE)
        !  !     ENDIF
        !  !  ENDIF
10DI    !  !  IF BATCH RECORD FOUND (OK SET), THEN
10DI    !  !     SET BATCH FOUND
        !  !     IF THIS IS THE FIRST BATCH, THEN
        !  !        DISPLAY BATCH HEADINGS
        !  !     (ELSE)
        !  !     ENDIF
43DI    !  !     DISPLAY BATCH INFORMATION
```

```
         !  !        IF NOT ACTIVE OR ALL BATCHES, THEN
         !  !           IF NOT ACTIVE, THEN
030I     !  !              ASK USER OK TO DELETE BATCH
         !  !              IF YES, THEN
100I     !  !                 SET DELETE FOUND
14PM     !  !                 STORE RELATIVE BATCH NUMBER IN IPM BUFFER (#2)
         !  !              (ELSE)
         !  !              ENDIF
         !  !           (ELSE)
         !  !           ENDIF
         !  !        ELSE
020I     !  !           DISLPAY 'BATCH BUST BE PENDING OR COMPLETE'
         !  !        ENDIF
         !  !     (ELSE)
         !  !     ENDIF
100I     !  !     IF SPECIFIC BATCH, THEN
120I     !  !        UPDATE BATCH COUNT BEYOND MAXIMUM
         !  !     (ELSE)
         !  !     ENDIF
         !  !     CLEAR THE ACTIVE BATCH FLAG
         !  ENDDO
100I     !  IF DELETE FOUND, THEN
530I     !  !  USE FILE MANAGER TO DELETE BATCH(ES) (DELETE.BATCH)
         !  ELSE
100I     !  !  IF BATCH FOUND NOT SET, THEN
040I     !  !     DISPLAY 'NO CURRENT BATCH INFORMATION'
         !  !  ELSE
         !  !     IF ALL OF THE BATCHES WERE ACTIVE, THEN
020I     !  !        DISPLAY 'ALL BATCHES ARE ACTIVE'
         !  !     (ELSE)
         !  !     ENDIF
         !  !  ENDIF
         !  ENDIF
         (ELSE)
         ENDIF
510I     RELEASE RECORD BUFFER (FREE.SRB)
500I     RELEASE THE IPM BUFFER (#1) (FREE.IPM)
500I     RELEASE THE IPM BUFFER (#2) (FREE.IPM)
         DISPLAY 'BATCH DELETION ENDED'
         DEQUEUE USER TERMINAL
         ENDPROG




         READ DISKETTE BATCH/TRANSACTION RECORD ( READ.BATCH )


                        - MODULE HISTORY -


            PROJECT:        DAS                   79-01709

            SUB-SYSTEM:     OPERATOR INTERFACE

            MODULE:         OICCRB                73


                        - MODULE ABSTRACT -


               CALL THE DISKETTE SUBROUTINE TO READ A BATCH OR
            TRANSACTION RECORD.
               THIS SUBROUTINE WILL EXIT AFTER A SINGLE CALL
            WHETHER DISKETTE ACCESS WAS SUCCESSFUL OR NOT.
         CALL READ DISKETTE DATA BLOCK
         CASENTRY (OOK, OIO, OBD, OLR, OCC, ? )
            CASE OOK ( SUCCESSFUL )
100I           SET OK
            CASE OIO ( I/O ERROR OCCURRED )
               ENQUEUE USER TERMINAL
```

```
020I          DISPLAY "DISKETTE I/O ERROR OCCURRED"
100I          SET LAST RECORD
100I          SET BATCH ABORT
100I          CLEAR OK
           CASE DBD (INVALID RECORD COUNT)
              ENQUEUE USER TERMINAL
              DISPLAY "DISKETTE FORMAT ERROR"
              CLEAR OK FLAG
           CASE DLR ( LAST RECORD - SUCCESSFUL )
100I          SET LAST RECORD
100I          SET OK
           CASE DCC ( INVALID CALL CODE )
540I          PANIC
           CASE ?  ( INVALID COMPLETION CODE )
540I          PANIC
        ENDCASE
        RETURN
```

```
        PANIC

                    - MODULE HISTORY -

           PROJECT:        DAS                 79-01709

           SUB-SYSTEM:     OPERATOR INTERFACE

           MODULE:         DICCPA              84

                    - MODULE ABSTRACT -

              THIS SUBROUTINE PERFORMS THE PANIC.  THE PANIC
           CODE IS RETRIEVED AND PUT ON THE ALARM QUEUE.  A
           DEQUEUE TERMINAL IS PERFORMED TO GET RID OF ANY LEFT
           OVER ENQUEUES.  THEN A WAIT FOR AN EVENT THET WILL
           NEVER BE POSTED IS PERFORMED.

08AL    GET PANIC CODE
01AL    GET ADDRESS OF ALARM QUEUE IN SYSCOM
        DEQUEUE TERMINAL / PRINTER
07AL    PUT PANIC CODE ON THE ALARM QUEUE
        WAIT FOR NEVER EVENT
        RETURN
```

```
        WRITE SORT TRANSLATION TABLE TO DISK

                    - MODULE HISTORY -

           PROJECT:        DAS                 79-01709

           SUB-SYSTEM:     OPERATOR INTERFACE

           MODULE:         DICCWS              82
```

```
            CHECKED:      S.R.MARSDEN            16-JAN-79                 00000190
                                                                           00000200
                                                                           00000210
                        - MODULE ABSTRACT -                                00000220
                                                                           00000230
                                                                           00000240
              THIS SUBROUTINE WRITES THE SORT TRANSLATION TABLE            00000250
           TO THE DISK.  IT FIRST CLEARS THE 256 BYTE BUFFER AND           00000260
           THEN COPIES IN THE SORT TRANSLATION TABLE.  THE BUF-            00000270
           FER IS THEN WRITTEN TO THE DISK.  IF ANY ERRORS ARE             00000280
           ENCOUNTERED A PANIC IS PERFORMED.                               00000290
                                                                           00000300
                                                                           00000310
                                                                           00000320
   06FM    GET ADDRESS OF SORT TRANSLATION TABLE IN SYSCOM                 00000330
           CLEAR WRITE BUFFER                                              00000340
   06FM    COPY TRANSLATION TABLE IN SYSCOM TO THE BUFFER                  00000350
   06FM    WRITE THE BUFFER TO DISK                                        00000360
           IF ANY DISK ERRORS WERE ENCOUNTERED THEN                        00000370
   54OI       PANIC                                                        00000380
           (ELSE)                                                          00000390
           ENDIF                                                           00000400
           RETURN                                                          00000410

                                                                           00000010
                                                                           00000020
                                                                           00000030
                                                                           00000040
                                                                           00000050
           ALARM OUTPUT                                                    00000060
                                                                           00000070
                                                                           00000080
                                                                           00000090
                       - MODULE HISTORY -                                  00000100
                                                                           00000110
                                                                           00000120
           PROJECT:      DAS                   76-01709                    00000130
                                                                           00000140
           SUB-SYSTEM:   OPERATOR INTERFACE                                00000150
                                                                          -00000160
           MODULE:       OICCSA                83                          00000170
                                                                           00000180
                                                                           00000190
                        - MODULE ABSTRACT -                                00000200
                                                                           00000210
                                                                           00000220
              THIS SUBROUTINE SENDS AN ALARM MESSAGE TO THE ALARM          00000230
           MESSAGE HANDLING SUB-SYSTEM.  IT GETS A BUFFER, PUTS            00000240
           IN THE MESSAGE NUMBER AND DATA, AND PUTS THE ADDRESS            00000250
           OF THE BUFFER ON THE ALARM QUEUE.  IF ANY ERRORS ARE            00000260
           ENCOUNTERED, PANICS ARE PERFORMED.                              00000270
                                                                           00000280
                                                                           00000290
                                                                           00000300
   02AL    GET ADDRESS ALARM BUFFER QUEUE IN SYSCOM                        00000310
   02AL    DEQUEUE A BUFFER                                                00000320
   02AL    IF ONE RECIEVED THEN                                            00000330
   03AL       PUT IN MESSAGE NUMBER                                        00000340
   03AL       PUT IN MESSAGE DATA                                          00000350
   01AL       GET ADDRESS OF ALARM QUEUE IN SYSCOM                         00000360
   01AL       PUT ADDRESS OF BUFFER ON THE ALARM QUEUE                     00000370
              IF THE ALARM QUEUE WAS ALREADY FULL THEN                     00000380
   54OI          PANIC                                                     00000390
              (ELSE)                                                       00000400
              ENDIF                                                        00000410
           ELSE                                                            00000420
              PANIC                                                        00000430
           ENDIF                                                           00000440
           RETURN                                                          00000450
```

```
FREE A RECORD BUFFER

                    - MODULE HISTORY -

   PROJECT:         DAS                        7G-01709

   SUB-SYSTEM:      OPERATOR INTERFACE

   MODULE:          OICCFR                     67

                    - MODULE ABSTRACT -

          THIS SUBROUTINE PUTS THE 64 BYTE RECORD BUFFER BACK
      ON THE BUFFER QUEUE IN SYSCOM. IF THE QUEUE IS FULL A
      PANIC IS PERFORMED.

36FM     GET ADDRESS OF SRB (64-BYTE) BUFFER QUEUE IN SYSCOM
36FM     PUT ADDRESS OF BUFFER ON THE QUEUE
36FM     IF THE QUEUE WAS ALREADY FULL THEN
54JI        PANIC
         (ELSE)
         ENDIF
         RETURN
```

```
GET A RECORD BUFFER

                    - MODULE HISTORY -

   PROJECT:         DAS                        7G-01709

   SUB-SYSTEM:      OPERATOR INTERFACE

   MODULE:          OICCGR                     66

                    - MODULE ABSTRACT -

          THIS SUBROUTINE GETS A 64 BYTE RECORD BUFFER FROM
      THE RECORD BUFFER QUEUE IN SYSCOM. IF THE QUEUE IS EMPTY
      A PANIC IS PERFORMED.

36FM     GET ADDRESS OF SRB (64-BYTE) BUFFER QUEUE IN SYSCOM
36FM     DEQUEUE A BUFFER FROM THE QUEUE
36FM     IF THE QUEUE WAS EMPTY THEN
54JI        PANIC
         (ELSE)
         ENDIF
         RETURN
```

```
FREE AN INTER-PROGRAM MESSAGE BUFFER


                    - MODULE HISTORY -

   PROJECT:        DAS                       73-01709

   SUB-SYSTEM:     OPERATOR INTERFACE

   MODULE:         OICCFI                    65

                    - MODULE ABSTRACT -

      THIS SUBROUTINE PUTS AN INTER-PROGRAM MESSAGE BUFFER
   BACK ON THE IPM QUEUE.  IF THE QUEUE IS FULL A PANIC IS
   PERFORMED.


09FM    GET ADDRESS OF IPM BUFFER QUEUE IN SYSCOM
09FM    PUT ADDRESS OF BUFFER ON THE QUEUE
09FM    IF THE QUEUE WAS ALREADY FULL THEN
540I       PANIC
        (ELSE)
        ENDIF
        RETURN
```

```
GET AN INTER-PROGRAM MESSAGE BUFFER


                    - MODULE HISTORY -

   PROJECT:        DAS                       73-01709

   SUB-SYSTEM:     OPERATOR INTERFACE

   MODULE:         OICCGI                    64

                    - MODULE ABSTRACT -

      THIS SUBROUTINE DEQUEUES AN INTER-PROGRAM MESSAGE
   BUFFER FROM THE IPM QUEUE.  IF THE QUEUE IS EMPTY A
   PANIC IS PERFORMED.


09FM    GET ADDRESS OF IPM BUFFER QUEUE IN SYSCOM
09FM    DEQUEUE A BUFFER FROM THE QUEUE
09FM    IF THE QUEUE WAS EMPTY THEN
540I       PANIC
        (ELSE)
        ENDIF
        RETURN
```

```
WRITE DISKETTE BATCH/TRANSACTION RECORD ( WRITE.BATCH )


                    - MODULE HISTORY -

   PROJECT:         DAS                     7G-01709

   SUB-SYSTEM:      OPERATOR INTERFACE

   MODULE:          DICCWB                  75

                    - MODULE ABSTRACT -

         CALL THE DISKETTE SUBROUTINE TO WRITE A BATCH OR
      TRANSACTION RECORD.
         THIS SUBROUTINE WILL EXIT AFTER A SINGLE CALL
      WHETHER DISKETTE ACCESS WAS SUCCESSFUL OR NOT.

      CALL WRITE DISKETTE DATA BLOCK
      CASENTRY (DOK, DIO, DCC, ? )
         CASE DOK ( SUCCESSFUL )
100I        SET OK
         CASE DIO ( I/O ERROR OCCURRED )
            ENQUEUE USER TERMINAL
020I        DISPLAY "DISKETTE I/O ERROR OCCURRED"
140I        UPDATE TRANSACTION COUNT BEYOND MAXIMUM
100I        SET BATCH ABORT
100I        CLEAR OK
         CASE DCC ( INVALID CALL CODE )
540I        PANIC
         CASE  ?  ( INVALID COMPLETION CODE )
540I        PANIC
      ENDCASE
      RETURN
```

```
ASSIGN TRANSACTION STATUS COMMAND


                    - MODULE HISTORY -

   PROJECT:         DAS                     7G-01709

   SUB-SYSTEM:      OPERATOR INTERFACE

   MODULE:          DIATS                   28

                    - MODULE ABSTRACT -

   THIS MODULE REQUESTS A BATCH ID. THE FILE MANAGER IS CALLED
TO READ THE BATCH FILE INFORMATION. IF THE BATCH INFORMATION IS
FOUND, THE USER IS ASKED FOR START AND END RANGE OF TRANSACTION
ID'S. EACH IS CHECKED FOR NON-ZERO VALUE,
AND THE END NUMBER GREATER THAN THE START NUMBER. IF TRANS-
ACTION VALUES ARE ACCEPTABLE, THE USER IS ASKED FOR THE NEW
TRANSACTION STATUS.
THE FILE MANAGER IS CALLED TO CHANGE TRANSACTION RECORD STATUS.
```

```
        ENQUEUE USER TERMINAL
04DI    DISPLAY ON USER TERMINAL "ASSIGN TRANSACTION STATUS COMMAND"
48DI    DEQUEUE AN IPM BUFFER (GET.IPM)
49DI    DEQUEUE RECORD BUFFER (GET.SRB)
03DI    ASK USER FOR BATCH ID
12DI
08AL    INITIALIZE PANIC CODE
40DI
16DI    ACCESS BATCH FILE (GET.BATCH)
01FM
10DI    IF BATCH RECORD FOUND (OK SET), THEN
43DI    !  DISPLAY BATCH HEADER
43DI    !  DISPLAY BATCH INFORMATION
03DI    !  ASK USER FOR START TRANSACTION NUMBER
40DI    !
40DI    !  IF INPUT TRANS ID WITHIN RANGE THEN
03DI    !  !  ASK USER FOR END TRANSACTION NUMBER
40DI    !  !  IF INPUT TRANS ID WITHIN RANGE AND GT. OR EQ. START ID. --
        !  !  -- THEN
03DI    !  !  !  DO UNTIL VALID STATUS RECEIVED
40DI    !  !  !
16FM    !  !  !     VERIFY STATUS CODE BY RANGE CHECK
40DI    !  !  !  ENDDO
        !  !  !  ASK USER IF ALL PARAMETERS CORRECT
        !  !  !  IF YES THEN
08AL    !  !  !  !  INITIALIZE PANIC CODE
        !  !  !  !  DISPLAY "PROCESSING STATUS CHANGES"
40DI    !  !  !  !
40DI    !  !  !  !  DOUNTIL START TRANS ID GREATER THAN END TRANS ID --
        !  !  !  !  -- OR ERROR FOUND
        !  !  !  !     DELAY
16DI    !  !  !  !     UPDATE IPM FOR CALL
08FM    !  !  !  !     CALL FILE MANAGER TO CHANGE TRANSACTION STATUS
16FM    !  !  !  !     CASENTRY (FOK, FNB, FTN, FCC, FIS, ? )
        !  !  !  !        CASE FOK ( SUCCESSFUL )
        !  !  !  !        CASE FNB ( TRANSACTION NOT IN BATCH )
02DI    !  !  !  !           DISPLAY "TRANS. NOT IN BATCH"
        !  !  !  !           SET ERROR FOUND
14DI    !  !  !  !           SUB 1 FROM TRANS. ID
        !  !  !  !        CASE FTN ( TRANSACTION NOT ON FILE )
        !  !  !  !           DISPLAY "TRANS. NOT ON FILE"
        !  !  !  !           SET ERROR FOUND
14DI    !  !  !  !           SUB 1 FROM TRANS. ID
        !  !  !  !        CASE FCC ( INVALID CALL CODE )
54DI    !  !  !  !           PANIC
        !  !  !  !        CASE FIS ( INVALID STATUS)
54DI    !  !  !  !           PANIC
        !  !  !  !        CASE  ?  ( INVALID COMPLETION CODE )
54DI    !  !  !  !           PANIC
        !  !  !  !     ENDCASE
14DI    !  !  !  !     INCREMENT TRANSACTION ID
        !  !  !  !  ENDDO
        !  !  !  !  IF ANY TRANSACTIONS CHANGED THEN
        !  !  !  !     DISPLAY TRANS. THAT WHERE CHANGED
        !  !  !  !  ELSE
        !  !  !  !     DISPLAY "NO CHANGE MADE"
        !  !  !  !  ENDIF
        !  !  !  (ELSE)
        !  !  !  ENDIF
        !  !  ELSE
        !  !  !  IF END ID LESS THAN START ID THEN
        !  !  !     DISPLAY "END ID MUST BE GREATER THAN OR --
        !  !  !     -- EQUAL TO THE START ID
        !  !  !  ELSE
        !  !  !     DISPLAY "INVALID TRANS. ID"
        !  !  !  ENDIF
        !  !  ENDIF
        !  ELSE
        !  !  DISPLAY "INVALID TRANS. ID"
        !  ENDIF
        !  DISPLAY "STATUS CHANGE COMMAND ENDED"
        ELSE
02DI    !  DISPLAY BATCH ID, "BATCH NOT ON FILE"
```

```
        ENDIF
510I    RELEASE RECORD BUFFER (FREE.SRB)
500I    RELEASE THE IPM BUFFER (FREE.IPM)
        DEQUEUE TERMINAL
        ENDPROG




        RECIRC. ON SCANNER ERROR



                       - MODULE HISTORY -


           PROJECT:        DAS                  7G-01709

           SUB-SYSTEM:     OPERATOR INTERFACE

           MODULE:         OIREC                45


                       - MODULE ABSTRACT -


           THIS MODULE SETS A SWITCH VALUE IN SYSCOM WHICH WHEN
        INTERROGATED BY SCANNER INPUT SOFTWARE, SCANNER ERRORS WILL
        BE RECIRCULATED.



        ENQUEUE USER TERMINAL
040I    DISPLAY ON USER TERMINAL "RECIRC. ON SCANNER ERROR"
11SC    SET SYSCOM FLAG VALUE
02AL    GET AN ALARM BUFFER
02AL    IF ONE RECEIVED, THEN
03AL       PUT IN MESSAGE NUMBER
01AL       PUT ADDRESS OF THE BUFFER IN THE ALARM QUEUE
01AL       IF THERE IS NO ROOM, THEN
07AL          PANIC
           (ELSE)
           ENDIF
        ELSE
07AL       PANIC
        ENDIF
        DEQUEUE TERMINAL
        ENDPROG




        GET DISK ORDER FILE RECORD BY ORDER ID ( GET.ORDER )



                       - MODULE HISTORY -


           PROJECT:        DAS                  7G-01709

           SUB-SYSTEM:     OPERATOR INTERFACE

           MODULE:         OICCGO               77


                       - MODULE ABSTRACT -


        PROCESS:    CALL THE FILE MANAGER TO READ THE DISK ORDER
              FILE RECORD. IF SUCCESSFUL, COPY THE ORDER INFORM-
```

```
              ATION FROM THE SYSCOM RECORD BUFFER TO THE DATA AREAS
              IN THE PROGRAM AND SET OK. IF AN ERROR OCCURRED, TELL
              THE USER, CLEAR OK AND TAKE ANY FURTHER APPRORIATE
              ACTION REQUIRED.
                 THIS SUBROUTINE WILL EXIT AFTER A SINGLE CALL TO THE
              FILE MANAGER WHETHER ORDER FILE ACCESS WAS SUCCESSFUL
              OR NOT.
22FM    UPDATE IPM FOR CALL
08FM    CALL FILE MANAGER TO READ ORDER FILE RECORD BY ORDER ID
22FM    CASENTRY (FOK, FBN, FCC, FON, ? )
           CASE FOK ( SUCCESSFUL )
05FM          GET ORDER INFORMATION
13OI
10OI          SET OK
           CASE FBN ( BATCH NOT FOUND )
02OI          PRINT/DISPLAY BATCH ID, "BATCH NO LONGER ON FILE"
10OI          CLEAR OK
           CASE FCC ( INVALID CALL CODE )
54OI          PANIC
           CASE FON ( ORDER NOT ON FILE)
02OI          PRINT/DISPLAY ORDER ID, "ORDER ID NOT ON FILE"
10OI          CLEAR OK
           CASE  ?  ( INVALID COMPLETION CODE )
54OI          PANIC
        ENDCASE
        RETURN




        FIND RELATIVE DISK ORDER FILE RECORD IN BATCH ( FIND.ORDER )



                          - MODULE HISTORY -


           PROJECT:         DAS                      73-01709

           SUB-SYSTEM:      OPERATOR INTERFACE

           MODULE:          OICCFO                   76


                          - MODULE ABSTRACT -


              EACH RELATIVE ORDER RECORD IS SEQUENTIALLY ACCESSED
           ONE AT A TIME BY CALLING THE FILE MANAGER FOR EACH
           RELATIVE ORDER NUMBER. IF SUCCESSFUL, COPY THE ORDER
           INFORMATION FROM THE SYSCOM RECORD BUFFER TO THE DATA
           AREAS IN THE PROGRAM AND SET OK. IF AN ERROR OCCURRED,
           TELL THE USER, CLEAR OK AND TAKE ANY FUTHER APPRO-
           PRIATE ACTION REQUIRED.
              THIS SUBROUTINE WILL EXIT WHEN EITHER:
           1) THE DISK ORDER FILE HAS BEEN ACCESSED WITHOUT
              ERROR, OR
           2) THE DISK ORDER FILE HAS BEEN COMPLETELY ACCESSED.

13OI    DOUNTIL END OF ORDER COUNT OR OK SET
12OI
10OI
23FM       UPDATE IPM FOR CALL
08FM       CALL FILE MANAGER TO READ ORDER FILE RECORD BY ORDER COUNT
23FM       CASENTRY (FOK, FBN, FCC, FIR, ? )
              CASE FOK ( SUCCESSFUL )
05FM             GET ORDER INFORMATION
13OI
10OI             SET OK
              CASE FBN ( BATCH NOT FOUND )
13OI             UPDATE ORDER COUNT BEYOND MAXIMUM
12OI
```

```
100I          CLEAR OK
           CASE FCC ( INVALID CALL CODE )
540I          PANIC
           CASE FIR ( INVALID RELATIVE RECORD )
540I          PANIC
           CASE  ?  ( INVALID COMPLETION CODE )
540I          PANIC
        ENDCASE
100I    INCREMENT ORDER COUNT
     ENDDO
     RETURN




     CHANGE DISK BATCH FILE RECORD STATUS ( CHANGE.BATCH )


                      - MODULE HISTORY -


        PROJECT:         DAS                    73-01709

        SUB-SYSTEM:      OPERATOR INTERFACE

        MODULE:          OICCCB                 72

                      - MODULE ABSTRACT -


              CALL THE FILE MANAGER TO CHANGE THE DISK BATCH
           FILE RECORD.
              IF AN ERROR OCCURRED, TELL THE USER, CLEAR OK AND
           TAKE ANY FURTHER APPRORIATE ACTION REQUIRED.
              THIS SUBROUTINE WILL EXIT AFTER A SINGLE CALL TO THE
           FILE MANAGER WHETHER BATCH FILE ACCESS WAS SUCCESSFUL
           OR NOT.
15FM  UPDATE IPM FOR CALL
08FM  CALL FILE MANAGER TO CHANGE BATCH STATUS
15FM  CASENTRY (FOK, FBN, FCC, FIS, ? )
         CASE FOK ( SUCCESSFUL )
100I        SET OK
         CASE FBN ( BATCH NOT FOUND )
            OUTPUT BATCH NOT ON FILE MESSAGE
            CLEAR OK
         CASE FCC ( INVALID CALL CODE )
540I        PANIC
         CASE FIS ( INVALID STATUS)
540I        PANIC
         CASE  ?  ( INVALID COMPLETION CODE )
540I        PANIC
      ENDCASE
      RETURN




      READ DISK BATCH FILE RECORD BY BATCH ID ( GET.BATCH )


                      - MODULE HISTORY -


         PROJECT:        DAS                    73-01709

         SUB-SYSTEM:     OPERATOR INTERFACE
```

```
     MODULE:          OICCGB                71


                      - MODULE ABSTRACT -


             CALL THE FILE MANAGER TO READ THE DISK BATCH FILE
          RECORD. IF SUCCESSFUL, COPY THE BATCH INFORMATION FROM
          THE SYSCOM RECORD BUFFER TO THE DATA AREAS IN THE PRO-
          GRAM AND SET OK. IF AN ERROR OCCURRED, TELL THE USER,
          CLEAR OK AND TAKE ANY FURTHER APPROPRIATE ACTION RE-
          QUIRED.
             THIS SUBROUTINE WILL EXIT AFTER A SINGLE CALL TO THE
          FILE MANAGER WHETHER BATCH FILE ACCESS WAS SUCCESSFUL
          OR NOT.
18FM    UPDATE IPM FOR CALL
08FM    CALL FILE MANAGER TO READ BATCH FILE RECORD BY BATCH ID
18FM    CASENTRY (FOK, FBN, FCC, ? )
           CASE FOK ( SUCCESSFUL )
01FM          GET BATCH INFORMATION
120I
100I          SET OK
           CASE FBN ( BATCH NOT FOUND )
100I          CLEAR OK
           CASE FCC ( INVALID CALL CODE )
540I          PANIC
           CASE  ?  ( INVALID COMPLETION CODE )
540I          PANIC
        ENDCASE
        RETURN




        FIND CURRENT BATCH IN SYSCOM BATCH DIRECTORY ( FIND.BATCH )



                      - MODULE HISTORY -


           PROJECT:       DAS                   79-01709

           SUB-SYSTEM:    OPERATOR INTERFACE

           MODULE:        OICCFB                70


                      - MODULE ABSTRACT -


             EACH SYSCOM BATCH DIRECTORY IS EXAMINED ONE AT
          AT A TIME. IF THE ENTRY CONTAINS A PENDING, ACTIVE
          OR COMPLETE STATUS; THE DISK BATCH FILE WILL BE
          ACCESSED.
             THIS SUBROUTINE WILL EXIT WHEN EITHER:
          1) THE DISK BATCH FILE HAS BEEN ACCESSED WITHOUT
             ERROR, OR
          2) THE BATCH DIRECTORY HAS BEEN COMPLETELY EXAMINED.

120I    DOUNTIL BATCH COUNT GREATER THAN MAXIMUM OR OK SET
100I
02FM       EXAMINE SYSCOM BATCH DIRECTORY ENTRY
02FM       IF BATCH PENDING, ACTIVE OR COMPLETE, THEN
160I          ACCESS BATCH FILE (GET.BATCH)
           ELSE
100I          CLEAR OK
           ENDIF
120I       INCREMENT POINTER TO SYSCOM BATCH DIRECTORY
120I       INCREMENT BATCH COUNT
        ENDDO
        RETURN
```

```
READ DISK TRANSACTION FILE RECORD BY TRANS. ID ( GET.TRANS )

                    - MODULE HISTORY -

   PROJECT:         DAS                     79-01709

   SUB-SYSTEM:      OPERATOR INTERFACE

   MODULE:          OICCGT                  80

                    - MODULE ABSTRACT -

         CALL THE FILE MANAGER TO READ THE TRANSACTION FILE
      RECORD. IF SUCCESSFUL, COPY THE TRANSACTION DATA FROM
      THE SYSCOM RECORD BUFFER TO THE DATA AREAS IN THE PRO-
      GRAM AND SET OK. IF AN ERROR OCCURRED, TELL THE USER,
      CLEAR OK AND TAKE ANY FURTHER APPROPRIATE ACTION RE-
      QUIRED.
         THIS SUBROUTINE WILL EXIT AFTER A SINGLE CALL TO THE
      FILE MANAGER WHETHER TRANSACTION FILE ACCESS WAS SUC-
      CESSFUL OR NOT.
19FM  UPDATE IPM FOR CALL
08FM  CALL FILE MANAGER TO READ TRANSACTION FILE RECORD
19FM  CASENTRY (FOK, FTN, FCC, ? )
         CASE FOK ( SUCCESSFUL )
04FM        GET TRANSACTION INFORMATION
14OI
10OI        SET OK
         CASE FTN ( TRANSACTION NOT FOUND )
10OI        CLEAR OK
         CASE FCC ( INVALID CALL CODE )
54OI        PANIC
         CASE  ?  ( INVALID COMPLETION CODE )
54OI        PANIC
      ENDCASE
      RETURN

HELP COMMAND (OPERATOR COMMAND LIST DISPLAY)

                    - MODULE HISTORY -

   PROJECT:         DAS                     79-01709

   SUB-SYSTEM:      OPERATOR INTERFACE

   MODULE:          OIHLP                   53

                    - MODULE ABSTRACT -

   THIS MODULE DISPLAYS ALL OPERATOR INTERFACE COMMANDS ON THE
USER TERMINAL.
```

```
        ENQUEUE USER TERMINAL
04OI    DISPLAY ON USER TERMINAL "HELP COMMAND"
47OI    DISPLAY OPERATOR COMMAND LIST ON USER TERMINAL
        DEQUEUE TERMINAL
        ENDPROG




        ADD DISK BATCH FILE RECORD ( ADD.BATCH )



                          - MODULE HISTORY -


           PROJECT:        DAS                     73-01709

           SUB-SYSTEM:     OPERATOR INTERFACE

           MODULE:         OICCAB                  74


                          - MODULE ABSTRACT -


                 CALL THE FILE MANAGER TO ADD THE DISKETTE BATCH
              RECORD.
                 THIS SUBROUTINE WILL EXIT AFTER A SINGLE CALL TO THE
              FILE MANAGER WHETHER BATCH FILE ACCESS WAS SUCCESSFUL
              OR NOT.

12FM    UPDATE IPM FOR CALL
08FM    CALL FILE MANAGER TO ADD BATCH FILE RECORD
12FM    CASENTRY (FOK, FBX, FBA, FAD, FCC, ? )
           CASE FOK ( SUCCESSFUL )
10OI          SET OK
           CASE FBX ( BATCH FILE SPACE EXHAUSTED )
02OI          DISPLAY "BATCH FILE SPACE EXHAUSTED"
10OI          CLEAR OK
           CASE FBA ( BATCH ALREADY ON FILE )
02OI          DISPLAY BATCH ID, "BATCH ALREADY ON FILE"
10OI          CLEAR OK
           CASE FAD ( BATCH ALREADY BEING ADDED )
54OI          PANIC
           CASE FCC ( INVALID CALL CODE )
54OI          PANIC
           CASE  ?  ( INVALID COMPLETION CODE )
54OI          PANIC
        ENDCASE
        RETURN




        RESTORE SHIPPING LINE COMMAND



                          - MODULE HISTORY -


           PROJECT:        DAS                     73-01709

           SUB-SYSTEM:     OPERATOR INTERFACE

           MODULE:         OIRSL                   26
```

```
                    - MODULE ABSTRACT -

         THIS MODULE REQUESTS SORT LINE NUMBER TO BE RESTORED.
      THE SORT LINE NUMBER IS VALIDATED BY RANGE CHECK. IF THE
      SORT LINE NUMBER IS ACCEPTABLE, THE RESIDENT SORT TRANSLA-
      TION TABLE IS UPDATED AND THE FILE MANAGER IS CALLED TO WRITE
      THE RESIDENT SORT TRANSLATION TABLE TO DISK.
      ENQUEUE USER TERMINAL
040I  DISPLAY ON USER TERMINAL "RESTORE SORT LINE COMMAND"
030I  ASK USER FOR OLD SORT LINE NUMBER
380I
380I  RANGE CHECK OLD SORT LINE NUMBER
39FM  IF NOT IN RANGE OR RECIRC OR ERROR CHUTE, THEN
020I     DISPLAY "INVALID SORT LINE NUMBER" OLD LINE NUMBER
         DISPLAY "COMMAND ABORTED"
      ELSE
         IF SORT LINE HAS BEEN REROUTED, THEN
380I        UPDATE RESIDENT SORT TRANSLATION TABLE
040I        DISPLAY "SORT LINE ASSIGNED"
08AL        INITIALIZE PANIC CODE
380I
460I        WRITE SORT TRANSLATION TABLE TO DISK (WRITE.SORT)
         ELSE
020I        DISPLAY "NO PRIOR ASSIGNMENT OF SORT LINE"
            DISPLAY "COMMAND ABORTED"
         ENDIF
      ENDIF
      DEQUEUE TERMINAL
      ENDPROG
```

```
      ASSIGN SHIPPING LINE COMMAND

                    - MODULE HISTORY -

         PROJECT:        DAS                    73-01709

         SUB-SYSTEM:     OPERATOR INTERFACE

         MODULE:         OIASL                  25

                    - MODULE ABSTRACT -

         THIS MODULE REQUESTS SORT LINE NUMBER TO BE (RE)ASSIGNED.
      THE SORT LINE NUMBER IS VALIDATED BY RANGE CHECK. IF THE OLD
      SORT LINE NUMBER IS ACCEPTABLE, THE USER IS ASKED FOR THE NEW
      SORT LINE NUMBER. THIS ALSO IS VALIDATED BY RANGE CHECK. IF THE
      NEW SORT LINE NUMBER IS ACCEPTABLE, THE RESIDENT SORT TRANSLA-
      TION TABLE IS UPDATED AND THE FILE MANAGER IS CALLED TO WRITE
      THE RESIDENT SORT TRANSLATION TABLE TO DISK.

      ENQUEUE USER TERMINAL
      CLEAR ABORT
39FM  GET SORT SYSTEM PARAMETERS
040I  DISPLAY ON USER TERMINAL "REROUTE SORT LINE COMMAND"
030I  ASK USER FOR OLD SORT LINE NUMBER
370I
370I  RANGE CHECK OLD SORT LINE NUMBER
      IF NOT IN RANGE OR RECIRC OR ERROR CHUTE, THEN
020I     DISPLAY "INVALID SORT LINE NUMBER" OLD LINE NUMBER
         SET ABORT
```

```
        ELSE
06FM       GET ENTRY FROM SORT TRANSLATION TABLE
           IF ALREADY RE-ASSIGNED, THEN
              TELL USER IT IS ALREADY ASSIGNED
              ASK IF WE SHOULD CONTINUE
              IF THE ANSWER IS "NO", THEN
                 SET ABORT
              (ELSE)
              ENDIF
           (ELSE)
           ENDIF
           IF ABORT IS NOT SET, THEN
03OI          ASK USER FOR NEW SORT LINE NUMBER
37OI
37OI          RANGE CHECK NEW SORT LINE NUMBER
              IF NOT IN RANGE
                 SET ABORT
02OI             DISPLAY "INVALID SORT LINE NUMBER" NEW LINE NUMBER
              ELSE
06FM             IF OLD SORT LINE EQ NEW SORT LINE, THEN
02OI                DISPLAY "ATTEMPT TO ASSIGN SORT LINE TO ITSELF"
                    DISPLAY "COMMAND ABORTED"
                 ELSE
37OI                UPDATE RESIDENT SORT TRANSLATION TABLE
04OI                DISPLAY "SORT LINE ASSIGNED"
08AL                INITIALIZE PANIC CODE
37OI
46OI                WRITE SORT TRANSLATION TABLE TO DISK (WRITE.SORT)
                 ENDIF
              ENDIF
           ENDIF
        ELSE
           DISPLAY "COMMAND ABORTED"
        ENDIF
        DEQUEUE TERMINAL
        ENDPROG
```

```
        OPERATOR INTERFACE CONTROL ( ATTENTION LIST )

                         - MODULE HISTORY -

           PROJECT:        DAS                    79-01709

           SUB-SYSTEM:     OPERATOR INTERFACE

           MODULE:         OICTL                  14

                       -MODULE ABSTRACT-

            THIS MODULE CONTAINS THE ATTENTION LIST PROCESSING. THE
        USER WILL HIT THE ATTENTION KEY, THEN TYPE THE OPERATOR COM-
        MAND FOLLOWED BY THE RETURN KEY. IN THE ATTENTION LIST PRO-
        CESSING THE PROGRAM WILL CALL A SUBROUTINE (TASK SELECT) TO
        SELECT ONE OF FOUR LOADING TASKS, DEPENDING ON WHICH ONES
        ARE NOT ACTIVE AT THE TIME.  THE NUMBER ASSOCIATED WITH THE
        COMMAND TYPED WILL BE PASSED TO THE LOADING TASK.  THEN AN
        END ATTENTION IS PERFORMED.
        THE ATTACHED TASK WILL THEN ENQUEUE A LOADING SUBROUTINE
        (LOADIT) AND PASS THE COMMAND NUMBER.  THE SUBROUTINE WILL
        THEN LOAD THE REQUIRED PROGRAM.

        DOUNTIL  FOREVER
26OI       WAIT FOR USER TO ENTER COMMAND
```

```
01DI      CASENTRY (COMMAND-1,COMMAND-2,...,COMMAND-N)           00000360
              CASE COMMAND-1                                     00000370
                  CALL TASK SELECT AND PASS COMMAND NUMBER       00000380
              CASE COMMAND-2                                     00000390
                  CALL TASK SELECT AND PASS COMMAND NUMBER       00000400
                  :                                              00000410
                  :                                              00000420
              CASE COMMAND-N                                     00000430
                  CALL TASK SELECT AND PASS COMMAND NUMBER       00000440
          ENDCASE                                                00000450
      ENDDO                                                      00000460
      ENDPROG                                                    00000470
                                                                 00000480
                  ***************                                00000490
                                                                 00000500
          * FORMAT OF SUBROUTINE TO ATTACH LOADING TASK *        00000510
                                                                 00000520
                                                                 00000530
      IF FIRST LOADING TASK IS NOT ACTIVE, THEN                  00000540
          PASS COMMAND NUMBER AND ATTACH THE TASK                00000550
      ELSE                                                       00000560
          IF SECOND LOADING TASK IS NOT ACTIVE, THEN             00000570
              PASS COMMAND NUMBER AND ATTACH THE TASK            00000580
          ELSE                                                   00000590
              IF THIRD LOADING TASK IS NOT ACTIVE, THEN          00000600
                  PASS COMMAND NUMBER AND ATTACH THE TASK        00000610
              ELSE                                               00000620
                  PASS COMMAND NUMBER AND ATTACH THE FOURTH TASK 00000630
              ENDIF                                              00000640
          ENDIF                                                  00000650
      ENDIF                                                      00000660
      RETURN                                                     00000670
                                                                 00000680
                  ***************                                00000690
                                                                 00000700
          * GENERAL FORMAT OF TASKS TO CALL LOADING SUBROUTINE. * 00000710
                                                                 00000720
      ENQUEUE USER TERMINAL                                      00000730
      ENQUEUE SUBROUTINE (LOAD IT)                               00000740
      CALL SUBROUTINE (LOAD IT) AND PASS COMMAND NUMBER          00000750
      DEQUEUE SUBROUTINE                                         00000760
      DEQUEUE USER TERMINAL                                      00000770
      ENDTASK                                                    00000780
                                                                 00000790
                  ***************                                00000800
                                                                 00000810
          * FORMAT OF LOADING SUBROUTINE (LOAD IT) *             00000820
                                                                 00000830
      CASENTRY (COMMAND-?,COMMAND-1,COMMAND-2,...,COMMAND-N)     00000840
          CASE COMMAND-?                                         00000850
07AL          PANIC                                              00000860
          CASE COMMAND-1                                         00000870
              LOAD COMMAND-1 PROGRAM                             00000880
          CASE COMMAND-2                                         00000890
              LOAD COMMAND-2 PROGRAM                             00000900
              :                                                  00000910
              :                                                  00000920

          CASE COMMAND-N                                         00000930
              LOAD COMMAND-N PROGRAM                             00000940
      ENDCASE                                                    00000950
      GET LOAD CONDITION CODE                                    00000960
      IF CONDITION CODE NOT EQUAL TO 'NO ERRORS', THEN           00000970
          IF CONDITION CODE NOT EQUAL TO 'NO ROOM FOR PROGRAM', AND, 00000980
             CONDITION CODE NOT EQUAL TO 'NO ROOM FOR LOADER', THEN  00000990
              DISPLAY '*01* PROGRAM LOAD ERROR'                  00001000
              DISPLAY ERROR CODE                                 00001010
          ELSE                                                   00001020
              DISPLAY '**** RETRY COMMAND LATER'                 00001030
          ENDIF                                                  00001040
      (ELSE)                                                     00001050
      ENDIF                                                      00001060
      RETURN                                                     00001070
```

```
NOTE - FOR COMMANDS 'READ BATCH' AND 'WRITE BATCH', THE DIS-
       KETTE IN USE FLAG MUST BE CHECKED BEFORE THE CORRES-
       PONDING PROGRAM IS LOADED.  IF THE FLAG IS ALREADY SET,
       'DISKETTE ALREADY IN USE' IS DISPLAYED.  OTHERWISE, IF
       THERE WERE NO LOAD ERRORS, THE FLAG IS THEN SET.
```

```
HOLD ON SCANNER ERROR

              - MODULE HISTORY -

   PROJECT:        DAS                 7G-01709

   SUB-SYSTEM:     OPERATOR INTERFACE

   MODULE:         OIHLT               46

              - MODULE ABSTRACT -

   THIS MODULE SETS A SWITCH VALUE IN SYSCOM WHICH WHEN
INTERROGATED BY SCANNER INPUT SOFTWARE, SCANNER ERRORS WILL
BE HALTED.

       ENQUEUE USER TERMINAL
04OI   DISPLAY ON USER TERMINAL "HOLD ON SCANNER ERROR"
11SC   SET SYSCOM FLAG VALUE
02AL   GET AN ALARM BUFFER
02AL   IF ONE RECEIVED, THEN
03AL      PUT IN MESSAGE NUMBER
01AL      PUT ADDRESS OF BUFFER ON THE ALARM QUEUE
01AL      IF NO ROOM, THEN
07AL         PANIC
          (ELSE)
          ENDIF
       ELSE
07AL      PANIC
       ENDIF
       DEQUEUE TERMINAL
       ENDPROG
```

```
OPEN PSC COMMUNICATIONS COMMAND

              - MODULE HISTORY -

   PROJECT:        DAS                 7G-01709

   SUB-SYSTEM:     OPERATOR INTERFACE

   MODULE:         OIPSC               27

              - MODULE ABSTRACT -
```

```
   THIS MODULE INITIATES PSC COMMUNICATIONS BY ENQUEUING A
RESTART CODE ON THE PSC COMMUNICATION QUEUE. THE USER IS
NOTIFIED OF INITIATION. IF THE PSC COMMUNICATIONS ARE ALREADY
OPEN THE USER IS TOLD AND THE COMMAND IS ABORTED.


       ENQUEUE USER TERMINAL
04OI   DISPLAY ON USER TERMINAL "OPEN PSC COMMUNICATIONS COMMAND"
07PS   GET PSC COMMUNICATIONS FLAG FROM SYSCOM
       IF THE FLAG EQ COMMUNICATIONS CLOSED, THEN
01PS      DEQUEUE A PSC OUTPUT BUFFER
01PS      IF BUFFER FOUND, THEN
05PS         UPDATE PSC OUTPUT BUFFER
02PS         ENQUEUE PSC OUTPUT BUFFER ON PSC OUTPUT QUEUE
02PS         IF PSC OUTPUT QUEUE FULL
54OI            PANIC
             (ELSE)
             ENDIF
          ELSE
54OI         PANIC
          ENDIF
04OI      DISPLAY "PSC COMMUNICATION INITIATED"
       ELSE
04OI      DISPLAY "PSC COMMUNICATIONS ALREADY OPEN"
04OI      DISPLAY "COMMAND ABORTED"
       ENDIF
       DEQUEUE TERMINAL
       ENDPROG


       ADD DISK TRANSACTION (ORDER) FILE RECORD ( ADD.TRANS )


                    - MODULE HISTORY -

          PROJECT:        DAS                    73-01709

          SUB-SYSTEM:     OPERATOR INTERFACE

          MODULE:         DICCAT                 81

                    - MODULE ABSTRACT -

             CALL THE FILE MANAGER TO ADD THE TRANSACTION FILE
          RECORD.
             THIS SUBROUTINE WILL EXIT AFTER A SINGLE CALL TO THE
          FILE MANAGER WHETHER TRANSACTION FILE ACCESS WAS SUC-
          CESSFUL OR NOT.

13FM   UPDATE IPM FOR CALL
08FM   CALL FILE MANAGER TO ADD TRANSACTION FILE RECORD
13FM   CASENTRY (FOK, FTA, FTX, FOX, FCC, ? )
          CASE FOK ( SUCCESSFUL )
10OI         SET OK
          CASE FTA ( TRANSACTION ALREADY ON FILE )
02OI         PRINT/DISPLAY TRANS. ID, "TRANSACTION ALREADY ON FILE"
10OI         CLEAR OK
          CASE FTX ( TRANSACTION FILE SPACE EXHAUSTED )
02OI         PRINT/DISPLAY "TRANSACTION FILE SPACE EXHAUSTED"
10OI         CLEAR OK
          CASE FOX ( ORDER FILE SPACE EXHAUSTED )
```

```
02OI        PRINT/DISPLAY "ORDER FILE SPACE EXHAUSTED"
10OI        CLEAR OK
         CASE FCC ( INVALID CALL CODE )
54OI        PANIC
         CASE  ?  ( INVALID COMPLETION CODE )
54OI        PANIC
      ENDCASE
      RETURN




      DELETE DISK BATCH FILE RECORD ( DELETE.BATCH )


                    - MODULE HISTORY -

         PROJECT:       DAS                  79-01709

         SUB-SYSTEM:    OPERATOR INTERFACE

         MODULE:        OICCDB               85

                    - MODULE ABSTRACT -

            CALL THE FILE MANAGER TO DELETE THE DISK BATCH
         FILE RECORD(S).
            IF AN ERROR OCCURRED, TELL THE USER, CLEAR OK AND
         TAKE ANY FURTHER APPRORIATE ACTION REQUIRED.
            THIS SUBROUTINE WILL EXIT AFTER A SINGLE CALL TO THE
         FILE MANAGER WHETHER BATCH FILE ACCESS WAS SUCCESSFUL
         OR NOT.


14FM  UPDATE IPM FOR CALL
08FM  CALL FILE MANAGER TO DELETE BATCH(ES)
14FM  CASENTRY (FOK, FIR, FCC, ? )
         CASE FOK ( SUCCESSFUL )
         CASE FIR ( INVALID RELATIVE BATCH ID )
54OI        PANIC
         CASE FCC ( INVALID CALL CODE )
54OI        PANIC
         CASE  ?  ( INVALID COMPLETION CODE )
54OI        PANIC
      ENDCASE
      RETURN




      ORDER STATUS REPORT


                    - MODULE HISTORY -

         PROJECT:       DAS                  79-01709

         SUB-SYSTEM:    OPERATOR INTERFACE

         MODULE:        OIOSR                17

                    - MODULE ABSTRACT -
```

```
   THIS MODULE REQUESTS A BATCH ID. THE FILE MANAGER IS
CALLED TO READ THE BATCH FILE INFORMATION.
   IF THE BATCH INFORMATION IS FOUND, THE USER IS ASKED IF
ALL ORDERS ARE TO BE LISTED. IF ALL ORDERS ARE NOT TO BE
LISTED, A SPECIFIC ORDER ID IS REQUESTED, AND THE FILE
MANAGER IS CALLED TO READ THE ORDER FILE INFORMATION. IF THE
ORDER INFORMATION IS FOUND, OR ALL ORDERS TO BE LISTED,
REQUEST IF EXCEPTIONS ARE TO BE LISTED AND WHETHER OR NOT
HARDCOPY OUTPUT IS REQUIRED. IF HARDCOPY IS REQUIRED, THEN
THE TERMINAL IS DEQUEUED AND THE SYSTEM PRINTER IS ENQUEUED.
   THE BATCH ID, HEADER AND STATUS ARE THEN OUTPUT TO THE
ENQUEUED DEVICE.
   IF ALL ORDERS TO BE LISTED, THE FILE MANAGER IS CALLED TO
SEQUENTIALLY READ EACH ORDER RECORD. FOR EACH ORDER RECORD,
OR THE SPECIFICLY REQUESTED ORDER RECORD, THE ORDER ID, ALL
QUANTITIES AND ORDER PERCENT COMPLETE ARE OUTPUT.
   IF AN EXCEPTION LIST WAS REQUIRED, THE FILE MANAGER IS
CALLED TO SEQUENTIALLY READ EACH TRANSACTION BLOCK. EACH
TRANSACTION RECORD ASSOCIATED WITH THE ORDER IS EXAMINED. IF
THE TRANSACTION STATUS IS AN EXCEPTION, THE TRANSACTION IN-
FORMATION IS OUTPUT TO THE ENQUEUED DEVICE.
   THE TERMINAL/PRINTER IS DEQUEUED BEFORE THE PROGRAM ENDS.


       ENQUEUE USER TERMINAL
040I   DISPLAY ON USER TERMINAL "ORDER STATUS REPORT"
030I   ASK USER FOR BATCH ID
120I
480I   DEQUEUE AN IPM BUFFER (GET.IPM)
490I   DEQUEUE RECORD BUFFER (GET.SRB)
       INITIALIZE PANIC CODE
290I
160I   ACCESS BATCH FILE (GET.BATCH)
100I   IF BATCH RECORD FOUND (OK SET), THEN
030I   !  ASK USER IF ALL ORDERS TO BE LISTED
290I   !  IF NOT ALL ORDERS, THEN
030I   !     ASK USER FOR ORDER ID
130I   !
       !     INITIALIZE PANIC CODE
290I   !
180I   !     ACCESS ORDER FILE (GET.ORDER)
100I   !     IF ORDER RECORD FOUND (OK SET), THEN
100I   !        SET SPECIFIC ORDER
       !     (ELSE)
       !     ENDIF
       !  ELSE
100I   !     SET OK
100I   !     CLEAR SPECIFIC ORDER
       !  ENDIF
100I   !  IF ORDER FOUND (OK SET), THEN
100I   !  !  SET ORDER SEQUENCE
030I   !  !  ASK USER IF EXCEPTIONS TO BE LISTED
290I   !  !  IF EXCEPTIONS TO BE LISTED, THEN
100I   !  !     SET EXCEPTIONS
       !  !  ELSE
100I   !  !     CLEAR EXCEPTIONS
       !  !  ENDIF
030I   !  !  ASK USER IF HARDCOPY OUTPUT IS REQUIRED
       !  !  IF HARDCOPY REQUIRED, THEN
100I   !  !     SET HARDCOPY
       !  !     DEQUEUE USER TERMINAL
       !  !     ENQUEUE PRINTER
       !  !  ELSE
100I   !  !     CLEAR HARDCOPY
       !  !  ENDIF
290I   !  !  INITIALIZE DATE, TIME, PAGE COUNT AND LINE COUNT
070I   !  !  PRINT/DISPLAY BATCH HEADINGS
070I   !  !  PRINT/DISPLAY BATCH INFORMATION
070I   !  !  PRINT/DISPLAY ORDER HEADINGS
       !  !  INITIALIZE PANIC CODE
290I   !  !
130I   !  !  INITIALIZE ORDER COUNT
```

```
13OI   ! !   DOUNTIL ORDER COUNT GREATER THAN MAXIMUM              00000930
10OI   ! !   IF SPECIFIC ORDER SET, THEN                           00000940
13OI   ! !        UPDATE ORDER COUNT BEYOND MAXIMUM                00000950
12OI   ! !                                                         00000960
       ! !   ELSE                                                  00000970
17OI   ! !        FIND THE FIRST/NEXT ORDER IN THIS BATCH (FIND.ORDER)00000980
       ! !   ENDIF                                                 00000990
10OI   ! !   IF ORDER RECORD FOUND (OK SET), THEN                  00001000
13OI   ! !   !   COMPUTE ORDER PERCENT COMPLETE                    00001010
       ! !   !   SET LIST ORDER INFORMATION                        00001020
07OI   ! !   !   PRINT/DISPLAY ORDER INFORMATION AND PERCENT COMPLETE00001030
       ! !   !   --- (FORMS.CTL) ---                               00001040
10OI   ! !   !   IF ABORT SET THEN                                 00001050
13OI   ! !   !       SET ORDER COUNT GREATER THAN MAX.             00001060
       ! !   !   ELSE                                              00001070
10OI   ! !   !   IF EXCEPTIONS SET, THEN                           00001080
       ! !   !   !   IF EXCEPTIONS IN THIS ORDER THEN              00001090
       ! !   !   !       CLEAR LIST ORDER INFORMATION              00001100
07OI   ! !   !   !       PRINT/DISPLAY TRANSACTION HEADINGS        00001110
29OI   ! !   !   !                                                 00001120
       ! !   !   !       INITIALIZE PANIC CODE                     00001130
29OI   ! !   !   !                                                 00001140
29OI   ! !   !   !       INITIALIZE REPORT TRANSACTION COUNT       00001150
14OI   ! !   !   !       INITIALIZE TRANS. CURRENT BLOCK NUMBER    00001160
14OI   ! !   !   !       INITIALIZE TRANSACTION COUNT              00001170
14OI   ! !   !   !       DOUNTIL TRANSACTION COUNT > MAXIMUM --    00001180
       ! !   !   !       -- OR BATCH NO LONGER ON FILE             00001190
19OI   ! !   !   !           FIND THE FIRST/NEXT EXCEPTION RECORD  00001200
       ! !   !   !           --- (FIND.TRANS) ---                  00001210
       ! !   !   !           IF BATCH STILL ON FILE THEN           00001220
10OI   ! !   !   !               IF EXCEPTION RECORD FOUND THEN    00001230
       ! !   !   !                   IF TRANS. STATUS = MIS-SORT THEN 00001240
20FM   ! !   !   !                       SET UP TO READ THE TRANS. DIR. 00001250
08FM   ! !   !   !                       CALL FILE MANAGER FOR DIR. REC.00001260
20FM   ! !   !   !                       IF RETURN CODE = ERROR THEN  00001270
20FM   ! !   !   !                           IF RETURN CODE = NOT ON FILE00001280
       ! !   !   !                               PRINT ABORT MSG.  00001290
       ! !   !   !                           ELSE                  00001300
54OI   ! !   !   !                               PANIC             00001310
       ! !   !   !                           ENDIF                 00001320
       ! !   !   !                       ELSE                      00001330
03FM   ! !   !   !                           GET MIS-SORT DEST. FROM REC.00001340
       ! !   !   !                           IF MIS-SORT DEST. = -1 THEN 00001350
       ! !   !   !                               SET OUTPUT = '?'  00001360
       ! !   !   !                           ELSE                  00001370
       ! !   !   !                               PLACE DEST. IN OUTPUT 00001380
       ! !   !   !                           ENDIF                 00001390
       ! !   !   !                       ENDIF                     00001400
       ! !   !   !                   ELSE                          00001410
       ! !   !   !                       SET OUTPUT TO BLANKS      00001420
       ! !   !   !                   ENDIF                         00001430
       ! !   !   !                   IF BATCH STILL ON FILE THEN   00001440
       ! !   !   !                       SET LIST TRANSACTION INFO. 00001450
07OI   ! !   !   !                       PRINT/DISPLAY TRANS INFORMATION00001460
       ! !   !   !                       --- (FORMS.CTL) ---       00001470
       ! !   !   !                   (ELSE)                        00001480
       ! !   !   !                   ENDIF                         00001490
10OI   ! !   !   !                   IF ABORT SET THEN             00001500
14OI   ! !   !   !                       SET TRANS. COUNT > MAX    00001510
13OI   ! !   !   !                       SET ORDER COUNT > MAX.    00001520
       ! !   !   !                   (ELSE)                        00001530
       ! !   !   !                   ENDIF                         00001540
       ! !   !   !               (ELSE)                            00001550
       ! !   !   !               ENDIF                             00001560
       ! !   !   !           ELSE                                  00001570
04OI   ! !   !   !               OUTPUT "BATCH NO LONGER ON FILE   00001580
       ! !   !   !               --- REPORT TERMINATED" ---        00001590
10OI   ! !   !   !               SET ABORT                         00001600
       ! !   !   !           ENDIF                                 00001610
       ! !   !   !       ENDDO                                     00001620
       ! !   !   !       CLEAR LIST TRANSACTION INFORMATION        00001630
       ! !   !   ELSE                                              00001640
04OI   ! !   !   !       PRINT/DISPLAY "NO EXCEPTIONS IN THIS ORDER"00001650
```

```
     !  !  !  !  !  !  ENDIF
     !  !  !  !  !  (ELSE)
     !  !  !  !  !  ENDIF
     !  !  !  !  !  IF HARD COPY SET THEN
     !  !  !  !  !     UPDATE LINE COUNT > MAX.
     !  !  !  !  !  ELSE
     !  !  !  !  !     MOVE REPORT TO TOP OF SCREEN
     !  !  !  !  !  ENDIF
     !  !  !  !  ENDIF
     !  !  !  ELSE
020I !  !  !  !  PRINT/DISPLAY "BATCH NO LONGER ON FILE - RPT TERM"
100I !  !  !  !  SET ABORT
     !  !  !  !  IF HARD COPY NOT SET THEN
     !  !  !  !     MOVE REPORT TO TOP OF SCREEN
     !  !  !  !  (ELSE)
     !  !  !  !  ENDIF
     !  !  !  ENDIF
     !  !  ENDDO
     !  !  IF HARD COPY AND EXCEPTIONS NOT SET THEN
     !  !     MOVE REPORT TO TOP OF SCREEN
     !  !  ELSE
     !  !  ENDIF
     !  (ELSE)
     !  ENDIF
     ELSE
020I    PRINT/DISPLAY BATCH ID, "BATCH NOT ON FILE"
     ENDIF
510I RELEASE RECORD BUFFER (FREE.SRB)
500I RELEASE THE IPM BUFFER (FREE.IPM)
     DEQUEUE TERMINAL/PRINTER
     ENDPROG
           FORMS.CTL SUBROUTINE

100I IF HARDCOPY SET, THEN
290I    IF LINE COUNT GREATER THAN PRINTER PAGE, THEN
100I       SET OK
        ELSE
100I       CLEAR OK
        ENDIF
     ELSE
290I    IF LINE COUNT GREATER THAN TERMINAL PAGE, THEN
100I       SET OK
        ELSE
100I       CLEAR OK
        ENDIF
     ENDIF
100I IF PAGE OVERFLOW (OK SET), THEN
290I    INCREMENT PAGE COUNT
070I    PRINT/DISPLAY BATCH HEADINGS
070I    PRINT/DISPLAY BATCH INFORMATION
070I    PRINT/DISPLAY ORDER HEADINGS
290I    INITIALIZE LINE COUNT
100I    IF LIST TRANSACTION INFORMATION SET, THEN
070I       PRINT/DISPLAY ORDER INFORMATION
070I       PRINT/DISPLAY TRANSACTION HEADINGS
290I       INCREMENT LINE COUNT
        (ELSE)
        ENDIF
     (ELSE)
     ENDIF
100I IF LIST ORDER INFORMATION SET, THEN
070I    PRINT/DISPLAY ORDER INFORMATION
290I    INCREMENT LINE COUNT
     (ELSE)
     ENDIF
100I IF LIST TRANSACTION INFORMATION SET, THEN
070I    PRINT/DISPLAY TRANSACTION INFORMATION
290I    INCREMENT REPORT TRANSACTION COUNT
290I    INCREMENT LINE COUNT
     (ELSE)
     ENDIF
     IF REPORT CANCELLED AND HARD COPY SET THEN
        PRINT REPORT CANCELLED MESSAGE
```

```
         (ELSE)
         ENDIF
         RETURN




         ALARM MESSAGE PROGRAM



                            - MODULE HISTORY -


            PROJECT:        DAS                      7G-01709

            SUB-SYSTEM:     ALARM MESSAGES

            MODULE:         ALMPG                    1


                            - MODULE ABSTRACT -


         THIS PROGRAM WILL DEQUEUE AN ALARM MESSAGE FROM THE ALARM
      MESSAGE QUEUE.  IF THE QUEUE IS EMPTY, IT WILL DELAY TWO
      SECONDS AND START ALL OVER.  IF THERE IS A MESSAGE, IT WILL GET
      THE MESSAGE DATA AND RETURN THE DATA BUFFER TO THE ALARM MES-
      SAGE BUFFER QUEUE.  IF THE ADDRESS ON THE QUEUE WAS LESS THAN
      THE ADDRESS OF $SYSCOM, THEREFORE NOT A VALID ADDRESS, THIS
      PROGRAM WILL OUTPUT A FATAL ERROR MESSAGE WITH THE NUMBER AND
      DEQUEUE ANOTHER MESSAGE. IF THE ADDRESS WAS VALID, THE MESSAGE
      NUMBER IS USED TO FORMAT THE MESSAGE.  THE MESSAGE IS THEN OUT-
      PUT TO THE APPROPRIATE LOG DEVICE, AND THE SEQUENCE STARTS OVER.
         INITIALIZATION
39FM     GET NUMBER OF LOG DEVICES FROM SYSCOM
         ATTACH THAT MANY OUTPUT TASKS
         ATTACH TIME OUT TASK
         DOUNTIL 1=0
01AL        GET AN ELEMENT FROM THE ALARM MESSAGE QUEUE (ALMQUE)
01AL        IF NO ELEMENT RECEIVED,  THEN
               DELAY AWHILE
            ELSE
02AL           IF THE BUFFER ADDRESS > $SYSCOM,  THEN
02AL              MOVE DATA FROM THE BUFFER TO AN INTERNAL BUFFER
02AL              RETURN BUFFER TO THE BUFFER POOL (BUFFQUE)
02AL              IF THE BUFFER POOL IS NOT FULL,  THEN
11AL                 SET COMPRESS FLAG
03AL                 IF THE MESSAGE NUMBER IS WITHIN RANGE (1-N),  THEN
                        CASENTRY (MSG1,MSG2,...,MSGN)
03AL                       CASE MSG1
                              FORMAT MSG1
03AL                       CASE MSG2
                              FORMAT MSG2
                           :
                           :
03AL                       CASE MSGN
                              FORMAT MSGN
                        ENDCASE
                        PUT MESSAGE IN THE OUTPUT BUFFER
10AL                    CALL THE DATE AND TIME SUBROUTINE
12AL                    IF NOT A COMPRESSABLE MESSAGE, THEN
11AL                       RESET COMPRESS FLAG
                        (ELSE)
                        ENDIF
11AL                    IF COMPRESS FLAG SET, THEN
13AL                       CALL COMPRESS SUBROUTINE
                        (ELSE)
                        ENDIF
04AL                    GET ADDRESS OF TCW TABLE IN SYSCOM
04AL                    ADD 2*(MSG#-1)
04AL                    GET TCW AT THIS ADDRESS
```

```
                      SAVE TCW POINTER
05AL                  GET POINTER TO OUTPUT TASK EVENT TABLE
04AL                  DOUNTIL TCW=0
04AL                     IF TCW<0,  THEN
05AL                        MOVE EVENT ADDR TO POST INSTRUCTION
05AL                        POST THE TASK START EVENT
                         (ELSE)
                         ENDIF
05AL                     INCREMENT PTR TO NEXT TASK START EVENT
04AL                     SHIFT TCW TO THE LEFT, 1 BIT
                      ENDDO
09AL                  POST TIMER START EVENT
                      GET TCW
06AL                  GET POINTER TO END EVENT TABLE
04AL                  DOUNTIL TCW = 0
04AL                     IF TCW<0, THEN
06AL                        MOVE EVENT ADDR TO WAIT AND RESET INSTRCTN
06AL                        WAIT FOR EVENT TO OCCUR
06AL                        RESET THE EVENT
                         (ELSE)
                         ENDIF
05AL                     INCREMENT POINTER TO NEXT EVENT
04AL                     SHIFT TCW TO THE LEFT, 1 BIT
                      ENDDO
09AL                  SET TIMER COUNT TO ZERO
09AL                  WAIT FOR TIMER END EVENT
09AL                  RESET TIMER END EVENT
                   ELSE
08AL                  SET PANIC CODE = BAD MSG NUMBER
                      SET FLAG = FATAL ERROR
                   ENDIF
                ELSE
08AL               SET PANIC CODE = ALARM BUFFER QUEUE FULL
                   SET FLAG = FATAL ERROR
                ENDIF
             ELSE
08AL            MOVE ADDRESS TO PANIC CODE
                SET FLAG = FATAL ERROR
             ENDIF
          ENDIF
08AL      IF A FATAL ERROR WAS ENCOUNTERED, THEN
08AL         FORMAT "FATAL ERROR" AND PANIC # TO OUTPUT BUFFER
10AL         CALL DATE AND TIME SUBROUTINE
13AL         CALL MESSAGE COMPRESSION SUBROUTINE
05AL         POST ALL OUTPUT TASKS
06AL         WAIT FOR ALL END EVENTS
          (ELSE)
          ENDIF
       ENDDO
       EXIT


       TIME OUT TASK (TIMRTSK)

       SET ADDRESSES OF ALL LOG DEVICE PRINT ECB'S
       DOUNTIL 1=0
          WAIT FOR TIMER START EVENT TO BE POSTED
          RESET THE TIMER START EVENT
          SET UP TIME OUT COUNT
          DOWHILE TIME OUT COUNT > 0
             DELAY A LITTLE
             DECREMENT THE TIME OUT COUNT
          ENDDO
          POST ALL LOG DEVICE PRINT ECB'S
          POST TIMER END EVENT
       ENDDO
       EXIT


       MESSAGE COMPRESSION SUBROUTINE   (MOVTXT)
```

```
SAVE REGISTERS
GET TEXT ADDRESS
CALCULATE THE END ADDRESS FROM THE INDEX WORD
DO WHILE POINTER < END ADDRESS
   GET CURRENT BYTE
   IF CURRENT BYTE IS A BLANK AND NEXT BYTE IS A BLANK, THEN
      GET NUMBER OF BYTES TO END OF MESSAGE
      DO WHILE NOT AT END OF MESSAGE
         MOVE A BYTE TO THE LEFT
         INCREMENT POINTERS
      ENDDO
      ADJUST INDEX WORD
      ADJUST END ADDRESS
   ELSE
      INCREMENT POINTER
   ENDIF
ENDDO
RESTORE REGISTERS
RETURN



GET DATE AND TIME SUBROUTINE (DATES)

MOVE PUNCTUATION INTO THE OUTPUT BUFFER
ADJUST BUFFER INDEX WORD
GET TIME AND DATE
GET A POINTER TO THE TEXT BUFFER
GET A POINTER TO THE TIME AND DATE BUFFER
SET A COUNTER = 6
DOUNTIL COUNTER = 0
   CONVERT TIME AND DATE ENTRY TO EBCDIC
   PUT CONVERTED ENTRY IN THE BUFFER
   CHANGE LEADING SPACES TO LEADING ZEROES
   INCREMENT POINTERS
ENDDO
RETURN





ALARM MESSAGE TERMINAL 3 OUTPUT TASK



              - MODULE HISTORY -


   PROJECT:        DAS                   79-01709

   SUB-SYSTEM:     ALARM MESSAGES

   MODULE:         ALTRM3                4


              - MODULE ABSTRACT -


   THIS TASK ENQUEUES LOG DEVICE 3. IT THEN WAITS FOR A
START EVENT TO BE POSTED. WHEN POSTED, IT WILL PRINT THE
CONTENTS OF THE OUTPUT BUFFER ON THE LOG DEVICE. THEN IT
RESETS ITS START EVENT AND POSTS ITS END EVENT. THEN RE-
TURNS TO WAIT FOR ITS START EVENT AGAIN.
4AL    ENQUEUE LOG DEVICE 003
       DOUNTIL 1=0
5AL       WAIT FOR START EVENT TO BE POSTED
          PRINT ALARM MESSAGE ON THE LOG DEVICE
5AL       RESET THE START EVENT
6AL       POST THE END EVENT
       ENDDO
       DEQUEUE THE LOG DEVICE
       EXIT
```

```
ALARM MESSAGE TERMINAL 2 OUTPUT TASK

                    - MODULE HISTORY -

   PROJECT:         DAS                        73-01709

   SUB-SYSTEM:      ALARM MESSAGES

   MODULE:          ALTRM2                     3

                    - MODULE ABSTRACT -

   THIS TASK ENQUEUES LOG DEVICE 2. IT THEN WAITS FOR A
START EVENT TO BE POSTED. WHEN POSTED, IT WILL PRINT THE
CONTENTS OF THE OUTPUT BUFFER ON THE LOG DEVICE. THEN IT
RESETS ITS START EVENT AND POSTS ITS END EVENT. THEN RE-
TURNS TO WAIT FOR ITS START EVENT AGAIN.
4AL    ENQUEUE LOG DEVICE 002
       DOUNTIL 1=0
5AL       WAIT FOR START EVENT TO BE POSTED
          PRINT ALARM MESSAGE ON THE LOG DEVICE
5AL       RESET THE START EVENT
6AL       POST THE END EVENT
       ENDDO
       DEQUEUE THE LOG DEVICE
       EXIT
```

```
ALARM MESSAGE TERMINAL 1 OUTPUT TASK

                    - MODULE HISTORY -

   PROJECT:         DAS                        73-01709

   SUB-SYSTEM:      ALARM MESSAGES

   MODULE:          ALTRM1                     2

                    - MODULE ABSTRACT -

   THIS TASK ENQUEUES LOG DEVICE 1. IT THEN WAITS FOR A
START EVENT TO BE POSTED. WHEN POSTED, IT WILL PRINT THE
CONTENTS OF THE OUTPUT BUFFER ON THE LOG DEVICE. THEN IT
RESETS ITS START EVENT AND POSTS ITS END EVENT. THEN RE-
TURNS TO WAIT FOR ITS START EVENT AGAIN.
4AL    ENQUEUE LOG DEVICE 001
       DOUNTIL 1=0
5AL       WAIT FOR START EVENT TO BE POSTED
          PRINT ALARM MESSAGE ON THE LOG DEVICE
5AL       RESET THE START EVENT
6AL       POST THE END EVENT
       ENDDO
       DEQUEUE THE LOG DEVICE
       EXIT
```

```
CHANGE TRANSACTION STATUS

                    - MODULE HISTORY -

   PROJECT:         DAS                         73-01709

   SUB-SYSTEM:      FILE MANAGER

   MODULE:          FMCTS                       36

                    - MODULE ABSTRACT -

   THIS SUBROUTINE PROCESSES THE CHANGE TRANSACTION STATUS
FILE MANAGER CALL CODES. IT CHECKS THE VALIDITY OF THE INPUT
STATUS, SEARCHES THE TRANSACTION DIRECTORY FOR THE
INPUT TRANSACTION NUMBER, THEN CHANGES THE TRANSACTION
STATUS ON FILE TO THE INPUT STATUS. IT ALSO UPDATES THE
ORDER STATUS COUNTS ASSOCIATED WITH THIS TRANSACTION.
16FM   GET INPUTS
17FM
16FM   GET INPUT TRANSACTION NUMBER
17FM
16FM   IF CALL CODE = CHANGE STATUS FROM SCANNERS AND NEW STATUS --
       -- EQUAL IN SORTATION THEN
16FM      GET DIRECTORY RECORD FROM INPUT BUFFER
       ELSE
03FM      COMPUTE TRANSACTION DIRECTORY SECTOR FOR THIS TRANS. NUMBER
28FM      READ THE TRANSACTION DIRECTORY SECTOR
03FM      INDEX INTO SECTOR FOR TRANSACTION DIRECTORY RECORD
       ENDIF
03FM   GET RELATIVE BATCH NUMBER FROM DIRECTORY RECORD
02FM   INDEX INTO THE RESIDENT BATCH FILE BY RELATIVE BATCH NUMBER
03FM   IF THE TRANSACTION DIRECTORY RECORD UNUSED OR THE BATCH -
02FM   -STATUS = ADDING, DELETING OR FREE THEN
16FM      SET COMPLETION CODE = TRANSACTION NOT ON FILE
17FM
       ELSE
16FM      SAVE INPUT STATUS AS NEW STATUS
17FM
17FM      IF CALL CODE = CHANGE STATUS FROM STATUS SCANNER THEN
17FM         IF NEW STATUS NOT 'EXCESS REPACK, STOCK-OUT, -
             - STAGED FOR SHIPMENT, IN SORTATION, OR MIS-SORT' THEN
17FM            SET COMPLETION CODE = INVALID STATUS
             (ELSE)
             ENDIF
          ELSE
15FM         IF NEW STATUS NOT 'EXCESS REPACK, STOCK-OUT, -
             - STAGED FOR SHIPMENT, IN SORTATION, -
             - OR NOT PICKED THEN
16FM            SET COMPLETION CODE = INVALID STATUS
             ELSE
16FM            IF REC. BATCH ID NOT EQUAL TO INPUT BATCH ID THEN
02FM
15FM               SET COMPLETION CODE = TRANSACTION NOT IN BATCH
                (ELSE)
             ENDIF
          ENDIF
       ENDIF
16FM   IF COMPLETION CODE = SUCCESSFUL THEN
17FM
03FM      GET RELATIVE TRANS. NO. FROM TRANS. DIR. RECORD
04FM      COMPUTE TRANSACTION FILE SECTOR NUMBER
28FM      READ THE TRANSACTION FILE SECTOR
```

```
16FM        IF TRANS. NO. IN RECORD = INPUT TRANSACTION NUMBER THEN
04FM
04FM           INDEX TO TRANSACTION RECORD IN SECTOR
               SAVE CURRENT TRANS. STATUS AS OLD STATUS
04FM           SET THE TRANS. STATUS = NEW STATUS
04FM           GET THE RELATIVE ORDER RECORD NUMBER FROM TRANS. RECORD
28FM           WRITE THE TRANSACTION FILE SECTOR
05FM           IF NEW STATUS = 'MIS-SORT' THEN
28FM              READ TRANS. DIR. SECTOR
03FM              INDEX INTO SECTOR FOR TRANS. DIRECTORY RECORD
03FM              SET MIS-SORT DESTINATION IN TRANS. DIRECTORY RECORD
16FM
28FM              WRITE THE TRANSACTION DIRECTORY SECTOR
               (ELSE)
               ENDIF
05FM           COMPUTE THE ORDER FILE SECTOR NUMBER
28FM           READ THE ORDER FILE SECTOR
05FM           INDEX TO ORDER RECORD IN SECTOR
05FM           INDEX TO OLD STATUS COUNT IN ORDER RECORD
05FM           SUBTRACT 1 FROM THE OLD STATUS COUNT
05FM           INDEX TO NEW STATUS COUNT IN ORDER RECORD
05FM           ADD 1 TO THE NEW STATUS COUNT
28FM           WRITE THE ORDER FILE SECTOR
            ELSE
16FM           SET RETURN COMPLETION CODE = TRANSACTION NOT ON FILE
            ENDIF
         (ELSE)
         ENDIF
16FM     RETURN TO CALLER
17FM
```

```
         FILE MANAGER PANIC PROCESSOR


                        - MODULE HISTORY -

            PROJECT:       DAS                 7G-01709

            SUB-SYSTEM:    FILE MANAGER

            MODULE:        FMPAN               48

                        - MODULE ABSTRACT -
            THIS SUBROUTINE IS CALLED FROM SEVERAL FILE MANAGER
         MODULES TO SEND A PANIC CODE TO THE ALARM MESSAGE SUB-SYSTEM
         TO PRINT A FATAL ERROR MESSAGE AND TO SUSPEND EXECUTION OF
         THE FILE MANAGER SUB-SYSTEM.
35FM     GET INPUTS
07AL
08AL     PUT PANIC CODE INPUT INTO ALARM MSG QUEUE
         DOUNTIL NEW IPL
            WAIT FOR IMPOSSIBLE EVENT
         ENDDO
         RETURN (NOT REALLY)
```

```
         USER INTERFACE TO FILE MANAGER


                        - MODULE HISTORY -

            PROJECT:       DAS                 7G-01709
```

```
   SUB-SYSTEM:     FILE MANAGER

   MODULE:         FM                    47


                 - MODULE ABSTRACT -


   THIS SUBROUTINE PERFORMS ALL THE FUNCTIONS NEEDED TO
CALL THE FILE MANAGER. A COPY OF THIS SUBROUTINE IS TO
BE INCLUDED IN EACH DAS SUBSYSTEM THAT CALLS THE FILE
MANAGER.
08FM     GET INPUTS
34FM     ENQUEUE THE FILE MANAGER RESOURCE
27FM     RESET FILE MANAGER COMPLETION EVENT
25FM     POST FILE MANAGER ENTRY EVENT
27FM     WAIT ON FILE MANAGER COMPLETION EVENT
34FM     DEQUEUE THE FILE MANAGER RESOURCE
08FM     RETURN TO CALLER





ADD BATCH COMPLETE



                 - MODULE HISTORY -


   PROJECT:        DAS                   73-01709

   SUB-SYSTEM:     FILE MANAGER

   MODULE:         FMADC                 90


                 - MODULE ABSTRACT -


   THIS SUBROUTINE PROCESSES THE ADD BATCH COMPLETE FILE MANAGER
CALL CODE. IT FINDS THE BATCH RECORD WITH THE STATUS OF
ADDING AND CHANGES IT TO PENDING IN BOTH THE RESIDENT BATCH
FILE AND THE DISK BATCH FILE.
38FM     GET INPUTS
02FM     GET ADDRESS OF RESIDENT BATCH FILE
         SET RELATIVE BATCH NUMBER = ZERO
02FM     DOUNTIL END OF RESIDENT BATCH FILE OR BATCH WITH STATUS --
         -- ADDING FOUND
            GET FIRST/NEXT RECORD
02FM        IF RECORD STATUS NOT ADDING THEN
               ADD 1 TO RELATIVE BATCH NUMBER
            (ELSE)
            ENDIF
         ENDDO
         IF BATCH FOUND THEN
05FM        COMPUTE FIRST ORDER FILE SECTOR ADDRESS FROM --
            -- RELATIVE BATCH NUMBER
28FM        UPDATE RESIDENT ORDER FILE
01FM        COMPUTE BATCH FILE SECTOR ADDRESS FROM RELATIVE BATCH NO.
28FM        READ THE BATCH FILE SECTOR
01FM        INDEX TO THE BATCH RECORD IN THE SECTOR
01FM        SET BATCH STATUS TO PENDING
28FM        WRITE THE BATCH FILE SECTOR
02FM        SET RESIDENT BATCH RECORD STATUS TO PENDING
         ELSE
38FM        SET RETURN COMPLETION CODE = BATCH NOT ON FILE
         ENDIF
38FM     RETURN TO CALLER
```

```
READ TRANSACTION DIRECTORY ENTRY VIA TRANSACTION NUMBER

                    - MODULE HISTORY -

   PROJECT:         DAS                    73-01709

   SUB-SYSTEM:      FILE MANAGER

   MODULE:          FMRTD                  41

                    - MODULE ABSTRACT -

   THIS SUBROUTINE READS A TRANSACTION DIRECTORY ENTRY INTO THE
CALLER'S BUFFER WHEN GIVEN A TRANSACTION NUMBER AS INPUT.
20FM    GET INPUTS
03FM    USING TRANSACTION NO. INPUT, COMPUTE TRANS. DIR. SECTOR NO.
28FM    READ TRANSACTION DIRECTORY SECTOR
03FM    INDEX INTO SECTOR TO TRANSACTION DIRECTORY ENTRY
03FM    IF ENTRY IS UNUSED OR BATCH STATUS = ADDING/DELETING OR FREE THE
20FM       SET RETURN COMPLETION CODE = TRANSACTION NOT ON FILE
        ELSE
03FM       COPY TRANS. DIR. ENTRY INTO USER BUFFER
20FM
08FM       GET RELATIVE TRANSACTION NO. FROM DIRECTORY RECORD
04FM       COMPUTE TRANSACTION FILE SECTOR FROM REL. TRANS. NO.
28FM       READ THE TRANSACTION FILE SECTOR
04FM       INDEX TO TRANSACTION RECORD
20FM       IF INPUT TRANSACTION NO. NOT EQUAL TO TRANSACTION NO. --
04FM       -- IN RECORD THEN
20FM          SET RETURN COMPLETION CODE = TRANSACTION NOT ON FILE
           (ELSE)
           ENDIF
        ENDIF
20FM    RETURN TO CALLER

READ ORDER RECORD VIA ORDER I.D.

                    - MODULE HISTORY -

   PROJECT:         DAS                    73-01709

   SUB-SYSTEM:      FILE MANAGER

   MODULE:          FMOID                  33

                    - MODULE ABSTRACT -

   THIS SUBROUTINE PROCESSES THE READ ORDER RECORD VIA
ORDER I.D. FILE MANAGER CALL CODE. IT CHECKS FOR A VALID
BATCH I.D. THEN SEARCHES THE ORDER FILE
FOR THE INPUT ORDER I.D.. WHEN FOUND THIS ROUTINE PLACES
THE REQUESTED ORDER RECORD INTO THE CALLERS BUFFER.
```

```
22FM    GET INPUTS
33FM    CALL ROUTINE TO SEARCH RESIDENT BATCH FILE FOR INPUT BATCH I.D.
33FM    IF INPUT BATCH ID FOUND THEN
01FM       COMPUTE THE BATCH FILE SECTOR FOR THE INPUT BATCH
28FM       READ THE BATCH FILE SECTOR
01FM       INDEX TO BATCH RECORD IN BATCH FILE SECTOR
01FM       GET THE NUMBER OF ORDERS FROM THE BATCH RECORD
05FM       COMPUTE STARTING SECTOR IN ORDER FILE FOR BATCH
           DOUNTIL ALL ORDER SECTORS SEARCHED OR RECORD FOUND
28FM          READ FIRST/NEXT ORDER FILE SECTOR
05FM          DOUNTIL ALL VALID ORDER RECORDS IN SECTOR SEARCHED OR -
              - RECORD FOUND
05FM             GET FIRST/NEXT ORDER RECORD IN SECTOR
05FM             IF RECORD ORDER I.D. = INPUT ORDER I.D. THEN
22FM
05FM                COPY ORDER RECORD INTO USER BUFFER
22FM
                 (ELSE)
                 ENDIF
              ENDDO
           ENDDO
           IF ORDER RECORD NOT FOUND THEN
22FM          SET COMPLETION CODE = ORDER NOT FOUND
           (ELSE)
           ENDIF
        ELSE
22FM       SET COMPLETION CODE = BATCH NOT FOUND
        ENDIF
22FM    RETURN TO CALLER
```

```
        READ TRANSACTION RECORD VIA TRANSACTION NUMBER

                        - MODULE HISTORY -

           PROJECT:        DAS                      75-01709

           SUB-SYSTEM:     FILE MANAGER

           MODULE:         FMTID                    39

                        - MODULE ABSTRACT -

           THIS SUBROUTINE COMPUTES THE TRANSACTION DIRECTORY ENTRY
        FROM THE INPUT TRANSACTION NUMBER.  THEN, UPON READING THE
        ASSOCIATED DIRECTORY ENTRY, THE TRANSACTION FILE RELATIVE
        RECORD ADDRESS CAN BE OBTAINED AND USED TO ACCESS THE DISK-
        RESIDENT TRANSACTION FILE TO OBTAIN THE RELEVANT TRANSACTION
        RECORD WHICH IS THEN DUTIFULLY COPIED INTO THE CALLER'S BUFFER.
19FM    GET INPUTS
03FM    FROM TRANSACTION NUMBER, COMPUTE TRANSACTION DIRECTORY SECTOR NO
28FM    READ TRANSACTION DIRECTORY SECTOR
03FM    INDEX INTO SECTOR FOR TRANSACTION ENTRY
03FM    IF ENTRY IS UNUSED OR BATCH STATUS = ADDING/DELETING OR FREE THE
19FM       SET RETURN COMPLETION CODE = TRANSACTION NOT ON FILE
        ELSE
03FM       GET RELATIVE TRANSACTION NO. FROM DIRECTORY
04FM       COMPUTE TRANSACTION FILE SECTOR NUMBER
28FM       READ TRANSACTION FILE SECTOR
04FM       INDEX INTO SECTOR FOR TRANSACTION RECORD
19FM       IF INPUT TRANSACTION NO. IS EQUAL TO TRANSACTION NO. --
04FM       -- IN RECORD THEN
04FM          COPY RECORD INTO CALLER'S BUFFER
           ELSE
19FM          SET RETURN COMPLETION CODE = TRANSACTION NOT ON FILE
           ENDIF
```

```
19FM
        ENDIF
19FM    RETURN TO CALLER




        READ ORDER RECORD VIA RELATIVE ORDER NUMBER


                          - MODULE HISTORY -


           PROJECT:       DAS                    73-01709

           SUB-SYSTEM:    FILE MANAGER

           MODULE:        FMROL                  40


                          - MODULE ABSTRACT -


           THIS SUBROUTINE FIRST CHECKS THE BATCH ID INPUT FOR VALIDITY
        AND THEN DETERMINES THE NO. OF ORDERS IN THE SPECIFIED BATCH.
        WITH THE NO. OF ORDERS IN THE BATCH KNOWN, THE RELATIVE ORDER
        NO. CAN BE VERIFIED.  HAVING A GOOD RELATIVE ORDER NO., IT'S
        A TRIVIAL EXERCISE TO ACCESS THE ORDER FILE ON DISK (IN THE
        PROPER BATCH SEGMENT, OF COURSE) TO GET THE ORDER RECORD
        AND COPY IT INTO THE CALLER'S BUFFER. NOW LET'S GET TO THE
        MEAT...
23FM    GET INPUTS
33FM    CALL ROUTINE TO SEARCH RES. BATCH FILE FOR BATCH ID INPUT
33FM    IF THE BATCH WAS FOUND THEN
01FM       READ THE BATCH FILE SECTOR WHICH CONTAINS THE INDICATED BATCH
01FM       GET THE NO. OF ORDERS IN THE BATCH FROM THE RECORD
23FM       IF THE RELATIVE ORDER NO. INPUT > NO. OF ORDERS OR < 1 THEN
23FM          SET COMPLETION CODE = INVALID REL. RECORD NO.
           ELSE
05FM          COMPUTE STARTING SECTOR NO. IN ORDER FILE FOR BATCH
05FM          COMPUTE SECTOR NO. FOR ORDER RECORD
28FM          READ SECTOR FROM ORDER FILE
05FM          INDEX INTO SECTOR FOR ORDER RECORD
05FM          COPY ORDER RECORD INTO USER BUFFER
23FM
           ENDIF
        ELSE
23FM       SET COMPLETION CODE = BATCH NOT ON FILE
        ENDIF
23FM    RETURN TO CALLER




        READ TRANSACTION FILE BLOCK


                          - MODULE HISTORY -


           PROJECT:       DAS                    73-01709

           SUB-SYSTEM:    FILE MANAGER

           MODULE:        FMRTB                  37


                          - MODULE ABSTRACT -
```

```
                THIS SUBROUTINE PROCESSES THE READ TRANSACTION FILE BLOCK      00000230
                FILE MANAGER CALL CODE. IT SEARCHES THE RESIDENT BATCH FILE    00000240
                FOR THE INPUT BATCH I.D.. THEN INPUTS THE REQUESTED TRANS.     00000250
                FILE SECTOR AND PASSES THE SECTOR TO THE CALLER.               00000260
     21FM       GET INPUTS                                                     00000270
     33FM       CALL ROUTINE TO SEARCH RESIDENT BATCH FILE FOR INPUT BATCH I.D.00000280
     33FM       IF THE BATCH RECORD FOUND THEN                                 00000290
     01FM           COMPUTE THE BATCH FILE SECTOR FOR THIS BATCH               00000300
     28FM           READ THE BATCH FILE SECTOR                                 00000310
     01FM           INDEX TO THE BATCH RECORD IN THE SECTOR                    00000320
     01FM           GET THE NUMBER OF TRANSACTIONS IN THIS BATCH               00000330
     04FM           COMPUTE THE MAX. NO. OF TRANS. FILE SECTORS IN THIS BATCH  00000340
     21FM           IF THE INPUT RELATIVE BLOCK NO. > MAX. TRANS. SECTORS THEN 00000350
     21FM               SET COMPLETION CODE = INVALID RELATIVE REC./BLOCK NO.  00000360
                    ELSE                                                       00000370
     04FM               COMPUTE THE TRANSACTION FILE SECTOR NUMBER             00000380
     28FM               READ THE TRANS. FILE SECTOR                            00000390
     21FM               COPY DATA INTO USER'S BUFFER                           00000400
                    ENDIF                                                      00000410
                ELSE                                                           00000420
     21FM           SET COMPLETION CODE = BATCH NOT ON FILE                    00000430
                ENDIF                                                          00000440
     21FM       RETURN TO CALLER                                               00000450
                                                                               00000010
                                                                               00000020
                                                                               00000030
                                                                               00000040
                                                                               00000050
                READ/WRITE BLOCK (SECTOR) FROM/TO DISK FILE                    00000060
                                                                               00000070
                                                                               00000080
                                                                               00000090
                            - MODULE HISTORY -                                 00000100
                                                                               00000110
                                                                               00000120
                   PROJECT:      DAS                  7G-01709                 00000130
                                                                               00000140
                   SUB-SYSTEM:   FILE MANAGER                                  00000150
                                                                               00000160
                   MODULE:       FMRWB                  42                     00000170
                                                                               00000180
                                                                               00000190
                            - MODULE ABSTRACT -                                00000200
                                                                               00000210
                                                                               00000220
                THIS MODULE READS/WRITES SECTORS FROM/TO DISK FILES            00000230
                INDICATED BY RELATIVE FILE NUMBER (FILE CODE).                 00000240
     28FM       GET INPUTS                                                     00000250
                CHECK VALIDITY OF BLOCK NUMBER/FILE CODE                       00000260
                IF INPUTS ARE VALID THEN                                       00000270
                    IF READ SECTOR WAS REQUESTED THEN                          00000280
                        IF BLOCK ALREADY IN MEMORY THEN                        00000290
                            COPY BLOCK INTO CALLERS BUFFER                     00000300
                        ELSE                                                   00000310
                            READ BLOCK(BLK INPUT) FROM FILE(FILE CODE INPUT)   00000320
                        ENDIF                                                  00000330
                    ELSE                                                       00000340
                        COPY CALLERS BUFFER TO MEMORY BLOCK                    00000350
                        WRITE BLOCK(BLK INPUT) TO FILE(FILE CODE INPUT)        00000360
                    ENDIF                                                      00000370
                    IF DISK ERROR ON READ/WRITE THEN                           00000380
     35FM           PANIC! (DO IT WITH CALL CODE FROM USER)                    00000390
     09FM                                                                      00000400
                        WAIT FOR IPL RELIEF...                                 00000410
                    (ELSE)                                                     00000420
                    ENDIF                                                      00000430
                ELSE                                                           00000440
     35FM           PANIC!                                                     00000450
                ENDIF                                                          00000460
     28FM       RETURN TO CALLER                                               00000470
                                                                               00000010
                                                                               00000020
                                                                               00000030
                                                                               00000040
```

```
               ADD TRANSACTION RECORD TO FILES              00000050
                                                            00000060
                                                            00000070
                                                            00000080
                                                            00000090
                         - MODULE HISTORY -                 00000100
                                                            00000110
                                                            00000120
          PROJECT:    DAS              76-01709             00000130
                                                            00000140
          SUB-SYSTEM: FILE MANAGER                          00000150
                                                            00000160
          MODULE:     FMATR            30                   00000170
                                                            00000180
                                                            00000190
                         - MODULE ABSTRACT -                00000200
                                                            00000210
                                                            00000220
             THIS SUBROUTINE PROCESSES THE ADD TRANSACTION RECORD  00000230
          FILE MANAGER CALL CODE. IT CHECKS FOR ANY CONFLICTS OF THE 00000240
          NEW TRANSACTION RECORD WITH THE TRANSACTION RECORDS ALREADY 00000250
          ON FILE THEN ADDS THE NEW TRANSACTION RECORD TO THE FILE  00000260
          IF NO CONFLICTS WERE FOUND. WHEN THE LAST TRANSACTION RECORD 00000270
          IS ADDED TO THE FILE, THE ORDER RECORDS ARE ADDED AND THE 00000280
          BATCH RECORD COUNTS ARE UPDATED TO SHOW THE ACTUAL NUMBER 00000290
          OF ORDERS AND TRANSACTIONS IN THIS BATCH. THE STATUS OF THE 00000300
          BATCH RECORD IS THEN CHANGED TO 'PENDING'.        00000310
13FM      GET INPUTS                                        00000320
02FM      DOUNTIL BATCH BEING ADDED FOUND OR END OF RESIDENT BATCH FILE 00000330
             GET FIRST/NEXT RESIDENT BATCH RECORD           00000340
             IF RECORD STATUS = ADDING THEN                 00000350
                SAVE THE RELATIVE BATCH NUMBER              00000360
             (ELSE)                                         00000370
             ENDIF                                          00000380
          ENDDO                                             00000390
          IF END OF RESIDENT BATCH FILE FOUND THEN          00000400
13FM         SET COMPLETION CODE = INVALID CALL CODE        00000410
          ELSE                                              00000420
03FM         COMPUTE TRANSACTION DIRECTORY SECTOR FOR INPUT TRANS. NUMBER 00000430
             IF CURRENT SECTOR NOT EQUAL TO COMPUTED SECTOR THEN 00000440
                WRITE CURRENT SECTOR                        00000450
                READ TRANSACTION DIRECTORY SECTOR           00000460
             (ELSE)                                         00000470
             ENDIF                                          00000480
03FM         INDEX TO TRANSACTION DIRECTORY RECORD IN SECTOR 00000490
03FM         IF TRANSACTION DIRECTORY RECORD IS USED THEN   00000500
03FM            GET RELATIVE BATCH NUMBER FROM RECORD       00000510
02FM            INDEX INTO RESIDENT BATCH FILE BY RELATIVE BATCH NUMBER 00000520
02FM            IF THE BATCH STATUS NOT DELETING OR NOT FREE THEN 00000530
03FM               GET RELATIVE TRANS. NO. FROM DIRECTORY RECORD 00000540
04FM               COMPUTE TRANS. FILE SECTOR NUMBER        00000550
                   IF COMPUTED TRANS. FILE SECTOR NOT IN MEMORY THEN 00000560
                      READ TRANSACTION FILE SECTOR          00000570
                   (ELSE)                                   00000580
                   ENDIF                                    00000590
04FM               INDEX TO TRANSACTION RECORD IN SECTOR    00000600
13FM               IF INPUT TRANS. NO. NOT EQUAL TO REC. TRANS. NO. THEN 00000610
13FM                  SET COMPLETION CODE = TRANSACTION ALREADY ON FILE 00000620
                   (ELSE)                                   00000630
                   ENDIF                                    00000640
                (ELSE)                                      00000650
                ENDIF                                       00000660
             (ELSE)                                         00000670
             ENDIF                                          00000680
31FM         GET NO. OF TRANSACTIONS ADDED THUSFAR          00000690
             IF NUMBER OF TRANS. G.T. OR E.Q. MAX. THEN     00000700
13FM            SET COMPLETION CODE = TRANS. FILE SPACE EXHAUSTED 00000710
             (ELSE)                                         00000720
             ENDIF                                          00000730
13FM         IF COMPLETION CODE = SUCCESSFUL THEN           00000740
31FM            ADD 1 TO NUMBER OF TRANSACTIONS ADDED THUSFAR 00000750
03FM            BUILD TRANSACTION DIRECTORY RECORD IN SECTOR 00000760
31FM            GET NUMBER OF ORDERS FOUND IN BATCH THUSFAR 00000770
```

```
          DOWHILE NUMBER OF ORDERS NOT ZERO
29FM         GET FIRST/NEXT ORDER ID FROM TABLE
13FM         IF TABLE ORDER ID = INPUT ORDER ID THEN
13FM            INDEX TO STATUS COUNTER FOR THIS ORDER
29FM            ADD 1 TO NUMBER OF TRANSACTIONS OF THIS STATUS
             (ELSE)
             ENDIF
          ENDDO
29FM      IF ORDER ID NOT FOUND IN TABLE THEN
             IF NO. OF ORDERS IN TABLE G.T. OR E.Q. MAX. THEN
13FM            SET COMPLETION CODE = ORDER FILE SPACE EXHAUSTED
             ELSE
29FM            ADD INPUT ORDER ID TO TABLE
                CLEAR ALL STATUS COUNTS
13FM            INDEX TO STATUS COUNTER FOR THIS ORDER
29FM            SET NUMBER OF TRANSACTIONS OF THIS STATUS = 1
                ADD 1 TO NUMBER OF ORDERS FOUND IN BATCH THUS FAR
             ENDIF
          (ELSE)
          ENDIF
13FM      IF COMPLETION CODE = SUCCESSFUL THEN
             SAVE RELATIVE ORDER NUMBER
04FM         PLACE NEW TRANS. RECORD INTO CURRENT SECTOR BUFFER
13FM
13FM         IF THIS IS THE LAST TRANSACTION IN THE BATCH THEN
04FM            COMPUTE THE TRANSACTION FILE SECTOR
                WRITE THE CURRENT SECTOR BUFFER TO THE TRANS. FILE
29FM            GET NUMBER OF ORDERS IN ORDER TABLE
                DOUNTIL NUMBERS OF ORDERS = ZERO
                   DOUNTIL ORDER SECTOR BUILT OR NUMBER OF -
                   - ORDERS = ZERO
29FM                  GET NEXT DATA FOR NEXT ORDER FROM TABLE
05FM                  BUILD ORDER RECORD IN CURRENT SECTOR BUFFER
29FM
31FM                  SUBTRACT 1 FROM NUMBER OF ORDERS
                   ENDDO
05FM               COMPUTE ORDER FILE SECTOR FOR CURRENT -
                   - SECTOR BUFFER
                   WRITE THE CURRENT SECTOR BUFF. TO THE ORDER FILE
                ENDDO
03FM            WRITE THE BUFFERED TRANS. DIR. SECTOR TO DISK
01FM            COMPUTE THE BATCH FILE SECTOR
                READ THE BATCH FILE SECTOR
01FM            INDEX INTO SECTOR FOR BATCH RECORD
01FM            PLACE THE NUMBER OF TRANS. IN THE BATCH RECORD
01FM            PLACE THE NUMBER OF ORDERS IN THE BATCH RECORD
                WRITE THE BATCH SECTOR
09FM            GET A F.M. CALL BUFFER
                IF ONE RECEIVED THEN
38FM               SET UP BUFFER FOR ADD COMPLETE CALL
08FM               CALL THE FILE MANAGER
08FM               IF F.M. RETURN CODE = SUCCESSFUL THEN
09FM                  RETURN CALL BUFFER TO FREE POOL
                      IF FREE POOL FULL THEN
54DI                     PANIC
                      (ELSE)
                      ENDIF
                   ELSE
54DI                  PANIC
                   ENDIF
                ELSE
54DI               PANIC
                ENDIF
             ELSE
04FM            IF THE CURRENT TRANS. FILE SECTOR BUFFER FULL THEN
04FM               COMPUTE THE TRANSACTION FILE SECTOR
                   WRITE THE CURRENT SECTOR BUFFER TO THE -
                   - TRANSACTION FILE
                (ELSE)
                ENDIF
             ENDIF
          (ELSE)
          ENDIF
```

```
            (ELSE)
            ENDIF
         ENDIF
13FM     IF COMPLETION CODE = TRANSACTION ALREADY ON FILE, -
         - TRANSACTION FILE SPACE EXHAUSTED, OR ORDER FILE -
         - SPACE EXHAUSTED THEN
02FM        INDEX INTO RESIDENT BATCH FILE BY RELATIVE BATCH NO.
02FM        SET RESIDENT BATCH RECORD STATUS = DELETING
09FM        GET A F.M. CALL BUFFER
            IF ONE RECEIVED THEN
14FM           SET RELATIVE BATCH NO. IN BATCH DELETION CALL BUFFER
08FM           CALL FILE MANAGER TO DELETE THE BATCH
08FM           IF ERROR RETURNED FROM CALL THEN
54OI              PANIC
               ELSE
09FM              RETURN CALL BUFFER TO FREE POOL
                  IF FREE POOL FULL THEN
54OI                 PANIC
                  (ELSE)
                  ENDIF
               ENDIF
            ELSE
54OI           PANIC
            ENDIF
         (ELSE)
         ENDIF
13FM     RETURN TO CALLER




         READ BATCH RECORD VIA BATCH I.D.


                        - MODULE HISTORY -


            PROJECT:         DAS                    79-01709

            SUB-SYSTEM:      FILE MANAGER

            MODULE:          FMBID                  34

                        - MODULE ABSTRACT -


            THIS SUBROUTINE PROCESSES THE READ BATCH FILE RECORD
         VIA BATCH ID FILE MANAGER CALL CODE.  IT SEARCHES THE
         RESIDENT BATCH FILE TO CHECK THE VALIDITY AND EXISTANCE
         OF THE BATCH ID INPUT, RESOLVES THE RELATIVE BATCH
         NUMBER, AND ACCESSES THE BATCH FILE ON DISK TO READ
         THE INDICATED BATCH RECORD AND COPY THE DATA INTO THE
         CALLER'S BUFFER.
18FM     GET INPUTS
33FM     CALL ROUTINE TO SEARCH RESIDENT BATCH FILE FOR INPUT BATCH I.D.
33FM     IF BATCH FOUND IN RESIDENT BATCH FILE THEN
33FM        GET RELATIVE BATCH NUMBER
28FM        READ BATCH FILE SECTOR CONTAINING INDICATED BATCH RECORD
01FM        COPY BATCH RECORD INTO CALLER'S BUFFER
18FM
         ELSE
18FM        SET COMPLETION CODE = BATCH NOT ON FILE
         ENDIF
18FM     RETURN TO CALLER




         SET UP BATCH DELETION QUEUE FOR FMDLD
```

```
                    - MODULE HISTORY -

       PROJECT:         DAS                    7G-01709

       SUB-SYSTEM:      FILE MANAGER

       MODULE:          FMDEL                  32

                    - MODULE ABSTRACT -

       THIS MODULE RECEIVES ONE OR MORE RELATIVE BATCH NUMBERS
    FOR BATCHES TO BE DELETED FROM THE SYSTEM. IT THEN PERFORMS
    VALIDITY CHECKS ON THE INPUTS, MAKES THE NECESSARY BATCH
    STATUS ADJUSTMENTS, AND PUTS THE BATCH NUMBERS INTO A
    WORK QUEUE FOR THE BATCH DELETION TASK (FMDLD).
14FM    GET RELATIVE BATCH NUMBER(S) INPUT
14FM    DOUNTIL ALL INPUTS VERIFIED OR INVALID INPUT DETECTED
14FM       GET FIRST(NEXT) REL. BATCH NO. IN INPUT LIST
           IF RELATIVE BATCH NUMBER IN RANGE THEN
02FM          GET BATCH RECORD IN RESIDENT BATCH FILE
02FM          IF RECORD STATUS = UNUSED,ACTIVE,OR ADDING THEN
14FM             SET RETURN COMPLETION CODE TO "INVALID REC. NO."
              (ELSE)
              ENDIF
           ELSE
14FM          SET RETURN COMPLETION CODE TO "INVALID REC. NO."
           ENDIF
        ENDDO
14FM    IF ALL INPUTS WERE FOUND TO BE VALID THEN
14FM       DOUNTIL ALL BATCHES IN INPUT LIST ARE PROCESSED
14FM          GET FIRST(NEXT) REL. BATCH NO. FROM LIST
02FM          GET BATCH RECORD IN RESIDENT BATCH FILE
02FM          SET STATUS IN RECORD TO "DELETING"
32FM          PUT RELATIVE BATCH NO. INTO QUEUE FOR DELETION TASK
              IF QUEUE IS FULL THEN
35FM             PANIC!
              (ELSE)
              ENDIF
28FM          READ SECTOR FROM BATCH FILE FOR INDICATED BATCH
01FM          INDEX TO INDICATED BATCH RECORD IN SECTOR
01FM          SET STATUS IN RECORD TO "DELETING"
28FM          WRITE MODIFIED SECTOR BACK TO BATCH FILE ON DISK
           ENDDO
        (ELSE)
        ENDIF
14FM    RETURN




    CHANGE BATCH STATUS


                    - MODULE HISTORY -

       PROJECT:         DAS                    7G-01709

       SUB-SYSTEM:      FILE MANAGER

       MODULE:          FMCBS                  35

                    - MODULE ABSTRACT -
```

```
         THIS SUBTOUTINE PROCESSES THE CHANGE BATCH STATUS FILE
      MANAGER CALL CODE. IT SEARCHES THE BATCH FILE FOR THE
      INPUT BATCH I.D. AND IF FOUND CHANGES THE BATCH STATUS
      TO THE INPUT STATUS.
15FM  GET INPUTS
33FM  CALL ROUTINE TO SEARCH RESIDENT BATCH FILE FOR INPUT BATCH I.D.
33FM  IF BATCH NOT FOUND THEN
15FM     SET COMPLETION CODE = BATCH NOT ON FILE
      ELSE
15FM     IF INPUT BATCH STATUS INVALID THEN
15FM        SET COMPLETION CODE = INVALID STATUS
         ELSE
01FM        COMPUTE BATCH FILE SECTOR FROM RELATIVE BATCH NUMBER
28FM        READ THE BATCH FILE SECTOR
01FM        INDEX INTO SECTOR FOR BATCH RECORD
01FM        SET RECORD STATUS = INPUT STATUS
28FM        WRITE THE BATCH FILE SECTOR
02FM        INDEX INTO RESIDENT BATCH FILE BY RELATIVE BATCH NUMBER
02FM        SET RESIDENT BATCH RECORD STATUS = INPUT STATUS
         ENDIF
      ENDIF
15FM  RETURN TO CALLER




      TASK TO PROCESS BATCH DELETIONS


                        - MODULE HISTORY -


         PROJECT:       DAS                       79-01709

         SUB-SYSTEM:    FILE MANAGER

         MODULE:        FMDLD                     44

                        - MODULE ABSTRACT -


         THIS MODULE IS A TASK WHICH OBTAINS RELATIVE BATCH NUMBERS
      FROM A QUEUE WHICH INDICATE THE BATCHES TO BE DELETED.
      IT THEN WRITES AN INITIALIZED SECTOR TO ALL SECTORS IN THE
      TRANS. FILE THAT ARE ASSOCIATED WITH THE BATCH BEING DELETED.
      FINALLY THIS TASK MAKES THE APPROPRIATE STATUS ADJUSTMENT
      ENTRIES IN THE DISK AND RESIDENT BATCH FILES.
      DO UNTIL CPU STOPPED
32FM     DOWHILE DATA STILL AVAILABLE IN QUEUE
32FM        GET NEXT RELATIVE BATCH NUMBER FROM QUEUE
04FM        COMPUTE FIRST TRANSACTION SECTOR FOR THIS BATCH
04FM        DOUNTIL ALL TRANSACTION SECTORS INITIALIZED
34FM           ENQUEUE FILE MANAGER RESOURCE
04FM           WRITE INITIALIZED TRANSACTION SECTOR
34FM           DEQUEUE FILE MANAGER RESOURCE
            ENDDO
34FM        ENQUEUE FILE MANAGER RESOURCE
            GET RELATIVE BATCH NUMBER
            READ BATCH FILE SECTOR FOR INDICATED BATCH
01FM        SET STATUS TO UNUSED IN INDICATED BATCH RECORD
            WRITE MODIFIED SECTOR BACK TO BATCH FILE
02FM        SET STATUS TO UNUSED IN RESIDENT BATCH FILE RECORD
34FM        DEQUEUE FILE MANAGER RESOURCE
         ENDDO
         DELAY FOR AWHILE
      ENDDO
```

ADD BATCH RECORD TO FILES

- MODULE HISTORY -

PROJECT:      DAS              73-01709

SUB-SYSTEM:   FILE MANAGER

MODULE:       FMABR            31

- MODULE ABSTRACT -

```
            THIS SUBROUTINE PROCESSES THE ADD BATCH RECORD FILE MANAGER
        CALL CODE. IT FINDS A FREE BATCH RECORD AND ADDS THE NEW
        BATCH RECORD TO THE FILES.
12FM    GET INPUTS
        SET RECORD POINTER = ZERO
        SET RECORD USE COUNT = ZERO
02FM    DOUNTIL END OF RESIDENT BATCH FILE OR ERROR FOUND
            GET FIRST/NEXT RESIDENT BATCH RECORD
02FM        IF RECORD STATUS NOT UNUSED OR DELETING THEN
                ADD 1 TO RECORD USE COUNT
            (ELSE)
            ENDIF
12FM        IF INPUT BATCH I.D. = RECORD BATCH I.D. THEN
02FM
02FM            IF RECORD STATUS NOT DELETING OR UNUSED THEN
12FM                SET COMPLETION CODE = BATCH ALREADY ON FILE
                ELSE
02FM                IF RECORD STATUS = UNUSED THEN
                        SAVE RECORD NO. IN RECORD POINTER
                    (ELSE)
                    ENDIF
                ENDIF
            ELSE
02FM            IF RECORD STATUS = ADDING THEN
12FM                SET COMPLETION CODE = BATCH ALREADY BEING ADDED
                ELSE
02FM                IF RECORD STATUS = UNUSED THEN
                        SAVE RECORD NO. IN RECORD POINTER
                    (ELSE)
                    ENDIF
                ENDIF
            ENDIF
        ENDDO
12FM    IF COMPLETION CODE = SUCCESSFUL THEN
            IF RECORD COUNT G.T. OR E.Q. 10 THEN
                SET RECORD POINTER = ZERO
            (ELSE)
            ENDIF
            IF RECORD POINTER NOT ZERO THEN
01FM            COMPUTE BATCH FILE SECTOR ADDRESS FROM RECORD POINTER
28FM            READ THE BATCH FILE SECTOR
01FM            PLACE NEW BATCH RECORD INTO SECTOR
01FM            SET NEW BATCH RECORD STATUS = ADDING
01FM            SET NEW BATCH RECORD COUNTS = ZERO
28FM            WRITE THE UPDATED BATCH SECTOR
02FM            BUILD RESIDENT BATCH RECORD WITH STATUS = ADDING
            ELSE
12FM            SET COMPLETION CODE = BATCH FILE SPACE EXHAUSTED
            ENDIF
        (ELSE)
        ENDIF
12FM    RETURN TO CALLER

        SEARCH RESIDENT BATCH FILE SUBROUTINE
```

```
                    - MODULE HISTORY -

       PROJECT:        DAS                   79-01709

       SUB-SYSTEM:     FILE MANAGER

       MODULE:         FMSRB                 43

                    - MODULE ABSTRACT -

       THIS SUBROUTINE SEARCHES THE RESIDENT BATCH FILE IN
    $SYSCOM FOR THE BATCH I.D. INPUT BY THE CALLER.
    IT WILL RETURN A "0" IF THE BATCH I.D. IS NOT ON FILE,
    OR THE RELATIVE BATCH NO. IF THE BATCH IS FOUND.
33FM    GET INPUTS
        SET RETURN CODE = 0
        DOUNTIL END OF DATA OR BATCH I.D. FOUND
02FM       GET FIRST/LAST RECORD FROM RESIDENT BATCH FILE
02FM       IF BATCH I.D. FROM RECORD = BATCH I.D. INPUT THEN
33FM
02FM          IF BATCH STATUS NOT UNUSED, ADDING, OR DELETING THEN
33FM             SET RETURN CODE = RELATIVE BATCH NUMBER
              (ELSE)
              ENDIF
           (ELSE)
           ENDIF
        ENDDO
33FM    RETURN TO CALLER




    COLD START DATABASE INITIALIZATION


                    - MODULE HISTORY -

       PROJECT:        DAS                   79-01709

       SUB-SYSTEM:     FILE MANAGER

       MODULE:         FMINT                 33

                    - MODULE ABSTRACT -

       THIS MODULE IS CALLED BY FMGR DURING SYSTEM COLD START TO
    START THE DELETION PROCESS FOR ANY BATCHES THAT HAVE A STATUS
    OF "ADDING OR DELETING".  THIS MODULE ALSO BUILDS THE RESIDENT
    BATCH FILE IN $SYSCOM FROM CURRENT DATA IN THE DISK FILE "BATCH"
    AND COPIES THE INFORMATION FROM THE DISK FILE "XLATE" INTO
    THE RESIDENT TRANSLATION FILE, ALSO IN $SYSCOM, AND COPIES
    INFORMATION FROM THE DISK FILE "ORDER" INTO THE RESIDENT
    ORDER FILE FOUND IN THE FILE MANAGER SUB-SYSTEM.
24FM    GET INPUTS
28FM    BUILD THE RESIDENT ORDER FILE
01FM    DOUNTIL ALL SECTORS IN BATCH FILE ARE PROCESSED
28FM       READ FIRST(NEXT) BATCH FILE SECTOR
01FM       DOUNTIL ALL RECORDS IN SECTOR ARE PROCESSED
01FM          GET FIRST(NEXT) RECORD IN SECTOR
01FM          IF STATUS IN RECORD = ADDING OR DELETING THEN
01FM             SET STATUS IN RECORD TO DELETING
32FM             PUT RELATIVE BATCH NUMBER IN QUEUE FOR DELETION TASK
              (ELSE)
              ENDIF
```

```
02FM         BUILD RESIDENT BATCH FILE RECORD IN $SYSCOM
          ENDDO
28FM      WRITE SECTOR BACK TO BATCH FILE
       ENDDO
28FM   READ SORT TRANSLATION FILE SECTOR INTO $SYSCOM
06FM
24FM   RETURN
```

```
       FILE MANAGER CONTROL


                        - MODULE HISTORY -


          PROJECT:        DAS                     73-01709

          SUB-SYSTEM:     FILE MANAGER

          MODULE:         FMGR                    29


                        - MODULE ABSTRACT -


          THIS MODULE CONTROLS ALL INPUT TO THE FILE MANAGER. IT
       WAITS ON THE FILE MANAGER ENTRY EVENT TO BE POSTED.
       IT THEN CHECKS FOR A VALID CALL CODE FOUND IN THE BUFFER
       PASSED TO IT BY THE CALLER. IF THE CALL CODE IS VALID
       THE SUBROUTINE THAT PROCESSES THAT CODE IS CALLED.
       WHEN THE SUBROUTINE RETURNS, THIS MODULE WILL POST
       THE COMPLETION EVENT BACK TO THE CALLER. THE INFORMATION
       REQUESTED BY THE CALLER IS HELD IN THE BUFFER THAT WAS
       PASSED TO THE FILE MANAGER UPON ENTRY.
       ATTACH BATCH DELETION WORK TASK (FMDLD)
       DOUNTIL CPU STOPPED
25FM      WAIT FOR THE FILE MANAGER ENTRY EVENT TO BE POSTED
09FM      IF THE CALL CODE FOUND IN THE BUFFER IS WITHIN RANGE THEN
26FM         GET ADDRESS OF CALL CODE DISPATCH TABLE
             INDEX INTO DISPATCH TABLE BY CONTROL CODE
             GET WORK SUBROUTINE ADDRESS FROM DISPATCH TABLE
             PLACE ADDRESS INTO SUBROUTINE CALL
             SET FIRST PARAMETER = INPUT BUFFER ADDRESS
09FM         SET COMPLETION CODE IN BUFFER = SUCCESSFUL
             CALL THE WORK SUBROUTINE
          ELSE
09FM         SET COMPLETION CODE = INVALID CALL CODE
          ENDIF
27FM      POST ADDRESS OF INPUT BUFFER BACK TO THE CALLER
       ENDDO
       PROGSTOP
```

```
             ;
             ; L E G E N D
             ;#    NUMBER, NUMBER OF
             ;AD   ADDRESS      CH   CHANNEL       CHAR CHARACTER    CM   COMMAND
             ;COMM COMMUNICATION                  COUT COMMAND OUT
             ;CP   COMPUTE      CR   CARRIAGE RETURN                  CT   CONTROL
             ;DC   DECODE, DIVERT-COMPLETE PHOTO
             ;DEC  DECREMENT    DIN  DATA IN DOUT DATA OUT
             ;DT   DATA         DV   DIVERT
             ;EC   ENCODE       EOF  END OF FILE  ER   ERROR
             ;ID   INDUCT PHOTO INC  INCREMENT    INT  INTERRUPT
             ;JDV  DIVERT NUMBER                  JINDU INDUCT PHOTO NUMBER
             ;JKB  KEYBOARD NUMBER
             ;JPPI PULSE POSITION INDICATOR NUMBER, =0 MEANS REAL TIME CLOCK
             ;JUD  UPDATE PHOTO NUMBER
             ;KB   KEYBOARD
             ;LAQ  LOOK-AHEAD QUEUE
             ;LE   LENGTH       LF   LINE FEED, LANE FULL PHOTO
             ;M    MEMORY       MG   MERGE PHOTO  MS   MOST SIGNIFICANT
             ;MUZ  MOVING UPDATABLE ZONE
             ;NL   NEW LINE
             ;O    OPTION
```

```
                    ;PC    PROGRAM COUNTER, PROCESS       PCR  PROCESSOR
                    ;PLE   PACKAGE LENGTH
                    ;PP    PACKAGE PRESENT PHOTO          PPI  PULSE POSITION INDICATOR
                    ;PR    PRINT
                    ;RC    RECORD         RDC  SILENT 700 REMOTE DEVICE CT    RE   READ
                    ;RLS   RELEASE MECHANISM
                    ;RTC   REAL TIME CLOCK
                    ;SEC   SECOND         SIN  STATUS IN
                    ;SP    STACK POINTER
                    ;T     TIME           TE   TRAILING EDGE PHOTO
                    ;TR    TRAINING PHOTO
                    ;TTY   TELETYPE
                    ;UD    UPDATE PHOTO
                    ;WR    WRITE          XM   TRANSMIT       XQ   EXECUTE
                    ;
                    ; S U B R O U T I N E S  ( M O D U L E S )
                    ;ALL FLAGS ARE ALWAYS EFFECTED UNLESS OTHERWISE STATED.
                    ;  REGISTERS A, B, C, D, E, H, L
                    ;  EFFECTED, OR SP, PC EFFECTED UNEXPECTEDLY, WILL BE MENTIONED.
                    ;
                    ; C O M M E N T S
                    ;COMMENTS ARE GROUPED BY SEMICOLONS.  CONTINUATION OF THE SAME
                    ;  COMMENT WILL BE INDENTED 2 COLUMNS.
                    ;
                    ;
                    ; R E F E R E N C E S
                    ;
                    ;(1) "APPLICATION MANUAL FOR PROGRAMMER SORT CONTROLLER"
                    ;
                    ;(2) PROGRAMMABLE SORT CONTROLLER SOFTWARE ORGANIZATION CHARTS
                    ;    AND SOFTWARE MANUAL
                    ;
                    ;***********************************************************************
                    ;ASSEMBLER PRESET VALUES
        4000        RAMAD    EQU   4000H      ;RAM STARTING ADDRESS
        0001        CVY01    EQU   1          ;FLAG FOR CONVEYOR RELAY CH
        4300        DCBPC    EQU   4300H      ;DIVERT-COMPLETE PHOTO-BLOCKING PROCESSOR
        03DD        EXEC     EQU   03DDH
        03EB        DEBUG    EQU   03EBH
        0966        COLDS    EQU   0966H
        0C19        DEVII    EQU   0C19H
        0C85        APEND    EQU   0C85H
        0CA2        CASSW    EQU   0CA2H
        0CB8        CLAKB    EQU   0CB8H
        0CC4        CLRBP    EQU   0CC4H
        0CC9        CLRKB    EQU   0CC9H
        0CDF        CLDP     EQU   0CDFH
        0D17        CPKBP    EQU   0D17H
        0D1B        AD16A    EQU   0D1BH
        0D25        CPLFM    EQU   0D25H
        0D28        CPMSK    EQU   0D28H
        0D3E        DC2BD    EQU   0D3EH
        0D51        DCBCD    EQU   0D51H
        0D81        DCDV     EQU   0D81H
        0D9E        DIGPC    EQU   0D9EH
        0DEA        DSPLA    EQU   0DEAH
        0DF4        DSPLM    EQU   0DF4H
        3A08        DELAY    EQU   3A08H
        3A89        DPHL     EQU   3A89H
        3A70        DPBD     EQU   3A70H
        0E1C        ERMPC    EQU   0E1CH
        0E01        ECDIG    EQU   0E01H
        0F08        ERPC     EQU   0F08H
        0F13        ERRPC    EQU   0F13H
        0F76        FLASH    EQU   0F76H
        0F91        GDTRE    EQU   0F91H
        0FA2        GITRE    EQU   0FA2H
        0FAC        GUTRE    EQU   0FACH
        0FAD        GUTR1    EQU   0FADH
        0FBA        GTREP    EQU   0FBAH
        0FCB        GETFS    EQU   0FCBH
        100E        GETKB    EQU   100EH
        1065        GETPH    EQU   1065H
        1097        LNKFS    EQU   1097H
        10C4        MOVE     EQU   10C4H
        10CF        MOVEB    EQU   10CFH
        10D8        MTKBB    EQU   10D8H
        1109        OFCVY    EQU   1109H
        110F        OPUT     EQU   110FH
        113F        PHPPB    EQU   113FH
        114F        PUTFS    EQU   114FH
        116C        PUTKB    EQU   116CH
                    ;
                    ;
                    ; P R O M   D A T A
                    ;
                    ;
                    ;FACTORY PRESET PARAMETERS.
```

```
                        ;
0000                    ORG    3D00H
3D00 004B     RAMT1:    DW     4B00H      ;COLD START SP VALUE, = RAM TOP + 1
3D02 02       NPPI:     DB     2          ;# PPI'S
3D03 02       NINDU:    DB     2          ;# INDUCTION STATIONS
3D04 06       NUPDA:    DB     6          ;# UPDATE PHOTOS
3D05 05       NDVT:     DB     5          ;# DIVERTS
3D06 03       P5080:    DB     3          ;STARTING ADDRESS OF 1ST PM5080 BOARD;
3D07 FF                 DB     0FFH       ;  MUST BE 0FFH (FOR COUT OR SIN);
3D08 02       NKB:      DB     2          ;  TOTAL # KB'S
3D09 01       MAKB:     DB     1          ;MASTER KB # FOR SYSTEM OPERATIONS & CASSETTES
3D0A 06       NDPLA:    DB     6          ;# DISPLAY DIGITS, MUST BE 2, 4 OR 6
3D0B 00       NXLTB:    DB     0          ;# TRANSLATE TABLES, <= 16,
                                          ;  0 MEANS NO TRANSLATION OPTION
3D0C 01       TBSIZ:    DB     1          ;TRANSLATE TABLE SIZE IN BYTES / 256,
                                          ;  MUST BE 1, 2, 4, 8, 10H, 20H, OR 40H
3D0D          COMAX:    DS     3          ;ENTRY CODE UPPER BOUND IN BCD
3D10 FFFF     ERO:      DW     0FFFFH     ;ERROR MESSAGES
3D12                    DS     6
3D18 FFFF               DW     0FFFFH     ;DIAG MODE ERROR MESSAGE MASK
3D1A                    DS     6
3D20 FFFF               DW     0FFFFH     ;TRAIN MODE ERROR MESSAGE MASK
3D22 00       ERMKI:    DB     00H        ;PSC INPUT MESSAGE MASK BYTE 0
3D23 00                 DB     00H        ;BYTE 1
3D24 08                 DB     08H        ;BYTE 2
3D25 09                 DB     09H        ;BYTE 3
3D26 00                 DB     00H        ;BYTE 4
3D27 00                 DB     00H        ;BYTE 5
3D28 00       ERMKO:    DB     00H        ;PSC OUTPUT MESSAGE MASK BYTE 0
3D29 03                 DB     03H        ;BYTE 1
3D2A 01                 DB     01H        ;BYTE 2
3D2B 11                 DB     11H        ;BYTE 3
3D2C 14                 DB     14H        ;BYTE 4
3D2D 00                 DB     00H        ;BYTE 5
3D2E FFFF               DW     0FFFFH     ;MUST BE ALL 1'S FOR FATAL ERRORS
3D30 00       ERCHU:    DB     0          ;ER CHUTE #
                                          ;  = 0 MEANS CONVEYOR END
3D31 00       SIDEO:    DB     0          ;SIDE INDUCT OPTION:
                                          ;  BIT 1 FOR AUTO-REINDUCT AFTER RECIRCULATION,
                                          ;  BIT 4 FOR SIDE-INDUCT MERGING
3D32 30       SENDO:    DB     30H        ;"SEND" OPTION CODE,
                                          ;  BITS 0 TO 3 (LS NIBBLE) FOR LENGTH OF FIXED-
                                          ;  LENGTH CODE WITHOUT "SEND" (0 MEANS OFF),
                                          ;  BIT 4 FOR ENTER-CODE-BY-"SEND",
                                          ;  BIT 5 FOR REPEAT-BY-"SEND".
3D33 01       NICC:     DB     1          ;# INTER-COMPUTER COMMUNICATION CHANNELS
3D34 01       DQLIM:    DB.    1
3D35 0000               DW     0
3D37 02       QLIMI:    DB     2          ;LAQ SIZE LIMIT, MUST BE 1 TO 8
3D38 00       DVTRS:    DB     0          ;DIVERT RESET OPTION:
                                          ;  0 FOR MAINTAINED DV & NO RESET UNTIL
                                          ;  NEXT PACKAGE
                                          ;  1 FOR MEASURED RESET ACCORDING TO PACKAGE LE
                                          ;  2 FOR HARDWARE RESET INITIATED BY PULSE
3D39 00       SCNRO:    DB     0          ;SCANNER OPTIONS:
                                          ;  BIT 0 TO ACTIVATE DIVER # DEFAULT.
                                          ;  BIT 1 TO ACTIVATE TRANSLATE DEFAULT;
                                          ;  BIT 6 TO ACTIVATE PARITY CHECKING.
                                          ;  BIT 7 FOR ODD PARITY
3D3A 00       SERDV:    DB     0          ;AUTO JDV FOR SCANNER FAIL
                                          ;  =0 MEANS RECIRCULATION
3D3B 00       DCO:      DB     0          ;DV-COMPLETE OPTION:
                                          ;  -0 MEANS NO DIVERT-COMPLETE
                                          ;  =1 MEANS 1 DIVERT-COMPLETE PHOTO PER DIVERT
                                          ;  = 2 MEANS UPDATE PHOTOS USED
                                          ;        AS DIVERT-COMPLETE PHOTOS
3D3C 02       LFO:      DB     2          ;LANE FULL PHOTO OPTION CODE,
                                          ;  BIT 0 (LS BIT) FOR KB-INHIBIT,
                                          ;  BIT 1 FOR DV-INHIBIT,
                                          ;  BIT 4 FOR AUTO SEND AFTER CLEARING LF
3D3D 00       LFEDV:    DB     0          ;LANE FULL ERROR DIVERT (FUTURE EXPANSION)
3D3E 0000     SYS9:     DW     0          ;MUST BE 0
3D40 00       SYSTM:    DB     0          ;MUD= LAST UD # FOR PPI #1
3D41 01                 DB     1          ;MUD= LAST UD # FOR PPI #2
3D42 00                 DB     0          ;MUST BE 0
3D43 03                 DB     3          ;MDV= LAST DV # FOR UD # 1
3D44 00                 DB     0          ;MUST BE 0
3D45                    DS     1          ;FID= FOLLOWING SIDE INDUCT # FOR UD # 1
                        ;
3D46                    ORG    3DC0H
3DC0 0080     XLTBS:    DW     8000H      ;TRANSLATE TABLE # 1 BASE ADDRESS
3DC2 0090               DW     9000H      ;TRANSLATE TABLE # 2 AD
3DC4 00A0               DW     0A000H     ;TRANSLATE TABLE # 3 AD
                        ;
3DC6                    ORG    3DF0H
3DF0 004C     TRSDB:    DW     4C00H
3DF2 FF4F     TLAST:    DW     4FFFH
                        ;
```

```
                        ; R A M   D A T A
                        ;  (PUT IN FRONT FOR CONDITIONAL MACRO EXPANSIONS)
                        ;
                        ;
                        ;FIELD SET PARAMETERS FOR RUNNING MODE.
                        ;
3DF4                            ORG    RAMAD
4000 0000       FLAGS:  DW      0               ;BIT 0 (LS BIT) TO ENABLE ALL ERROR MESSAGES;
                                                ;BIT 7 (128) FOR AUTOMATIC INDUCTION
4002 0000       SLIP:   DW      0               ;INERTIAL SLIPPAGE ALLOWANCE FOR
                                                ;  HOT START
4004 0000       PLEMX:  DW      0               ;T FROM RLS TO TEC2
                                                ;  = MAX PLE + TE DELAY + SAFETY FACTOR
4006 0000       HDSEN:  DW      0               ;HALF HOST MODE ENABLED
4008 0000       DVH:    DW      0               ;FOR DVTRS=1, = MAX DIVERT HOLD TIME - PLE,
                                                ;  FOR DVTRS=2, = PULSE LENGTH
400A 0000       PPD:    DW      0               ;PP DWELL FOR PUTTING IN GAP
400C 0000       GAP:    DW      0               ;ADDITIONAL RELEASE DELAY FOR A PACKAGE NOT
                                                ;  FULLY STOPPED
                DCTT:                           ;OVERALL MAX TIME FROM DIVERT SET
                                                ;  TO DIVERT-COMPLETE PHOTO BLOCKED
                DCZSZ:                          ;DC ZONE SIZE
400E 0000       DCPSZ:  DW      0               ;MIN PACKAGE SIZE AT DC
4010            TTBP:   DS      01E0H           ;FOR TIMING TABLES
                        ;
                        ;
41F0                    ORG     RAMAD+0200H
                        ;
                        ;BREAKPOINT VARIABLES.
                        ;
4200 0000       RS1AD:  DW      0               ;RESTART
4202 EB03       RS2AD:  DW      DEBUG           ;  MODULE
4204 0000       RS3AD:  DW      0               ;  AD'S
4206 0000       RS4AD:  DW      0               ;
4208 0000       RS5AD:  DW      0               ;
420A 0000       RS6AD:  DW      0               ;
420C 00         BPM:    DB      0               ;BREAKPOINT M CONTENT (TO BE RESTORED)
420D 0000       ENTAD:  DW      0               ;"GO" COMMAND ENTRANCE AD
420F 0000       REGAF:  DW      0               ;REGISTERS A,F VALUES
4211 0000       REGBC:  DW      0               ;REGISTERS B,C VALUES
4213 0000       REGDE:  DW      0               ;REGISTERS D,E VALUES
4215 0000       REGHL:  DW      0               ;REGISTERS H,L VALUES
4217 0000       BP:     DW      0               ;BREAKPOINT
4219 00         CVCHN:  DB      0               ;COMPOSITE CHN # FOR CONVEYOR RELAY
                        ;
                        ;DEBUGGER AND CASSETTE VARIABLES.
                        ;
421A 00         CMCH:   DB      0               ;COMMAND CHARACTER
421B 00         JRC:    DB      0               ;RECORD INDEX
421C 00         RCLE:   DB      0               ;RECORD LENGTH
421D 0000       DUMP0:  DW      0               ;MEMORY DUMP START AD
421F 0000       DUMP9:  DW      0               ;MEMORY DUMP END AD
4221 0000       LOFFS:  DW      0               ;LOAD M OFFSET
4223 0000       MISMP:  DW      0               ; POINTS TO MOST RECENT MISMATCH BYTE
                        ;
                        ;VALUES NOT EFFECTED BY COLD START.
                        ;
4225 3C         MODE:   DB      '<'             ;'<' FOR RUN, '=' FOR DIAGNOSTIC,
                                                ;  '>' FOR TRAINING, ':' FOR INTER-COMPUTER
4226 08         MODEE:  DB      8               ;NOT=0 WILL ENABLE MODE TRANSITION
4227 0000       FSP0:   DW      0               ;BASE AD OF FIELD-SET PARAMETERS
4229 35         RS:     DB      35H             ;ASCII 5
422A 35         LMR:    DB      35H             ;ASCII 5
422B 00         ICMO:   DB      0               ;INTERCOMPUTER MODE ACTIVE FLAG
422C 0200       TDLTM:  DW      0002H           ;MESSAGE TIMEOUT IN 0.1 SEC INCREMENTS
422E 0F         VICLG:  DB      0FH             ;I/C LIGHT REFRESH TIME IN 0.1 SEC INCREMENTS
                        ;
                        ;TABLE POINTERS TO BE SET BY COLD START & NEVER CHANGED.
                        ;
                CSRAM:
422F 0000       PRET:   DW      0               ;PRE-INDUCT TIME TABLE: IF STRAIGHT MERGE
                                                ;  THEN MAX T FROM RLS TO ID,
                                                ;  ELSE UDBPC TO BMG
4231 0000       TET:    DW      0               ;TE DELAY TABLE
4233 0000       IDT:    DW      0               ;MIN T FROM ID-BLOCKING TO UD1-BLOCKING TABLE;
                                                ;  IF SIDE-INDUCT, RELEASE TO UDB1 TIME
4235 0000       ZNT:    DW      0               ;UDB1 TO UDB2 TIMING TABLE
4237 0000       UDT:    DW      0               ;UPDATE PHOTO TIMING TABLE
4239 0000       DVT:    DW      0               ;DIVERT TIMING TABLE
423B 0000       DCT:    DW      0               ;MIN T LAST UD-BLOCKING TO DC-BLOCKING TABLE
                        ;
423D 0000       LDVDB:  DW      0               ;LDV DATABASE IN PROM
423F 0000       FIDDB:  DW      0               ;SIDE INDUCT # FOLLOWING UPDATE
4241 0000       ICDB:   DW      0               ;INTER-COMPUTER DATABASE
4243 0000       PPDB:   DW      0               ;PACKAGE-PRESENT DATABASE
4245 0000       PPIDB:  DW      0               ;PPI DATABASE FOR TREE PARAMETERS
                                                ;  PPI # 0 MEANS RTC
```

```
4247 0000   KBDB:    DW   0         ;KB DATA BASE,
4249 0000   KBIBF:   DW   0         ;  KB INPUT BUFFERS,
424B 0000   KBOBF:   DW   0         ;  KB ECHO BUFFERS
424D 0000   XLDB:    DW   0         ;TRANSLATE DATABASE
424F 0000   RLSDB:   DW   0         ;RLS DATABASE
4251 0000   UDDB:    DW   0         ;UPDA PHOTO DATABASE
4253 0000   LFDB:    DW   0         ;LF PHOTO DATABASE
4255 0000   DVDB:    DW   0         ;DIVERT DATABASE FOR DC
4257 0000   DCDB:    DW   0         ;DV-COMPLETE DATABASE FOR DC
4259 0000   OUTDB:   DW   0         ;PM5007 OUTPUT BOARD IMAGES
425B 0000   FS:      DW   0         ;FREE STORAGE FOR TCB'S IN RUNNING MODE
                     ;
                     ;VALUES TO BE SENT IN COLD START & NEVER CHANGED.
                     ;
425D AA55   RAM01:   DW   55AAH     ;FOR TESTING VALIDITY OF RAM
425F AA55   RAM02:   DW   55AAH     ;  ON POWER-UP
4261        HTSL:    DS   5         ;FOR PM5008 INITIALIZATION
4266 04FF   MKBCO:   DW   0FF04H    ;MASTER KB COUNT AD
4268 00     SL700:   DB   0         ;NOT=0 MEANS MASTER KB IS SILENT 700
4269 0000   K5080:   DW   0         ;PM5080 SIN AD FOR 1ST KB
426B 00     N5080:   DB   0         ;# PM5080 BOARDS
426C 00     P5008:   DB   0         ;1ST PM5008 BOARD AD
426D 00     P5007:   DB   0         ;1ST PM5007 BOARD AD
426E 00     N5007:   DB   0         ;# PM5007 BOARDS
426F 00     PPCHN:   DB   0         ;1ST PP PM5008 COMPOSITE CHANNEL #
4270 00     IDCHN:   DB   0         ;1ST ID CH #
4271 00     UDCHN:   DB   0         ;1ST UD CH #
4272 00     DCCHN:   DB   0         ;1ST DC CH #
4273 00     LFCHN:   DB   0         ;1ST LF CH #
4274 00     TRCHN:   DB   0         ;1ST TR CH #
4275 00     ILCHN:   DB   0         ;OUTPUT CHANNEL # FOR INTER-COMPUTER LIGHT
                     ;
                     ;
                     ;SCRATCH VARIABLES FOR ALL MODES. INITIALLY ALL 0.
                     ;
4276 00     XYZ9:    DB   0         ;KB
4277 00     XYZ8:    DB   0         ;  DISPLAY
4278 00     XYZ7:    DB   0         ;  DIGITS
4279 00     XYZ6:    DB   0         ;
427A 00     XYZ5:    DB   0         ;
427B 00     XYZ4:    DB   0         ;
427C 00     XYZ3:    DB   0         ;
427D 00     XYZ2:    DB   0         ;
427E 00     XYZ1:    DB   0         ;
427F 00     XYZ0:    DB   0         ;(LS ASCII DIGIT)
4280 00     XYZ:     DB   0         ;MUST BE 0 (SEE TYPEM)
4281 0000   PFSP:    DW   0         ;SP FOR POWER FAIL HOT START
4283 0000   NNOIS:   DW   0         ;# NOISE INT'S PER 8 RTC INT'S
4285 00     PCRON:   DB   0         ;FLAG TO FLASH PCRON LIGHT
4286 0000   FLSHR:   DW   0         ;SPARE FLASHER FLAG
4288 0000   RGAF:    DW   0         ;ERRPC
428A 0000   RGBC:    DW   0         ;  INPUT
428C 0000   RGDE:    DW   0         ;  REGISTERS'
428E 0000   RGHL:    DW   0         ;  VALUES
4290 0000   RGPC:    DW   0         ;
4292 00     INDEX:   DB   0         ;DEVICE INDEX
4293 00     DEVIC:   DB   0         ;DEVICE CODE
4294 00     JINDU:   DB   0         ;INDUCTION STATION #
4295 00     JUPDA:   DB   0         ;CURRENT UPDA PHOTO #
4296 00     JDV:     DB   0         ;CURRENT DIVERT # AND
4297 0000   IDENT:   DW   0         ;  PACKAGE IDENTIFICATION CODE
4299 0000   UDBT:    DW   0         ;UPDA BLOCKING TIME
429B 0000   DVST:    DW   0         ;DIVERT SET TIME
429D 0000   VALUE:   DW   0         ;D4BCD INPUT
429F 0000   CODE:    DW   0         ;PACKAGE CODE LS 2 BYTES; OR PARAMETER CODE
42A1 0000   CODE9:   DW   0         ;  PACKAGE CODE MS BYTE; OR OLD PARAMETER CODE
                     ;
                     ;MMNPL DATA
                     ;
42A3 00     MNPLC:   DB   0         ;DIGIT COUNT ( >= 0 ) WHEN ER = 2 OR 5
42A4 0000   MLOC:    DW   0         ;POINTS TO M BYTE TO BE DISPLAYED
42A6 00     MBYTE:   DB   0         ;M REPLACEMENT BYTE
42A7 00     MTBD:    DB   0         ;M TO BE DISPLAYED
                     ;
                     ;RUNNING MODE SCRATCH VARIABLES. INITIALLY ALL 0.
                     ;
42A8 0000   FSQ1:    DW   0         ;START OF FREE STORAGE QUEUE
42AA 0000   FSQ9:    DW   0         ;  END OF FREE STORAGE QUEUE
42AC 00     FSQ0:    DB   0         ;FREE STORAGE OUT FLAG TO LOCK OUT INDUCTS, &
42AD 00     NTRE0:   DB   0         ;  COUNT DOWN OF # EMPTY TREES
42AE 0000   NNTR0:   DW   0         ;COUNT DOWN OF # TIMES TREES ALL EMPTY
42B0 0000   COUNT:   DW   0         ;TOTAL # PACKAGES THRU UPDA #1
42B2 0000   CTIMP:   DW   0         ;POINTS TO CTIME FOR CURRENT PPI
42B4 0000   TCBP:    DW   0         ;TCB POINTER
                     ;
                     ;TREE PARAMETERS FOR THE CURRENTLY USED PPI.
                     ;
42B6 0000   CTIME:   DW   0         ;PPI CLOCK TIME
```

```
42B8 0000   HEAD:    DW   0     ;TREE HEADER
42BA 0000   RLINK:   DW   0     ;POINTS TO TREE ROOT
42BC 00              DB   0     ;WOULD-BE TREE BALANCE FACTOR
42BD 0000   NXTIM:   DW   0     ;NEXT EVENT DUE TIME
42BF 00     JPPI:    DB   0     ;CURRENT PPI #
42C0 00     MUD:     DB   0     ;LAST UD # FOR THIS PPI
42C1                 DS   5     ;UNUSED FILLER FOR PPIDB DATA TRANSFER
42C6 0000   STKSV:   DW   0     ;SP SAVE
42C8 0000   QP:      DW   0     ;TREE PROCESSOR
42CA 0000   QX:      DW   0     ;  VARIABLES
42CC 0000   QT:      DW   0     ;
42CE 0000   QW:      DW   0     ;
42D0 0000   QS:      DW   0     ;
42D2 0000   QR:      DW   0     ;
42D4 0000   QDIR:    DW   0     ;
42D6 0000   NEWTM:   DW   0     ;NEW EVENT TIME
42D8 0000   PPIDP:   DW   0     ;POINTER TO CTIME IN PPIDB
                     ;
                     ;KEYBOARD DATA
                     ;
42DA 0000   KBDBP:   DW   0     ;KB DATABASE POINTER
42DC 0000   KBCM:    DW   0     ;AD FOR KB COUT OR SIN
42DE 00     CHAR:    DB   0     ;KB INPUT CHARACTER
42DF 00     NDIG:    DB   0     ;# DIGITS ENTERED
                     ;
                     ;TRANSLATION DATA
                     ;
42E0 00     XL:      DB   0     ;TRANSLATE FLAG FOR PACKAGE ENCODING
42E1 0000   DELTA:   DW   0     ;HASH FUNCTION OFFSET
42E3 01     JXL:     DB   1     ;TRANSLATE TABLE #
42E4 01     MJXL:    DB   1     ;MASTER KB TRANSLATE TABLE #
42E5 0000   NCODE:   DW   0     ;# CODE ENTRIES POSSIBLE PER TABLE
42E7 0000   XLTB:    DW   0     ;TRANSLATE TABLE BASE
42E9 0000   XLTBP:   DW   0     ;TRANSLATE TABLE ENTRY POINTER
                     ;
                     ;INDUCTION DATA
                     ;
42EB 0000   PPDBP:   DW   0     ;POINS TO PPDB
42ED 0000   PSEQ:    DW   0     ;POINTS TO PACKAGE SEQUENCE THRU ID
42EF 0000   RLDBP:   DW   0     ;POINTS TO RLSDB
42F1 0000   NEXTP:   DW   0     ;NEXT TCB POINTER
                     ;
                     ;UPDATE PHOTO DATA
                     ;
42F3 0000   PMUZ:    DW   0     ;SEE UDDB
42F5 0000   PMUZP:   DW   0     ;PMUZ POINTER
42F7 0000   LDVP:    DW   0     ;POINTS TO LDV ITEM
                     ;
                     ;DIVERT DATA
                     ;
42F9 0000   OACT:    DW   0     ;CURRENT OACT IN TCB
42FB 00     LFDV:    DB   0     ;FOR LANE-FULL-CLEAR AUTOMATIC RE-INDUCTION
42FC 0000   LFP:     DW   0     ;POINTS TO LF IN LFDB
42FE 00     C5007:   DB   0     ;=N5007 - BOARD #
42FF 0000   OUTIM:   DW   0     ;TEMPORARY PM5007 OUTPUT IMAGE
4301 0000   DCDBP:   DW   0     ;DCDB ENTRY POINTER
                     ;
                     ;
                     ;DIAGNOSTIC & TRAINIING MODE SCRATCH VARIABLES.
                     ;  INITIALLY ALL 0.
                     ;
4303 00     CMCHR:   DB   0     ;CM CHAR
4304 00     XC:      DB   0     ;EXERCISER FLAG
4305 0000   SOURC:   DW   0     ;SOURCE PHOTO DEVICE CODE (MS BYTE) & INDEX
4307 0000   DEST:    DW   0     ;DESTINATION PHOTO DEVICE CODE & INDEX
4309 0000   BASE:    DW   0     ;TRAINING TABLE BASE ADDRESS
                     ;
                     ;DIAGNOSTIC MODE & TRAINING MODE INITIALLY NONZERO VARIABLES.
                     ;
430B 01     SUBMO:   DB   1     ;SUBMODE #
430C 4000   XCITV:   DW   64    ;EXERCISE INTERVAL IN PPI'S
                                ;  MUST BE A POWER OF 2
430E 01     KPPI:    DB   1     ;CURRENTLY ACTIVE PPI #
430F 02     DVXYZ:   DB   2     ;CURRENT DIVERT STATE.
                                ;  =1 MEANS SET, =2 MEANS RESET
                     ;
                     ;INTER-COMPUTER MODE DATA
                     ;
4310 00     XMRBS:   DB   0     ;TRANSMITTER BUSY FLAG
4311 00              DB   0     ;
4312 0000            DW   0     ;
4314 0000            DW   0     ;
4316 0000            DW   0     ;
4318        BYT16:   DS   16    ;MESSAGE TEMPORARY BUFFER
4328        DASDB:   DS   16    ;PSC INPUT MESSAGE BUFFER
4338        MOBUF:   DS   16    ;PSC OUTPUT MESSAGE BUFFER
4348 00     CSEQ:    DB   0     ;COUNTER INDICATING BAD SEQ BYTE
```

```
4349 00        CSUM:    DB    0         ;COUNTER INDICATING BAD CHECKSUM
434A 00        CTOUT:   DB    0         ;COUNTER INDICATING MESSAGE TIMEOUT
434B 0000      DASIP:   DW    0         ;POINTER IN PSC INPUT MESSAGE BUFFER
434D 00        DTYBS:   DB    0         ;FLAG INDICATING PSC IS OUTPUTTING TO I/C 5080
434E 00        FDV:     DB    0         ;FLAG INDICATING A DVT# OF 0
434F 00        FLG9:    DB    0         ;FLAG USED TO INDICATE MESSAGE 9
4350 00        FLINK:   DB    0         ;FLAG INDICATING I/C LINK STATUS
4351 00        FMBAD:   DB    0         ;FLAG INDICATING BAD MESSAGE RECEIVED BY PSC
4352 00        FULBF:   DB    0         ;FLAG INDICATING FULL PSC INPUT MESSAGE BUFFER
4353 00        ICLGT:   DB    0         ;I/C LIGHT COUNTER = VICLG
4354 0000      LMP:     DW    0         ;LOAD MESSAGE POINTER IN FS
4356 0000      MBUFP:   DW    0         ;POINTER IN PSC OUTPUT MESSAGE BUFFER
4358 0000      SMP:     DW    0         ;SEND MESSAGE POINTER IN FS
435A 00        TCONT:   DB    0         ;COUNTER USED IN TRANSACTION TABLE LOADING
435B 0000      TMOUT:   DW    0         ;MESSAGE TIMEOUT = TDLTM
435D 0000      TRSDP:   DW    0         ;POINTER IN TRANSACTION TABLE
                        ;
                        ;GENERAL PURPOSE TEMPORARY VARIABLES
                        ;
435F 0000      T2:      DW    0         ;TEMPORARY
4361                    DS    27        ;(FILLER)
                        ;
                        ;PHOTO INTERRUPT BUFFER DATA
                        ;  N.B.: BUFFER OF LENGTH 64 MUST START AT ADDRESS DIVISIBLE BY 64. ****
                        ;
437C 8043      PH1:     DW    PHBF      ;PHOTO IN-POINTER
437E 8043      PH2:     DW    PHBF      ;PHOTO OUT-POINTER
4380           PHBF:    DS    64        ;CIRCULAR BUFFER FOR 31 OR LESS INTERRUPTS
                        ;
                        ;VARIABLE SIZE TABLES AND FREE STORAGE.
                        ;  N.B.:  MUST START AT MULTIPLE OF 32.  ***************************
                        ;
43C0           TBS:     DS    100       ;(DYNAMIC TABLES START HERE)
                        ;
                        ;
                        ;MISCELLANEOUS MACROS
                        ;
                        ;
                        ;JUMP TO NXBC IF B,C NOT= AD OF XBC.
                        ;REGISTER A,D, E EFFECTED.
                        ;
               JBCN     MACRO XBC,NXBC
                        LXI   D,XBC
                        MOV   A,C
                        CMP   E
                        JNZ   NXBC
                        MOV   A,B
                        CMP   D
                        JNZ   NXBC
                        ENDM
                        ;
                        ;
                        ;JUMP TO MEQ IF M CONTENTS AT H,L & H,L+2 ARE EQUAL, ELSE FALL THRU.
                        ;
                        ;OUTPUT: B,C = 1ST CONTENT, D,E = 2ND CONTENT, H,L POINTS TO MS BYTE.
                        ;
               JMEQ     MACRO MEQ
                        MOV   C,M       ;1ST CONTENT IN B,C
                        INX   H         ;
                        MOV   B,M       ;
                        INX   H         ;2ND CONTENT IN D,E
                        MOV   E,M       ;
                        INX   H         ;
                        MOV   D,M       ;
                        MOV   A,E
                        CMP   C
                        JNZ   $+8
                        MOV   A,D
                        CMP   B
                        JZ    MEQ
                        ENDM
                        ;
                        ;
                        ;H,L = H,L - XXX. A, E, E EFFECTED. FLAG C SET IF <0.
                        ;
               SUBX     MACRO XXX
                        XCHG            ;D,E=SUBTRAHEND
                        LHLD  XXX       ;H,L=XXX
                        MOV   A,E
                        SUB   L
                        MOV   L,A
                        MOV   A,D
                        SBB   H
                        MOV   H,A
                        ENDM
                        ;
                        ;
```

```
        ;BALANCED BINARY TREE MACRO DEFINITION
        ;
        ;
        ;GET VALUE OF LEFT LINK
        ;
GTLLK   MACRO SRCNO,DEST
        IF    SRCNO     ;IS NODE ADDRESS IN (H,L)?
        LHLD  SRCNO             ;NO-NODE POINTER TO (H,L)
        ENDIF
        MOV   E,M               ;MOVE THE LEFT
        INX   H                 ;LINK INTO THE
        MOV   D,M               ;(D,E) REGISTER
        IF    DEST              ;IS IT SAVE LINK MODE?
        XCHG                    ;YES - LINK TO (H,L)
        SHLD  DEST              ;LINK TO MEMORY
        ENDIF
        ENDM
        ;
        ;GET VALUE OF RIGHT LINK
        ;
GTRLK   MACRO SRCNO,DEST
        IF    SRCNO             ;IS NODE ADDRESS IN (H,L)?
        LHLD  SRCNO             ;NO - NODE POINTER TO (H,L)
        ENDIF
        INX   H                 ;STEP POINTER TO
        INX   H                 ;THE RIGHT LINK
        MOV   E,M               ;MOVE THE RIGHT
        INX   H                 ;LINK INTO THE
        MOV   D,M               ;(D,E) REGISTER
        IF    DEST              ;IS IT SAVE LINK MODE?
        XCHG                    ;YES - LINK TO (H,L)
        SHLD  DEST              ;LINK TO MEMORY
        ENDIF
        ENDM
        ;
        ;SET VALUE OF LEFT LINK
        ;
PTLLK   MACRO DSTNO,SOURC
MCTEM   SET   1                 ;ASSUME ADDRESS IN (H,L)
        IF    DSTNO             ;TEST ASSUMPTION
MCTEM   SET   0                 ;FALSE ASSUMPTION
        ENDIF
        IF    SOURC             ;IS NEW LINK IN (D,E)?
        IF    MCTEM             ;NO - BUT IS POINTER IN (H,L)?
        XCHG                    ;YES - SAVE NODE POINTER
        ENDIF
        LHLD  SOURC             ;NEW LINK TO (H,L)
        XCHG                    ;NEW LINK TO (D,E)
        ENDIF
        IF    DSTNO             ;IS NODE ADDRESS IN (H,L)?
        LHLD  DSTNO             ;NO - NODE POINTER TO (H,L)
        ENDIF
        MOV   M,E               ;MOVE THE NEW
        INX   H                 ;LEFT LINK VALUE
        MOV   M,D               ;INTO THE NODE
        ENDM
        ;
        ;SET VALUE OF RIGHT LINK
        ;
PTRLK   MACRO DSTNO,SOURC
MCTEM   SET   1                 ;ASSUME ADDRESS IN (H,L)
        IF    DSTNO             ;TEST ASSUMPTION
MCTEM   SET   0                 ;FALSE ASSUMPTION
        ENDIF
        IF    SOURC             ;IS NEW LINK IN (D,E)?
        IF    MCTEM             ;NO - BUT IS POINTER IN (H,L)?
        XCHG                    ;YES - SAVE NODE POINTER
        ENDIF
        LHLD  SOURC             ;NEW LINK TO (H,L)
        XCHG                    ;NEW LINK TO (D,E)
        ENDIF
        IF    DSTNO             ;IS NODE ADDRESS IN (H,L)?
        LHLD  DSTNO             ;NO - NODE POINTER TO (H,L)
        ENDIF
        INX   H                 ;NOW STEP TO THE
        INX   H                 ;RIGHT LINK BYTES
        MOV   M,E               ;MOVE THE NEW
        INX   H                 ;RIGHT LINK VALUE
        MOV   M,D               ;INTO THE NODE
        ENDM
        ;
        ;GET BALANCE FACTOR OF NODE
        ;
GTBAL   MACRO NODPT,DEST
        IF    NODPT             ;IS NODE ADDRESS IN (H,L)?
        LHLD  NODPT             ;NO - NODE POINTER TO (H,L)
        ENDIF
```

```
                        INX   H                  ;STEP POINTER TO
                        INX   H                  ;THE BALANCE BYTE
                        INX   H
                        INX   H
                        MOV   A,M                ;BALANCE CODE TO A-REG
                        IF    DEST               ;TEST IF SAVE NODE
                        STA   DEST               ;YES - CODE TO MEMORY
                        ENDIF
                        ORA   A                  ;SET CONDITION CODES
                        ENDM
              ;
              ;PUT BALANCE FACTOR INTO A NODE
              ;
              PTBAL     MACRO NODPT,SOURC
                        IF    SOURC              ;IS FACTOR IN A-REG?
                        LDA   SOURC              ;NO - BALANCE TO A-REG
                        ENDIF
                        IF    NODPT              ;IS NODE ADDRESS IN (H,L)
                        LHLD  NODPT              ;NO - NODE POINTER TO (H,L)
                        ENDIF
                        INX   H                  ;STEP POINTER TO
                        INX   H                  ;THE BALANCE BYTE
                        INX   H
                        INX   H
                        MOV   M,A                ;BALANCE CODE TO NODE
                        ENDM
              ;
              ;
4424                    ORG   1400H      ;RUN MODE EXEC
              ;
              ;RUNNING MODE EXECUTIVE.
              ;
              ;INPUT: INTERRUPTS DISABLED, MODE DATA, COLD-START DATA.
              ;ALL REGISTERS & MEMORY EFFECTED.
              ;
1400 CDAC1A   REXEC:    CALL  RINI       ;;INI FOR RUNNING MODE
              ;
              ;CLEAR KB'S
              ;
1403 FB                 EI               ;;ENABLE INTERRUPTS
1404 CDB80C             CALL  CLAKB      ;CLEAR ALL KB'S
1407 C30D14             JMP   RXEC1      ;ENTER MAIN LOOP
              ;
              ;PROCESS EVERYTHING IN PSCBF
              ;
140A CD2F1B   RPHPC:    CALL  PHPC       ;PROCESS ALL PHOTOS
140D CD6510   RXEC1:    CALL  GETPH      ;GET B=DEVIC,
1410 C20A14             JNZ   RPHPC      ;  C=INDEX
              ;
              ;FLASH WATCH-DOG LIGHT
              ;
1413 CD760F             CALL  FLASH      ;FLASH PSC-ON LIGHT
              ;
              ;IF FREE STORAGE IS OUT THEN LOCK OUT INDUCTS
              ;
1416 3AAC42             LDA   FSQ0       ;IF FREE STORAGE
1419 3D                 DCR   A          ;  IS
141A FA3614             JM    RKBPC      ;  OUT
141D CA3C14             JZ    REVNT      ;IF INDUCTS HAVE NOT YET
1420 32AC42             STA   FSQ0       ;  BEEN LOCKED OUT
              ;
1423 3A033D             LDA   NINDU      ;C= INDUCT #,
1426 4F                 MOV   C,A        ;  = NINDU INITIALLY
1427 CD1422   RMCID:    CALL  MCLPC      ;MASTER CLEAR INDUCT
142A 3E0F               MVI   A,15       ;ERROR
142C CD130F             CALL  ERRPC      ;  15
142F 0D                 DCR   C          ;DOUNTIL ALL
1430 C22714             JNZ   RMCID      ;  CLEARED
1433 C33C14             JMP   REVNT      ;IGNORE KB INPUTS
              ;
              ;PROCESS A CHAR IN KBIBF
              ;
1436 CD0E10   RKBPC:    CALL  GETKB      ;A = INPUT CHAR, C = KB #,
                                         ;  KBDBP = HL POINTS TO KBDB BYTE 4
1439 C4501B             CNZ   KBPC       ;PROCESS ANY KB INPUT CHAR
              ;
              ;PROCESS EVENTS DUE OR OVERDUE IN ALL AVL TREES
              ;  TREE # 0 IS FOR RTC, TREES # 1 TO # NPPI ARE FOR PPI'S
              ;  (BEWARE OF CRITICAL SECTIONS);
              ;  RTC TREE IS USED FOR LOW PRIORITY DELAYED TASKS
              ;
143C 3A023D   REVNT:    LDA   NPPI       ;A= # PPI'S = # TREES - 1
143F 32AD42             STA   NTRE0      ;COUNT DOWN # EMPTY TREES
1442 2A4542             LHLD  PPIDB      ;POINT TO CTIME IN PPIDB
1445 22D842   NWTRE:    SHLD  PPIDP      ;SAVE PPIDB POINTER
1448 E5                 PUSH  H          ;SAVE AGAIN (GTREP MAY CHANGE PPIDP)
1449 F5                 PUSH  PSW        ;SAVE TREE COUNT
144A 11B642             LXI   D,CTIME    ;D,E POINTS TO CTIME
```

```
144D 0610               MVI    B,10H      ;GET TREE
144F F3                 DI                ;;  PARAMETERS
1450 CDCF10             CALL   MOVEB      ;;  (CRITICAL SECTION WITH
1453 FB                 EI                ;;  RTCIN & PPIIN)
1454 2ABA42             LHLD   RLINK      ;IF THE TREE
1457 7D                 MOV    A,L        ;  IS NOT
1458 B4                 ORA    H          ;  EMPTY
1459 CA8E14             JZ     TREE0      ;
145C 2ABD42             LHLD   NXTIM      ;H,L=NXTIM
145F 3AB642             LDA    CTIME      ;IF CTIME-NXTIM >= 0,
1462 95                 SUB    L          ;  I.E.,
1463 3AB742             LDA    CTIME+1    ;  IF EVENT
1466 9C                 SBB    H          ;  IS OVERDUE
1467 FA9214             JM     NXTRE      ;  OR DUE
                ;
                ;  ;REMOVE EVENT FROM TREE & EXECUTE IT
                ;
146A CDAE27             CALL   DEQUE      ;H,L POINTS TO EVENT TCB
146D 22B442             SHLD   TCBP       ;TCBP POINTS TO TCB
1470 2AD842             LHLD   PPIDP      ;POINT D,E TO
1473 EB                 XCHG              ;  TREE HEADER IN PPIDB
1474 13                 INX    D          ;POINT TO TREE PARAMETERS
1475 13                 INX    D          ;  IN PPIDB
1476 21B842             LXI    H,HEAD     ;POINT H,L TO CTIME
1479 060E               MVI    B,14       ;UPDATE
147B CDCF10             CALL   MOVEB      ;  PPIDB
147E 219214             LXI    H,NXTRE    ;SIMULATE A SUBROUTINE
1481 E5                 PUSH   H          ;  RETURN ADDRESS NXTRE
1482 2AB442             LHLD   TCBP       ;POINT H,L TO
1485 110700             LXI    D,7        ;  BYTE 7
1488 19                 DAD    D          ;  IN TCB
1489 5E                 MOV    E,M        ;POINT
148A 23                 INX    H          ;  D,E TO
148B 56                 MOV    D,M        ;  EVENT
148C EB                 XCHG              ;H,L=ENTRY, D,E POINTS TO
                                          ;  BYTE 8 OF TCB
148D E9                 PCHL              ;XQ EVENT WITH SIMULATED CALL
                ;
                ;  ;EXAMINE NEXT EVENT TREE
                ;
148E 21AD42     TREE0:  LXI    H,NTRE0    ;COUNT DOWN
1491 35                 DCR    M          ;  # EMPTY TREES
1492 F1         NXTRE:  POP    PSW        ;A= #TREES LEFT TO BE EXAMINED
1493 E1                 POP    H          ;POINT TO PPIDB
1494 011000             LXI    B,10H      ;POINT TO NEXT CTIME
1497 09                 DAD    B          ;  IN PPIDB
1498 3D                 DCR    A          ;DO FOR ALL
1499 F24514             JP     NWTRE      ;  TREES
                ;
                ;IF FSQ0 NOT= 0 & TREE EMPTY FOR SOME TIME THEN COLD START
                ;  (A WAIT LOOP COUNT NNTR0 IS USED RATHER THAN THE RTC
                ;  SO THAT THE LARGER THE SYSTEM, THE LONGER THE WAIT)
                ;
149C 2AAC42             LHLD   FSQ0       ;L=FSQ0, H=NTRE0
149F 2D                 DCR    L          ;IF FSQ0 SET, I.E.,
14A0 FA0D14             JM     RXEC1      ;  FREE STORAGE OUT
14A3 24                 INR    H          ;IF ALL TREES
14A4 C2B914             JNZ    ENNTR      ;  EMPTY
14A7 2AAE42             LHLD   NNTR0      ;WAIT UNTIL
14AA 2B                 DCX    H          ;  ALL TREES
14AB 22AE42             SHLD   NNTR0      ;  HAVE BEEN
14AE 7D                 MOV    A,L        ;  EMPTY FOR
14AF B4                 ORA    H          ;  SOME
14B0 C20D14             JNZ    RXEC1      ;  TIME
                ;
14B3 CD6609             CALL   COLDS      ;COLD START & RESTART
14B6 C30014             JMP    REXEC      ;  RUNNING MODE
                ;
14B9 210020     ENNTR:  LXI    H,2000H    ;IF ANY TREE NONEMPTY THEN
14BC 22AE42             SHLD   NNTR0      ;  INITIALIZE WAIT COUNT
14BF C30D14             JMP    RXEC1      ;DO EXEC FOREVER
                ; INTERCOMPUTE(I/C) RUNNING MODE EXECUTIVE
                ;
                ; INPUT: INTERRUPTS DISABLED, MODE DATA, COLD-START DATA
                ;        ALL REGISTERS AND MEMORY AFFECTED
                ;
                ;
14C2 CDAC1A     ICEXC:  CALL   RINI       ;INI FOR I/C RUNNING MODE
                ;
                ;CLEAR KB'S AND ENABLE INTERRUPTS
14C5 FB                 EI                ;ENABLE INTERRUPTS
14C6 CDB80C             CALL   CLAKB      ;CLEAR ALL KB'S
14C9 C3CF14             JMP    ICEX1      ;ENTER MAIN LOOP
                ;
                ;PROCESS EVERYTHING IN PSCBF
                ;
14CC CD2F1B     IPHPC:  CALL   PHPC       ;PROCESS ALL PHOTOS
```

```
        14CF CD6510  ICEX1:  CALL  GETPH    ;GET B=DEVIC,
        14D2 C2CC14          JNZ   IPHPC    ;   C=INDEX
                     ;
                     ;FLASH WATCH-DOG LIGHT
                     ;
        14D5 CD760F          CALL  FLASH    ;FLASH PSC-ON LIGHT
                     ;
                     ;IF FREE STORAGE RUNNOUT,LOCKOUT KB INPUTS BUT PROCESS DAS MESSAGES
                     ;L AND I (ACCEPT BUT DON'T PROCESS D). THIS WILL ALLOW SYSTEM TO CLEAR
                     ;PACKAGES CURRENTLY IN SYSTEM WITHOUT ACCEPTING NEW PACKAGES WHILE FS
                     ;IS OUT. AFTER A 'SUFFICIENT' TIME, THE PSCWILL COLDSTART(WARMSTART)
                     ;ITSELF WHEN ALL THE MESSAGES IN FS HAVE BEEN SENT TO DAS.
                     ;
                     ;IF FS IS OUT THEN LOCK OUT INDUCTS
                     ;
        14D8 3AAC42          LDA   FSQ0     ;TEST FOR FS RUNOUT
        14DB 3D              DCR   A
        14DC FAF814          JM    IKBPC    ;JMP IF NO FS RUNOUT
        14DF CAFE14          JZ    FLBCK    ;JMP IF FS RUNOUT IN PROGRESS(IGNORE KB)
        14E2 32AC42          STA   FSQ0     ;FS RUNOUT 1ST PASS LOOP
        14E5 3A033D          LDA   NINDU    ;C= INDUCT # = NINDU INITIALLY
        14E8 4F              MOV   C,A
        14E9 CD1422  IMCID:  CALL  MCLPC    ;MASTER CLEAR INDUCT
        14EC 3E0F            MVI   A,15     ;ERROR
        14EE CD130F          CALL  ERRPC    ;  15
        14F1 0D              DCR   C        ;DO UNTIL ALL
        14F2 C2E914          JNZ   IMCID    ;   CLEARED
        14F5 C3FE14          JMP   FLBCK    ;IGNORE KB INPUTS
                     ;
                     ; PROCESS A CHAR IN KBIBF
                     ;
        14F8 CD0E10  IKBPC:  CALL  GETKB    ;A=INPUT CHAR,C=KB#,
                                            ;  KBDBP=HL POINTS TO KBDB BYTE 4
        14FB C4501B          CNZ   KBPC     ;PROCESS ANY KB INPUT CHAR(WILL ONLY
                                            ;PROCESS A 'CLEAR' FOR DAS SYSTEM)
                     ;
                     ;CHECK TO SEE IF A 16 BYTE MESSAGE FROM DAS HAS ARRIVED(IS MESSAGE INPUT
                     ;BUFFER FULL?)
                     ;
        14FE 3A5243  FLBCK:  LDA   FULBF
        1501 D601            SUI   01H
        1503 CA4A15          JZ    CDSCK    ;JMP IF MESSAGE RECEIVED FROM DAS
                     ;CHECK FOR MESSAGE TIMEOUT(TIMEOUT IF 1ST BYTE OF MESSAGE WAS RECEIVED
                     ;MORE THAN TDLTM AGO)
        1506 3A5B43          LDA   TMOUT    ;A=TMOUT
        1509 47              MOV   B,A      ;B=TMOUT
        150A 3EFF            MVI   A,0FFH   ;A=FF
        150C B8              CMP   B        ;COMPARE TMOUT LSB TO FF
        150D CA1315          JZ    TMCAL    ;CHECK FURTHER
        1510 C31D15          JMP   CALTM    ;1ST BYTE OF MESSAGE HAS BEEN SENT
        1513 3E7F    TMCAL:  MVI   A,7FH    ;A=7F
        1515 47              MOV   B,A      ;B=7F
        1516 3A5C43          LDA   TMOUT+1  ;A=TMOUT+1
        1519 B8              CMP   B        ;COMPARE TMOUT MSB TO 7F
        151A CA6A15          JZ    IEVNT    ;BYPASS TIMEOUT CALC IF 1ST BYTE OF
                                            ;MESSAGE HASN'T BEEN SENT YET(AS TMOUT=7FFF YET)
        151D 2A4542  CALTM:  LHLD  PPIDB    ;H,L=LOC OF RTC CTIME LSB
        1520 5E              MOV   E,M      ;E=CTIME LSB
        1521 23              INX   H        ;H,L=CTIME MSG
        1522 56              MOV   D,M      ;D,E=CTIME
        1523 2A5B43          LHLD  TMOUT    ;H,L=TMOUT
        1526 7B              MOV   A,E      ;A=CTIME LSB
        1527 95              SUB   L        ;SUB TMOUT LSB(ALSO SETS BORROW FLAG)
        1528 4F              MOV   C,A      ;C=LSB SUBTRACTION
        1529 7A              MOV   A,D      ;D=CTIME MSG
        152A 9C              SBB   H        ;SUB(TMOUT MSG+BORROW FLAG SETTING)
        152B 47              MOV   B,A      ;BIC NOW CONTAINS CTIME-TMOUT
        152C 2A2C42          LHLD  TDLTM    ;H,L=TDLTM VALUE
        152F 79              MOV   A,C      ;A=LSB OF CTIME-TMOUT
        1530 95              SUB   L        ;A=LSB SUBTRACTION (CTIME-TMOUT(-TDLTM
        1531 78              MOV   A,B      ;A=MSB
        1532 9C              SBB   H        ;A=MSB SUBTRACTION (WITH BORROW FLAG)
        1533 F23915          JP    MTMOT    ;JMP IF (CTIME-TMOUT)=> TDLTM
        1536 C36A15          JMP   IEVNT    ;JMP IF NO TIMEOUT
                     ;MESSAGE TIMEOUT. RESET MESSAGE INPUT POINTER DASDB, INCREMENT COUNTER
                     ;CTOUT FOR DEBUGGING PURPOSES
        1539 212843  MTMOT:  LXI   H,DASDB  ;DASIP= DASDB LOC
        153C 224B43          SHLD  DASIP
        153F 3A4A43          LDA   CTOUT    ;A=CTOUT
        1542 C601            ADI   1        ;CTOUT=CTOUT+1
        1544 324A43          STA   CTOUT
        1547 C36A15          JMP   IEVNT    ;JMP TO IEVNT
                     ;
                     ; CHECK MESSAGE FOR GOOD SEQ BYTE AND CHECKSUM
                     ;
        154A 3E00    CDSCK:  MVI   A,0      ;A=0
        154C 325243          STA   FULBF            ;RESET FULBF=0
        154F CDFF15          CALL  DSCHK    ;CHECK SEQ BYTE AND CHECKSUM
```

```
0923   1552 3A5143              LDA    FMBAD    ;MESSAGE GOOD ?
0924   1555 D600                SUI    00H
0925   1557 CA6715              JZ     CDDEC    ;JMP IF MESSAGE IS GOOD
0926                      ;
0927                      ; MESSAGE SEQ BYTE OR CHECKSUM NO GOOD. SEND DAS LAST PSC MESSAGE(WITH
0928                      ; UNTOGGLED SEQ BYTE).
0929   155A 3E00                MVI    A,00         ;A= 0
0930   155C 325143              STA    FMBAD        ;RESET FMBAD
0931   155F 3EFF                MVI    A,0FFH       ;A=FFH
0932   1561 CD7719              CALL   DSOUT        ;RESEND TO DAS THE LAST PSC MESSAGE
0933   1564 C36A15              JMP    IEVNT        ;JMP TO IEVNT
0934                      ;
0935                      ; MESSAGE SEQ BYTE AND CHECKSUM IS GOOD. PROCESS THE MESSAGE AND SEND
0936                      ; REPLY
0937                      ;
0938   1567 CD8116       CDDEC:  CALL  DSDEC
0939                      ;
0940                      ; PROCESS EVENTS DUE OR OVERDUE IN ALL AVL TREES
0941                      ;     TREE # 0 IS FOR RTC, TREES #1 TO NPPI ARE FOR PPI'S
0942                      ;     (BEWARE OF CRITICAL SECTIONS);
0943                      ;     RTC IS USED FOR LOW PRIORITY DELAYED TASKS
0944                      ;
0945   156A 3A023D       IEVNT: LDA    NPPI     ;A=# PPI'S = #TREES-1
0946   156D 32AD42              STA    NTRE0    ;COUNT DOWN # EMPTY TREES
0947   1570 2A4542              LHLD   PPIDB    ;POINT TO CTIME IN PPIDB
0948   1573 22D842       INWTR: SHLD   PPIDP    ;SAVE PPIDB POINTER
0949   1576 E5                  PUSH   H        ;SAVE AGAIN(GTREP MAY CHANGE PPIDP)
0950   1577 F5                  PUSH   PSW      ;SAVE TREE COUNT
0951   1578 11B642              LXI    D,CTIME  ;D,E POINTS TO CTIME
0952   157B 0610                MVI    B,10H    ;GET TREE
0953   157D F3                  DI              ;    PARAMETERS.
0954   157E CDCF10              CALL   MOVEB    ;    (CRITICAL SECTION WITH
0955   1581 FB                  EI              ;     RTCIN AND PPIIN)
0956   1582 2ABA42              LHLD   RLINK    ;IF THE TREE
0957   1585 7D                  MOV    A,L      ;   IS NOT
0958   1586 B4                  ORA    H        ;   EMPTY
0959   1587 CABC15              JZ     ITREE
0960   158A 2ABD42              LHLD   NXTIM    ;H,L=NXTIM
0961   158D 3AB642              LDA    CTIME    ;IF CTIME-NXTIME>=0,
0962   1590 95                  SUB    L        ;  I.E.,
0963   1591 3AB742              LDA    CTIME+1  ;  IF EVENT
0964   1594 9C                  SBB    H        ;IS OVERDUE
0965   1595 FAC015              JM     INXTR    ;OR DUE
0966                      ;
0967                      ; REMOVE EVENT FROM TREE AND EXECUTE IT
0968                      ;
0969   1598 CDAE27              CALL   DEQUE    ;H;L POINTS TO EVENT TCR
0970   159B 22B442              SHLD   TCBP     ;TCBP POINTS TO TCB
0971   159E 2AD842              LHLD   PPIDP    ;POINT DIE TO
0972   15A1 EB                  XCHG            ;   TREE HEADER IN PPIDB
0973   15A2 13                  INX    D        ;POINT TO TREE PARAMETERS
0974   15A3 13                  INX    D        ;   IN PPIDB
0975   15A4 21B842              LXI    H,HEAD   ;POINT H,L TO CTIME
0976   15A7 060E                MVI    B,14     ;UPDATE
0977   15A9 CDCF10              CALL   MOVEB    ;    PPIDB
0978   15AC 21C015              LXI    H,INXTR  ;SIMULATE A SUBROUTINE
0979   15AF E5                  PUSH   H        ;   RETURN ADDRESS INXTR
0980   15B0 2AB442              LHLD   TCBP     ;POINT H,L TO
0981   15B3 110700              LXI    D,7      ;   BYTE 7
0982   15B6 19                  DAD    D        ;   IN TCB
0983   15B7 5E                  MOV    E,M      ;POINT
0984   15B8 23                  INX    H        ;   DIE TO
0985   15B9 56                  MOV    D,M      ;EVENT
0986   15BA EB                  XCHG            ;H,L=ENTRY,D,E POINTS TO
0987                                            ;   BYTE 8 OF TCB
0988   15BB E9                  PCHL            ;XQ EVENT WITH SIMULATED CALL
0989                      ;
0990                      ; EXAMINE NEXT EVENT TREE
0991                      ;
0992   15BC 21AD42       ITREE: LXI    H,NTRE0  ;COUNT DOWN
0993   15BF 35                  DCR    M        ;   # EMPTY TREES
0994   15C0 F1           INXTR: POP    PSW      ;A= #TREES LEFT TO BE EXAMINED
0995   15C1 E1                  POP    H        ;POIN TO PPIDB
0996   15C2 011000              LXI    B,10H    ;POINT TO NEXT CTIME
0997   15C5 09                  DAD    B        ;   IN PPIDB
0998   15C6 3D                  DCR    A        ;DO FOR ALL
0999   15C7 F27315              JP     INWTR    ;   TREES
1000                      ;
1001                      ; TEST TO SEE IF FS IS OUT. IF IT IS, COLDSTART(WARMSTART) AFTER A DELAY
1002                      ; AND MESSAGES IN FS ARE SENT TO DAS(A WAIT LOOP COUNT NNTR0 IS USED
1003                      ; RATHER THAN THE RTC SO THAT THE LARGER THE SYSTEM, THE LONGER THE WAIT
1004                      ;
1005   15CA 2AAC42              LHLD   FSQ0     ;L=FSQ0,H=NTRE0
1006   15CD 2D                  DCR    L        ;IF FSQ0 SET,I.E.
1007   15CE FACF14              JM     ICEX1    ;   FREE STORAGE OUT
1008   15D1 24                  INR    H        ;IF ALL TREES
1009   15D2 C2F615              JNZ    IENNT    ;   EMPTY
```

```
15D5 2AAE42          LHLD  NNTR0     ;WAIT UNTIL
15D8 2B              DCX   H         ;   ALL TREES
15D9 22AE42          SHLD  NNTR0     ;   HAVE BEEN
15DC 7D              MOV   A,L       ;   EMPTY FOR
15DD B4              ORA   H         ;   SOME
15DE C2CF14          JNZ   ICEX1     ;   TIME
              ; SEE IF MESSAGES IN FS ARE ALL SENT TO DAS
15E1 2AAE42          LHLD  NNTR0      ;SET NNTR0= 1 AGAIN
15E4 23              INX   H
15E5 22AE42          SHLD  NNTR0
15E8 2A5443          LHLD  LMP       ;H,L=LMP VALUE
15EB 7D              MOV   A,L       ;A=L
15EC B4              ORA   H
15ED C2CF14          JNZ   ICEX1     ;JMP IF LMP2 NOT EQUAL ZERO,INDICATING
                                     ;MESSAGES STILL IN FS
15F0 CD6609          CALL  COLDS     ;COLDSTART(WARMSTART) AND RESTART
15F3 C3C214          JMP   ICEXC     ;I/C RUN MODE
15F6 210020   IENNT: LXI   H,2000H   ;IF ANY TREE NONEMPTY THEN
15F9 22AE42          SHLD  NNTR0     ;   INITIALIZE WAIT COUNT
15FC C3CF14          JMP   ICEX1     ;DO EXEC FOREVER
              ;I/C SUBROUTINE DSCHK
              ;
              ;CHECKS DAS MESSAGES FOR CORRECT SEQ BYTE AND CHECKSUM. IF SEQ BYTE
              ;OR CHECKSUM IS INVALID, DON'T TOGGLE SEQ BYTE AND RETURN TO ICEXC. IF
              ;VALID, TOGGLE SEQ BYTE AND RETURN TO ICEXC.
              ;
              ;INPUTS: DAS MESSAGE RESIDES IN BUFFER DASDB(16 BYTES)
              ;
              ;PROCESS:SEE ABOVE
              ;
              ;OUTPUTS:IF MESSAGE IS GOOD, TOGGLE RS,LMR AND SET FMBAD=0 AND RETURN
              ;        TO ICEXC. IF MESSAGE IS BAD, DON'T TOGGLE LMR,RS, SET FMBAD=1
              ;        AND RETURN TO ICEXC. ALSO SET COUNTERS FOR DEBUGGING IF SEQ
              ;        BYTE NOT A '5' OR 'J' OR IF CHECKSUM NO GOOD.
              ;TEST TO SEE IF IT'S MESSAGE L
              ;
15FF 212843   DSCHK: LXI   H,DASDB   ;H,L= MESSAGE BYTE 0 LOC
1602 23              INX   H         ;H,L= MESSAGE BYTE 1 LOC
1603 46              MOV   B,M       ;B= MESSAGE IDENTIFIER
1604 3E4C            MVI   A,'L'     ;A= ASCII L
1606 B8              CMP   B         ;COMPARE
1607 C21316          JNZ   NOL       ;JMP IF NOT MESSAGE L
              ;ITS MESSAGE L. TEST IF 1ST MESSAGE L
160A 3A5043   YESL:  LDA   FLINK     ;A= FLAG INDICATING L COUNT
160D D600            SUI   0         ;
160F CA1C16          JZ    CDSCH     ;JMP IF THIS IS THE 1ST L MESSAGE
              ;ITS 2ND OR MORE MESSAGE L. THEREFORE IGNORE IT AND DO NOTHING SO
              ;THAT DAS TIMES OUT. THE PSC LINK CAN ONLY BE OPENED AGAIN WHEN THE
              ;HOST SWITCH IS OPERATED FOLLOWED BY A MESSAGE L FROM DAS
1612 C9              RET             ;RET TO ICEXC AND TAKE MULTIPLE L PATH IN DSDEC
              ;
              ;ITS NOT MESSAGE L. TEST TO SEE IF L HAS BEEN SENT YET
              ;
1613 3A5043   NOL:   LDA   FLINK     ;A=L COUNT
1616 D600            SUI   0         ;
1618 C21C16          JNZ   CDSCH     ;JMP IF L HAS BEEN SENT AT LEAST ONCE ALREADY
              ;MESSAGE L HAS NOT YET BEEN SENT. THEREFORE DO NOTHING
161B C9              RET             ;RET TO ICEXC AND TAKE 'DO NOTHING' PATH IN
              ;                      ;DSDEC
              ;TEST IF SEQ BYTE= COMPLEMENT OF LMR
161C 3A2A42   CDSCH: LDA   LMR       ;A= LMR
161F 2F              CMA             ;A=COMPLEMENT OF LMR
1620 E67F            ANI   7FH       ;MASK OFF BIT 7 FOR SAFETY
1622 47              MOV   B,A       ;B= COMPL OF LMR
1623 212843          LXI   H,DASDB   ;H,L=DASDB LOC
1626 7E              MOV   A,M       ;A= SEQ BYTE
1627 90              SUB   B         ;A=0 IF SEQ BYTE=COMPLEMENT OF LMR
1628 CA5816          JZ    YSEQ      ;JMP IF SEQ GOOD
              ;SEQUENCE NO GOOD.CHECK TO SEE IF ITS A '5' OR 'J'
162B 212843          LXI   H,DASDB   ;H,L=POINT TO SEQ BYTE
162E 46              MOV   B,M       ;B=SEQ BYTE
162F 3E35            MVI   A,'5'     ;A= ASCII 5
1631 90              SUB   B
1632 CA3F16          JZ    NMESG     ;JMP IF SEQ IS A '5'
1635 3E4A            MVI   A,'J'     ;A= ASCII J
1637 90              SUB   B
1638 CA3F16          JZ    NMESG     ;JMP IF SEQ IS A 'J'
              ; BUMP COUNTER TO INDICATE SEQ NEITHER A '5' NOR A 'J'
163B 214843          LXI   H,CSEQ    ;CSEQ=CSEQ+1
163E 34              INR   M
              ;
              ;MESSAGE SEQ OR CHECKSUM NO GOOD. LEAVE LMR,RS UNCHANGED, SET FMBAD=1
              ;AND RETURN TO ICEXC
163F 3E01     NMESG: MVI   A,01H     ;SET FMBAD=1
1641 325143          STA   FMBAD
1644 212843          LXI   H,DASDB   ;H,L=MESSAGE BYTE 0 LOC
1647 23              INX   H         ;H,L=BYTE 1 LOC
1648 46              MOV   B,M       ;B=MESSAGE IDENTIFIER
```

```
1649 3E4C           MVI   A,'L'     ;A=ASCII L
164B B8             CMP   B         ;COMPARE
164C C0             RNZ             ;RET IF NO MESSAGE L (TO ICEXC)WITH FMBAD=1
164D 3E00           MVI   A,0       ;SET FMBAD=0 FOR USE ON RETURN TO ICEXC
164F 325143         STA   FMBAD     ;SO THAT DSDEC WILL BE CALLED
1652 3EFF           MVI   A,-1      ;SET FLINK=-1 SO THAT WHEN DSDEC IS CALLED
1654 325043         STA   FLINK     ;ON RETURN TO ICEXC, THE MULTIPLE L PATH
1657 C9             RET             ;WILL BE TAKEN SO DAS TIMES OUT AND FUTURE
                                            ;L WILL BE TREATED AS 1ST L.
                    ;
                    ;SEQ OK. CHECK FOR CORRECT CHECKSUM
1658 212843  YSEQ:  LXI   H,DASDB   ;H,L=DASDB LOC
165B CD211A         CALL  CHKSM     ;GET PRINTABLE ASCII CHECKSUM IN REG A
165E 212843         LXI   H,DASDB   ;H,L=DASDB BYTE 0 LOC
1661 110D00         LXI   D,13
1664 19             DAD   D         ;H,L=CHECKSUM BYTE 13 LOC
1665 46             MOV   B,M       ;B=CHECKSUM FROM DAS
1666 B8             CMP   B         ;COMPARE CALL WITH DAS CHECKSUM
1667 CA7116         JZ    YMESG     ;JMP IF CHECKSUM GOOD
                    ;
                    ;CHECKSUM NO GOOD. DON'T TOGGLE RS,LMR, AND SET FMBAD=1. RET TO ICEXC
                    ;AFTER BUMPING COUNTER CSUM FOR DEBUGGING PURPOSES
166A 214943         LXI   H,CSUM    ;H,L= CSUM LOC
166D 34             INR   M         ;CSUM = CSUM+1
166E C33F16         JMP   NMESG
                    ;
                    ;SEQ BYTE AND CHECKSUM BOTH GOOD. SET FMBAD=0, TOGGLE LMR,RS AND RETURN
1671 212843  YMESG: LXI   H,DASDB   ;H,L= SEQ BYTE LOC
1674 7E             MOV   A,M       ;A=SEQ BYTE
1675 322A42         STA   LMR       ;LMR= SEQ BYTE JUST RECEIVED FROM DAS
1678 322942         STA   RS        ;RS= SAME
167B 3E00           MVI   A,0
167D 325143         STA   FMBAD     ;FMBAD=0
1680 C9             RET             ;RET TO ICEXC
                    ;       SUBROUTINE DSDEC
                    ;
                    ;  THIS SUBROUTINE DECODES THE VALID(SEQ BYTE AND CHECKSUM ARE OK) DAS
                    ;  MESSAGES AND PROCESSES THEM IF THEY ARE MASKED FOR PROCESSING.
                    ;
                    ;  INPUTS: DAS MESSAGE RESIDING IN BUFFER DASDB(16 BYTES)
                    ;
                    ;  PROCESS: NO MESSAGES ARE PROCESSED UNTIL MESSAGE L IS RECEIVED. WHEN
                    ;           MESSAGE L IS RECEIVED FOR THE 1ST TIME, DSOUT IS CALLED TO
                    ;           SEND DAS THE 1ST MESSAGE WAITING IN FS TO BE SENT TO DAS IF
                    ;           THE MESSAGE IN MOBUF IS NUMBER 8 OR 9(LAST MESSAGE SENT TO
                    ;           DAS IS MESSAGE 8 OR 9). IF THE LAST MESSAGE SENT TO DAS WAS
                    ;           NOT 8 OR 9, THEN THE MESSAGE IN MOBUF WILL BE RESENT TO DAS
                    ;           WHEN MESSAGE L IS RECEIVED FOR THE 1ST TIME.MULTIPLE MESSAGE
                    ;           L'S WILL CAUSE DAS TO TIMEOUT(NO PSC REPLY WILL BE SENT) AND
                    ;           A FLAG FLINK INCREMENTED FOR DEBUGGING PURPOSES.IF MESSAGE
                    ;           I IS SENT.DSOUT WILL BE CALLED TO REPLY WITH 1ST WAITING PSC
                    ;           MESSAGE. IF MESSAGE D IS SENT.IT WILL BE PROCESSED BY
                    ;           CALLING DASMD AND THEN A REPLY SENT TO DAS BY CALLING DSOUT.
                    ;           UNINTERPRETABLE MESSAGES WILL CAUSE A MESSAGE 8 REPLY WITH
                    ;           UNTOGGLED SEQ BYTE SO THAT DAS TIMES OUT.
                    ;
                    ;  OUTPUTS: DAS MESSAGE DECODED AND REPLY SENT BACK (BY CALL DSOUT)
                    ;  CHECK FOR MESSAGE L
                    ;
1681 212943  DSDEC: LXI   H,DASDB+1         ;H,L= LOC OF MESSAGE BYTE 1
1684 3E4C           MVI   A,'L'             ;A=ASCII L
1686 96             SUB   M                 ;A=ASCII L - MESSAGE BYTE 1
1687 C2D316         JNZ   LPAST             ;IF NOT L, JMP TO LPAST
                    ;  ITS MESSAGE L
                    ;  IS IT 1ST MESSAGE L?
168A 3A5043         LDA   FLINK             ;A=FLINK
168D A7             ANA   A                 ;SET ZERO FLAG AS PER VALUE OF FLINK
168E CA9616         JZ    LPROS             ;JMP TO LPROS IF FLINK=0
                    ;  MULTIPLE MESSAGE L.
1691 215043  LMULT: LXI   H,FLINK           ;H,L= FLINK LOC IN MEMORY
1694 34             INR   M                 ;FLINK=FLINK+1
1695 C9             RET                     ;RETURN TO ICEXC WITHOUT REPLY TO DAS SO
                    ;                       ;DAS WILL TIMEOUT AND REQUIRE I/C
                    ;                       ;SWITCH TO BE RESET TO RESYNC RS,LMR,ETC
                    ;                       ;DON'T REFRESH I/C LIGHT EITHER
                    ;  1ST TIME MESSAGE L IS SENT
1696 3E01    LPROS: MVI   A,01H             ;A=1
1698 325043         STA   FLINK             ;FLINK=1
169B 3A7542         LDA   ILCHN             ;A=I/C LIGHT CHANNEL
169E 4F             MOV   C,A               ;C=SAME
169F 0601           MVI   B,1               ;B=1 FOR TURN ON
16A1 CD0F11         CALL  OPUT              ;TURN ON I/C LIGHT
16A4 3A2E42         LDA   VICLG             ;A= VICLG
16A7 325343         STA   ICLGT             ;SET I/C LIGHT REFRESH TIMER
16AA 213943         LXI   H,MOBUF+1         ;H,L=LOC OF BYTE 1 OF MOBUF
16AD 3E20           MVI   A,20H             ;A=ASCII SPACE
16AF 96             SUB   M                 ;A= 0 - BYTE 1 OF MOBUF
16B0 CACD16         JZ    CDSOT             ;JMP IF BYTE 1 = 0 (IF NO MESS IN MOBUF)
```

```
16B3 3E38          MVI   A,'8'            ;A=ASCII 8
16B5 96            SUB   M                ;A=ASCII 8 - BYTE 1 OF MOBUF
16B6 CACD16        JZ    CDSOT            ;JMP IF BYTE 1 = 8 (LAST MESSAGE SENT=8)
16B9 3E39          MVI   A,'9'            ;DO SAME FOR MESSAGE 9
16BB 96            SUB   M
16BC CACD16        JZ    CDSOT            ;JMP IF MESSAGE 9 IN MOBUF
                ;
                ;   RESEND MOBUF TO DAS WITH NEW SEQ BYTE
16BF 212843        LXI   H,DASDB          ;
16C2 7E            MOV   A,M              ;A= SEQ BYTE  FROM DAS
16C3 213843        LXI   H,MOBUF
16C6 77            MOV   M,A              ;MOBUF BYTE 0= SEQ BYTE FROM DAS
16C7 3EFF          MVI   A,0FFH           ;A=FF
16C9 CD7719        CALL  DSOUT            ;SEND MOBUF TO DAS
16CC C9            RET                    ;RET TO ICEXC
                ;  SEND DAS 1ST MESSAGE IN FS (DEFAULTS TO IDLE MESSAGE)
16CD 3E00       CDSOT:  MVI   A,00H       ;A=00
16CF CD7719        CALL  DSOUT
16D2 C9            RET                    ;RETURN TO ICEXC
                ;
                ;  NOT MESSAGE L
                ;
                ;  HAS MESSAGE L BEEN SENT YET
16D3 3A5043     LPAST:  LDA   FLINK       ;A=FLINK
16D6 D601          SUI   01H              ;A=FLINK-1
16D8 CADC16        JZ    ITEST            ;JMP TO ITEST IF FLINK=1(L HAS BEEN SENT
16DB C9            RET                    ;DO NOTHING.RETURN TO ICEXC AND WAIT FOR
                ;                         ;MESSAGE L OTHERWISE
                ;  REFRESH I/C LIGHT
16DC 3A2E42     ITEST:  LDA   VICLG       ;A= VICLG
16DF 325343        STA   ICLGT            ;ICLGT=VICLG
                ;  TEST FOR MESSAGE I
16E2 212943        LXI   H,DASDB+1        ;H,L= ADDR OF BYTE 1
16E5 3E49          MVI   A,'I'            ;A= ASCII I
16E7 96            SUB   M                ;A= ASCII I - BYTE 1
16E8 C2FA16        JNZ   DTEST            ;JMP TO DTEST IF NOT MESSAGE I
                ;  ITS MESSAGE I IS I MASKED?
16EB 21253D        LXI   H,ERMKI+3        ;
16EE 7E            MOV   A,M              ;A= BYTE 4 OF ERMKI
16EF E601          ANI   01H              ;LOOK AT MESSAGE I BIT
16F1 CAFA16        JZ    DTEST            ;JMP IF NOT MASKED
16F4 3E00       IPROS:  MVI   A,00H       ;A=00H
16F6 CD7719        CALL  DSOUT            ;CALL DSOUT TO SEND DAS 1ST WAITING
                ;                         ;MESSAGE IN FS.DEFAULT TO I MESSAGE
16F9 C9            RET                    ;RET TO ICEXC
                ;
                ;  TEST FOR MESSAGE D
                ;
16FA 212943     DTEST:  LXI   H,DASDB+1   ;H,L= LOC OF BYTE 1 OF MESSAGE
16FD 3E44          MVI   A,'D'
16FF 96            SUB   M                ;A=ASCII D - BYTE 1
1700 C26517        JNZ   DFALT            ;JMP IF NOT D
                ; ITS MESSAGE D. IS D MASKED?
1703 21243D        LXI   H,ERMKI+2        ;
1706 7E            MOV   A,M              ;A= BYTE 3 OF ERMKI
1707 E608          ANI   08H              ;LOOK AT MESSAGE D BIT
1709 CA6517        JZ    DFALT            ;JMP IF D NOT MASKED
                ;  TEST TO SEE IF FS RUNNOT IS IN PROGRESS
170C 3AAC42        LDA   FSQ0             ;A=FSC0 FLAG
170F A7            ANA   A                ;SET ZERO FLAG ACCORDINGLY
1710 C2F416        JNZ   IPROS            ;JMP IF FS RUNNOUT IS IN PROGRESS
                ;TEST TO SEE LAQ OVERFLOW HAS OCCURRED. IF SO, DON'T PROCESS MESSAGE
                ;D TILL ERROR 6 IS CLEARED OFF KB.
                ;
                ;ACCESS ER FLAG IN KBDB TO SEE IF ERROR 6 (LAQ OVERFLOW) IS ON KB
1713 212843        LXI   H,DASDB   ;H,L= MESSAGE BYTE 0
1716 110800        LXI   D,8       ;
1719 19            DAD   D         ;H,L= INDUCT BYTE 1 LOC
171A 7E            MOV   A,M       ;A= INDUCT MSB
171B 0E0A          MVI   C,10      ;C= WEIGHT OF 10
171D CD8F18        CALL  ASCII     ;CONVERT TO BINARY
1720 5F            MOV   E,A       ;E= CURRENT SUM
1721 23            INX   H         ;H,L= INDUCT BYTE 2 LOC
1722 7E            MOV   A,M       ;A= INDUCT LSB
1723 0E01          MVI   C,1       ;C= WEIGHT OF 1
1725 CD8F18        CALL  ASCII     ;A= BINARY 1'S
1728 83            ADD   E         ;A= BINARY INDUCT # = KB#
1729 CD170D        CALL  CPKBP     ;POINT TO KBI1 IN KBDB FOR KB IN REG A
172C 110400        LXI   D,4       ;
172F 19            DAD   D         ;H,L= ER LOC
1730 7E            MOV   A,M       ;A= ER VALUE
1731 D601          SUI   1         ;SUB 1
1733 C24117        JNZ   THDAS     ;JMP IF NO ERROR ON KB
                ;ER= 1. THEREFORE AN ERROR IS ON THIS KB. ACCESS ERROR CODE(TEMPORARILY
                ;STORED IN SND LOC) TO SEE IF ITS ERROR #6.
1736 23            INX   H         ;
1737 23            INX   H         ;H,L= SND LOC
1738 7E            MOV   A,M       ;A= SND VALUE = ERROR CODE
```

```
1739 D606              SUI   6             ;SUB 6
173B C24117            JNZ   THDAS         ;JMP IF NOT ERROR 6(LAQ OVERFLOW)
                  ;LAQ OVERFLOW HAS OCCURRED ON THIS KB. THEREFORE DON'T PROCESS ANYMORE
                  ;MESSAGE D'S UNTIL KB IS CLEARED(AND LAQ) BY HITTING 'CLEAR' KEY
                  ;ON KB. THIS IS NECESSARY TO INSURE PACKAGES DON'T GET OUT OF SEQUENCE.
173E C3F416            JMP   IPROS         ;JMP TO IPROS
                  ;
                  ;TEST IF IN HALF DAS MODE. IF ARE, DON'T PROSS MESSAGE D.
                  ;
1741 3A0640       THDAS:  LDA   HDSEN         ;A= HALF-DAS FLAG
1744 D601              SUI   1             ;SUB 1
1746 CAF416            JZ    IPROS         ;JMP IF HALF-DAS
                  ;
                  ;PROCESS MESSAGE D
1749 CD9617            CALL  DASMD                 ;PROCESS MESSAGE D
174C 3A4F43            LDA   FLG9                  ;FLG9=1?
174F D601              SUI   01H
1751 CA5A17            JZ    REGA                  ;JMP IF FLG9=1
1754 3E00              MVI   A,0                   ;REG A = 0
1756 CD7719            CALL  DSOUT                 ;CALL DSOUT WITH REGA=0
1759 C9                RET                         ;RET TO ICEXC
175A 3E00         REGA:   MVI   A,0                   ;A=0
175C 324F43            STA   FLG9                  ;FLG9=0
175F 3EFF              MVI   A,0FFH                ;A= FFH
1761 CD7719            CALL  DSOUT                 ;CALL DSOUT WITH REG A=FF
1764 C9                RET                         ;RET TO ICEXC
                  ;  DEFAULT TO MESSAGE 8. DON'T TOGGLE RS,LMR AS WANT LINK TO GO DOWN.
                  ;  SINCE WE HAVE PREVIOUSLY TOGGLED THEM AT YMESG,WE MUST RETOGGLE
                  ;  THEM HERE TO GET BACK TO ORIGINAL DAS STATE.
1765 3A2843       DFALT:  LDA   DASDB                 ;A= SEQ BYTE FROM DAS
1768 2F                CMA                         ;A= COMPLEMENT OF SEQ BYTE
1769 E67F              ANI   7FH                   ;MASK BIT 7
176B 322A42            STA   LMR                   ;SET LMR,RS & SEQ BYTE 0 IN MOBUF = TO
176E 322942            STA   RS                    ;COMPLEMENT OF SEQ BYTE SENT BY DAS AS
1771 323843            STA   MOBUF                 ;DON'T WANT TO TOGGLE SEQ BYTE
1774 212843            LXI   H,DASDB
1777 224B43            SHLD  DASIP
                  ;
                  ; LOAD REST OF MESSAGE 8 INTO MOBUF
177A 212943            LXI   H,DASDB+1             ;H,L= BYTE 1 LOC OF INPUT MESSAGE
177D 113943            LXI   D,MOBUF+1             ;D,E= BYTE 1 LOC OF OUTPUT MESSAGE
1780 010F00            LXI   B,15                  ;B,C= 15 BYTES TO MOVE
1783 CDC410            CALL  MOVE                  ;MOVE 15 BYTES FROM DASDB TO MOBUF
1786 3E38              MVI   A,'8'                 ;A=ASCII 8
1788 323943            STA   MOBUF+1               ;STORE IN MOBUF
178B 3E08              MVI   A,8                   ;SEND ERROR 8 TO MASTER
178D CD080F            CALL  ERPC                  ;
1790 3EFF              MVI   A,0FFH                ;A=FFFF
1792 CD7719            CALL  DSOUT                 ;SEND MOBUF TO DAS
1795 C9                RET                         ;RET TO ICEXC
                  ; SUBROUTINE DASMD
                  ;
                  ; INPUTS: MESSAGE D RESIDING IN DASDB
                  ;
                  ; PROCESS: PUT PACKAGE IDENT AND DVT INTO LAQ. OTHER FUNCTIONS SIMILAR
                  ;          TO SNDPC
                  ;
                  ; OUTPUTS: SIMILAR TO SNDPC SUBROUTINE
                  ;
                  ; CONVERT ASCII DVT # AND INDUCT # IN MESSAGE D TO BINARY AND PUT ON
                  ; STACK FOR FUTURE USE
                  ;
1796 212843       DASMD:  LXI   H,DASDB               ;H,L= LOC MESSAGE D BYTE 0
1799 110A00            LXI   D,10
179C 19                DAD   D                     ;H,L= LOC OF DVT BYTE 1
179D 7E                MOV   A,M                   ;A= DVT BYTE 1 (100'S DIGIT)
179E 0E64              MVI   C,100                 ;C= WEIGHT OF 100
17A0 CD8F18            CALL  ASCII                 ;CONVERT TO BINARY
17A3 5F                MOV   E,A                   ;E= CURRENT SUM
17A4 23                INX   H                     ;H,L= DVT BYTE 2 (10'S DIGIT) LOC
17A5 7E                MOV   A,M                   ;A= 10'S DIGIT
17A6 0E0A              MVI   C,10                  ;C= WEIGHT OF 10
17A8 CD8F18            CALL  ASCII                 ;A= BINARY EQUIVALENT
17AB 83                ADD   E                     ;ADD 100'S
17AC 5F                MOV   E,A                   ;E= 100'S + 10'S
17AD 23                INX   H                     ;H,L= DVT BYTE 3 (1'S DIGIT) LOC
17AE 7E                MOV   A,M                   ;A= 1'S DIGIT
17AF 0E01              MVI   C,1                   ;C= WEIGHT OF 1
17B1 CD8F18            CALL  ASCII                 ;A= BINARY 1'S
17B4 83                ADD   E                     ;A= BINARY DIVERT #
17B5 47                MOV   B,A                   ;B= SAME
17B6 C5                PUSH  B                     ;STACK = SAME
17B7 212843            LXI   H,DASDB               ;H,L= LOC OF MESSAGE D
17BA 110800            LXI   D,8
17BD 19                DAD   D                     ;H,L= INDUCT BYTE 1 LOC
17BE 7E                MOV   A,M                   ;A= INDUCT BYTE 1 LOC (10'S DIGIT)
17BF 0E0A              MVI   C,10                  ;C= WEIGHT OF 10
17C1 CD8F18            CALL  ASCII                 ;CONVERT TO BINARY
```

```
17C4 5F                 MOV   E,A           ;E=CURRENT SUM
17C5 23                 INX   H             ;H,L= INDUCT BYTE 2 LOC (1'S DIGIT)
17C6 7E                 MOV   A,M           ;A= 1'S DIGIT
17C7 0E01               MVI   C,1           ;C= WEIGHT OF 1
17C9 CD8F18             CALL  ASCII         ;A= BINARY 1'S
17CC 83                 ADD   E             ;A= BINARY INDUCT #
17CD C1                 POP   B             ;B= JDV IN BINARY
17CE 4F                 MOV   C,A           ;C= JINDU IN BINARY
17CF C5                 PUSH  B             ;STACK= JDV,JINDU IN BINARY
                ;
                ; CHECK FOR LEGAL INDUCT # (>0 AND < NINDU)
17D0 79                 MOV   A,C           ;A= INDUCT #
17D1 D600               SUI   0
17D3 CA1E18             JZ    SNDM9         ;JMP IF IND = 0
17D6 3A033D             LDA   NINDU         ;A=NINDU
17D9 91                 SUB   C             ;A=NINDU-JINDU
17DA FA1E18             JM    SNDM9         ;JMP IF JINDU> NINDU (# OF INDUCTS)
                ;
                ; INDUCT IS LEGAL. CHECK FOR LEGAL PACK CODE (EACH BYTE A NUMBER)
17DD 0630               MVI   B,30H         ;B= ASCII 0
17DF 0E39               MVI   C,39H         ;C= ASCII 9
17E1 212A43             LXI   H,DASDB+2     ;H,L= PACKAGE CODE BYTE 1
17E4 1606               MVI   D,6           ;D=LOOP COUNTER
17E6 79         LEGPC:  MOV   A,C           ;A= UPPER LIMIT ASCII 9
17E7 96                 SUB   M             ;A= ASCII 9 - BYTE
17E8 FA1E18             JM    SNDM9         ;JMP IF BYTE > 9
17EB 7E                 MOV   A,M           ;A= PACK CODE BYTE
17EC 90                 SUB   B             ;A-BYTE - ASCII 0
17ED FA1E18             JM    SNDM9         ;JMP IF BYTE < 0
17F0 23                 INX   H             ;GO TO NEXT BYTE
17F1 15                 DCR   D             ;DEC COUNTER
17F2 C2E617             JNZ   LEGPC         ;DO FOR ALL 6 BYTES
                ; LEGAL PACKAGE CODE. CHECK FOR LEGAL DV # (>0 AND <NDVT)
17F5 C1                 POP   B             ;B,C= JDV,JINDU
17F6 C5                 PUSH  B             ;STACK=SAME
17F7 78                 MOV   A,B           ;A= JDV
17F8 D600               SUI   00H
17FA CA0A18             JZ    DVEO          ;JMP IF DV#=0
17FD 3A053D             LDA   NDVT          ;A= NDVT
1800 57                 MOV   D,A           ;0= SAME
1801 78                 MOV   A,B           ;A= DV#
1802 3D                 DCR   A             ;BIAS FOR 'JP' INSTRUCTION
1803 92                 SUB   D             ;A= DV#-NDVT
1804 F20A18             JP    DVEO          ;JMP IF DV#>NDVT
1807 C34A18             JMP   INHIB         ;LEGAL DV#.JMP TO INHIB
                ; DV # IS ILLEGAL. CHECK IF ZERO OR NON-ZERO
                ;
180A 78         DVEO:   MOV   A,B           ;A= BINARY DV #
180B D600               SUI   00H
180D C21E18             JNZ   SNDM9         ;JMP IF DV # > 0
                ; DV# IS 0. DEFAULT JDV TO SERDV. SET FDV FOR USE IN DPLAQ
1810 3A3A3D             LDA   SERDV
1813 329642             STA   JDV           ;JDV=SERDV
1816 3E01               MVI   A,01H
1818 324E43             STA   FDV           ;FDV=1
181B C34A18             JMP   INHIB
                ; SEND MESSAGE 9 TO DAS WITH SEQUENCE BYTE UNTOGGLED SO DAS TIMESOUT
181E 3A2843     SNDM9:  LDA   DASDB         ;A= SEQ BYTE RECEIVED FROM DAS
1821 2F                 CMA                 ;A= COMPLEMENT OF SEQ BYTE FROM DAS
1822 E67F               ANI   7FH           ;MASK BIT 7
1824 322A42             STA   LMR           ;SET LMF,RS AND SEQ BYTE IN MOBUF
1827 322942             STA   RS            ;EQUAL TO ORIGINAL STATE (UNTOGGLED)
182A 323843             STA   MOBUF
                ; ECHO INPUT MESSAGE BY LOADING INTO MOBUF AND SENDING TO DAS BY
                ; CALL DSOUT WITH REG A = FFH
182D 212943             LXI   H,DASDB+1     ;H,L= BYTE 1 OF DASDB
1830 113943             LXI   D,MOBUF+1     ;D,E= BYTE 1 OF MOBUF
1833 010F00             LXI   B,15          ;B= 15 BYTES TO MOVE
1836 CDC410             CALL  MOVE          ;MOVE 15 BYTES FROM DASDB TO MOBUF
1839 3E39               MVI   A,'9'         ;A= ASCII 9
183B 323943             STA   MOBUF+1       ;MOBUF BYTE 1 = MESSAGE 9
183E 3E09               MVI   A,09H         ;A=09H
1840 CD080F             CALL  ERPC          ;PUT ERROR 9 ON KB
1843 3E01               MVI   A,01H         ;FLG9=1 SO WHEN DSOUT IS CALLED ON RET
1845 324F43             STA   FLG9          ;TODSDEC MOBUF WILL BE SENT TO DAS
1848 C1                 POP   B             ;ADJUST STACK
1849 C9                 RET                 ;RET TO DSDEC
                ;
                ; CHECK FOR LANE FULL KB INHIBIT DESIRED
184A C1         INHIB:  POP   B             ;B,C=JDV, JINDU
184B 3A3C3D             LDA   LFO           ;CHECK TO SEE IF LANE-FULL KB INHIBIT
184E E601               ANI   01H           ;   IS DESIRED
1850 CA7018             JZ    CDPLQ         ;JMP IF NOT DESIRED
                ;
                ; GET LANE FULL MASK
1853 78                 MOV   A,B           ;A=JDV
1854 C5                 PUSH  B             ;STACK= JDV, JINDU
```

```
1855 CD250D           CALL   CPLFM           ;CP LF MASK IN A, H,L=MASK POINTER
1858 C1               POP    B               ;B,C= JDV, JINDU
1859 A6               ANA    M               ;IF LANE FULL JMP TO CALL 7
185A C26018           JNZ    CALL7           ;IF NOT FULL JMP TO CDPLQ
185D C37018           JMP    CDPLQ
1860 3E07    CALL7:   MVI    A,7             ;LANE FULL, PUT ERROR 7 ON KB. IF AUTO
1862 CD130F           CALL   ERRPC           ;REINDUCT AFTER LANE CLEARS IS DESIRED,
1865 3A3C3D           LDA    LFO             ;SET AUTO REINDUCT FLAG ER=10
1868 E610             ANI    10H
186A C8               RZ                     ;RET TO DSDEC IF NO AUTO REINDUCT
186B 2ADA42           LHLD   KBDBP
186E 77               MOV    M,A             ;SET ER=10
186F C9               RET                    ;RET TO DSDEC
             ;
             ; LOAD LAQ WITH JDV AND IDENT(IDENT= LOC IN TRANSACTION TABLE OF
             ; PACKAGE CODE) AND ATTEMPT TO SEND PACKAGE
1870 C5      CDPLQ:   PUSH   B               ;STACK= JDV, JINDU
1871 CD9D18           CALL   DPLAQ           ;LOAD LAW WITH JDV,IDENT
1874 C1               POP    B               ;B,C= JDV,JINDU
1875 CA0B22           JZ     SLAQF           ;IF LAQ FULL,SEND ERROR 6 TO KB
1878 2AEB42           LHLD   PPDBP           ;POINT H,L TO BYTE 1 IN PPDB
187B 7E               MOV    A,M             ;A=PWING
187C 3D               DCR    A               ;IF PACKAGE AT PP
187D C28618           JNZ    CRBSO           ;    WAITING TO BE CODED
             ;
             ; SEND OUT WAITING PACKAGE IF NO MERGE CONFLICT
1880 C5               PUSH   B               ;STACK= JDV,JINDU
1881 23               INX    H               ;H,L= BYTE 2 OF PPDB
1882 CD7022           CALL   PSEQR           ;QUEUE PACKAGE UP FOR RELEASE
1885 C1               POP    B               ;B,C= JDV,JINDU
             ;
             ; CONSIDER REPEAT-BY-SEND OPTION
1886 3A323D  CRBSO:   LDA    SENDO           ;IF REPEAT NOT DESIRED
1889 E620             ANI    20H             ;    THEN CLEAR
188B CCC90C           CZ     CLRKB           ;    KB AND KBDB
188E C9               RET                    ;RET TO DSDEC
             ; SUBROUTINE ASCII
             ;
             ; INPUTS: REG A = ASCII CHARACTER, REG C = VALUE ASSIGNED TO EACH
             ;           DIGIT(1,10 OR 100)
             ;
             ; PROCESS: CONVERTS ASCII CHAR IN REG A TO BINARY VALUE WEIGHTED
             ;           BY REG C
             ;
             ; OUTPUTS: WEIGHTED BINARY VALUE IN REG A
             ;
188F E60F    ASCII:   ANI    0FH             ;LOOK AT 4 LSB
1891 CA9C18           JZ     RETRN           ;JMP IF ZERO
1894 47               MOV    B,A             ;B= LOOP COUNT
1895 3E00             MVI    A,0             ;INITIALIZE A
1897 81      ALOOP:   ADD    C               ;A= WEIGHT
1898 05               DCR    B               ;DEC COUNTER
1899 C29718           JNZ    ALOOP           ;DO FOR ALL COUNTS
189C C9      RETRN:   RET                    ;RET WITH WEIGHTED BINARY # IN REG A
             ; SUBROUTINE DPLAQ
             ;
             ; INPUTS: MESSAGE D RESIDING IN DASDB. STACK= JDV,JINDU IN BINARY
             ;
             ; PROCESS: LOAD THE LAQ FOR THE INDUCT IN MESSAGE D WITH THE DIVERT
             ;           NUMBER IN MESSAGE D(DVT# IN BINARY). LOAD THE IDENT IN THE
             ;           LAQ WITH THE ADDRESS IN THE TRANSACTION TABLE WHERE THE
             ;           6 BYTE ASCII PACKAGE CODE HAS BEEN STORED
             ;
             ;OUTPUTS: STACK=JDV,JINDU. LAQ LOADED WITH JDV,IDENT
             ;
             ; TEST TO SEE IF LAQ IS FULL
189D 79      DPLAQ:   MOV    A,C             ;A=INDUCT #
189E CD9927           CALL   CPPPP           ;POINT H,L TO BYTE 1
18A1 23               INX    H               ;    IN PPDB FOR THIS INDUCT
18A2 22EB42           SHLD   PPDBP           ;OUTPUT POINTER
18A5 110500           LXI    D,5
18A8 19               DAD    D
18A9 3A343D           LDA    DQLIM
18AC 96               SUB    M
18AD C8               RZ                     ;RET IF LAQ FULL
             ;
             ; LAQ NOT FULL. TEST TO SEE IF JDV HAS ALREADY BEEN SET IN DASMD FOR
             ; THE CASE WHEN JDV=0.
18AE 3A4E43           LDA    FDV             ;FDV=1?
18B1 A7               ANA    A
18B2 CABE18           JZ     CNVJD           ;JMP IF FDV=0
18B5 3E00             MVI    A,0             ;SET FDV=0
18B7 324E43           STA    FDV
18BA C5               PUSH   B               ;STACK= JDV,JINDU
18BB C3C318           JMP    PCODE           ;JDV ALREADY LOADED IN MEMORY,JUMP
             ; LOAD JDV FROM MESSAGE D AS BINARY INTO MEMORY LOC JDV
18BE C5      CNVJD:   PUSH   B               ;STACK=JDV,JINDU
```

```
18BF 78              MOV   A,B              ;A=JDV
18C0 329642          STA   JDV              ;MEMORY JDV = JDV IN BINARY
                ;
                ; SEE IF PACKAGE CODE=000000 MEANING TO RECIRCULATE PACKAGE. IF SO,
                ; BYPASS PUTTING CODE INTO TRANSACTION TABLE AND SET IDENT=0000 TO
                ; IDENTIFY RECIRCULATING PACKAGE
18C3 212A43     PCODE:   LXI   H,DASDB+2        ;H,L= PACKAGE CODE BYTE 1
18C6 0606                MVI   B,6              ;B= COUNTER
18C8 7E         PCDCK:   MOV   A,M              ;A= PACK CODE BYTE
18C9 D630                SUI   '0'              ;SUBTRACT ASCII 0
18CB C2DE18              JNZ   SCODE            ;JMP IF EACH BYTE NOT A ASCII 0
18CE 23                  INX   H                ;LOOK AT NEXT BYTE
18CF 05                  DCR   B                ;DEC COUNTER
18D0 C2C818              JNZ   PCDCK            ;DO ALL 6 BYTES
                ;
                ; PACKAGE CODE ='S 000000. THEREFORE SET IDENT=0000 SO WHEN PACKAGE
                ; LEAVES SYSTEM, IT WON'T BE NECESSARY TO CLEAR IT FROM TRANSACTION
                ; TABLE AS WE ARE ABOUT TO BYPASS PUTTING IT INTO TABLE.
18D3 3E00                MVI   A,00H            ;A=0
18D5 329742              STA   IDENT
18D8 329842              STA   IDENT+1          ;IDENT = 0000H
18DB C3E118              JMP   LDLAQ            ;JMP LDLAQ
                ;
                ; LOAD 6 ASCII BYTES OF PACKAGE CODE INTO 1ST AVAILABLE 6 LOC IN
                ; TRANSACTION TABLE BY CALLING DSPAK. RET WITH IDENT= ADDRESS IN
                ; TRANSACTION TABLE WHERE CODE IS STORED.
18DE CD0619     SCODE:   CALL  DSPAK
                ;
                ; LOAD MEMORY JDV AND IDENT INTO LAQ FOR THIS INDUCT
18E1 C1         LDLAQ:   POP   B                ;B,C= JDV,JINDU
18E2 79                  MOV   A,C              ;A=INDUCT #
18E3 CD9927              CALL  CPPPP            ;POINT H,L TO BYTE 1 IN PPDB
18E6 23                  INX   H
18E7 22EB42              SHLD  PPDBP            ;OUTPUT POINTER
18EA 110500              LXI   D,5              ;POINT H,L TO LAQSZ IN PPDB
18ED 19                  DAD   D                ;H,L=LAQSZ=# OF PACKAGES IN LAQ
18EE 7E                  MOV   A,M              ;A=LAQSZ VALUE
18EF 34                  INR   M                ;INCREMENT LAQSZ
18F0 23                  INX   H                ;H,L=LAQ1 LOC
18F1 86                  ADD   M                ;A=RELATINE NUMBER OF LOC USED UP IN LAQ
18F2 E607                ANI   07H              ;MASK TO 3 BITS FOR WRAPAROUND
18F4 5F                  MOV   E,A
18F5 1600                MVI   D,0              ;D,E= RELATIVE LOC OF AVAIL SPACE IN LAQ
18F7 23                  INX   H                ;H,L= START LOC OF LAQ IN PPDB
18F8 19                  DAD   D                ;POINT H,L TO ABSOLUTE LOC OF AVAILABLE
18F9 19                  DAD   D                ;   SPACE IN
18FA 19                  DAD   D                ;   LAQ
18FB EB                  XCHG                   ;D,E = AVAIL LOC IN LAQ
18FC 219642              LXI   H,JDV            ;POINT H,L TO MEMORY JDV,IDENT
18FF 0603                MVI   B,3              ;3 BYTES TO MOVE
1901 CDCF10              CALL  MOVEB            ;COPY MEMORY JDV, IDENT INTO LAQ
1904 04                  INR   B                ;POSITIVE RETURN
1905 C9                  RET
                ;        SUBROUTINE DSPAK
                ;
                ;        INPUTS: POINTERS TRSDB,TRSDP,TLAST. 6 BYTE ASCII PACKAGE CODE
                ;                IN DASDB BYTES 2-7. STACK= JDV,JINDU
                ;
                ;        PROCESS: LOAD 6 BYTES OF ASCII CODE INTO TRANSACTION TABLE IN
                ;                 1ST AVAILABLE 6 BYTES. TRANSACTION TABLE STARTS AT
                ;                 LOC TRSDB, ENDS AT LOC TLAST, WITH TRSDP POINTING TO
                ;                 LOC IN TABLE WHERE PREVIOUS 6 BYTES ENDED.
                ;
                ;        OUTPUTS: PACKAGE CODE IN ASCII RESIDES IN TRANSACTION TABLE
                ;                 STARTING AT LOC POINTED TO BY H,L. TRSDP POINTS TO
                ;                 START OF NEXT 6 BYTE BLOCK IN TRANSACTION TABLE.STACK
                ;                 =JDV,JINDU
                ; TEST TO SEE IF VALUE IN LOC TRSDP = 0
1906 2A5D43     DSPAK:   LHLD  TRSDP     ;H,L= LOC IN TRANS TAB WHERE LEFT OFF
1909 7E                  MOV   A,M       ;A= VALUE IN LOC TRSDP
190A D600                SUI   0
190C CA1719              JZ    BCONT     ;JMP IF VALUE=0
190F 3E00                MVI   A,0       ;OTHERWISE, RESET COUNTER
1911 325A43              STA   TCONT     ;TCONT=0
1914 C31E19              JMP   BTRDP     ;JMP TO BTRDP
1917 3A5A43     BCONT:   LDA   TCONT     ;SET TCONT = TCONT+1
191A 3C                  INR   A
191B 325A43              STA   TCONT
191E 2A5D43     BTRDP:   LHLD  TRSDP     ;INCREMENT TRSDP POINTER
1921 23                  INX   H         ;TRSDP=TRSDP+1
1922 225D43              SHLD  TRSDP
                ;
                ; TEST FOR WRAPAROUND OF TRANSACTION TABLE
1925 3AF23D              LDA   TLAST     ;A= TLAST LSB
1928 57                  MOV   D,A       ;B= SAME
1929 3A5D43              LDA   TRSDP     ;A= TRSDP LSB
192C 92                  SUB   D         ;A= TRSDP LSB - TLAST LSB
```

```
192D C24919         JNZ   TTCNT    ;JMP IF NOT EQUAL
1930 3AF33D         LDA   TLAST+1  ;A= TLAST MSB
1933 57             MOV   D,A      ;D= SAME
1934 3A5E43         LDA   TRSDP+1  ;A= TRSDP MSB
1937 92             SUB   D        ;A= TRSDP MSB - TLAST MSB
1938 C24919         JNZ   TTCNT    ;JMP IF NOT EQUAL
                ;
                ; WRAPAROUND BECAUSE TRSDP = TLAST
193B 3E00           MVI   A,0      ;A=0
193D 325A43         STA   TCONT    ;TCONT=0
1940 2AF03D         LHLD  TRSDB    ;H,L= START LOC OF TRANSACTION TAB
1943 225D43         SHLD  TRSDP    ;RESET TRSDP POINTER TO START
1946 C30619         JMP   DSPAK    ;START AT TOP OF TABLE TO LOOK FOR 6 BYTE
                ;
                ; NO WRAP-AROUND. CHECK TO SEE IF 6 BYTES HAS BEEN FOUND
                ;
1949 3A5A43     TTCNT:  LDA   TCONT    ;A= TCONT
194C D606           SUI   6        ;TCONT=6?
194E C20619         JNZ   DSPAK    ;JMP IF TCONT NOT=6
1951 3E00           MVI   A,0      ;A=0
1953 325A43         STA   TCONT    ;TCONT=0 (RESET COUNTER)
                ; SIX CONSECUTIVE BYTES FOUND. POINT H,L TO START OF 6 BYTES
1956 2A5D43         LHLD  TRSDP
1959 2B             DCX   H
195A 2B             DCX   H
195B 2B             DCX   H
195C 2B             DCX   H
195D 2B             DCX   H
195E 2B             DCX   H        ;H,L= START OF 6 AVAILABLE BYTES IN TABLE
195F E5             PUSH  H        ;STACK= SAME
1960 EB             XCHG           ;D,E=SAME
1961 212843         LXI   H,DASDB  ;H,L=DASDB LOC
1964 010200         LXI   B,2      ;B,C=2
1967 09             DAD   B        ;H,L=BYTE 2 OF DASDB= PACKAGE CODE START
1968 010600         LXI   B,6      ;B,C= 6
196B CDC410         CALL  MOVE     ;MOVE 6 BYTES FROM H,L TO DIE
196E E1             POP   H        ;H,L= LOC IN TRANSACTION TABLE OF CODE
196F EB             XCHG           ;D,E=SAME
                ; PUT LOC OF STORED PAK CODE INTO MEMORY IDENT
1970 219742         LXI   H,IDENT  ;H,L= IDENT LSB LOC
1973 73             MOV   M,E      ;IDENT LSB= REG E
1974 23             INX   H        ;H,L= IDENT MSB LOC
1975 72             MOV   M,D      ;IDENT MSB= REG D
1976 C9             RET            ;RET TO DPLAQ WITH IDENT=LOC IN TRANS TAB
                ;       SUBROUTINE DSOUT
                ;
                ;   WILL SEND DAS THE 1ST MESSAGE POINTED TO BY SMP IN FS. DEFAULTS TO
                ;   IDLE MESSAGE IF NO MESSAGES IN FS. WILL RESEND LAST PSC MESSAGE IF
                ;   CALLED FROM ICEXC WITH REG A=FFH, OR IF CALLED FROM DSDEC WITH
                ;   REG A= FFH WILL SEND MESSAGE IN MOBUF(COULD BE SAME AS LAST PSC
                ;   MESSAGE SENT)
                ;
                ;   INPUTS: IF REG A=FFH, MOBUF WILL CONTAIN DESIRED MESSAGE TO DAS.
                ;           OTHERWISE, SMP WILL BE POINTING TO 1ST MESSAGE IN FS WAIT-
                ;           ING TO BE SENT TO DAS (DEFAULT TO IDLE MESSAGE)
                ;
                ;   PROCESS: IF REG A=FFH ON ENTRY, SEND MOBUF TO DAS.  IF THERE ARE NO
                ;            MESSAGES IN FS, LOAD IDLE MESSAGE INTO MOBUF AND SEND TO
                ;            DAS. IF THERE IS A MESSAGE IN FS, LOAD IT INTO MOBUF AND
                ;            SEND TO DAS AND THEN UPDATE SMP POINTER TO NEXT MESSAGE.
                ;
                ;   OUTPUTS: DAS MESSAGE OUTPUT TO 5080 BOARD
                ;
                ;
1977 06FF       DSOUT:  MVI   B,0FFH          ;JMP TO SMOBF IF REG A=FFH IN ORDER
1979 90             SUB   B               ;TO RESEND MOBUF
197A CAF119         JZ    SMOBF
                ; REG A MUST=00.
                ; CHECK TO SEE IF ANY MESSAGES IN FS.
197D 2A5843         LHLD  SMP             ;H,L= SMP VALUE
1980 7C             MOV   A,H
1981 B5             ORA   L               ;SMP=0000H?
1982 C2A019         JNZ   YFS             ;JMP IF MESSAGES IN FS
                ;
                ; NO MESSAGES IN FS. DEFAULT TO IDLE MESSAGE.
1985 3A2942         LDA   RS              ;SET SEQ BYTE= TOGGLED RS
1988 323843         STA   MOBUF
198B 3E49           MVI   A,'I'           ;A= ASCII 'I'
198D 323943         STA   MOBUF+1
1990 3E20           MVI   A,20H           ;A= ASCII SPACE
1992 213A43         LXI   H,MOBUF+2       ;STORE INTO MOBUF BYTES 2-12 AS SPACES
1995 060B           MVI   B,11
1997 77         LPMOB:  MOV   M,A
1998 23             INX   H
1999 05             DCR   B
199A C29719         JNZ   LPMOB
199D C3F119         JMP   SMOBF           ;JMP WHEN ALL BYTES 2-12 LOADED AS SPACE
                ;
```

```
1711                       ; LOAD MESSAGE IN FS POINTED TO BY SMP INTO MOBUF
1712   19A0 3A2942  YFS:    LDA   RS              ;SET SEQ BYTE = TOGGLED RS
1713   19A3 323843          STA   MOBUF
1714   19A6 2A5843          LHLD  SMP             ;H,L= BYTE 1 OF MESSAGE IN FS
1715   19A9 23              INX   H
1716   19AA 113943          LXI   D,MOBUF+1       ;D,E= MOBUF BYTE 1 LOC
1717   19AD 010C00          LXI   B,12            ;B,C= 12 BYTES TO MOVE
1718   19B0 CDC410          CALL  MOVE            ;MOVE MESSAGE FROM FS TO MOBUF
1719                  ;
1720                  ; TEST TO SEE IF THIS IS THE LAST MESSAGE WAITING IN FS. IT'S LAST
1721                  ; MESSAGE IF SMP=LMP(AND WE ALREADY KNOW LMP AND SMP ARE NON-ZERO)
1722   19B3 2A5843          LHLD  SMP             ;H,L= SMP VALUE
1723   19B6 EB              XCHG                  ;D,E= SAME
1724   19B7 2A5443          LHLD  LMP             ;H,L= LMP VALUE
1725   19BA 7B              MOV   A,E             ;A= SMP LSB
1726   19BB 95              SUB   L               ;A= SMP LSB- LMP LSB
1727   19BC C2D919          JNZ   OTHFS           ;JMP IF SMP LSB NOT= SMP LSB
1728   19BF 7A              MOV   A,D             ;A= SMP MSB
1729   19C0 94              SUB   H               ;A= SMP MSB- LSB MSB
1730   19C1 C2D919          JNZ   OTHFS           ;JUMP IF NOT=
1731                  ;
1732                  ; THIS WAS LAST MESSAGE IN FS. RESET THE LOAD MESSAGE POINTER LMP AND
1733                  ; SEND MESSAGE POINTER SMP.
1734   19C4 2A5843          LHLD  SMP             ;H,L= SMP VALUE
1735   19C7 EB              XCHG                  ;D,E= ORIG SMP VALUE
1736   19C8 3E00            MVI   A,0             ;A=0
1737   19CA 325843          STA   SMP             ;SMP=0000H
1738   19CD 325943          STA   SMP+1
1739   19D0 325443          STA   LMP             ;LMP=0000H
1740   19D3 325543          STA   LMP+1
1741   19D6 C3ED19          JMP   RTTCB           ;JMP TO RTTCB
1742                  ;
1743                  ; THIS IS NOT THE ONLY MESSAGE IN FS. POINT SMP POINTER TO NEXT ONE
1744   19D9 2A5843  OTHFS:  LHLD  SMP             ;H,L= SMP VALUE
1745   19DC EB              XCHG                  ;D,E= ORIG SMP
1746   19DD 2A5843          LHLD  SMP             ;POINT H,L TO BYTE 14 OF MESSAGE TCB
1747   19E0 010E00          LXI   B,14
1748   19E3 09              DAD   B               ;H,L= BYTE 14 LOC
1749   19E4 7E              MOV   A,M             ;A= BYTE 14
1750   19E5 325843          STA   SMP             ;SMP= LSB OF LINK
1751   19E8 23              INX   H               ;H,L= BYTE 15 LOC
1752   19E9 7E              MOV   A,M             ;A= BYTE 15
1753   19EA 325943          STA   SMP+1           ;SMP+1 = MSB OF LINK
1754                  ;
1755                  ; RETURN MESSAGE TCB TO FS
1756   19ED EB      RTTCB:  XCHG                  ;H,L= ORIG SMP
1757   19EE CD4F11          CALL  PUTFS           ;RETURN TCB POINTED TO BY ORIG SMP TO FS
1758                  ;
1759                  ;LOAD CR,LF INTO MOBUF.CALC CHECKSUM OF MOBUF AND LOAD INTO MOBUF.
1760                  ; SEND MOBUF
1761                  ; TO DAS BY CALLING PUTDS. RESET DASIP
1762   19F1 213843  SMOBF:  LXI   H,MOBUF         ;POINT TO MOBUF
1763   19F4 CD211A          CALL  CHKSM           ;A= PRINTABLE ASCII CHECKSUM
1764   19F7 324543          STA   MOBUF+13        ;PUT CHKSM INTO MOBUF
1765   19FA 212843          LXI   H,DASDB         ;H,L= LOC OF DAS MESSAGE INPUT BUFFER
1766   19FD 224B43          SHLD  DASIP           ;RESET POINTER TO START OF BUFFER
1767   1A00 214643          LXI   H,MOBUF+14      ;H,L= BYTE 14 LOC
1768   1A03 360A            MVI   M,0AH           ;SET ASCII LF IN MOBUF
1769   1A05 23              INX   H               ;H,L= BYTE 15 LOC
1770   1A06 360D            MVI   M,0DH           ;SET ASCII CR IN MOBUF
1771   1A08 CD0C1A          CALL  PUTDS           ;PUTDS STARTS TRANSMISSION OF MOBUF
1772   1A0B C9              RET                   ;RET TO CALLER
1773                  ; SUBROUTINE PUTDS
1774                  ;
1775                  ;       INPUTS: PSC TO DAS MESSAGE RESIDING IN BUFFER MOBUF. POINTER
1776                  ;               MBUFP POINTS TO BYTE 0 OF MOBUF.DTYBS=0
1777                  ;
1778                  ;       PROCESS: DOUT BYTE 0 OF MOBUF TO I/C 5080 BOARD.
1779                  ;
1780                  ;       OUTPUT: MOBUF BYTE 0 OUTPUT TO I/C 5080 BOARD.MBUFP POINTS TO
1781                  ;               BYTE 1 OF MOBUF. REST OF MESSAGE IN MOBUF WILL BE
1782                  ;               SENT BY INTERRUPT DRIVERS IN SUBROUTINE ICINT.ALSO
1783                  ;               SET DTYBS=1 FOR USE IN ICINT.
1784                  ;
1785   1A0C 3E01    PUTDS:  MVI   A,01H
1786   1A0E 324D43          STA   DTYBS           ;DTYBS=1 FOR USE IN ICINT
1787   1A11 2A5643          LHLD  MBUFP
1788   1A14 23              INX   H
1789   1A15 225643          SHLD  MBUFP           ;MBUFP=MBUFP+1 (MOBUF BYTE 1)
1790   1A18 2A063D          LHLD  P5080           ;H,L= SIN ADDR FOR I/C 5080 BOARD
1791   1A1B 25              DCR   H               ;H=FE FOR DOUT OPERATION
1792   1A1C 3A3843          LDA   MOBUF           ;A= MOBUF BYTE 0
1793   1A1F 77              MOV   M,A             ;DOUT MOBUF BYTE 0 TO REG FEXX
1794   1A20 C9              RET                   ;RETURN TO DSOUT
1795                  ; SUBROUTINE CHKSM
1796                  ;
1797                  ;       INPUT: H,L POINTS TO 1ST OF 13 CONSECUTIVE BYTES TO CALCULATE
```

```
                     ;                 A PRINTABLE ASCII CHECKSUM FROM
                     ;
                     ;         PROCESS: SUM ALL 12 BINARY BYTES. MAKE BIT 7 OF RESULT=0 AND
                     ;                  BIT 6 = COMPLEMENT OF BIT 5.
                     ;
                     ;         OUTPUT: PRINTABLE ASCII CHECKSUM IN REG A
                     ;
                     ; MASK OFF BIT 7 OF EACH BYTE BEFORE CHECKSUMMING
1A21 060D            CHKSM:   MVI    B,13       ;SET LOOP COUNTER
1A23 0E00                     MVI    C,0        ;INITIALIZE C REG TO ZERO
1A25 7E              MCKSM:   MOV    A,M        ;A=BYTE
1A26 E67F                     ANI    7FH        ;MASK BIT 7
1A28 81                       ADD    C
1A29 4F                       MOV    C,A        ;C=CURRENT CHKSM
1A2A 23                       INX    H          ;POINT TO NEXT BYTE
1A2B 05                       DCR    B          ;DEC COUNTER
1A2C C2251A                   JNZ    MCKSM      ;DO ALL 12 BYTES
1A2F 79                       MOV    A,C        ;A=CHECKSUM
                     ;
                     ; SET BIT 7 = 0
1A30 E67F                     ANI    7FH        ;BIT 7=0
1A32 47                       MOV    B,A        ;STORE RESULT
                     ;
                     ; SET BIT 6 = COMPLEMENT OF BIT 5
1A33 E620                     ANI    20H        ;LOOK AT BIT 5
1A35 CA3C1A                   JZ     BITO       ;JMP IF BIT 5 = 0
                     ; BIT 5 = 1. THEREFORE MAKE BIT 6 = 0.
1A38 78                       MOV    A,B        ;A= CHECKSUM WITH BIT 7=0
1A39 E6BF                     ANI    0BFH       ;ZERO OUT BIT 6
1A3B C9                       RET               ;RET WITH PRINTABLE ASCII CHECKSUM IN A
                     ; BIT 5 = 0. THEREFORE MAKE BIT 6 = 1.
1A3C 78              BITO:    MOV    A,B        ;A = CHECKSUM WITH BIT 7 = 0.
1A3D F640                     ORI    40H        ;SET BIT 6=1
1A3F C9                       RET               ;RET WITH PRINTABLE ASCII CHKSM IN REG A
                     ;        SUBROUTINE ZPACK
                     ;
                     ;         INPUTS: H,L POINTS TO LOC WHERE IT IS DESIRED TO CLEAR 6 BYTES
                     ;                 IN TRANSACTION TABLE
                     ;         PROCESS: IF H,L IS WITHIN TRANSACTION TABLE, CLEAR THE 6 BYTES
                     ;                  STARTING AT H,L. IF H,L NOT WITHIN TABLE, DO FATAL
                     ;                  ERROR # 1
                     ;
                     ;         OUTPUT: 6 BYTES OF TRANSACTION TABLE CLEARED STARTING AT INPUT
                     ;                 H,L LOCATIONS.
                     ;
                     ; CHECK TO SEE IF H,L WITHIN TRANSACTION TABLE LIMITS
1A40 E5              ZPACK:   PUSH   H          ;STACK= H,L INPUT
1A41 2AF03D                   LHLD   TRSDB
1A44 44                       MOV    B,H
1A45 4D                       MOV    C,L        ;B,C=START ADDR OF TRANS TABLE
1A46 2AF23D                   LHLD   TLAST      ;H,L= END ADDR OF TRANS TAB
1A49 EB                       XCHG              ;D,E=SAME
1A4A E1                       POP    H          ;H,L= ADDR OF DESIRED DELETE
1A4B E5                       PUSH   H          ;STACK= SAME
1A4C 7D                       MOV    A,L        ;A= LSB OF DESIRED DELETE ADDR
1A4D 91                       SUB    C          ;16-BIT
1A4E 7C                       MOV    A,H        ;COMPARE
1A4F 98                       SBB    B          ;HERE
1A50 FA661A                   JM     FATLE      ;JMP IF PASSED ADDR < TRANSLATION TABLE
                     ;
                     ; IF GET TO HERE, DESIRED DELETE ADDR IS GREATER THAN START OF TRANS TAB
                     ; NOW SEE IF DELETE ADDR < TLAST OF TRANS TABLE
1A53 7B              TTOP:    MOV    A,E        ;A=LSB OF TLAST
1A54 95                       SUB    L          ;16-BIT
1A55 7A                       MOV    A,D        ;COMPARE
1A56 9C                       SBB    H          ;HERE
1A57 FA661A                   JM     FATLE      ;JMP IF PASSED ADDR > TLAST
                     ;
                     ; H,L IS WITHIN TRANS TABLE. THEREFORE ZERO THE 6 LOC'S.
1A5A E1              ZLOOP:   POP    H          ;H,L= ADDR OF DESIRED DELETE
1A5B 3E00                     MVI    A,0        ;A=0
1A5D 0606                     MVI    B,6        ;COUNT=6
1A5F 77              ZTRAN:   MOV    M,A        ;ZERO THE LOC
1A60 23                       INX    H          ;INCREMENT LOC
1A61 05                       DCR    B          ;DEC COUNTER
1A62 C25F1A                   JNZ    ZTRAN      ;DO ALL 6 LOC
1A65 C9                       RET               ;RET TO CALLER
                     ;
                     ; H,L NOT WITHIN TRANSACTION TABLE. DO FATAL ERROR #1
1A66 3E01            FATLE:   MVI    A,01H
1A68 CD0C2C                   CALL   FATAL
1A6B C9                       RET
                     ;        SUBROUTINE TRANP
                     ;
                     ;         INPUTS:H,L POINTS TO 1ST OF 6 BYTES DESIRED TO BE MOVED
                     ;
                     ;         PROCESS: MOVE 6 BYTES POINTED TO BY H,L INTO BUFFER BYT16
                     ;                  IN BYTES 2-7 LOC
```

```
                  ;
                  ;        OUTPUTS: BYTES 2-7 OF BUFFER BYT16 CONTAIN THE 6 BYTES
                  ;                 ORIGINALLY POINTED TO BY H,L
                  ;
1A6C E5           TRANP:   PUSH  H          ;STACK = LOC OF 6 BYTES TO MOVE
1A6D 211843                LXI   H,BYT16    ;H,L= BYT16 LOC
1A70 110200                LXI   D,2
1A73 19                    DAD   D          ;H,L= BYTE 2 OF BYT16
1A74 EB                    XCHG             ;D,E= SAME
1A75 010600                LXI   B,6        ;B,C= 6 COUNT
1A78 E1                    POP   H          ;H,L= LOC OF 6 BYTES
1A79 CDC410                CALL  MOVE       ;MOVE 6 BYTES FROM H,L TO D1E LOC
1A7C C9                    RET              ;RETURN
                  ;        SUBROUTINE DSLD
                  ;
                  ;        INPUTS: MESSAGE TO BE LOADED INTO FS RESIDES IN BUFFER BYT16.
                  ;                LMP POINTS TO FS LOC WHERE LAST MESSAGE WAS LOADED.
                  ;
                  ;        OUTPUTS: MESSAGE IS IN FS POINTED TO BY LMP. MESSAGE IS LINKED
                  ;                 TO OTHER MESSAGES IN FS.
                  ;
                  ;        PROCESS: GET 1ST AVAIL FS BLOCK AND LOAD MESSAGE BUFFER BYT16
                  ;                 INTO IT. LINK THIS FS BLOCK TO PREVIOUS MESSAGE
                  ;                 LOADED.
                  ;
1A7D CDCB0F       DSLD:    CALL  GETFS              ;H,L= LOC OF AVAIL FS
1A80 EB                    XCHG                     ;D,E= LOC OF AVAIL FS
1A81 211843                LXI   H,BYT16            ;H,L= BYTE 0 LOC OF BYT16 BUFFER
1A84 011000                LXI   B,16               ;B,C= 16 BYTES TO MOVE
1A87 D5                    PUSH  D                  ;STACK= LOC OF AVAIL FS
1A88 CDC410                CALL  MOVE               ;COPY BYT16 INTO FS
                  ;
                  ;        TEST TO SEE IF THIS IS THE 1ST MESSAGE IN FS
1A8B 2A5443                LHLD  LMP                ;H,L= LMP VALUE
1A8E 7C                    MOV   A,H                ;A= LMP MSB
1A8F B5                    ORA   L                  ;OR WITH LMP LSB
1A90 C29B1A                JNZ   MLINK              ;JMP IF LMP NOT ZERO
                  ; THIS IS THE 1ST MESSAGE IN FS. SET LMP AND SMP TO THIS FS LOC
1A93 E1                    POP   H                  ;H,L= LOC IN FS WHERE MESSAGE WAS LOADED
1A94 225843                SHLD  SMP                ;SMP= LOC IN FS OF MESSAGE
1A97 225443                SHLD  LMP                ;LMP= LOC IN FS OF MESSAGE
1A9A C9                    RET                      ;RET TO CALLER
                  ;  THIS IS NOT THE ONLY MESSAGE IN FS. LINK IT TO PREVIOUS MESSAGE IN FS
1A9B 2A5443       MLINK:   LHLD  LMP                ;H,L= LMP LOC = LOC IN FS WHERE LAST
                                                    ;   MESSAGE WAS STORED
1A9E EB                    XCHG                     ;D,E= LMP LOC OF LAST MESSAGE
1A9F 210E00                LXI   H,14
1AA2 19                    DAD   D                  ;H,L= BYTE 14 OF LAST MESSAGE
1AA3 D1                    POP   D                  ;D,E= LOC WHERE NEW MESSAGE JUST STORED
1AA4 73                    MOV   M,E                ;BYTE 14 = LSB OF NEW LOC
1AA5 23                    INX   H                  ;POINT TO BYTE 15
1AA6 72                    MOV   M,D                ;BYTE 15 OF PREVIOUS MESG=MSB OF NEW LOC
                  ;  BUMP LMP TO LOC IN FS WHERE NEW MESSAGE WAS JUST LOADED
1AA7 EB                    XCHG                     ;H,L= ADDR IN FS WHERE NEW MESSAGE PUT
1AA8 225443                SHLD  LMP                ;LMP= ADDR IN FS OF NEW MESSAGE
1AAB C9                    RET                      ;RET TO CALLER
                  ;
                  ;RUNNING MODE INITIALIZATION.
                  ;
                  ;INPUT: INTERRUPTS DISABLED.
                  ;ALL REGISTERS EFFECTED.
                  ;
1AAC 3E3C         RINI:    MVI   A,'<'      ;MODE
1AAE 322542                STA   MODE       ;  = "RUN"
1AB1 CD9710                CALL  LNKFS      ;LINK FREE STORAGE
1AB4 3A0B3D                LDA   NXLTB      ;IF TRANSLATE OPTION SPECIFIED
1AB7 B7                    ORA   A          ;  THEN INITIALIZE
1AB8 C4002F                CNZ   XLINI      ;  TRANSLATION DATA
                  ;
                  ;POLL PP AND TE PHOTOS TO SEE IF PACKAGE IS PRESENT
                  ;
1ABB 3EFF                  MVI   A,0FFH     ;FOR HIGH-TRUE
1ABD D301                  OUT   1          ;  PHOTOS
1ABF 3A6F42                LDA   PPCHN      ;A= PM5008 COMPOSITE CH # FOR PP # 1
1AC2 47                    MOV   B,A        ;B= COMPOSITE CH #
1AC3 0E01                  MVI   C,1        ;C= INDUCT # = 1
                  ;
1AC5 C5           RPLPP:   PUSH  B          ;SAVE COMPOSITE CH #, INDUCT #
1AC6 CD171B                CALL  POLL       ;POLL PP
1AC9 04                    INR   B          ;B= TE CH #
1ACA DAD31A                JC    RPP1       ;IF PP NOT BLOCKED
1ACD CD171B                CALL  POLL       ;POLL TE
1AD0 D2E01A                JNC   RPP0       ;IF BLOCKED
                  ;
1AD3 C1           RPP1:    POP   B          ;B=COMPOSITE CH #, C= INDUCT #
1AD4 79                    MOV   A,C        ;A= INDUCT #
1AD5 CD9927                CALL  CPPPP      ;POINT H,L TO PPDB
```

```
1AD8 3601              MVI    M,1        ;SET PACKAGE-PRESENT &
1ADA 23                INX    H          ;  PACKAGE-WAITING
1ADB 3601              MVI    M,1        ;  FLAGS
1ADD C3E81A            JMP    RPPLP
                ;
1AE0 C1         RPP0:  POP    B          ;B= COMPOSITE CH #,
1AE1 C5                PUSH   B          ;  C= INDUCT #
1AE2 0601              MVI    B,1        ;START RELEASE
1AE4 CD0F11            CALL   OPUT       ;  BELT
1AE7 C1                POP    B          ;B= COMPOSITE CH #, C= INDUCT #
                ;
1AE8 04         RPPLP: INR    B          ;B= NEXT PP CH #
1AE9 04                INR    B          ;
1AEA 0C                INR    C          ;INC INDUCT #
1AEB 3A033D            LDA    NINDU      ;DOUNTIL
1AEE B9                CMP    C          ;  INDUCT #
1AEF D2C51A            JNC    RPLPP      ;  > NINDU
                ;
                ;POLL LF TO SET LFDB FLAGS
                ;
1AF2 3A3C3D     RPLLF: LDA    LFO        ;IF
1AF5 B7                ORA    A          ;  THERE ARE
1AF6 CA131B            JZ     REINI      ;  LF'S
1AF9 3A7442            LDA    TRCHN      ;A= PM5008 COMPOSITE CH #
1AFC DE02              SBI    2          ;  FOR LAST LF
1AFE 47                MOV    B,A        ;B= COMPOSITE CH #
1AFF 3A053D            LDA    NDVT       ;A= # LF'S = COUNT
1B02 4F                MOV    C,A        ;C= COUNT
1B03 C5         RPLF:  PUSH   B          ;SAVE CH #, COUNT
1B04 CD171B            CALL   POLL       ;POLL LF # C
1B07 C1                POP    B          ;B= CH #,
1B08 C5                PUSH   B          ;  C= DIVERT #
1B09 DCE720            CC     LFBPC      ;IF LF BLOCKED THEN SET FLAG IN LFDB
1B0C C1                POP    B          ;B= COMPOSITE CH #, C= DIVERT #
1B0D 05                DCR    B          ;B= COMPOSITE CH #
1B0E 05                DCR    B          ;  FOR PREVIOUS LF
1B0F 0D                DCR    C          ;DECREMENT DIVERT # (COUNT)
1B10 C2031B            JNZ    RPLF       ;  UNTIL =0
                ;
                ;REINITIALIZE PM5008'S
                ;
1B13 CD190C     REINI: CALL   DEVII      ;REINITIALIZE
1B16 C9                RET
                ;;
                ;POLL PM5008 COMPOSITE CHANNEL # B FOR HIGH-TRUE SIGNAL LEVEL.
                ;   B>=0.
                ;
                ;INPUT: A=0 MEANS LOW-TRUE. A=0FFH MEANS HIGH-TRUE.
                ;OUTPUT: FLAG C SET IF SIGNAL TRUE.
                ;ALL REGISTERS EXCEPT B EFFECTED.
                ;
1B17 3EFF       POLL:  MVI    A,0FFH     ;FOR HIGH-TRUE PHOTOS
                ;
1B19 D301       POLL1: OUT    1          ;SET HIGH-TRUE SELECT BITS
1B1B 3A6C42            LDA    P5008      ;H,L
1B1E 6F                MOV    L,A        ;  = COUT AD FOR
1B1F 26FF              MVI    H,0FFH     ;  1ST PM5008 BOARD
1B21 78                MOV    A,B        ;A= COMPOSITE CH #
1B22 CD280D            CALL   CPMSK      ;CP COUT AD & BIT MASK
1B25 3606              MVI    M,06H      ;ENABLE BOARD & CLEAR ITS FLAGS
1B27 25                DCR    H          ;H,L= DOUT AD
1B28 3600              MVI    M,0        ;FOR SPURIOUS INT'S (SEE PM5008 MANUAL)
1B2A 77                MOV    M,A        ;DOUT TO ENABLE CH
1B2B 24                INR    H          ;H,L= SIN AD
1B2C 7E                MOV    A,M        ;SIN
1B2D 1F                RAR               ;GROUP SELECT BIT TO FLAG C
1B2E C9                RET
                ;;
                ;RUNNING MODE PHOTO SENSOR CELL PROCESSOR.
                ;
                ;INPUT: B=DEVIC, C=INDEX.
                ;ALL REGISTERS EFFECTED.
                ;
1B2F 78         PHPC:  MOV    A,B        ;CASENTRY DEVIC= 2 TO 11
1B30 3D                DCR    A          ;
1B31 1E0A              MVI    E,10       ;CASE SWITCH
1B33 CDA20C            CALL   CASSW      ;  ON 10 CASES
1B36 651C              DW     PPBPC      ;DEVIC=2: PP-BLOCKING
1B38 C51C              DW     TECPC      ;DEVIC=3: TE-CLEARING
1B3A 2E1D              DW     IDBPC      ;DEVIC=4: ID-BLOCKING
1B3C 4F1B              DW     PSRET      ;FOR FUTURE EXPANSION
1B3E 6E1D              DW     UDBPC      ;DEVIC=6: UD-BLOCKING
1B40 3120              DW     UDCPC      ;DEVIC=7: UD-CLEARING
1B42 0043              DW     DCBPC      ;DEVIC=8: DC-BLOCKING
1B44 4F1B              DW     PSRET      ;FOR FUTURE EXPANSION
1B46 E720              DW     LFBPC      ;DEVIC=10: LF-BLOCKING
1B48 EE20              DW     LFCPC      ;DEVIC=11: LF-CLEARING
```

```
                    ;
                    ;ERROR EXIT AND NO-OPERATION EXIT
                    ;
1B4A 3E0A                   MVI   A,10        ;DEFAULT CASE:
1B4C CD080F                 CALL  ERPC        ;  ERROR 10
1B4F C9             PSRET:  RET               ;NO OPERATION
                    ;;
                    ;RUNNING MODE KEYBOARD INPUT CHARACTER PROCESSOR.
                    ;
                    ;INPUT: C= KEYBOARD NUMBER, A= INPUT CHARACTER,
                    ;  KBDBP=HL POINTS TO BYTE 4 IN KBDB.
                    ;OUTPUT: CHAR.
                    ;ALL REGISTERS EFFECTED.
                    ;
1B50 32DE42         KBPC:   STA   CHAR                ;SAVE INPUT CHAR
1B53 47                     MOV   B,A                 ;B=CHAR
1B54 7E                     MOV   A,M                 ;IF ER IN KBDB=0 THEN
1B55 B7                     ORA   A                   ;   SET FLAG Z
1B56 C2731B                 JNZ   IKERZ               ;IF KB NOT IN ER MODE
                    ; TEST IF IN I/C MODE
1B59 3A2B42                 LDA   ICMO
1B5C D601                   SUI   01H                 ;ICMO=1?
1B5E C2EF1B                 JNZ   NUMER               ;JMP IF NOT I/C
                    ; TEST FOR HALF DAS
1B61 3A0640                 LDA   HDSEN
1B64 D601                   SUI   01H
1B66 CAEF1B                 JZ    NUMER               ;JMP IF HALF DAS
                    ;TEST IF IN 'PROGRAM' MODE, I.E., IS IT DESIRED TO PROGRAM
                    ;TRANSLATION TABLES WHILE IN HOST MODE?
1B69 3E2E                   MVI   A,2EH               ;A=ASCII + = 'SEND' KEY IN PROGRAM MODE
1B6B B8                     CMP   B                   ;COMPARE '+' WITH INPUT CHAR
1B6C CAEF1B                 JZ    NUMER               ;JMP IF 'SEND' KEY WAS HIT WHILE IN
                                                      ;  PROGRAM MODE
1B6F D2EF1B                 JNC   NUMER               ;JMP IF A DIGIT WAS HIT WHILE IN
                                                      ;  PROGRAM MODE
1B72 C9                     RET                       ;RET-THEREFORE WON'T PROCESS ANY KB
                                                      ;INPUTS EXCEPT 'SEND' OR A DIGIT WHILE
                                                      ;IN PROGRAM MODE IF NO ERRORS ARE ON KB
                                                      ; (WILL ALSO PROCESS '<' AND '>')
                                                      ;AND SYSTEM IS IN HOST MODE BUT NOT IN
                                                      ;HALF DAS MODE
                    ;
                    ;
                    ; TEST IF IN I/C MODE
1B73 3A2B42         IKERZ:  LDA   ICMO
1B76 D601                   SUI   01H
1B78 C2411C                 JNZ   KERNZ               ;JMP IF NOT I/C
                    ;
                    ; TEST FOR HALF DAS
1B7B 3A0640                 LDA   HDSEN
1B7E D601                   SUI   01H
1B80 CA411C                 JZ    KERNZ               ;JMP IF HALF DAS
                    ;
                    ; TEST IF INPUT WAS A 'CLEAR'
1B83 3ADE42                 LDA   CHAR                ;PICK UP INPUT CHAR
1B86 F630                   ORI   30H                 ;NORMAL ILED INPUT CHAR
1B88 FE3A                   CPI   ':'                 ;COMPARE WITH 'CLEAR' CHAR
1B8A CA8E1B                 JZ    PRCLR               ;JMP IF 'CLEAR' WAS HIT
1B8D C9                     RET                       ;RETURN AS SOME KEY OTHER THAN CLEAR WAS
                                                      ;HIT WHILE IN I/C MODE(AND NOT HALF DAS)
                    ;
                    ; PROCESS 'CLEAR' KEY
                    ;
                    ; IF ERROR ON KB IS A 1,2,6,11,OR 12, DO SAME THING NORMALLY DONE FOR
                    ; 'CLEAR' KEY. IF ANY OTHER ERROR, ONLY CLEAR ERROR OFF KB AND TURN RUN
                    ; LIGHT ON KB BACK ON.
1B8E 79             PRCLR:  MOV   A,C                 ;A=KB#
1B8F CD170D                 CALL  CPKBP               ;H,L POINTS TO KBI1 IN KBDB
1B92 110600                 LXI   D,6                 ;POINT TO SND LOC(CODE IS TEMP STORED
1B95 19                     DAD   D                   ;# HERE IN ERRPC)
1B96 7E                     MOV   A,M                 ;A= ERROR CODE
1B97 57                     MOV   D,A                 ;STORE ERROR CODE IN D
1B98 D601                   SUI   1
1B9A CAB91B                 JZ    KRLAQ               ;JMP IF ERROR #1
1B9D 7A                     MOV   A,D
1B9E D602                   SUI   2
1BA0 CAB91B                 JZ    KRLAQ               ;JMP IF ERROR #2
1BA3 7A                     MOV   A,D
1BA4 D606                   SUI   6                   ;JMP IF ERROR #6
1BA6 CAB91B                 JZ    KRLAQ
1BA9 7A                     MOV   A,D
1BAA D60B                   SUI   11
1BAC CAB91B                 JZ    KRLAQ               ;JMP IF ERROR #11
1BAF 7A                     MOV   A,D
1BB0 D60C                   SUI   12
1BB2 CAB91B                 JZ    KRLAQ               ;JMP IF ERROR #12
                    ;
                    ; THEREFORE JUST WANT TO CLEAR ERROR FROM KB AND TURN RUN LIGHT ON KB
```

```
                    ; BACK ON(FOR NON-INDUCT KB'S AND ERRORS 0,3,4,5,7,8,9,10,13,14)
1BB5 CDC90C  KLRKB:    CALL   CLRKB              ;CLEAR KBDB, KB DISPLAY, TURN BACK ON
                                                 ;MODE LIGHT
1BB8 C9                RET                       ;RETURN
                    ;
                    ; BEFORE CLEARING LAQ DURING CALL MCLPC, CLEAR THE PACKAGES CURRENTLY
                    ; IN LAW FROM TRANSACTION TABLE
1BB9 3A033D  KRLAQ:    LDA    NINDU              ;A=NUMBER OF INDUCTS
1BBC B9                CMP    C                  ;COMPARE WITH KB# IN REG C
1BBD DAB51B            JC     KLRKB              ;JUMP IF IT'S A NON-INDUCT KB
1BC0 79                MOV    A,C                ;A= INDUCT #
1BC1 CD9927            CALL   CPPPP              ;POINT H,L TO PPDB FOR THIS INDUCT
1BC4 C5                PUSH   B                  ;C= KB# NOW ON STACK
1BC5 110600            LXI    D,6                ;D,E= 6
1BC8 19                DAD    D                  ;H,L= LOC OF LAQSZ IN PPDB
1BC9 46                MOV    B,M                ;B= LAQSZ = LOOP COUNTER
1BCA 23                INX    H                  ;H,L= LOC OF LAQ1 IN PPDB
1BCB 5E                MOV    E,M                ;E= LAQ1
1BCC 1600              MVI    D,0                ;D,E= LAQ1
1BCE 23                INX    H                  ;H,L= LOC OF LAQ IN PPDB
1BCF 19                DAD    D                  ;POINT H,L TO LOC IN PPDB
1BD0 19                DAD    D                  ;   OF 1ST PACKAGE THAT
1BD1 19                DAD    D                  ;   HASN'T YET BEEN INDUCTED
1BD2 05      LGLAQ:    DCR    B                  ;COUNT = COUNT -1
1BD3 FAEB1B            JM     MGLAQ              ;JMP IF NO PACKAGES LEFT TO CLEAR IN LAQ
1BD6 23                INX    H                  ;POINT TO IDENT LSB
1BD7 5E                MOV    E,M                ;E= IDENT LSB
1BD8 23                INX    H                  ;POINT TO IDENT MSB
1BD9 56                MOV    D,M                ;D,E= IDENT
1BDA E5                PUSH   H                  ;STACK= LOC OF IDENT MSB
1BDB EB                XCHG                      ;H,L= IDENT VALUE
1BDC 7C                MOV    A,H                ;A= IDENT MSB
1BDD B5                ORA    L                  ;OR WITH IDENT LSB
1BDE CAE61B            JZ     NGLAQ              ;JMP IF IDENT = 0
1BE1 C5                PUSH   B                  ;SAVE COUNTER
1BE2 CD401A            CALL   ZPACK              ;REMOVE PACK CODE FROM TRANSACTION TABLE
1BE5 C1                POP    B                  ;B= COUNT AGAIN
1BE6 E1      NGLAQ:    POP    H                  ;H,L= LOC OF IDENT MSB
1BE7 23                INX    H                  ;H,L= LOC OF NEXT PACK JDV VALUE
1BE8 C3D21B            JMP    LGLAQ              ;JMP TO LGLAQ
1BEB C1      MGLAQ:    POP    B                  ;B= CB# AGAIN
1BEC C3611C            JMP    KCLR               ;JMP TO KCLR TO CLEAR LAQ,ETC.
1BEF 3ADE42  NUMER:    LDA    CHAR               ;A= CHAR
1BF2 F630              ORI    30H       ;NORMALIZED INPUT CHAR
1BF4 FE3A              CPI    ':'       ;IF CHAR IS
1BF6 D2111C            JNC    KNDIG     ;  '0' TO '9'
1BF9 CD9E0D            CALL   DIGPC     ;PROCESS DIGIT
                    ;
                    ;  ;AUTOMATIC "SEND" BY FIXED LENGTH CODE
                    ;
1BFC 3ADE42            LDA    CHAR      ;"SEND" PACKAGE
1BFF E6F0              ANI    0F0H      ;  ONLY IF
1C01 FE30              CPI    30H       ;  KEYSWITCH
1C03 C0                RNZ              ;  IS IN "RUN" POSITION
1C04 3A323D            LDA    SENDO     ;A= LENGTH OF FIXED-LENGTH CODE
1C07 E60F              ANI    0FH       ;  WITHOUT "SEND"
1C09 C8                RZ               ;IF LENGTH SPECIFIED ( > 0 )
1C0A 23                INX    H         ;POINT H,L TO BYTE 5 IN KBDB
1C0B BE                CMP    M         ;IF CODE ENTERED HAS REACHED
1C0C C0                RNZ              ;  THAT LENGTH
1C0D CD5B21            CALL   SNPC      ;"SEND" AUTOMATICALLY
1C10 C9                RET
                    ;
                    ;NON-NUMERIC CHAR
                    ;
1C11 CA611C  KNDIG:    JZ     KCLR      ;IF NOT= ':'
1C14 FE3C              CPI    '<'       ;IF < '<' THEN
1C16 D21D1C            JNC    KNSND     ;  MUST BE ';'
1C19 CD3D21            CALL   SNDPC     ;NORMAL "SEND"
1C1C C9                RET
                    ;
1C1D C22B1C  KNSND:    JNZ    KNLT      ;IF = '<'
1C20 3A0B3D            LDA    NXLTB     ;USED ONLY FOR
1C23 B7                ORA    A         ;  TRANSLATION
1C24 CA3B1C            JZ     KBERR     ;  OPTION
1C27 CDB22F            CALL   RLTPC     ;TRANSLATE FROM DV # TO CODE
1C2A C9                RET
                    ;
1C2B FE3E    KNLT:     CPI    '>'       ;IF IT IS
1C2D C23B1C            JNZ    KBERR     ;  ">" KEY
1C30 3A0B3D            LDA    NXLTB     ;USED ONLY FOR
1C33 B7                ORA    A         ;  TRANSLATION
1C34 CA3B1C            JZ     KBERR     ;  OPTION
1C37 CD6830            CALL   RGTPC     ;EXAMINE OR CHANGE DV #
1C3A C9                RET
                    ;
                    ;ERRONEOUS CHAR
                    ;
```

```
1C3B 3E08      KBERR:  MVI   A,8       ;ERROR
1C3D CD130F            CALL  ERRPC     ;  8
1C40 C9                RET
               ;
               ;
               ;KEYBOARD PROCESSOR WHEN FLAG ER NOT=0, I.E., KEYBOARD SPECIAL MODES
               ;
               ;INPUT: C= KEYBOARD #, B=CHAR= INPUT CHARACTER.
               ;
1C41 3ADE42    KERNZ:  LDA   CHAR      ;PICK UP INPUT CHARACTER
1C44 F630              ORI   30H       ;NORMALIZED CHAR
1C46 FE3A              CPI   ':'       ;IF NOT
1C48 CA5D1C            JZ    KBCLR     ;  "CLEAR"
1C4B 7E                MOV   A,M       ;A= SPECIAL KB MODE FLAG ER IN KBDB
1C4C D60A              SUI   10        ;ER=10 IS FOR MANIPULATING
1C4E CABA30            JZ    RM0PC     ;  TRANSLATE TABLE
1C51 3D                DCR   A         ;ER=11 IS FOR MANIPULATING
1C52 CA0000            JZ    0000H     ;  COUNT TABLE
1C55 3D                DCR   A         ;ER=12 IS FOR MANIPULATING
1C56 CA0000            JZ    0000H     ;  PACKAGE COUNTS
1C59 CD1C0E            CALL  ERMPC     ;CALL SPECIAL KB MODE PROCESSOR
1C5C C9                RET
               ;
               ;KB "CLEAR" PROCESSING
               ;
1C5D 7E        KBCLR:  MOV   A,M       ;IGNORE ALL INPUTS IF
1C5E FE0F              CPI   0FH       ;  KB IS IN
1C60 C8                RZ              ;  LOCK-OUT MODE
               ;
1C61 CD1422    KCLR:   CALL  MCLPC     ;"MASTER CLEAR"
1C64 C9                RET
               ;;
               ;PACKAGE-PRESENT-PHOTO-BLOCKING PROCESSOR.
               ;
               ;INPUT: C= INDUCT NUMBER, PPDB.
               ;OUTPUT: PPDB.
               ;ALL REGISTERS & PPDB EFFECTED.
               ;
1C65 79        PPBPC:  MOV   A,C       ;A = INDUCT #
1C66 CD9927            CALL  CPPPP     ;POINT H,L TO PPDB
1C69 7E                MOV   A,M       ;PICK UP FLAG PP IN PPDB
1C6A 3601              MVI   M,1       ;PP IN PPDB = 1
1C6C B7                ORA   A         ;IF ORIGINAL PP IN PPDB
1C6D C2B21C            JNZ   PPBES     ;  = 0
               ;
1C70 E5                PUSH  H         ;SAVE PPDB POINTER
1C71 C5                PUSH  B         ;SAVE INDUCT #
1C72 79                MOV   A,C       ;A = INDUCT #
1C73 2A5942            LHLD  OUTDB     ;IF RELEASE IS STOPPED
1C76 CD280D            CALL  CPMSK     ;  THEN SET
1C79 A6                ANA   M         ;  FLAG Z
1C7A C1                POP   B         ;RESTORE C= INDUCT #
1C7B E1                POP   H         ;RESTORE POINTER TO PPDB
1C7C CAB91C            JZ    PPBPE     ;IF RLS STOPPED THEN ERROR
               ;
               ;LEGITIMATE PACKAGE BLOCKING PP
               ;
1C7F C5                PUSH  B         ;SAVE C= INDUCT #
1C80 E5                PUSH  H         ;SAVE PPDB POINTER
1C81 CDA20F            CALL  GITRE     ;GET TREE PARAMETERS FOR INDUCT
1C84 2A0A40            LHLD  PPD       ;SET DE = # PPI PULSES
1C87 EB                XCHG            ;  TO TIME OUT
1C88 E1                POP   H         ;POINT TO
1C89 23                INX   H         ;  BYTE 2
1C8A 23                INX   H         ;  IN PPDB
1C8B E5                PUSH  H         ;SAVE POINTER
1C8C 23                INX   H         ;POINT TO BYTE 4
1C8D 23                INX   H         ;  IN PPDB
1C8E 019123            LXI   B,PPDTO   ;SCHEDULE EVENT PPDTO
1C91 CD192D            CALL  RSCHD     ;  TO TIMEOUT PP DWELL
1C94 D1                POP   D         ;POINT DE TO BYTE 2 IN PPDB
1C95 210400            LXI   H,4       ;POINT HL TO BYTE 6
1C98 19                DAD   D         ;  IN PPDB
1C99 7E                MOV   A,M       ;PICK UP LAQ CURRENT SIZE
1C9A EB                XCHG            ;POINT TO PPDB BYTE 2
1C9B C1                POP   B         ;RESTORE C= INDUCT #
1C9C B7                ORA   A         ;IF LAQ NOT
1C9D CAA41C            JZ    PPWTG     ;  EMPTY
1CA0 CD7022            CALL  PSEQR     ;SEQUENCE PACKAGE TO BE INDUCTED
1CA3 C9                RET
               ;
               ;  ;PACKAGE HAS TO WAIT TO BE ENCODED
               ;
1CA4 2B        PPWTG:  DCX   H         ;POINT H,L TO BYTE 1 IN PPDB
1CA5 7E                MOV   A,M       ;A= PWTNG IN PPDB
1CA6 3601              MVI   M,1       ;PWTNG IN PPDB = 1
1CA8 B7                ORA   A         ;IF ORIGINAL PWTNG IN PPDB
1CA9 C2BF1C            JNZ   PPBFX     ;  = 0
```

```
1CAC 0602              MVI    B,2        ;RELEASE
1CAE CD0F11            CALL   OPUT       ;  OFF
1CB1 C9                RET
                ;
                ;ILLEGITIMATE PP-BLOCKED INTERRUPT
                ;
1CB2 C5         PPBES: PUSH   B          ;STOP RELEASE MECHANISM
1CB3 0602              MVI    B,2        ;  TO AVOID RELEASING
1CB5 CD0F11            CALL   OPUT       ;  MULTIPLE
1CB8 C1                POP    B          ;  PACKAGES
1CB9 3E0C       PPBPE: MVI    A,12       ;INDUCT ERROR
1CBB CD130F            CALL   ERRPC      ;  12
1CBE C9                RET
                ;
                ;FLAG PP=0, RELEASE OFF, BUT FLAG PWTNG NOT=0
                ;
1CBF 3E0C       PPBFX: MVI    A,12       ;FATAL ERROR
1CC1 CD0C2C            CALL   FATAL      ;  # 12
1CC4 C9                RET
                ;;
                ;TRAILING-EDGE-PHOTO-CLEARING PROCESSOR.
                ;
                ;INPUT: C= INDUCT #, PPDB, RLSDB, OUTDB.
                ;OUTPUT: PPDB, RLSDB, EVENT TECMG OR CMG.
                ;ALL REGISTERS EFFECTED.
                ;
1CC5 79         TECPC: MOV    A,C        ;A = INDUCT #
1CC6 CD9927            CALL   CPPPP      ;POINT H,L TO PPDB
1CC9 35                DCR    M          ;RESET PP IN PPDB
1CCA C2261D            JNZ    TCPE0      ;IF NOT ALREADY RESET
                ;
1CCD C5                PUSH   B          ;SAVE C= INDUCT #
1CCE 79                MOV    A,C        ;A = INDUCT #
1CCF 2A5942            LHLD   OUTDB      ;IF RLS IS STOPPED
1CD2 CD280D            CALL   CPMSK      ;  THEN SET
1CD5 A6                ANA    M          ;  FLAG Z
1CD6 C1                POP    B          ;C = INDUCT #
1CD7 CA281D            JZ     TCPEX      ;IF RLS RUNNING
                ;
1CDA CDA227            CALL   CPRLP      ;POINT H,L TO TCBP IN RLSDB
1CDD 5E                MOV    E,M        ;POINT D,E TO
1CDE 23                INX    H          ;  PACKAGE BEING
1CDF 56                MOV    D,M        ;  RELEASED
1CE0 7B                MOV    A,E        ;IF TCB
1CE1 B2                ORA    D          ;  NOT
1CE2 CA201D            JZ     TCPFE      ;  NULL
                ;
                ;D,E POINTS TO TCB FOR PACKAGE BEING RELEASED
                ;
1CE5 AF                XRA    A          ;A=0
1CE6 77                MOV    M,A        ;CLEAR TCBP
1CE7 2B                DCX    H          ;  IN
1CE8 77                MOV    M,A        ;  RLSDB
1CE9 210900            LXI    H,9        ;POINT H,L TO BYTE 9
1CEC 19                DAD    D          ;  IN TCB
1CED 7E                MOV    A,M        ;A= JINDU IN TCB
1CEE B9                CMP    C          ;IF IT MATCHES
1CEF C2201D            JNZ    TCPFE      ;  THE INT
                ;
                ;  ;JUNK EVENT TEC2, CREATE EVENT TECMG OR CMG
                ;
1CF2 2B                DCX    H          ;POINT H,L TO BYTE 8 IN TCB
1CF3 118025            LXI    D,JUNK     ;CHANGE
1CF6 72                MOV    M,D        ;  EVENT
1CF7 2B                DCX    H          ;  TEC2
1CF8 73                MOV    M,E        ;  TO JUNK
                ;
1CF9 C5                PUSH   B          ;SAVE JINDU
1CFA CDA20F            CALL   GITRE      ;GET TREE PARAMETERS FOR INDUCT
1CFD C1                POP    B          ;B,C=JINDU
1CFE CDCB0F            CALL   GETFS      ;GET FREE BLOCK
1D01 110900            LXI    D,9        ;POINT H,L TO BYTE 9
1D04 19                DAD    D          ;  IN TCB
1D05 71                MOV    M,C        ;SET JINDU IN TCB
1D06 2B                DCX    H          ;POINT H,L TO BYTE 8 IN TCB
1D07 11CA23            LXI    D,TECMG    ;POINT D,E TO TECMG
1D0A 3A313D            LDA    SIDEO      ;IF
1D0D E610              ANI    010H       ;  SIDE INDUCT
1D0F CA151D            JZ     TSEVN      ;  THEN
1D12 112924            LXI    D,CMG      ;  POINT D,E TO CMG
1D15 72         TSEVN: MOV    M,D        ;SET
1D16 2B                DCX    H          ;  EVENT
1D17 73                MOV    M,E        ;  IN TCB
1D18 EB                XCHG              ;POINT D,E TO BYTE 7 IN TCB
1D19 2A3142            LHLD   TET        ;SCHEDULE EVENT AT
1D1C CD2F29            CALL   ENTCB      ;  CTIME+ TET TIME
1D1F C9                RET
                ;
```

```
                  ;BAD TCB, OR NULL TCB
                  ;
1D20 3E02         TCPFE:   MVI    A,2          ;FATAL ERROR
1D22 CD0C2C                CALL   FATAL        ;  2
1D25 C9                    RET
                  ;
                  ;TECPC WITHOUT PPBPC
                  ;
1D26 3600         TCPE0:   MVI    M,0          ;ZERO PP IN PPDB
                  ;
                  ;TECPC WHILE RELEASE NOT RUNNING
                  ;
1D28 3E01         TCPEX:   MVI    A,1          ;ERROR
1D2A CD130F                CALL   ERRPC        ;  1
1D2D C9                    RET
                  ;;
                  ;INDUCT-PHOTO-BLOCKING PROCESSOR.  FOR STRAIGHT INDUCT ONLY
                  ;  START TO TRACK PACKAGE.
                  ;
                  ;INPUT: C= INDUCT #.
                  ;ALL REGISTERS EFFECTED.
                  ;
1D2E CDA227       IDBPC:   CALL   CPRLP        ;POINT HL TO
1D31 23                    INX    H            ;  BYTE 2
1D32 23                    INX    H            ;  IN RLSDB
1D33 22EF42                SHLD   RLDBP        ;SAVE RLSDB POINTER
1D36 5E                    MOV    E,M          ;POINT DE
1D37 23                    INX    H            ;  TO MERGE
1D38 56                    MOV    D,M          ;  FIFO
1D39 7B                    MOV    A,E          ;IF POINTER
1D3A B2                    ORA    D            ;  NOT
1D3B C8                    RZ                  ;  NULL
                  ;
1D3C 210900                LXI    H,9          ;POINT H,L TO BYTE 9
1D3F 19                    DAD    D            ;  IN TCB
1D40 7E                    MOV    A,M          ;IF JINDU IN TCB
1D41 B9                    CMP    C            ;  MATCHES
1D42 C0                    RNZ                 ;  THIS INTERRUPT
                  ;
                  ;THE INTERRUPT IS AS EXPECTED; JUNK EVENT IDB2
                  ;
1D43 210E00                LXI    H,14         ;POINT H,L TO BYTE 14
1D46 19                    DAD    D            ;  IN TCB
1D47 E5                    PUSH   H            ;SAVE POINTER
1D48 4E                    MOV    C,M          ;POINT B,C TO NEXT
1D49 23                    INX    H            ;  PACKAGE
1D4A 46                    MOV    B,M          ;  IN MERGE FIFO
1D4B 2AEF42                LHLD   RLDBP        ;DELETE TCB
1D4E 71                    MOV    M,C          ;  FROM
1D4F 23                    INX    H            ;  INDUCT MERGE
1D50 70                    MOV    M,B          ;  FIFO
1D51 210700                LXI    H,7          ;POINT H,L TO BYTE 7
1D54 19                    DAD    D            ;  IN TCB
1D55 118025                LXI    D,JUNK       ;CHANGE
1D58 73                    MOV    M,E          ;  EVENT IDB2
1D59 23                    INX    H            ;  TO
1D5A 72                    MOV    M,D          ;  JUNK
                  ;
                  ;CREATE EVENT UDB1
                  ;
1D5B 3E01                  MVI    A,1          ;GET TREE PARAMETERS
1D5D CDBA0F                CALL   GTREP        ;  FOR PPI # 1
1D60 C1                    POP    B            ;POINT B,C TO BYTE 13
1D61 0B                    DCX    B            ;  IN OLD TCB
1D62 CD892C                CALL   GUDB1        ;CREATE TCB FOR UDB1
1D65 4F                    MOV    C,A          ;C=JINDU
1D66 EB                    XCHG                ;POINT D,E TO BYTE 7 IN TCB
1D67 2A3342                LHLD   IDT          ;POINT H,L TO IDT TABLE
1D6A CD2F29                CALL   ENTCB        ;SCHEDULE EVENT UDB1
1D6D C9                    RET
                  ;;
                  ;UPDATE-PHOTO-BLOCKING PROCESSOR.
                  ;
                  ;INPUT: C= UPDATE PHOTO NUMBER > 0.
                  ;OUTPUT: NEW SCHEDULED EVENTS, UDBT FOR SDVRS, LDVP FOR SCDVA,
                  ;  JDV FOR SCHDC.
                  ;ALL REGISTERS AND JUPDA EFFECTED.
                  ;
1D6E 79           UDBPC:   MOV    A,C          ;SAVE UPDATE PHOTO
1D6F 329542                STA    JUPDA        ;  NUMBER
1D72 0600                  MVI    B,0          ;B,C=JUPDA
1D74 0B                    DCX    B            ;B,C=JUPDA-1
1D75 2A5142                LHLD   UDDB         ;POINT
1D78 09                    DAD    B            ;  H,L
1D79 09                    DAD    B            ;  TO
1D7A 09                    DAD    B            ;  PMUZ(JUPDA)
1D7B 09                    DAD    B            ;  IN UDDB
1D7C 03                    INX    B            ;B,C=JUPDA
```

```
1D7D 5E              MOV   E,M         ;D,E
1D7E 70              MOV   M,B         ;  = PMUZ,
1D7F 23              INX   H           ;  AND NEW
1D80 56              MOV   D,M         ;  PMUZ IN UDDB
1D81 70              MOV   M,B         ;  = 0
1D82 E5              PUSH  H           ;SAVE POINTER TO BYTE 1 IN UDDB
1D83 7B              MOV   A,E         ;IF OLD
1D84 B2              ORA   D           ;  PMUZ
1D85 C2AA1D          JNZ   UBPN0       ;  NULL
                ;
                ;UNIDENTIFIED PACKAGE DETECTED AT UD
                ;
1D88 CD080F          CALL  ERPC        ;ERROR 0 TO MASTER KB
1D8B CDCB0F          CALL  GETFS       ;GET FREE BLOCK FOR TCB
1D8E E5              PUSH  H           ;SAVE TCB POINTER
1D8F 110D00          LXI   D,13        ;POINT H,L TO BYTE 13
1D92 19              DAD   D           ;  IN TCB
1D93 72              MOV   M,D         ;IDENT
1D94 2B              DCX   H           ;  IN TCB
1D95 72              MOV   M,D         ;  = 0
1D96 2B              DCX   H           ;POINT H,L TO BYTE 11 IN TCB
1D97 3A303D          LDA   ERCHU       ;JDV IN TCB
1D9A 77              MOV   M,A         ;  =ERCHU
1D9B 2B              DCX   H           ;POINT H,L TO BYTE 10 IN TCB
1D9C 3A9542          LDA   JUPDA       ;A=JUPDA
1D9F 77              MOV   M,A         ;SET JUPDA IN TCB
1DA0 2B              DCX   H           ;JINDU IN TCB
1DA1 3601            MVI   M,1         ;  = 1
1DA3 2B              DCX   H           ;POINT H,L TO BYTE 8 IN TCB
1DA4 72              MOV   M,D         ;EVENT IN TCB
1DA5 2B              DCX   H           ;  = 0
1DA6 72              MOV   M,D         ;  FOR UDCPC
1DA7 C3541E          JMP   UBPUD
                ;
                ;INT IS AS EXPECTED; PACKAGE WITHIN UD ZONE
                ;
1DAA 210A00     UBPN0:  LXI   H,10        ;POINT H,L TO BYTE 10
1DAD 19              DAD   D           ;  IN TCB AT PMUZ
1DAE 79              MOV   A,C         ;A=JUPDA
1DAF BE              CMP   M           ;IF JUPDA MATCHES
1DB0 C2A71F          JNZ   UBPFX       ;  JUPDA IN TCB
                ;
1DB3 D5              PUSH  D                   ;SAVE TCB POINTER
1DB4 2B              DCX   H                   ;POINT H,L TO BYTE 8
1DB5 2B              DCX   H                   ;   IN TCB
                ;
                ; TEST TO SEE IF EVENT IS UDB2 OR DCB2
1DB6 2B              DCX   H                   ;H,L= EVENT LSB
1DB7 11D924          LXI   D,UDB2              ;D,E=UDB2
1DBA 7B              MOV   A,E                 ;A= LSB
1DBB 96              SUB   M                   ;
1DBC 47              MOV   B,A                 ;B= LSB RESULT
1DBD 23              INX   H                   ;
1DBE 7A              MOV   A,D                 ;A= MSB
1DBF 96              SUB   M                   ;MSB SUBTRACT
1DC0 90              SUB   B                   ;(UDB2-EVENT)
1DC1 CA481E          JZ    UBPN1               ;JMP IF EVENT UDB2
                ;
                ; EVENT = DCB2. THEREFORE SEND DAS THE MESSAGE U(IF MASKED) AND SEND
                ;PACKAGE TO ERCHU.DON'T CLEAR FROM TRANSACTION TAB AS PACK STILL TRAKIN
1DC4 3A2B42          LDA   ICMO                ;ICMO=1?
1DC7 A7              ANA   A
1DC8 CA391E          JZ    UBPN2               ;JMP IF NOT IN I/C MODE
1DCB 212C3D          LXI   H,ERMKO+4           ;H,L= MASK BYTE 4
1DCE 7E              MOV   A,M
1DCP E610            ANI   10H                 ;LOOK AT BIT 4
1DD1 CA3E1E          JZ    UBPN3               ;JMP IF U NOT MASKED
                ; SEND MESSAGE U TO DAS
                ; LOAD PACKAGE CODE INTO BUFFER BYT16 FROM TRANSACTION TABLE IF IDENT
                ;NOT=0.IF IDENT=0,LOAD 6 ASCII 0'S INTO BYT16.DON'T CLEAR PACKAGE
                ; CODE FROM TRANSACTION TABLE AS PACKAGE IS STILL BEING TRACKED.
1DD4 E1              POP   H                   ;H,L= TCB LOC
1DD5 E5              PUSH  H                   ;STACK=SAME
1DD6 110C00          LXI   D,12                ;
1DD9 19              DAD   D                   ;H,L= IDENT LSB
1DDA 5E              MOV   E,M                 ;
1DDB 23              INX   H                   ;H,L=IDENT MSB
1DDC 56              MOV   D,M                 ;D,E=IDENT=LOC OF PACK CODE IN TRANS TAB
1DDD 7B              MOV   A,E                 ;A= IDENT LSB
1DDE B2              ORA   D                   ;OR WITH IDENT MSB
1DDF CAE91D          JZ    UPACK               ;JMP IF IDENT = 0
1DE2 EB              XCHG                      ;H,L= TRANS TAB LOC OF PACK CODE
1DE3 CD6C1A          CALL  TRANP               ;LOAD PACK CODE INTO BYT16 BYTES 2-7
1DE6 C3FD1D          JMP   PSTAK               ;JMP TO PSTAK
1DE9 3E30       UPACK:  MVI   A,'0'               ;STORE ASCII 0 INTO BYT16 FOR PACK CODE
1DEB 321A43          STA   BYT16+2             ;
1DEE 321B43          STA   BYT16+3             ;
1DF1 321C43          STA   BYT16+4             ;
```

```
1DF4 321D43           STA   BYT16+5          ;
1DF7 321E43           STA   BYT16+6          ;
1DFA 321F43           STA   BYT16+7          ;
1DFD E1      PSTAK:   POP   H                ;H,L+TCB LOC
1DFE E5               PUSH  H                ;STACK= SAME
             ; CONVERT BINARY JDV AND JINDU INTO ASCII AND STORE IN BYT16 BUFFER
             ;
1DFF 110900           LXI   D,9
1E02 19               DAD   D                ;H,L= JINDU LOC
1E03 7E               MOV   A,M              ;A= JINDU BINARY VALUE
1E04 CD010E           CALL  ECDIG            ;CONVERT TO ASCII
1E07 3A7E42           LDA   XYZ1
1E0A 322043           STA   BYT16+8          ;STORE ASCII 10'S
1E0D 3A7F42           LDA   XYZ0
1E10 322143           STA   BYT16+9          ;STORE ASCII 1'S
1E13 E1               POP   H                ;H,L= TCB LOC
1E14 E5               PUSH  H                ;STACK= SAME
1E15 110B00           LXI   D,11
1E18 19               DAD   D                ;H,L= JDV BINARY VALUE LOC
1E19 7E               MOV   A,M              ;A= JDV BINARY VALUE
1E1A CD010E           CALL  ECDIG            ;CONVERT TO ASCII
1E1D 3A7D42           LDA   XYZ2
1E20 322243           STA   BYT16+10         ;STORE ASCII 100'S
1E23 3A7E42           LDA   XYZ1
1E26 322343           STA   BYT16+11         ;STORE ASCII 10'S
1E29 3A7F42           LDA   XYZ0
1E2C 322443           STA   BYT16+12         ;STORE ASCII 1'S
1E2F 211843           LXI   H,BYT16          ;H,L= BYT16 LOC
1E32 23               INX   H
1E33 3E55             MVI   A,'U'            ;MAKE BYTE 1 = ASCII U
1E35 77               MOV   M,A
1E36 CD7D1A           CALL  DSLD             ;LOAD BYT16 INTO FS
             ;
             ; PUT ERROR 5 ON KB
1E39 3E05    UBPN2:   MVI   A,5              ;A=5
1E3B CD080F           CALL  ERPC             ;DISPLAY ON KB
             ;
             ; SEND PACKAGE TO ERCHU
1E3E E1      UBPN3:   POP   H                ;H,L= TCB LOC
1E3F E5               PUSH  H                ;STACK= SAME
1E40 110B00           LXI   D,11
1E43 19               DAD   D                ;H,L= JDV LOC IN TCB
1E44 3A303D           LDA   ERCHU            ;A= ERCHU
1E47 77               MOV   M,A              ;SET JDV=ERCHU
             ;
             ; CHANGE EVENT DCB2 TO UDB3
1E48 E1      UBPN1:   POP   H                ;H,L= TCB LOC
1E49 E5               PUSH  H                ;STACK= SAME
1E4A 110800           LXI   D,8
1E4D 19               DAD   D                ;H,L= EVENT MSB
1E4E 119925           LXI   D,UDB3           ;D,E=UDB3
1E51 72               MOV   M,D
1E52 2B               DCX   H
1E53 73               MOV   M,E              ;D,E= UDB3= EVENT IN TCB
             ;
1E54 D1      UBPUD:   POP   D          ;POINT D,E TO TCB
1E55 E1               POP   H          ;POINT H,L TO BYTE 2
1E56 23               INX   H          ;  IN  UDDB
1E57 7E               MOV   A,M        ;IF
1E58 23               INX   H          ;  PUD
1E59 B6               ORA   M          ;  IN UDDB
1E5A CA681E           JZ    UPPUD      ;  =0, THEN FINE
             ;
             ;  ;FAKE AN UD-CLEAR INTERRUPT IF IT WAS LOST
             ;
1E5D E5               PUSH  H          ;SAVE
1E5E D5               PUSH  D          ;  POINTERS
1E5F 3A9542           LDA   JUPDA      ;PICK UP UPDATE
1E62 4F               MOV   C,A        ;  PHOTO #
1E63 CD3120           CALL  UDCPC      ;FAKE UD-CLEAR INTERRUPT
1E66 D1               POP   D          ;RESTORE
1E67 E1               POP   H          ;  POINTERS
1E68 72      UPPUD:   MOV   M,D        ;POINT PUD
1E69 2B               DCX   H          ;  IN UDDB
1E6A 73               MOV   M,E        ;  TO TCB
1E6B 210B00           LXI   H,11       ;POINT H,L TO BYTE 11
1E6E 19               DAD   D          ;  IN TCB
1E6F E5               PUSH  H          ;SAVE POINTER
1E70 3A9542           LDA   JUPDA      ;A=JUPDA
1E73 CDAD0F           CALL  GUTR1      ;GET TREE PARAMETERS FOR UD # JUPDA
             ;
             ;SCHEDULE BMG FOR SIDE INDUCT
             ;
1E76 3A313D           LDA   SIDEO      ;IF SIDE INDUCT
1E79 E610             ANI   010H       ;  THEN
1E7B C4AE1F           CNZ   SCBMG      ;  SCHEDULE BMG
             ;
             ;CONTINUE TO TRACK PACKAGE OR SCHEDULE DIVERTS
```

```
                     ;
1E7E 2AB642                  LHLD   CTIME       ;SET UDBT FOR
1E81 229942                  SHLD   UDBT        ;  SDVRS
1E84 3A9542                  LDA    JUPDA       ;A
1E87 D602                    SUI    2           ;  = UPDATE PHOTO # - 2
1E89 2A3D42                  LHLD   LDVDB       ;POINT H,L TO LDV(1)
1E8C 85                      ADD    L           ;POINT H,L
1E8D 6F                      MOV    L,A         ;  TO LDV(JUPDA-1)
1E8E 22F742                  SHLD   LDVP        ;SET LDVP FOR SCDVA, UBNXU
1E91 C1                      POP    B           ;POINT B,C TO BYTE 11 IN TCB
1E92 0A                      LDAX   B           ;A=JDV
1E93 329642                  STA    JDV         ;SAVE JDV FOR SCHDC AND SCDVA
1E96 03                      INX    B           ;POINT B,C TO BYTE 13
1E97 03                      INX    B           ;  IN TCB
1E98 B7                      ORA    A           ;JDV=0 MEANS TO
1E99 CA4A1F                  JZ     UBNXU       ;  RECIRCULATE
1E9C 3D                      DCR    A           ;A=JDV-1
1E9D BE                      CMP    M           ;IF JDV-1 >= LDV(JUPDA-1),
1E9E DA4A1F                  JC     UBNXU       ;  I.E., IF JDV > LDV(JUPDA-1)
1EA1 23                      INX    H           ;POINT H,L TO LDV(JUPDA)
1EA2 BE                      CMP    M           ;IF JDV-1 < LDV,
1EA3 D24A1F                  JNC    UBNXU       ;  I.E., IF JDV <= LDV
                     ;
                     ;  ;PACKAGE IS TO BE DIVERTED BEFORE NEXT UD OR END OF CONVEYOR
                     ;
1EA6 C5                      PUSH   B                  ;STACK = BYTE 13 OF PACKAGE TCB
1EA7 3A2B42                  LDA    ICMO               ;
1EAA D601                    SUI    1                  ;
1EAC CAB41E                  JZ     CKDLF              ;JMP IF I/C MODE
1EAF CDD41F          CSCDV:  CALL   SCDVA              ;SCHEDULE DIVERT
1EB2 C1                      POP    B                  ;ADJUST STACK
1EB3 C9                      RET
                     ;CHECK TO SEE IF DIVERT LANE IS FULL
                     ;
1EB4 3A9642          CKDLF:  LDA    JDV                ;A= DVT#
1EB7 47                      MOV    B,A                ;B= DVT#
1EB8 CD250D                  CALL   CPLFM              ;CHECK FOR LANE FULL
1EBB A6                      ANA    M                  ;IF DVT LANE FULL, CLEAR ZERO FLAG
1EBC C2D11E                  JNZ    CKAMK              ;JMP IF LANE FULL
                     ;DIVERT LANE NOT FULL. TEST FOR DIVERT COMPLETE OPTION
                     ;
1EBF C1                      POP    B                  ;B,C= BYTE 13 LOC OF TCB
1EC0 C5                      PUSH   B                  ;STACK = SAME
1EC1 3A3B3D                  LDA    DCO                ;DCO= 2?
1EC4 D602                    SUI    2                  ;
1EC6 C2AF1E                  JNZ    CSCDV              ;JMP IF DCO NOT= 2
1EC9 CD1E20                  CALL   SCHDC              ;SCHEDULE DCB1 IN ORDER TO SEND MESSAGE
                                                       ;  S OR U
1ECC C1                      POP    B                  ;B,C= BYTE 13 LOC OF TCB
1ECD C5                      PUSH   B                  ;STACK = SAME
1ECE C3AF1E                  JMP    CSCDV              ;JMP TO SCHEDULE DIVERT
                     ;DIVERT LANE IS FULL. SEND MESSAGE A AND SEND PACKAGE TO LFEDV
                     ;IF MESSAGE A IS MASKED.
1ED1 212A3D          CKAMK:  LXI    H,ERMKO+2          ;H,L= ERMKO BYTE 2
1ED4 7E                      MOV    A,M                ;A= BYTE 2
1ED5 E601                    ANI    01H                ;LOOK AT BIT 0
1ED7 CA3F1F                  JZ     SLFDV              ;JMP IF A NOT MASKED
1EDA C1                      POP    B                  ;B,C= BYTE 13 OF PACKAGE TCB
1EDB C5                      PUSH B                    ;STACK=SAME
1EDC 69                      MOV    L,C                ;
1EDD 60                      MOV    H,B                ;H,L= BYTE 13 LOC OF TCB
1EDE 56                      MOV    D,M                ;
1EDF 2B                      DCX    H                  ;H,L= BYTE 12 LOC
1EE0 5E                      MOV    E,M                ;D,E= IDENT VALUE
                     ;ACCESS PACKAGE CODE FROM TRANSACTION TABLE AND LOAD INTO BYTES 2-7 OF
                     ;BUFFER BYT16 IF IDENT NOT=0.IF IDENT=0,LOAD 6 ASCII 0'S INTO BYT16 FOR
                     ;PACK CODE. IN EITHER CASE, DON'T REMOVE FROM TRANSACTION TABLE AS
                     ;PACKAGE IS STILL TRACKING.
1EE1 7B                      MOV    A,E                ;
1EE2 B2                      ORA    D                  ;
1EE3 CAEF1E                  JZ     APACK              ;JMP IF IDENT=0
1EE6 EB                      XCHG                      ;H,L= IDENT= LOC OF PACK CODE
1EE7 E5                      PUSH   H                  ;STACK= SAME
1EE8 CD6C1A                  CALL   TRANP              ;TRANSFER PACK CODE TO BYT16 BYTES 2-7
1EEB E1                      POP    H                  ;ADJUST STACK
1EEC C3031F                  JMP    LOADH              ;JMP TO LOADH
1EEF 3E30            APACK:  MVI    A,30H              ;STORE 6 ASCII 0'S AS PACK CODE
1EF1 321A43                  STA    BYT16+2            ;
1EF4 321B43                  STA    BYT16+3            ;
1EF7 321C43                  STA    BYT16+4            ;
1EFA 321D43                  STA    BYT16+5            ;
1EFD 321E43                  STA    BYT16+6            ;
1F00 321F43                  STA    BYT16+7            ;
                     ;CONVERT BINARY INDUCT AND DVT# IN PACKAGE TCB INTO ASCII AND STORE IN
                     ;BUFFER BYT16.
                     ;
1F03 E1              LOADH:  POP    H                  ;H,L= BYTE 13 LOC IN PACK TCB
```

```
1F04 E5              PUSH  H             ;STACK= SAME
1F05 11FCFF         .LXI   D,-4          ;
1F08 19              DAD   D             ;H,L= JINDU LOC
1F09 7E              MOV   A,M           ;A= JINDU IN BINARY
1F0A CD010E          CALL  ECDIG         ;CONVERT TO ASCII
1F0D 3A7E42          LDA   XYZ1          ;
1F10 322043          STA   BYT16+8       ;WSTORE ASCII 10'S DIGIT
1F13 3A7F42          LDA   XYZ0          ;
1F16 322143          STA   BYT16+9       ;STORE ASCII 1'S DIGIT
1F19 E1              POP   H             ;H,L= TCB BYTE 13 LOC
1F1A E5              PUSH  H             ;
1F1B 11FEFF          LXI   D,-2          ;H,L= JDV LOC
1F1E 19              DAD   D             ;
1F1F 7E              MOV   A,M           ;A= JDV IN BINARY
1F20 CD010E          CALL  ECDIG         ;CONVERT TO ASCII
1F23 3A7D42          LDA   XYZ2          ;
1F26 322243          STA   BYT16+10      ;STORE 100'S DIGIT
1F29 3A7E42          LDA   XYZ1          ;
1F2C 322343          STA   BYT16+11      ;STORE 10'S DIGIT
1F2F 3A7F42          LDA   XYZ0          ;
1F32 322443          STA   BYT16+12      ;STORE 1'S DIGIT
1F35 211843          LXI   H,BYT16       ;
1F38 23              INX   H             ;H,L= BYT16 BYTE 1
1F39 3E41            MVI   A,'A'         ;
1F3B 77              MOV   M,A           ;STORE ASCII A
1F3C CD7D1A          CALL  DSLD          ;STORE MESSAGE A IN FS
                    ;
                    ;SEND PACKAGE TO LFEDV
                    ;
1F3F C1     SLFDV:   POP   B             ;B,C= BYTE 13 OF TCB
1F40 69              MOV   L,C           ;H,L= BYTE 13 LOC OF TCB
1F41 60              MOV   H,B           ;
1F42 11FEFF          LXI   D,-2          ;
1F45 19              DAD   D             ;H,L= JDV LOC (BYTE 11)
1F46 3A3D3D          LDA   LFEDV         ;
1F49 77              MOV   M,A           ;JDV IN TCB NOW=LFEDV
                    ;
                    ;  ;TRANSFER PACKAGE TO NEXT UD
                    ;
1F4A C5     UBNXU:   PUSH  B        ;SAVE POINTER TO BYTE 13 IN TCB
1F4B 2AF742          LHLD  LDVP     ;POINT H,L TO LDV(JUPDA-1)
1F4E 4E              MOV   C,M      ;C= LDV(JUPDA-1)
1F4F 0C              INR   C        ;C= 1ST DV # FOR THIS UD
1F50 23              INX   H        ;A
1F51 7E              MOV   A,M      ;  = LDV(JUPDA)
1F52 CD7727          CALL  SDVRS    ;SCHEDULE RESETS OF ALL DV'S FOR THIS UD
1F55 C1              POP   B        ;POINT B,C TO BYTE 13 IN TCB
                    ;
                    ;  ;  ;SCHEDULE UDB1 IF NECESSARY
                    ;
1F56 3A9542          LDA   JUPDA    ;IF
1F59 21043D          LXI   H,NUPDA  ;  JUPDA
1F5C BE              CMP   M        ;  <
1F5D D26C1F          JNC   USUD1    ;  NUPDA
1F60 CD892C          CALL  GUDB1    ;CREATE TCB FOR UDB1 FOR NEXT UD
1F63 4B              MOV   C,E      ;C= OLD JUPDA
1F64 EB              XCHG           ;POINT D,E TO BYTE 7 IN TCB
1F65 2A3742          LHLD  UDT      ;POINT H,L TO UDT TABLE
1F68 CD2F29          CALL  ENTCB    ;SCHEDULE UDB1 FOR NEXT UD
1F6B C9              RET .
                    ;
                    ; PACKAGE HAS JUST PASSED LAST UPDATE PHOTO. IF IN I/C MODE, AND IDENT
                    ; NOT=0, REMOVE PACK CODE FROM TRANSACTION TABLE.
                    ;
1F6C 3A2B42 USUD1:   LDA   ICMO          ;TEST TO SEE IF ARE IN I/C MODE
1F6F D600            SUI   0             ;
1F71 CA8F1F          JZ    USUDP         ;JMP IF NOT IN I/C MODE
                    ;
                    ; ARE IN I/C MODE. TEST TO SEE IF PACK CODE IS IN TRANS TABLE
1F74 60              MOV   H,B           ;
1F75 69              MOV   L,C           ;H,L= TCB BYTE 13 LOC
1F76 7E              MOV   A,M           ;A= IDENT MSB
1F77 D600            SUI   0
1F79 C2861F          JNZ   USUDJ         ;JMP IF IDENT MSB NOT=0
1F7C 2B              DCX   H             ;H,L= IDENT LSB LOC
1F7D 7E              MOV   A,M
1F7E D600            SUI   0
1F80 C2861F          JNZ   USUDJ         ;JMP IF IDENT LSB NOT = 0
1F83 C38F1F          JMP   USUDP         ;JMP IF IDENT = 0
                    ;
                    ; PACKAGE HAS JUST PASSED LAST UPDATE PHOTO WITH IDENT NOT=0. THEREFORE
                    ; REMOVE PACKAGE CODE FROM TRANSACTION TABLE
1F86 60     USUDJ:   MOV   H,B           ;
1F87 69              MOV   L,C      ;H,L=IDENT MSB LOC
1F88 56              MOV   D,M
1F89 2B              DCX   H
1F8A 5E              MOV   E,M      ;D,E=IDENT
```

```
1F8B EB                 XCHG                 ;H,L=SAME
1F8C CD401A             CALL   ZPACK         ;REMOVE PACK CODE FROM TRANS TAB
                ;
1F8F 3A313D     USUDP:  LDA    SIDEO         ;IF SIDE-INDUCT RE-CIRCULATION
1F92 E602               ANI    02H           ;  AUTO-REINDUCT
1F94 C8                 RZ                   ;  DESIRED
1F95 CD892C             CALL   GUDB1         ;CREATE TCB FOR UDB1, E=JUPDA
1F98 4B                 MOV    C,E           ;C=JUPDA, SHOULD = NUPDA
1F99 EB                 XCHG                 ;POINT D,E TO BYTE 7 IN TCB
1F9A 210300             LXI    H,3           ;POINT H,L TO BYTE 10
1F9D 19                 DAD    D             ;  IN TCB
1F9E 3601               MVI    M,1           ;JUPDA IN TCB = 1
1FA0 2A3742             LHLD   UDT           ;POINT H,L TO UDT TABLE
1FA3 CD2F29             CALL   ENTCB         ;SCHEDULE UDB1 FOR UD # 1
1FA6 C9                 RET
                ;
                ;OLD TCB FOR UDB2 FOUND TO BE SCRIBBLED; OR
                ;  UPDATE DATA SCRIBBLED (MAY BE DUE TO LOST UD-CLEARING INTERRUPT)
                ;
1FA7 3E0A       UBPFX:  MVI    A,10          ;FATAL ERROR
1FA9 CD0C2C             CALL   FATAL         ;  10
1FAC E1                 POP    H             ;RESET SP
1FAD C9                 RET
                ;;
                ;CALLED BY UDBPC TO SCHEDULE EVENT BMG FOR SIDE INDUCT.
                ;
                ;INPUT: JUPDA= UPDATE #, TREE PARAMETERS.
                ;OUTPUT: EVENT BMG IN TREE.
                ;ALL REGISTERS EFFECTED.
                ;
1FAE 3A9542     SCBMG:  LDA    JUPDA         ;PICK UP
1FB1 4F                 MOV    C,A           ;  UPDATE
1FB2 0600               MVI    B,0           ;  PHOTO #
1FB4 2A3F42             LHLD   FIDDB         ;GET NUMBER OF INDUCT
1FB7 09                 DAD    B             ;  FOLLOWING
1FB8 2B                 DCX    H             ;  IF
1FB9 4E                 MOV    C,M           ;  ANY
1FBA 0D                 DCR    C             ;DO NOTHING IF
1FBB 0C                 INR    C             ;  NO INDUCT
1FBC C8                 RZ                   ;  FOLLOWS
                ;
1FBD CDCB0F             CALL   GETFS         ;GET FREE BLOCK
1FC0 110900             LXI    D,9           ;POINT H,L TO BYTE 9
1FC3 19                 DAD    D             ;  IN TCB
1FC4 71                 MOV    M,C           ;SET INDUCT # IN TCB
1FC5 2B                 DCX    H             ;POINT H,L TO BYTE 8 IN TCB
1FC6 111A24             LXI    D,BMG         ;POINT EVENT
1FC9 72                 MOV    M,D           ;  IN TCB
1FCA 2B                 DCX    H             ;  TO
1FCB 73                 MOV    M,E           ;  BMG
1FCC EB                 XCHG                 ;POINT D,E TO BYTE 7 IN TCB
1FCD 2A2F42             LHLD   PRET          ;POINT H,L TO PRET TABLE
1FD0 CD2F29             CALL   ENTCB         ;SCHEDULE EVENT BMG
1FD3 C9                 RET
                ;;
                ;SCHEDULE DIVERT ACTUATION EVENTS AFTER
                ;  PACKAGE HAS HIT ITS LAST UPDATE PHOTO.
                ;  CALLED BY UDBPC.
                ;
                ;INPUT: B,C POINTS TO BYTE 13 IN OLD TCB, TREE PARAMETERS,
                ;  UDBT, JDV, LDVP POINTS TO LDV(JUPDA-1).
                ;ALL REGISTERS EFFECTED.
                ;
1FD4 2AF742     SCDVA:  LHLD   LDVP          ;POINT H,L TO LDV(JUPDA-1)
1FD7 C5                 PUSH   B             ;STACK = BYTE 13 OF OLD TCB
1FD8 4E                 MOV    C,M           ;C= LDV(JUPDA-1)
1FD9 0C                 INR    C             ;C= 1ST DV FOR THIS UD
1FDA 3A9642             LDA    JDV           ;A
1FDD 3D                 DCR    A             ;  =JDV-1
1FDE CD7727             CALL   SDVRS         ;SCHEDULE RESETS OF DV'S BEFORE # JDV
                ;
                ;SCHEDULE ACTUATION OF DV # JDV
                ;
1FE1 CDCB0F             CALL   GETFS         ;GET FREE STORAGE
1FE4 D1                 POP    D             ;D,E= BYTE 13 OF OLD TCB LOC
1FE5 E5                 PUSH   H             ;STACK= LOC OF NEW TCB
1FE6 EB                 XCHG                 ;H,L= BYTE 13 OF OLD TCB LOC
1FE7 7E                 MOV    A,M           ;A= IDENT MSB
1FE8 329842             STA    IDENT+1       ;STORE IN WORKING MEMORY
1FEB 2B                 DCX    H             ;H,L= BYTE 12 OF OLD TCB LOC
1FEC 7E                 MOV    A,M           ;A= IDENT LSB
1FED 329742             STA    IDENT         ;STORE IN WORKING MEMORY
1FF0 2B                 DCX    H
1FF1 2B                 DCX    H
1FF2 2B                 DCX    H             ;H,L= BYTE 9 OF OLD TCB
1FF3 7E                 MOV    A,M           ;A= JINDU
1FF4 329442             STA    JINDU         ;STORE IN WORKING MEMORY
```

```
1FF7 E1                 POP    H          ;H,L= LOC OF NEW TCB
1FF8 110D00             LXI    D,13       ;D,E= 13
1FFB 19                 DAD    D          ;H,L= LOC OF BYTE 13 IN NEW TCB
1FFC 3A9842             LDA    IDENT+1    ;A= IDENT MSB
1FFF 77                 MOV    M,A        ;SET IN NEW TCB
2000 3A9742             LDA    IDENT      ;A= IDENT LSB
2003 2B                 DCX    H          ;H,L= BYTE12 LOC IN NEW TCB
2004 77                 MOV    M,A        ;SET IN NEW TCB
2005 2B                 DCX    H          ;H,L= BYTE 11 LOC IN NEW TCB
2006 3A9442             LDA    JINDU      ;A= JINDU
2009 77                 MOV    M,A        ;SET IN JDV LOC FOR DVACT TCB
200A 2B                 DCX    H          ;H,L= BYTE 10 LOC
200B 3601               MVI    M,1         ;SET DIVERT FLAG = 1 FOR SETTING DV
200D 2B                 DCX    H           ;SET JDV
200E 3A9642             LDA    JDV         ;  IN
2011 77                 MOV    M,A         ;  TCB
2012 2B                 DCX    H           ;POINT H,L TO BYTE 8 IN TCB
2013 11A526             LXI    D,DVACT     ;LET
2016 72                 MOV    M,D         ;  EVENT
2017 2B                 DCX    H           ;  BE
2018 73                 MOV    M,E         ;  DVACT
2019 4F                 MOV    C,A         ;C=JDV
201A CD1D29             CALL   ENDVA       ;SCHEDULE DVACT
201D C9                 RET
                ;
                ; SUBROUTINE SCHDC
                ;
                ;          INPUTS: B,C POINTS TO BYTE 13 OF PACKAGE TCB,TREE PARAMETERS,
                ;                  UDBT,JDV,LDVP POINTS TO LDV(JUPDA-1)(INPUTS SAME AS
                ;                  FOR SCDVA).
                ;
                ;          OUTPUTS: EVENT DCB1 CREATED AND SCHEDULED. DCB1 IS LOWER BOUND
                ;                   ON MUZ FOR NEXT UPDATE PHOTO
                ;
                ;          PROCESS: CREATE EVENT DCB1 BY CALLING GUDB1 AND THEN CHANGING
                ;                   EVENT TO DCB1. SCHEDULE DCB1 BY CALLING ENTCB
                ;
201E CD892C     SCHDC:     CALL   GUDB1              ;CREATE TCB FOR EVENT UDB1. RETURN WITH
                                                     ;H,L AT BYTE 7 OF NEW TCB,E=OLD JUPDA
2021 01A525                LXI    B,DCB1             ;B,C= DCB1 EVENT LOC
2024 23                    INX    H                  ;H,L= BYTE 8 OF NEW TCB
2025 70                    MOV    M,B                ;MAKE EVENT IN NEW TCB= DCB1
2026 2B                    DCX    H                  ;H,L= BYTE 7 OF NEW TCB
2027 71                    MOV    M,C                ;EVENT IN NEW TCB NOW = DCB1
2028 4B                    MOV    C,E                ;C= OLD JUPDA
2029 EB                    XCHG                      ;POINT D,E TO BYTE 7 OF NEW TCB=EVENT
202A 2A3742                LHLD   UDT                ;POINT H,L TO UDT TABLE
202D CD2F29                CALL   ENTCB              ;SCHEDULE DCB1 FOR NEXT UD
2030 C9                    RET                       ;RET TO UDBPC
                ;
                ;UPDATE-PHOTO-CLEARING PROCESSOR.
                ;
                ;INPUT: C=JUPDA (P
                ;UPDATE-PHOTO-CLEARING PROCESSOR.
                ;
                ;INPUT: C=JUPDA (PHOTO #).
                ;ALL REGISTERS EFFECTED.
                ;
2031 0600       UDCPC:     MVI    B,0         ;B,C=JUPDA
2033 2A5142                LHLD   UDDB        ;POINT H,L TO UDDB TABLE
2036 09                    DAD    B           ;POINT
2037 09                    DAD    B           ;  H,L TO
2038 09                    DAD    B           ;  PMUZ IN UDDB
2039 09                    DAD    B           ;  FOR UD # JUPDA+1
203A 2B                    DCX    H           ;POINT H,L TO PUD MS BYTE IN UDDB
203B 56                    MOV    D,M         ;SET
203C 70                    MOV    M,B         ;  D,E
203D 2B                    DCX    H           ;  = PUD IN UDDB
203E 5E                    MOV    E,M         ;  POINTING TO TCB
203F 70                    MOV    M,B         ;  & ZERO PUD IN UDDB
2040 7B                    MOV    A,E         ;IF
2041 B2                    ORA    D           ;  TCB
2042 CAA420                JZ     UCPCE       ;  NONNULL
                ;
                ;D,E POINTS TO NONNULL PACKAGE TCB
                ;
2045 D5                    PUSH   D           ;SAVE TCB POINTER
2046 C5                    PUSH   B           ;SAVE JUPDA
2047 CDAC0F                CALL   GUTRE       ;GET TREE PARAMETERS
204A C1                    POP    B           ;B,C=JUPDA
204B C5                    PUSH   B           ;SAVE UPDATE PHOTO #
204C 3A313D                LDA    SIDEO       ;IF SIDE INDUCT
204F E610                  ANI    010H        ;  THEN
2051 C4AA20                CNZ    SCCMG       ;  SCHEDULE CMG
                ;
2054 C1                    POP    B           ;RESTORE BC = UPDATE PHOTO #
2055 2A3D42                LHLD   LDVDB       ;POINT H,L TO LDV TABLE
2058 09                    DAD    B           ;POINT H,L TO LDV
```

```
2059 2B              DCX    H          ;  FOR THIS UD
205A 7E              MOV    A,M        ;A= LDV FOR THIS UD
205B D1              POP    D          ;POINT D,E TO TCB
205C 210B00          LXI    H,11       ;POINT H,L TO BYTE 11
205F 19              DAD    D          ;  IN TCB
2060 BE              CMP    M          ;IF LDV FOR THIS UD
2061 DA8E20          JC     UCUSE      ;  >= JDV

             ;
             ;SCHEDULE PROGRAM-MEASURED DIVERT RESET IF DESIRED
             ;
2064 3A383D          LDA    DVTRS      ;IF
2067 3D              DCR    A          ;  MEASURED
2068 C28E20          JNZ    UCUSE      ;  RESET
             ;
206B D5              PUSH   D          ;SAVE TCB POINTER
206C 4E              MOV    C,M        ;C=JDV
206D 2AB642          LHLD   CTIME      ;D,E
2070 EB              XCHG              ;  = CTIME
2071 2A0840          LHLD   DVH        ;ADD CONSTANT
2074 19              DAD    D          ;  DVH
2075 229942          SHLD   UDBT       ;SET UDBT FOR ENDVA
2078 CDCB0F          CALL   GETFS      ;GET FREE BLOCK
207B 110A00          LXI    D,10       ;POINT H,L TO BYTE 10
207E 19              DAD    D          ;  IN TCB
207F 3602            MVI    M,2        ;SET DV MODE = 2 FOR RESETTING DV
2081 2B              DCX    H          ;SET DIVERT #
2082 71              MOV    M,C        ;  IN TCB
2083 2B              DCX    H          ;POINT H,L TO BYTE 8 IN TCB
2084 11A526          LXI    D,DVACT    ;LET
2087 72              MOV    M,D        ;  EVENT
2088 2B              DCX    H          ;  BE
2089 73              MOV    M,E        ;  DVACT
208A CD1D29          CALL   ENDVA      ;SCHEDULE DV RESET
208D D1              POP    D          ;POINT D,E TO TCB
             ;
             ;TCB HAS TO BE RETURNED TO FREE STORAGE AFTER HAVING BEEN USED
             ; ' BY BOTH UDB3 AND UDCPC, OR UDCPC AND JUNK.
             ;
208E 210700  UCUSE:  LXI    H,7        ;POINT H,L TO
2091 19              DAD    D          ;  BYTE 7 IN TCB
2092 7E              MOV    A,M        ;IF TCB IS FOR UNIDENTIFIED PACKAGE
2093 23              INX    H          ;  FROM UDBPC, OR HAS
2094 B6              ORA    M          ;  NOT YET BEEN USED
2095 CA9F20          JZ     UCRFS      ;  BY UDB3
             ;
2098 118025          LXI    D,JUNK     ;CHANGE
209B 72              MOV    M,D        ;  EVENT
209C 2B              DCX    H          ;  TO
209D 73              MOV    M,E        ;  JUNK
209E C9              RET
             ;
209F EB      UCRFS:  XCHG              ;H,L POINTS TO TCB
20A0 CD4F11          CALL   PUTFS      ;RETURN TO FREE STORAGE
20A3 C9              RET
             ;
             ;SPURIOUS INTERRUPT
             ;
20A4 3E0D    UCPCE:  MVI    A,13       ;ERROR 13
20A6 CD080F          CALL   ERPC       ;  TO MASTER KB
20A9 C9              RET
             ;
             ;SCHEDULE EVENT CMG FOR SIDE INDUCT.
             ;  CALLED BY UDCPC.
             ;
             ;INPUT: B,C= UPDATE #, TREE PARAMETERS.
             ;OUTPUT: EVENT CMG IN TREE.
             ;ALL REGISTERS EFFECTED.
             ;
20AA 2A3F42  SCCMG:  LHLD   FIDDB      ;GET NUMBER OF INDUCT
20AD 09              DAD    B          ;  FOLLOWING
20AE 2B              DCX    H          ;  IF
20AF 4E              MOV    C,M        ;  ANY
20B0 0D              DCR    C          ;DO NOTHING IF
20B1 0C              INR    C          ;  NO INDUCT
20B2 C8              RZ                ;  FOLLOWS
             ;
20B3 CDCB0F          CALL   GETFS      ;GET FREE BLOCK
20B6 110900          LXI    D,9        ;POINT H,L TO BYTE 9
20B9 19              DAD    D          ;  IN TCB
20BA 71              MOV    M,C        ;SET JINDU IN TCB
20BB 2B              DCX    H          ;POINT H,L TO BYTE 8 IN TCB
20BC 112924          LXI    D,CMG      ;POINT EVENT
20BF 72              MOV    M,D        ;  IN TCB
20C0 2B              DCX    H          ;  TO
20C1 73              MOV    M,E        ;  CMG
20C2 E5              PUSH   H          ;SAVE POINTER TO BYTE 7 IN TCB
20C3 0B              DCX    B          ;B,C=JINDU-1
```

```
20C4 2A2F42          LHLD  PRET       ;POINT H,L TO
20C7 09              DAD   B          ;  PRET
20C8 09              DAD   B          ;  TIME
20C9 5E              MOV   E,M        ;D,E
20CA 23              INX   H          ;  =
20CB 56              MOV   D,M        ;  PRET TIME
20CC 2A3142          LHLD  TET        ;POINT H,L TO
20CF 09              DAD   B          ;  TET
20D0 09              DAD   B          ;  TIME
20D1 4E              MOV   C,M        ;B,C
20D2 23              INX   H          ;  =
20D3 46              MOV   B,M        ;  TET TIME
20D4 2AB642          LHLD  CTIME      ;H,L= EVTIM
20D7 19              DAD   D          ;  =CTIME+ PRET TIME
20D8 09              DAD   B          ;  + TET TIME
20D9 EB              XCHG             ;D,E= EVTIM
20DA E1              POP   H          ;POINT H,L TO BYTE 6
20DB 2B              DCX   H          ;  IN TCB
20DC 72              MOV   M,D        ;SET EVTIM
20DD 2B              DCX   H          ;  IN
20DE 73              MOV   M,E        ;  TCB
20DF 11FBFF          LXI   D,0FFFBH   ;POINT H,L TO
20E2 19              DAD   D          ;  TCB
20E3 CD4429          CALL  ENQU2      ;SCHEDULE CMG
20E6 C9              RET
                ;;
                ;LANE-FULL-PHOTO-BLOCKED PROCESSOR.
                ;  CALLED BY PHPC OR RINI.
                ;
                ;INPUT: C= DIVERT #.
                ;ALL REGISTERS EXCEPT B EFFECTED.
                ;
20E7 79         LFBPC:  MOV   A,C        ;A = DIVERT #
20E8 CD250D             CALL  CPLFM      ;H,L POINTS TO BYTE LF, A= MASK
20EB B6                 ORA   M          ;SET LF BIT IN LFDB
20EC 77                 MOV   M,A        ;
20ED C9                 RET
                ;
                ;
                ;LANE-FULL-PHOTO-CLEARED PROCESSOR.
                ;
                ;INPUT: C= DIVERT #.
                ;ALL REGISTERS EFFECTED.
                ;
20EE 79         LFCPC:  MOV   A,C        ;A = DIVERT #
20EF 32FB42             STA   LFDV       ;SAVE DV #
20F2 CD250D             CALL  CPLFM      ;A= LF BYTE MASK, H,L POINTS TO
                                         ;  BYTE LF
20F5 2F                 CMA              ;RESET LF BIT IN LFDB
20F6 A6                 ANA   M          ;
20F7 77                 MOV   M,A        ;
                ;
                ;CONSIDER AUTO-INDUCTION AFTER LANE CLEARS
                ;
20F8 111000             LXI   D,10H      ;D,E=E=10H
20FB 3A3C3D             LDA   LFO        ;IF LANE-CLEAR-AUTO-REINDUCT
20FE A3                 ANA   E          ;  OPTION
20FF C8                 RZ               ;  SPECIFIED
                ;
2100 2A4742             LHLD  KBDB       ;POINT H,L TO BYTE 4
2103 010400             LXI   B,4        ;  IN KBDB
2106 09                 DAD   B          ;  INITIALLY FOR KB # 1
2107 0E01               MVI   C,1        ;C = INDUCT #, = 1 INITIALLY
2109 7E         LFCAI:  MOV   A,M        ;A= AUTO-REINDUCT FLAG
210A 93                 SUB   E          ;IF FLAG IS
210B C23321             JNZ   LNXKB      ;  SET
                ;
                ;  ;CHECK DIVERT NUMBER
                ;
210E 22DA42             SHLD  KBDBP      ;SAVE POINTER FOR SNPC
2111 23                 INX   H          ;POINT H,L TO BYTE 6
2112 23                 INX   H          ;  IN KBDB
2113 5E                 MOV   E,M        ;PICK UP
2114 23                 INX   H          ;  PACKAGE IDENT
2115 56                 MOV   D,M        ;  FROM
2116 2B                 DCX   H          ;  KBDB
2117 B2                 ORA   D          ;MS BYTE NONZERO MEANS
2118 CA1C21             JZ    LFNXL      ;  CODE HAS BEEN TRANSLATED
211B EB                 XCHG             ;IDENT POINTS TO DIVERT #
211C 3AFB42     LFNXL:  LDA   LFDV       ;IF THIS DV LANE IS THE ONE
211F 96                 SUB   M          ;  DESIRED THEN SET FLAG Z
2120 C22D21             JNZ   LKBDP      ;IF THIS IS THE DV WANTED
                ;
                ;  ;AUTOMATIC INDUCTION
                ;
2123 2ADA42             LHLD  KBDBP      ;POINT H,L TO BYTE 4 IN KBDB
2126 77                 MOV   M,A        ;RESET FLAG ER IN KBDB
```

```
2127 CDDF0C           CALL   CLDP       ;CLEAR KB DISPLAY
212A CD5B21           CALL   SNPC       ;AUTO-REINDUCT PACKAGE
                ;
                ;  ;CONSIDER NEXT INDUCT
                ;
212D 2ADA42     LKBDP:  LHLD   KBDBP      ;POINT H,L TO BYTE 4 IN KBDB
2130 111000           LXI    D,10H      ;SET D,E=E=10H
2133 19         LNXKB:  DAD    D          ;POINT TO NEXT INDUCT KBDB
2134 0C               INR    C          ;NEXT JINDU-1
2135 3A033D           LDA    NINDU      ;DO FOR
2138 B9               CMP    C          ;  ALL
2139 D20921           JNC    LFCAI      ;  INDUCTS
213C C9               RET
                ;;
                ;RUN MODE "SEND" KEY PROCESSOR IN NORMAL KEYBOARD MODE.
                ;  ';' TO ENTER OR REPEAT CODE FOR PACKAGE INDUCTION;
                ;  '+' TO INSERT, CHANGE OR DELETE ENTRY IN TRANSLATE TABLE.
                ;
                ;INPUT: CHAR, C= KB #, KBDBP=H,L POINTS TO KBDB BYTE 4.
                ;ALL REGISTERS EXCEPT C EFFECTED, JDV, IDENT, XYZ4 TO XYZ0,
                ;  STACK, XLTBP, CODE, DELTA, TCBP, TREE EFFECTED.
                ;
213D 3ADE42     SNDPC:  LDA    CHAR       ;IF CHARACTER ';' THEN
2140 FE3B             CPI    ';'        ;  SET FLAG Z
2142 23               INX    H          ;PICK UP
2143 7E               MOV    A,M        ;  NDIG IN KBDB
2144 C2532F           JNZ    PSNPC      ;IF CHAR WAS INDEED ';'
                ;
                ;"SEND" PACKAGE
                ;
2147 B7               ORA    A          ;IF NDIG IN KBDB
2148 C25521           JNZ    SENTR      ;  =0
                ;
                ;  ;PREVIOUS CHARACTER ENTERED WAS NOT DIGIT
                ;
214B 23               INX    H          ;IF
214C 7E               MOV    A,M        ;  SND
214D 23               INX    H          ;  IN KBDB
214E B6               ORA    M          ;  NOT
214F CA0D22           JZ     SILCM      ;  0
2152 C35B21           JMP    SNPC       ;REPEAT PACKAGE CODE
                ;
                ;. ;NEW DIGIT STRING HAS BEEN ENTERED
                ;
2155 3A323D     SENTR:  LDA    SENDO      ;IF
2158 E610             ANI    10H        ;  ENTER-BY-"SEND"
215A C8               RZ                ;  ENABLED
                ;
                ;
                ;AUTOMATIC "SEND" BY FIXED-LENGTH CODE, OR "REPEAT",
                ;  OR CALLED BY LFCPC FOR LANE-CLEAR-AUTO-REINDUCT,
                ;  OR CALLED BY RLTPC FOR DIRECT PACKAGE CODING BY DIVERT #.
                ;
                ;INPUT: C= KB #, KBDBP PONINTS TO BYTE 4 IN KBDB,
                ;  FLAG XL ACTIVATES CODE TRANSLATION.
                ;ALL REGISTERS EXCEPT C EFFECTED, KBDBP, JDV,IDENT EFFECTED.
                ;
215B 3A033D     SNPC:   LDA    NINDU      ;IF NINDU - KB # >= 0,
215E B9               CMP    C          ;  I.E., IT IS AN
215F 3E00             MVI    A,0        ;  (FOR ERRPC)
2161 DA0D22           JC     SILCM      ;  INDUCTION KB
                ;
                ;DECODE DIVERT # OR PACKAGE CODE ENTERED
                ;
2164 2ADA42           LHLD   KBDBP      ;POINT TO
2167 23               INX    H          ;  BYTE 6
2168 23               INX    H          ;  IN KBDB
2169 3AE042           LDA    XL         ;IF TRANSLATION
216C B7               ORA    A          ;  IS
216D CA8521           JZ     SNNXL      ;  NECESSARY
                ;
                ;  ;TRANSLATE PACKAGE CODE; DEFAULT IF NECESSARY
                ;
2170 CD9732           CALL   XLATE      ;TRANSLATE CODE
2173 DA7D21           JC     SXLDF      ;IF CODE IS
2176 3A9642           LDA    JDV        ;  OUT OF BOUND
2179 B7               ORA    A          ;  OR NOT IN
217A C29F21           JNZ    SNPC1      ;  TRANSLATE TABLE
217D 3A393D     SXLDF:  LDA    SCNRO      ;TEST DEFAULT
2180 E602             ANI    02H        ;  OPTION
2182 C39021           JMP    SDFDV      ;DEFAULT IF NECESSARY
                ;
                ;  ;DECODE DIVERT NUMBER; DEFAULT IF NECESSARY
                ;
2185 CD810D     SNNXL:  CALL   DCDV       ;DECODE DIVERT #
2188 D29F21           JNC    SNPC1      ;IF NOT LEGAL
218B 3A393D           LDA    SCNRO      ;IF DEFAULT
```

```
218E E601                   ANI    01H         ;  OPTION
2190 CA0E22     SDFDV:      JZ     SILDV       ;  SPECIFIED
2193 3A3A3D                 LDA    SERDV       ;DEFAULT DIVERT # = SERDV
2196 6F                     MOV    L,A         ;  AND PACKAGE
2197 2600                   MVI    H,0         ;  IDENTIFICATION = SERDV
2199 329642                 STA    JDV         ;SET DIVERT # AND
219C 229742                 SHLD   IDENT       ;  PACKAGE IDENTIFICATION
                ;
                ;SET KEYBOARD DATA IN KBDB
                ;
219F 2ADA42     SNPC1:      LHLD   KBDBP       ;CLEAR NDIG IN KBDB
21A2 23                     INX    H           ;  TO DENOTE
21A3 3600                   MVI    M,0         ;  NON-DIGIT CHAR
21A5 23                     INX    H           ;POINT TO BYTE 6 IN KBDB
21A6 3A9742                 LDA    IDENT       ;PUT IDENT INTO
21A9 77                     MOV    M,A         ;  SECONDARY
21AA 23                     INX    H           ;  BUFFER
21AB 3A9842                 LDA    IDENT+1     ;  SND IN
21AE 77                     MOV    M,A         ;  KBDB
                ;
                ;B= LEGAL DV #, CHECK LANE FULL
                ;
21AF 3A3C3D     SNPC2:      LDA    LFO         ;IF LANE-FULL
21B2 E601                   ANI    01H         ;  KB-INHIBIT
21B4 CAC121                 JZ     SPLAQ       ;  IS DESIRED
21B7 78                     MOV    A,B         ;A= JDV
21B8 C5                     PUSH   B           ;SAVE JDV,JINDU
21B9 CD250D                 CALL   CPLFM       ;CP LF MASK IN A, H,L MASK POINTER
21BC C1                     POP    B           ;B = DIVERT #, C = INDUCT #
21BD A6                     ANA    M           ;IF LANE
21BE C2FB21                 JNZ    SDVLF       ;  NOT FULL
                ;
                ;PUT CODE INTO LAQ & ATTEMPT TO SEND PACKAGE
                ;
                ; IF IN I/C AND HALF-DAS MODE, SET IDENT=0 BEFORE LOADING IT INTO LAQ
                ;
21C1 3A2B42     SPLAQ:      LDA    ICMO        ;TEST FOR I/C MODE
21C4 D600                   SUI    0           ;
21C6 CAD921                 JZ     CSPLA       ;JMP IF NOT I/C MODE
21C9 3A0640                 LDA    HDSEN       ;TEST FOR HALF-DAS MODE
21CC D600                   SUI    0           ;
21CE CAD921                 JZ     CSPLA       ;JMP IF NOT HALF-DAS
                ; ARE IN HALF-DAS MODE
21D1 3E00                   MVI    A,0         ;ZERO IDENT BEFORE LOADING INTO LAQ
21D3 329742                 STA    IDENT       ;
21D6 329842                 STA    IDENT+1     ;
21D9 CDF02C     CSPLA:      CALL   PLAQ        ;PUT JDV,IDENT INTO LAQ,POINT PPDBP
21DC CA0B22                 JZ     SLAQF       ;  TO BYTE 1 IN PPDB
21DF 2AEB42                 LHLD   PPDBP       ;POINT H,L TO BYTE 1 IN PPDB
21E2 7E                     MOV    A,M         ;A= PWTNG IN PPDB
21E3 3D                     DCR    A           ;IF PACKAGE AT PP
21E4 C2ED21                 JNZ    SBEEP       ;  WAITING TO BE CODED
                ;
                ;SEND OUT WAITING PACKAGE IF NO MERGE CONFLICT
                ;
21E7 C5                     PUSH   B           ;SAVE INDUCT #
21E8 23                     INX    H           ;POINT H,L TO BYTE 2 IN PPDB
21E9 CD7022                 CALL   PSEQR       ;QUEUE PACKAGE UP FOR RELEASE
                ;
21EC C1                     POP    B           ;C= INDUCT #
21ED 063B       SBEEP:      MVI    B,';'       ;BEEP
21EF CD6C11                 CALL   PUTKB       ;  KB
                ;
                ;CONSIDER REPEAT-BY-"SEND" OPTION
                ;
21F2 3A323D                 LDA    SENDO       ;IF REPEAT NOT DESIRED
21F5 E620                   ANI    20H         ;  THEN CLEAR
21F7 CCC90C                 CZ     CLRKB       ;  KB & KBDB
21FA C9                     RET
                ;
                ;DV LANE FULL
                ;
21FB 3E07       SDVLF:      MVI    A,7         ;ERROR
21FD CD130F                 CALL   ERRPC       ;  7
2200 3A3C3D                 LDA    LFO         ;IF AUTO-REINDUCT-
2203 E610                   ANI    10H         ;  AFTER-LANE-CLEARS
2205 C8                     RZ                 ;  DESIRED
2206 2ADA42                 LHLD   KBDBP       ;POINT H,L TO BYTE 4 IN KBDB
2209 77                     MOV    M,A         ;SET AUTO-REINDUCT FLAG IN KBDB
220A C9                     RET
                ;
                ;ERROR HANDLING
                ;
220B 3D         SLAQF:      DCR    A           ;ERROR 06H MEANS LAQ FULL
220C 3D                     DCR    A           ;ERROR 07H MEANS DV LANE FULL
220D 3D         SILCM:      DCR    A           ;ERROR 08H MEANS ILLEGAL COMMAND
220E C609       SILDV:      ADI    09H         ;ERROR 09H MEANS ILLEGAL DV #
```

```
2210 CD130F              CALL   ERRPC       ;PROCESS RUN ERROR
2213 C9                  RET
                ;;
                ;MASTER-CLEAR PROCESSOR FOR KEYBOARD # C.
                ;  CLEARS KBDB, KB, PURGE LAQ IN PPDB,
                ;  AND IF RELEASE IS OFF THEN REINITIALIZE INDUCT.
                ;  CALLED BY KBPC.
                ;
                ;INPUT: C= KEYBOARD #.
                ;ALL REGISTERS EXCEPT C, AND KBDB, PPDB EFFECTED.
                ;
2214 CDC90C     MCLPC:   CALL   CLRKB       ;CLEAR KBDB, KB
2217 3A033D              LDA    NINDU       ;IF IT IS A NON-INDUCT KB
221A B9                  CMP    C           ;  THEN WE
221B D8                  RC                 ;  ARE DONE
                ;
                ;CLEAR INDUCT LAQ
                ;
221C 79                  MOV    A,C         ;A = INDUCT #
221D CD9927              CALL   CPPPP       ;POINT H,L TO PPDB(JINDU)
2220 E5                  PUSH   H           ;SAVE POINTER
2221 110600              LXI    D,6         ;POINT H,L TO BYTE 6
2224 19                  DAD    D           ;  IN PPDB
2225 3600                MVI    M,0         ;PURGE LAQ
                ;
                ;IF RELEASE IS OFF THEN RE-INITIALIZE INDUCT
                ;
2227 C5                  PUSH   B           ;SAVE C = INDUCT #
2228 79                  MOV    A,C         ;A = INDUCT #
2229 2A5942              LHLD   OUTDB       ;POINT H,L TO OUTIM
222C CD280D              CALL   CPMSK       ;CP A= MASK POINTED TO BY H,L
222F A6                  ANA    M           ;IF RELEASE OFF THEN SET FLAG Z
2230 C1                  POP    B           ;C=JINDU= INDUCT #
2231 E1                  POP    H           ;POINT H,L TO PPDB(JINDU)
2232 C0                  RNZ                ;IF RELEASE OFF
                ;
2233 23                  INX    H           ;RETURN IF
2234 23                  INX    H           ;  RELEASE
2235 23                  INX    H           ;  IS
2236 B6                  ORA    M           ;  BEING
2237 C0                  RNZ                ;  DELAYED
                ;
                ;  ;CLEAN UP PPDB MERGE DATA
                ;
2238 2B                  DCX    H           ;POINT TO
2239 2B                  DCX    H           ;  BYTE 0
223A 2B                  DCX    H           ;  IN PPDB
223B 7E                  MOV    A,M         ;A = FLAG PP IN PPDB
223C 23                  INX    H           ;POINT H,L TO BYTE 1 IN PPDB
223D 77                  MOV    M,A         ;PWTNG IN PPDB = PP IN PPDB
223E B7                  ORA    A           ;IF PP IN PPDB
223F C24B22              JNZ    MICNT       ;  = 0
2242 E5                  PUSH   H           ;SAVE POINTER
2243 C5                  PUSH   B           ;SAVE C= INDUCT #
2244 0601                MVI    B,1         ;SET RELEASE
2246 CD0F11              CALL   OPUT        ;  ON
2249 C1                  POP    B           ;C= INDUCT #
224A E1                  POP    H           ;POINT H,L TO BYTE 1 IN PPDB
                ;
                ;  ;  ;IF STRAIGHT INDUCTS THEN ADJUST COUNTS IN PPDB
                ;
224B 3A313D     MICNT:   LDA    SIDEO       ;IF
224E E610                ANI    010H        ;  STRAIGHT
2250 C0                  RNZ                ;  INDUCTION
                ;
2251 C5                  PUSH   B           ;SAVE C=JINDU= INDUCT #
2252 23                  INX    H           ;B
2253 46                  MOV    B,M         ;  = COUNT(JINDU) IN PPDB
2254 2A4342              LHLD   PPDB        ;POINT H,L TO BYTE 2
2257 23                  INX    H           ;  IN PPDB FOR
2258 23                  INX    H           ;  INDUCT # 1
2259 112000              LXI    D,32        ;SET POINTER INCREMENT
225C 3A033D              LDA    NINDU       ;C IS THE LOOP
225F 4F                  MOV    C,A         ;  COUNT
2260 78                  MOV    A,B         ;A= COUNT(JINDU)
2261 BE         M9CNT:   CMP    M           ;IF COUNT(C)
2262 D26622              JNC    MNXCN       ;  > COUNT(JINDU)
2265 35                  DCR    M           ;DEC COUNT(C)
2266 19         MNXCN:   DAD    D           ;POINT H,L TO NEXT COUNT
2267 0D                  DCR    C           ;DO FOR ALL
2268 C26122              JNZ    M9CNT       ;  INDUCTS
                ;
226B C1                  POP    B           ;C= INDUCT #
226C CDAC2C              CALL   PEND        ;ADJUST COUNT(JINDU)
226F C9                  RET
                ;;
                ;PACKAGE RELEASE SEQUENCER.  MERGE CODED PACKAGES ON A 1ST-COME-
```

```
                  ;  1ST-SERVE BASIS; OR SIDE-INDUCT INTO GAP ON CONVEYOR.
                  ;  CALLED BY PPBPC OR SNDPC.
                  ;
                  ;INPUT: C= INDUCT #, PPDB, H,L POINTS TO BYTE 2 IN PPDB.
                  ;OUTPUT: PPDB.
                  ;ALL REGISTERS EFFECTED.
                  ;
2270 7E           PSEQR:   MOV   A,M        ;A= COUNT IN PPDB
2271 2B                    DCX   H          ;POINT H,L TO BYTE 1 IN PPDB
2272 B7                    ORA   A          ;IF COUNT IN PPDB
2273 C29E22                JNZ   PSTOP      ;  =0
                  ;
                  ;SPACE AVAILABLE FOR PACKAGE TO BE RELEASED
                  ;
2276 77                    MOV   M,A        ;PWTNG IN PPDB = 0
2277 23                    INX   H          ;POINT H,L TO BYTE 2 IN PPDB
2278 3A313D                LDA   SIDEO      ;IF IT IS
227B E610                  ANI   010H       ;  A STRAIGHT
227D C29922                JNZ   PSIDE      ;  MERGE
                  ;
                  ;  ;STRAIGHT-MERGE INDUCT
                  ;
2280 E5                    PUSH  H          ;SAVE POINTER TO BYTE 2 IN PPDB
2281 2A4342                LHLD  PPDB       ;POINT H,L TO
2284 23                    INX   H          ;  1ST COUNT
2285 23                    INX   H          ;  IN PPDB
2286 3A033D                LDA   NINDU      ;A= LOOP COUNT
2289 112000                LXI   D,32       ;D,E= 32
228C 0601                  MVI   B,1        ;B=1
228E 70           P1CNT:   MOV   M,B        ;EVERY COUNT IN PPDB = 1
228F 19                    DAD   D          ;POINT H,L TO NEXT COUNT IN PPDB
2290 3D                    DCR   A          ;DO FOR ALL
2291 C28E22                JNZ   P1CNT      ;  INDUCTS
2294 E1                    POP   H          ;POINT H,L TO BYTE 2 IN PPDB
2295 CDCF22                CALL  RLSPC      ;PHYSICALLY RELEASE PACKAGE
2298 C9                    RET
                  ;
                  ;  ;SIDE-MERGE INDUCT
                  ;
2299 34           PSIDE:   INR   M          ;INC COUNT(JINDU) IN PPDB
229A CDCF22                CALL  RLSPC      ;PHYSICALLY RELEASE PACKAGE
229D C9                    RET
                  ;
                  ;SPACE NOT AVAILABLE ON MAINLINE FOR PACKAGE RELEASE
                  ;
229E 3602         PSTOP:   MVI   M,2        ;PWTNG IN PPDB = 2
22A0 5F                    MOV   E,A        ;E= COUNT(JINDU) IN PPDB
22A1 3A313D                LDA   SIDEO      ;IF
22A4 E610                  ANI   010H       ;  STRAIGHT
22A6 C2C922                JNZ   PRSRL      ;  MERGE
                  ;
22A9 0601                  MVI   B,1        ;B= INDUCT #, = 1 INITIALLY
22AB 2A4342                LHLD  PPDB       ;POINT H,L TO
22AE 23                    INX   H          ;  1ST COUNT
22AF 23                    INX   H          ;  IN PPDB
22B0 78           PICCN:   MOV   A,B        ;A= INDUCT #
22B1 B9                    CMP   C          ;IF INDUCT #
22B2 CABB22                JZ    PID01      ;  NOT= JINDU
22B5 7E                    MOV   A,M        ;A= COUNT IN PPDB
22B6 BB                    CMP   E          ;IF THIS COUNT
22B7 DABB22                JC    PID01      ;  >= COUNT(JINDU)
22BA 34                    INR   M          ;INC COUNT IN PPDB
22BB D5           PID01:   PUSH  D          ;POINT H,L TO
22BC 112000                LXI   D,32       ;  NEXT
22BF 19                    DAD   D          ;  COUNT
22C0 D1                    POP   D          ;  IN PPDB
22C1 04                    INR   B          ;INC INDUCT #
22C2 3A033D                LDA   NINDU      ;DO FOR
22C5 B8                    CMP   B          ;  ALL
22C6 D2B022                JNC   PICCN      ;  INDUCTS
                  ;
22C9 0602         PRSRL:   MVI   B,2        ;RESET RELEASE
22CB CD0F11                CALL  OPUT       ;  # JINDU
22CE C9                    RET
                  ;;
                  ;PACKAGE RELEASE PROCESSOR.
                  ;  CALLED BY PSEQR, TECMG OR CMG.
                  ;
                  ;INPUT: C= INDUCT #, H,L POINTS TO BYTE 2 IN PPDB.
                  ;OUTPUT: EVENT TEC2, EVENT IDB2 OR UDB1.
                  ;ALL REGISTERS EFFECTED, JINDU, PPDBP, TCBP, RLDBP EFFECTED.
                  ;
22CF 22EB42       RLSPC:   SHLD  PPDBP      ;SAVE POINTER
22D2 CD622C                CALL  GLAQ       ;GET B=JDV, D,E=IDENT FROM LAQ
22D5 CA8B23                JZ    RLSFX      ;  IN PPDB
22D8 D5                    PUSH  D          ;SAVE IDENT
22D9 C5                    PUSH  B          ;SAVE INDUCT #, DIVERT #
```

```
                            ;
                            ;DELAY PACKAGE IF IT HAS NOT BEEN STOPPED LONG ENOUGH
                            ;
22DA CDA20F                         CALL   GITRE      ;GET TREE PARAMETERS FOR INDUCT
22DD 2AEB42                         LHLD   PPDBP      ;POINT TO
22E0 23                             INX    H          ;  BYTE 4
22E1 23                             INX    H          ;  IN PPDB
22E2 7E                             MOV    A,M        ;TEST IF PP-DWELL HAS
22E3 23                             INX    H          ;  TIMED OUT
22E4 B6                             ORA    M          ;  YET
22E5 C1                             POP    B          ;B = DIVERT #, C = INDUCT #
22E6 CAFD22                         JZ     RTCBS      ;IF NOT YET TIMED OUT
22E9 2B                             DCX    H          ;SET RELEASE DELAY
22EA 2B                             DCX    H          ;  FLAG FOR
22EB 3601                           MVI    M,1        ;  MCLPC
22ED C5                             PUSH   B          ;SAVE B,C
22EE 0602                           MVI    B,2        ;RELEASE
22F0 CD0F11                         CALL   OPUT       ;  OFF
22F3 2A0C40                         LHLD   GAP        ;DE = PPI GAP
22F6 EB                             XCHG              ;  TO DELAY
22F7 C1                             POP    B          ;MUST BE CAREFUL NOT TO
22F8 E1                             POP    H          ;  LEAVE DATA IN STACK
22F9 CD672D                         CALL   RDLPP      ;DELAY PPI PULSES
22FC E5                             PUSH   H          ;RE-SAVE IDENT
22FD 79                     RTCBS:  MOV    A,C        ;SAVE INDUCT #
22FE 329442                         STA    JINDU      ;  IN MEMORY
2301 CD9927                         CALL   CPPPP      ;POINT TO
2304 23                             INX    H          ;  RELEASE DELAY
2305 23                             INX    H          ;  FLAG IN
2306 23                             INX    H          ;  PPDB
2307 3600                           MVI    M,0        ;CLEAR FLAG
                            ;
                            ;PREPARE TCB FOR IDB2 OR UDB1
                            ;
2309 CDCB0F                         CALL   GETFS      ;GET FREE BLOCK FOR TCB
230C 22B442                         SHLD   TCBP       ;SET TCBP FOR APEND
230F 110D00                         LXI    D,13       ;POINT H,L TO BYTE 13
2312 19                             DAD    D          ;  IN TCB
2313 D1                             POP    D          ;D,E=IDENT
2314 72                             MOV    M,D        ;SET IDENT
2315 2B                             DCX    H          ;  IN
2316 73                             MOV    M,E        ;  TCB
2317 2B                             DCX    H          ;POINT H,L TO BYTE 11 IN TCB
2318 70                             MOV    M,B        ;SET JDV IN TCB
2319 2B                             DCX    H          ;JUPDA IN TCB
231A 3600                           MVI    M,0        ;  = 0
231C 2B                             DCX    H          ;SET JINDU
231D 71                             MOV    M,C        ;  IN TCB
231E 2B                             DCX    H          ;POINT H,L TO BYTE 8 IN TCB
                            ;
                            ;SET TCBP IN RLSDB FOR TECPC;  IF STRAIGHT INDUCT
                            ;  THEN ALSO APPEND TCB TO MERGE FIFO FOR IDBPC
                            ;
231F E5                             PUSH   H          ;SAVE POINTER
2320 C5                             PUSH   B          ;SAVE C=JINDU
2321 CDA227                         CALL   CPRLP      ;POINT H,L TO RLSDB
2324 22EF42                         SHLD   RLDBP      ;SAVE POINTER
2327 23                             INX    H          ;POINT H,L TO BYTE 2
2328 23                             INX    H          ;  IN RLSDB
2329 3A313D                         LDA    SIDEO      ;IF
232C E610                           ANI    010H       ;  STRAIGHT
232E C24623                         JNZ    RSIDE      ;  INDUCT
2331 CD850C                         CALL   APEND      ;APPEND TCB TO END OF MERGE FIFO
                            ;
                            ;SCHEDULE EVENT IDB2
                            ;
2334 C1                             POP    B          ;C=JINDU
2335 E1                             POP    H          ;POINT H,L TO BYTE 8 IN TCB
2336 115824                         LXI    D,IDB2     ;EVENT
2339 72                             MOV    M,D        ;  IN TCB
233A 2B                             DCX    H          ;  =
233B 73                             MOV    M,E        ;  IDB2
233C EB                             XCHG              ;POINT DE TO BYTE 7 IN TCB
233D 2A2F42                         LHLD   PRET       ;POINT HL TO PRET TABLE
2340 CD2F29                         CALL   ENTCB      ;SCHEDULE EVENT IDB2
2343 C37423                         JMP    RTEC2
                            ;
                            ;SCHEDULE EVENT UDB1 FOR SIDE INDUCT
                            ;
2346 C1                     RSIDE:  POP    B          ;C=JINDU
2347 2A3F42                         LHLD   FIDDB      ;POINT TO FOLLOWING-INDUCT DATABASE
234A 3A043D                         LDA    NUPDA      ;B IS THE LOOP
234D 47                             MOV    B,A        ;  DOWN COUNT
234E 79                             MOV    A,C        ;A = INDUCT #
234F 05                     RLSID:  DCR    B          ;SEARCH
2350 FA5F23                         JM     RNFID      ;  FOR
2353 BE                             CMP    M          ;  INDUCT #
2354 23                             INX    H          ;  IN
```

```
2355 C24F23            JNZ    RLSID     ;  FIDDB
2358 3A043D            LDA    NUPDA     ;A
235B 90                SUB    B         ;  =
235C C36023            JMP    RLUD1     ;  NEXT
235F AF       RNFID:   XRA    A         ;  UPDATE
2360 3C       RLUD1:   INR    A         ;  PHOTO #
2361 E1                POP    H         ;POINT H,L TO BYTE 8 IN TCB
2362 23                INX    H         ;SET UPCOMING
2363 23                INX    H         ;  UPDATE
2364 77                MOV    M,A       ;  PHOTO
2365 2B                DCX    H         ;  IN
2366 2B                DCX    H         ;  TCB
2367 119424            LXI    D,UDB1    ;POINT EVENT
236A 72                MOV    M,D       ;  IN TCB
236B 2B                DCX    H         ;  TO
236C 73                MOV    M,E       ;  UDB1
236D EB                XCHG             ;POINT D,E TO BYTE 7 IN TCB
236E 2A3342            LHLD   IDT       ;POINT H,L TO IDT TABLE
2371 CD2F29            CALL   ENTCB     ;SCHEDULE EVENT UDB1
              ;
              ;SCHEDULE TEC2 AND SET TCBP IN RLSDB
              ;
2374 2A0440   RTEC2:   LHLD   PLEMX     ;D,E = TE TIMEOUT
2377 EB                XCHG             ;  PPI COUNT
2378 2AEF42            LHLD   RLDBP     ;POINT TO TIMEOUT POINTER
237B 01A223            LXI    B,TEC2    ;SCHEDULE TE
237E CD192D            CALL   RSCHD     ;  TIMEOUT
2381 3A9442            LDA    JINDU     ;C
2384 4F                MOV    C,A       ;  =JINDU
2385 0601              MVI    B,1       ;RELEASE
2387 CD0F11            CALL   OPUT      ;  ON
238A C9                RET
              ;
              ;EITHER LAQ EMPTY
              ;
238B 3E03     RLSFX:   MVI    A,3       ;FATAL ERROR
238D CD0C2C            CALL   FATAL     ;  3
2390 C9                RET
              ;;
              ;PACKAGE-PRESENT DWELL TIMEOUT FOR ADDITIONAL DELAY
              ;  BEFORE RELEASING PACKAGE.
              ;
              ;INPUT: DE POINTS TO BYTE 8 IN TCB, TCBP POINTS TO TCB.
              ;ALL REGISTERS EXCEPT B, C EFFECTED.
              ;
2391 EB       PPDTO:   XCHG             ;POINT TO
2392 23                INX    H         ;  BYTE 10
2393 23                INX    H         ;  IN TCB
2394 5E                MOV    E,M       ;PICK UP
2395 23                INX    H         ;  BACK
2396 56                MOV    D,M       ;  POINTER
2397 AF                XRA    A         ;CLEAR
2398 12                STAX   D         ;  TIME
2399 13                INX    D         ;  OUT
239A 12                STAX   D         ;  POINTER
239B 2AB442            LHLD   TCBP      ;RETURN BLOCK TO
239E CD4F11            CALL   PUTFS     ;  FREE STORAGE
23A1 C9                RET
              ;;
              ;TRAILING-EDGE-PHOTO-TIME-OUT EVENT.
              ;  CREATED BY RLSPC.
              ;
              ;INPUT: TCBP POINTS TO TCB, D,E POINTS TO BYTE 8 IN TCB.
              ;ALL REGISTERS EFFECTED.
              ;
23A2 D5       TEC2:    PUSH   D         ;SAVE D,E
23A3 EB                XCHG             ;POINT TO BYTE 9
23A4 23                INX    H         ;  IN TCB
23A5 4E                MOV    C,M       ;PICK UP INDUCT #
23A6 23                INX    H         ;POINT TO BYTE 10
23A7 5E                MOV    E,M       ;PICK UP
23A8 23                INX    H         ;  BACK
23A9 56                MOV    D,M       ;  POINTER
23AA AF                XRA    A         ;CLEAR
23AB 12                STAX   D         ;  TE
23AC 13                INX    D         ;  TIMEOUT
23AD 12                STAX   D         ;  POINTER
23AE 3E0B              MVI    A,11      ;ERROR 11 TO
23B0 CD130F            CALL   ERRPC     ;  INDUCT # JINDU
              ;
              ;YIELD TO ANY NEXT PACKAGE TO BE INDUCTED
              ;
23B3 00                NOP
23B4 0602              MVI    B,2       ;STOP RELEASE
23B6 CD0F11            CALL   OPUT      ;  # JINDU
23B9 D1                POP    D         ;POINT D,E TO BYTE 8 IN TCB
23BA 3A313D            LDA    SIDEO     ;IF
23BD E610              ANI    10H       ;  STRAIGHT
```

```
23BF C2C623          JNZ   TE2SI      ;  MERGE
23C2 CDCA23          CALL  TECMG      ;CLEAR MERGE AREA & POSSIBLY RELEASE
23C5 C9              RET
                ;
23C6 CD2924     TE2SI:  CALL  CMG     ;CLEAR MERGE AREA & POSSIBLY RELEASE
23C9 C9              RET
                ;;
                ;CLEAR-MERGE EVENT SCHEDULED BY TECPC FOR STRAIGHT INDUCT,
                ;  OR CALLED BY TEC2.
                ;  RELEASE NEXT PENDING PACKAGE IF ANY.
                ;
                ;INPUT: TCBP, D,E POINTS TO BYTE 8 IN TCB.
                ;ALL REGISTERS EFFECTED, TCBP, PPDB AND RLSDB EFFECTED.
                ;
23CA 3A033D     TECMG:  LDA   NINDU   ;B= INDUCT #
23CD 47              MOV   B,A        ;  = LOOP COUNT
23CE 2A4342          LHLD  PPDB       ;POINT H,L TO BYTE 2
23D1 23              INX   H          ;  IN PPDB FOR
23D2 23              INX   H          ;  INDUCT # 1
23D3 112000          LXI   D,32       ;SET POINTER INCREMENT
23D6 0E00            MVI   C,0        ;C FLAGS ANY PENDING PACKAGE TO RELEASE
23D8 3E02            MVI   A,2        ;A=2
                ;
23DA 35         T9CNT:  DCR   M       ;DEC COUNT(B)
23DB FA0E24          JM    TCMFX      ;IF COUNT < 0 THEN FATAL ERROR
23DE C2ED23          JNZ   TNXID      ;IF COUNT(B) = 0
23E1 2B              DCX   H          ;IF
23E2 BE              CMP   M          ;  PWTNG(B)
23E3 23              INX   H          ;  =
23E4 C2ED23          JNZ   TNXID      ;  2
                ;
23E7 0C              INR   C          ;IF C ALREADY SET THEN
23E8 0D              DCR   C          ;  FATAL ERROR
23E9 C20E24          JNZ   TCMFX      ;  ELSE
23EC 48              MOV   C,B        ;C= INVERSE INDUCT # FOR PACKAGE RELEASE
                ;
23ED 19         TNXID:  DAD   D       ;POINT H,L TO NEXT COUNT IN PPDB
23EE 05              DCR   B          ;DO FOR ALL
23EF C2DA23          JNZ   T9CNT      ;  INDUCTS
                ;
                ;C= INDUCT # FOR PACKAGE TO BE RELEASED IF ANY
                ;
23F2 2AB442          LHLD  TCBP       ;SAVE TCBP IN STACK TO AVOID
23F5 E5              PUSH  H          ;  CONFLICT WITH RLSPC
23F6 0D              DCR   C          ;C=0 MEANS NO MORE PACKAGE TO
23F7 FA0924          JM    TCMGX      ;  RELEASE NOW
23FA 3A033D          LDA   NINDU      ;CONVERT C TO
23FD 91              SUB   C          ;  INDUCT #
23FE 4F              MOV   C,A        ;
23FF CDAC2C          CALL  PEND       ;ADJUST COUNTS IN PPDB FOR INDUCT
2402 2B              DCX   H          ;POINT H,L TO BYTE 1 IN PPDB
2403 3600            MVI   M,0        ;PWTNG(JINDU) = 0
2405 23              INX   H          ;POINT H,L TO BYTE 2 IN PPDB
2406 CDCF22          CALL  RLSPC      ;RELEASE PACKAGE
2409 E1         TCMGX:  POP   H       ;RETURN TCB TO
240A CD4F11          CALL  PUTFS      ;  FREE STORAGE
240D C9              RET
                ;;
                ;ILLEGAL COUNT FOUND IN PPDB
                ;
240E 3E06       TCMFX:  MVI   A,6     ;FATAL ERROR
2410 CD0C2C          CALL  FATAL      ;  6
2413 2AB442          LHLD  TCBP       ;RETURN TCB TO
2416 CD4F11          CALL  PUTFS      ;  FREE STORAGE
2419 C9              RET
                ;;
                ;BLOCK-MERGE EVENT SCHEDULED BY UDBPC.  FOR SIDE INDUCT ONLY.
                ;
                ;INPUT: TCBP POINTS TO TCB, D,E POINTS TO BYTE 8 IN TCB.
                ;
241A 13         BMG:    INX   D       ;A
241B 1A              LDAX  D          ;  =JINDU
241C CD9927          CALL  CPPPP      ;POINT H,L TO
241F 23              INX   H          ;  BYTE 2
2420 23              INX   H          ;  IN PPDB
2421 34              INR   M          ;INC COUNT IN PPDB
                ;
2422 2AB442          LHLD  TCBP       ;RETURN TCB TO
2425 CD4F11          CALL  PUTFS      ;  FREE STORAGE
2428 C9              RET
                ;;
                ;CLEAR-MERGE EVENT FOR A SIDE INDUCT.
                ;  SCHEDULED BY SCCMG OR CALLED BY UDBPC.
                ;
                ;INPUT: TCBP, D,E POINTS TO BYTE 8 IN TCB.
                ;ALL REGISTERS EFFECTED, TCBP EFFECTED.
                ;
```

```
2429 2AB442   CMG:     LHLD   TCBP       ;SAVE TCB
242C E5                PUSH   H          ;  POINTER
242D 13                INX    D          ;POINT D,E TO BYTE 9 IN TCB
242E 1A                LDAX   D          ;A=JINDU
242F 4F                MOV    C,A        ;C=JINDU
2430 CD9927            CALL   CPPPP      ;POINT H,L TO BYTE 1
2433 23                INX    H          ;  IN PPDB
2434 7E                MOV    A,M        ;A= PWTNG(JINDU)
2435 23                INX    H          ;POINT H,L TO BYTE 2 IN PPDB
2436 35                DCR    M          ;DEC COUNT(JINDU) IN PPDB
2437 FA4C24            JM     CMGEX      ;IF COUNT NOT< 0
              ;
243A C25324            JNZ    CMGX       ;IF COUNT = 0
              ;
243D D602              SUI    2          ;IF PWTNG(JINDU) = 2 THEN
243F C25324            JNZ    CMGX       ;  A = 0, AND
              ;
              ;PACKAGE PENDING AT INDUCT # C
              ;
2442 34                INR    M          ;INC COUNT(JINDU)
2443 2B                DCX    H          ;PWTNG(JINDU)
2444 77                MOV    M,A        ;  = 0
2445 23                INX    H          ;POINT H,L TO BYTE 2 IN PPDB
2446 CDCF22            CALL   RLSPC      ;RELEASE PACKAGE (TCBP EFFECTED)
2449 C35324            JMP    CMGX
              ;
              ;ILLEGAL COUNT IN PPDB
              ;
244C 3600     CMGEX:   MVI    M,0        ;CLEAR COUNT(JINDU)
244E 3E0D              MVI    A,13       ;ERROR
2450 CD130F            CALL   ERRPC      ;  13
              ;
              ;EVENT EXIT
              ;
2453 E1       CMGX:    POP    H          ;RETURN TCB TO
2454 CD4F11            CALL   PUTFS      ;  FREE STORAGE
2457 C9                RET
              ;;
              ;TIME-OUT EVENT FOR IDBPC.  FOR STRAIGHT INDUCT ONLY.
              ;
              ;INPUT: TCBP, D,E POINTS TO BYTE 8 IN TCB.
              ;ALL REGISTERS EFFECTED.
              ;
2458 EB       IDB2:    XCHG              ;POINT H,L TO BYTE 9
2459 23                INX    H          ;  IN TCB
245A 4E                MOV    C,M        ;C = INDUCT #
245B CDA227            CALL   CPRLP      ;POINT HL TO
245E 23                INX    H          ;  BYTE 2
245F 23                INX    H          ;  IN RLSDB
2460 5E                MOV    E,M        ;DE = PSEQ IN RLSDB,
2461 23                INX    H          ;  I.E., POINT DE TO
2462 56                MOV    D,M        ;  INDUCT FIFO
2463 3AB442            LDA    TCBP       ;IF THIS TCB
2466 BB                CMP    E          ;  IS THE
2467 C28E24            JNZ    IB2FX      ;  1ST TCB
246A 3AB542            LDA    TCBP+1     ;  IN
246D BA                CMP    D          ;  INDUCT
246E C28E24            JNZ    IB2FX      ;  FIFO
              ;
              ;NOTHING FOUND WRONG WITH THE INDUCT FIFO
              ;
2471 E5                PUSH   H          ;SAVE POINTER TO BYTE 3 IN RLSDB
2472 210E00            LXI    H,14       ;POINT HL TO BYTE 14
2475 19                DAD    D          ;  IN TCB
2476 5E                MOV    E,M        ;POINT DE
2477 23                INX    H          ;  TO NEXT
2478 56                MOV    D,M        ;  PACKAGE
2479 E1                POP    H          ;POINT HL TO BYTE 3 IN RLSDB
247A 72                MOV    M,D        ;POINT PSEQ IN RLSDB
247B 2B                DCX    H          ;  TO NEXT
247C 73                MOV    M,E        ;  PACKAGE
              ;
247D 3E02              MVI    A,2        ;ERROR
247F CD130F            CALL   ERRPC      ;  2
              ;
2482 0602              MVI    B,2        ;RELEASE
2484 CD0F11            CALL   OPUT       ;  OFF
2487 2AB442            LHLD   TCBP       ;RETURN TCB TO
248A CD4F11            CALL   PUTFS      ;  FREE STORAGE
248D C9                RET
              ;
              ;INDUCT FIFO AT PSEQ IN RLSDB HAS BEEN SCRIBBLED
              ;
248E 3E09     IB2FX:   MVI    A,9        ;FATAL ERROR
2490 CD0C2C            CALL   FATAL      ;  9
2493 C9                RET
              ;;
```

```
                    ;EVENT UDB1 IS A PROPER LOWER BOUND FOR UPDATE PHOTO BLOCKED.
                    ;
                    ;INPUT: TCBP, D,E POINTS TO BYTE 8 OF TCB, TREE PARAMETERS.
                    ;ALL REGISTERS EFFECTED.
                    ;
2494 CD8725         UDB1:   CALL  UDB12      ;POINT H,L TO PMUZ IN UDDB
2497 5E                     MOV   E,M        ;D,E
2498 23                     INX   H          ;  = PMUZ
2499 56                     MOV   D,M        ;  IN UDDB
249A 7B                     MOV   A,E        ;IF
249B B2                     ORA   D          ;  PMUZ NOT= 0
249C CABB24                 JZ    UB1        ;
                    ;
                    ;OVERLAPPING MUZ'S, LATTER OVERRIDES FORMER
                    ;
249F E5                     PUSH  H          ;SAVE POINTER TO PMUZ MS BYTE
24A0 210700                 LXI   H,7        ;H,L POINTS TO BYTE 7 OF TCB
24A3 19                     DAD   D          ;  POINTED TO BY PMUZ IN UDDB
24A4 118025                 LXI   D,JUNK     ;JUNK
24A7 73                     MOV   M,E        ;  THAT TCB
24A8 23                     INX   H          ;  (ZONE POINTER
24A9 72                     MOV   M,D        ;  OVERRIDEN)
24AA 3E03                   MVI   A,3        ;ERROR 3
24AC CD080F                 CALL  ERPC       ;  TO MASTER KB
24AF E1                     POP   H          ;H,L POINTS TO PMUZ MS BYTE
24B0 AF                     XRA   A          ;CLEAR A
24B1 77                     MOV   M,A        ;CLEAR POINTER
24B2 2B                     DCX   H          ;  PMUZ
24B3 77                     MOV   M,A        ;  IN UDDB
24B4 2AB442                 LHLD  TCBP       ;RETURN TCB TO
24B7 CD4F11                 CALL  PUTFS      ;  FREE STORAGE
24BA C9                     RET
                    ;
                    ;LEGITIMATE EVENT UDB1
                    ;
24BB EB             UB1:    XCHG             ;POINT D,E
24BC 2AB442                 LHLD  TCBP       ;  TO
24BF EB                     XCHG             ;  TCB
24C0 72                     MOV   M,D        ;POINT PMUZ
24C1 2B                     DCX   H          ;  IN UDDB
24C2 73                     MOV   M,E        ;  TO TCB
                    ;
24C3 210800                 LXI   H,8        ;POINT H,L TO BYTE 8
24C6 19                     DAD   D          ;  IN TCB
24C7 11D924                 LXI   D,UDB2     ;POINT EVENT
24CA 72                     MOV   M,D        ;  IN TCB
24CB 2B                     DCX   H          ;  TO
24CC 73                     MOV   M,E        ;  UDB2
24CD EB                     XCHG             ;POINT D,E TO BYTE 7 IN TCB
24CE 2A3542                 LHLD  ZNT        ;POINT H,L TO ZNT TABLE
24D1 3A9542                 LDA   JUPDA      ;C
24D4 4F                     MOV   C,A        ;  = UPDATE PHOTO #
24D5 CD2F29                 CALL  ENTCB      ;SCHEDULE EVENT UDB2
24D8 C9                     RET
                    ;;
                    ;LEADING EDGE OF PACKAGE NOT FOUND IN MOVING UPDATABLE ZONE.
                    ;
                    ;INPUT: TCBP, D,E POINTS TO BYTE 8 IN TCB.
                    ;ALL REGISTERS EFFECTED.
                    ;
24D9 CD8725         UDB2:   CALL  UDB12      ;POINT H,L TO PMUZ IN UDDB
24DC AF                     XRA   A          ;CLEAR A
24DD 77                     MOV   M,A        ;ZERO
24DE 23                     INX   H          ;  PMUZ IN UDDB
24DF 77                     MOV   M,A        ;
24E0 3E04                   MVI   A,4        ;PUT ERROR 4 ON KB
24E2 CD080F                 CALL  ERPC       ;
                    ;
                    ; TEST TO SEE IF UPDATE-DIVERT-COMPLETE OPTION SPECIFIED
24E5 3A3B3D                 LDA   DCO              ;DCO=2?
24E8 D602                   SUI   02H
24EA C28025                 JNZ   JUNK             ;JMP IF DCO NOT = 2.
                    ;
                    ; TEST FOR I/C MODE
24ED 3A2B42                 LDA   ICMO             ;ICMO=1?
24F0 A7                     ANA   A
24F1 CA8025                 JZ    JUNK             ;JMP IF NOT IN I/C MODE
                    ;
                    ; TEST IF MESSAGE M IS MASKED
24F4 212B3D                 LXI   H,ERMK0+3        ;H,L= MASK BYTE 4 LOC
24F7 7E                     MOV   A,M              ;A= MASK BYTE 4
24F8 E610                   ANI   10H              ;LOOK AT BIT 4
24FA CA8025                 JZ    JUNK             ;JMP IF M NOT MASKED
                    ;
                    ; ARE IN I/C MODE,MESSAGE M IS MASKED, AND DCO=2 IS SPECIFIED. SEND
                    ; MESSAGE M TO DAS(BY CALLING DSLD) FIRST TEST IF IDENT=0.
24FD 2AB442                 LHLD  TCBP             ;H,L= TCB LOC
2500 110C00                 LXI   D,12
```

```
2503 19              DAD    D               ;H,L= IDENT LSB LOC
2504 7E              MOV    A,M             ;A= IDENT LSB
2505 23              INX    H               ;H,L= IDENT MSB LKOC
2506 46              MOV    B,M             ;B= IDENT MSB
2507 B0              ORA    B
2508 C21D25          JNZ    TRANS           ;JMP IF IDENT NOT = 0
                ;
                ; IDENT IS ZERO. THEREFORE PACKAGE CODE IS ZERO (DAS WANTS TO RECIRC
                ; PACKAGE) AND IS NOT IN TRANSACTION TABLE. THUS PUT 6 ASCII 0'S INTO
                ; BUFFER BYT16 FOR PACKAGE CODE VALUE
250B 211843          LXI    H,BYT16         ;H,L= BYT16 LOC
250E 23              INX    H
250F 23              INX    H               ;POINT TO BYTE 2
2510 3E30            MVI    A,'0'           ;A=ASCII 0
2512 0606            MVI    B,6             ;LOOP COUNT=6
2514 77         PC000:  MOV    M,A          ;BYTE = ASCII0
2515 23              INX    H               ;POINT TO NEXT BYTE
2516 05              DCR    B               ;DECREMENT COUNTER
2517 C21425          JNZ    PC000           ;DO FOR BYTES 2-7
251A C33025          JMP    CVTJD           ;JMP TO CVTJD WHEN LOADED
                ;
                ; ACCESS PACKAGE CODE FROM TRANSACTION TABLE AND PUT INTO BYT16 BUFFER.
                ; CLEAR PACKAGE CODE FROM TRANSACTION TABLE
251D 2AB442     TRANS:  LHLD   TCBP         ;H,L= TCB LOC
2520 110C00          LXI    D,12
2523 19              DAD    D               ;H,L= IDENT LSB LOC
2524 5E              MOV    E,M             ;E= IDENT LSB
2525 23              INX    H               ;H,L= IDENT MSB LOC
2526 56              MOV    D,M             ;D= IDENT MSB
2527 EB              XCHG                   ;H,L=IDENT=LOC IN TRANS TAB OF PACK CODE
2528 E5              PUSH   H               ;STACK=SAME
2529 CD6C1A          CALL   TRANP           ;MOVE PACK CODE TO BYTES 2-7 OF BYT16
252C E1              POP    H               ;H,L= PACK CODE LOC AGAIN
252D CD401A          CALL   ZPACK           ;REMOVE PACK CODE FROM TRANS TAB
                ;
                ; LOAD THE ASSUMED DVT# VVV INTO BYTES 10-12 OF BYT16. THE ASSUMED
                ; DVT# IS LOCATED IN LDVDB IN RELATIVE LOC JUPDA-2
2530 2AB442     CVTJD:  LHLD   TCBP         ;H,L= TCB LOC
2533 110A00          LXI    D,10
2536 19              DAD    D               ;H,L= JUPDA LOC
2537 7E              MOV    A,M             ;A=JUPDA
2538 D602            SUI    2               ;A=JUPDA-2
253A F24225          JP     CVTJ1           ;JMP IF DVT# >1
253D 3E00            MVI    A,0             ;A= 0
253F C34A25          JMP    CVTJ2           ;JMP IF PACKAGE DISAPPEARED BEFORE DV#1
2542 1600       CVTJ1:  MVI    D,0          ;D= 0
2544 5F              MOV    E,A             ;D,E= REL LDVDB TABLE LOC OF DV#
2545 2A3D42          LHLD   LDVDB           ;H,L= LDVDB LOC
2548 19              DAD    D               ;H,L= LOC IN LDVDB TABLE OF DESIRED DVT#
2549 7E              MOV    A,M             ;A= DVT# IN BINARY
254A CD010E     CVTJ2:  CALL   ECDIG        ;CONVERT TO ASCII
254D 3A7D42          LDA    XYZ2
2550 322243          STA    BYT16+10        ;STORE ASCII 100'S
2553 3A7E42          LDA    XYZ1
2556 322343          STA    BYT16+11        ;STORE ASCII 10'S
2559 3A7F42          LDA    XYZ0
255C 322443          STA    BYT16+12        ;STORE ASCII 1'S
                ; CONVERT BINARY JINDU INTO ASCII AND STORE IN BYTES 8-9 OF BYT16
255F 2AB442          LHLD   TCBP            ;H,L = TCB LOC
2562 110900          LXI    D,9
2565 19              DAD    D               ;H,L= JINDU LOC
2566 7E              MOV    A,M             ;A= JINDU IN BINARY
2567 CD010E          CALL   ECDIG           ;CONVERT TO ASCII
256A 3A7E42          LDA    XYZ1
256D 322043          STA    BYT16+8         ;STORE ASCII 10'S
2570 3A7F42          LDA    XYZ0
2573 322143          STA    BYT16+9         ;STORE ASCII 1'S
2576 211843          LXI    H,BYT16         ;H,L=BYT16
2579 23              INX    H               ;H,L= BYTE 1 OF BYT16
257A 3E4D            MVI    A,'M'           ;A= ASCII 'M'
257C 77              MOV    M,A             ;PUT ASCII M INTO BYTE 1 OF BYT16
                ; LOAD BYT16 INTO FS
257D CD7D1A          CALL   DSLD            ;PUT MESSAGE M INTO FS
                ; RETURN PACKAGE TCB TO FS
                ;
                ;
                ;JUNK AND NO-OPERATION EVENTS DELETED FROM TREE.
                ;CREATED BY UDB1, UDBPC, MCLPC
                ;
                ;INPUT: TCBP.
                ;REGISTERS D, E, H, L EFFECTED.
                ;
2580 2AB442     JUNK:   LHLD   TCBP      ;RETURN TCB TO
2583 CD4F11             CALL   PUTFS     ;  FREE STORAGE
                ;
2586 C9         NOOP:   RET
                ;
```

```
                        ;
                        ;1ST PART OF UDB1, UDB2.  POINT H,L TO PMUZ IN UDDB.
                        ;
                        ;INPUT: DE POINTS TO BYTE 8 IN TCB.
                        ;OUTPUT: DE POINTS TO BYTE 10 IN TCB,
                        ;  JUPDA= UPDATE PHOTO #, BC= UPDATE # - 1.
                        ;ALL REGISTERS EFFECTED.
                        ;
2587 13         UDB12:   INX    D           ;D,E POINTS TO
2588 13                  INX    D           ;  BYTE 10 IN TCB
2589 1A                  LDAX   D           ;A = JUPDA (UPDATE PHOTO #)
258A 329542              STA    JUPDA       ;SET UPDATE PHOTO # IN MEMORY
258D 2A5142              LHLD   UDDB        ;H,L POINTS TO UDDB TABLE
2590 4F                  MOV    C,A         ;B,C
2591 0600                MVI    B,0         ;  =JUPDA
2593 0B                  DCX    B           ;B,C=JUPDA-1
2594 09                  DAD    B           ;H,L
2595 09                  DAD    B           ;  POINTS TO
2596 09                  DAD    B           ;  PMUZ IN UDDB
2597 09                  DAD    B           ;  FOR UD # JUPDA
2598 C9                  RET
                        ;;
                        ;CHANGED FROM UDB2 BY UDBPC.  SET BYTES 7, 8 IN TCB
                        ;  ZERO TO DENOTE TCB OUT OF TREE.
                        ;
                        ;INPUT: TCBP.
                        ;REGISTERS D, E, H, L EFFECTED.
                        ;
2599 2AB442     UDB3:    LHLD    TCBP             ;POINT H,L
259C 110700              LXI     D,7              ;  TO BYTE 7
259F 19                  DAD     D                ;  IN TCB
25A0 AF                  XRA     A                ;A=0
25A1 77                  MOV     M,A              ;ZERO
25A2 23                  INX     H                ;  BYTES
25A3 77                  MOV     M,A              ;  7, 8
25A4 C9                  RET
                        ;
                        ;        SUBROUTINE DCB1
                        ;
                        ;        INPUTS: TCBP,D,E POINTS TO BYTE 8 OF TCB,TREE PARAMETERS.
                        ;
                        ;        OUTPUTS: EVENT DCB2 CREATED AND SCHEDULED. DCB2 IS UPPER
                        ;                 BOUND ON MUZ
                        ;
                        ;        PROCESS: SAME AS FOR EVENT UDB1. ONLY DIFFERENCE IS THAT WE
                        ;                 ARE CREATING AND SCHEDULING DCB2 INSTEAD OF UDB2
                        ;
25A5 CD8725     DCB1:    CALL   UDB12             ;POINT H,L TO PMUZ IN UDDB
25A8 5E                  MOV    E,M               ;D,E
25A9 23                  INX    H                 ;  = PMUZ
25AA 56                  MOV    D,M               ;  INUDDB
25AB 7B                  MOV    A,E               ;IF
25AC B2                  ORA    D                 ;  PMUZ NOT= 0
25AD CACC25              JZ     DB1               ;
                        ;
                        ;OVERLAPPING MUZ'S. LATTER OVERRIDES FORMER
                        ;
25B0 E5                  PUSH   H                 ;SAVE POINTER TO PMUZ MS BYTE
25B1 210700              LXI    H,7               ;H,L POINTS TO BYTE 7 OF TCB
25B4 19                  DAD    D                 ;  POINTED TO BY PMUZ IN UDDB
25B5 118025              LXI    D,JUNK            ;JUNK
25B8 73                  MOV    M,E               ;  THAT TCB
25B9 23                  INX    H                 ;  (ZONE POINTER
25BA 72                  MOV    M,D               ;  OVERRIDEN)
25BB 3E03                MVI    A,3               ;ERROR 3
25BD CD080F              CALL   ERPC              ;  TO MASTER KB
25C0 E1                  POP    H                 ;H,L POINTS TO PMUZ MS BYTE
25C1 AF                  XRA    A                 ;CLEAR A
25C2 77                  MOV    M,A               ;CLEAR POINTER
25C3 2B                  DCX    H                 ;  PMUZ
25C4 77                  MOV    M,A               ;  IN UDDB
25C5 2AB442              LHLD   TCBP              ;RETURN TCB TO
25C8 CD4F11              CALL   PUTFS             ;  FREE STORAGE
25CB C9                  RET
                        ; LEGITIMATE EVENT DCB1
                        ;
25CC EB         DB1:     XCHG                     ;POINT D,E
25CD 2AB442              LHLD   TCBP              ;  TO
25D0 EB                  XCHG                     ;  TCB
25D1 72                  MOV    M,D               ;SET PMUZ= CURRENT PACKAGE TCB LOC
25D2 2B                  DCX    H
25D3 73                  MOV    M,E
25D4 210800              LXI    H,8               ;POINT H,L TO BYTE 8
25D7 19                  DAD    D                 ;  IN TCB.
25D8 11EA25              LXI    D,DCB2            ;SET EVENT = DCB2
25DB 72                  MOV    M,D
25DC 2B                  DCX    H
```

```
25DD 73                 MOV   M,E
25DE EB                 XCHG                    ;D,E= BYTE 7 IN TCB
25DF 2A3B42             LHLD  DCT               ;H,L= 8000 SERIES TABLE
25E2 3A9542             LDA   JUPDA
25E5 4F                 MOV   C,A               ;C= JUPDA
25E6 CD2F29             CALL  ENTCB             ;SCHEDULE EVENT DCB2
25E9 C9                 RET
               ;        SUBROUTINE DCB2
               ;
               ;        INPUTS: TCBP, D,E POINTS TO BYTE 8 INTCB
               ;
               ;        OUTPUTS: PMUZ SET=0, ERROR MESSAGE
               ;              'S' TO DAS IF MASKED. PACKAGE TCB RETURNED TO FS
               ;
               ;        PROCESS: SAME AS FOR UDB2
               ;
25EA CD8725    DCB2:    CALL  UDB12     ;POINT H,L TO PMUZ IN UDDB
25ED AF                 XRA   A         ;CLEA A
25EE 77                 MOV   M,A       ;ZERO
25EF 23                 INX   H         ;    PMUZ IN UDDB
25F0 77                 MOV   M,A
               ; CHECK TO SEE IF IN I/C MODE
25F1 3A2B42             LDA   ICMO      ;ICMO=1?
25F4 A7                 ANA   A
25F5 CA6F26             JZ    RTFS      ;JMP IF NOT I/C MODE
               ; CHECK TO SEE IF MESSAGE S IS MASKED
25F8 21283D             LXI   H,ERMKO   ;H,L=ERROR MASK LOC
25FB 23                 INX   H
25FC 23                 INX   H         ;H,L= ERROR MASK BYTE 2 (LOC 2A)
25FD 7E                 MOV   A,M       ;LOOK AT MASK
25FE E601               ANI   01H       ;LOOK AT BYTE 0
2600 CA6F26             JZ    RTFS      ;JMP IF MESSAGE A NOT MASKED
               ;
               ; SEND MESSAGE S TO DAS. CLEAR PACKAGE CODE FROM TRANSACTION TABLE
               ; IF IDENT NOT = 0. SEND MESSAGE S BY CALLING DSLD.
2603 2AB442             LHLD  TCBP      ;H,L= PACKAGE TCB LOC
2606 110C00             LXI   D,12
2609 19                 DAD   D         ;H,L= BYTE 12 OF TCB
260A 5E                 MOV   E,M       ;E= LSB OF IDENT
260B 23                 INX   H
260C 56                 MOV   D,M       ;D= MSB OF IDENT
260D EB                 XCHG            ;H,L= LOC IN TRANSACTION TAB OF PACK CODE
260E E5                 PUSH  H         ;STACK= SAME
260F 7C                 MOV   A,H       ;A= IDENT MSB
2610 B5                .ORA   L         ;IDENT=0 ?
2611 CA1E26             JZ    SABO      ;JMP IF IDENT=0
2614 CD6C1A             CALL  TRANP     ;TRANSFER PACK CODE TO BYT16 BYTES 2-7
2617 E1                 POP   H         ;H,L=LOC IN TRANS TAB OF PACK CODE
2618 CD401A             CALL  ZPACK     ;REMOVE PACK CODE FROM TABLE
261B C33326             JMP   DABO      ;JMP TO DABO
               ; PACKAGE IDENT = 0. THEREFORE PACK NOT IN TRANS TAB. SET CODE=0
261E 3E30      SABO:    MVI   A,'0'     ;A= ASCII 0
2620 321A43             STA   BYT16+2   ;SET PACKAGE CODE=0 IN BUFFER BYT16
2623 321B43             STA   BYT16+3
2626 321C43             STA   BYT16+4
2629 321D43             STA   BYT16+5
262C 321E43             STA   BYT16+6
262F 321F43             STA   BYT16+7
2632 E1                 POP   H         ;ADJUST STACK
               ; CONVERT BINARY INDUCT AND DVT IN PACKAGE TCB INTO ASCII AND STORE
               ; INTO BUFFER BYT16
2633 2AB442    DABO:    LHLD  TCBP      ;H,L= PACK TCB LOC
2636 110900             LXI   D,9
2639 19                 DAD   D         ;H,L= JINDU LOC IN TCB
263A 7E                 MOV   A,M       ;A= BINARY JINDU VALUE
263B CD010E             CALL  ECDIG     ;CONVERT TO ASCII
263E 3A7E42             LDA   XYZ1
2641 322043             STA   BYT16+8   ;STORE ASCII 10'S
2644 3A7F42             LDA   XYZ0
2647 322143             STA   BYT16+9   ;STORE ASCII 1'S
264A 2AB442             LHLD  TCBP      ;H,L= PACK TCB LOC
264D 110B00             LXI   D,11
2650 19                 DAD   D         ;H,L= JDV IN TCB LOC
2651 7E                 MOV   A,M       ;A= BINARY OUT#
2652 CD010E             CALL  ECDIG     ;CONVERT TO ASCII
2655 3A7D42             LDA   XYZ2
2658 322243             STA   BYT16+10  ;STORE ASCII 100'S
265B 3A7E42             LDA   XYZ1
265E 322343             STA   BYT16+11  ;STORE ASCII 10'S
2661 3A7F42             LDA   XYZ0
2664 322443             STA   BYT16+12  ;STORE ASCII 1'S
2667 3E53               MVI   A,'S'     ;A=ASCII S
2669 321943             STA   BYT16+1   ;STORE
266C CD7D1A             CALL  DSLD      ;LOAD BYT16 INTO FS
               ; RETURN PACKAGE TCB TO FS
               ;
266F 2AB442    RTFS:    LHLD  TCBP      ;H,L= TCB LOC
```

```
2672 CD4F11          CALL   PUTFS        ;RET TCB TO FS
2675 C9              RET                 ;RET TO CALLER
                ;
                ;EVENT TO RESET DIVERT AND SCHEDULE ANY FURTHER RESETS WITH
                ;  SAME PPI IF REQUIRED.
                ;
                ;INPUT: D,E POINTS TO BYTE 8 IN TCB, TCBP, TREE PARAMETERS.
                ;ALL REGISTERS EFFECTED.
                ;
2676 EB         DVRS:   XCHG                     ;POINT H,L TO BYTE 9
2677 23                 INX     H                ;  IN TCB
2678 4E                 MOV     C,M              ;C=JDV
2679 34                 INR     M                ;INC JDV IN TCB FOR NEXT DV
267A 23                 INX     H                ;POINT H,L TO BYTE 10 IN TCB
267B 35                 DCR     M                ;IF MORE DV'S
267C CA9426             JZ      DV0RS            ;  TO RESET
                ;
                ;SCHEDULE DVRS AGAIN TO RESET MORE DV'S
                ;
267F C5                 PUSH    B                ;SAVE C=JDV
2680 23                 INX     H                ;POINT H,L TO BYTE 11 IN TCB
2681 5E                 MOV     E,M              ;D,E
2682 23                 INX     H                ;  = UDBT
2683 56                 MOV     D,M              ;  IN TCB
2684 EB                 XCHG                     ;SET UDBT
2685 229942             SHLD    UDBT             ;  FOR ENDVA
2688 21FBFF             LXI     H,0FFFBH         ;POINT H,L TO BYTE 12-5=7
268B 19                 DAD     D                ;  IN TCB
268C 0C                 INR     C                ;C= NEXT JDV
268D CD1D29             CALL    ENDVA            ;SCHEDULE FURTHER DV RESETS
2690 C1                 POP     B                ;C=JDV
2691 C39A26             JMP     DORS
                ;
                ;NO MORE DV'S TO RESET FOR THIS TASK
                ;
2694 2AB442     DV0RS:  LHLD    TCBP             ;RETURN TCB TO
2697 CD4F11             CALL    PUTFS            ;  FREE STORAGE
                ;
                ;OUTPUT DV RESET SIGNAL
                ;
269A 3A033D     DORS:   LDA     NINDU            ;C
269D 81                 ADD     C                ;  =NINDU+JDV
269E 4F                 MOV     C,A              ;  = DV OUTPUT CH #
269F 0602               MVI     B,2              ;RESET
26A1 CD0F11             CALL    OPUT             ;  DV # JDV
26A4 C9                 RET
                ;;
                ;DIVERT ACTUATION EVENT.
                ;
                ;INPUT:  TCBP, D,E POINTS TO BYTE 8 OF TCB, TREE PARAMETERS.
                ;OUTPUT: DVST.
                ;ALL REGISTERS EFFECTED, JUPDA EFFECTED.
                ;
26A5 2AB642     DVACT:  LHLD   CTIME     ;FOR DVRCC
26A8 229B42             SHLD   DVST      ;
26AB 13                 INX    D         ;POINT H,L TO BYTE 9
26AC EB                 XCHG             ;  IN TCB
26AD 3A033D             LDA    NINDU     ;C
26B0 86                 ADD    M         ;  =NINDU+JDV
26B1 4F                 MOV    C,A       ;  = DIVERT OUTPUT CH #.
26B2 23                 INX    H         ;B
26B3 46                 MOV    B,M       ;  = DIVERT MODE
26B4 C5                 PUSH   B         ;SAVE PARAMETERS FOR OPUT
26B5 05                 DCR    B         ;IF B=1, I.E.,
26B6 C2F926             JNZ    DDVNS     ;  DV TO BE SET
                ;
                ;CHECK LANE-FULL CONDITIONS LOCALLY
                ;
26B9 3A2B42             LDA    ICMO             ;A= I/C FLAG
26BC A7                 ANA    A                ;
26BD C2E026             JNZ    DVLF0            ;BYPASS LANE FULL CHECK IF I/C MODE AS
                                                ;CHECK HAS ALREADY BEEN MADE AT PEVIOUS
                                                ;UPDATE PHOTO
26C0 3A3C3D             LDA    LFO       ;IF LANE-FULL-
26C3 E602               ANI    02H       ;  DV-INHIBIT
26C5 CAE026             JZ     DVLF0     ;  DESIRED
26C8 E5                 PUSH   H         ;SAVE POINTER TO TCB BYTE 10
26C9 2B                 DCX    H         ;POINT H,L TO BYTE 9 IN TCB
26CA 7E                 MOV    A,M       ;A=JDV
26CB 47                 MOV    B,A       ;SAVE JDV IN B
26CC CD250D             CALL   CPLFM     ;IF DV LANE FULL THEN
26CF A6                 ANA    M         ;  CLEAR FLAG Z
26D0 E1                 POP    H         ;POINT H,L TO BYTE 10 IN TCB
26D1 CAE026             JZ     DVLF0     ;IF LANE FULL
26D4 48                 MOV    C,B              ;C=JDV
26D5 CD0427             CALL   DVRCC            ;SEND PACKAGE TO LFEDV(LANE FULL ERR DVT
26D8 2AB442             LHLD   TCBP             ;RETURN PACKAGE TCB TO FS
```

```
26DB CD4F11          CALL  PUTFS
26DE C1              POP   B              ;ADJUST STACK
26DF C9              RET                  ;RET
               ;
               ;IF DVTRS=2 THEN SCHEDULE RESET OF DV # JDV
               ;
26E0 3A383D    DVLF0:  LDA   DVTRS      ;IF DVTRS=2,
26E3 D602            SUI   2          ;  I.E., FIXED-LE-
26E5 C2F926          JNZ   DDVNS      ;  DV-PULSE OPTION
26E8 34              INR   M          ;DV MODE IN TCB = 2 TO RESET
26E9 11FDFF          LXI   D,0FFFDH   ;POINT D,E TO
26EC 19              DAD   D          ;  BYTE 7
26ED EB              XCHG             ;  IN TCB
26EE 0E01            MVI   C,1        ;SET PARAMETERS FOR ENTCB
26F0 210840          LXI   H,DVH      ;  ( DVH(1)=DVH )
26F3 CD2F29          CALL  ENTCB      ;SCHEDULE DV RESET
26F6 C3FF26          JMP   DOPUT
               ;
               ;OUTPUT DV SIGNAL AND EXIT
               ;
26F9 2AB442    DDVNS:  LHLD  TCBP       ;RETURN FREE
26FC CD4F11          CALL  PUTFS      ;  STORAGE
26FF C1        DOPUT:  POP   B          ;ACTUATE
2700 CD0F11          CALL  OPUT       ;  DV
2703 C9              RET
               ;;
               ;CALLED BY DVACT FOR PACKAGE RECIRCULATION.
               ;
               ;INPUT: C=JDV (DIVERT #), NDVT, TREE PARAMETERS, DVST= CTIME AT DIVERT.
               ;OUTPUT: UDBT= UD-BLOCKING TIME.
               ;ALL REGISTERS EFFECTED, CTIME EFFECTED.
               ;
               DVRCC:
               ;
               ;SCHEDULE RESETS FOR DIVERTS # JDV TO # LAST FOR THIS UD
               ;
2704 0D              DCR   C          ;C=JDV-1
2705 0600            MVI   B,0        ;B,C=JDV-1
2707 2A3942          LHLD  DVT        ;H,L POINTS TO TIME IN
270A 09              DAD   B          ;  DVT TABLE
270B 09              DAD   B          ;
270C 5E              MOV   E,M        ;D,E= TIME IN DVT
270D 23              INX   H          ;
270E 56              MOV   D,M        ;
270F 2A9B42          LHLD  DVST       ;H,L= CTIME AT DIVERT
2712 7D              MOV   A,L        ;H,L=CTIME- TIME IN DVT FOR
2713 93              SUB   E          ;  JDV=
2714 6F              MOV   L,A        ;  LAST UPDA BLOCKING
2715 7C              MOV   A,H        ;  TIME
2716 9A              SBB   D          ;
2717 67              MOV   H,A        ;
2718 229942          SHLD  UDBT       ;SAVE IN UDBT FOR SDVRS
               ;
271B 3AC042          LDA   MUD        ;A= LAST UD # FOR THIS PPI
271E 5F              MOV   E,A        ;D,E
271F 1600            MVI   D,0        ;  = LAST UD #
2721 2A3D42          LHLD  LDVDB      ;POINT H,L TO LDV OF
2724 19              DAD   D          ;  LAST UD
2725 2B              DCX   H          ;  FOR THIS PPI
2726 79              MOV   A,C        ;A=JDV-1
2727 2B        DPVUD:  DCX   H          ;POINT H,L TO PREVIOUS LDV
2728 1D              DCR   E          ;E = PREVIOUS UD #
2729 BE              CMP   M          ;DOUNTIL JDV-1 >= LDV,
272A DA2727          JC    DPVUD      ;  I.E., LDV < JDV
272D 1C              INR   E          ;COMPUTE
272E D5              PUSH  D          ;  UPDATE PHOTO #
272F 23              INX   H          ;A= LDV
2730 7E              MOV   A,M        ;  FOR THIS UD
2731 0C              INR   C          ;C=JDV
2732 CD7727          CALL  SDVRS      ;SCHEDULE THEIR RESETS
               ;
               ;SCHEDULE EVENT UDB1 FOR NEXT UPDATE PHOTO
               ;
2735 C1              POP   B          ;C = UPDATE PHOTO #
2736 3A043D          LDA   NUPDA      ;IF ALREADY
2739 A9              XRA   C          ;  PASSED LAST
273A 47              MOV   B,A        ;  UPDATE PHOTO
273B 3A313D          LDA   SIDEO      ;  AND NO SIDE-INDUCT
273E E602            ANI   02H        ;  AUTO
2740 B0              ORA   B          ;  RECIRCULATION
2741 C8              RZ               ;  THEN RETURN
               ;
2742 CDCB0F          CALL  GETFS      ;GET FREE BLOCK
2745 110D00          LXI   D,13       ;POINT TO BYTE 13
2748 19              DAD   D          ;  IN TCB
2749 3600            MVI   M,0        ;DEFAULT
274B 2B              DCX   H          ;  IDENT IN TCB
```

```
274C 3600            MVI   M,0        ;  = 0
274E 2B              DCX   H          ;POINT TO BYTE 11 IN TCB
274F 3A3D3D          LDA   LFEDV      ;ROUTE PACKAGE TO LANE-FULL
2752 77              MOV   M,A        ;  ERROR DIVERT
2753 2B              DCX   H          ;POINT TO BYTE 10 IN TCB
2754 71              MOV   M,C        ;SET JUPDA IN TCB
2755 34              INR   M          ;  FOR NEXT UPDATE PHOTO
2756 3A043D          LDA   NUPDA      ;UPDATE PHOTO # NUPDA + 1
2759 BE              CMP   M          ;  MEANS
275A D25F27          JNC   DRTCB      ;  UPDATE PHOTO
275D 3601            MVI   M,1        ;  # 1
275F 2B      DRTCB:  DCX   H          ;DEFAULT
2760 3601            MVI   M,1        ;  JINDU IN TCB = 1
2762 2B              DCX   H          ;POINT TO TCB BYTE 8
2763 119424          LXI   D,UDB1     ;LET
2766 72              MOV   M,D        ;  EVENT
2767 2B              DCX   H          ;  BE
2768 73              MOV   M,E        ;  UDB1
2769 EB              XCHG             ;POINT D,E TO BYTE 7 IN TCB
276A 2A9942          LHLD  UDBT       ;SET CTIME FOR
276D 22B642          SHLD  CTIME      ;  ENTCB
2770 2A3742          LHLD  UDT        ;SCHEDULE UDB1 FOR
2773 CD2F29          CALL  ENTCB      ;  UD # C
2776 C9              RET

             ;;
             ;SCHEDULE RESETS FOR DIVERTS # C TO # A,
             ;  ALL FOR CURRENT PPI.
             ;  CALLED BY UDBPC, SCHDV OR DVRCC.
             ;
             ;INPUT: UDBT= LAST UPDA BLOCKING TIME, TREE PARAMETERS.
             ;ALL REGISTERS EFFECTED.
             ;
2777 91      SDVRS:  SUB   C          ;RETURN
2778 D8              RC               ;  IF NO DIVERT TO RESET
             ;
2779 3C              INR   A          ;A= # DV'S TO RESET
277A 47              MOV   B,A        ;B= # DIVERTS TO BE RESET
277B CDCB0F          CALL  GETFS      ;GET FREE BLOCK
277E 110C00          LXI   D,12       ;POINT H,L TO BYTE 12
2781 19              DAD   D          ;  IN TCB
2782 EB              XCHG             ;D,E
2783 2A9942          LHLD  UDBT       ;  =
2786 EB              XCHG             ;  UDBT
2787 72              MOV   M,D        ;SET UDBT
2788 2B              DCX   H          ;  IN
2789 73              MOV   M,E        ;  TCB
278A 2B              DCX   H          ;POINT H,L TO BYTE 10 IN TCB
278B 70              MOV   M,B        ;STORE # DV'S TO RESET
278C 2B              DCX   H          ;SET # OF 1ST DV
278D 71              MOV   M,C        ;  TO RESET
278E 2B              DCX   H          ;POINT H,L TO BYTE 8 IN TCB
278F 117626          LXI   D,DVRS     ;LET
2792 72              MOV   M,D        ;  EVENT
2793 2B              DCX   H          ;  BE
2794 73              MOV   M,E        ;  DVRS
2795 CD1D29          CALL  ENDVA      ;SCHEDULE DV RESETS
2798 C9              RET
             ;;
             ;POINT H,L TO PPDB( INDUCT #).
             ;
             ;INPUT: A= INDUCT # .
             ;REGISTERS A, D, E EFFECTED.
             ;
2799 3D      CPPPP:  DCR   A          ;A = INDUCT # - 1
279A 87              ADD   A          ;A = ( INDUCT # - 1 ) * 2
279B 2A4342          LHLD  PPDB       ;POINT H,L TO PPDB
279E CD1B0D          CALL  AD16A      ;ADD ( INDUCT # * 32 )
27A1 C9              RET
             ;
             ;
             ;COMPUTE RSLDB POINTER.
             ;
             ;INPUT: C= INDUCT #.
             ;OUTPUT: HL POINTS TO RLSDB( INDUCT # ).
             ;REGISTER B ALSO EFFECTED.
             ;
27A2 2A4F42  CPRLP:  LHLD  RLSDB      ;POINT H,L TO RLSDB START
27A5 0600            MVI   B,0        ;BC
27A7 0D              DCR   C          ;  = INDUCT # - 1
27A8 09              DAD   B          ;POINT
27A9 09              DAD   B          ;  H,L
27AA 09              DAD   B          ;  TO
27AB 09              DAD   B          ;  RLSDB(JINDU)
27AC 0C              INR   C          ;RESTORE C = INDUCT #
27AD C9              RET
             ;;
             ;REMOVE THE NEXT ITEM FROM THE FUTURE EVENT TREE
```

```
                    ;  AND UPDATE NXTIM.
                    ;
                    ;INPUT: TREE PARAMETERS, AVL TREE.
                    ;OUTPUT: H,L POINTS TO TCB DELETED.
                    ;ALL REGISTERS EFFECTED.
                    ;
27AE 2ABA42  DEQUE:  LHLD  RLINK      ;GET ADDRESS OF ROOT
27B1 EB              XCHG              ;SAVE ADDRESS OF ROOT
27B2 210000          LXI   H,0         ;SAVE THE SP VALUE
27B5 39              DAD   SP          ;FOR STACK PURGE
27B6 22C642          SHLD  STKSV
27B9 21B842          LXI   H,HEAD      ;STACK (HEAD,+)
27BC E5              PUSH  H
27BD 2601            MVI   H,01
27BF E5      TEST:   PUSH  H           ;STACK DIRECTION
27C0 EB              XCHG              ;NODE ADDRESS TO (H,L)
                     GTLLK 0,0         ;MOVE TO THE LEFT
                     IF    00000H      ;IS NODE ADDRESS IN (H,L)?
                     LHLD  00000H      ;NO-NODE POINTER TO (H,L)
                     ENDIF
27C1 5E              MOV   E,M         ;MOVE THE LEFT
27C2 23              INX   H           ;LINK INTO THE
27C3 56              MOV   D,M         ;(D,E) REGISTER
                     IF    00000H      ;IS IT SAVE LINK MODE?
                     XCHG              ;YES - LINK TO (H,L)
                     SHLD  00000H      ;LINK TO MEMORY
                     ENDIF

27C4 2B              DCX   H           ;RESTORE NODE ADDRESS
27C5 7A              MOV   A,D         ;HAVE WE FOUND THE
27C6 B3              ORA   E           ;LEFTMOST NODE IN TREE?
27C7 CAD027          JZ    DLTE        ;YES - DELETE IT
27CA E5              PUSH  H           ;STACK AS PARENT ADDRESS
27CB 26FF            MVI   H,0FFH      ;MARK DIRECTION LEFT
27CD C3BF27          JMP   TEST        ;GO LEFT AGAIN
                    ;
                    ; DELETE A RECORD FROM TREE
                    ;
27D0 22C842  DLTE:   SHLD  QP          ;SAVE NODE ADDRESS
                     GTRLK 0,0         ;GET ITS RIGHT LINK
                     IF    00000H      ;IS NODE ADDRESS IN (H,L)?
                     LHLD  00000H      ;NO -.NODE POINTER TO (H,L)
                     ENDIF
27D3 23              INX   H           ;STEP POINTER TO
27D4 23              INX   H           ;THE RIGHT LINK
27D5 5E              MOV   E,M         ;MOVE THE RIGHT
27D6 23              INX   H           ;LINK INTO THE
27D7 56              MOV   D,M         ;(D,E) REGISTER
                     IF    00000H      ;IS IT SAVE LINK MODE?
                     XCHG              ;YES - LINK TO (H,L)
                     SHLD  00000H      ;LINK TO MEMORY
                     ENDIF

27D8 E1              POP   H           ;POP AND SAVE THE
27D9 7C              MOV   A,H         ;DIRECTION INTO NODE
27DA E1              POP   H           ;GET THE PARENT NODE
27DB 22CA42          SHLD  QX          ;SAVE ADDRESS OF PARENT
27DE B7              ORA   A           ;DIRECTION TO CONDITION CODE
27DF F5              PUSH  PSW         ;SAVE DIRECTION STATUS
27E0 F21329          JP    QRTY        ;PARENT IS TREE HEADER
                     PTLLK 0,0         ;RLINK(SON) TO LLINK(PARENT)
0001         MCTEM   SET   1           ;ASSUME ADDRESS IN (H,L)
                     IF    00000H      ;TEST ASSUMPTION
             MCTEM   SET   0           ;FALSE ASSUMPTION
                     ENDIF
                     IF    00000H      ;IS NEW LINK IN (D,E)?
                     IF    MCTEM       ;NO - BUT IS POINTER IN (H,L)?
                     XCHG              ;YES - SAVE NODE POINTER
                     ENDIF
                     LHLD  00000H      ;NEW LINK TO (H,L)
                     XCHG              ;NEW LINK TO (D,E)
                     ENDIF
                     IF    00000H      ;IS NODE ADDRESS IN (H,L)?
                     LHLD  00000H      ;NO - NODE POINTER TO (H,L)
                     ENDIF
27E3 73              MOV   M,E         ;MOVE THE NEW
27E4 23              INX   H           ;LEFT LINK VALUE
27E5 72              MOV   M,D         ;INTO THE NODE

27E6 7A      QRTX:   MOV   A,D         ;IF RLINK(SON) IS ZERO THE
27E7 B3              ORA   E           ;PARENT IS THE POST ORDER
27E8 CAF427          JZ    SETTM       ;SUCCESSOR OF TASK NODE
27EB EB      FIND:   XCHG              ;FIND THE POST ORDER
                     GTLLK 0,0         ;SUCCESSOR OF THE
                     IF    00000H      ;IS NODE ADDRESS IN (H,L)?
                     LHLD  00000H      ;NO-NODE POINTER TO (H,L)
                     ENDIF
27EC 5E              MOV   E,M         ;MOVE THE LEFT
```

```
27ED 23                INX    H             ;LINK INTO THE
27EE 56                MOV    D,M           ;(D,E) REGISTER
                       IF     00000H          ;IS IT SAVE LINK MODE?
                       XCHG                 ;YES - LINK TO (H,L)
                       SHLD   00000H          ;LINK TO MEMORY
                       ENDIF

27EF 7A                MOV     A,D          ;SELECTED NODE
27F0 B3                ORA     E
27F1 C2EB27            JNZ     FIND
27F4 110400   SETTM:   LXI     D,4          ;TIME OFFSET LESS ONE TO (D,E)
27F7 19                DAD     D            ;POINT TO NEXT EVENT TIME
27F8 5E                MOV     E,M          ;GET THE TIME OF
27F9 23                INX     H            ;THE NEXT EVENT
27FA 56                MOV     D,M
27FB EB                XCHG                 ;TIME TO (H,L)
27FC 22BD42            SHLD    NXTIM        ;UPDATE NEXT EVENT TIME
27FF F1                POP     PSW          ;RECOVER ENTRY DIRECTION
2800 2ACA42   QLOOP:   LHLD    QX           ;POINT TO PARENT NODE
2803 B7       QLRP:    ORA     A            ;ENTRY MODE TO FLAGS
2804 F2F528            JP      QXIT         ;PARENT IS TREE HEADER
                       GTBAL   0,0          ;GET BALANCE FACTOR OF PARENT
                       IF     00000H         ;IS NODE ADDRESS IN (H,L)?
                       LHLD   00000H         ;NO - NODE POINTER TO (H,L)
                       ENDIF
2807 23                INX    H             ;STEP POINTER TO
2808 23                INX    H             ;THE BALANCE BYTE
2809 23                INX    H
280A 23                INX    H
280B 7E                MOV    A,M           ;BALANCE CODE TO A-REG
                       IF     00000H          ;TEST IF SAVE NODE
                       STA    00000H          ;YES - CODE TO MEMORY
                       ENDIF
280C B7                ORA    A             ;SET CONDITION CODES

280D FAC228            JM      BMNUS        ;PARENT WAS HEAVY TO LEFT
2810 CACD28            JZ      BZERO        ;PARENT WAS BALANCED
                       GTRLK  QX,QT         ;PARENT WAS HEAVY TO RIGHT
                       IF     QX        ;IS NODE ADDRESS IN (H,L)?
2813 2ACA42            LHLD   QX        ;NO - NODE POINTER TO (H,L)
                       ENDIF
2816 23                INX    H             ;STEP POINTER TO
2817 23                INX    H             ;THE RIGHT LINK
2818 5E                MOV    E,M           ;MOVE THE RIGHT
2819 23                INX    H             ;LINK INTO THE
281A 56                MOV    D,M           ;(D,E) REGISTER
                       IF     QT          ;IS IT SAVE LINK MODE?
281B EB                XCHG                 ;YES - LINK TO (H,L)
281C 22CC42            SHLD   QT          ;LINK TO MEMORY
                       ENDIF


                       GTLLK  0,0           ;GET THE BALANCE FACTOR OF THE
                       IF     00000H    ;IS NODE ADDRESS IN (H,L)?
                       LHLD   00000H         ;NO-NODE POINTER TO (H,L)
                       ENDIF
281F 5E                MOV    E,M           ;MOVE THE LEFT
2820 23                INX    H             ;LINK INTO THE
2821 56                MOV    D,M           ;(D,E) REGISTER
                       IF     00000H          ;IS IT SAVE LINK MODE?
                       XCHG                 ;YES - LINK TO (H,L)
                       SHLD   00000H          ;LINK TO MEMORY
                       ENDIF

2822 2B                DCX     H            ;PARENTS RIGHT SUBTREE AFTER
                       GTBAL   0,0          ;GETTING THE LEFT LINK OF THE
                       IF     00000H         ;IS NODE ADDRESS IN (H,L)?
                       LHLD   00000H         ;NO - NODE POINTER TO (H,L)
                       ENDIF
2823 23                INX    H             ;STEP POINTER TO
2824 23                INX    H             ;THE BALANCE BYTE
2825 23                INX    H
2826 23                INX    H
2827 7E                MOV    A,M           ;BALANCE CODE TO A-REG
                       IF     00000H          ;TEST IF SAVE NODE
                       STA    00000H          ;YES - CODE TO MEMORY
                       ENDIF
2828 B7                ORA    A             ;SET CONDITION CODES

2829 CAD228            JZ      CASE3        ;SUBTREE ROOT NODE
282C FA5028            JM      CASE2        ;RIGHT SUBTREE HEAVY ON LEFT
282F 3600              MVI     M,0          ;RIGHT SUBTREE HEAVY ON RIGHT
                       PTRLK   QX,0         ;ROTATE SUBTREE INTO BALANCE
0001          MCTEM    SET    1             ;ASSUME ADDRESS IN (H,L)
                       IF     QX        ;TEST ASSUMPTION
0000          MCTEM    SET    0             ;FALSE ASSUMPTION
                       ENDIF
                       IF     00000H         ;IS NEW LINK IN (D,E)?
                       IF     MCTEM         ;NO - BUT IS POINTER IN (H,L)?
```

```
4573                           XCHG                  ;YES - SAVE NODE POINTER
4573                           ENDIF
4573                           LHLD   00000H          ;NEW LINK TO (H,L)
4573                           XCHG                  ;NEW LINK TO (D,E)
4573                           ENDIF
4573                           IF     QX           ;IS NODE ADDRESS IN (H,L)?
4573   2831 2ACA42             LHLD   QX           ;NO - NODE POINTER TO (H,L)
4573                           ENDIF
4573   2834 23                 INX    H              ;NOW STEP TO THE
4573   2835 23                 INX    H              ;RIGHT LINK BYTES
4573   2836 73                 MOV    M,E            ;MOVE THE NEW
4573   2837 23                 INX    H              ;RIGHT LINK VALUE
4573   2838 72                 MOV    M,D            ;INTO THE NODE
4573
4574                           PTLLK  QT,QX          ;PARENT TO LLINK(SUBTREE ROOT)
4574   0001          MCTEM     SET    1              ;ASSUME ADDRESS IN (H,L)
4574                           IF     QT           ;TEST ASSUMPTION
4574   0000          MCTEM     SET    0              ;FALSE ASSUMPTION
4574                           ENDIF
4574                           IF     QX           ;IS NEW LINK IN (D,E)?
4574                           IF     MCTEM          ;NO - BUT IS POINTER IN (H,L)?
4574                           XCHG                  ;YES - SAVE NODE POINTER
4574                           ENDIF
4574   2839 2ACA42             LHLD   QX           ;NEW LINK TO (H,L)
4574   283C EB                 XCHG                  ;NEW LINK TO (D,E)
4574                           ENDIF
4574                           IF     QT           ;IS NODE ADDRESS IN (H,L)?
4574   283D 2ACC42             LHLD   QT           ;NO - NODE POINTER TO (H,L)
4574                           ENDIF
4574   2840 73                 MOV    M,E            ;MOVE THE NEW
4574   2841 23                 INX    H              ;LEFT LINK VALUE
4574   2842 72                 MOV    M,D            ;INTO THE NODE
4574
4575   2843 AF                 XRA    A              ;THE ORIGINAL PARENT IS
4576   2844 EB                 XCHG                  ;NOW BALANCED BUT THE ROOT
4577                           PTBAL  0,0            ;OF RIGHT SUBTREE HAS REPLACED IT
4577                           IF     00000H          ;IS FACTOR IN A-REG?
4577                           LDA    00000H          ;NO - BALANCE TO A-REG
4577                           ENDIF
4577                           IF     00000H          ;IS NODE ADDRESS IN (H,L)
4577                           LHLD   00000H          ;NO - NODE POINTER TO (H,L)
4577                           ENDIF
4577   2845 23                 INX    H              ;STEP POINTER TO
4577   2846 23                 INX    H              ;THE BALANCE BYTE
4577   2847 23                 INX    H
4577   2848 23                 INX    H
4577   2849 77                 MOV    M,A            ;BALANCE CODE TO NODE
4577
4578   284A CDF928             CALL   CSUBR          ;SO ADJUST THE GRANDPARENT
4579   284D C30028             JMP    QLOOP          ;TREE HEIGHT CHANGED, SO GO ON
4580                 ;
4581   2850 EB       CASE2:    XCHG                  ;SAVE THE LEFT LINK OF
4582   2851 22CE42             SHLD   QW             ;THE SUBTREE ROOT NODE
4583                           GTRLK  0,0            ;PLACE THIS NODE INTO PARENTS
4583                           IF     00000H          ;IS NODE ADDRESS IN (H,L)?
4583                           LHLD   00000H          ;NO - NODE POINTER TO (H,L)
4583                           ENDIF
4583   2854 23                 INX    H              ;STEP POINTER TO
4583   2855 23                 INX    H              ;THE RIGHT LINK
4583   2856 5E                 MOV    E,M            ;MOVE THE RIGHT
4583   2857 23                 INX    H              ;LINK INTO THE
4583   2858 56                 MOV    D,M            ;(D,E) REGISTER
4583                           IF     00000H          ;IS IT SAVE LINK MODE?
4583                           XCHG                  ;YES - LINK TO (H,L)
4583                           SHLD   00000H          ;LINK TO MEMORY
4583                           ENDIF
4583
4584                           PTLLK  QT,0           ;TREE POSITION WITH PARENT AS
4584   0001          MCTEM     SET    1              ;ASSUME ADDRESS IN (H,L)
4584                           IF     QT           ;TEST ASSUMPTION
4584   0000          MCTEM     SET    0              ;FALSE ASSUMPTION
4584                           ENDIF
4584                           IF     00000H          ;IS NEW LINK IN (D,E)?
4584                           IF     MCTEM          ;NO - BUT IS POINTER IN (H,L)?
4584                           XCHG                  ;YES - SAVE NODE POINTER
4584                           ENDIF
4584                           LHLD   00000H          ;NEW LINK TO (H,L)
4584                           XCHG                  ;NEW LINK TO (D,E)
4584                           ENDIF
4584                           IF     QT           ;IS NODE ADDRESS IN (H,L)?
4584   2859 2ACC42             LHLD   QT           ;NO - NODE POINTER TO (H,L)
4584                           ENDIF
4584   285C 73                 MOV    M,E            ;MOVE THE NEW
4584   285D 23                 INX    H              ;LEFT LINK VALUE
4584   285E 72                 MOV    M,D            ;INTO THE NODE
4584
4585                           PTRLK  QW,QT          ;ITS LEFT SUBTREE AND ITS OLD LEFT
```

```
4585   0001          MCTEM    SET    1              ;ASSUME ADDRESS IN (H,L)
4585                          IF     QW             ;TEST ASSUMPTION
4585   0000          MCTEM    SET    0              ;FALSE ASSUMPTION
4585                          ENDIF
4585                          IF     QT             ;IS NEW LINK IN (D,E)?
4585                          IF     MCTEM             ;NO - BUT IS POINTER IN (H,L)?
4585                          XCHG                     ;YES - SAVE NODE POINTER
4585                          ENDIF
4585   285F 2ACC42            LHLD   QT             ;NEW LINK TO (H,L)
4585   2862 EB                XCHG                     ;NEW LINK TO (D,E)
4585                          ENDIF
4585                          IF     QW             ;IS NODE ADDRESS IN (H,L)?
4585   2863 2ACE42            LHLD   QW             ;NO - NODE POINTER TO (H,L)
4585                          ENDIF
4585   2866 23                INX    H                 ;NOW STEP TO THE
4585   2867 23                INX    H                 ;RIGHT LINK BYTES
4585   2868 73                MOV    M,E               ;MOVE THE NEW
4585   2869 23                INX    H                 ;RIGHT LINK VALUE
4585   286A 72                MOV    M,D               ;INTO THE NODE
4585
4586                          GTLLK  QW,0              ;SUBTREE AS PARENTS RIGHT SUBTREE
4586                          IF     QW     ;IS NODE ADDRESS IN (H,L)?
4586   286B 2ACE42            LHLD   QW             ;NO-NODE POINTER TO (H,L)
4586                          ENDIF
4586   286E 5E                MOV    E,M               ;MOVE THE LEFT
4586   286F 23                INX    H                 ;LINK INTO THE
4586   2870 56                MOV    D,M               ;(D,E) REGISTER
4586                          IF     00000H              ;IS IT SAVE LINK MODE?
4586                          XCHG                     ;YES - LINK TO (H,L)
4586                          SHLD   00000H              ;LINK TO MEMORY
4586                          ENDIF
4586
4587                          PTRLK  QX,0              ;ITS RIGHT SUBTREE REPLACES THE
4587   0001          MCTEM    SET    1                 ;ASSUME ADDRESS IN (H,L)
4587                          IF     QX             ;TEST ASSUMPTION
4587   0000          MCTEM    SET    0                 ;FALSE ASSUMPTION
4587                          ENDIF
4587                          IF     00000H             ;IS NEW LINK IN (D,E)?
4587                          IF     MCTEM             ;NO - BUT IS POINTER IN (H,L)?
4587                          XCHG                     ;YES - SAVE NODE POINTER
4587                          ENDIF
4587                          LHLD   00000H             ;NEW LINK TO (H,L)
4587                          XCHG                     ;NEW LINK TO (D,E)
4587                          ENDIF
4587                          IF     QX             ;IS NODE ADDRESS IN (H,L)?
4587   2871 2ACA42            LHLD   QX             ;NO - NODE POINTER TO (H,L)
4587                          ENDIF
4587   2874 23                INX    H                 ;NOW STEP TO THE
4587   2875 23                INX    H                 ;RIGHT LINK BYTES
4587   2876 73                MOV    M,E               ;MOVE THE NEW
4587   2877 23                INX    H                 ;RIGHT LINK VALUE
4587   2878 72                MOV    M,D               ;INTO THE NODE
4587
4588                          PTLLK  QW,QX             ;LEFT SUBTREE OF ORIGINAL RIGHT
4588   0001          MCTEM    SET    1                 ;ASSUME ADDRESS IN (H,L)
4588                          IF     QW             ;TEST ASSUMPTION
4588   0000          MCTEM    SET    0                 ;FALSE ASSUMPTION
4588                          ENDIF
4588                          IF     QX             ;IS NEW LINK IN (D,E)?
4588                          IF     MCTEM             ;NO - BUT IS POINTER IN (H,L)?
4588                          XCHG                     ;YES - SAVE NODE POINTER
4588                          ENDIF
4588   2879 2ACA42            LHLD   QX             ;NEW LINK TO (H,L)
4588   287C EB                XCHG                     ;NEW LINK TO (D,E)
4588                          ENDIF
4588                          IF     QW             ;IS NODE ADDRESS IN (H,L)?
4588   287D 2ACE42            LHLD   QW             ;NO - NODE POINTER TO (H,L)
4588                          ENDIF
4588   2880 73                MOV    M,E               ;MOVE THE NEW
4588   2881 23                INX    H                 ;LEFT LINK VALUE
4588   2882 72                MOV    M,D               ;INTO THE NODE
4588
4589   2883 2B                DCX    H                 ;SUBTREE OF THE PARENT
4590                          GTBAL  0,0               ;GET BALANCE FACTOR OF PARENTS REPLCMT
4590                          IF     00000H             ;IS NODE ADDRESS IN (H,L)?
4590                          LHLD   00000H             ;NO - NODE POINTER TO (H,L)
4590                          ENDIF
4590   2884 23                INX    H                 ;STEP POINTER TO
4590   2885 23                INX    H                 ;THE BALANCE BYTE
4590   2886 23                INX    H
4590   2887 23                INX    H
4590   2888 7E                MOV    A,M               ;BALANCE CODE TO A-REG
4590                          IF     00000H              ;TEST IF SAVE NODE
4590                          STA    00000H              ;YES - CODE TO MEMORY
4590                          ENDIF
4590   2889 B7                ORA    A                 ;SET CONDITION CODES
4590
```

```
288A CAB628         JZ     CSSZ         ;BALANCED NODE
288D F2B428         JP     CSSP         ;HEAVY ON THE RIGHT
2890 AF             XRA    A            ;NEW RIGHT SUBTREE OF PARENT
                    PTBAL  QX,0         ;BRINGS IT INTO BALANCE BUT
                    IF     00000H        ;IS FACTOR IN A-REG?
                    LDA    00000H        ;NO - BALANCE TO A-REG
                    ENDIF
                    IF     QX       ;IS NODE ADDRESS IN (H,L)
2891 2ACA42         LHLD   QX       ;NO - NODE POINTER TO (H,L)
                    ENDIF
2894 23             INX    H            ;STEP POINTER TO
2895 23             INX    H            ;THE BALANCE BYTE
2896 23             INX    H
2897 23             INX    H
2898 77             MOV    M,A          ;BALANCE CODE TO NODE

2899 3C             INR    A            ;ROOT OF ORIGINAL RIGHT SUBTREE
            CSSX:   PTBAL  QT,0         ;IS NOW HEAVY TO THE RIGHT
                    IF     00000H        ;IS FACTOR IN A-REG?
                    LDA    00000H        ;NO - BALANCE TO A-REG
                    ENDIF
                    IF     QT       ;IS NODE ADDRESS IN (H,L)
289A 2ACC42         LHLD   QT       ;NO - NODE POINTER TO (H,L)
                    ENDIF
289D 23             INX    H            ;STEP POINTER TO
289E 23             INX    H            ;THE BALANCE BYTE
289F 23             INX    H
28A0 23             INX    H
28A1 77             MOV    M,A          ;BALANCE CODE TO NODE

28A2 2ACE42         LHLD   QW           ;SAVE ADDRESS OF PARENTS
28A5 22CC42         SHLD   QT           ;REPLACEMENT NODE AND
28A8 AF             XRA    A            ;ALSO MARK IT AS A
                    PTBAL  0,0          ;BALANCED SUBTREE AND
                    IF     00000H        ;IS FACTOR IN A-REG?
                    LDA    00000H        ;NO - BALANCE TO A-REG
                    ENDIF
                    IF     00000H        ;IS NODE ADDRESS IN (H,L)
                    LHLD   00000H        ;NO - NODE POINTER TO (H,L)
                    ENDIF
28A9 23             INX    H            ;STEP POINTER TO
28AA 23             INX    H            ;THE BALANCE BYTE
28AB 23             INX    H
28AC 23             INX    H
28AD 77             MOV    M,A          ;BALANCE CODE TO NODE

28AE CDF928         CALL   CSUBR        ;ADJUST THE GRANDPARENT NODE LINK
28B1 C30028         JMP    QLOOP        ;TREE HEIGHT CHANGED - SO GO ON
            ;
28B4 3EFF   CSSP:   MVI    A,0FFH       ;PARENT WILL BE LEFT HEAVY
            CSSZ:   PTBAL  QX,0         ;SET PARENT BALANCE (0,-)
                    IF     00000H        ;IS FACTOR IN A-REG?
                    LDA    00000H        ;NO - BALANCE TO A-REG
                    ENDIF
                    IF     QX       ;IS NODE ADDRESS IN (H,L)
28B6 2ACA42         LHLD   QX       ;NO - NODE POINTER TO (H,L)
                    ENDIF
28B9 23             INX    H            ;STEP POINTER TO
28BA 23             INX    H            ;THE BALANCE BYTE
28BB 23             INX    H
28BC 23             INX    H
28BD 77             MOV    M,A          ;BALANCE CODE TO NODE

28BE AF             XRA    A            ;BUT ORIGINAL RIGHT SUBTREE
28BF C39A28         JMP    CSSX         ;OF PARENT WILL BE BALANCED
            ;
28C2 AF     BMNUS:  XRA    A            ;REMOVED ITEM ON LEFT SO
28C3 77             MOV    M,A          ;PARENT IS NOW BALANCED
28C4 E1             POP    H            ;BUT WE MAY HAVE UPSET
28C5 7C             MOV    A,H          ;BALANCES ABOVE THIS NODE
28C6 E1             POP    H            ;SO BACKTRACK UP THE TREE
28C7 22CA42         SHLD   QX           ;SET NEW PARENT ADDRESS
28CA C30328         JMP    QLRP         ;AND GO ON
            ;
28CD 3C     BZERO:  INR    A            ;PARENT NOW HEAVY ON RIGHT
28CE 77             MOV    M,A          ;BUT SUBTREE HEIGHT UNCHANGED
28CF C3F128         JMP    QDONE        ;SO THE TOTAL TREE IS NOW OK
            ;
28D2 3EFF   CASE3:  MVI    A,0FFH       ;PARENTS REPLACEMENT WILL
                    PTBAL  QT,0         ;BE HEAVY TO THE LEFT
                    IF     00000H        ;IS FACTOR IN A-REG?
                    LDA    00000H        ;NO - BALANCE TO A-REG
                    ENDIF
                    IF     QT       ;IS NODE ADDRESS IN (H,L)
28D4 2ACC42         LHLD   QT       ;NO - NODE POINTER TO (H,L)
                    ENDIF
28D7 23             INX    H            ;STEP POINTER TO
```

```
4622   28D8 23                  INX   H              ;THE BALANCE BYTE
4622   28D9 23                  INX   H
4622   28DA 23                  INX   H
4622   28DB 77                  MOV   M,A            ;BALANCE CODE TO NODE
4622
4623                            PTRLK  QX,0          ;SUBTREE ROOT LLINK TO PARENT RLINK
4623   0001          MCTEM      SET   1              ;ASSUME ADDRESS IN (H,L)
4623                            IF    QX           ;TEST ASSUMPTION
4623   0000          MCTEM      SET   0              ;FALSE ASSUMPTION
4623                            ENDIF
4623                            IF    00000H          ;IS NEW LINK IN (D,E)?
4623                            IF    MCTEM          ;NO - BUT IS POINTER IN (H,L)?
4623                            XCHG                 ;YES - SAVE NODE POINTER
4623                            ENDIF
4623                            LHLD  00000H          ;NEW LINK TO (H,L)
4623                            XCHG                 ;NEW LINK TO (D,E)
4623                            ENDIF
4623                            IF    QX           ;IS NODE ADDRESS IN (H,L)?
4623   28DC 2ACA42              LHLD  QX           ;NO - NODE POINTER TO (H,L)
4623,                           ENDIF
4623   28DF 23                  INX   H              ;NOW STEP TO THE
4623   28E0 23                  INX   H              ;RIGHT LINK BYTES
4623   28E1 73                  MOV   M,E            ;MOVE THE NEW
4623   28E2 23                  INX   H              ;RIGHT LINK VALUE
4623   28E3 72                  MOV   M,D            ;INTO THE NODE
4623
4624                            PTLLK  QT,QX          ;ADD PARENT AS LEFT SUBTREE
4624   0001          MCTEM      SET    1             ;ASSUME ADDRESS IN (H,L)
4624                            IF    QT           ;TEST ASSUMPTION
4624   0000          MCTEM      SET   0              ;FALSE ASSUMPTION
4624                            ENDIF
4624                            IF    QX           ;IS NEW LINK IN (D,E)?
4624                            IF    MCTEM          ;NO - BUT IS POINTER IN (H,L)?
4624                            XCHG                 ;YES - SAVE NODE POINTER
4624                            ENDIF
4624   28E4 2ACA42              LHLD  QX           ;NEW LINK TO (H,L)
4624   28E7 EB                  XCHG                 ;NEW LINK TO (D,E)
4624                            ENDIF
4624                            IF    QT           ;IS NODE ADDRESS IN (H,L)?
4624   28E8 2ACC42              LHLD  QT           ;NO - NODE POINTER TO (H,L)
4624                            ENDIF
4624   28EB 73                  MOV   M,E            ;MOVE THE NEW
4624   28EC 23                  INX   H              ;LEFT LINK VALUE
4624   28ED 72                  MOV   M,D            ;INTO THE NODE
4624
4625   28EE CDF928              CALL   CSUBR         ;LINK NEW PARENT TO TREE
4626                 ;
4627   28F1 2AC642   QDONE:     LHLD   STKSV         ;PURGE THE STACK BACK
4628   28F4 F9                  SPHL                 ;TO ITS ENTRY VALUE
4629   28F5 2AC842   QXIT:      LHLD   QP            ;ADDRESS OF SELECTED NODE
4630   28F8 C9                  RET                  ;RETURN
4631                 ;
4632   28F9 2ACC42   CSUBR:     LHLD   QT            ;GET ADDRESS OF OLD PARENT
4633   28FC EB                  XCHG                 ;NODE REPLACEMENT AND
4634   28FD E1                  POP    H             ;POP THE ROUTINE RETURN THEN
4635   28FE E3                  XTHL                 ;GET GRANDPARENTS EXIT DIRECTION
4636   28FF 7C                  MOV    A,H           ;SAVE IT
4637   2900 E1                  POP    H             ;THE RETURN AGAIN
4638   2901 E3                  XTHL                 ;GET GRANDPARENT ADDRESS
4639   2902 22CA42              SHLD   QX            ;AND SAVE IT
4640   2905 B7                  ORA    A             ;DIRECTION TO CONDITION CODE
4641   2906 FA0F29              JM     CS225         ;WE CAME FROM THE LEFT
4642                            PTRLK  0,0           ;ADJUST THE RIGHT LINK
4642   0001          MCTEM      SET   1              ;ASSUME ADDRESS IN (H,L)
4642                            IF    00000H          ;TEST ASSUMPTION
4642                 MCTEM      SET   0              ;FALSE ASSUMPTION
4642                            ENDIF
4642                            IF    00000H          ;IS NEW LINK IN (D,E)?
4642                            IF    MCTEM          ;NO - BUT IS POINTER IN (H,L)?
4642                            XCHG                 ;YES - SAVE NODE POINTER
4642                            ENDIF
4642                            LHLD  00000H          ;NEW LINK TO (H,L)
4642                            XCHG                 ;NEW LINK TO (D,E)
4642                            ENDIF
4642                            IF    00000H          ;IS NODE ADDRESS IN (H,L)?
4642                            LHLD  00000H          ;NO - NODE POINTER TO (H,L)
4642                            ENDIF
4642   2909 23                  INX   H              ;NOW STEP TO THE
4642   290A 23                  INX   H              ;RIGHT LINK BYTES
4642   290B 73                  MOV   M,E            ;MOVE THE NEW
4642   290C 23                  INX   H              ;RIGHT LINK VALUE
4642   290D 72                  MOV   M,D            ;INTO THE-NODE
4642
4643   290E C9                  RET                  ;AND RETURN
4644                 ;
4645                 CS225:     PTLLK  0,0           ;ADJUST THE LEFT LINK
4645   0001          MCTEM      SET   1              ;ASSUME ADDRESS IN (H,L)
```

```
                        IF    00000H          ;TEST ASSUMPTION
               MCTEM    SET   0               ;FALSE ASSUMPTION
                        ENDIF
                        IF    00000H          ;IS NEW LINK IN (D,E)?
                        IF    MCTEM           ;NO - BUT IS POINTER IN (H,L)?
                        XCHG                  ;YES - SAVE NODE POINTER
                        ENDIF
                        LHLD  00000H          ;NEW LINK TO (H,L)
                        XCHG                  ;NEW LINK TO (D,E)
                        ENDIF
                        IF    00000H          ;IS NODE ADDRESS IN (H,L)?
                        LHLD  00000H          ;NO - NODE POINTER TO (H,L)
                        ENDIF
     290F 73            MOV   M,E             ;MOVE THE NEW
     2910 23            INX   H               ;LEFT LINK VALUE
     2911 72            MOV   M,D             ;INTO THE NODE

     2912 C9            RET                   ;AND RETURN
               ;
               QRTY:    PTRLK  0,0            ;ESTABLISH THE NEW ROOT
     0001      MCTEM    SET   1               ;ASSUME ADDRESS IN (H,L)
                        IF    00000H          ;TEST ASSUMPTION
               MCTEM    SET   0               ;FALSE ASSUMPTION
                        ENDIF
                        IF    00000H          ;IS NEW LINK IN (D,E)?
                        IF    MCTEM           ;NO - BUT IS POINTER IN (H,L)?
                        XCHG                  ;YES - SAVE NODE POINTER
                        ENDIF
                        LHLD  00000H          ;NEW LINK TO (H,L)
                        XCHG                  ;NEW LINK TO (D,E)
                        ENDIF
                        IF    00000H          ;IS NODE ADDRESS IN (H,L)?
                        LHLD  00000H          ;NO - NODE POINTER TO (H,L)
                        ENDIF
     2913 23            INX   H               ;NOW STEP TO THE
     2914 23            INX   H               ;RIGHT LINK BYTES
     2915 73            MOV   M,E             ;MOVE THE NEW
     2916 23            INX   H               ;RIGHT LINK VALUE
     2917 72            MOV   M,D             ;INTO THE NODE

     2918 2B            DCX    H              ;NODE FOR THE TREE AND
     2919 2B            DCX    H              ;ADJUST THE POINTERS SO
     291A C3E627        JMP    QRTX           ;THAT WE MAY CONTINUE
               ;;
               ;SCHEDULE DIVERT ACTUATION EVENT AT UDBT + DVT(C).
               ;  CALLED BY SCDVA, DVRS, SDVRS.
               ;
               ;INPUT: H,L POINTS TO BYTE 7 IN TCB, TREE PARAMETERS, UDBT, C=JDV.
               ;OUTPUT: EVENT IN TREE, UPDATED PPIDB.
               ;ALL REGISTERS EFFECTED.
               ;
     291D EB   ENDVA:   XCHG          ;POINT D,E TO BYTE 7 IN TCB
     291E 2A3942        LHLD  DVT     ;POINT H,L TO DVT TABLE
     2921 0600          MVI   B,0     ;B,C=JDV
     2923 09            DAD   B       ;POINT H,L TO
     2924 09            DAD   B       ;  DVT(JDV)
     2925 2B            DCX   H       ;  MS BYTE
     2926 46            MOV   B,M     ;B,C
     2927 2B            DCX   H       ;  =
     2928 4E            MOV   C,M     ;  DVT(JDV)
     2929 2A9942        LHLD  UDBT    ;H,L=UDBT
     292C C33A29        JMP   ENTC1
               ;
               ;SCHEDULE EVENT AT CTIME + H,L(C).
               ;
               ;INPUT: D,E POINTS TO BYTE 7 IN TCB, H,L POINTS TO TIME
               ;  TABLE, C ITS INDEX, TREE PARAMETERS.
               ;OUTPUT: EVENT IN TREE.
               ;ALL REGISTERS EFFECTED.
               ;
     292F 0600 ENTCB:   MVI   B,0     ;B,C= INDEX
     2931 09            DAD   B       ;POINT H,L
     2932 09            DAD   B       ;  TO TIME
     2933 2B            DCX   H       ;  MS BYTE
     2934 46            MOV   B,M     ;B,C
     2935 2B            DCX   H       ;  = TABLE
     2936 4E            MOV   C,M     ;  TIME
     2937 2AB642        LHLD  CTIME   ;H,L= CTIME
               ;
     293A 09   ENTC1:   DAD   B       ;H,L= EVENT TIME
     293B EB            XCHG          ;D,E= EVTIM, POINT H,L TO
     293C 2B            DCX   H       ;  BYTE 6 IN TCB
     293D 72            MOV   M,D     ;SET EVTIM
     293E 2B            DCX   H       ;  IN
     293F 73            MOV   M,E     ;  TCB
     2940 11FBFF        LXI   D,0FFFBH ;POINT H,L TO
     2943 19            DAD   D       ;  TCB
```

```
                        ;
                        ;
                        ;INSERT TCB INTO EVENT TREE & UPDATE PPIDB.
                        ;
                        ;INPUT: H,L POINTS TO TCB, TREE PARAMETERS FOR THIS PPI,
                        ;  PPIDP POINTS TO CTIME IN PPIDB (SEE EXEC, GTREP).
                        ;ALL REGISTERS EFFECTED.
                        ;
2944 CD5629     ENQU2:  CALL  ENQUE     ;INSERT EVENT TCB
2947 2AD842             LHLD  PPIDP     ;POINT D,E TO
294A EB                 XCHG            ;  CTIME IN PPIDB
294B 13                 INX   D         ;SKIP PPI CLOCK TIME SINCE
294C 13                 INX   D         ;  IT MAY HAVE BEEN CHANGED BY PPIIN
294D 21B842             LXI   H,HEAD    ;POINT H,L TO TREE HEADER
2950 060E               MVI   B,14      ;UPDATE
2952 CDCF10             CALL  MOVEB     ;  PPIDB
2955 C9                 RET
                        ;;
                        ; ADD A NEW NODE TO THE FUTURE EVENT TREE
                        ;
2956 EB         ENQUE:  XCHG                    ;SAVE NEW NODE ADDRESS
2957 2ABA42             LHLD   RLINK            ;TEST IF THE
295A 7C                 MOV    A,H              ;TREE IS EMPTY
295B B5                 ORA    L
295C CAE22B             JZ     TREMT            ;THE TREE IS EMPTY
295F D5                 PUSH   D                ;SAVE NODE ADDRESS
2960 EB                 XCHG                    ;SAVE ADDRESS OF THE ROOT
2961 21B842             LXI    H,HEAD           ;POINT TO THE TREE HEADER
2964 22CC42             SHLD   QT               ;SET PARENT ADDRESS
2967 EB                 XCHG                    ;GET BALANCE POINT NODE
2968 22D042             SHLD   QS               ;AND SAVE IT
296B AF                 XRA    A                ;MARK EXIT DIRECTION
296C 32D442             STA    QDIR             ;AS RIGHT AND SAVE IT
296F 22C842             SHLD   QP               ;SET CURRENT NODE ADDRESS
2972 E1                 POP    H                ;RECOVER THE ADDRESS
2973 E5                 PUSH   H                ;OF THE NEW NODE
2974 CDEE2B             CALL   NDCLR            ;CLEAR ITS LINKS & GET 'TIME'
2977 2ABD42             LHLD   NXTIM            ;GET THE NEXT SCHEDULED
297A EB                 XCHG                    ;EVENT TIME AND COMPARE
297B 7B                 MOV    A,E              ;IT TO THE SCHEDULED TIME
297C 95                 SUB    L                ;IN THE NEW FUTURE EVENT
297D 7A                 MOV    A,D              ;(NXTIME)-(NEW TIME)
297E 9C                 SBB    H
                ;        ADD    A                ;DECISION BIT TO CONDITION CODE
297F FA8529             JM     ENQ10            ;NEW EVENT IS NOT NEXT
2982 22BD42             SHLD   NXTIM            ;UPDATE NEXT EVENT TIME
2985 22D642     ENQ10:  SHLD   NEWTM            ;SAVE THIS EVENT TIME
2988 2AC842             LHLD   QP               ;COMPARE THE NEW 'PPI'
298B CDFD2B     ENQ2:   CALL   CMPTM            ;TIME WITH NODE VALUE
298E F2CA29             JP     ENQ4             ;MOVE TO RIGHT IN SUBTREE
                ENQ3:   GTLLK  QP,QW            ;MOVE TO THE LEFT
                        IF    QP      ;IS NODE ADDRESS IN (H,L)?
2991 2AC842             LHLD  QP               ;NO-NODE POINTER TO (H,L)
                        ENDIF
2994 5E                 MOV   E,M               ;MOVE THE LEFT
2995 23                 INX   H                 ;LINK INTO THE
2996 56                 MOV   D,M               ;(D,E) REGISTER
                        IF    QW               ;IS IT SAVE LINK MODE?
2997 EB                 XCHG                    ;YES - LINK TO (H,L)
2998 22CE42             SHLD  QW               ;LINK TO MEMORY
                        ENDIF

299B 7C                 MOV    A,H              ;BUT TEST FOR A
299C B5                 ORA    L                ;NULL LEFT SUBTREE
299D CAE929             JZ     ENQ5             ;NULL - ADD NEW NODE
29A0 16FF               MVI    D,0FFH           ;MARK DIRECTION AS LEFT
                ENQ3A:  GTBAL  0,0              ;TEST THE BALANCE FACTOR
                        IF    00000H            ;IS NODE ADDRESS IN (H,L)?
                        LHLD  00000H            ;NO - NODE POINTER TO (H,L)
                        ENDIF
29A2 23                 INX   H                 ;STEP POINTER TO
29A3 23                 INX   H                 ;THE BALANCE BYTE
29A4 23                 INX   H
29A5 23                 INX   H
29A6 7E                 MOV   A,M               ;BALANCE CODE TO A-REG
                        IF    00000H             ;TEST IF SAVE NODE
                        STA   00000H             ;YES - CODE TO MEMORY
                        ENDIF
29A7 B7                 ORA   A                 ;SET CONDITION CODES

29A8 CAC129             JZ     ENQ3B            ;OF THIS NODE - BALANCED
29AB 7A                 MOV    A,D              ;GET EXIT DIRECTION FROM
29AC 32D442             STA    QDIR             ;THIS NODE'S PARENT AND SAVE
29AF 2AC842             LHLD   QP               ;RECORD PARENT OF THE
29B2 22CC42             SHLD   QT               ;NEW REBALANCE POINT
29B5 2ACE42             LHLD   QW               ;MARK THE NEXT NODE
29B8 22D042             SHLD   QS               ;AS REBALANCE POINT
```

```
29BB 22C842            SHLD   QP             ;AND AS CURRENT NODE
29BE C38B29            JMP    ENQ2           ;FIND DIRECTION OF NEXT STEP
                ;
29C1 2ACE42     ENQ3B: LHLD   QW       ;MARK THIS AS
29C4 22C842            SHLD   QP       ;  THE CURRENT NODE
29C7 C38B29            JMP    ENQ2     ;FIND DIRECTION OF NEXT STEP
                ;
                ENQ4:  GTRLK  QP,QW          ;MOVE TO THE RIGHT
                       IF     QP           ;IS NODE ADDRESS IN (H,L)?
29CA 2AC842            LHLD   QP           ;NO - NODE POINTER TO (H,L)
                       ENDIF
29CD 23                INX    H              ;STEP POINTER TO
29CE 23                INX    H              ;THE RIGHT LINK
29CF 5E                MOV    E,M            ;MOVE THE RIGHT
29D0 23                INX    H              ;LINK INTO THE
29D1 56                MOV    D,M            ;(D,E) REGISTER
                       IF     QW            ;IS IT SAVE LINK MODE?
29D2 EB                XCHG                  ;YES - LINK TO (H,L)
29D3 22CE42            SHLD   QW            ;LINK TO MEMORY
                       ENDIF

29D6 7C                MOV    A,H            ;BUT TEST FOR A
29D7 B5                ORA    L              ;NULL RIGHT SUBTREE
29D8 1600              MVI    D,0            ;BUT MARK A STEP RIGHT
29DA C2A229            JNZ    ENQ3A          ;CONTINUE IF NOT NULL SUBTREE
29DD D1                POP    D              ;GET NEW NODE ADDRESS
                       PTRLK  QP,0           ;ATTACH AS RIGHT SUBTREE
0001            MCTEM  SET    1              ;ASSUME ADDRESS IN (H,L)
                       IF     QP           ;TEST ASSUMPTION
0000            MCTEM  SET    0              ;FALSE ASSUMPTION
                       ENDIF
                       IF     00000H          ;IS NEW LINK IN (D,E)?
                       IF     MCTEM          ;NO - BUT IS POINTER IN (H,L)?
                       XCHG                  ;YES - SAVE NODE POINTER
                       ENDIF
                       LHLD   00000H          ;NEW LINK TO (H,L)
                       XCHG                  ;NEW LINK TO (D,E)
                       ENDIF
                       IF     QP           ;IS NODE ADDRESS IN (H,L)?
29DE 2AC842            LHLD   QP           ;NO - NODE POINTER TO (H,L)
                       ENDIF
29E1 23                INX    H              ;NOW STEP TO THE
29E2 23                INX    H              ;RIGHT LINK BYTES
29E3 73                MOV    M,E            ;MOVE THE NEW
29E4 23                INX    H              ;RIGHT LINK VALUE
29E5 72                MOV    M,D            ;INTO THE NODE

29E6 C3F029            JMP    ENQ6           ;IF NEEDED - BALANCE THE TREE
                ;
29E9 D1         ENQ5:  POP    D              ;GET NEW NODE ADDRESS
                       PTLLK  QP,0           ;ATTACH AS LEFT SUBTREE
0001            MCTEM  SET    1              ;ASSUME ADDRESS IN (H,L)
                       IF     QP           ;TEST ASSUMPTION
0000            MCTEM  SET    0              ;FALSE ASSUMPTION
                       ENDIF
                       IF     00000H          ;IS NEW LINK IN (D,E)?
                       IF     MCTEM          ;NO - BUT IS POINTER IN (H,L)?
                       XCHG                  ;YES - SAVE NODE POINTER
                       ENDIF
                       LHLD   00000H          ;NEW LINK TO (H,L)
                       XCHG                  ;NEW LINK TO (D,E)
                       ENDIF
                       IF     QP           ;IS NODE ADDRESS IN (H,L)?
29EA 2AC842            LHLD   QP           ;NO - NODE POINTER TO (H,L)
                       ENDIF
29ED 73                MOV    M,E            ;MOVE THE NEW
29EE 23                INX    H              ;LEFT LINK VALUE
29EF 72                MOV    M,D            ;INTO THE NODE

                ;
                ;BALANCE TREE
                ;
29F0 EB         ENQ6:  XCHG                  ;NOW SAVE THE ADDRESS
29F1 22CE42            SHLD   QW             ;OF THE ADDED NODE
29F4 2AD042            LHLD   QS             ;DETERMINE IF LEFT OR
29F7 CDFD2B            CALL   CMPTM          ;RIGHT SUBTREE TO BE
29FA F5                PUSH   PSW            ;ADJUSTED - SAVE INDICATOR
29FB 2AD042            LHLD   QS             ;POINT TO REBALANCE POINT
29FE FA092A            JM     EN6A1          ;TEST FOR LEFT SUBTREE
                       GTRLK  0,0            ;IT IS RIGHT SUBTREE
                       IF     00000H          ;IS NODE ADDRESS IN (H,L)?
                       LHLD   00000H          ;NO - NODE POINTER TO (H,L)
                       ENDIF
2A01 23                INX    H              ;STEP POINTER TO
2A02 23                INX    H              ;THE RIGHT LINK
2A03 5E                MOV    E,M            ;MOVE THE RIGHT
2A04 23                INX    H              ;LINK INTO THE
```

```
4787    2A05 56                MOV    D,M              ;(D,E) REGISTER
4787                           IF     00000H             ;IS IT SAVE LINK MODE?
4787                           XCHG                    ;YES - LINK TO (H,L)
4787                           SHLD   00000H             ;LINK TO MEMORY
4787                           ENDIF
4787
4788    2A06 C30C2A            JMP    EN6A2            ;GO TO COMMON PATH
4789                    ;
4790                    EN6A1: GTLLK  0,0              ;IT IS LEFT SUBTREE
4790                           IF     00000H       ;IS NODE ADDRESS IN (H,L)?
4790                           LHLD   00000H            ;NO-NODE POINTER TO (H,L)
4790                           ENDIF
4790    2A09 5E                MOV    E,M              ;MOVE THE LEFT
4790    2A0A 23                INX    H                ;LINK INTO THE
4790    2A0B 56                MOV    D,M              ;(D,E) REGISTER
4790                           IF     00000H             ;IS IT SAVE LINK MODE?
4790                           XCHG                    ;YES - LINK TO (H,L)
4790                           SHLD   00000H             ;LINK TO MEMORY
4790                           ENDIF
4790
4791    2A0C EB         EN6A2: XCHG                    ;GET START OF CHAIN
4792    2A0D 22C842            SHLD   QP               ;INITIALIZE THE
4793    2A10 22D242            SHLD   QR               ;PATH POINTERS
4794    2A13 EB         EN6A3: XCHG                    ;SAVE NEXT NODE ADDRESS
4795    2A14 2ACE42            LHLD   QW               ;BUT TEST IF IT IS
4796    2A17 7D                MOV    A,L              ;THE NEWLY ADDED NODE
4797    2A18 AB                XRA    E
4798    2A19 C2212A            JNZ    EN6A4            ;NO
4799    2A1C 7C                MOV    A,H              ;MAYBE - COMPARE THE
4800    2A1D AA                XRA    D                ;SECOND BYTES
4801    2A1E CA532A            JZ     ENQ7             ;OK - BALANCE FACTORS ADJUSTED
4802    2A21 EB         EN6A4: XCHG                    ;NEW NODE ADDRESS TO (H,L)
4803    2A22 CDFD2B            CALL   CMPTM            ;COMPARE THE KEYS
4804    2A25 2AC842            LHLD   QP               ;AGAIN POINT TO THE NODE
4805    2A28 FA412A            JM     EN6A5            ;WE MUST CHASE LEFTWARDS
4806    2A2B 3E01              MVI    A,01             ;SET BALANCE FACTOR TO +
4807                           PTBAL  0,0              ;AND ADJUST THIS NODE
4807                           IF     00000H            ;IS FACTOR IN A-REG?
4807                           LDA    00000H            ;NO - BALANCE TO A-REG
4807                           ENDIF
4807                           IF     00000H            ;IS NODE ADDRESS IN (H,L)
4807                           LHLD   00000H            ;NO - NODE POINTER TO (H,L)
4807                           ENDIF
4807    2A2D 23                INX    H                ;STEP POINTER TO
4807    2A2E 23                INX    H                ;THE BALANCE BYTE
4807    2A2F 23                INX    H
4807    2A30 23                INX    H
4807    2A31 77                MOV    M,A              ;BALANCE CODE TO NODE
4807
4808                           GTRLK  QP,QP            ;MOVE TO THE RIGHT
4808                           IF     QP             ;IS NODE ADDRESS IN (H,L)?
4808    2A32 2AC842            LHLD   QP             ;NO - NODE POINTER TO (H,L)
4808                           ENDIF
4808    2A35 23                INX    H                ;STEP POINTER TO
4808    2A36 23                INX    H                ;THE RIGHT LINK
4808    2A37 5E                MOV    E,M              ;MOVE THE RIGHT
4808    2A38 23                INX    H                ;LINK INTO THE
4808    2A39 56                MOV    D,M              ;(D,E) REGISTER
4808                           IF     QP              ;IS IT SAVE LINK MODE?
4808    2A3A EB                XCHG                    ;YES - LINK TO (H,L)
4808    2A3B 22C842            SHLD   QP              ;LINK TO MEMORY
4808                           ENDIF
4808
4809    2A3E C3132A            JMP    EN6A3            ;CONTINUE
4810
4811
4812                    ;
4813                    EN6A5: PTBAL  0,0              ;SET NEW BALANCE AS (-)
4813                           IF     00000H            ;IS FACTOR IN A-REG?
4813                           LDA    00000H            ;NO - BALANCE TO A-REG
4813                           ENDIF
4813                           IF     00000H            ;IS NODE ADDRESS IN (H,L)
4813                           LHLD   00000H            ;NO - NODE POINTER TO (H,L)
4813                           ENDIF
4813    2A41 23                INX    H                ;STEP POINTER TO
4813    2A42 23                INX    H                ;THE BALANCE BYTE
4813    2A43 23                INX    H
4813    2A44 23                INX    H
4813    2A45 77                MOV    M,A              ;BALANCE CODE TO NODE
4813
4814                           GTLLK  QP,QP            ;MOVE TO THE LEFT
4814                           IF     QP     ;IS NODE ADDRESS IN (H,L)?
4814    2A46 2AC842            LHLD   QP           ;NO-NODE POINTER TO (H,L)
4814                           ENDIF
4814    2A49 5E                MOV    E,M              ;MOVE THE LEFT
4814    2A4A 23                INX    H                ;LINK INTO THE
4814    2A4B 56                MOV    D,M              ;(D,E) REGISTER
```

```
4814                       IF    QP               ;IS IT SAVE LINK MODE?
4814   2A4C EB             XCHG                    ;YES - LINK TO (H,L)
4814   2A4D 22C842         SHLD  QP               ;LINK TO MEMORY
4814                       ENDIF
4814
4815   2A50 C3132A         JMP    EN6A3            ;CONTINUE
4816                 ;
4817   2A53 F1       ENQ7: POP    PSW              ;RECOVER REBALANCE DIRECTION
4818   2A54 FA072B         JM     EN7AM            ;WE ARE ADJUSTING A LEFT SUBTREE
4819                       GTBAL  QS,0             ;WAS REBALANCE POINT BALANCED?
4819                       IF    QS               ;IS NODE ADDRESS IN (H,L)?
4819   2A57 2AD042         LHLD  QS               ;NO - NODE POINTER TO (H,L)
4819                       ENDIF
4819   2A5A 23             INX   H                 ;STEP POINTER TO
4819   2A5B 23             INX   H                 ;THE BALANCE BYTE
4819   2A5C 23             INX   H
4819   2A5D 23             INX   H
4819   2A5E 7E             MOV   A,M               ;BALANCE CODE TO A-REG
4819                       IF    00000H              ;TEST IF SAVE NODE
4819                       STA   00000H              ;YES - CODE TO MEMORY
4819                       ENDIF
4819   2A5F B7             ORA   A                 ;SET CONDITION CODES
4819
4820   2A60 C2672A         JNZ    EN7P1            ;NO
4821   2A63 3E01           MVI    A,01             ;YES - SET BALANCE FACTOR TO (+)
4822   2A65 77             MOV    M,A              ;BECAUSE THE TREE IS HIGHER
4823   2A66 C9             RET                     ;WE ARE DONE
4824                 ;
4825   2A67 F26D2A   EN7P1: JP    EN7P2            ;SUBTREE WAS HEAVY TO RIGHT
4826   2A6A AF       EN7X1: XRA   A                ;IT WAS HEAVY TO THE LEFT
4827   2A6B 77             MOV    M,A              ;NOW IT IS BALANCED
4828   2A6C C9             RET                     ;WE ARE DONE
4829                 ;
4830                 EN7P2: GTBAL QR,0             ;TREE TOO FAR OUT OF BALANCE
4830                       IF    QR               ;IS NODE ADDRESS IN (H,L)?
4830   2A6D 2AD242         LHLD  QR               ;NO - NODE POINTER TO (H,L)
4830                       ENDIF
4830   2A70 23             INX   H                 ;STEP POINTER TO
4830   2A71 23             INX   H                 ;THE BALANCE BYTE
4830   2A72 23             INX   H
4830   2A73 23             INX   H
4830   2A74 7E             MOV   A,M               ;BALANCE CODE TO A-REG
4830                       IF    00000H              ;TEST IF SAVE NODE
4830                       STA   00000H              ;YES - CODE TO MEMORY
4830                       ENDIF
4830   2A75 B7             ORA   A                 ;SET CONDITION CODES
4830
4831   2A76 FA972A         JM     EN7P9            ;DETERMINE ADJUSTMENT NEEDS
4832   2A79 2AD242         LHLD   QR               ;SAVE ADDRESS OF ROOT
4833   2A7C 22C842         SHLD   QP               ;OF THE RIGHT SUBTREE
4834                       GTLLK  0,0              ;ATTACH ITS LEFT SUBTREE AS
4834                       IF    00000H      ;IS NODE ADDRESS IN (H,L)?
4834                       LHLD  00000H            ;NO-NODE POINTER TO (H,L)
4834                       ENDIF
4834   2A7F 5E             MOV   E,M               ;MOVE THE LEFT
4834   2A80 23             INX   H                 ;LINK INTO THE
4834   2A81 56             MOV   D,M               ;(D,E) REGISTER
4834                       IF    00000H              ;IS IT SAVE LINK MODE?
4834                       XCHG                    ;YES - LINK TO (H,L)
4834                       SHLD  00000H              ;LINK TO MEMORY
4834                       ENDIF
4834
4835                       PTRLK  QS,0             ;THE RIGHT SUBTREE OF REBALANCE POINT
4835   0001          MCTEM SET   1                 ;ASSUME ADDRESS IN (H,L)
4835                       IF    QS               ;TEST ASSUMPTION
4835   0000          MCTEM SET   0                 ;FALSE ASSUMPTION
4835                       ENDIF
4835                       IF    00000H              ;IS NEW LINK IN (D,E)?
4835                       IF    MCTEM            ;NO - BUT IS POINTER IN (H,L)?
4835                       XCHG                    ;YES - SAVE NODE POINTER
4835                       ENDIF
4835                       LHLD  00000H              ;NEW LINK TO (H,L)
4835                       XCHG                    ;NEW LINK TO (D,E)
4835                       ENDIF
4835                       IF    QS               ;IS NODE ADDRESS IN (H,L)?
4835   2A82 2AD042         LHLD  QS               ;NO - NODE POINTER TO (H,L)
4835                       ENDIF
4835   2A85 23             INX   H                 ;NOW STEP TO THE
4835   2A86 23             INX   H                 ;RIGHT LINK BYTES
4835   2A87 73             MOV   M,E               ;MOVE THE NEW
4835   2A88 23             INX   H                 ;RIGHT LINK VALUE
4835   2A89 72             MOV   M,D               ;INTO THE NODE
4835
4836                       PTLLK  QR,QS            ;BALANCE POINT BECOMES LEFT SUBTREE
4836   0001          MCTEM SET   1                 ;ASSUME ADDRESS IN (H,L)
4836                       IF    QR               ;TEST ASSUMPTION
4836   0000          MCTEM SET   0                 ;FALSE ASSUMPTION
```

```
                        ENDIF
                        IF    QS          ;IS NEW LINK IN (D,E)?
                        IF    MCTEM          ;NO - BUT IS POINTER IN (H,L)?
                        XCHG                 ;YES - SAVE NODE POINTER
                        ENDIF
2A8A 2AD042             LHLD  QS          ;NEW LINK TO (H,L)
2A8D EB                 XCHG                 ;NEW LINK TO (D,E)
                        ENDIF
                        IF    QR          ;IS NODE ADDRESS IN (H,L)?
2A8E 2AD242             LHLD  QR          ;NO - NODE POINTER TO (H,L)
                        ENDIF
2A91 73                 MOV   M,E            ;MOVE THE NEW
2A92 23                 INX   H              ;LEFT LINK VALUE
2A93 72                 MOV   M,D            ;INTO THE NODE

2A94 C3422B             JMP    EN7T5         ;RESET BOTH BALANCE FACTORS



               ;
               EN7P9:   GTLLK  QR,QP         ;MOVE RIGHT THEN LEFT FROM BALANCE POINT
                        IF    QR     ;IS NODE ADDRESS IN (H,L)?
2A97 2AD242             LHLD  QR          ;NO-NODE POINTER TO (H,L)
                        ENDIF
2A9A 5E                 MOV   E,M            ;MOVE THE LEFT
2A9B 23                 INX   H              ;LINK INTO THE
2A9C 56                 MOV   D,M            ;(D,E) REGISTER
                        IF    QP           ;IS IT SAVE LINK MODE?
2A9D EB                 XCHG                 ;YES - LINK TO (H,L)
2A9E 22C842             SHLD  QP           ;LINK TO MEMORY
                        ENDIF

                        GTRLK  0,0           ;THIS CODE EFFECTS A CLOCKWISE ROTATION
                        IF    00000H          ;IS NODE ADDRESS IN (H,L)?
                        LHLD  00000H          ;NO - NODE POINTER TO (H,L)
                        ENDIF
2AA1 23                 INX   H              ;STEP POINTER TO
2AA2 23                 INX   H              ;THE RIGHT LINK
2AA3 5E                 MOV   E,M            ;MOVE THE RIGHT
2AA4 23                 INX   H              ;LINK INTO THE .
2AA5 56                 MOV   D,M            ;(D,E) REGISTER
                        IF    00000H           ;IS IT SAVE LINK MODE?
                        XCHG                 ;YES - LINK TO (H,L)
                        SHLD  00000H           ;LINK TO MEMORY
                        ENDIF

                        PTLLK  QR,0          ;OF THE RIGHT SUBTREE FOLLOWED BY
0001           MCTEM    SET   1              ;ASSUME ADDRESS IN (H,L)
                        IF    QR          ;TEST ASSUMPTION
0000           MCTEM    SET   0              ;FALSE ASSUMPTION
                        ENDIF
                        IF    00000H          ;IS NEW LINK IN (D,E)?
                        IF    MCTEM          ;NO - BUT IS POINTER IN (H,L)?
                        XCHG                 ;YES - SAVE NODE POINTER
                        ENDIF
                        LHLD  00000H          ;NEW LINK TO (H,L)
                        XCHG                 ;NEW LINK TO (D,E)
                        ENDIF
                        IF    QR          ;IS NODE ADDRESS IN (H,L)?
2AA6 2AD242             LHLD  QR          ;NO - NODE POINTER TO (H,L)
                        ENDIF
2AA9 73                 MOV   M,E            ;MOVE THE NEW
2AAA 23                 INX   H              ;LEFT LINK VALUE
2AAB 72                 MOV   M,D            ;INTO THE NODE

                        PTRLK  QP,QR         ;A COUNTER CLOCKWISE ROTATION OF
0001           MCTEM    SET   1              ;ASSUME ADDRESS IN (H,L)
                        IF    QP          ;TEST ASSUMPTION
0000           MCTEM    SET   0              ;FALSE ASSUMPTION
                        ENDIF
                        IF    QR          ;IS NEW LINK IN (D,E)?
                        IF    MCTEM          ;NO - BUT IS POINTER IN (H,L)?
                        XCHG                 ;YES - SAVE NODE POINTER
                        ENDIF
2AAC 2AD242             LHLD  QR          ;NEW LINK TO (H,L)
2AAF EB                 XCHG                 ;NEW LINK TO (D,E)
                        ENDIF
                        IF    QP          ;IS NODE ADDRESS IN (H,L)?
2AB0 2AC842             LHLD  QP          ;NO - NODE POINTER TO (H,L)
                        ENDIF
2AB3 23                 INX   H              ;NOW STEP TO THE .
2AB4 23                 INX   H              ;RIGHT LINK BYTES
2AB5 73                 MOV   M,E            ;MOVE THE NEW
2AB6 23                 INX   H              ;RIGHT LINK VALUE
2AB7 72                 MOV   M,D            ;INTO THE NODE

                        GTLLK  QP,0          ;THE TREE. IN THIS CONTEXT THE
                        IF    QP     ;IS NODE ADDRESS IN (H,L)?
```

```
2AB8 2AC842            LHLD   QP              ;NO-NODE POINTER TO (H,L)
                       ENDIF
2ABB 5E                MOV    E,M                ;MOVE THE LEFT
2ABC 23                INX    H                  ;LINK INTO THE
2ABD 56                MOV    D,M                ;(D,E) REGISTER
                       IF     00000H               ;IS IT SAVE LINK MODE?
                       XCHG                      ;YES - LINK TO (H,L)
                       SHLD   00000H               ;LINK TO MEMORY
                       ENDIF

                       PTRLK  QS,0               ;REBALANCE POINT IS
0001         MCTEM     SET    1                  ;ASSUME ADDRESS IN (H,L)
                       IF     QS              ;TEST ASSUMPTION
0000         MCTEM     SET    0                  ;FALSE ASSUMPTION
                       ENDIF
                       IF     00000H              ;IS NEW LINK IN (D,E)?
                       IF     MCTEM              ;NO - BUT IS POINTER IN (H,L)?
                       XCHG                      ;YES - SAVE NODE POINTER
                       ENDIF
                       LHLD   00000H              ;NEW LINK TO (H,L)
                       XCHG                      ;NEW LINK TO (D,E)
                       ENDIF
                       IF     QS              ;IS NODE ADDRESS IN (H,L)?
2ABE 2AD042            LHLD   QS              ;NO - NODE POINTER TO (H,L)
                       ENDIF
2AC1 23                INX    H                  ;NOW STEP TO THE
2AC2 23                INX    H                  ;RIGHT LINK BYTES
2AC3 73                MOV    M,E                ;MOVE THE NEW
2AC4 23                INX    H                  ;RIGHT LINK VALUE
2AC5 72                MOV    M,D                ;INTO THE NODE

                       PTLLK  QP,QS              ;CONSIDERED TO BE THE ROOT
0001         MCTEM     SET    1                  ;ASSUME ADDRESS IN (H,L)
                       IF     QP              ;TEST ASSUMPTION
0000         MCTEM     SET    0                  ;FALSE ASSUMPTION
                       ENDIF
                       IF     QS              ;IS NEW LINK IN (D,E)?
                       IF     MCTEM              ;NO - BUT IS POINTER IN (H,L)?
                       XCHG                      ;YES - SAVE NODE POINTER
                       ENDIF
2AC6 2AD042            LHLD   QS              ;NEW LINK TO (H,L)
2AC9 EB                XCHG                      ;NEW LINK TO (D,E)
                       ENDIF
                       IF     QP              ;IS NODE ADDRESS IN (H,L)?
2ACA 2AC842            LHLD   QP              ;NO - NODE POINTER TO (H,L)
                       ENDIF
2ACD 73                MOV    M,E                ;MOVE THE NEW
2ACE 23                INX    H                  ;LEFT LINK VALUE
2ACF 72                MOV    M,D                ;INTO THE NODE

2AD0 23                INX    H                  ;STEP (H,L) TO
2AD1 23                INX    H                  ;POINT AT THE BALANCE
2AD2 23                INX    H                  ;FACTOR OF THE NEW ROOT
2AD3 56                MOV    D,M                ;GET THE ORIGINAL
2AD4 AF                XRA    A                  ;BALANCE FACTOR AND
2AD5 77                MOV    M,A                ;MARK THE ROOT BALANCED
2AD6 B2                ORA    D                  ;TEST ORIGINAL BALANCE FACTOR
2AD7 CA422B            JZ     EN7T5              ;BALANCED - SO SUBTREES ARE BALANCED
2ADA FAF22A            JM     EN7P8              ;IT WAS HEAVY TO THE LEFT
2ADD AF                XRA    A                  ;IT WAS HEAVY TO THE RIGHT
                       PTBAL  QR,0               ;SET BALANCE FACTORS
                       IF     00000H               ;IS FACTOR IN A-REG?
                       LDA    00000H               ;NO - BALANCE TO A-REG
                       ENDIF
                       IF     QR              ;IS NODE ADDRESS IN (H,L)
2ADE 2AD242            LHLD   QR              ;NO - NODE POINTER TO (H,L)
                       ENDIF
2AE1 23                INX    H                  ;STEP POINTER TO
2AE2 23                INX    H                  ;THE BALANCE BYTE
2AE3 23                INX    H
2AE4 23                INX    H
2AE5 77                MOV    M,A                ;BALANCE CODE TO NODE

2AE6 2F                CMA                       ;FOR THE SUBTREES THAT
                       PTBAL  QS,0               ;WERE ROTATED DURING ADJUSTMENT
                       IF     00000H               ;IS FACTOR IN A-REG?
                       LDA    00000H               ;NO - BALANCE TO A-REG
                       ENDIF
                       IF     QS              ;IS NODE ADDRESS IN (H,L)
2AE7 2AD042            LHLD   QS              ;NO - NODE POINTER TO (H,L)
                       ENDIF
2AEA 23                INX    H                  ;STEP POINTER TO
2AEB 23                INX    H                  ;THE BALANCE BYTE
2AEC 23                INX    H
2AED 23                INX    H
2AEE 77                MOV    M,A                ;BALANCE CODE TO NODE
```

```
2AEF C3C32B           JMP    NQA10          ;ADJUST LINKAGE TO TOTAL TREE .
                ;
2AF2 AF         EN7P8: XRA    A              ;SET THE BALANCE FACTORS
                       PTBAL  QS,0           ;FOR THE SUBTREES THAT WERE
                       IF     00000H          ;IS FACTOR IN A-REG?
                       LDA    00000H          ;NO - BALANCE TO A-REG
                       ENDIF
                       IF     QS            ;IS NODE ADDRESS IN (H,L)
2AF3 2AD042            LHLD   QS            ;NO - NODE POINTER TO (H,L)
                       ENDIF
2AF6 23                INX    H              ;STEP POINTER TO
2AF7 23                INX    H              ;THE BALANCE BYTE
2AF8 23                INX    H
2AF9 23                INX    H
2AFA 77                MOV    M,A            ;BALANCE CODE TO NODE

2AFB 3C                INR    A              ;ROTATED DURING ADJUSTMENT
                       PTBAL  QR,0
                       IF     00000H          ;IS FACTOR IN A-REG?
                       LDA    00000H          ;NO - BALANCE TO A-REG
                       ENDIF
                       IF     QR            ;IS NODE ADDRESS IN (H,L)
2AFC 2AD242            LHLD   QR            ;NO - NODE POINTER TO (H,L)
                       ENDIF
2AFF 23                INX    H              ;STEP POINTER TO
2B00 23                INX    H              ;THE BALANCE BYTE
2B01 23                INX    H
2B02 23                INX    H
2B03 77                MOV    M,A            ;BALANCE CODE TO NODE

2B04 C3C32B            JMP    NQA10          ;ADJUST LINKAGE TO TOTAL TREE
                ;
                EN7AM: GTBAL  QS,0           ;WAS REBALANCE POINT BALANCED?
                       IF     QS            ;IS NODE ADDRESS IN (H,L)?
2B07 2AD042            LHLD   QS            ;NO - NODE POINTER TO (H,L)
                       ENDIF
2B0A 23                INX    H              ;STEP POINTER TO
2B0B 23                INX    H              ;THE BALANCE BYTE
2B0C 23                INX    H
2B0D 23                INX    H
2B0E 7E                MOV    A,M            ;BALANCE CODE TO A-REG
                       IF     00000H           ;TEST IF SAVE NODE
                       STA    00000H           ;YES - CODE TO MEMORY
                       ENDIF
2B0F B7                ORA    A              ;SET CONDITION CODES

2B10 C2162B            JNZ    EN7M1          ;NO
2B13 2F                CMA                   ;YES - SET BALANCE FACTOR TO (-)
2B14 77                MOV    M,A            ;BECAUSE THE TREE IS HIGHER.
2B15 C9                RET                   ;WE ARE DONE
                ;
2B16 F26A2A     EN7M1: JP     EN7X1          ;SUBTREE WAS HEAVY TO RIGHT
                       GTBAL  QR,0           ;TREE TOO FAR OUT OF BALANCE
                       IF     QR            ;IS NODE ADDRESS IN (H,L)?
2B19 2AD242            LHLD   QR            ;NO - NODE POINTER TO (H,L)
                       ENDIF
2B1C 23                INX    H              ;STEP POINTER TO
2B1D 23                INX    H              ;THE BALANCE BYTE
2B1E 23                INX    H
2B1F 23                INX    H
2B20 7E                MOV    A,M            ;BALANCE CODE TO A-REG
                       IF     00000H           ;TEST IF SAVE NODE
                       STA    00000H           ;YES - CODE TO MEMORY
                       ENDIF
2B21 B7                ORA    A              ;SET CONDITION CODES

2B22 F2562B            JP     EN7M9          ;DETERMINE ADJUSTMENT NEEDS
2B25 2AD242            LHLD   QR             ;SAVE ADDRESS OF ROOT
2B28 22C842            SHLD   QP             ;OF THE LEFT SUBTREE
                       GTRLK  0,0            ;ATTACH ITS RIGHT SUBTREE AS
                       IF     00000H          ;IS NODE ADDRESS IN (H,L)?
                       LHLD   00000H          ;NO - NODE POINTER TO (H,L)
                       ENDIF
2B2B 23                INX    H              ;STEP POINTER TO
2B2C 23                INX    H              ;THE RIGHT LINK
2B2D 5E                MOV    E,M            ;MOVE THE RIGHT
2B2E 23                INX    H              ;LINK INTO THE
2B2F 56                MOV    D,M            ;(D,E) REGISTER
                       IF     00000H           ;IS IT SAVE LINK MODE?
                       XCHG                  ;YES - LINK TO (H,L)
                       SHLD   00000H           ;LINK TO MEMORY
                       ENDIF

                       PTLLK  QS,0           ;THE LEFT SUBTREE OF REBALANCE POINT
0001            MCTEM  SET    1              ;ASSUME ADDRESS IN (H,L)
                       IF     QS            ;TEST ASSUMPTION
0000            MCTEM  SET    0              ;FALSE ASSUMPTION
```

```
4881                            ENDIF
4881                            IF    00000H           ;IS NEW LINK IN (D,E)?
4881                            IF    MCTEM            ;NO - BUT IS POINTER IN (H,L)?
4881                            XCHG                   ;YES - SAVE NODE POINTER
4881                            ENDIF
4881                            LHLD  00000H           ;NEW LINK TO (H,L)
4881                            XCHG                   ;NEW LINK TO (D,E)
4881                            ENDIF
4881                            IF    QS          ;IS NODE ADDRESS IN (H,L)?
4881   2B30 2AD042              LHLD  QS          ;NO - NODE POINTER TO (H,L)
4881                            ENDIF
4881   2B33 73                  MOV   M,E              ;MOVE THE NEW
4881   2B34 23                  INX   H                ;LEFT LINK VALUE
4881   2B35 72                  MOV   M,D              ;INTO THE NODE
4881
4882                            PTRLK  QR,QS           ;BALANCE POINT BECOMES RIGHT SUBTREE
4882   0001          MCTEM      SET   1                ;ASSUME ADDRESS IN (H,L)
4882                            IF    QR          ;TEST ASSUMPTION
4882   0000          MCTEM      SET   0                ;FALSE ASSUMPTION
4882                            ENDIF
4882                            IF    QS          ;IS NEW LINK IN (D,E)?
4882                            IF    MCTEM            ;NO - BUT IS POINTER IN (H,L)?
4882                            XCHG                   ;YES - SAVE NODE POINTER
4882                            ENDIF
4882   2B36 2AD042              LHLD  QS          ;NEW LINK TO (H,L)
4882   2B39 EB                  XCHG                   ;NEW LINK TO (D,E)
4882                            ENDIF
4882                            IF    QR          ;IS NODE ADDRESS IN (H,L)?
4882   2B3A 2AD242              LHLD  QR          ;NO - NODE POINTER TO (H,L)
4882                            ENDIF
4882   2B3D 23                  INX   H                ;NOW STEP TO THE
4882   2B3E 23                  INX   H                ;RIGHT LINK BYTES
4882   2B3F 73                  MOV   M,E              ;MOVE THE NEW
4882   2B40 23                  INX   H                ;RIGHT LINK VALUE
4882   2B41 72                  MOV   M,D              ;INTO THE NODE
4882
4883                 ;
4884   2B42 AF       EN7T5:     XRA    A               ;TOTAL TREE IS BALANCED - SO
4885                            PTBAL  QS,0            ;RESET THE BALANCE FACTORS
4885                            IF    00000H            ;IS FACTOR IN A-REG?
4885                            LDA   00000H            ;NO - BALANCE TO A-REG
4885                            ENDIF
4885                            IF    QS          ;IS NODE ADDRESS IN (H,L)
4885   2B43 2AD042              LHLD  QS          ;NO - NODE POINTER TO (H,L)
4885                            ENDIF
4885   2B46 23                  INX   H                ;STEP POINTER TO
4885   2B47 23                  INX   H                ;THE BALANCE BYTE
4885   2B48 23                  INX   H
4885   2B49 23                  INX   H
4885   2B4A 77                  MOV   M,A              ;BALANCE CODE TO NODE
4885
4886                            PTBAL  QR,0            ;IN THE AFFECTED NODES
4886                            IF    00000H            ;IS FACTOR IN A-REG?
4886                            LDA   00000H            ;NO - BALANCE TO A-REG
4886                            ENDIF
4886                            IF    QR          ;IS NODE ADDRESS IN (H,L)
4886   2B4B 2AD242              LHLD  QR          ;NO - NODE POINTER TO (H,L)
4886                            ENDIF
4886   2B4E 23                  INX   H                ;STEP POINTER TO
4886   2B4F 23                  INX   H                ;THE BALANCE BYTE
4886   2B50 23                  INX   H
4886   2B51 23                  INX   H
4886   2B52 77                  MOV   M,A              ;BALANCE CODE TO NODE
4886
4887   2B53 C3C32B              JMP    NQA10           ;ADJUST LINKAGE TO TOTAL TREE
4888                 ;
4889                 EN7M9:     GTRLK  QR,QP           ;MOVE LEFT THEN RIGHT FROM BALANCE POINT
4889                            IF    QR          ;IS NODE ADDRESS IN (H,L)?
4889   2B56 2AD242              LHLD  QR          ;NO - NODE POINTER TO (H,L)
4889                            ENDIF
4889   2B59 23                  INX   H                ;STEP POINTER TO
4889   2B5A 23                  INX   H                ;THE RIGHT LINK
4889   2B5B 5E                  MOV   E,M              ;MOVE THE RIGHT
4889   2B5C 23                  INX   H                ;LINK INTO THE
4889   2B5D 56                  MOV   D,M              ;(D,E) REGISTER
4889                            IF    QP           ;IS IT SAVE LINK MODE?
4889   2B5E EB                  XCHG                   ;YES - LINK TO (H,L)
4889   2B5F 22C842              SHLD  QP           ;LINK TO MEMORY
4889                            ENDIF
4889
4890                            GTLLK  0,0             ;THIS CODE EFFECTS A COUNTER CLOCKWISE
4890                            IF    00000H     ;IS NODE ADDRESS IN (H,L)?
4890                            LHLD  00000H            ;NO-NODE POINTER TO (H,L)
4890                            ENDIF
4890   2B62 5E                  MOV   E,M              ;MOVE THE LEFT
4890   2B63 23                  INX   H                .LINK INTO THE
4890   2B64 56                  MOV   D,M              ;(D,E) REGISTER
```

```
4890                        IF    00000H          ;IS IT SAVE LINK MODE?
4890                        XCHG                  ;YES - LINK TO (H,L)
4890                        SHLD  00000H          ;LINK TO MEMORY
4890                        ENDIF
4890
4891                        PTRLK  QR,0           ;ROTATION OF THE LEFT SUBTREE FOLLOWED
4891  0001          MCTEM   SET   1               ;ASSUME ADDRESS IN (H,L)
4891                        IF    QR              ;TEST ASSUMPTION
4891  0000          MCTEM   SET   0               ;FALSE ASSUMPTION
4891                        ENDIF
4891                        IF    00000H          ;IS NEW LINK IN (D,E)?
4891                        IF    MCTEM           ;NO - BUT IS POINTER IN (H,L)?
4891                        XCHG                  ;YES - SAVE NODE POINTER
4891                        ENDIF
4891                        LHLD  00000H          ;NEW LINK TO (H,L)
4891                        XCHG                  ;NEW LINK TO (D,E)
4891                        ENDIF
4891                        IF    QR              ;IS NODE ADDRESS IN (H,L)?
4891  2B65 2AD242           LHLD  QR              ;NO - NODE POINTER TO (H,L)
4891                        ENDIF
4891  2B68 23               INX   H               ;NOW STEP TO THE
4891  2B69 23               INX   H               ;RIGHT LINK BYTES
4891  2B6A 73               MOV   M,E             ;MOVE THE NEW
4891  2B6B 23               INX   H               ;RIGHT LINK VALUE
4891  2B6C 72               MOV   M,D             ;INTO THE NODE
4891
4892                        PTLLK  QP,QR          ;BY A CLOCKWISE ROTATION OF THE TREE.
4892  0001          MCTEM   SET   1               ;ASSUME ADDRESS IN (H,L)
4892                        IF    QP              ;TEST ASSUMPTION
4892  0000          MCTEM   SET   0               ;FALSE ASSUMPTION
4892                        ENDIF
4892                        IF    QR              ;IS NEW LINK IN (D,E)?
4892                        IF    MCTEM           ;NO - BUT IS POINTER IN (H,L)?
4892                        XCHG                  ;YES - SAVE NODE POINTER
4892                        ENDIF
4892  2B6D 2AD242           LHLD  QR              ;NEW LINK TO (H,L)
4892  2B70 EB               XCHG                  ;NEW LINK TO (D,E)
4892                        ENDIF
4892                        IF    QP              ;IS NODE ADDRESS IN (H,L)?
4892  2B71 2AC842           LHLD  QP              ;NO - NODE POINTER TO (H,L)
4892                        ENDIF
4892  2B74 73               MOV   M,E             ;MOVE THE NEW
4892  2B75 23               INX   H               ;LEFT LINK VALUE
4892  2B76 72               MOV   M,D             ;INTO THE NODE
4892
4893                        GTRLK  QP,0           ;IN THIS CONTEXT THE REBALANCE
4893                        IF    QP              ;IS NODE ADDRESS IN (H,L)?
4893  2B77 2AC842           LHLD  QP              ;NO - NODE POINTER TO (H,L)
4893                        ENDIF
4893  2B7A 23               INX   H               ;STEP POINTER TO
4893  2B7B 23               INX   H               ;THE RIGHT LINK
4893  2B7C 5E               MOV   E,M             ;MOVE THE RIGHT
4893  2B7D 23               INX   H               ;LINK INTO THE
4893  2B7E 56               MOV   D,M             ;(D,E) REGISTER
4893                        IF    00000H          ;IS IT SAVE LINK MODE?
4893                        XCHG                  ;YES - LINK TO (H,L)
4893                        SHLD  00000H          ;LINK TO MEMORY
4893                        ENDIF
4893
4894                        PTLLK  QS,0           ;POINT IS CONSIDERED TO BE
4894  0001          MCTEM   SET   1               ;ASSUME ADDRESS IN (H,L)
4894                        IF    QS              ;TEST ASSUMPTION
4894  0000          MCTEM   SET   0               ;FALSE ASSUMPTION
4894                        ENDIF
4894                        IF    00000H          ;IS NEW LINK IN (D,E)?
4894                        IF    MCTEM           ;NO - BUT IS POINTER IN (H,L)?
4894                        XCHG                  ;YES - SAVE NODE POINTER
4894                        ENDIF
4894                        LHLD  00000H          ;NEW LINK TO (H,L)
4894                        XCHG                  ;NEW LINK TO (D,E)
4894                        ENDIF
4894                        IF    QS              ;IS NODE ADDRESS IN (H,L)?
4894  2B7F 2AD042           LHLD  QS              ;NO - NODE POINTER TO (H,L)
4894                        ENDIF
4894  2B82 73               MOV   M,E             ;MOVE THE NEW
4894  2B83 23               INX   H               ;LEFT LINK VALUE
4894  2B84 72               MOV   M,D             ;INTO THE NODE
4894
4895                        PTRLK  QP,QS          ;THE ROOT NODE OF THE TREE
4895  0001          MCTEM   SET   1               ;ASSUME ADDRESS IN (H,L)
4895                        IF    QP              ;TEST ASSUMPTION
4895  0000          MCTEM   SET   0               ;FALSE ASSUMPTION
4895                        ENDIF
4895                        IF    QS              ;IS NEW LINK IN (D,E)?
4895                        IF    MCTEM           ;NO - BUT IS POINTER IN (H,L)?
4895                        XCHG                  ;YES - SAVE NODE POINTER
4895                        ENDIF
```

```
4895    2B85 2AD042             LHLD  QS         ;NEW LINK TO (H,L)
4895    2B88 EB                 XCHG                ;NEW LINK TO (D,E)
4895                            ENDIF
4895                            IF    QP         ;IS NODE ADDRESS IN (H,L)?
4895    2B89 2AC842             LHLD  QP         ;NO - NODE POINTER TO (H,L)
4895                            ENDIF
4895    2B8C 23                 INX   H             ;NOW STEP TO THE
4895    2B8D 23                 INX   H             ;RIGHT LINK BYTES
4895    2B8E 73                 MOV   M,E           ;MOVE THE NEW
4895    2B8F 23                 INX   H             ;RIGHT LINK VALUE
4895    2B90 72                 MOV   M,D           ;INTO THE NODE
4895
4896    2B91 23                 INX    H            ;STEP TO THE BALANCE FACTOR
4897    2B92 56                 MOV    D,M          ;GET ORINAL BALANCE FACTOR
4898    2B93 AF                 XRA    A            ;OF NEW SUBTREE ROOT NODE
4899    2B94 77                 MOV    M,A          ;AND MARK IT AS BALANCED
4900    2B95 B2                 ORA    D            ;TEST ORIGINAL BALANCE FACTOR
4901    2B96 CA422B             JZ     EN7T5        ;OK - ALL SUBTREES BALANCED
4902    2B99 F2B12B             JP     EN7M8        ;IT WAS HEAVY TO THE RIGHT
4903    2B9C AF                 XRA    A            ;IT WAS HEAVY TO THE LEFT
4904                            PTBAL  QR,0         ;SET BALANCE FACTORS FOR
4904                            IF     00000H        ;IS FACTOR IN A-REG?
4904                            LDA    00000H        ;NO - BALANCE TO A-REG
4904                            ENDIF
4904                            IF     QR        ;IS NODE ADDRESS IN (H,L)
4904    2B9D 2AD242             LHLD   QR        ;NO - NODE POINTER TO (H,L)
4904                            ENDIF
4904    2BA0 23                 INX    H            ;STEP POINTER TO
4904    2BA1 23                 INX    H            ;THE BALANCE BYTE
4904    2BA2 23                 INX    H
4904    2BA3 23                 INX    H
4904    2BA4 77                 MOV    M,A          ;BALANCE CODE TO NODE
4904
4905    2BA5 3C                 INR    A            ;THE SUBTREES THAT WERE
4906                            PTBAL  QS,0         ;ROTATED DURING ADJUSTMENT
4906                            IF     00000H        ;IS FACTOR IN A-REG?
4906                            LDA    00000H        ;NO - BALANCE TO A-REG
4906                            ENDIF
4906                            IF     QS        ;IS NODE ADDRESS IN (H,L)
4906    2BA6 2AD042             LHLD   QS        ;NO - NODE POINTER TO (H,L)
4906                            ENDIF
4906    2BA9 23                 INX    H            ;STEP POINTER TO
4906    2BAA 23                 INX    H            ;THE BALANCE BYTE
4906    2BAB 23                 INX    H
4906    2BAC 23                 INX    H
4906    2BAD 77                 MOV    M,A          ;BALANCE CODE TO NODE
4906
4907    2BAE C3C32B             JMP    NQA10        ;ADJUST LINKAGE TO TOTAL TREE
4908                    ;
4909    2BB1 AF         EN7M8:  XRA    A            ;SET BALANCE FACTORS
4910                            PTBAL  QS,0         ;FOR THE SUBTREES THAT WERE
4910                            IF     00000H        ;IS FACTOR IN A-REG?
4910                            LDA    00000H        ;NO - BALANCE TO A-REG
4910                            ENDIF
4910                            IF     QS        ;IS NODE ADDRESS IN (H,L)
4910    2BB2 2AD042             LHLD   QS        ;NO - NODE POINTER TO (H,L)
4910                            ENDIF
4910    2BB5 23                 INX    H            ;STEP POINTER TO
4910    2BB6 23                 INX    H            ;THE BALANCE BYTE
4910    2BB7 23                 INX    H
4910    2BB8 23                 INX    H
4910    2BB9 77                 MOV    M,A          ;BALANCE CODE TO NODE
4910
4911    2BBA 2F                 CMA                 ;ROTATED DURING ADJUSTMENT
4912                            PTBAL  QR,0
4912                            IF     00000H        ;IS FACTOR IN A-REG?
4912                            LDA    00000H        ;NO - BALANCE TO A-REG
4912                            ENDIF
4912                            IF     QR        ;IS NODE ADDRESS IN (H,L)
4912    2BBB 2AD242             LHLD   QR        ;NO - NODE POINTER TO (H,L)
4912                            ENDIF
4912    2BBE 23                 INX    H            ;STEP POINTER TO
4912    2BBF 23                 INX    H            ;THE BALANCE BYTE
4912    2BC0 23                 INX    H
4912    2BC1 23                 INX    H
4912    2BC2 77                 MOV    M,A          ;BALANCE CODE TO NODE
4912
4913                    ;
4914    2BC3 3AD442     NQA10:  LDA    QDIR         ;GET THE ENTRY DIRECTION
4915    2BC6 B7                 ORA    A            ;INTO THE BALANCE POINT
4916    2BC7 FAD72B             JM     ENQ11        ;AND TEST IT
4917                            PTRLK  QT,QP        ;LINK ADJUSTED SUBTREE
4917    0001            MCTEM   SET    1            ;ASSUME ADDRESS IN (H,L)
4917                            IF     QT        ;TEST ASSUMPTION
4917    0000            MCTEM   SET    0            ;FALSE ASSUMPTION
4917                            ENDIF
4917                            IF     QP        ;IS NEW LINK IN (D,E)?
```

```
                        IF     MCTEM            ;NO - BUT IS POINTER IN (H,L)?
                        XCHG                    ;YES - SAVE NODE POINTER
                        ENDIF
2BCA 2AC842             LHLD   QP              ;NEW LINK TO (H,L)
2BCD EB                 XCHG                    ;NEW LINK TO (D,E)
                        ENDIF
                        IF     QT              ;IS NODE ADDRESS IN (H,L)?
2BCE 2ACC42             LHLD   QT              ;NO - NODE POINTER TO (H,L)
                        ENDIF
2BD1 23                 INX    H                ;NOW STEP TO THE
2BD2 23                 INX    H                ;RIGHT LINK BYTES
2BD3 73                 MOV    M,E              ;MOVE THE NEW
2BD4 23                 INX    H                ;RIGHT LINK VALUE
2BD5 72                 MOV    M,D              ;INTO THE NODE

2BD6 C9                 RET                     ;AS A RIGHT SUBTREE
               ;
               ENQ11:   PTLLK  QT,QP            ;LINK ADJUSTED SUBTREE
0001           MCTEM    SET    1                ;ASSUME ADDRESS IN (H,L)
                        IF     QT              ;TEST ASSUMPTION
0000           MCTEM    SET    0                ;FALSE ASSUMPTION
                        ENDIF
                        IF     QP              ;IS NEW LINK IN (D,E)?
                        IF     MCTEM            ;NO - BUT IS POINTER IN (H,L)?
                        XCHG                    ;YES - SAVE NODE POINTER
                        ENDIF
2BD7 2AC842             LHLD   QP              ;NEW LINK TO (H,L)
2BDA EB                 XCHG                    ;NEW LINK TO (D,E)
                        ENDIF
                        IF     QT              ;IS NODE ADDRESS IN (H,L)?
2BDB 2ACC42             LHLD   QT              ;NO - NODE POINTER TO (H,L)
                        ENDIF
2BDE 73                 MOV    M,E              ;MOVE THE NEW
2BDF 23                 INX    H                ;LEFT LINK VALUE
2BE0 72                 MOV    M,D              ;INTO THE NODE

2BE1 C9                 RET                     ;AS A LEFT SUBTREE
               ;
2BE2 EB        TREMT:   XCHG                    ;RECOVER THE NODE ADDRESS
2BE3 22BA42             SHLD    RLINK           ;MARK TREE NONEMPTY
2BE6 CDEE2B             CALL    NDCLR           ;RESET LINK AND BALANCE FACTOR
2BE9 EB                 XCHG                    ;GET EVENT TIME FROM NODE
2BEA 22BD42             SHLD    NXTIM           ;SET AS NEXT EVENT TIME
2BED C9                 RET                     ;ALL DONE
               ;
2BEE AF        NDCLR:   XRA     A               ;RESET THE LINKS AND
2BEF 77                 MOV     M,A             ;THE BALANCE FACTOR OF
2BF0 23                 INX     H               ;THE SELECTED NODE
2BF1 77                 MOV     M,A
2BF2 23                 INX     H
2BF3 77                 MOV     M,A
2BF4 23                 INX     H
2BF5 77                 MOV     M,A
2BF6 23                 INX     H
2BF7 77                 MOV     M,A
2BF8 23                 INX     H               ;STEP TO THE EVENT TIME
2BF9 5E                 MOV     E,M             ;RETURN WITH THE
2BFA 23                 INX     H               ;EVENT TIME IN (D,E)
2BFB 56                 MOV     D,M
2BFC C9                 RET
               ;
2BFD 110500    CMPTM:   LXI     D,05            ;POINT TO THE TIME WORD
2C00 19                 DAD     D               ;OF SELECTED NODE
2C01 5E                 MOV     E,M             ;GET LOW ORDER BITS
2C02 23                 INX     H               ;POINT AT HIGH BITS
2C03 56                 MOV     D,M             ;AND GET THEM
2C04 2AD642             LHLD    NEWTM           ;GET TIME OF NEW NODE
2C07 7D                 MOV     A,L             ;FORM
2C08 93                 SUB     E               ;(NEW TIME)-(NODE TIME)
2C09 7C                 MOV     A,H
2C0A 9A                 SBB     D
               ;         ADD     A               ;DECISION BIT TO SIGN
2C0B C9                 RET                     ;EXIT
               ;;
               ;FATAL ERROR HANDLER.  WAIT FOR "CLEAR" FROM MASTER KEYBOARD
               ;  AND THEN COLD START THE COMPUTER.
               ;  IF "SEND" IS HIT INSTEAD, WILL RETURN TO CALLER.
               ;
               ;INPUT: A= ERROR CODE.
               ;ALL REGISTERS RESTORED.
               ;
2C0C F5        FATAL:   PUSH  PSW       ;SAVE PSW FOR DEBUGGER
2C0D 3A6842             LDA   SL700     ;IF MASTER KEYBOARD
2C10 B7                 ORA   A         ;  IS T.I.
2C11 CA162C             JZ    FATL      ;  SILENT 700
2C14 F1                 POP   PSW       ;RESTORE PSW
2C15 D7                 RST   2         ;ENTER DEBUGGER
```

```
                      ;
                      ;NORMAL FATAL ERROR HANDLING
                      ;
2C16 F1       FATL:     POP   PSW      ;A = ERROR CODE
2C17 E5                 PUSH  H        ;SAVE
2C18 D5                 PUSH  D        ;  ALL
2C19 C5                 PUSH  B        ;  REGISTERS
2C1A F5                 PUSH  PSW      ;
2C1B F6F0               ORI   0F0H     ;FATAL ERROR CODES ARE 0F0H TO 0FFH
2C1D CD080F             CALL  ERPC     ;DISPLAY MESSAGE
2C20 CD0911             CALL  OFCVY    ;TURN OFF CONVEYOR
2C23 3E01               MVI   A,1      ;LOCK OUT
2C25 32AC42             STA   FSQ0     ;  ALL OTHER KB PROCESSING
                      ;
                      ;  ;BEEP AND WAIT FOR COMMAND
                      ;
2C28 063B     FALRM:    MVI   B,';'    ;B = "BEEP"
2C2A 3A093D             LDA   MAKB     ;C
2C2D 4F                 MOV   C,A      ;  = MASTER KB #
2C2E CD6C11             CALL  PUTKB    ;ALARM OPERATOR
2C31 110500             LXI   D,5      ;IDLE ABOUT
2C34 CD5A2D             CALL  RDELA    ;  500 MS
2C37 C5                 PUSH  B        ;SAVE MASTER KB #
2C38 CD0E10             CALL  GETKB    ;C = KB #, A = CHAR
2C3B 47                 MOV   B,A      ;SAVE CHARACTER IN B
2C3C D1                 POP   D        ;E = MASTER KB #
2C3D 79                 MOV   A,C      ;WAIT UNTIL
2C3E BB                 CMP   E        ;  THERE IS INPUT
2C3F C2282C             JNZ   FALRM    ;  FROM MASTER KB.
2C42 78                 MOV   A,B      ;A = CHAR
2C43 FE3B               CPI   ';'      ;IF ';' THEN
2C45 CA4B2C             JZ    FATLX    ;  RETURN
2C48 C3DD03             JMP   EXEC     ;ELSE COLD START
                      ;
2C4B CD190C   FATLX:    CALL  DEVII    ;RE-INITIALIZE DEVICES
2C4E F1                 POP   PSW      ;RESTORE
2C4F C1                 POP   B        ;  ALL
2C50 D1                 POP   D        ;  REGISTERS
2C51 E1                 POP   H        ;
2C52 C9                 RET
                      ;;
                      ;GET DCDB QUEUE POINTER IN D,E
                      ;
                      ;INPUT: C=JDV
                      ;OUTPUT: B,C=JDV, H,L POINTS TO DCDB(JDV), SO DOES DCDBP
                      ;
2C53 2A5742   GDCQ:     LHLD  DCDB     ;POINT H,L TO DCDB TABLE
2C56 0600               MVI   B,0      ;B,C=JDV
2C58 09                 DAD   B        ;POINT H,L TO
2C59 09                 DAD   B        ;  DCDB(JDV)
2C5A 2B                 DCX   H        ;  MS BYTE
2C5B 56                 MOV   D,M      ;D,E
2C5C 2B                 DCX   H        ;  =
2C5D 5E                 MOV   E,M      ;  DCDB(JDV)
2C5E 220143             SHLD  DCDBP    ;SET DCDBP
2C61 C9                 RET
                      ;
                      ;
                      ;GET JDV, IDENT FROM LAQ IN PPDB
                      ;
                      ;INPUT: H,L POINTS TO BYTE 2 IN PPDB
                      ;OUTPUT: B=JDV, D,E=IDENT, H,L POINTS TO IDENT MS BYTE IN PPDB,
                      ;  FLAG Z SET & H,L NOT EFFECTED ON NEGATIVE RETURN.
                      ;ALL REGISTERS EXCEPT C EFFECTED
                      ;
2C62 110400   GLAQ:     LXI   D,4      ;POINT  TO BYTE 6
2C65 19                 DAD   D        ;  IN PPDB
2C66 7E                 MOV   A,M      ;IF
2C67 B7                 ORA   A        ;  LAQ
2C68 C8                 RZ             ;  NOT EMPTY
                      ;
                      ;REMOVE JDV,IDENT FROM LAQ IN PPDB
                      ;
2C69 3A0040             LDA   FLAGS    ;IF AUTO-INDUCT
2C6C B7                 ORA   A        ;  IS
2C6D F2752C             JP    GDLAQ    ;  DESIRED
2C70 23                 INX   H        ;PICK UP LAQ
2C71 5E                 MOV   E,M      ;  ITEM WITHOUT
2C72 C37D2C             JMP   GLAQ1    ;  DELETING
                      ;
2C75 35       GDLAQ:    DCR   M        ;DEC LAQSZ IN PPDB
2C76 23                 INX   H        ;H,L POINTS TO LAQ1
2C77 7E                 MOV   A,M      ;PICK UP LAQ 1ST ITEM # LAQ1
2C78 5F                 MOV   E,A      ;SAVE LAQ1 IN E
2C79 3C                 INR   A        ;NEXT ITEM IN LAQ BECOMES 1ST ITEM
2C7A E607               ANI   07H      ;WRAP AROUND IF NECESSARY
2C7C 77                 MOV   M,A      ;UPDATE LAQ1 IN PPDB
```

```
2C7D 2C      GLAQ1:  INR   L          ;H,L POINTS TO LAQ (ALSO RESET FLAG Z)
2C7E 1600            MVI   D,0        ;D,E=LAQ1
2C80 19              DAD   D          ;H,L POINTS TO
2C81 19              DAD   D          ;  ITEM # LAQ1
2C82 19              DAD   D          ;  IN LAQ
2C83 46              MOV   B,M        ;B=JDV
2C84 23              INX   H          ;H,L POINTS TO IDENT
2C85 5E              MOV   E,M        ;D,E
2C86 23              INX   H          ;  = PACKAGE
2C87 56              MOV   D,M        ;  IDENTIFICATION
2C88 C9              RET              ;POSITIVE RETURN
                     ;;
                     ;CREATE  UDB1  FOR NEXT UPDATE PHOTO.  COPY IDENT, JDV,
                     ;  JUPDA, JINDU FROM OLD TCB TO NEW TCB AND INCREMENT JUPDA.
                     ;  CALLED BY IDBPC OR UDBPC.
                     ;
                     ;INPUT: B,C POINTS TO BYTE 13 IN OLD TCB.
                     ;OUTPUT: NEW TCB, H,L POINTS TO BYTE 7 IN NEW TCB,

                     ;  A=JINDU, D,E= OLD JUPDA.
                     ;ALL REGISTERS EFFECTED.
                     ;
2C89 CDCB0F  GUDB1:  CALL  GETFS      ;GET FREE BLOCK FOR UDB1
2C8C 110D00          LXI   D,13       ;POINT H,L TO BYTE 13
2C8F 19              DAD   D          ;  IN TCB
2C90 0A              LDAX  B          ;COPY
2C91 77              MOV   M,A        ;  IDENT
2C92 0B              DCX   B          ;  FROM
2C93 2B              DCX   H          ;  OLD TCB
2C94 0A              LDAX  B          ;  TO
2C95 77              MOV   M,A        ;  NEW TCB
2C96 0B              DCX   B          ;MOVE POINTERS TO
2C97 2B              DCX   H          ;  BYTES 11
2C98 0A              LDAX  B          ;COPY
2C99 77              MOV   M,A        ;  JDV
2C9A 0B              DCX   B          ;MOVE POINTERS TO
2C9B 2B              DCX   H          ;  BYTES 10
2C9C 0A              LDAX  B          ;A= OLD JUPDA
2C9D 5F              MOV   E,A        ;E= OLD JUPDA FOR UDBPC
2C9E 3C              INR   A          ;A= NEW JUPDA
2C9F 77              MOV   M,A        ;SET JUPDA IN NEW TCB
2CA0 0B              DCX   B          ;MOVE POINTERS TO
2CA1 2B              DCX   H          ;  BYTES 9
2CA2 0A              LDAX  B          ;COPY
2CA3 77              MOV   M,A        ;  JINDU
2CA4 2B              DCX   H          ;POINT H,L TO BYTE 8 IN NEW TCB
2CA5 019424          LXI   B,UDB1     ;EVENT
2CA8 70              MOV   M,B        ;  IN TCB
2CA9 2B              DCX   H          ;  =
2CAA 71              MOV   M,C        ;  UDB1
2CAB C9              RET
                     ;;
                     ;SET UP COUNT IN PPDB FOR UNBLOCKED PP # C+1 OR A PENDING
                     ;  UNCODED PACKAGE AT PP.  FOR STRAIGHT MERGE ONLY.
                     ;  CALLED BY MCLPC OR TECMG.
                     ;
                     ;INPUT: C= INDUCT #, PWTNG & COUNT IN PPDB.
                     ;OUTPUT: COUNT(JINDU) IN PPDB, POINTED TO BY H,L.
                     ;ALL REGISTERS EXCEPT C EFFECTED.
                     ;
2CAC 2A4342  PEND:   LHLD  PPDB       ;POINT H,L TO BYTE 1
2CAF 23              INX   H          ;  IN PPDB
2CB0 3A033D          LDA   NINDU      ;IF IT IS
2CB3 3D              DCR   A          ;  A SINGLE INDUCT
2CB4 C2BE2C          JNZ   PENDS      ;  SYSTEM
                     ;
                     ;SPECIAL HANDLING FOR SINGLE INDUCT SYSTEMS
                     ;
2CB7 7E              MOV   A,M        ;PICK UP PWTNG FLAG IN PPDB
2CB8 23              INX   H          ;POINT TO COUNT IN PPDB
2CB9 FE02            CPI   2          ;IF PWTNG FLAG = 2 THEN
2CBB C0              RNZ              ;  INCREMENT
2CBC 34              INR   M          ;  COUNT
2CBD C9              RET
                     ;
                     ;ADJUST COUNT FOR MULTIPLE STRAIGHT INDUCT SYSTEMS
                     ;
2CBE 110100  PENDS:  LXI   D,0001H    ;INITIALIZE D = MAX COUNT
                                      ;  & E = COUNT INCREMENT
```

```
2CC1 43                     MOV   B,E        ;B= INDUCT #, = 1 INITIALLY
                   ;
2CC2 78            PNWCN:   MOV   A,B        ;IF INDUCT
2CC3 B9                     CMP   C          ;  NOT #
2CC4 CAD72C                 JZ    PNXID      ;  JINDU
2CC7 7E                     MOV   A,M        ;A= PWTNG IN PPDB
2CC8 FE02                   CPI   2          ;IF NOT=
2CCA CACF2C                 JZ    PMXCN      ;  2
2CCD 1E00                   MVI   E,0        ;INC COUNT ONLY IF EVERY PWTNG = 2
2CCF 7A            PMXCN:   MOV   A,D        ;A= MAX COUNT
2CD0 23                     INX   H          ;POINT H,L TO BYTE 2 IN PPDB
2CD1 BE                     CMP   M          ;IF COUNT
2CD2 D2D62C                 JNC   PNXI       ;  > MAX COUNT THEN
2CD5 56                     MOV   D,M        ;MAX COUNT = COUNT
2CD6 2B            PNXI:    DCX   H          ;POINT H,L TO BYTE 1 IN PPDB
2CD7 D5            PNXID:   PUSH  D          ;MOVE H,L
2CD8 112000                 LXI   D,32       ;  TO
2CDB 19                     DAD   D          ;  NEXT
2CDC D1                     POP   D          ;  INDUCT
2CDD 04                     INR   B          ;NEXT INDUCT #
2CDE 3A033D                 LDA   NINDU      ;DO FOR
2CE1 B8                     CMP   B          ;  ALL
2CE2 D2C22C                 JNC   PNWCN      ;  INDUCTS
                   ;
2CE5 7A                     MOV   A,D        ;B
2CE6 83                     ADD   E          ;  = MAX COUNT + COUNT INC
2CE7 47                     MOV   B,A        ;  = NEW COUNT
2CE8 79                     MOV   A,C        ;A= INDUCT #
2CE9 CD9927                 CALL  CPPPP      ;POINT H,L TO
2CEC 23                     INX   H          ;  BYTE 2
2CED 23                     INX   H          ;  IN PPDB
2CEE 70                     MOV   M,B        ;UPDATE COUNT(JINDU) IN PPDB
2CEF C9                     RET
                   ;;
                   ;PUT JDV & IDENT INTO LAQ IN PPDB FOR INDUCT # C+1.
                   ;  CALLED BY SNPC.
                   ;
                   ;INPUT: C= INDUCT #, JDV,IDENT.
                   ;OUTPUT: PPDBP POINTS TO BYTE 1 IN PPDB, FLAG Z SET AND
                   ;  A=0 ON LAQ FULL.
                   ;A
2CF0 79            PLAQ:    MOV   A,C        ;A= INDUCT #
2CF1 CD9927                 CALL  CPPPP      ;POINT H,L TO BYTE 1
2CF4 23                     INX   H          ;  IN PPDB(JINDU)
2CF5 22EB42                 SHLD  PPDBP      ;OUTPUT POINTER
2CF8 110500                 LXI   D,5        ;POINT H,L TO BYTE 6
2CFB 19                     DAD   D          ;  IN PPDB
2CFC 3A373D                 LDA   QLIMI      ;A= LAQ SIZE LIMIT DESIRED
2CFF 96                     SUB   M          ;IF LAQ NOT
2D00 C8                     RZ               ;  FULL
                   ;
                   ;LAQ NOT YET FULL; INSERT JDV & IDENT
                   ;
2D01 7E                     MOV   A,M        ;PICK UP CURRENT LAQ SIZE
2D02 34                     INR   M          ;INC LAQSZ IN PPDB
2D03 23                     INX   H          ;POINT H,L TO BYTE 7 IN PPDB
2D04 86                     ADD   M          ;COMPUTE LAQ NEW ITEM #
2D05 E607                   ANI   07H        ;MASK TO 3 BITS
2D07 5F                     MOV   E,A        ;D,E
2D08 1600                   MVI   D,0        ;  = LAQ NEW ITEM #
2D0A 23                     INX   H          ;POINT H,L TO LAQ ITEM 0
2D0B 19                     DAD   D          ;POINT H,L TO
2D0C 19                     DAD   D          ;  NEW ITEM
2D0D 19                     DAD   D          ;  LOCATION
2D0E EB                     XCHG             ;POINT D,E TO NEW LOCATION
2D0F 219642                 LXI   H,JDV      ;POINT H,L TO JDV,IDENT
2D12 0603                   MVI   B,3        ;B= LOOP COUNT
2D14 CDCF10                 CALL  MOVEB      ;COPY JDV,IDENT INTO LAQ
2D17 04                     INR   B          ;POSITIVE
2D18 C9                     RET              ;  RETURN
                   ;
2D19 D5            RSCHD:   PUSH  D          ;SAVE DELAY COUNT
2D1A E5                     PUSH  H          ;SAVE POINTER
2D1B 5E                     MOV   E,M        ;PICK UP
2D1C 23                     INX   H          ;  TCB
2D1D 56                     MOV   D,M        ;  POINTER
2D1E 7B                     MOV   A,E        ;IF NONZERO
2D1F B2                     ORA   D          ;  THEN EVENT
2D20 CA2D2D                 JZ    RSSEE      ;  PENDING
                   ;
                   ;JUNK ANY EVENT ALREADY PENDING
                   ;
2D23 210700                 LXI   H,7        ;POINT TO BYTE 7
2D26 19                     DAD   D          ;  IN TCB
2D27 118025                 LXI   D,JUNK     ;JUNK
2D2A 73                     MOV   M,E        ;  THE
2D2B 23                     INX   H          ;  PENDING
2D2C 72                     MOV   M,D        ;  EVENT
```

```
                    ;SCHEDULE NEW EVENT
                    ;
2D2D CDCB0F  RSSEE:     CALL   GETFS      ;GET NEW BLOCK FOR TCB
2D30 EB                 XCHG              ;POINT DE TO TCB
2D31 E1                 POP    H          ;POINT TO TCB
2D32 E5                 PUSH   H          ;  POINTER
2D33 73                 MOV    M,E        ;SET UP
2D34 23                 INX    H          ;  TCB
2D35 72                 MOV    M,D        ;  POINTER
2D36 210B00             LXI    H,11       ;POINT TO BYTE 11
2D39 19                 DAD    D          ;  IN TCB
2D3A D1                 POP    D          ;POIN DE TO TCB POINTER
2D3B 72                 MOV    M,D        ;SET BACKWARD
2D3C 2B                 DCX    H          ;  POINTER
2D3D 73                 MOV    M,E        ;  IN TCB
2D3E 2B                 DCX    H          ;POINT TO BYTE 9 IN TCB
2D3F 3A9442             LDA    JINDU      ;SAVE INDUCT #
2D42 77                 MOV    M,A        ;  IN TCB
2D43 2B                 DCX    H          ;POINT TO BYTE 8 IN TCB
2D44 70                 MOV    M,B        ;SET EVENT
2D45 2B                 DCX    H          ;  ENTRY IN
2D46 71                 MOV    M,C        ;  TCB
2D47 EB                 XCHG              ;COMPUTE
2D48 C1                 POP    B          ;  DE
2D49 2AB642             LHLD   CTIME      ;  = EVENT
2D4C 09                 DAD    B          ;  DUE
2D4D EB                 XCHG              ;  TIME
2D4E 2B                 DCX    H          ;POINT TO BYTE 6 IN TCB
2D4F 72                 MOV    M,D        ;SET EVENT
2D50 2B                 DCX    H          ;  DUE TIME
2D51 73                 MOV    M,E        ;  IN TCB
2D52 11FBFF             LXI    D,0FFFBH   ;POINT TO
2D55 19                 DAD    D          ;  TCB
2D56 CD4429             CALL   ENQU2      ;SCHEDULE EVENT
2D59 C9                 RET
                    ;
2D5A E5      RDELA:     PUSH   H          ;SAVE CALLER'S H,L, A
2D5B F5                 PUSH   PSW        ;  IN STACK
2D5C C5                 PUSH   B          ;GET TREE
2D5D D5                 PUSH   D          ;  PARAMETERS
2D5E AF                 XRA    A          ;  FOR
2D5F CDBA0F             CALL   GTREP      ;  REAL
2D62 D1                 POP    D          ;  TIME
2D63 C1                 POP    B          ;  CLOCK
2D64 C3692D             JMP    RDLPI
                    ;
                    ;
                    ;DELAY D,E PPI PULSES.
                    ;
                    ;INPUT: TREE PARAMETERS, D,E= # PULSES TO DELAY.
                    ;OUTPUT: TCBP POINTS TO DELAYED EVENT.
                    ;REGISTERS A, B, C, H, L RESTORED. STACK EFFECTED AFTER DELAY.
                    ;  TCBP, TREE DATA EFFECTED.
                    ;
2D67 E5      RDLPP:     PUSH   H          ;SAVE CALLER'S H,L, A
2D68 F5                 PUSH   PSW        ;  IN STACK
2D69 2AB642  RDLPI:     LHLD   CTIME      ;SAVE DELAYED EVENT
2D6C 19                 DAD    D          ;  TIME IN
2D6D E5                 PUSH   H          ;  STACK
2D6E CDCB0F             CALL   GETFS      ;GET FREE BLOCK
2D71 22B442             SHLD   TCBP       ;SAVE POINTER
2D74 110500             LXI    D,5        ;POINT TO BYTE 5
2D77 19                 DAD    D          ;  IN TCB
2D78 D1                 POP    D          ;SET
2D79 73                 MOV    M,E        ;  DELAYED
2D7A 23                 INX    H          ;  EVENT
2D7B 72                 MOV    M,D        ;  TIME
2D7C 23                 INX    H          ;POINT TO BYTE 7 IN TCB
2D7D 119B2D             LXI    D,R2DEL    ;SET
2D80 73                 MOV    M,E        ;  EVENT
2D81 23                 INX    H          ;  TO BE
2D82 72                 MOV    M,D        ;  DELA2
2D83 23                 INX    H          ;POINT TO BYTE 9
2D84 F1                 POP    PSW        ;SAVE CALLER'S A
2D85 77                 MOV    M,A        ;  IN TCB
2D86 23                 INX    H          ;POINT TO BYTE 10
2D87 71                 MOV    M,C        ;SAVE CALLER'S
2D88 23                 INX    H          ;  B,C
2D89 70                 MOV    M,B        ;  IN TCB
2D8A 23                 INX    H          ;POINT TO BYTE 12
2D8B D1                 POP    D          ;SAVE CALLER'S
2D8C 73                 MOV    M,E        ;  H,L
2D8D 23                 INX    H          ;  IN
2D8E 72                 MOV    M,D        ;  TCB
2D8F 23                 INX    H          ;POINT TO BYTE 14
```

```
2D90 D1                    POP    D          ;SAVE
2D91 73                    MOV    M,E        ;  RETURN
2D92 23                    INX    H          ;  ADDRESS
2D93 72                    MOV    M,D        ;  IN TCB
2D94 2AB442                LHLD   TCBP       ;SCHEDULE
2D97 CD4429                CALL   ENQU2      ;  EVENT DELA2
2D9A C9                    RET               ;RETURN TO CALLER OF CALLER
                   ;
                   ;RESUMPTION OF DELAYED EVENT.
                   ;  PART OF MODULE DELAY.
                   ;
                   ;INPUT: TCBP, D,E POINTS TO BYTE 8 OF TCB, TREE PARAMETERS.
                   ;
2D9B 210700        R2DEL:  LXI    H,7        ;POINT TO BYTE 15
2D9E 19                    DAD    D          ;  IN TCB
2D9F 56                    MOV    D,M        ;PUT CALLER'S
2DA0 2B                    DCX    H          ;  RETURN ADDRESS
2DA1 5E                    MOV    E,M        ;  IN
2DA2 D5                    PUSH   D          ;  STACK
2DA3 2B                    DCX    H          ;POINT TO BYTE 13
2DA4 56                    MOV    D,M        ;SAVE CALLER'S
2DA5 2B                    DCX    H          ;  H,L
2DA6 5E                    MOV    E,M        ;  IN
2DA7 D5                    PUSH   D          ;  STACK
2DA8 2B                    DCX    H          ;POINT TO BYTE 11
2DA9 46                    MOV    B,M        ;RESTORE
2DAA 2B                    DCX    H          ;  CALLER'S
2DAB 4E                    MOV    C,M        ;  B,C
2DAC 2B                    DCX    H          ;POINT TO BYTE 10
2DAD 7E                    MOV    A,M        ;SAVE CALLER'S A
2DAE F5                    PUSH   PSW        ;  IN STACK
2DAF 2AB442                LHLD   TCBP       ;RETURN TCB TO
2DB2 CD4F11                CALL   PUTFS      ;  FREE STORAGE
2DB5 F1                    POP    PSW        ;RESTORE CALLER'S A
2DB6 E1                    POP    H          ;RESTORE CALLER'S H,L
2DB7 C9                    RET               ;RETURN TO CALLER OF DELAY
                   ;
                   ;
                   ;;
                   ;**********************************************************************
                   ;          OPTIONAL TRANSLATION AND PROGRAMMING MODULES
                   ;**********************************************************************
                   ;
2DB8                       ORG    2F00H       ;TRANSLATION MODULE
                   ;
                   ;
                   ;INITIALIZE TRANSLATION DATABASE AND TABLE.
                   ;
                   ;INPUT: INTERRUPTS DISABLED.
                   ;ALL REGISTERS EFFECTED.
                   ;
2F00 2A4D42        XLINI:  LHLD   XLDB       ;POINT TO XLDB FOR TABLE # 1
2F03 E5                    PUSH   H          ;SAVE POINTER AT TOP OF STACK
2F04 21C03D                LXI    H,XLTBS    ;POINT TO TABLE ADDRESSES
2F07 3A0B3D                LDA    NXLTB      ;SET COUNTER B
2F0A 47                    MOV    B,A        ;  = # TRANSLATE TABLES
2F0B 5E            XXLDB:  MOV    E,M        ;PICK UP
2F0C 23                    INX    H          ;  TABLE
2F0D 56                    MOV    D,M        ;  ADDRESS
2F0E 23                    INX    H          ;POINT TO NEXT TABLE AD
2F0F E3                    XTHL              ;POINT TO BYTE 1 IN XLDB,
2F10 23                    INX    H          ;  LEAVING TABLE-FULL FLAG TBFU = 0
2F11 73                    MOV    M,E        ;SET POINTER
2F12 23                    INX    H          ;  XLTB
2F13 72                    MOV    M,D        ;  IN XLDB
2F14 3A0C3D                LDA    TBSIZ      ;COMPUTE D,E = XLTB2
```

The embodiments of the invention in which an exclusive property or privilege is claimed are defined as follows.

1. A system for monitoring and controlling the flow of articles in a warehousing system including a sorting conveyer with a plurality of discharge locations in which stored articles are to be batch picked and sorted for shipment comprising:

means for storing data representing each article to be picked, said data including a number assigned to each article which is unique to each article and sort destination information for each article;

indicia mean associated with each article to be picked including said unique number;

scanning means for scanning said indicia means on an article transported within the warehousing system;

computer circuit means coupled to said data storing means and to said scanning means for correlating position information of each article with the article identification number;

display means coupled to said computer circuit means for providing display information to an operator of the status of each article to be picked and sorted;

a conveyer control circuit for selectively controlling the discharge of articles; and means coupling said conveyer control circuit to said computer circuit means for controlling the diverting of articles in response to the correlation of their unique identification number with associated sort destination information stored in said data storing means.

2. The system as defined in claim 1 wherein data for each batch of articles to be picked is stored on a recording medium which can be transported from a remote central control area, and wherein said system includes data transfer means coupled to said computer circuit means for reading and transferring data from said recording medium to said data storing means.

3. The system as defined in claim 2 wherein said display means includes an operator terminal coupled to said computer circuit means and including a keyboard and CRT display for selectively interrogating the computer circuit means for status information.

4. The system as defined in claim 3 wherein said display means further includes printer means coupled to said computer circuit means for providing a printout of the status of articles to be picked and sorted.

5. The system as defined in claim 4 wherein said display means further includes additional printer means for printing alarm messages relating to predetermined events occuring during the operation of said system.

6. A system for monitoring the status of articles being processed in a warehouse system including article conveying means comprising:

a plurality of label reading means positioned at selected locations within the warehouse system for reading a unique identification number contained on a label applied to each article moving within the system and uniquely identifying each such article;

data storage means including each identification number of articles to be processed and including processing information associated with each such article;

computer circuit means coupled to said label reading means and to said data storage means for monitoring the position of articles travelling within the system and for generating signals representative of the position and therefore the processing status of such articles;

display means coupled to said computer circuit means for displaying the status of articles or groups of articles in the system; and control means coupled to said computer circuit means for controlling the operation of the warehouse conveying means to control the movement of articles or groups of articles in the system.

7. The system as defined in claim 6 wherein said data storage means includes a data recording medium including each identification number stored thereon together with associated processing information.

8. The system as defined in claim 7 wherein said data storage means further includes data transfer means for reading and writing data to and from said recording medium respectively, said data transfer means coupled to said computer circuit means.

9. The system as defined in claim 8 and further including printer means coupled to said computer circuit means for providing a printout of the status of articles to be processed.

10. The system as defined in claim 9 and further including an operator keyboard and wherein said computer circuit means is programmed to provide reports selectively printed by said printing means when requested by commands from said operator keyboard.

11. A system for monitoring the status of articles being processed comprising:

a plurality of label reading means for reading a unique identification number contained on a label applied to each article moving within the system and uniquely identifying each such article;

data storage means including a data recording medium for storing each identification number together with associated processing information for articles to be processed;

computer circuit means coupled to said label reading means and to said data storage means for monitoring the position of articles travelling within the system and for generating signals representative of the position and therefore the processing status of such articles wherein said data storage means further includes data transfer means for reading and writing data to and from said recording medium respectively, said data transfer means coupled to said computer circuit means;

display means coupled to said computer circuit means for displaying the status of articles or groups of articles in the system said display means including printer means coupled to said computer circuit means for providing a printout of the status of articles to be processed;

an operator keyboard coupled to said computer circuit means and wherein said computer circuit means is programmed to provide reports selectively printed by said printing means when requested by commands from said operator keyboard;

a sorting conveyer with a plurality of discharge chutes;

a conveyer control circuit for selectively controlling the discharge of articles onto said discharge chutes; and means coupling said conveyer control circuit to said computer circuit means for controlling the diverting of articles in response to the correlation of their unique identification number with associated sort destination information stored in said data storage means.

12. A system for monitoring and controlling the batch order picking and sorting of articles in a warehouse comprising:

a plurality of label reading means for reading a unique identification number contained on a label applied to each article moving within the system and uniquely identifying each such article;

bulk data storage means including each identification number of articles to be sorted and including sort destination information for each such article;

computer circuit means coupled to said label reading means and to said bulk data storage means for monitoring the physical position of articles travelling within the system and for generating signals representative of the position and therefore the sorting status of such articles;

display means coupled to said computer circuit means for displaying the status of articles or groups of articles in the system;

a conveyer control circuit for selectively controlling the discharge of articles at discharge locations in the warehouse; and means coupling said conveyer control circuit to said computer circuit means for controlling the diverting of articles in response to the correlation of their unique identification number with associated sort destination information stored in said data storage means.

13. The system as defined in claim 12 wherein said bulk data storage means receives data from a data recording medium including each identification number stored thereon together with associated sorting information.

14. The system as defined in claim 13 wherein said data storage means includes data transfer means for reading and writing data to and from said recording medium respectively, said data transfer means coupled to said computer circuit means.

15. The system as defined in claim 14 wherein said recording medium is a diskette.

16. The system as defined in claim 15 wherein said display means includes printer means coupled to said computer circuit means for providing a printout of the status of articles to be sorted.

17. The system as defined in claim 16 and further including an operator keyboard and wherein said computer circuit means is programmed to provide reports selectively printed by said printing means when requested by commands from said operator keyboard.

* * * * *

UNITED STATES PATENT AND TRADEMARK OFFICE

CERTIFICATE OF CORRECTION

PATENT NO. : 4,336,589

DATED : June 22, 1982

INVENTOR(S) : Smith et al

It is certified that error appears in the above—identified patent and that said Letters Patent is hereby corrected as shown below:

Column 2, line 29:

"syste" should be --system--

Column 3, line 15:

"disketter" should be --diskette--

Column 7, line 12:

After "such" insert --as--

Column 453, line 13:

"mean" should be --means--

Signed and Sealed this

*Second* Day of *April 1985*

[SEAL]

*Attest:*

DONALD J. QUIGG

*Attesting Officer* *Acting Commissioner of Patents and Trademarks*